(12) United States Patent
Johnston et al.

(10) Patent No.: US 11,966,560 B2
(45) Date of Patent: Apr. 23, 2024

(54) USER INTERFACES FOR BROWSING CONTENT FROM MULTIPLE CONTENT APPLICATIONS ON AN ELECTRONIC DEVICE

(71) Applicant: Apple Inc., Cupertino, CA (US)

(72) Inventors: Alexander W. Johnston, La Jolla, CA (US); Dennis S. Park, San Francisco, CA (US); Tito Lloyd Balsamo, San Francisco, CA (US); Jonathan Lochhead, Scotts Valley, CA (US); Yesmeen El-Shafey, Denver, CO (US); Graham R. Clarke, Scotts Valley, CA (US); Peter D. Anton, Portola Valley, CA (US); Jennifer L. C. Folse, San Francisco, CA (US); William M. Bachman, San Jose, CA (US); Stephen O. Lemay, Palo Alto, CA (US); Gregg Suzuki, Daly City, CA (US); Alan C. Dye, San Francisco, CA (US); Jeff Tan-Ang, San Jose, CA (US); Policarpo B. Wood, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/719,404

(22) Filed: Sep. 28, 2017

(65) Prior Publication Data

US 2018/0113579 A1 Apr. 26, 2018

Related U.S. Application Data

(60) Provisional application No. 62/556,912, filed on Sep. 11, 2017, provisional application No. 62/423,150, (Continued)

(51) Int. Cl.
*G06F 3/04842* (2022.01)
*G06F 3/00* (2006.01)
(Continued)

(52) U.S. Cl.
CPC ........ *G06F 3/0482* (2013.01); *G06F 3/04817* (2013.01); *G06F 3/0485* (2013.01);
(Continued)

(58) Field of Classification Search
CPC .... G06F 3/04842; G06F 16/40; G06F 16/743; G06F 16/44; G06F 3/04817;
(Continued)

(56) References Cited

U.S. PATENT DOCUMENTS

| 2,718,550 A | 9/1955 | Hoyt et al. |
| 4,672,677 A | 6/1987 | Yamakawa |

(Continued)

FOREIGN PATENT DOCUMENTS

| AU | 2009255409 B2 | 7/2012 |
| AU | 2016100476 A4 | 5/2016 |

(Continued)

OTHER PUBLICATIONS

Engadget, Sling TV redesign makes it easy to find your favorite content, published Jan. 5, 2016, Engadget.com, pp. 1-12 (pdf).*

(Continued)

*Primary Examiner* — Manglesh M Patel
(74) *Attorney, Agent, or Firm* — Kubota & Basol LLP

(57) ABSTRACT

In some embodiments, an electronic device presents media items from different media applications in a unified media browsing application. In some embodiments, an electronic device facilitates browsing of media from different media applications based on category of media (e.g., movies, television shows, etc.). In some embodiments, an electronic device facilitates setup of a unified media browsing appli- (Continued)

cation that presents media items from different media applications in a unified media browsing user interface. In some embodiments, an electronic device displays multiple episodes of a collection of episodic content (e.g., a television series) in a user interface for the collection of episodic content. In some embodiments, an electronic device displays representations of, and provides access to, live-event media items accessible on the electronic device.

69 Claims, 183 Drawing Sheets

Related U.S. Application Data filed on Nov. 16, 2016, provisional application No. 62/413,333, filed on Oct. 26, 2016.

(51) Int. Cl.
| | |
|---|---|
| G06F 3/04817 | (2022.01) |
| G06F 3/0482 | (2013.01) |
| G06F 3/0485 | (2022.01) |
| G06F 3/04883 | (2022.01) |
| G06F 16/40 | (2019.01) |
| G06F 16/44 | (2019.01) |
| G06F 16/74 | (2019.01) |
| H04N 21/422 | (2011.01) |
| H04N 21/431 | (2011.01) |
| H04N 21/462 | (2011.01) |
| H04N 21/472 | (2011.01) |
| H04N 21/482 | (2011.01) |
| G06F 3/0488 | (2022.01) |
| G06F 3/16 | (2006.01) |

(52) U.S. Cl.
CPC .......... *G06F 3/04883* (2013.01); *G06F 16/40* (2019.01); *G06F 16/44* (2019.01); *G06F 16/743* (2019.01); *H04N 21/42224* (2013.01); *H04N 21/4312* (2013.01); *H04N 21/4622* (2013.01); *H04N 21/472* (2013.01); *H04N 21/47217* (2013.01); *H04N 21/482* (2013.01); *H04N 21/4826* (2013.01); *G06F 3/0488* (2013.01); *G06F 3/165* (2013.01); *H04N 21/4821* (2013.01)

(58) Field of Classification Search
CPC .. G06F 3/0485; G06F 3/04883; G06F 3/0488; G06F 3/165; H04N 21/42224; H04N 21/4312; H04N 21/4622; H04N 21/472; H04N 21/47217; H04N 21/482; H04N 21/4826; H04N 21/4821
USPC ................................................. 715/719, 200
See application file for complete search history.

(56) References Cited

U.S. PATENT DOCUMENTS

| | | | |
|---|---|---|---|
| 5,029,223 A | 7/1991 | Fujisaki | |
| 5,483,261 A | 1/1996 | Yasutake | |
| 5,488,204 A | 1/1996 | Mead et al. | |
| 5,585,866 A | 12/1996 | Miller et al. | |
| 5,596,373 A | 1/1997 | White et al. | |
| 5,621,456 A | 4/1997 | Florin et al. | |
| 5,818,439 A | 10/1998 | Nagasaka et al. | |
| 5,825,352 A | 10/1998 | Bisset et al. | |
| 5,835,079 A | 11/1998 | Shieh | |
| 5,880,411 A | 3/1999 | Gillespie et al. | |
| 5,886,690 A | 3/1999 | Pond et al. | |
| 5,926,230 A | 7/1999 | Niijima et al. | |
| 6,021,320 A | 2/2000 | Bickford et al. | |
| 6,028,600 A | 2/2000 | Rosin et al. | |
| 6,049,333 A | 4/2000 | Lajoie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,405,371 B1 | 6/2002 | Oosterhout et al. | |
| 6,487,722 B1 | 11/2002 | Okura et al. | |
| 6,570,557 B1 | 5/2003 | Westerman et al. | |
| 6,628,304 B2 | 9/2003 | Mitchell et al. | |
| 6,677,932 B1 | 1/2004 | Westerman | |
| 6,690,387 B2 | 2/2004 | Zimmerman et al. | |
| 6,745,391 B1 | 6/2004 | Macrae et al. | |
| 6,909,837 B1 | 6/2005 | Unger | |
| 6,928,433 B2 | 8/2005 | Goodman et al. | |
| 7,015,894 B2 | 3/2006 | Morohoshi | |
| 7,039,879 B2 | 5/2006 | Bergsten et al. | |
| 7,103,906 B1 | 9/2006 | Katz et al. | |
| 7,134,089 B2 | 11/2006 | Celik et al. | |
| 7,184,064 B2 | 2/2007 | Zimmerman et al. | |
| 7,213,255 B2 | 5/2007 | Markel et al. | |
| 7,293,275 B1 | 11/2007 | Krieger et al. | |
| 7,330,192 B2* | 2/2008 | Brunner .................. | G06T 15/40 |
| | | | 345/32 |
| 7,596,761 B2 | 9/2009 | Lemay et al. | |
| 7,614,008 B2 | 11/2009 | Ording | |
| 7,631,278 B2 | 12/2009 | Miksovsky et al. | |
| 7,633,076 B2 | 12/2009 | Huppi et al. | |
| 7,636,897 B2 | 12/2009 | Koralski et al. | |
| 7,649,526 B2 | 1/2010 | Ording et al. | |
| 7,650,569 B1* | 1/2010 | Allen .................. | H04N 21/4312 |
| | | | 715/720 |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,694,231 B2 | 4/2010 | Kocienda et al. | |
| 7,712,051 B2 | 5/2010 | Chadzelek et al. | |
| 7,783,892 B2 | 8/2010 | Russell et al. | |
| 7,810,043 B2 | 10/2010 | Ostojic et al. | |
| 7,814,023 B1 | 10/2010 | Rao et al. | |
| 7,827,483 B2 | 11/2010 | Unbedacht et al. | |
| 7,836,475 B2 | 11/2010 | Angiolillo et al. | |
| 7,844,914 B2 | 11/2010 | Andre et al. | |
| 7,849,487 B1 | 12/2010 | Vosseller | |
| 7,856,605 B2 | 12/2010 | Ording et al. | |
| 7,917,477 B2 | 3/2011 | Hutson et al. | |
| 7,956,846 B2 | 6/2011 | Ording et al. | |
| 7,957,762 B2 | 6/2011 | Herz et al. | |
| 7,970,379 B2 | 6/2011 | White et al. | |
| 3,006,002 A1 | 8/2011 | Kalayjian et al. | |
| 8,026,805 B1 | 9/2011 | Rowe | |
| 8,082,523 B2 | 12/2011 | Forstall et al. | |
| 8,094,132 B1 | 1/2012 | Frischling et al. | |
| 8,115,731 B2 | 2/2012 | Varanda | |
| 8,145,617 B1 | 3/2012 | Verstak et al. | |
| 8,170,931 B2 | 5/2012 | Ross et al. | |
| 8,205,240 B2 | 6/2012 | Ansari et al. | |
| 8,239,784 B2 | 8/2012 | Hotelling et al. | |
| 8,279,180 B2 | 10/2012 | Hotelling et al. | |
| 8,291,452 B1 | 10/2012 | Yong et al. | |
| 8,299,889 B2 | 10/2012 | Kumar et al. | |
| 8,301,484 B1* | 10/2012 | Kumar .................. | G06Q 30/00 |
| | | | 705/7.29 |
| 8,312,484 B1 | 11/2012 | Mccarty et al. | |
| 8,312,486 B1 | 11/2012 | Briggs et al. | |
| 8,325,160 B2 | 12/2012 | St. Pierre et al. | |
| 8,346,798 B2 | 1/2013 | Spiegelman et al. | |
| 8,370,874 B1 | 2/2013 | Chang et al. | |
| 8,381,135 B2 | 2/2013 | Hotelling et al. | |
| 8,386,588 B1 | 2/2013 | Cooley | |
| 8,407,737 B1 | 3/2013 | Ellis | |
| 8,416,217 B1 | 4/2013 | Eriksson et al. | |
| 8,418,202 B2 | 4/2013 | Ahmad-taylor | |
| 8,424,048 B1 | 4/2013 | Lyren et al. | |
| 8,479,122 B2 | 7/2013 | Hotelling et al. | |
| 8,495,499 B1 | 7/2013 | Denise | |
| 8,516,063 B2 | 8/2013 | Fletcher | |
| 8,516,525 B1 | 8/2013 | Jerding et al. | |
| 8,560,398 B1 | 10/2013 | Few et al. | |

(56) References Cited

U.S. PATENT DOCUMENTS

| | | |
|---|---|---|
| 8,584,165 B1 | 11/2013 | Kane et al. |
| 8,607,163 B2 | 12/2013 | Plummer |
| 8,613,015 B2 | 12/2013 | Gordon et al. |
| 8,613,023 B2 | 12/2013 | Narahara et al. |
| 8,625,974 B1 | 1/2014 | Pinson |
| 8,674,958 B1 | 3/2014 | Kravets et al. |
| 8,683,362 B2 | 3/2014 | Shiplacoff et al. |
| 8,683,517 B2 | 3/2014 | Carpenter et al. |
| 8,730,190 B2 | 5/2014 | Moloney |
| 8,742,885 B2 | 6/2014 | Brodersen et al. |
| 8,754,862 B2 | 6/2014 | Zaliva |
| 8,762,852 B2 | 6/2014 | Davis et al. |
| 8,769,408 B2 * | 7/2014 | Madden ............... H04N 5/85 715/716 |
| 8,782,706 B2 | 7/2014 | Ellis |
| 8,850,471 B2 | 9/2014 | Kilar et al. |
| 8,850,490 B1 | 9/2014 | Thomas et al. |
| 8,869,207 B1 | 10/2014 | Earle |
| 8,887,202 B2 * | 11/2014 | Hunter ............... H04N 21/4821 725/48 |
| 8,930,839 B2 | 1/2015 | He et al. |
| 8,952,987 B2 | 2/2015 | Momeyer et al. |
| 8,963,847 B2 | 2/2015 | Hunt |
| 8,983,950 B2 | 3/2015 | Askey et al. |
| 8,988,356 B2 | 3/2015 | Tseng |
| 8,990,857 B2 | 3/2015 | Yong et al. |
| 9,007,322 B1 | 4/2015 | Young |
| 9,066,146 B2 | 6/2015 | Suh et al. |
| 9,081,421 B1 | 7/2015 | Lai et al. |
| 9,092,057 B2 | 7/2015 | Varela et al. |
| 9,116,569 B2 | 8/2015 | Stacy et al. |
| 9,118,967 B2 | 8/2015 | Sirpal et al. |
| 9,129,656 B2 | 9/2015 | Prather et al. |
| 9,141,200 B2 | 9/2015 | Bernstein et al. |
| 9,196,309 B2 | 11/2015 | Schultz et al. |
| 9,214,290 B2 | 12/2015 | Xie et al. |
| 9,215,273 B2 | 12/2015 | Jonnala et al. |
| 9,219,634 B1 | 12/2015 | Morse et al. |
| 9,235,317 B2 | 1/2016 | Matas et al. |
| 9,241,121 B2 | 1/2016 | Rudolph |
| 9,244,600 B2 | 1/2016 | Mcintosh et al. |
| 9,247,014 B1 | 1/2016 | Rao |
| 9,247,174 B2 | 1/2016 | Sirpal et al. |
| 9,285,977 B1 | 3/2016 | Greenberg et al. |
| 9,319,727 B2 | 4/2016 | Phipps et al. |
| 9,348,458 B2 | 5/2016 | Hotelling et al. |
| 9,357,250 B1 | 5/2016 | Newman et al. |
| 9,380,343 B2 | 6/2016 | Webster et al. |
| 9,414,108 B2 | 8/2016 | Sirpal et al. |
| 9,454,288 B2 | 9/2016 | Raffle et al. |
| 9,514,476 B2 | 12/2016 | Kay et al. |
| 9,532,111 B1 | 12/2016 | Christie et al. |
| 9,538,310 B2 | 1/2017 | Fjeldsoe-nielsen et al. |
| 9,542,060 B1 | 1/2017 | Brenner et al. |
| 9,560,399 B2 | 1/2017 | Kaya et al. |
| 9,575,944 B2 | 2/2017 | Neil et al. |
| 9,591,339 B1 | 3/2017 | Christie et al. |
| 9,600,159 B2 | 3/2017 | Lawson et al. |
| 9,602,566 B1 | 3/2017 | Lewis et al. |
| 9,639,241 B2 | 5/2017 | Penha et al. |
| 9,652,118 B2 | 5/2017 | Hill et al. |
| 9,652,448 B2 | 5/2017 | Pasquero et al. |
| 9,658,740 B2 | 5/2017 | Chaudhri |
| 9,774,917 B1 | 9/2017 | Christie et al. |
| 9,792,018 B2 | 10/2017 | Van Os et al. |
| 9,807,462 B2 | 10/2017 | Wood |
| 9,864,508 B2 | 1/2018 | Dixon et al. |
| 9,864,509 B2 | 1/2018 | Howard et al. |
| 9,871,905 B1 | 1/2018 | Habiger et al. |
| 9,913,142 B2 | 3/2018 | Folse et al. |
| 9,933,937 B2 | 4/2018 | Lemay et al. |
| 9,973,800 B2 | 5/2018 | Yellin et al. |
| 10,019,142 B2 | 7/2018 | Van Os et al. |
| 10,025,499 B2 | 7/2018 | Howard et al. |
| 10,079,872 B1 | 9/2018 | Thomas et al. |
| 10,091,558 B2 | 10/2018 | Christie et al. |
| 10,116,996 B1 | 10/2018 | Christie et al. |
| 10,126,904 B2 | 11/2018 | Agnetta et al. |
| 10,168,871 B2 | 1/2019 | Wallters et al. |
| 10,200,761 B1 | 2/2019 | Christie et al. |
| 10,205,985 B2 | 2/2019 | Lue-sang et al. |
| 10,237,599 B1 | 3/2019 | Gravino et al. |
| 10,275,148 B2 | 4/2019 | Matas et al. |
| 10,282,088 B2 | 5/2019 | Kim et al. |
| 10,303,422 B1 | 5/2019 | Woo et al. |
| 10,405,015 B2 | 9/2019 | Kite et al. |
| 10,521,188 B1 | 12/2019 | Christie et al. |
| 10,551,995 B1 | 2/2020 | Ho et al. |
| 10,552,470 B2 | 2/2020 | Todd et al. |
| 10,564,823 B1 | 2/2020 | Dennis et al. |
| 10,601,808 B1 | 3/2020 | Nijim et al. |
| 10,606,539 B2 | 3/2020 | Bernstein et al. |
| 10,631,042 B2 | 4/2020 | Zerr et al. |
| 10,650,052 B2 | 5/2020 | Van Os et al. |
| 10,795,490 B2 | 10/2020 | Chaudhri et al. |
| 10,827,007 B2 | 11/2020 | Kode et al. |
| 11,062,358 B1 | 7/2021 | Lewis et al. |
| 11,461,397 B2 | 10/2022 | Van Os et al. |
| 2002/0015024 A1 | 2/2002 | Westerman et al. |
| 2002/0026637 A1 | 2/2002 | Markel et al. |
| 2002/0042920 A1 | 4/2002 | Thomas et al. |
| 2002/0060750 A1 | 5/2002 | Istvan et al. |
| 2002/0085045 A1 | 7/2002 | Vong et al. |
| 2002/0100063 A1 | 7/2002 | Herigstad et al. |
| 2002/0112239 A1 | 8/2002 | Goldman |
| 2002/0113816 A1 | 8/2002 | Mitchell et al. |
| 2002/0144269 A1 | 10/2002 | Connelly |
| 2002/0171686 A1 | 11/2002 | Kamen et al. |
| 2003/0001907 A1 | 1/2003 | Bergsten et al. |
| 2003/0005445 A1 | 1/2003 | Schein et al. |
| 2003/0009757 A1 | 1/2003 | Kikinis |
| 2003/0011641 A1 | 1/2003 | Totman et al. |
| 2003/0013483 A1 | 1/2003 | Ausems et al. |
| 2003/0088872 A1 | 5/2003 | Maissel et al. |
| 2003/0093790 A1 | 5/2003 | Logan et al. |
| 2003/0126600 A1 | 7/2003 | Heuvelman |
| 2003/0149628 A1 | 8/2003 | Abbosh et al. |
| 2003/0158950 A1 | 8/2003 | Sako |
| 2003/0167471 A1 | 9/2003 | Roth et al. |
| 2003/0177075 A1 | 9/2003 | Burke |
| 2003/0177498 A1 | 9/2003 | Ellis et al. |
| 2003/0192060 A1 | 10/2003 | Levy |
| 2003/0221191 A1 | 11/2003 | Khusheim |
| 2003/0228130 A1 | 12/2003 | Tanikawa et al. |
| 2003/0234804 A1 | 12/2003 | Parker et al. |
| 2004/0019497 A1 | 1/2004 | Volk et al. |
| 2004/0046801 A1 | 3/2004 | Lin et al. |
| 2004/0070573 A1 | 4/2004 | Graham |
| 2004/0088328 A1 | 5/2004 | Cook et al. |
| 2004/0090463 A1 | 5/2004 | Celik et al. |
| 2004/0133909 A1 | 7/2004 | Ma |
| 2004/0139401 A1 | 7/2004 | Unbedacht et al. |
| 2004/0161151 A1 | 8/2004 | Iwayama et al. |
| 2004/0168184 A1 | 8/2004 | Steenkamp et al. |
| 2004/0193421 A1 | 9/2004 | Blass |
| 2004/0252120 A1 | 12/2004 | Hunleth et al. |
| 2004/0254883 A1 | 12/2004 | Kondrk et al. |
| 2004/0254958 A1 | 12/2004 | Volk |
| 2004/0267715 A1 | 12/2004 | Polson et al. |
| 2005/0012599 A1 | 1/2005 | Dematteo |
| 2005/0071761 A1 | 3/2005 | Kontio |
| 2005/0071785 A1 | 3/2005 | Chadzelek et al. |
| 2005/0076363 A1 | 4/2005 | Dukes et al. |
| 2005/0091254 A1 | 4/2005 | Stabb et al. |
| 2005/0091597 A1 | 4/2005 | Ackley |
| 2005/0162398 A1 | 7/2005 | Eliasson et al. |
| 2005/0162402 A1 | 7/2005 | Watanachote |
| 2005/0186988 A1 | 8/2005 | Lim et al. |
| 2005/0190059 A1 | 9/2005 | Wehrenberg |
| 2005/0223335 A1 | 10/2005 | Ichikawa |
| 2005/0235316 A1 | 10/2005 | Ahmad-taylor |
| 2005/0257166 A1 | 11/2005 | Tu |
| 2005/0283358 A1 | 12/2005 | Stephanick et al. |
| 2006/0017692 A1 | 1/2006 | Wehrenberg et al. |

(56) References Cited

U.S. PATENT DOCUMENTS

| | | |
|---|---|---|
| 2006/0020904 A1 | 1/2006 | Aaltonen et al. |
| 2006/0029374 A1 | 2/2006 | Park |
| 2006/0031872 A1 | 2/2006 | Hsiao et al. |
| 2006/0033724 A1 | 2/2006 | Chaudhri et al. |
| 2006/0053449 A1 | 3/2006 | Gutta |
| 2006/0069998 A1 | 3/2006 | Artman et al. |
| 2006/0071905 A1 | 4/2006 | Varanda |
| 2006/0080352 A1 | 4/2006 | Boubez et al. |
| 2006/0107304 A1 | 5/2006 | Cleron et al. |
| 2006/0112346 A1 | 5/2006 | Miksovsky et al. |
| 2006/0112352 A1 | 5/2006 | Tseng et al. |
| 2006/0117267 A1 | 6/2006 | Koralski et al. |
| 2006/0120624 A1 | 6/2006 | Jojic et al. |
| 2006/0195479 A1 | 8/2006 | Spiegelman et al. |
| 2006/0195512 A1 | 8/2006 | Rogers et al. |
| 2006/0197753 A1 | 9/2006 | Hotelling |
| 2006/0224987 A1 | 10/2006 | Caffarelli |
| 2006/0248113 A1 | 11/2006 | Leffert et al. |
| 2006/0265637 A1 | 11/2006 | Marriott et al. |
| 2006/0271968 A1 | 11/2006 | Zellner |
| 2006/0282856 A1 | 12/2006 | Errico et al. |
| 2006/0294545 A1 | 12/2006 | Morris et al. |
| 2007/0005569 A1 | 1/2007 | Hurst-hiller et al. |
| 2007/0009229 A1 | 1/2007 | Liu |
| 2007/0011702 A1 | 1/2007 | Vaysman |
| 2007/0028267 A1 | 2/2007 | Ostojic et al. |
| 2007/0038957 A1 | 2/2007 | White |
| 2007/0073596 A1 | 3/2007 | Alexander et al. |
| 2007/0092204 A1 | 4/2007 | Wagner et al. |
| 2007/0150802 A1 | 6/2007 | Wan et al. |
| 2007/0154163 A1 | 7/2007 | Cordray |
| 2007/0157220 A1 | 7/2007 | Cordray et al. |
| 2007/0157249 A1 | 7/2007 | Cordray et al. |
| 2007/0168413 A1 | 7/2007 | Barletta et al. |
| 2007/0186254 A1 | 8/2007 | Tsutsui et al. |
| 2007/0199035 A1 | 8/2007 | Schwartz et al. |
| 2007/0204057 A1 | 8/2007 | Shaver et al. |
| 2007/0229465 A1 | 10/2007 | Sakai et al. |
| 2007/0233880 A1 | 10/2007 | Nieh et al. |
| 2007/0244902 A1 | 10/2007 | Seide et al. |
| 2007/0248317 A1 | 10/2007 | Bahn |
| 2008/0046928 A1 | 2/2008 | Poling et al. |
| 2008/0059884 A1 | 3/2008 | Ellis et al. |
| 2008/0065989 A1 | 3/2008 | Conroy et al. |
| 2008/0066010 A1 | 3/2008 | Brodersen et al. |
| 2008/0077562 A1 | 3/2008 | Schleppe |
| 2008/0092168 A1 | 4/2008 | Logan et al. |
| 2008/0092173 A1 | 4/2008 | Shannon et al. |
| 2008/0111822 A1 | 5/2008 | Horowitz et al. |
| 2008/0120668 A1 | 5/2008 | Yau |
| 2008/0127281 A1 | 5/2008 | Van et al. |
| 2008/0155475 A1 | 6/2008 | Duhig |
| 2008/0189740 A1 | 8/2008 | Carpenter et al. |
| 2008/0189742 A1 | 8/2008 | Ellis et al. |
| 2008/0216020 A1 | 9/2008 | Plummer |
| 2008/0222677 A1 | 9/2008 | Woo et al. |
| 2008/0235588 A1 | 9/2008 | Gonze et al. |
| 2008/0243817 A1 | 10/2008 | Chan et al. |
| 2008/0250312 A1 | 10/2008 | Curtis |
| 2008/0260252 A1 | 10/2008 | Borgaonkar et al. |
| 2008/0270886 A1 | 10/2008 | Gossweiler et al. |
| 2008/0276279 A1 | 11/2008 | Gossweiler et al. |
| 2008/0301260 A1 | 12/2008 | Goldeen et al. |
| 2008/0301579 A1 | 12/2008 | Jonasson et al. |
| 2008/0301734 A1 | 12/2008 | Goldeen et al. |
| 2008/0307343 A1 | 12/2008 | Robert et al. |
| 2008/0307458 A1 | 12/2008 | Kim et al. |
| 2008/0307459 A1 | 12/2008 | Migos |
| 2008/0320391 A1 | 12/2008 | Lemay et al. |
| 2008/0320532 A1 | 12/2008 | Lee |
| 2009/0055385 A1 | 2/2009 | Jeon et al. |
| 2009/0063521 A1 | 3/2009 | Bull et al. |
| 2009/0063975 A1 | 3/2009 | Rottler et al. |
| 2009/0089837 A1 | 4/2009 | Momosaki |
| 2009/0094662 A1 | 4/2009 | Chang et al. |
| 2009/0119754 A1 | 5/2009 | Schubert |
| 2009/0158325 A1 | 6/2009 | Johnson |
| 2009/0158326 A1 | 6/2009 | Hunt et al. |
| 2009/0161868 A1 | 6/2009 | Chaudhry |
| 2009/0164944 A1 | 6/2009 | Webster et al. |
| 2009/0165054 A1 | 6/2009 | Rudolph |
| 2009/0174679 A1 | 7/2009 | Westerman |
| 2009/0177301 A1 | 7/2009 | Hayes |
| 2009/0177989 A1 | 7/2009 | Ma et al. |
| 2009/0178083 A1 | 7/2009 | Carr et al. |
| 2009/0228491 A1 | 9/2009 | Malik |
| 2009/0239587 A1 | 9/2009 | Negron et al. |
| 2009/0256807 A1 | 10/2009 | Nurmi |
| 2009/0259957 A1* | 10/2009 | Slocum .............. H04N 21/8126 715/765 |
| 2009/0278916 A1 | 11/2009 | Ito |
| 2009/0282444 A1 | 11/2009 | Laksono et al. |
| 2009/0288079 A1 | 11/2009 | Zuber et al. |
| 2009/0313100 A1 | 12/2009 | Ingleshwar |
| 2009/0322962 A1 | 12/2009 | Weeks |
| 2009/0327952 A1 | 12/2009 | Karas et al. |
| 2010/0009629 A1 | 1/2010 | Jung et al. |
| 2010/0031162 A1 | 2/2010 | Wiser et al. |
| 2010/0053220 A1 | 3/2010 | Ozawa et al. |
| 2010/0053432 A1 | 3/2010 | Cheng et al. |
| 2010/0057696 A1 | 3/2010 | Miyazawa et al. |
| 2010/0064313 A1 | 3/2010 | Beyabani |
| 2010/0080163 A1 | 4/2010 | Krishnamoorthi et al. |
| 2010/0083181 A1 | 4/2010 | Matsushima et al. |
| 2010/0095240 A1 | 4/2010 | Shiplacoff et al. |
| 2010/0100899 A1 | 4/2010 | Bradbury et al. |
| 2010/0104269 A1 | 4/2010 | Prestenback et al. |
| 2010/0115592 A1 | 5/2010 | Belz et al. |
| 2010/0121714 A1 | 5/2010 | Bryant et al. |
| 2010/0146442 A1 | 6/2010 | Nagasaka et al. |
| 2010/0153881 A1 | 6/2010 | Dinn |
| 2010/0153999 A1 | 6/2010 | Yates |
| 2010/0159898 A1 | 6/2010 | Krzyzanowski et al. |
| 2010/0162172 A1 | 6/2010 | Aroner |
| 2010/0194998 A1 | 8/2010 | Lee et al. |
| 2010/0198822 A1 | 8/2010 | Glennon et al. |
| 2010/0205628 A1 | 8/2010 | Davis et al. |
| 2010/0211636 A1 | 8/2010 | Starkenburg et al. |
| 2010/0223646 A1 | 9/2010 | Goldeen et al. |
| 2010/0229194 A1 | 9/2010 | Blanchard et al. |
| 2010/0235744 A1 | 9/2010 | Schultz et al. |
| 2010/0251304 A1 | 9/2010 | Donoghue et al. |
| 2010/0257005 A1 | 10/2010 | Phenner et al. |
| 2010/0269145 A1 | 10/2010 | Ingrassia et al. |
| 2010/0275143 A1 | 10/2010 | Fu et al. |
| 2010/0277337 A1 | 11/2010 | Brodersen et al. |
| 2010/0293190 A1 | 11/2010 | Kaiser et al. |
| 2010/0293586 A1 | 11/2010 | Simoes et al. |
| 2010/0312824 A1 | 12/2010 | Smith et al. |
| 2010/0325660 A1 | 12/2010 | Holden |
| 2010/0333142 A1 | 12/2010 | Busse et al. |
| 2010/0333143 A1 | 12/2010 | Civanlar et al. |
| 2011/0004831 A1 | 1/2011 | Steinberg et al. |
| 2011/0047513 A1 | 2/2011 | Onogi et al. |
| 2011/0052146 A1 | 3/2011 | Murthy et al. |
| 2011/0054649 A1 | 3/2011 | Sarkis et al. |
| 2011/0055762 A1 | 3/2011 | Jung et al. |
| 2011/0055870 A1 | 3/2011 | Yum et al. |
| 2011/0071977 A1 | 3/2011 | Nakajima et al. |
| 2011/0078739 A1 | 3/2011 | Grad |
| 2011/0080935 A1 | 4/2011 | Kim et al. |
| 2011/0087992 A1 | 4/2011 | Wang et al. |
| 2011/0090402 A1 | 4/2011 | Huntington et al. |
| 2011/0093415 A1 | 4/2011 | Rhee et al. |
| 2011/0119715 A1 | 5/2011 | Chang et al. |
| 2011/0131607 A1 | 6/2011 | Thomas et al. |
| 2011/0154194 A1 | 6/2011 | Mathai et al. |
| 2011/0154305 A1 | 6/2011 | Leroux et al. |
| 2011/0157029 A1 | 6/2011 | Tseng |
| 2011/0163971 A1 | 7/2011 | Wagner et al. |
| 2011/0167339 A1 | 7/2011 | Lemay |
| 2011/0175930 A1 | 7/2011 | Hwang et al. |
| 2011/0179388 A1 | 7/2011 | Fleizach et al. |
| 2011/0179453 A1 | 7/2011 | Poniatowski |

(56) References Cited

U.S. PATENT DOCUMENTS

| | | |
|---|---|---|
| 2011/0197153 A1 | 8/2011 | King et al. |
| 2011/0209177 A1 | 8/2011 | Sela et al. |
| 2011/0218948 A1 | 9/2011 | De et al. |
| 2011/0231280 A1 | 9/2011 | Farah |
| 2011/0231823 A1 | 9/2011 | Fryc et al. |
| 2011/0231872 A1 | 9/2011 | Gharachorloo et al. |
| 2011/0231878 A1 | 9/2011 | Hunter et al. |
| 2011/0246332 A1 | 10/2011 | Alcodray et al. |
| 2011/0281517 A1 | 11/2011 | Ukkadam |
| 2011/0283304 A1 | 11/2011 | Roberts et al. |
| 2011/0283333 A1 | 11/2011 | Ukkadam |
| 2011/0289064 A1 | 11/2011 | Lebeau et al. |
| 2011/0289317 A1 | 11/2011 | Darapu et al. |
| 2011/0289419 A1 | 11/2011 | Yu et al. |
| 2011/0289421 A1 | 11/2011 | Jordan et al. |
| 2011/0289452 A1 | 11/2011 | Jordan et al. |
| 2011/0289531 A1 | 11/2011 | Moonka et al. |
| 2011/0289534 A1 | 11/2011 | Jordan et al. |
| 2011/0296351 A1 | 12/2011 | Ewing et al. |
| 2011/0302532 A1 | 12/2011 | Missig |
| 2011/0307631 A1 | 12/2011 | Park et al. |
| 2011/0312278 A1 | 12/2011 | Matsushita et al. |
| 2011/0321072 A1 | 12/2011 | Patterson et al. |
| 2012/0019674 A1 | 1/2012 | Ohnishi et al. |
| 2012/0036552 A1 | 2/2012 | Dare et al. |
| 2012/0042245 A1 | 2/2012 | Askey et al. |
| 2012/0042343 A1 | 2/2012 | Laligand et al. |
| 2012/0053887 A1 | 3/2012 | Nurmi |
| 2012/0054178 A1 | 3/2012 | Tran et al. |
| 2012/0054642 A1 | 3/2012 | Balsiger et al. |
| 2012/0054797 A1 | 3/2012 | Skog et al. |
| 2012/0059910 A1 | 3/2012 | Cassidy |
| 2012/0060092 A1* | 3/2012 | Hill .................... H04N 21/4882 715/716 |
| 2012/0064204 A1 | 3/2012 | Davila et al. |
| 2012/0084136 A1 | 4/2012 | Seth et al. |
| 2012/0093481 A1 | 4/2012 | Mcdowell et al. |
| 2012/0096011 A1 | 4/2012 | Kay et al. |
| 2012/0102573 A1 | 4/2012 | Spooner et al. |
| 2012/0105367 A1 | 5/2012 | Son et al. |
| 2012/0110616 A1 | 5/2012 | Kilar et al. |
| 2012/0110621 A1 | 5/2012 | Gossweiler, III |
| 2012/0114303 A1 | 5/2012 | Chung et al. |
| 2012/0117584 A1 | 5/2012 | Gordon |
| 2012/0131615 A1 | 5/2012 | Kobayashi et al. |
| 2012/0139938 A1 | 6/2012 | Khedouri et al. |
| 2012/0144003 A1 | 6/2012 | Rosenbaum et al. |
| 2012/0158524 A1 | 6/2012 | Hintz et al. |
| 2012/0173991 A1 | 7/2012 | Roberts et al. |
| 2012/0174157 A1 | 7/2012 | Stinson et al. |
| 2012/0198020 A1 | 8/2012 | Parker et al. |
| 2012/0198336 A1 | 8/2012 | Novotny et al. |
| 2012/0210366 A1 | 8/2012 | Wong et al. |
| 2012/0215684 A1 | 8/2012 | Kidron |
| 2012/0216113 A1 | 8/2012 | Li |
| 2012/0216117 A1 | 8/2012 | Arriola et al. |
| 2012/0216296 A1 | 8/2012 | Kidron |
| 2012/0221498 A1 | 8/2012 | Kaszynski et al. |
| 2012/0222056 A1 | 8/2012 | Donoghue et al. |
| 2012/0233640 A1 | 9/2012 | Odryna et al. |
| 2012/0242704 A1 | 9/2012 | Bamford et al. |
| 2012/0260291 A1 | 10/2012 | Wood |
| 2012/0260293 A1 | 10/2012 | Young et al. |
| 2012/0262371 A1 | 10/2012 | Lee et al. |
| 2012/0262407 A1 | 10/2012 | Hinckley et al. |
| 2012/0266069 A1 | 10/2012 | Moshiri et al. |
| 2012/0272261 A1 | 10/2012 | Reynolds et al. |
| 2012/0284753 A1 | 11/2012 | Roberts et al. |
| 2012/0290933 A1 | 11/2012 | Rajaraman et al. |
| 2012/0291079 A1 | 11/2012 | Gordon et al. |
| 2012/0308143 A1 | 12/2012 | Bellegarda et al. |
| 2012/0311443 A1 | 12/2012 | Chaudhri et al. |
| 2012/0311638 A1 | 12/2012 | Reyna et al. |
| 2012/0317482 A1 | 12/2012 | Barraclough et al. |
| 2012/0323938 A1 | 12/2012 | Skeen et al. |
| 2012/0324504 A1 | 12/2012 | Archer et al. |
| 2012/0327125 A1 | 12/2012 | Kutliroff et al. |
| 2013/0014150 A1 | 1/2013 | Seo et al. |
| 2013/0014159 A1 | 1/2013 | Wiser et al. |
| 2013/0021288 A1 | 1/2013 | Kaerkkaeinen et al. |
| 2013/0024895 A1 | 1/2013 | Yong et al. |
| 2013/0031585 A1 | 1/2013 | Ltagaki et al. |
| 2013/0033643 A1 | 2/2013 | Kim et al. |
| 2013/0042271 A1 | 2/2013 | Yellin et al. |
| 2013/0061234 A1 | 3/2013 | Piira et al. |
| 2013/0061267 A1 | 3/2013 | Cansino et al. |
| 2013/0067366 A1 | 3/2013 | Almosnino |
| 2013/0073403 A1 | 3/2013 | Tuchman et al. |
| 2013/0083076 A1 | 4/2013 | Liu et al. |
| 2013/0097009 A1 | 4/2013 | Akadiri |
| 2013/0110978 A1 | 5/2013 | Gordon et al. |
| 2013/0124998 A1 | 5/2013 | Pendergast et al. |
| 2013/0132874 A1 | 5/2013 | He et al. |
| 2013/0132966 A1 | 5/2013 | Chanda et al. |
| 2013/0151300 A1 | 6/2013 | Le et al. |
| 2013/0173034 A1 | 7/2013 | Reimann et al. |
| 2013/0174193 A1 | 7/2013 | Yu et al. |
| 2013/0179812 A1 | 7/2013 | Bianrosa et al. |
| 2013/0179995 A1 | 7/2013 | Basile et al. |
| 2013/0198686 A1 | 8/2013 | Kawai et al. |
| 2013/0205312 A1 | 8/2013 | Huang |
| 2013/0212531 A1 | 8/2013 | Yoshida |
| 2013/0227482 A1 | 8/2013 | Thorsander et al. |
| 2013/0247105 A1 | 9/2013 | Jovanovski et al. |
| 2013/0262431 A1 | 10/2013 | Garner et al. |
| 2013/0262558 A1 | 10/2013 | Wood et al. |
| 2013/0262619 A1 | 10/2013 | Goodwin et al. |
| 2013/0262633 A1 | 10/2013 | Goodwin et al. |
| 2013/0263189 A1 | 10/2013 | Garner |
| 2013/0283154 A1 | 10/2013 | Sasakura |
| 2013/0283168 A1 | 10/2013 | Brown et al. |
| 2013/0283317 A1 | 10/2013 | Guntupalli et al. |
| 2013/0283318 A1 | 10/2013 | Wannamaker |
| 2013/0285937 A1 | 10/2013 | Billings et al. |
| 2013/0290233 A1 | 10/2013 | Ferren et al. |
| 2013/0290848 A1 | 10/2013 | Billings et al. |
| 2013/0291018 A1 | 10/2013 | Billings et al. |
| 2013/0291037 A1 | 10/2013 | Im et al. |
| 2013/0294755 A1 | 11/2013 | Arme et al. |
| 2013/0312044 A1 | 11/2013 | Itagaki |
| 2013/0326499 A1 | 12/2013 | Mowatt et al. |
| 2013/0326554 A1 | 12/2013 | Shkedi |
| 2013/0326561 A1 | 12/2013 | Pandey |
| 2013/0332838 A1 | 12/2013 | Naggar et al. |
| 2013/0332960 A1 | 12/2013 | Young et al. |
| 2013/0340006 A1 | 12/2013 | Kwan |
| 2013/0346564 A1 | 12/2013 | Warrick et al. |
| 2013/0347044 A1 | 12/2013 | Lee et al. |
| 2014/0006635 A1 | 1/2014 | Braness et al. |
| 2014/0006795 A1 | 1/2014 | Han et al. |
| 2014/0006951 A1 | 1/2014 | Hunter |
| 2014/0012859 A1 | 1/2014 | Heilprin et al. |
| 2014/0013283 A1 | 1/2014 | Matas et al. |
| 2014/0020017 A1 | 1/2014 | Stern et al. |
| 2014/0024341 A1 | 1/2014 | Johan |
| 2014/0033245 A1 | 1/2014 | Barton et al. |
| 2014/0049692 A1 | 2/2014 | Sirpal et al. |
| 2014/0052683 A1 | 2/2014 | Kirkham et al. |
| 2014/0053116 A1 | 2/2014 | Smith et al. |
| 2014/0053195 A1 | 2/2014 | Sirpal et al. |
| 2014/0059605 A1 | 2/2014 | Sirpal et al. |
| 2014/0059615 A1 | 2/2014 | Sirpal et al. |
| 2014/0059625 A1 | 2/2014 | Dourado et al. |
| 2014/0059635 A1 | 2/2014 | Sirpal et al. |
| 2014/0068654 A1 | 3/2014 | Marlow et al. |
| 2014/0071068 A1 | 3/2014 | Shih et al. |
| 2014/0074454 A1 | 3/2014 | Brown et al. |
| 2014/0075313 A1 | 3/2014 | Bachman et al. |
| 2014/0075316 A1 | 3/2014 | Li |
| 2014/0075394 A1 | 3/2014 | Nawle et al. |
| 2014/0075574 A1 | 3/2014 | Zheng et al. |
| 2014/0082497 A1 | 3/2014 | Chalouhi et al. |
| 2014/0088952 A1 | 3/2014 | Fife et al. |
| 2014/0089816 A1 | 3/2014 | Dipersia et al. |

(56) References Cited

U.S. PATENT DOCUMENTS

| | | |
|---|---|---|
| 2014/0098102 A1 | 4/2014 | Raffle et al. |
| 2014/0104646 A1 | 4/2014 | Nishiyama |
| 2014/0109204 A1 | 4/2014 | Papillon et al. |
| 2014/0111416 A1 | 4/2014 | Sugiura |
| 2014/0115636 A1 | 4/2014 | Stuckman |
| 2014/0123006 A1 | 5/2014 | Chen et al. |
| 2014/0129232 A1 | 5/2014 | Jones et al. |
| 2014/0130097 A1 | 5/2014 | Londero |
| 2014/0136946 A1 | 5/2014 | Matas |
| 2014/0137029 A1 | 5/2014 | Stephenson et al. |
| 2014/0137030 A1 | 5/2014 | Matas |
| 2014/0143260 A1 | 5/2014 | Simonson et al. |
| 2014/0143683 A1 | 5/2014 | Underwood et al. |
| 2014/0156792 A1 | 6/2014 | Roberts et al. |
| 2014/0157204 A1 | 6/2014 | Roberts et al. |
| 2014/0157329 A1 | 6/2014 | Roberts et al. |
| 2014/0164966 A1 | 6/2014 | Kim et al. |
| 2014/0168071 A1 | 6/2014 | Ahmed et al. |
| 2014/0171153 A1 | 6/2014 | Kienzle et al. |
| 2014/0172622 A1 | 6/2014 | Baronshin |
| 2014/0172953 A1 | 6/2014 | Blanksteen |
| 2014/0173660 A1 | 6/2014 | Correa et al. |
| 2014/0184471 A1 | 7/2014 | Martynov et al. |
| 2014/0189523 A1 | 7/2014 | Shuttleworth et al. |
| 2014/0189574 A1 | 7/2014 | Stallings et al. |
| 2014/0189606 A1 | 7/2014 | Shuttleworth et al. |
| 2014/0196064 A1 | 7/2014 | Kennedy et al. |
| 2014/0196069 A1 | 7/2014 | Ahmed et al. |
| 2014/0208268 A1 | 7/2014 | Jimenez |
| 2014/0208360 A1 | 7/2014 | Kardatzke |
| 2014/0219637 A1 | 8/2014 | Mcintosh et al. |
| 2014/0224867 A1 | 8/2014 | Werner et al. |
| 2014/0244751 A1 | 8/2014 | Tseng |
| 2014/0245148 A1* | 8/2014 | Silva ............... H04N 21/4126 715/719 |
| 2014/0245186 A1 | 8/2014 | Tseng |
| 2014/0245222 A1 | 8/2014 | Kovacevic et al. |
| 2014/0250465 A1 | 9/2014 | Mulholland et al. |
| 2014/0250479 A1 | 9/2014 | Lee et al. |
| 2014/0253463 A1 | 9/2014 | Hicks |
| 2014/0259074 A1 | 9/2014 | Ansari et al. |
| 2014/0278072 A1 | 9/2014 | Fino et al. |
| 2014/0278940 A1 | 9/2014 | Wade |
| 2014/0282208 A1 | 9/2014 | Chaudhri |
| 2014/0282636 A1 | 9/2014 | Petander et al. |
| 2014/0282677 A1 | 9/2014 | Mantell et al. |
| 2014/0289226 A1 | 9/2014 | English et al. |
| 2014/0289751 A1 | 9/2014 | Hsu et al. |
| 2014/0310742 A1 | 10/2014 | Kim |
| 2014/0317653 A1 | 10/2014 | Mlodzinski |
| 2014/0333530 A1 | 11/2014 | Agnetta et al. |
| 2014/0337607 A1 | 11/2014 | Peterson et al. |
| 2014/0340358 A1 | 11/2014 | Martinoli |
| 2014/0341109 A1 | 11/2014 | Cartmell et al. |
| 2014/0344247 A1 | 11/2014 | Procopio et al. |
| 2014/0344291 A9 | 11/2014 | Simonson et al. |
| 2014/0344294 A1 | 11/2014 | Skeen et al. |
| 2014/0351691 A1 | 11/2014 | Neil et al. |
| 2014/0359598 A1 | 12/2014 | Oliver et al. |
| 2014/0365479 A1 | 12/2014 | Lyons et al. |
| 2014/0365481 A1 | 12/2014 | Novosel et al. |
| 2014/0365604 A1 | 12/2014 | Lewis et al. |
| 2014/0365919 A1 | 12/2014 | Shaw et al. |
| 2014/0366040 A1 | 12/2014 | Parker et al. |
| 2014/0366047 A1 | 12/2014 | Thomas et al. |
| 2015/0020127 A1 | 1/2015 | Doshi et al. |
| 2015/0039685 A1 | 2/2015 | Lewis et al. |
| 2015/0046866 A1 | 2/2015 | Shimadate |
| 2015/0067582 A1 | 3/2015 | Donnelly et al. |
| 2015/0067724 A1 | 3/2015 | Johnson et al. |
| 2015/0074552 A1 | 3/2015 | Chai et al. |
| 2015/0074603 A1 | 3/2015 | Abe et al. |
| 2015/0082187 A1 | 3/2015 | Wallters et al. |
| 2015/0095460 A1 | 4/2015 | Berger et al. |
| 2015/0095845 A1 | 4/2015 | Chun et al. |
| 2015/0113429 A1 | 4/2015 | Edwards et al. |
| 2015/0121408 A1 | 4/2015 | Jacoby et al. |
| 2015/0134653 A1 | 5/2015 | Bayer et al. |
| 2015/0150049 A1 | 5/2015 | White |
| 2015/0150066 A1 | 5/2015 | Park et al. |
| 2015/0153571 A1 | 6/2015 | Ballard et al. |
| 2015/0161251 A1 | 6/2015 | Ramanarayanan et al. |
| 2015/0169705 A1 | 6/2015 | Korbecki et al. |
| 2015/0169975 A1 | 6/2015 | Kienzle et al. |
| 2015/0186002 A1 | 7/2015 | Suzuki et al. |
| 2015/0189347 A1 | 7/2015 | Oztaskent et al. |
| 2015/0195624 A1 | 7/2015 | Gossweiler, III |
| 2015/0205591 A1 | 7/2015 | Jitkoff et al. |
| 2015/0237389 A1 | 8/2015 | Grouf et al. |
| 2015/0296072 A1 | 10/2015 | Zhou et al. |
| 2015/0301729 A1 | 10/2015 | Wang et al. |
| 2015/0309670 A1 | 10/2015 | Wheeler et al. |
| 2015/0312603 A1 | 10/2015 | Singh et al. |
| 2015/0317343 A1 | 11/2015 | Cselle et al. |
| 2015/0334464 A1 | 11/2015 | Shin |
| 2015/0346975 A1 | 12/2015 | Lee et al. |
| 2015/0350741 A1 | 12/2015 | Rajaraman et al. |
| 2015/0355816 A1 | 12/2015 | Shim |
| 2015/0363035 A1 | 12/2015 | Hinckley et al. |
| 2015/0365729 A1 | 12/2015 | Kaya et al. |
| 2015/0370435 A1 | 12/2015 | Kirmse et al. |
| 2015/0370455 A1 | 12/2015 | Van Os et al. |
| 2015/0370920 A1 | 12/2015 | Van Os et al. |
| 2015/0373107 A1 | 12/2015 | Chan et al. |
| 2015/0382047 A1 | 12/2015 | Van Os et al. |
| 2015/0382066 A1 | 12/2015 | Heeter et al. |
| 2016/0004425 A1 | 1/2016 | Yoon et al. |
| 2016/0004772 A1 | 1/2016 | Kim et al. |
| 2016/0004773 A1 | 1/2016 | Jannink et al. |
| 2016/0005013 A1 | 1/2016 | Perry |
| 2016/0014461 A1 | 1/2016 | Leech et al. |
| 2016/0021412 A1 | 1/2016 | Zito, Jr. |
| 2016/0035119 A1 | 2/2016 | Lee et al. |
| 2016/0036897 A1 | 2/2016 | Kim et al. |
| 2016/0041702 A1 | 2/2016 | Wang |
| 2016/0043962 A1 | 2/2016 | Kim et al. |
| 2016/0066004 A1 | 3/2016 | Lieu et al. |
| 2016/0066021 A1 | 3/2016 | Thomas et al. |
| 2016/0066040 A1 | 3/2016 | Webster et al. |
| 2016/0066049 A1 | 3/2016 | Mountain |
| 2016/0078526 A1 | 3/2016 | Nations et al. |
| 2016/0080815 A1 | 3/2016 | Ruffini et al. |
| 2016/0092042 A1 | 3/2016 | Yenigalla et al. |
| 2016/0092559 A1 | 3/2016 | Lind et al. |
| 2016/0096113 A1 | 4/2016 | Decoufle |
| 2016/0099991 A1 | 4/2016 | Lonkar et al. |
| 2016/0105540 A1 | 4/2016 | Kwon et al. |
| 2016/0110064 A1 | 4/2016 | Shapira |
| 2016/0127783 A1 | 5/2016 | Garcia Navarro |
| 2016/0127789 A1 | 5/2016 | Roberts et al. |
| 2016/0133230 A1 | 5/2016 | Daniels et al. |
| 2016/0142783 A1 | 5/2016 | Bagga et al. |
| 2016/0165307 A1 | 6/2016 | Lavender et al. |
| 2016/0188902 A1 | 6/2016 | Jin |
| 2016/0191639 A1 | 6/2016 | Dai et al. |
| 2016/0192017 A1 | 6/2016 | Tirpak |
| 2016/0231885 A1 | 8/2016 | Lee et al. |
| 2016/0249105 A1 | 8/2016 | Carney Landow |
| 2016/0255379 A1 | 9/2016 | Langan et al. |
| 2016/0277785 A1 | 9/2016 | Newman et al. |
| 2016/0345070 A1 | 11/2016 | Beeson et al. |
| 2016/0357305 A1 | 12/2016 | Wells et al. |
| 2016/0357352 A1 | 12/2016 | Matas et al. |
| 2016/0357355 A1 | 12/2016 | Carrigan et al. |
| 2016/0357366 A1 | 12/2016 | Migos et al. |
| 2016/0370982 A1 | 12/2016 | Penha et al. |
| 2017/0010846 A1 | 1/2017 | Bernstein et al. |
| 2017/0010847 A1 | 1/2017 | Bernstein et al. |
| 2017/0013295 A1 | 1/2017 | Wertheimer et al. |
| 2017/0046039 A1 | 2/2017 | Karunamuni et al. |
| 2017/0046339 A1 | 2/2017 | Bhat et al. |
| 2017/0068402 A1 | 3/2017 | Lochhead et al. |
| 2017/0068511 A1 | 3/2017 | Brown et al. |
| 2017/0094360 A1 | 3/2017 | Keighran et al. |

(56) References Cited

U.S. PATENT DOCUMENTS

| | | |
|---|---|---|
| 2017/0097969 A1 | 4/2017 | Stein et al. |
| 2017/0115867 A1 | 4/2017 | Bargmann |
| 2017/0124594 A1 | 5/2017 | Naiga et al. |
| 2017/0132659 A1 | 5/2017 | Dirks et al. |
| 2017/0132829 A1 | 5/2017 | Blas et al. |
| 2017/0134778 A1 | 5/2017 | Christie et al. |
| 2017/0140748 A1 | 5/2017 | Roberts et al. |
| 2017/0188116 A1 | 6/2017 | Major et al. |
| 2017/0192642 A1 | 7/2017 | Fishman et al. |
| 2017/0195736 A1 | 7/2017 | Chai et al. |
| 2017/0201850 A1 | 7/2017 | Raleigh et al. |
| 2017/0214975 A1 | 7/2017 | Schmidt et al. |
| 2017/0220228 A1 | 8/2017 | Sang et al. |
| 2017/0242913 A1 | 8/2017 | Tijssen et al. |
| 2017/0245017 A1 | 8/2017 | Chaudhri et al. |
| 2017/0251257 A1 | 8/2017 | Obrien |
| 2017/0300151 A1 | 10/2017 | Lue-sang et al. |
| 2017/0339443 A1 | 11/2017 | Lue-sang et al. |
| 2017/0344553 A1 | 11/2017 | Evnine et al. |
| 2017/0345040 A1 | 11/2017 | Pirnack et al. |
| 2017/0353603 A1 | 12/2017 | Grunewald et al. |
| 2017/0357387 A1 | 12/2017 | Clarke |
| 2017/0359722 A1 | 12/2017 | Folse et al. |
| 2017/0364246 A1 | 12/2017 | Van Os et al. |
| 2018/0011580 A1 | 1/2018 | Lebowitz et al. |
| 2018/0041814 A1 | 2/2018 | Christie et al. |
| 2018/0063591 A1 | 3/2018 | Newman et al. |
| 2018/0070121 A1 | 3/2018 | Zimmerman et al. |
| 2018/0070138 A1 | 3/2018 | Chai et al. |
| 2018/0107353 A1 | 4/2018 | Lee |
| 2018/0130097 A1 | 5/2018 | Tran et al. |
| 2018/0136800 A1 | 5/2018 | Johnston et al. |
| 2018/0146377 A1 | 5/2018 | Folse et al. |
| 2018/0189076 A1 | 7/2018 | Liston et al. |
| 2018/0253900 A1 | 9/2018 | Finding et al. |
| 2018/0275855 A1 | 9/2018 | Van Os et al. |
| 2018/0293771 A1 | 10/2018 | Piemonte et al. |
| 2018/0295403 A1 | 10/2018 | Christie et al. |
| 2018/0302680 A1 | 10/2018 | Cormican |
| 2018/0343497 A1 | 11/2018 | Brown et al. |
| 2018/0349509 A1 | 12/2018 | Abou Mahmoud et al. |
| 2018/0367834 A1 | 12/2018 | Carpenter et al. |
| 2019/0012048 A1 | 1/2019 | Johnston et al. |
| 2019/0020925 A1 | 1/2019 | Christie et al. |
| 2019/0028769 A1 | 1/2019 | Jeon et al. |
| 2019/0045271 A1 | 2/2019 | Christie et al. |
| 2019/0052744 A1 | 2/2019 | Jung et al. |
| 2019/0058921 A1 | 2/2019 | Christie et al. |
| 2019/0066672 A1 | 2/2019 | Wood et al. |
| 2019/0073104 A1 | 3/2019 | Wang |
| 2019/0073680 A1 | 3/2019 | Knox |
| 2019/0129588 A1 | 5/2019 | Johnston et al. |
| 2019/0138163 A1 | 5/2019 | Howland et al. |
| 2019/0141399 A1 | 5/2019 | Auxer et al. |
| 2019/0258373 A1 | 8/2019 | Davydov et al. |
| 2019/0272853 A1 | 9/2019 | Moore |
| 2019/0342616 A1 | 11/2019 | Domm et al. |
| 2019/0354264 A1 | 11/2019 | Van Os et al. |
| 2019/0373320 A1 | 12/2019 | Balsamo |
| 2020/0068274 A1 | 2/2020 | Aher et al. |
| 2020/0084488 A1 | 3/2020 | Christie et al. |
| 2020/0099985 A1 | 3/2020 | Keighran et al. |
| 2020/0133631 A1 | 4/2020 | Christie et al. |
| 2020/0137175 A1 | 4/2020 | Ganci et al. |
| 2020/0257415 A1 | 8/2020 | Clarke |
| 2020/0272666 A1 | 8/2020 | Van Os et al. |
| 2020/0301567 A1 | 9/2020 | Park et al. |
| 2020/0301575 A1 | 9/2020 | Lindholm et al. |
| 2020/0304863 A1 | 9/2020 | Domm et al. |
| 2020/0304876 A1 | 9/2020 | Cielak et al. |
| 2020/0304879 A1 | 9/2020 | Ellingford |
| 2020/0304880 A1 | 9/2020 | Diaz Delgado et al. |
| 2020/0363934 A1 | 11/2020 | Van Os et al. |
| 2020/0374595 A1 | 11/2020 | Yang et al. |
| 2020/0380029 A1 | 12/2020 | Chen |
| 2020/0382845 A1 | 12/2020 | Payne |
| 2020/0396507 A1 | 12/2020 | Balsamo |
| 2021/0021903 A1 | 1/2021 | Christie et al. |
| 2021/0168424 A1 | 6/2021 | Sharma |
| 2021/0181901 A1 | 6/2021 | Johnston et al. |
| 2021/0195277 A1 | 6/2021 | Thurlow et al. |
| 2021/0286454 A1 | 9/2021 | Beaumier et al. |
| 2021/0306711 A1 | 9/2021 | Ellingford et al. |
| 2021/0337280 A1 | 10/2021 | Diaz Delgado et al. |
| 2021/0345004 A1 | 11/2021 | Christie et al. |
| 2021/0365134 A1 | 11/2021 | Beaumier et al. |
| 2021/0397306 A1 | 12/2021 | Rajam et al. |
| 2021/0406995 A1 | 12/2021 | Peters et al. |
| 2022/0132215 A1 | 4/2022 | Venugopal et al. |
| 2022/0179526 A1 | 6/2022 | Schöberl |
| 2022/0244824 A1 | 8/2022 | Cielak |
| 2022/0321940 A1 | 10/2022 | Christie et al. |
| 2022/0329891 A1 | 10/2022 | Christie et al. |
| 2022/0337914 A1 | 10/2022 | Christie et al. |
| 2022/0360858 A1 | 11/2022 | Christie et al. |
| 2022/0413796 A1 | 12/2022 | Christie et al. |
| 2023/0022781 A1 | 1/2023 | Lindholm et al. |
| 2023/0033604 A1 | 2/2023 | Diaz Delgado et al. |
| 2023/0096458 A1 | 3/2023 | Van Os et al. |
| 2023/0127228 A1 | 4/2023 | Clarke |
| 2023/0132595 A1 | 5/2023 | Van Os et al. |
| 2023/0300415 A1 | 9/2023 | Balsamo |

FOREIGN PATENT DOCUMENTS

| | | | |
|---|---|---|---|
| AU | 2017101431 A4 | 11/2017 | |
| AU | 2018100810 A4 | 7/2018 | |
| CN | 1295419 A | 5/2001 | |
| CN | 1391765 A | 1/2003 | |
| CN | 1985277 A | 6/2007 | |
| CN | 101160932 A | 4/2008 | |
| CN | 101228570 A | 7/2008 | |
| CN | 101317149 A | 12/2008 | |
| CN | 101370104 A | 2/2009 | |
| CN | 101405679 A | 4/2009 | |
| CN | 101436110 A | 5/2009 | |
| CN | 101465993 A | 6/2009 | |
| CN | 101529437 A | 9/2009 | |
| CN | 101699505 A | 4/2010 | |
| CN | 101706704 A | 5/2010 | |
| CN | 101719125 A | 6/2010 | |
| CN | 101860447 A | 10/2010 | |
| CN | 102098537 A | 6/2011 | |
| CN | 102103460 A | 6/2011 | |
| CN | 102265586 A | 11/2011 | |
| CN | 102325144 A | 1/2012 | |
| CN | 102819715 A | 12/2012 | |
| CN | 102859484 A | 1/2013 | |
| CN | 102880404 A | 1/2013 | |
| CN | 102890615 A | 1/2013 | |
| CN | 102955653 A | 3/2013 | |
| CN | 102981695 A | 3/2013 | |
| CN | 103037265 A | 4/2013 | |
| CN | 103177738 A | 6/2013 | |
| CN | 103399967 A | 11/2013 | |
| CN | 103516933 A | 1/2014 | |
| CN | 103546816 A | 1/2014 | |
| CN | 103562848 A | 2/2014 | |
| CN | 103562947 A | 2/2014 | |
| CN | 103620531 A | 3/2014 | |
| CN | 103620541 A | 3/2014 | |
| CN | 103620639 A | 3/2014 | |
| CN | 103686418 A | 3/2014 | |
| CN | 103985045 A | 8/2014 | |
| CN | 103999017 A | 8/2014 | |
| CN | 104508618 A | 4/2015 | |
| CN | 104822098 A | 8/2015 | |
| CN | 105190590 A | 12/2015 | |
| CN | 105247526 A | 1/2016 | |
| CN | 105264479 A | 1/2016 | |
| CN | 105303372 A | 2/2016 | |
| CN | 105308634 A | 2/2016 | |
| CN | 105308923 A | 2/2016 | |
| CN | 105336350 A | 2/2016 | |

(56) References Cited

FOREIGN PATENT DOCUMENTS

| | | |
|---|---|---|
| CN | 105657554 A | 6/2016 |
| CN | 105812849 A | 7/2016 |
| CN | 105828098 A | 8/2016 |
| CN | 105955520 A | 9/2016 |
| CN | 105955607 A | 9/2016 |
| CN | 105989085 A | 10/2016 |
| CN | 105992068 A | 10/2016 |
| CN | 106101982 A | 11/2016 |
| DE | 20 2016 003 233 U1 | 8/2016 |
| EP | 0608708 A2 | 8/1994 |
| EP | 0624853 A2 | 11/1994 |
| EP | 2386984 A2 | 11/2011 |
| EP | 2453667 A1 | 5/2012 |
| EP | 2535844 A2 | 12/2012 |
| EP | 2574089 A1 | 3/2013 |
| EP | 2605203 A1 | 6/2013 |
| EP | 2642402 A2 | 9/2013 |
| EP | 2672703 A1 | 12/2013 |
| EP | 2704032 A2 | 3/2014 |
| EP | 2 725 531 A1 | 4/2014 |
| EP | 2879398 A1 | 6/2015 |
| JP | 2000-112977 A | 4/2000 |
| JP | 2000-163031 A | 6/2000 |
| JP | 2001-197445 A | 7/2001 |
| JP | 2002-27381 A | 1/2002 |
| JP | 2002-342033 A | 11/2002 |
| JP | 2003-99452 A | 4/2003 |
| JP | 2003-534737 A | 11/2003 |
| JP | 2004-62237 A | 2/2004 |
| JP | 2006-31219 A | 2/2006 |
| JP | 2007-124465 A | 5/2007 |
| JP | 2007-512640 A | 5/2007 |
| JP | 2007-140910 A | 6/2007 |
| JP | 2007-294068 A | 11/2007 |
| JP | 2008-71112 A | 3/2008 |
| JP | 2008-135911 A | 6/2008 |
| JP | 2009-60328 A | 3/2009 |
| JP | 2009-206957 A | 9/2009 |
| JP | 2009-260947 A | 11/2009 |
| JP | 2010-28437 A | 2/2010 |
| JP | 2010-56595 A | 3/2010 |
| JP | 2010-509684 A | 3/2010 |
| JP | 2010-114733 A | 5/2010 |
| JP | 2011-512701 A | 4/2011 |
| JP | 2011-123750 A | 6/2011 |
| JP | 2011-154455 A | 8/2011 |
| JP | 2011-182146 A | 9/2011 |
| JP | 2011-205562 A | 10/2011 |
| JP | 2011-257930 A | 12/2011 |
| JP | 2012-95123 A | 5/2012 |
| JP | 2012-123685 A | 6/2012 |
| JP | 2012-208622 A | 10/2012 |
| JP | 2013-8369 A | 1/2013 |
| JP | 2013-12021 A | 1/2013 |
| JP | 2013-223150 A | 10/2013 |
| JP | 2013-235523 A | 11/2013 |
| JP | 2014-81740 A | 5/2014 |
| JP | 2014-102660 A | 6/2014 |
| JP | 2015-50655 A | 3/2015 |
| JP | 2015-70404 A | 4/2015 |
| KR | 2001-0005939 A | 1/2001 |
| KR | 2001-0035356 A | 5/2001 |
| KR | 10-2002-0010151 A | 2/2002 |
| KR | 10-2007-0114329 A | 12/2007 |
| KR | 10-2009-0106104 A | 10/2009 |
| KR | 10-2010-0039194 A | 4/2010 |
| KR | 10-2011-0036408 A | 4/2011 |
| KR | 10-2011-0061811 A | 6/2011 |
| KR | 10-2012-0076682 A | 7/2012 |
| KR | 10-2012-0124445 A | 11/2012 |
| KR | 10-2013-0014712 A | 2/2013 |
| KR | 10-2013-0058034 A | 6/2013 |
| KR | 10-2013-0137969 A | 12/2013 |
| KR | 10-2014-0041939 A | 4/2014 |
| KR | 10-20190033658 A | 3/2019 |
| KR | 10-20220041231 A | 3/2022 |
| TW | 200622893 A | 7/2006 |
| TW | 200719204 A | 5/2007 |
| TW | 201337717 A | 9/2013 |
| TW | 201349049 A | 12/2013 |
| TW | 201351261 A | 12/2013 |
| WO | 1994/009438 A2 | 4/1994 |
| WO | 1999/040728 A1 | 8/1999 |
| WO | 2004/063862 A2 | 7/2004 |
| WO | 2005/050652 A1 | 6/2005 |
| WO | 2005/109345 A1 | 11/2005 |
| WO | 2007/078623 A2 | 7/2007 |
| WO | WO-2008/005135 A1 | 1/2008 |
| WO | 2008060486 A2 | 5/2008 |
| WO | 2009/016607 A2 | 2/2009 |
| WO | 2009/039786 A1 | 4/2009 |
| WO | 2009/148781 A1 | 12/2009 |
| WO | 2010/022570 A1 | 3/2010 |
| WO | 2010/025168 A1 | 3/2010 |
| WO | 2010/118690 A1 | 10/2010 |
| WO | 2011/095693 A1 | 8/2011 |
| WO | 2011/158475 A1 | 12/2011 |
| WO | 2012/012446 A2 | 1/2012 |
| WO | 2012/061760 A2 | 5/2012 |
| WO | 2012/088665 A1 | 7/2012 |
| WO | 2013/000741 A1 | 1/2013 |
| WO | 2013/149128 A2 | 10/2013 |
| WO | 2013/169849 A2 | 11/2013 |
| WO | 2013/169877 A2 | 11/2013 |
| WO | 2013/187370 A1 | 12/2013 |
| WO | 2013/149128 A3 | 2/2014 |
| WO | 2014/105276 A1 | 7/2014 |
| WO | 2014/144908 A1 | 9/2014 |
| WO | 2014/177929 A2 | 11/2014 |
| WO | 2014/200730 A1 | 12/2014 |
| WO | 2015/200227 A1 | 12/2015 |
| WO | 2015/200228 A1 | 12/2015 |
| WO | 2015/200537 A2 | 12/2015 |
| WO | 2016/030437 A1 | 3/2016 |
| WO | 2016/048308 A1 | 3/2016 |
| WO | 2016/048310 A1 | 3/2016 |
| WO | 2016/111065 A1 | 7/2016 |
| WO | 2017/008079 A1 | 1/2017 |
| WO | 2017/124116 A1 | 7/2017 |
| WO | 2017/200923 A1 | 11/2017 |
| WO | 2017/218104 A1 | 12/2017 |

OTHER PUBLICATIONS

Notice of Allowance dated Jun. 7, 2018, for U.S. Appl. No. 15/798,092, filed Oct. 30, 2017, nine pages.
Notice of Allowance dated Oct. 9, 2018, for U.S. Appl. No. 15/798,092, filed Oct. 30, 2017, five pages.
Bishop, B. (Nov. 13, 2013). "Netflix introduces one unified TV interface to rule them all," The Verge, pp. 1-6, Retrieved from the Internet: URL:https//www.theverge.com/2013/L1/13/5098224/netfix-introduces-one-unified-tv-interface-to-rule-them-all retrieved on Jan. 16, 2018, the whole document.
Final Office Action dated Nov. 9, 2017, for U.S. Appl. No. 15/390,377, filed Dec. 23, 2016, seventeen pages.
Non-Final Office Action dated Apr. 5, 2017, for U.S. Appl. No. 15/390,377, filed Dec. 23, 2016, sixteen pages.
Non-Final Office Action dated Dec. 20, 2017, for U.S. Appl. No. 15/798,092, filed Oct. 30, 2017, 18 pages.
Pierce, D.: (Mar. 10, 2016). "Got Hulu and Netflix? You Need an App to Search It All," WIRED, retrieved from the Internet: URL:https://www.wired.com/2016/03/got-hulu-netflix-need-app- search/ pp. 1-4, retrieved on Jan. 15, 2018, the whole document.
Danish Search Report for dated Jul. 14, 2017, for DA Application No. PA 2017 70200, four pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Rubine, D.H. (Dec. 1991). "The Automatic Recognition of Gestures," CMU-CS-91-202, Submitted in Partial Fulfillment of the

(56) References Cited

OTHER PUBLICATIONS

Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Examiner Initiated Interview Summary received for U.S. Appl. No. 15/390,377, dated Oct. 30, 2017, 2 pages.
International Preliminary Report on Patentability received for PCT Patent Application No. PCT/US2017/058132, dated May 9, 2019, 17 pages.
Non-Final Office Action received for U.S. Appl. No. 16/126,962, dated Sep. 3, 2019, 16 pages.
Notice of Allowance received for U.S. Appl. No. 15/390,377, dated Jul. 2, 2018, 9 pages.
Office Action received for Australian Patent Application No. 2017347797, dated Nov. 18, 2019, 3 pages.
Office Action received for Australian Patent Application No. 2018101455, dated Apr. 24, 2019, 3 pages.
Office Action received for Australian Patent Application No. 2018101455, dated May 23, 2019, 3 pages.
Supplemental Notice of Allowance received for U.S. Appl. No. 15/798,092, dated Jan. 9, 2019, 2 pages.
Advisory Action received for U.S. Appl. No. 15/167,801, dated Feb. 16, 2018, 4 pages.
Applicant Initiated Interview Summary received for U.S. Appl. No. 15/167,801, dated Apr. 23, 2018, 3 pages.
Applicant Initiated Interview Summary received for U.S. Appl. No. 15/167,801, dated Jul. 29, 2019, 3 pages.
Corrected Notice of Allowance received for U.S. Appl. No. 14/242,575, dated Dec. 15, 2016, 7 pages.
Corrected Notice of Allowance received for U.S. Appl. No. 14/242,575, dated Nov. 16, 2016, 7 pages.
Corrected Notice of Allowance received for U.S. Appl. No. 14/255,664, dated Aug. 29, 2017, 4 pages.
Corrected Notice of Allowance received for U.S. Appl. No. 14/267,671, dated Nov. 29, 2018, 3 pages.
Corrected Notice of Allowance received for U.S. Appl. No. 14/749,288, dated Sep. 21, 2017, 5 pages.
Corrected Notice of Allowance received for U.S. Appl. No. 15/276,633, dated Sep. 10, 2019, 7 pages.
Corrected Notice of Allowance received for U.S. Appl. No. 15/695,880, dated Jun. 11, 2018, 6 pages.
Corrected Notice of Allowance received for U.S. Appl. No. 15/714,904, dated Sep. 7, 2018, 5 pages.
Corrected Notice of Allowance received for U.S. Appl. No. 16/010,280, dated Aug. 6, 2019, 2 pages.
Corrected Notice of Allowance received for U.S. Appl. No. 16/036,810, dated Nov. 19, 2018, 6 pages.
Examiner's Answer to Appeal Brief received for U.S. Appl. No. 15/876,715, mailed on Aug. 18, 2020, 16 pages.
Extended European Search Report received for European Patent Application No. 17813728.7, dated Feb. 11, 2019, 8 pages.
Final Office Action received for U.S. Appl. No. 14/255,664, dated Oct. 17, 2016, 16 pages.
Final Office Action received for U.S. Appl. No. 14/267,671, dated May 23, 2018, 17 pages.
Final Office Action received for U.S. Appl. No. 14/267,671, dated Oct. 26, 2016, 21 pages.
Final Office Action received for U.S. Appl. No. 14/271,179, dated Dec. 15, 2016, 10 pages.
Final Office Action received for U.S. Appl. No. 14/271,179, dated Jun. 20, 2019, 15 pages.
Final Office Action received for U.S. Appl. No. 14/271,179, dated Jun. 21, 2018, 14 pages.
Final Office Action received for U.S. Appl. No. 14/746,095, dated Jul. 16, 2018, 33 pages.
Final Office Action received for U.S. Appl. No. 14/746,662, dated Apr. 24, 2017, 8 pages.
Final Office Action received for U.S. Appl. No. 14/746,662, dated Jun. 27, 2017, 9 pages.
Final Office Action received for U.S. Appl. No. 15/167,801, dated Apr. 5, 2019, 18 pages.
Final Office Action received for U.S. Appl. No. 15/167,801, dated May 28, 2020, 17 pages.
Final Office Action received for U.S. Appl. No. 15/167,801, dated Nov. 29, 2017, 12 pages.
Final Office Action received for U.S. Appl. No. 15/235,000, dated Dec. 19, 2018, 33 pages.
Final Office Action received for U.S. Appl. No. 15/235,000, dated Mar. 13, 2018, 31 pages.
Final Office Action received for U.S. Appl. No. 15/272,393, dated Mar. 25, 2019, 54 pages.
Final Office Action received for U.S. Appl. No. 15/272,397, dated Mar. 7, 2017, 23 pages.
Final Office Action received for U.S. Appl. No. 15/276,633, dated Jul. 26, 2017, 15 pages.
Final Office Action received for U.S. Appl. No. 15/276,633, dated Oct. 29, 2018, 12 pages.
Final Office Action received for U.S. Appl. No. 15/507,229, dated Jul. 15, 2020, 20 pages.
Final Office Action received for U.S. Appl. No. 15/507,229, dated Sep. 18, 2019, 15 pages.
Final Office Action received for U.S. Appl. No. 15/876,715, dated Nov. 5, 2018, 15 pages.
Final Office Action received for U.S. Appl. No. 16/108,519, dated Dec. 12, 2019, 10 pages.
Final Office Action received for U.S. Appl. No. 16/126,962, dated Apr. 8, 2020, 20 pages.
Final Office Action received for U.S. Appl. No. 16/136,005, dated Mar. 9, 2020, 9 pages.
Final Office Action received for U.S. Appl. No. 16/144,077, dated Jul. 12, 2019, 22 pages.
Final Office Action received for U.S. Appl. No. 16/584,790, dated May 27, 2020, 27 pages.
International Search Report received for PCT Patent Application No. PCT/US2014/057272, dated May 28, 2015, 4 pages.
International Search Report received for PCT Patent Application No. PCT/US2014/057280, dated May 27, 2015, 4 pages.
International Search Report received for PCT Patent Application No. PCT/US2015/037027, dated Sep. 28, 2015, 3 pages.
International Search Report received for PCT Patent Application No. PCT/US2015/037030, dated Dec. 10, 2015, 7 pages.
International Search Report received for PCT Patent Application No. PCT/US2015/037520, dated Mar. 7, 2016, 6 pages.
International Search Report received for PCT Patent Application No. PCT/US2017/029448, dated Jul. 13, 2017, 3 pages.
International Search Report received for PCT Patent Application No. PCT/US2017/031764, dated Aug. 7, 2017, 2 pages.
International Search Report received for PCT Patent Application No. PCT/US2017/058132, dated Mar. 27, 2018, 6 pages.
Non-Final Office Action received for U.S. Appl. No. 14/208,099, dated Jun. 25, 2015, 12 pages.
Non-Final Office Action received for U.S. Appl. No. 14/242,575, dated Mar. 21, 2016, 12 pages.
Non-Final Office Action received for U.S. Appl. No. 14/255,664, dated Apr. 1, 2016, 15 pages.
Non-Final Office Action received for U.S. Appl. No. 14/262,435, dated Feb. 22, 2016, 22 pages.
Non-Final Office Action received for U.S. Appl. No. 14/267,671, dated Apr. 1, 2016, 16 pages.
Non-Final Office Action received for U.S. Appl. No. 14/267,671, dated Dec. 1, 2017, 18 pages.
Non-Final Office Action received for U.S. Appl. No. 14/267,671, dated May 26, 2017, 18 pages.
Non-Final Office Action received for U.S. Appl. No. 14/271,179, dated May 29, 2015, 25 pages.

(56) References Cited

OTHER PUBLICATIONS

Non-Final Office Action received for U.S. Appl. No. 14/271,179, dated Oct. 5, 2018, 15 pages.
Non-Final Office Action received for U.S. Appl. No. 14/271,179, dated Sep. 21, 2017, 12 pages.
Non-Final Office Action received for U.S. Appl. No. 14/746,095, dated Dec. 1, 2017, 34 pages.
Non-Final Office Action received for U.S. Appl. No. 14/746,095, dated Jul. 25, 2019, 33 pages.
Non-Final Office Action received for U.S. Appl. No. 14/746,620, dated Jan. 11, 2017, 16 pages.
Non-Final Office Action received for U.S. Appl. No. 14/746,662, dated Aug. 9, 2016, 8 pages.
Non-Final Office Action received for U.S. Appl. No. 14/749,288, dated Oct. 12, 2016, 11 pages.
Non-Final Office Action received for U.S. Appl. No. 15/167,801 dated Mar. 24, 2017, 12 Pages.
Non-Final Office Action received for U.S. Appl. No. 15/167,801, dated Aug. 30, 2018, 15 pages.
Non-Final Office Action received for U.S. Appl. No. 15/167,801, dated Sep. 26, 2019, 18 pages.
Non-Final Office Action received for U.S. Appl. No. 15/224,370, dated Oct. 3, 2017, 14 pages.
Non-Final Office Action received for U.S. Appl. No. 15/235,000, dated Jul. 14, 2017, 31 pages.
Non-Final Office Action received for U.S. Appl. No. 15/235,000, dated Jul. 25, 2018, 31 pages.
Non-Final Office Action received for U.S. Appl. No. 15/235,000, dated Jun. 26, 2019, 31 pages.
Non-Final Office Action received for U.S. Appl. No. 15/272,393, dated Oct. 2, 2018, 52 pages.
Non-Final Office Action received for U.S. Appl. No. 15/272,397, dated Nov. 22, 2016, 20 pages.
Non-Final Office Action received for U.S. Appl. No. 15/276,633, dated Feb. 23, 2018, 12 pages.
Non-Final Office Action received for U.S. Appl. No. 15/276,633, dated Mar. 5, 2019, 16 pages.
Non-Final Office Action received for U.S. Appl. No. 15/276,633, dated Nov. 17, 2016, 12 pages.
Non-Final Office Action received for U.S. Appl. No. 15/414,493, dated Oct. 6, 2017, 15 pages.
Non-Final Office Action received for U.S. Appl. No. 15/507,229, dated Feb. 27, 2020, 16 pages.
Non-Final Office Action received for U.S. Appl. No. 15/507,229, dated Jun. 3, 2019, 14 pages.
Non-Final Office Action received for U.S. Appl. No. 15/674,992, dated May 11, 2018, 8 pages.
Non-Final Office Action received for U.S. Appl. No. 15/876,715, dated Jun. 4, 2018, 12 pages.
Non-Final Office Action received for U.S. Appl. No. 15/876,715, dated Sep. 10, 2019, 13 pages.
Non-Final Office Action received for U.S. Appl. No. 15/990,327, dated Jul. 31, 2018, 8 pages.
Non-Final Office Action received for U.S. Appl. No. 16/010,280, dated Mar. 7, 2019, 5 pages.
Non-Final Office Action received for U.S. Appl. No. 16/108,519, dated Aug. 2, 2019, 10 pages.
Non-Final Office Action received for U.S. Appl. No. 16/108,519, dated May 8, 2020, 11 pages.
Non-Final Office Action received for U.S. Appl. No. 16/126,962, dated Aug. 25, 2020, 22 pages.
Non-Final Office Action received for U.S. Appl. No. 16/136,005, dated Sep. 9, 2020, 10 pages.
Non-Final Office Action received for U.S. Appl. No. 16/136,005, dated Sep. 18, 2019, 9 pages.
Non-Final Office Action received for U.S. Appl. No. 16/142,635, dated Jun. 8, 2020, 19 pages.
Non-Final Office Action received for U.S. Appl. No. 16/144,077, dated Feb. 19, 2019, 24 pages.
Non-Final Office Action received for U.S. Appl. No. 16/144,077, dated Nov. 27, 2019, 40 pages.
Non-Final Office Action received for U.S. Appl. No. 16/233,990, dated Jun. 18, 2020, 17 pages.
Non-Final Office Action received for U.S. Appl. No. 16/392,467, dated Sep. 27, 2019, 5 pages.
Non-Final Office Action received for U.S. Appl. No. 16/584,790, dated Dec. 26, 2019, 24 pages.
Non-Final Office Action received for U.S. Appl. No. 16/682,443, dated Sep. 23, 2020, 10 pages.
Non-Final Office Action received for U.S. Appl. No. 16/697,090, dated Jul. 6, 2020, 14 pages.
Non-Final Office Action received for U.S. Appl. No. 16/865,172, dated Aug. 20, 2020, 19 pages.
Notice of Allowance received for U.S. Appl. No. 14/208,099, dated Feb. 3, 2016, 10 pages.
Notice of Allowance received for U.S. Appl. No. 14/242,575, dated Oct. 27, 2016, 11 pages.
Notice of Allowance received for U.S. Appl. No. 14/255,664, dated May 5, 2017, 7 pages.
Notice of Allowance received for U.S. Appl. No. 14/262,435, dated Aug. 16, 2016, 6 pages.
Notice of Allowance received for U.S. Appl. No. 14/267,671, dated Sep. 19, 2018, 8 pages.
Notice of Allowance received for U.S. Appl. No. 14/746,095, dated Dec. 31, 2019, 8 pages.
Notice of Allowance received for U.S. Appl. No. 14/746,620, dated Sep. 25, 2017, 8 pages.
Notice of Allowance received for U.S. Appl. No. 14/746,662, dated Sep. 25, 2017, 7 pages.
Notice of Allowance received for U.S. Appl. No. 14/749,288, dated May 25, 2017, 8 pages.
Notice of Allowance received for U.S. Appl. No. 15/272,393, dated Jan. 15, 2020, 7 pages.
Notice of Allowance received for U.S. Appl. No. 15/272,393, dated Sep. 18, 2019, 10 pages.
Notice of Allowance received for U.S. Appl. No. 15/272,397, dated Oct. 18, 2017, 8 pages.
Notice of Allowance received for U.S. Appl. No. 15/276,633, dated Aug. 26, 2019, 8 pages.
Notice of Allowance received for U.S. Appl. No. 15/414,493, dated Mar. 14, 2018, 7 pages.
Notice of Allowance received for U.S. Appl. No. 15/674,992, dated Oct. 1, 2018, 7 pages.
Notice of Allowance received for U.S. Appl. No. 15/695,880, dated Feb. 28, 2018, 10 pages.
Notice of Allowance received for U.S. Appl. No. 15/695,880, dated Oct. 18, 2017, 9 pages.
Notice of Allowance received for U.S. Appl. No. 15/714,904, dated May 22, 2018, 8 pages.
Notice of Allowance received for U.S. Appl. No. 15/833,618, dated Mar. 14, 2018, 9 pages.
Notice of Allowance received for U.S. Appl. No. 15/990,327, dated Jan. 11, 2019, 7 pages.
Notice of Allowance received for U.S. Appl. No. 16/010,280, dated Jul. 29, 2019, 7 pages.
Notice of Allowance received for U.S. Appl. No. 16/036,810, dated Oct. 31, 2018, 9 pages.
Notice of Allowance received for U.S. Appl. No. 16/144,077, dated May 8, 2020, 15 pages.
Notice of Allowance received for U.S. Appl. No. 16/392,467, dated Mar. 23, 2020, 9 pages.
Notice of Allowance received for U.S. Appl. No. 16/827,942, dated Oct. 5, 2020, 10 pages.
Restriction Requirement received for U.S. Appl. No. 14/208,099, dated Feb. 24, 2015, 5 pages.
Search Report received for Chinese Patent Application No. 201580028382.1, dated Oct. 12, 2018, 5 pages (2 pages of English Translation & 3 pages of Official copy).
Search Report received for Danish Patent Application No. PA 201670581, dated Apr. 4, 2017, 2 pages.
Search Report received for Danish Patent Application No. PA 201670581, dated Feb. 5, 2018, 1 page.

(56) References Cited

OTHER PUBLICATIONS

Search Report received for Danish Patent Application No. PA 201670581, dated Nov. 3, 2016, 1 page.
Search Report received for Danish Patent Application No. PA 201870354, dated Sep. 26, 2018, 4 pages.
Search Report received for Danish Patent Application No. PA 201670582, dated Feb. 9, 2017, 1 pages.
Search Report received for Danish Patent Application No. PA 201670582, dated Mar. 6, 2018, 2 pages.
Search Report received for Danish Patent Application No. PA 201670582, dated Oct. 28, 2016, 4 pages.
Search Report received for Taiwanese Patent Application No. 104120369, dated Aug. 8, 2016, 2 Pages (1 page of official copy & 1 page of English translation).
Search Report received for Taiwanese Patent Application No. 104120385, dated Nov. 25, 2016, 2 Pages (1 page of official copy & 1 page of English translation).
Akhtar Iyaz, "Movies Anywhere: Everything You Need to Know", Available online at <https://www.cnet.com/how-to/movies-anywhere-ultraviolet-movies-locker-streaming-redeem-faq/>, 2017, 8 pages.
Bohn Dieter, "Rebooting WebOS: How LG Rethought the Smart TV", The Verge, Available online at: <http://www.theverge.com/2014/1/6/5279220/rebooting-webos-how-lg-rethought-the-smart-tv>, Jan. 6, 2014, 5 pages.
episodecalendar.com, "Keep track of your favorite TV shows!—TV Episode Calendar", Available Online at: <https://web.archive.org/web/20140517060612/https://episodecalendar.com/>, May 17, 2014, 6 pages.
Fingas Roger, "Walmart's Vudu to get Native Apple TV", AppleInsider, 2017, pp. 1-4.
Grey Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.
International Standard—ISO, "Ergonomic Requirements for Office Work with Visual Display Terminals (VDTs)", Part 13: User Guidance, Zurich, CH, vol. 9241-13, XP001525163, Section 10, Jul. 15, 1998, 40 pages.
Ng Gary, "New Netflix User Interface Coming This Month, First Redesign in Four Years", iPhone in Canada, Available online at: <https://www.iphoneincanada.ca/news/new-netflix-user-interface/>, Jun. 1, 2015, 3 pages.
Panzarino Matthew, "Apple Announces Voice Activated Siri Assistant Feature for iOS 5, Integrates Wolfram Alpha and Wikipedia", Available online at: <www.thenextweb.com>, Oct. 4, 2011, pp. 1-6.
Cover Flow—Wikipedia, Available online at: <https://en.wikipedia.org/w/index.php?t%20itle=Cover%20Flow&oldid=879285208>, Jan. 20, 2019, 3 pages.
Extended European Search Report received for European Patent Application No. 20190698.9, dated Oct. 30, 2020, 6 pages.
Final Office Action received for U.S. Appl. No. 16/108,519, dated Nov. 25, 2020, 12 pages.
Final Office Action received for U.S. Appl. No. 16/233,990, dated Jan. 11, 2021, 17 pages.
International Search Report received for PCT Patent Application No. PCT/US2019/034921, dated Nov. 19, 2019, 5 pages.
International Search Report received for PCT Patent Application No. PCT/US2020/024452, dated Aug. 6, 2020, 6 pages.
International Search Report received for PCT Patent Application No. PCT/US2020/024485, dated Aug. 3, 2020, 6 pages.
International Search Report received for PCT Patent Application No. PCT/US2020/024486, dated Aug. 11, 2020, 6 pages.
International Search Report received for PCT Patent Application No. PCT/US2020/024492, dated Aug. 10, 2020, 6 pages.
Invitation to Pay Addition Fees received for PCT Patent Application No. PCT/US2020/024492, dated Jun. 8, 2020, 10 pages.
Invitation to Pay Additional Fees received for PCT Patent Application No. PCT/US2019/034921, dated Sep. 24, 2019, 12 pages.
Invitation to Pay Additional Fees received for PCT Patent Application No. PCT/US2020/024452, dated Jun. 15, 2020, 13 pages.
Invitation to Pay Additional Fees received for PCT Patent Application No. PCT/US2020/024485, dated Jun. 8, 2020, 11 pages.
Invitation to Pay Additional Fees received for PCT Patent Application No. PCT/US2020/024486, dated Jun. 3, 2020, 11 pages.
Non-Final Office Action received for U.S. Appl. No. 15/167,801, dated Dec. 11, 2020, 18 pages.
Non-Final Office Action received for U.S. Appl. No. 16/584,790, dated Dec. 23, 2020, 30 pages.
Non-Final Office Action received for U.S. Appl. No. 16/827,918, dated Dec. 10, 2020, 28 pages.
Non-Final Office Action received for U.S. Appl. No. 16/827,926, dated Oct. 29, 2020, 45 pages.
Supplemental Notice of Allowability received for U.S. Appl. No. 16/827,942, dated Nov. 4, 2020, 3 pages.
Final Office Action received for U.S. Appl. No. 16/142,635, dated Feb. 3, 2021, 23 pages.
Final Office Action received for U.S. Appl. No. 16/697,090, dated Jan. 27, 2021, 18 pages.
Non-Final Office Action received for U.S. Appl. No. 17/065,387, dated Jan. 28, 2021, 28 pages.
Notice of Allowance received for U.S. Appl. No. 16/827,942, dated Jan. 22, 2021, 5 pages.
Final Office Action received for U.S. Appl. No. 16/865,172, dated Feb. 12, 2021, 29 pages.
Extended European Search Report received for European Patent Application No. 20199219.5, dated Apr. 22, 2021, 8 pages.
Final Office Action received for U.S. Appl. No. 16/175,565, dated Nov. 12, 2020, 40 pages.
Final Office Action received for U.S. Appl. No. 16/584,790, dated Jun. 15, 2021, 30 pages.
Final Office Action received for U.S. Appl. No. 16/682,443, dated Mar. 9, 2021, 9 pages.
Final Office Action received for U.S. Appl. No. 16/827,918, dated Jul. 8, 2021, 31 pages.
Final Office Action received for U.S. Appl. No. 16/827,926, dated Mar. 17, 2021, 44 pages.
International Search Report received for PCT Patent Application No. PCT/US2020/035423, dated Oct. 13, 2020, 4 pages.
Non-Final Office Action received for U.S. Appl. No. 16/108,519, dated Apr. 5, 2021, 13 pages.
Non-Final Office Action received for U.S. Appl. No. 16/142,635, dated Jun. 11, 2021, 23 pages.
Non-Final Office Action received for U.S. Appl. No. 16/233,990, dated Jul. 9, 2021, 18 pages.
Non-Final Office Action received for U.S. Appl. No. 16/697,090, dated Aug. 3, 2021, 16 pages.
Non-Final Office Action received for U.S. Appl. No. 16/827,910, dated Jun. 17, 2021, 16 pages.
Non-Final Office Action received for U.S. Appl. No. 16/827,931, dated Mar. 3, 2021, 24 pages.
Non-Final Office Action received for U.S. Appl. No. 16/865,172 dated Jun. 29, 2021, 29 pages.
Non-Final Office Action received for U.S. Appl. No. 16/872,274, dated Jul. 9, 2021, 19 pages.
Non-Final Office Action received for U.S. Appl. No. 16/888,453, dated Jun. 4, 2021, 37 pages.
Non-Final Office Action received for U.S. Appl. No. 16/888,478, dated Feb. 8, 2021, 24 pages.
Non-Final Office Action received for U.S. Appl. No. 16/945,724, dated Jul. 19, 2021, 8 pages.
Non-Final Office Action received for U.S. Appl. No. 17/065,387, dated Jun. 1, 2021, 25 pages.
Non-Final Office Action received for U.S. Appl. No. 17/133,550, dated Jun. 8, 2021, 23 pages.
Non-Final Office Action received for U.S. Appl. No. 16/175,565, dated Mar. 4, 2020, 36 pages.
Notice of Allowance received for U.S. Appl. No. 16/136,005, dated Feb. 24, 2021, 8 pages.
Notice of Allowance received for U.S. Appl. No. 16/136,005, dated Jun. 9, 2021, 7 pages.
Notice of Allowance received for U.S. Appl. No. 16/682,443, dated Aug. 20, 2021, 7 pages.

(56) References Cited

OTHER PUBLICATIONS

Notice of Allowance received for U.S. Appl. No. 16/726,179, dated Jun. 17, 2021, 9 pages.
Notice of Allowance received for U.S. Appl. No. 16/827,942, dated Apr. 28, 2021, 5 pages.
Patent Board Decision received for U.S. Appl. No. 15/876,715, mailed on Aug. 3, 2021, 8 pages.
Search Report received for Chinese Patent Application No. 201780033590.X, dated Mar. 24, 2021, 4 pages (2 page of English Translation and 2 pages of Official Copy).
Search Report received for Chinese Patent Application No. 201910469185.3, dated Feb. 23, 2021, 6 pages (3 page of English Translation and 3 page of Official Copy).
Cheredar, Tom, "Verizon's Viewdini lets you watch Netflix, Comcast, & Hulu videos from a single app", venturebeat.com, May 22, 2012, 6 pages.
Kaijser, Martijn, "Mimic skin for Kodi 15.x: Installation and showcase", Time 2:23-2:28, Available online at: <https://www.youtube.com/watch?v=RGfpbUWVkgQ&t=143s>, Aug. 3, 2015, 1 page.
Li, Xiaoshan, "CNTV, HULU, BBC iPlayer Comparative Study on User Interface of Three Network TV Stations", Modern Communication (Journal of Communication University of China), Issue 11, Nov. 5, 2010, pp. 156-158. See attached Communication 37 CFR § 1.98(a) (3).
Final Office Action received for U.S. Appl. No. 17/210,352, dated Jun. 3, 2022, 21 pages.
Notice of Allowance received for U.S. Appl. No. 17/000,112, dated Jun. 3, 2022, 14 pages.
Applicant Initiated Interview Summary received for U.S. Appl. No. 17/210,352, dated Feb. 28, 2022, 4 pages.
Corrected Notice of Allowability received for U.S. Appl. No. 16/108,519, dated Dec. 22, 2021, 3 pages.
Corrected Notice of Allowance received for U.S. Appl. No. 15/876,715, dated Oct. 20, 2021, 2 pages.
Corrected Notice of Allowance received for U.S. Appl. No. 16/142,635, dated Mar. 10, 2022, 2 Pages.
Corrected Notice of Allowance received for U.S. Appl. No. 16/233,990, dated Mar. 8, 2022, 4 pages.
Corrected Notice of Allowance received for U.S. Appl. No. 16/827,931, dated Dec. 6, 2021, 4 pages.
Final Office Action received for U.S. Appl. No. 16/697,090, dated Feb. 23, 2022, 25 pages.
Final Office Action received for U.S. Appl. No. 16/827,910, dated Feb. 28, 2022, 17 pages.
Final Office Action received for U.S. Appl. No. 16/872,274, dated Dec. 23, 2021, 20 pages.
Final Office Action received for U.S. Appl. No. 16/888,478, dated Nov. 15, 2021, 27 pages.
Final Office Action received for U.S. Appl. No. 17/133,550, dated Feb. 11, 2022, 18 pages.
Non-Final Office Action received for U.S. Appl. No. 15/167,801, dated Sep. 3, 2021, 17 pages.
Non-Final Office Action received for U.S. Appl. No. 16/175,565, dated Sep. 20, 2021, 33 pages.
Non-Final Office Action received for U.S. Appl. No. 16/584,790, dated Feb. 1, 2022, 33 pages.
Non-Final Office Action received for U.S. Appl. No. 17/000,112, dated Dec. 7, 2021, 15 pages.
Non-Final Office Action received for U.S. Appl. No. 17/210,352, dated Oct. 18, 2021, 18 pages.
Non-Final Office Action received for U.S. Appl. No. 17/353,527, dated Oct. 5, 2021, 14 pages.
Notice of Allowance received for U.S. Appl. No. 15/876,715, dated Oct. 14, 2021, 7 pages.
Notice of Allowance received for U.S. Appl. No. 16/108,519, dated Sep. 21, 2021, 8 pages.
Notice of Allowance received for U.S. Appl. No. 16/142,635, dated Nov. 10, 2021, 8 pages.
Notice of Allowance received for U.S. Appl. No. 16/233,990, dated Feb. 22, 2022, 8 pages.
Notice of Allowance received for U.S. Appl. No. 16/682,443, dated Nov. 17, 2021, 8 pages.
Notice of Allowance received for U.S. Appl. No. 16/726,179, dated Sep. 30, 2021, 8 pages.
Notice of Allowance received for U.S. Appl. No. 16/827,918, dated Feb. 7, 2022, 9 pages.
Notice of Allowance received for U.S. Appl. No. 16/827,926, dated Nov. 1, 2021, 35 pages.
Notice of Allowance received for U.S. Appl. No. 16/827,931, dated Jan. 5, 2022, 7 pages.
Notice of Allowance received for U.S. Appl. No. 16/827,931, dated Sep. 15, 2021, 11 pages.
Notice of Allowance received for U.S. Appl. No. 16/865,172, dated Dec. 16, 2021, 10 pages.
Notice of Allowance received for U.S. Appl. No. 16/945,724, dated Dec. 20, 2021, 7 pages.
Notice of Allowance received for U.S. Appl. No. 17/065,387, dated Dec. 1, 2021, 10 pages.
Search Report received for Chinese Patent Application No. 201680050096.X, dated Jan. 10, 2022, 4 pages (2 pages of English Translation and 2 pages of Official Copy).
Search Report received for Chinese Patent Application No. 201910587972.8, dated Jan. 4, 2022, 4 pages (2 pages of English Translation and 2 pages of Official Copy).
Corrected Notice of Allowance received for U.S. Appl. No. 15/876,715, dated Apr. 11, 2022, 4 Pages.
Corrected Notice of Allowance received for U.S. Appl. No. 15/876,715, dated Apr. 19, 2022, 4 Pages.
Corrected Notice of Allowance received for U.S. Appl. No. 17/065,387, dated Mar. 30, 2022, 2 Pages.
Final Office Action received for U.S. Appl. No. 16/888,453, dated Apr. 8, 2022, 39 pages.
Final Office Action received for U.S. Appl. No. 16/175,565, dated May 27, 2022, 33 pages.
Final Office Action received for U.S. Appl. No. 17/353,527, dated May 11, 2022, 17 Pages.
Non-Final Office Action received for U.S. Appl. No. 15/167,801, dated May 18, 2022, 17 Pages.
Non-Final Office Action received for U.S. Appl. No. 16/827,926, dated Apr. 25, 2022, 27 pages.
Non-Final Office Action received for U.S. Appl. No. 16/888,478, dated May 2, 2022, 29 pages.
Non-Final Office Action received for U.S. Appl. No. 17/379,785, dated Mar. 30, 2022, 18 Pages.
Notice of Allowance received for U.S. Appl. No. 15/876,715, dated Apr. 4, 2022, 7 pages.
Notice of Allowance received for U.S. Appl. No. 16/233,990, dated May 26, 2022, 5 pages.
Notice of Allowance received for U.S. Appl. No. 16/827,931, dated Apr. 19, 2022, 7 Pages.
Notice of Allowance received for U.S. Appl. No. 16/865,172, dated Apr. 13, 2022, 8 pages.
Notice of Allowance received for U.S. Appl. No. 16/872,274, dated Apr. 19, 2022, 10 Pages.
Notice of Allowance received for U.S. Appl. No. 16/945,724, dated Apr. 4, 2022, 8 Pages.
Corrected Notice of Allowance received for U.S. Appl. No. 16/872,274, dated Aug. 12, 2022, 5 pages.
Corrected Notice of Allowance received for U.S. Appl. No. 16/945,724, dated Aug. 31, 2022, 2 pages.
Corrected Notice of Allowance received for U.S. Patent Application No. 17/000, 112, dated Jun. 17, 2022, 2 pages.
Extended European Search Report received for European Patent Application No. 22167405.4, dated Jul. 4, 2022, 11 Pages.
Final Office Action received for U.S. Appl. No. 16/584,790, dated Jun. 14, 2022, 37 pages.
Non-Final Office Action received for U.S. Appl. No. 16/697,090, dated Jul. 7, 2022, 25 pages.
Non-Final Office Action received for U.S. Appl. No. 16/827,910, dated Sep. 14, 2022, 18 pages.

(56) References Cited

OTHER PUBLICATIONS

Non-Final Office Action received for U.S. Appl. No. 17/133,550, dated Sep. 9, 2022, 23 pages.
Non-Final Office Action received for U.S. Appl. No. 17/457,901, dated Apr. 28, 2022, 24 Pages.
Notice of Allowance received for U.S. Appl. No. 15/876,715, dated Aug. 3, 2022, 7 Pages.
Notice of Allowance received for U.S. Appl. No. 16/233,990, dated Oct. 5, 2022, 5 pages.
Notice of Allowance received for U.S. Appl. No. 16/827,918, dated Jun. 8, 2022, 9 Pages.
Notice of Allowance received for U.S. Patent Application No. 16/865,172, dated Aug. 25, 2022, 8 Pages.
Notice of Allowance received for U.S. Appl. No. 16/945,724, dated Jul. 20, 2022, 8 Pages.
Corrected Notice of Allowance received for U.S. Appl. No. 16/233,990, dated Oct. 20, 2022, 2 bages.
Final Office Action received for U.S. Appl. No. 16/697,090, dated Dec. 14, 2022, 28 pages.
Final Office Action received for U.S. Appl. No. 17/379,785, dated Oct. 28, 2022, 14 pages.
Non-Final Office Action received for U.S. Appl. No. 17/353,527, dated Dec. 8, 2022, 17 pages.
Non-Final Office Action received for U.S. Appl. No. 17/586,625, dated Sep. 1, 2022, 13 pages.
Non-Final Office Action received for U.S. Appl. No. 17/656,610, dated Feb. 6, 2023, 10 pages.
Non-Final Office Action received for U.S. Appl. No. 17/660,622, dated Dec. 20, 2022, 17 pages.
Notice of Allowance received for U.S. Appl. No. 16/233,990, dated Jan. 31, 2023, 5 pages.
Notice of Allowance received for U.S. Appl. No. 16/584,790, dated Feb. 3, 2023, 9 pages.
Notice of Allowance received for U.S. Appl. No. 17/000,112, dated Oct. 18, 2022, 10 pages.
Notice of Allowance received for U.S. Appl. No. 17/210,352, dated Dec. 5, 2022, 9 pages.
Notice of Allowance received for U.S. Appl. No. 17/457,901, dated Nov. 16, 2022, 9 pages.
Notice of Allowance received for U.S. Appl. No. 17/654,578, dated Oct. 25, 2022, 8 pages.
Search Report received for Chinese Patent Application No. 201780066823.6, dated Nov. 1, 2022, 4 pages (2 pages of English Translation and 2 Pages of Official Copy).
Search Report received for Chinese Patent Application No. 201811143102.3, dated Nov. 22, 2022, 5 Pages (2 Pages of English Translation and 3 Pages of Official Copy).
Search Report received for Chinese Patent Application No. 201911313497.1, dated Dec. 14, 2022, 3 pages (1 pages of English Translation and 2 Pages of Official Copy).
Search Report received for Chinese Patent Application No. 202010011436.6, dated Dec. 15, 2022, 9 pages (4 pages of English Translation and 5 Pages of Official Copy).
Apple, "The control is all yours", Available online at : <https://www.apple.com.cn/privacy/control/>, [Retrieved Dec. 29, 2022], Nov. 30, 2022, 12 pages. See attached Communication 37 CFR § 1.98(a)(3).
Drews et al., "Virtual Jukebox—Reviving a Classic", Proceedings of the 35th Hawaii International Conference on System Sciences, 2022, 7 pages.
Jin et al., "Pricing Sponsored Content in Wireless Networks with Multiple Content Providers", The Fourth IEEE Workshop on Smart Data Pricing 2015, 2015, pp. 668-673.
Kimbler, Kristofer, "App Store Strategies for Service Providers", 2010 4th International Conference on Intelligence in Next Generation Networks, Nov. 18, 2010, 5 Pages.
Wang et al., "Authorization Management Mechanism of Web application system", Network and Information Technology, vol. 25, No. 11, 2006, 3 pages. See attached Communication 37 CFR § 1.98(a)(3).
Meng et al., "Role Authorization Based Web Service Access Control Model", Journal of Lanzhou University (Natural Science Edition), vol. 42, No. 2, 2007, pp. 84-88. See attached Communication 37 CFR § 1.98(a)(3).
Corrected Notice of Allowance received for U.S. Appl. No. 16/888,453, dated Jul. 26, 2023, 5 pages.
Corrected Notice of Allowance received for U.S. Appl. No. 17/210,352, dated Sep. 20, 2023, 5 pages.
Corrected Notice of Allowance received for U.S. Appl. No. 17/367,227, dated Jul. 27, 2023, 2 pages.
Final Office Action received for U.S. Appl. No. 15/167,801, dated Sep. 19, 2023, 19 pages.
Final Office Action received for U.S. Appl. No. 17/379,785, dated Aug. 23, 2023, 13 pages.
Final Office Action received for U.S. Appl. No. 17/937,410, dated Aug. 3, 2023, 15 pages.
Final Office Action received for U.S. Appl. No. 17/937,704, dated Aug. 31, 2023, 18 pages.
Final Office Action received for U.S. Appl. No. 18/060,902, dated Aug. 25, 2023, 8 pages.
Non-Final Office Action received for U.S. Appl. No. 17/656,610, dated Jul. 26, 2023, 10 pages.
Non-Final Office Action received for U.S. Appl. No. 17/657,913, dated Jul. 21, 2023, 16 pages.
Non-Final Office Action received for U.S. Appl. No. 18/146,336, dated Aug. 3, 2023, 23 pages.
Notice of Allowance received for U.S. Appl. No. 16/827,910, dated Aug. 3, 2023, 21 pages.
Notice of Allowance received for U.S. Appl. No. 16/827,926, dated Sep. 13, 2023, 9 pages.
Notice of Allowance received for U.S. Appl. No. 16/888,453, dated Jun. 21, 2023, 7 pages.
Notice of Allowance received for U.S. Appl. No. 16/888,478, dated Aug. 2, 2023, 9 pages.
Notice of Allowance received for U.S. Appl. No. 17/353,527, dated Jul. 21, 2023, 7 pages.
Notice of Allowance received for U.S. Appl. No. 17/654,578, dated Jun. 13, 2023, 7 pages.
Notice of Allowance received for U.S. Appl. No. 17/651,731, dated Oct. 3, 2023, 5 pages.
Notice of Allowance received for U.S. Appl. No. 17/353,527, dated Oct. 4, 2023, 7 pages.
Search Report received for Chinese Patent Application No. 202010011436.6 dated Aug. 30, 2023, 4 pages (2 pages of English Translation and 2 pages of Official Copy).
Search Report received for Chinese Patent Application No. 202210799020.4, dated Jul. 27, 2023, 5 pages (1 page of English Translation and 4 pages of Official Copy).
Cai, Chongshan, "Analysis of Copyright Infringement Problems of Video Aggregation App", China Copyright, vol. 02, Apr. 15, 2015, 2 pages (abstract) [retrieved on Oct. 6, 2023]. Retrieved from the Internet: < http://www.cqvip.com/qk/81889a/2015002/9071668150484953485048.html>. See attached Communication 37 CFR § 1.98(a)(3).
Final Office Action received for U.S. Appl. No. 16/827,910, dated Mar. 15, 2023, 18 pages.
Final Office Action received for U.S. Appl. No. 16/827,926, dated Apr. 18, 2023, 32 pages.
Final Office Action received for U.S. Appl. No. 16/888,478, dated Feb. 13, 2023, 27 pages.
Final Office Action received for U.S. Appl. No. 17/133,550, dated Feb. 15, 2023, 22 pages.
Final Office Action received for U.S. Appl. No. 17/586,625, dated May 4, 2023, 15 pages.
Final Office Action received for U.S. Appl. No. 17/660,622, dated May 24, 2023, 20 pages.
Non-Final Office Action received for U.S. Appl. No. 15/167,801, dated Feb. 8, 2023, 23 pages.
Non-Final Office Action received for U.S. Appl. No. 16/175,565, dated Feb. 17, 2023, 33 pages.
Non-Final Office Action received for U.S. Appl. No. 17/379,785, dated Mar. 9, 2023, 14 pages.

(56) References Cited

OTHER PUBLICATIONS

Non-Final Office Action received for U.S. Appl. No. 17/651,731, dated Apr. 25, 2023, 9 pages.
Non-Final Office Action received for U.S. Appl. No. 17/937,410, dated Mar. 2, 2023, 15 pages.
Non-Final Office Action received for U.S. Appl. No. 17/937,704, dated Mar. 30, 2023, 18 pages.
Non-Final Office Action received for U.S. Appl. No. 18/060,902, dated Mar. 10, 2023, 8 pages.
Notice of Allowability received for U.S. Appl. No. 17/457,901, dated Mar. 8, 2023, 9 pages.
Notice of Allowance received for U.S. Appl. No. 16/888,453, dated Mar. 1, 2023, 8 pages.
Notice of Allowance received for U.S. Appl. No. 17/210,352, dated Mar. 16, 2023, 7 pages.
Notice of Allowance received for U.S. Appl. No. 17/367,227, dated Mar. 23, 2023, 12 pages.
Notice of Allowance received for U.S. Appl. No. 17/654,578, dated Feb. 15, 2023, 8 pages.
Search Report received for Chinese Patent Application No. 201911313480.6, dated Jan. 20, 2023, 4 pages (2 pages of English Translation and 2 pages of Official Copy).
Search Report received for Chinese Patent Application No. 201911313496.7, dated Jan. 20, 2023, 4 pages (2 pages of English Translation and 2 pages of Official Copy).
Search Report received for Chinese Patent Application No. 201911313497.1, dated Apr. 11, 2023, 5 pages (2 pages of English Translation and 3 pages of Official Copy).
Search Report received for Chinese Patent Application No. 202010662190.9, dated Apr. 28, 2023, 5 pages (2 pages of English Translation and 3 pages of Official Copy).
Search Report received for Chinese Patent Application No. 202010662206.6, dated Apr. 28, 2023, 5 pages (2 pages of English Translation and 3 pages of Official Copy).
Search Report received for Chinese Patent Application No. 202010662994.9, dated Apr. 28, 2023, 5 pages (2 pages of English Translation and 3 pages of Official Copy).
Search Report received for European Patent Application No. 20718506.7, dated Mar. 21, 2023, 2 pages.
Anonymous, "Video Progress Bar—YouTube Help", Retrieved from the Internet: <https://web.archive.org/web/20190317001501/https://support.google.com/youtube/answer/7174115?hl=en>, [retrieved on Mar. 22, 2023], Mar. 17, 2019, 2 pages.
Beer et al., "The Odds Of Running A Nonlinear TV Program Using Web Technologies", IEEE International Symposium on Broadband Multimedia Systems and Broadcasting (BMSB), 2011, 4 pages.
Biao et al., "Research on UI Optimization of Chinese Network Television Stations", Southeast Communications, 2013, 4 pages. See attached Communication 37 CFR § 1.98(a)(3).
Budhraja et al., "Probability Based Playlist Generation Based on Music Similarity and User Customization", National Conference On Computing And Communication Systems, 2012, 5 pages.
Cheng, Luo, "The Designing of Dynamic Play-list Based on Flash Streaming Media Technology", Computer and Telecommunication, 2008, 3 pages. See attached Communication 37 CFR § 1.98(a)(3).
Liu, Chang, "Functions and Design of Multi-Screen Playing System in TV Variety Studio", Modern TV Technology, 2013, 5 pages. See attached Communication 37 CFR § 1.98(a)(3).
Tinari, George, "What's New in the Netflix Redesign and How to Use It", Retrieved from the Internet: <https://web.archive.org/web/20161110092133/https://www.guidingtech.com/48443/netflix-redesign-overview/ >, [retrieved on Mar. 22, 2023], Nov. 10, 2016, 9 pages.
Zhang et al., "Music Playlist Prediction Via Detecting Song Moods", IEEE China Summit and International Conference on Signal and Information Processing, 2013, pp. 174-178.

\* cited by examiner

Application: Provider 3

Media Item F

Application: Provider 2

Content Collection A:
Season 2, Episode 1
Version B

Application: Provider 2

Content Collection A:
Season 2, Episode 1
Version B

USER INTERFACES FOR BROWSING CONTENT FROM MULTIPLE CONTENT APPLICATIONS ON AN ELECTRONIC DEVICE

CROSS-REFERENCE TO RELATED APPLICATIONS

This application claims benefit of U.S. Provisional Patent Application No. 62/556,912, filed on Sep. 11, 2017, and claims benefit of U.S. Provisional Patent Application No. 62/423,150, filed Nov. 16, 2016, and claims benefit of U.S. Provisional Patent Application No. 62/413,333, filed on Oct. 26, 2016, which are hereby incorporated by reference in their entirety for all purposes.

FIELD OF THE DISCLOSURE

This relates generally to electronic devices that allow for browsing and playing content, and user interactions with such devices.

BACKGROUND OF THE DISCLOSURE

User interaction with electronic devices has increased significantly in recent years. These devices can be devices such as computers, tablet computers, televisions, multimedia devices, mobile devices, and the like.

In some circumstances, such a device has access to content or media (e.g., music, movies, television shows, etc.) via content applications installed on the device that are associated with content providers, and user interaction with such a device entails browsing and playing of the content using the content applications. Enhancing these interactions improves the user's experience with the device and decreases user interaction time, which is particularly important where input devices are battery-operated.

SUMMARY OF THE DISCLOSURE

Some embodiments described in this disclosure are directed to one or more electronic devices that present media items from different media applications in a unified media browsing application, and one or more operations related to the above that the electronic devices optionally perform. Some embodiments described in this disclosure are directed to one or more electronic devices that facilitate browsing of media from different media applications based on category of media (e.g., movies, television shows, etc.), and one or more operations related to the above that the electronic devices optionally perform. Some embodiments described in this disclosure are directed to one or more electronic devices that facilitate setup of a unified media browsing application that presents media items from different media applications in a unified media browsing user interface, and one or more operations related to the above that the electronic devices optionally perform. Some embodiments described in this disclosure are directed to one or more electronic devices that display multiple episodes of a collection of episodic content (e.g., a television series) in a user interface for the collection of episodic content, and one or more operations related to the above that the electronic devices optionally perform. Some embodiments described in this disclosure are directed to one or more electronic devices that display representations of, and provide access to, live-event media items accessible on the electronic devices, and one or more operations related to the above that the electronic devices optionally perform. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1A:
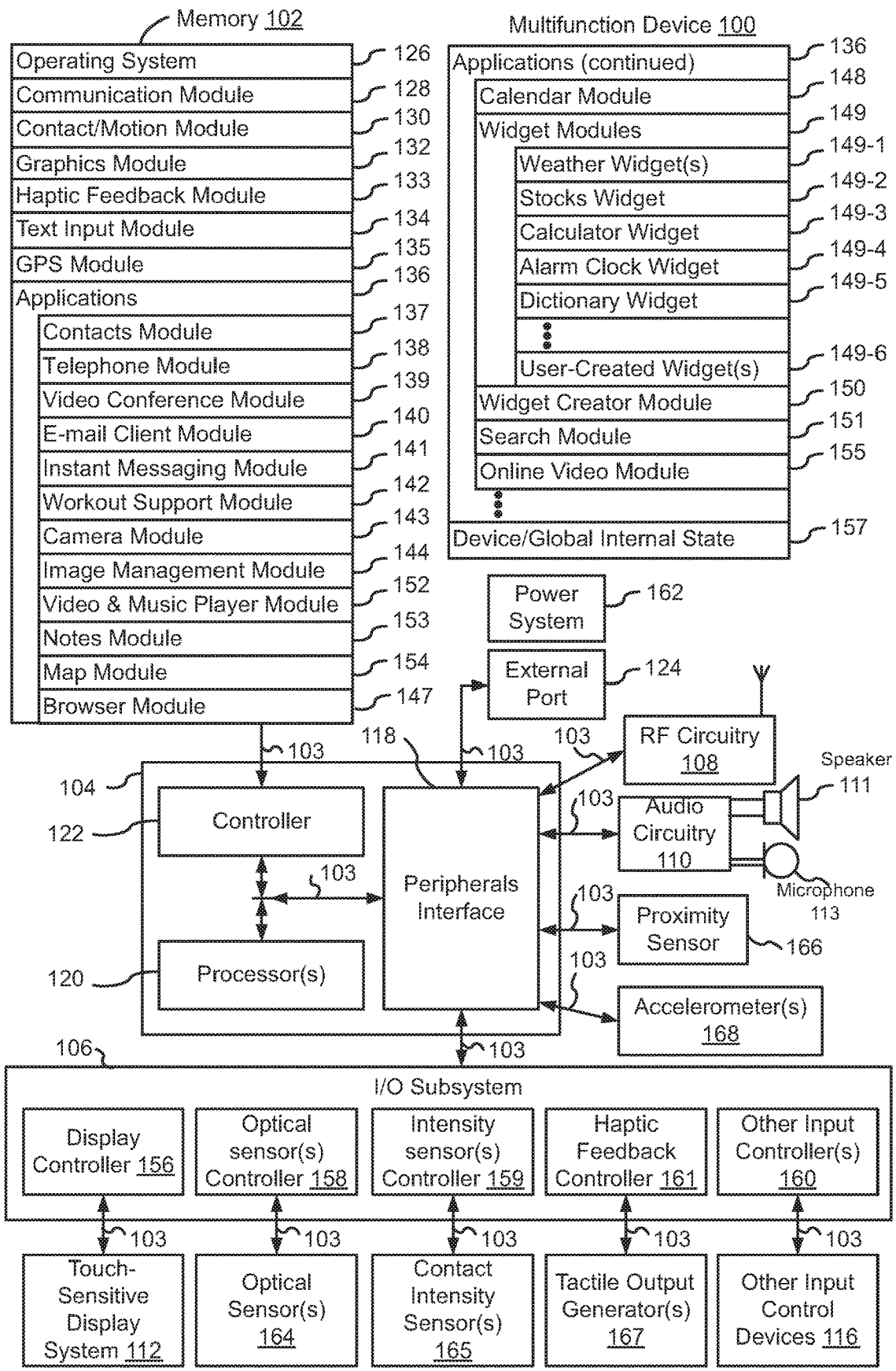
FIG. 1A is a block diagram illustrating a multifunction device with a touch-sensitive display in accordance with some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments. Further, although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

A touch-sensitive display in some embodiments of touch screen 112 is, optionally, analogous to the multi-touch sensitive touchpads described in the following U.S. Pat. No.

6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
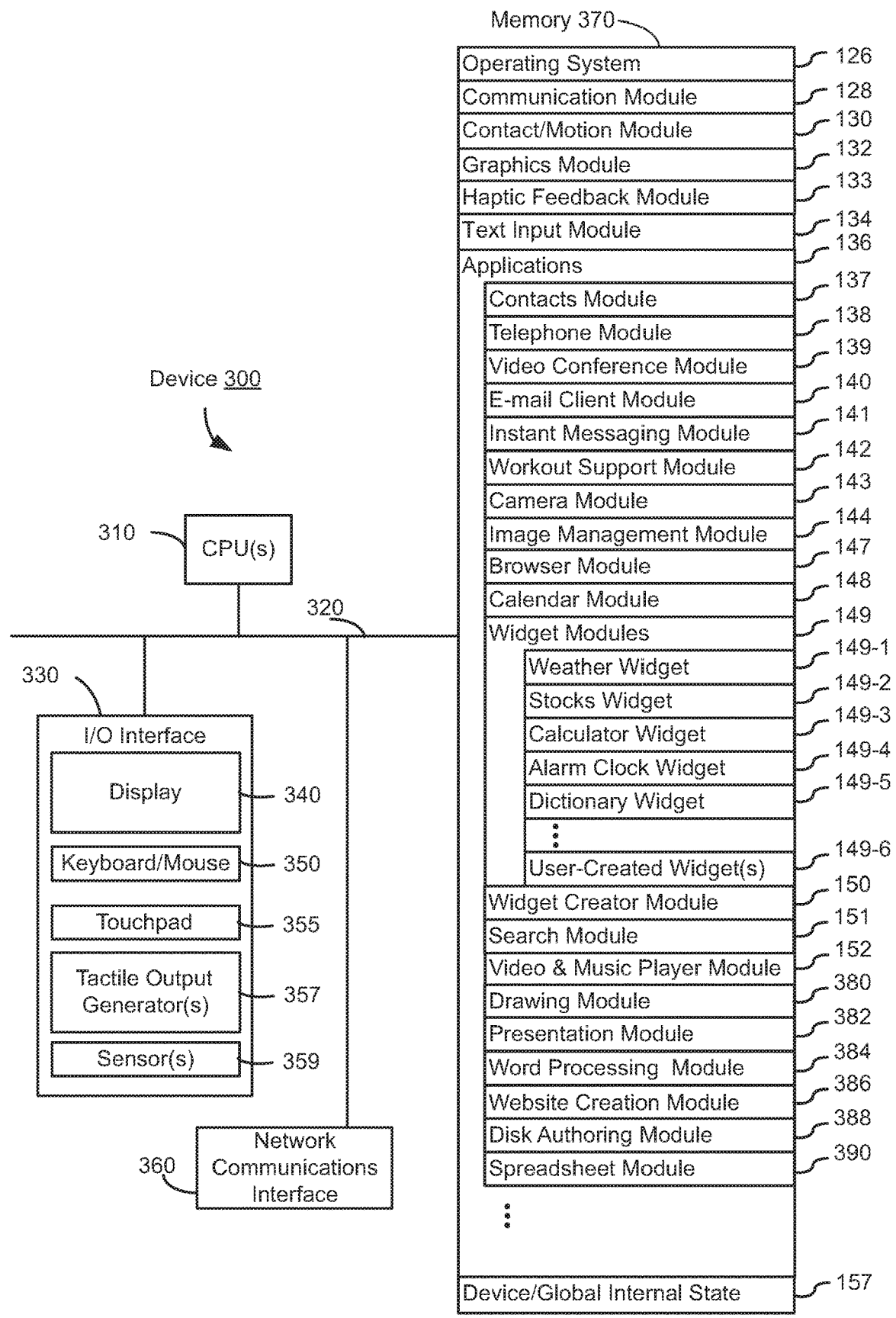
FIG. 3 is a block diagram of an exemplary multifunction device with a display and a touch-sensitive surface in accordance with some embodiments of the disclosure.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  video player module;
  music player module;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which merges video player module and music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
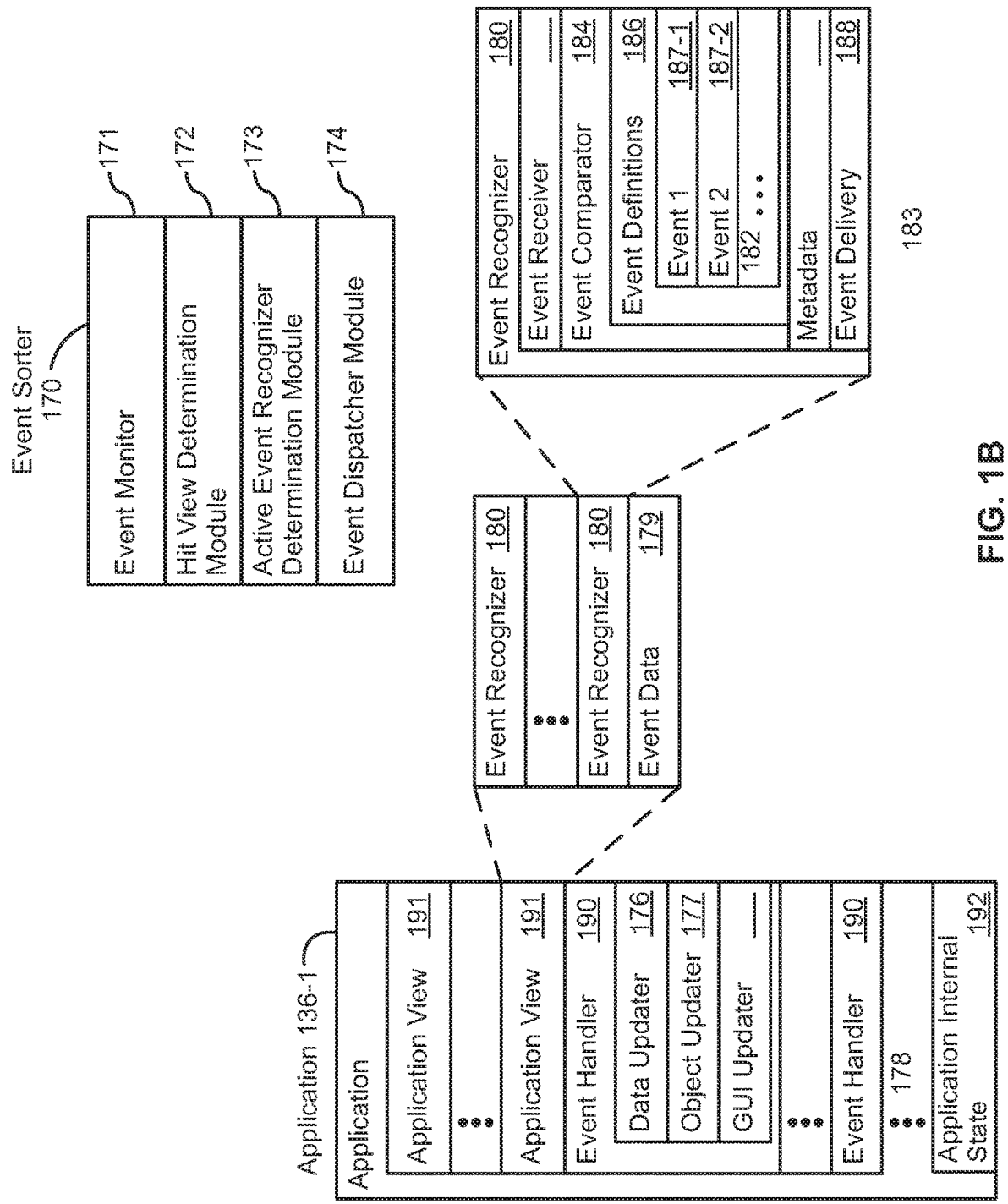
FIG. 1B is a block diagram illustrating exemplary components for event handling in accordance with some embodiments of the disclosure.

FIG. 1B is a block diagram illustrating exemplary components for event handling in accordance with some embodiments. In some embodiments, memory 102 (FIG.

1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
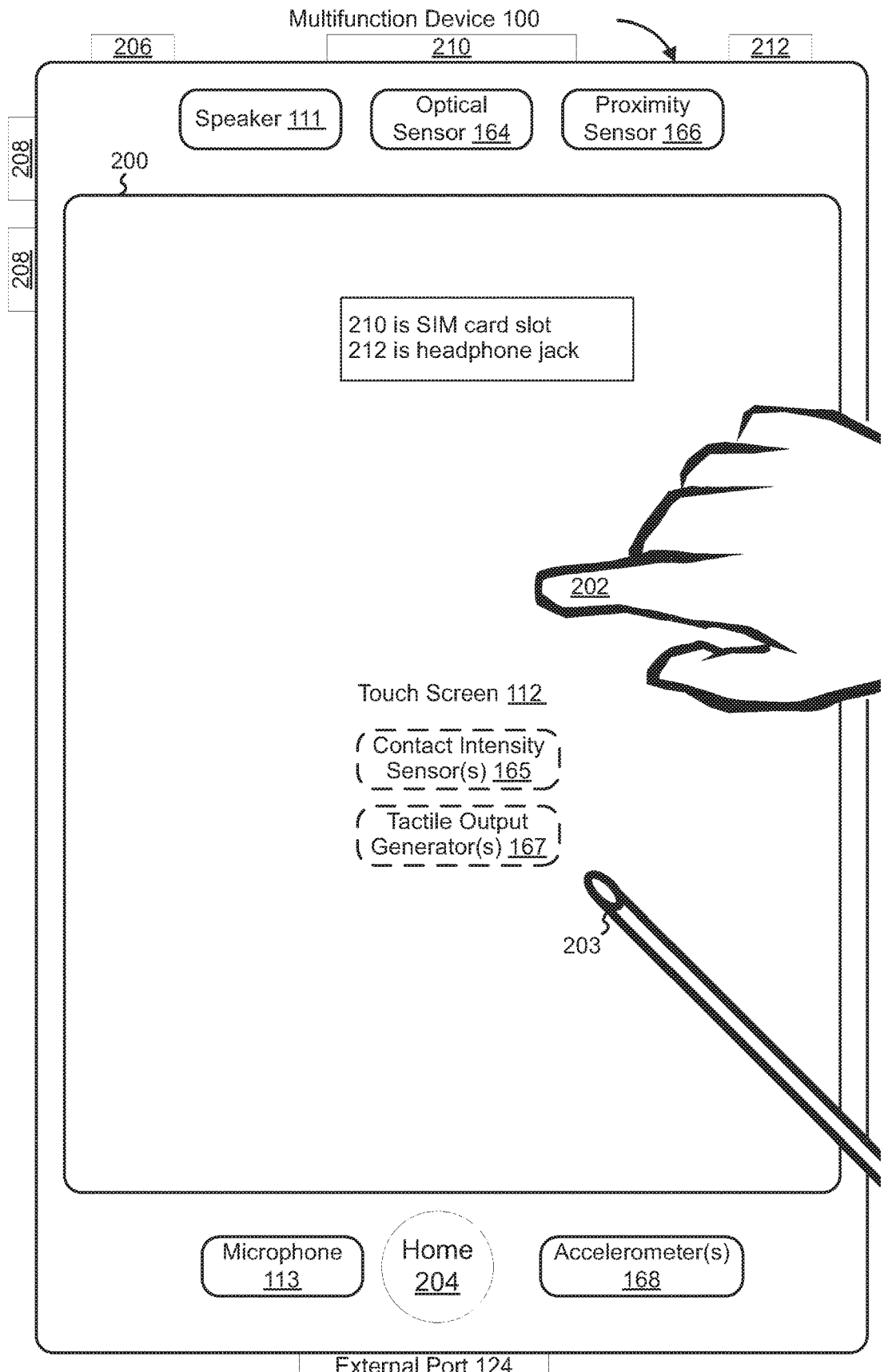
FIG. 2 illustrates a multifunction device having a touch screen in accordance with some embodiments of the disclosure.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 4:
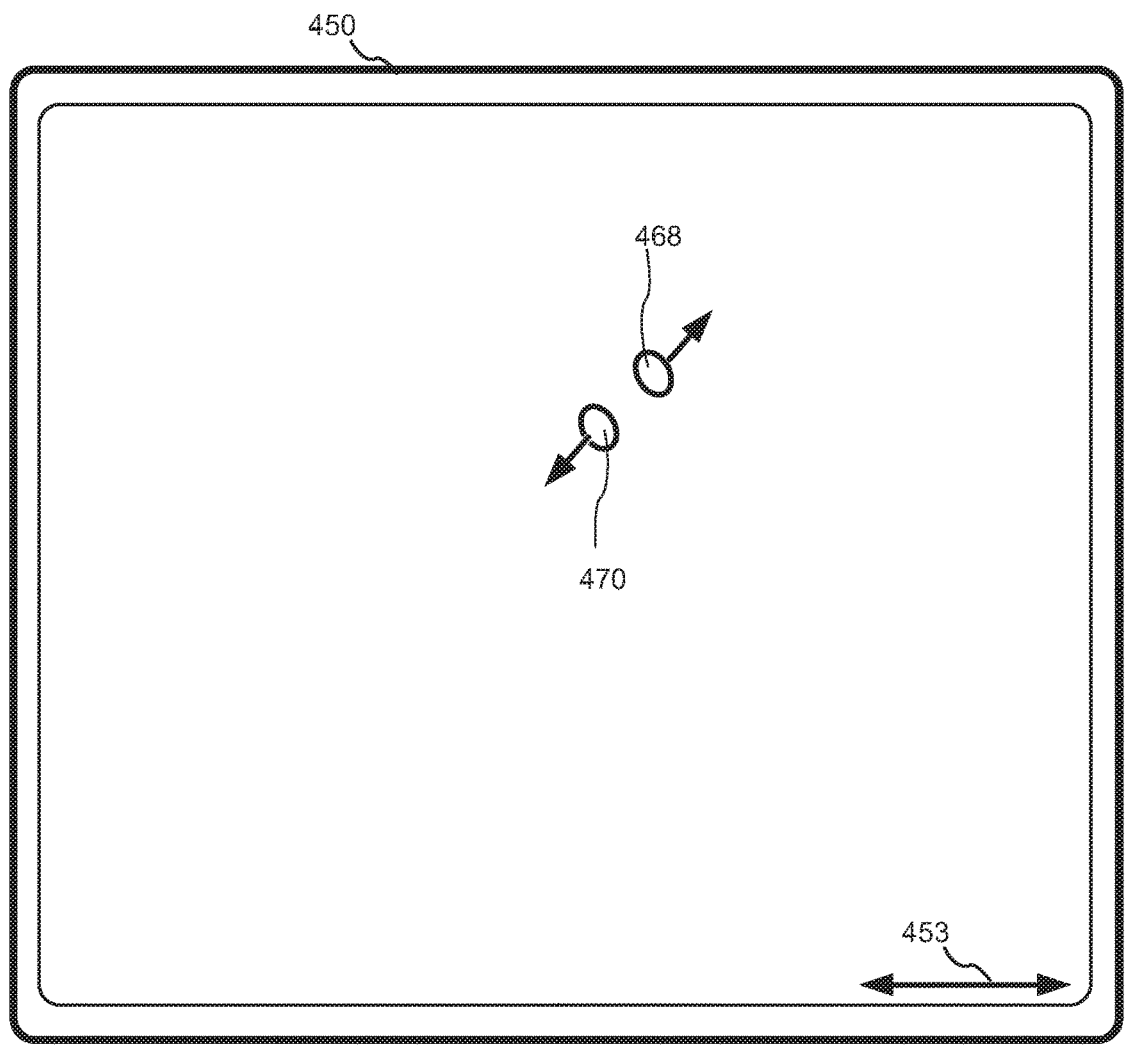
FIG. 4 illustrates an exemplary user interface for a multifunction device with a touch-sensitive surface that is separate from the display in accordance with some embodiments of the disclosure.
Figure 4:
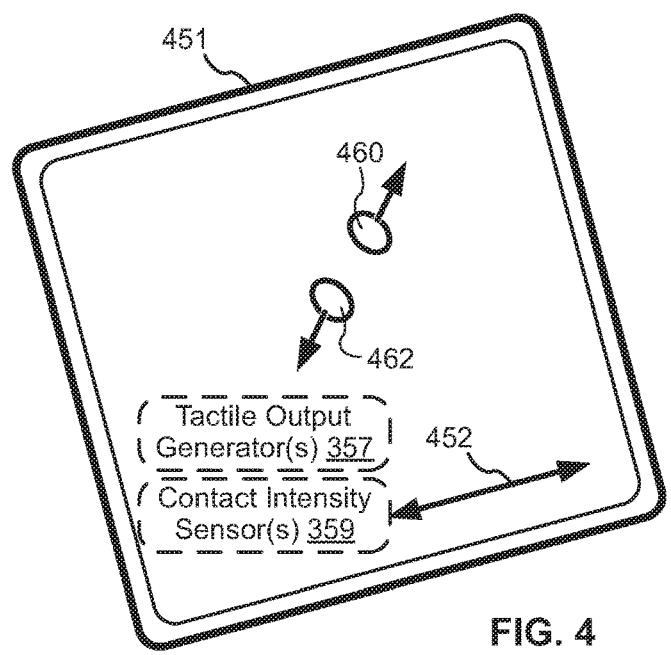

FIG. 4 illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples that follow will be given with reference to inputs on touch screen display 112 (where the touch sensitive surface and the display are combined), in some embodiments, the device detects inputs on a touch-sensitive surface that is separate from the display, as shown in FIG. 4. In some embodiments the touch sensitive surface (e.g., 451 in FIG. 4) has a primary axis (e.g., 452 in FIG. 4) that corresponds to a primary axis (e.g., 453 in FIG. 4) on the display (e.g., 450). In accordance with these embodiments, the device detects contacts (e.g., 460 and 462 in FIG. 4) with the touch-sensitive surface 451 at locations that correspond to respective locations on the display (e.g., in FIG. 4, 460 corresponds to 468 and 462 corresponds to 470). In this way, user inputs (e.g., contacts 460 and 462, and movements thereof) detected by the device on the touch-sensitive surface (e.g., 451 in FIG. 4) are used by the device to manipulate the user interface on the display (e.g., 450 in FIG. 4) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
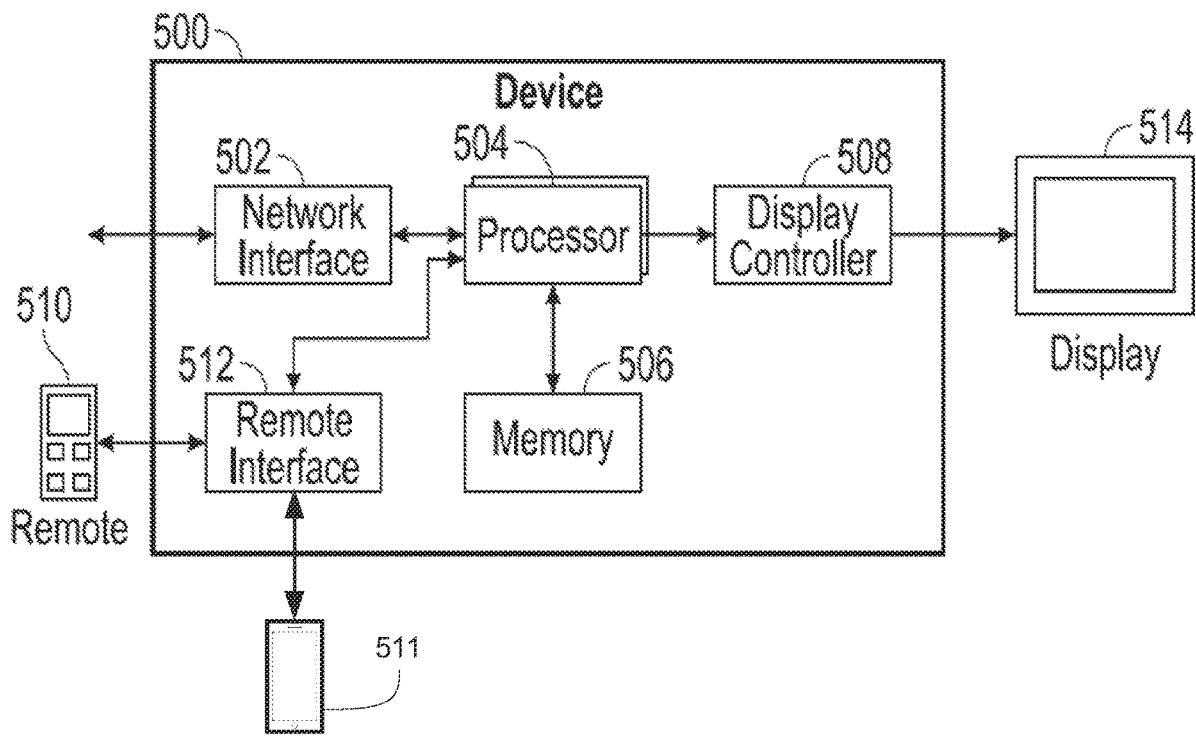
FIGS. 5A-5B illustrate block diagrams of exemplary architectures for devices according to some embodiments of the disclosure.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., method 700).

In some embodiments, display controller 508 causes the various user interfaces of the disclosure to be displayed on display 514. Further, input to device 500 is optionally provided by remote 510 via remote interface 512, which is optionally a wireless or a wired connection. In some embodiments, input to device 500 is provided by a multifunction device 511 (e.g., a smartphone) on which a remote control application is running that configures the multifunction device to simulate remote control functionality, as will be described in more detail below. In some embodiments, multifunction device 511 corresponds to one or more of device 100 in FIGS. 1A and 2, and device 300 in FIG. 3. It is understood that the embodiment of FIG. 5A is not meant to limit the features of the device of the disclosure, and that other components to facilitate other features described in the disclosure are optionally included in the architecture of FIG. 5A as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 514 optionally corresponds to one or more of touch-sensitive display system 112 in FIGS. 1A and 2, and display 340 in FIG. 3.

Figure 5B:
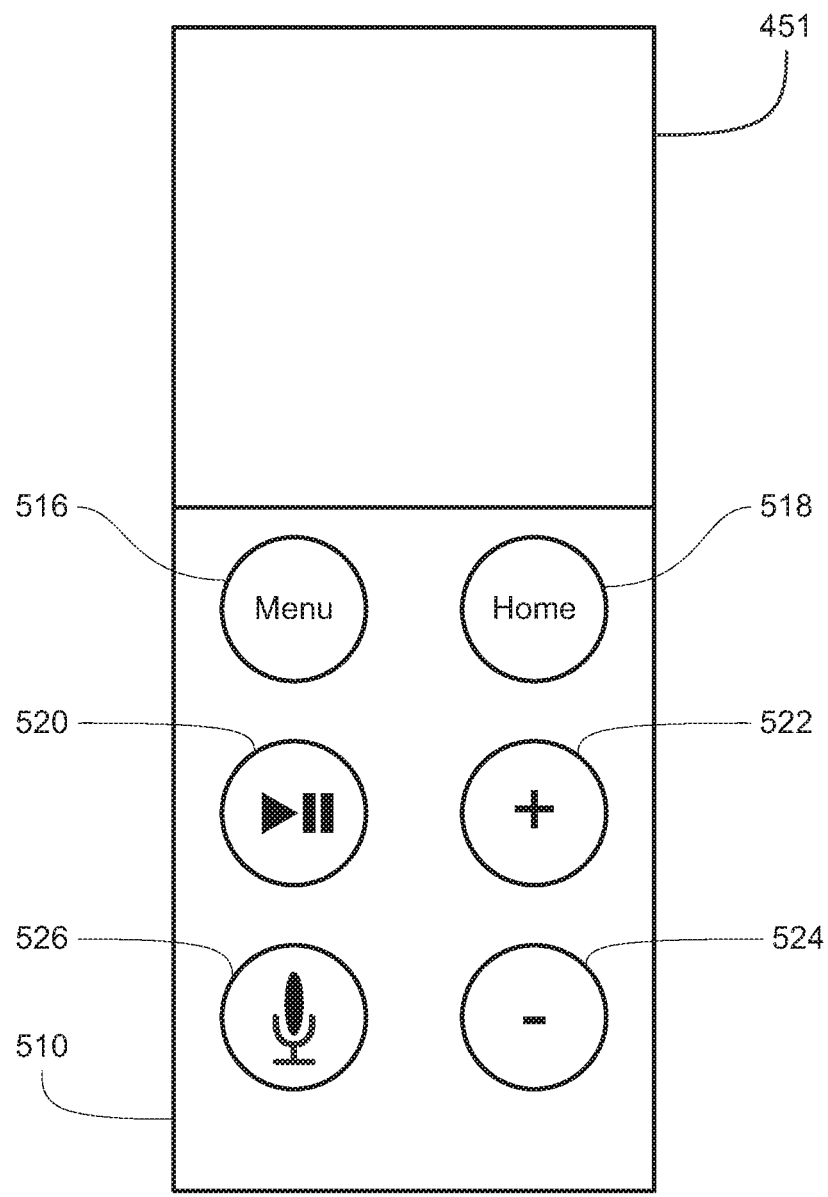

FIG. 5B illustrates an exemplary structure for remote 510 according to some embodiments of the disclosure. In some embodiments, remote 510 optionally corresponds to one or more of multifunction device 100 in FIGS. 1A and 2 and device 300 in FIG. 3. Remote 510 optionally includes touch-sensitive surface 451. In some embodiments, touch-sensitive surface 451 is edge-to-edge (e.g., it extends to the edges of remote 510, such that little or no surface of remote 510 exists between the touch-sensitive surface 451 and one or more edges of remote 510, as illustrated in FIG. 5B). Touch-sensitive surface 451 is optionally able to sense contacts as well as contact intensities (e.g., clicks of touch-sensitive surface 451), as previously described in this disclosure. Further, touch-sensitive surface 451 optionally includes a mechanical actuator for providing physical button click functionality (e.g., touch-sensitive surface 451 is "clickable" to provide corresponding input to device 500). Remote 510 also optionally includes buttons 516, 518, 520, 522, 524 and 526. Buttons 516, 518, 520, 522, 524 and 526 are optionally mechanical buttons or mechanical button alternatives that are able to sense contact with, or depression of, such buttons to initiate corresponding action(s) on, for example, device 500. In some embodiments, selection of "menu" button 516 by a user navigates device 500 backwards in a currently-executing application or currently-displayed user interface (e.g., back to a user interface that was displayed previous to the currently-displayed user interface), or navigates device 500 to a one-higher-level user interface than the currently-displayed user interface. In some embodiments, selection of "home" button 518 by a user navigates device 500 to a main, home, or root user interface from any user interface that is displayed on device 500 (e.g., to a home screen of device 500 that optionally includes one or more applications accessible on device 500). In some embodiments, selection of "play/pause" button 520 by a user toggles between playing and pausing a currently-playing content item on device 500 (e.g., if a content item is playing on device 500 when "play/pause" button 520 is selected, the content item is optionally paused, and if a content item is paused on device 500 when "play/pause" button 520 is selected, the content item is optionally played). In some embodiments, selection of "+" 522 or "−" 524 buttons by a user increases or decreases, respectively, the volume of audio reproduced by device 500 (e.g., the volume of a content item currently-playing on device 500). In some embodiments, selection of "audio input" button 526 by a user allows the user to provide audio input (e.g., voice input) to device 500, optionally, to a voice assistant on the device. In some embodiments, remote 510 includes a microphone via which the user provides audio input to device 500 upon selection of "audio input" button 526. In some embodiments, remote 510 includes one or more accelerometers for detecting information about the motion of the remote.

User Interfaces and Associated Processes

Unified Media Browsing Interface

Users interact with electronic devices in many different manners, including interacting with media (e.g., music, movies, etc.) that may be available (e.g., stored or otherwise accessible) on the electronic devices (e.g. as described with reference to FIGS. 6A-6LL, FIGS. 8A-8GG, FIGS. 10A-10Z, FIGS. 12A-12V and/or FIGS. 18A-18J). For example, a user may browse and play media that is accessible on the electronic device. In some circumstances, such media is available via different media applications that are installed on the electronic device. For example, a first media application on the electronic device optionally provides access to media from a first media provider, and a second media application on the electronic device optionally provides access to media from a second media provider. However, in some circumstances, the user must browse media from each media application (and, thus, provider) separately—the user may desire to, instead, browse the media from the different media applications in a unified media browsing user interface. The embodiments described below provide ways in which an electronic device presents suggested media items (e.g., movies, television shows, etc.) from different media applications to a user in a unified media browsing application, thereby enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 6A-6LL illustrate exemplary ways in which an electronic device presents suggested media items (e.g., movies, television shows, etc.) to a user in a unified media browsing application in accordance with some embodiments of the disclosure. The embodiments in these figures are used to illustrate the processes described below, including the processes described with reference to FIGS. 7A-7L.

Figure 6A:
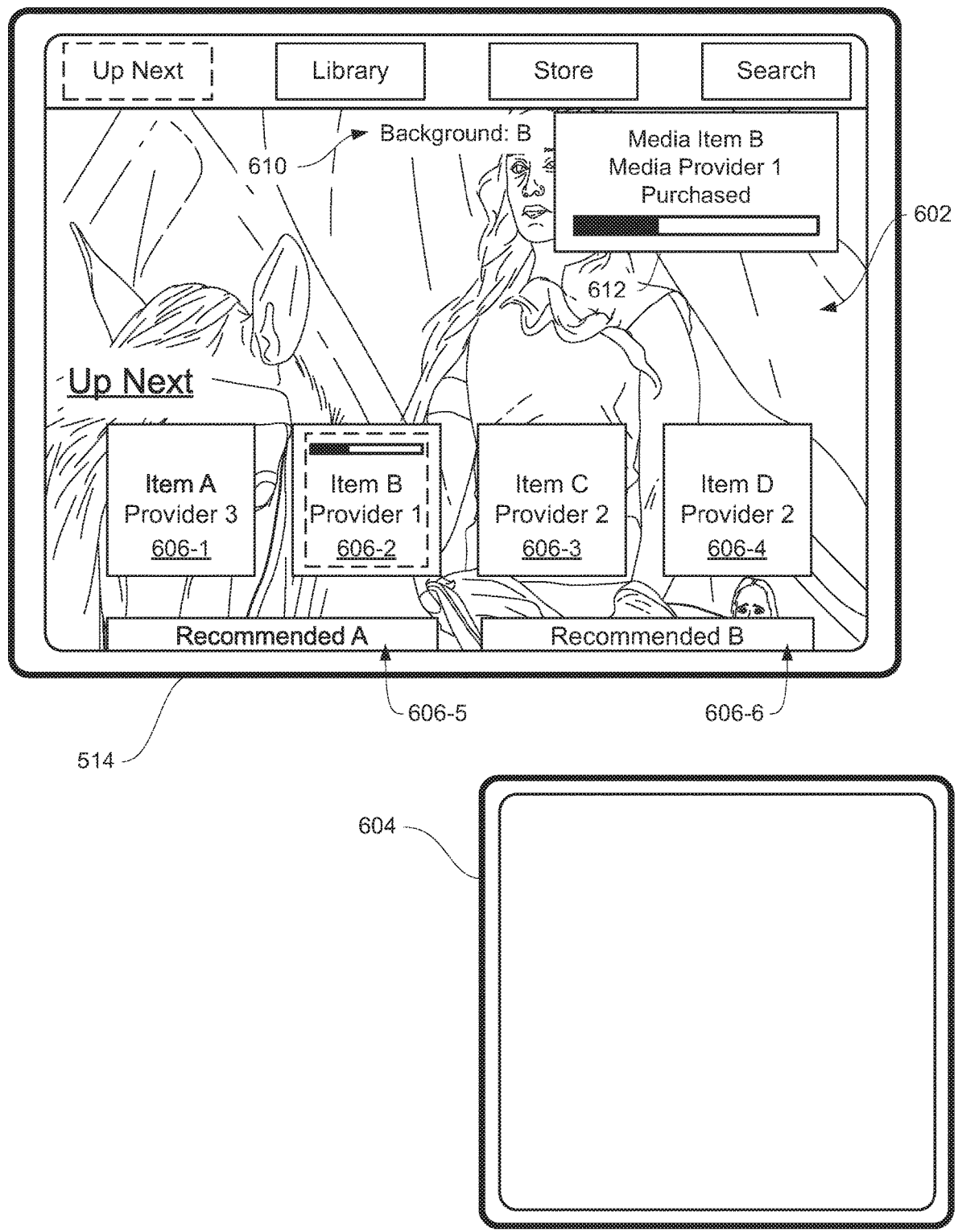
FIGS. 6A-6LL illustrate exemplary ways in which an electronic device presents suggested media items (e.g., movies, television shows, etc.) to a user in a unified media browsing application in accordance with some embodiments of the disclosure.

FIG. 6A illustrates exemplary display 514. Display 514 optionally displays one or more user interfaces that include various content. In the example illustrated in FIG. 6A, display 514 displays a unified media browsing application running on an electronic device (e.g., electronic device 500 of FIG. 5A) of which display 514 is a part, or to which display 514 is connected. The electronic device optionally has access to various media items (e.g., movies, television shows, songs, etc.) via various media applications installed on the electronic device, which provide the electronic device with access to media from corresponding media providers (e.g., a first application corresponding to a first media provider provides the electronic device with access to media from the first media provider, a second application corresponding to a second media provider provides the electronic device with access to media from a second media provider, etc.). The unified media browsing application is optionally an application that acts as a centralized media navigation application that displays representations of media items available from the various media applications installed on the electronic device to facilitate easy browsing and viewing of those media items by the user of the electronic device.

In FIG. 6A, the unified media browsing application displays unified media browsing user interface 602, which includes a top menu bar that includes an "up next" element, a "library" element, a "store" element and a "search" element. Selection of different elements in the top menu bar optionally causes the unified media browsing application to display a user interface corresponding to the selected menu element. In FIG. 6A, the "up next" menu element is selected, as indicated by the dashed-line boundary. As such, the unified media browsing application is displaying user interface 602, as described here. In some embodiments, the electronic device hides the top menu bar after (e.g., a predetermined time after) a menu item is selected. Additional details of the other menu elements in the top menu bar will be described with reference to FIGS. 8A-8GG, below.

In FIG. 6A, user interface includes representations 606-1 to 606-6 of media items available from different media providers (e.g., representation 606-1 of media item A available from media provider 3, representation 606-2 of media item B available from media provider 1, etc.). Representations 606 include information that identifies the media items to which they correspond (e.g., "Item A") and the media provider via which they are available (e.g., "Provider 3"). The media items displayed in FIG. 6A are optionally media items suggested by the electronic device for the user of the electronic device, and are determined by the electronic device to be suggested media items for various reasons, such as prior user actions associated with the media items and/or prior media viewing activity of the user. For example, the user may have partially watched some media items to cause them to be included in user interface 602, the user may have favorited some media items to cause them to be included in user interface 602, the user may have watched previous episodes in a television series such that the current/next episode is included in user interface 602, etc. Representations 606-5 and 606-6 optionally correspond to media that a third party (e.g., a media provider) has recommended for the user of the electronic device. In FIG. 6A, representations 606-5 and 606-6 are partially displayed in user interface 602.

Representations 606 are overlaid over a background that includes representative content from the media item that corresponds to the representation 606 that currently has focus in user interface 602. Specifically, in FIG. 6A, representation 606-2, which corresponds to media item B, currently has focus in user interface 602 (indicated by the dashed-line box within representations 606-2). As such, representations 606 are overlaid over a background that includes representative content from media item B (indicated in FIG. 6A by 610). The representative content is optionally a still image (e.g., pre-selected cover art associated with media item B, a still image from the current play position in media item B, etc.) and/or a video (e.g., a video preview of media item B, a video loop of the current play position in media item B, etc.) that corresponds to media item B. The background in FIG. 6A also includes information 612 corresponding to media item B, because representation 606-2, which corresponds to media item B, has the current focus. Information 612 includes an indication of the title of media item B, an indication of the media provider via which media item B is available (media provider 1), an indication of why media item B is included as a suggested media item in user interface 602 (media item B was purchased by the user) and an indication (a progress bar in FIG. 6A) of how much of media item B the electronic device has already played (e.g., how much of media item B the user has already watched), if any. In FIG. 6A, because media item B has been partially watched, representation 606-2 also includes an indication (e.g., a progress bar) of how much of media item B the electronic device has already played. In some embodiments, the progress indication included in a representation is only included in the representation when that representation has the current focus (e.g., if representation 606-2 loses the current focus, the electronic device optionally ceases to display the progress indicator in representation 606-2).

As different representations 606 in user interface 602 get the current focus, the background of user interface 602 changes, accordingly. Moving the current focus indicator within user interface 602 (e.g., from one representation 606 to another) is accomplished via directional inputs detected on a remote control device, such as swipes detected on a touch-sensitive surface of the remote control device. Touch-sensitive surface 604 optionally corresponds to such a remote control device (e.g., touch-sensitive surface 604 is optionally included in a multifunction device that is configured to simulate dedicated remote control functionality in controlling electronic device 500, or touch-sensitive surface 604 is optionally included in a dedicated remote control device that controls electronic device 500). The device in which touch-sensitive surface 604 is included optionally corresponds to one or more of device 100 in FIG. 1A, device 100 in FIG. 2, device 300 in FIG. 3 and devices 510 and 511 in FIG. 5A.

Figure 6B:
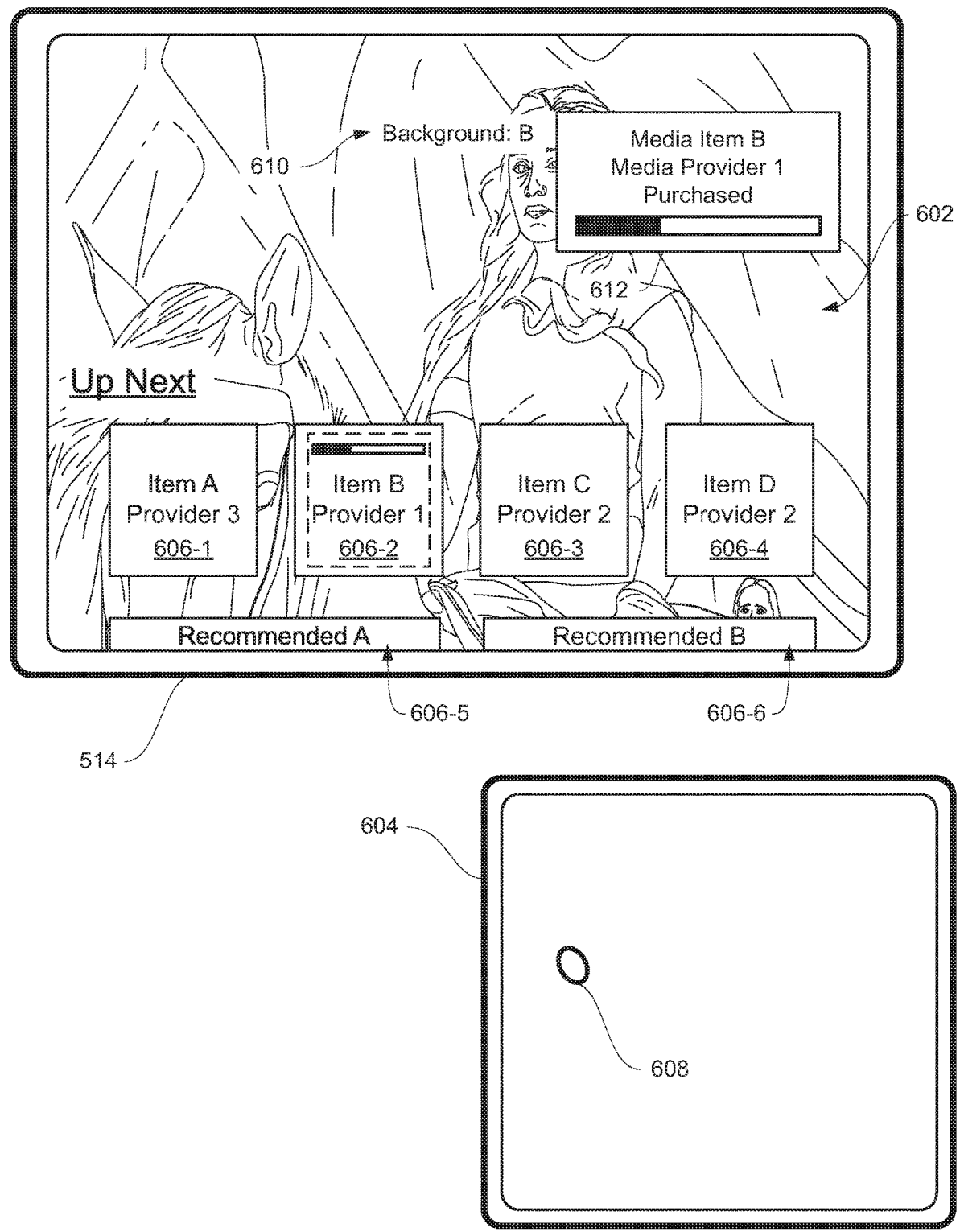
Figure 6C:
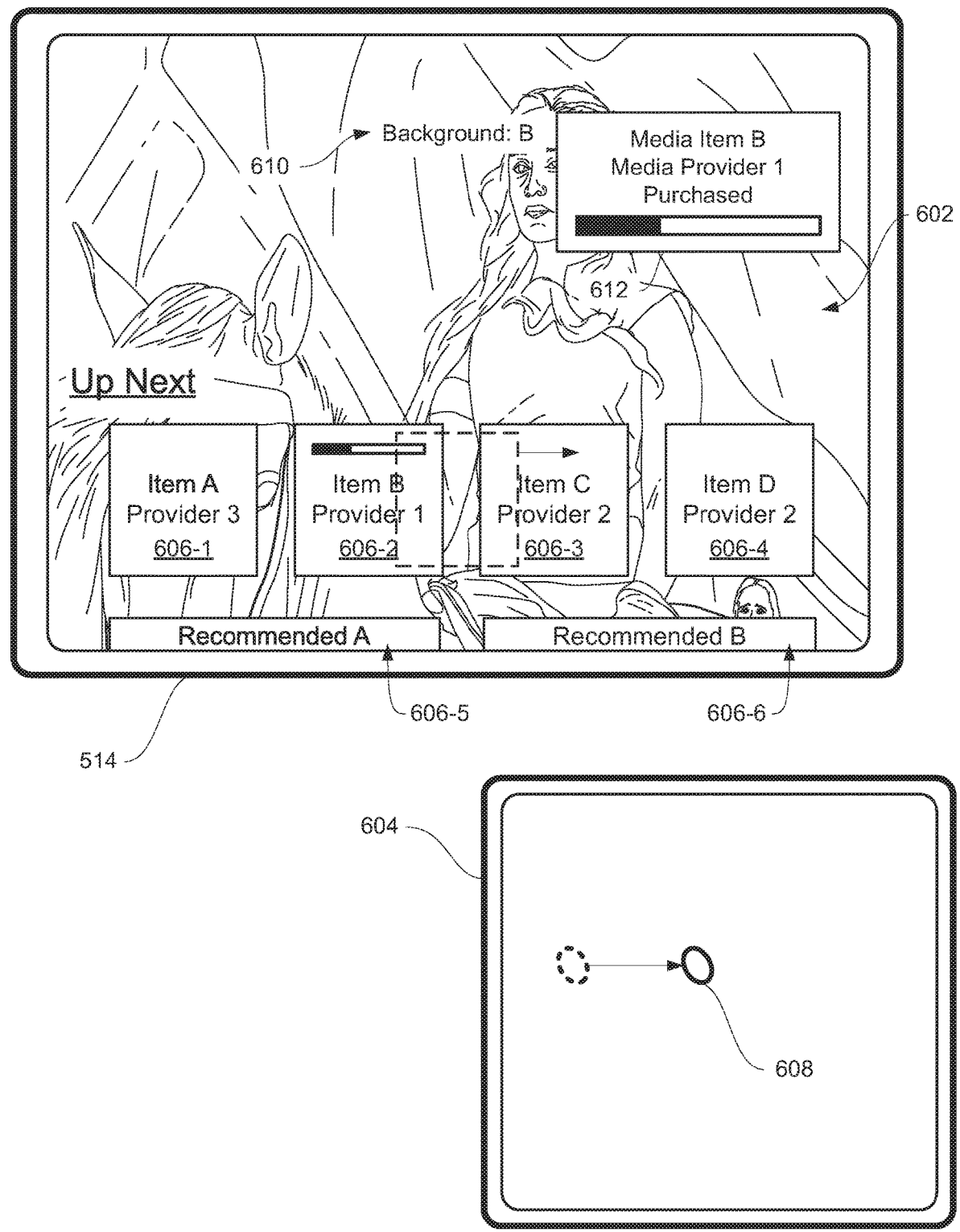
Figure 6D:
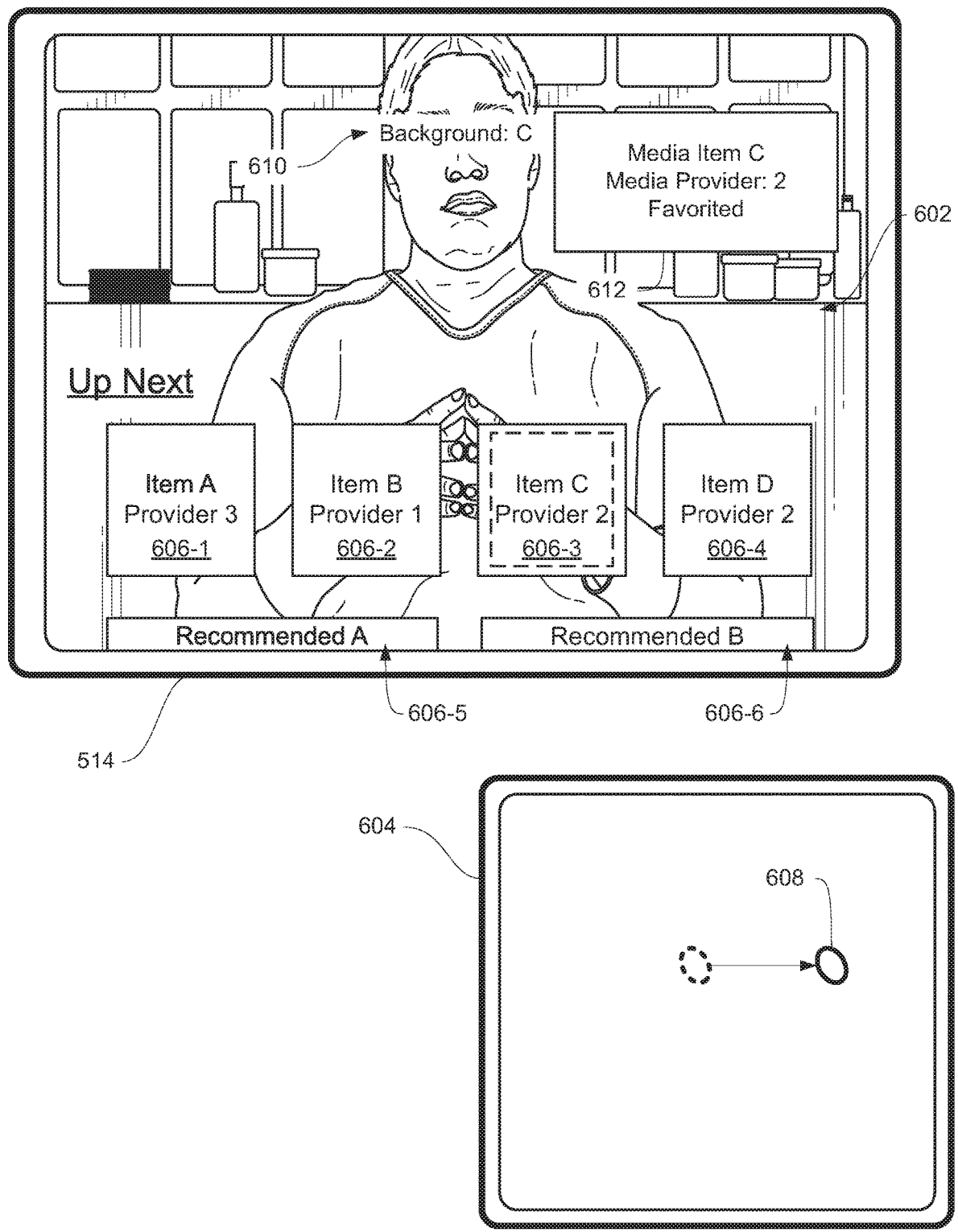

In FIGS. 6B-6D, a left-to-right swipe of contact 608 has been detected on touch-sensitive surface 604. In response, the electronic device moves the current focus from representation 606-2 to representation 606-3, which corresponds to media item C from media provider 2, as shown in FIG. 6D. Accordingly, the electronic device replaces the background of user interface 602 with representative content from media item C, and updates information 612 to correspond to media item C (e.g., to include the title of media item C, an indication of media provider 2, and an indication that media item C is a suggested media item, because the user of the electronic device favorited media item C). Information 612 does not include an indication of how much of media item C the user has already watched, because the user has not started watching media item C (e.g., the electronic device has not started playback of media item C).

Figure 6E:
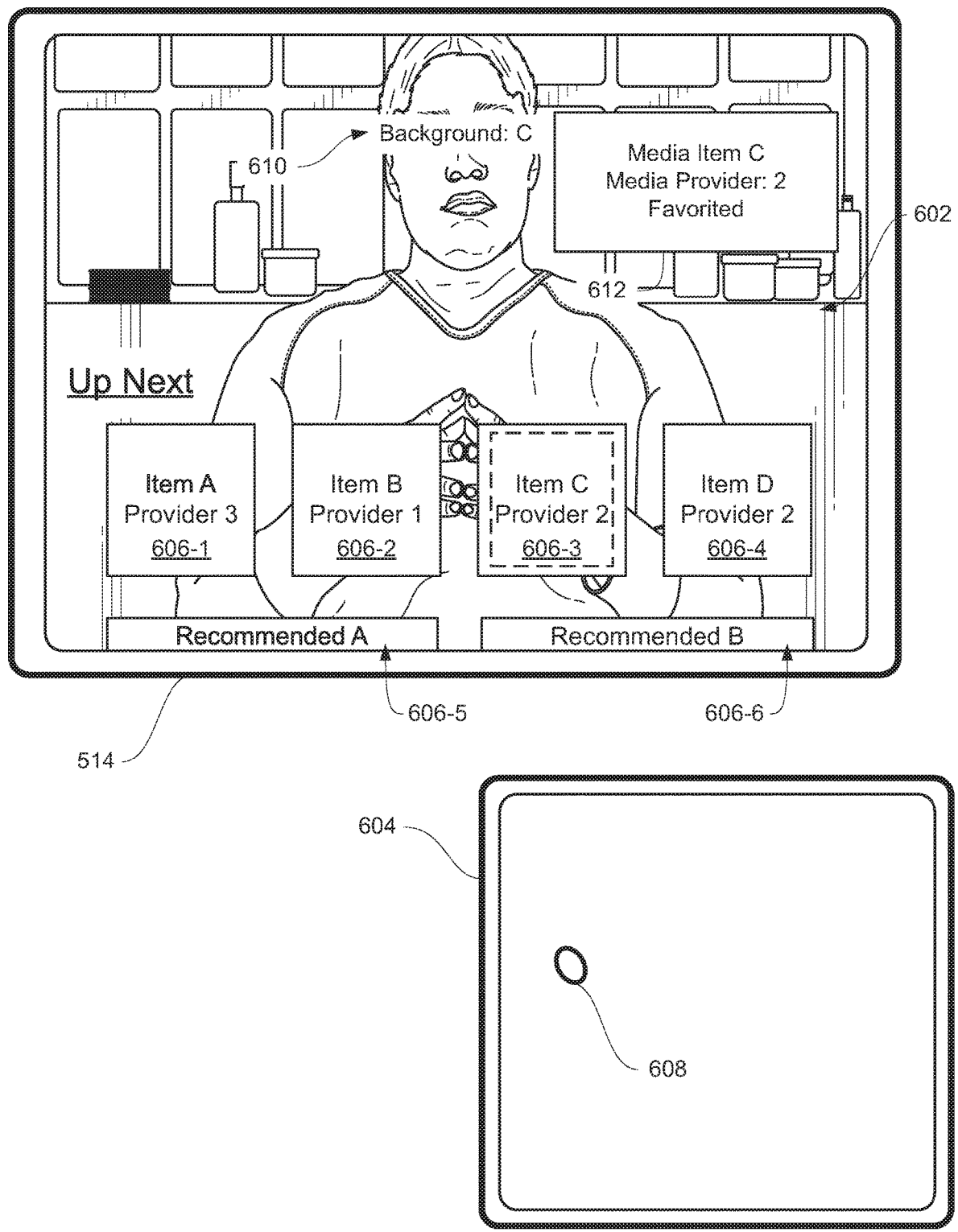
Figure 6F:
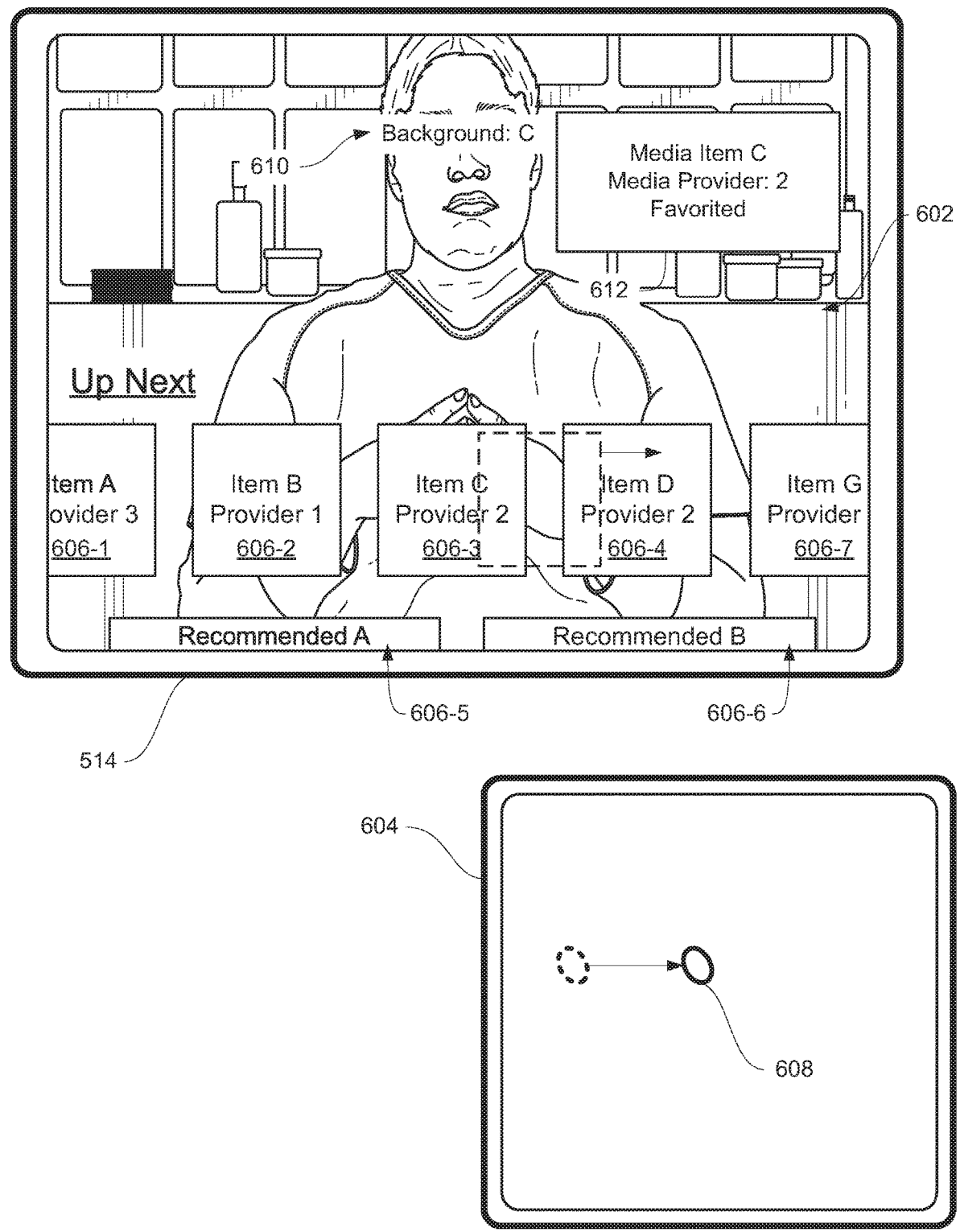
Figure 6G:
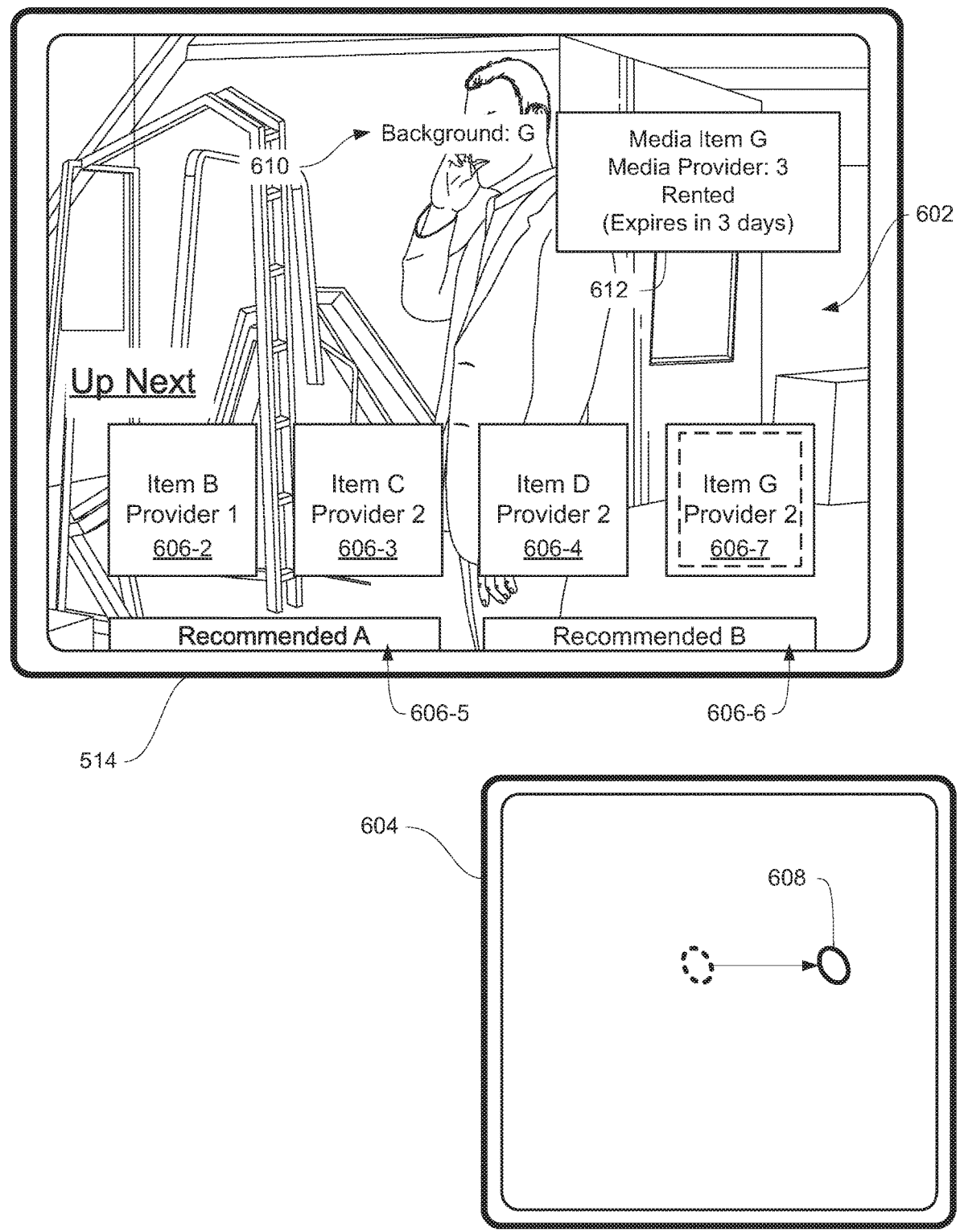

In FIGS. 6E-6G, a further left-to-right swipe of contact 608 has been detected on touch-sensitive surface 604. In response, the electronic device similarly moves the current focus from representation 606-3 to representation 606-7, which corresponds to media item G from media provider 3, as shown in FIG. 6G. Accordingly, the electronic device similarly replaces the background of user interface 602 with representative content from media item G, and updates information 612 to correspond to media item G (e.g., to include the title of media item G, an indication of media provider 3, an indication that media item G is a suggested media item, because the user of the electronic device rented media item G, and an indication of when the user's access to media item G expires). In FIGS. 6E-6G, the swipe of contact 608 caused the electronic device to scroll past the last representation 606-4 that was displayed in user interface 602. As a result, the electronic device has scrolled into user interface 602 representation 606-7, and has scrolled out of user interface representation 606-1. As such, FIGS. 6E-6G illustrated the horizontal scrolling characteristics of the rows of representations 606 in user interface 602.

Figure 6H:
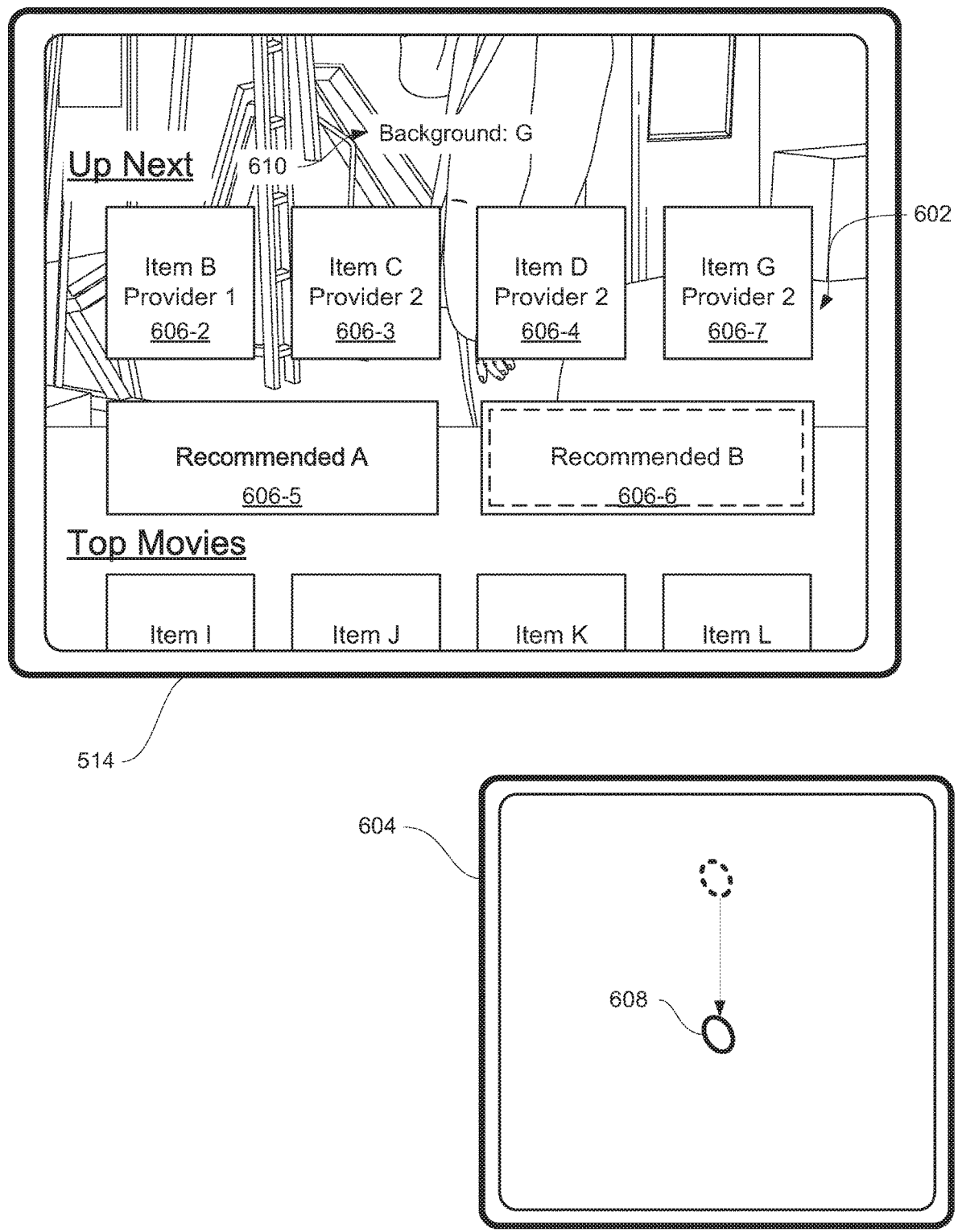

In FIG. 6H, a top-to-bottom swipe of contact 608 has been detected on touch-sensitive surface 604 such that the current focus is navigated past the bottom edge of user interface 602. In response, the electronic device scrolls through user interface 602 to fully reveal, in user interface 602, representations 606-5 and 606-6 of recommended media items, and partially reveal further representations of trending media items (e.g., top movies, in FIG. 6H). As a result of the top-to-bottom swipe of contact 608 on touch-sensitive surface 604 in FIG. 6H, the electronic device moves the current focus from representation 606-7 to representation 606-6, as shown in FIG. 6H. Additionally, in response to the top-to-bottom swipe of contact 608, the background of user interface 602 that corresponds to one of representations 606-2, 606-3, 606-4 and 606-7 scrolls up and out of user interface 602 in accordance with the amount of downward scrolling that the swipe achieves. As further top-to-bottom swipes cause further downward scrolling in user interface 602, the background of the user interface moves further up and out of user interface 602. In some embodiments, as the background of user interface 602 moves further up, it becomes more and more blurred and/or transparent.

Figure 6I:
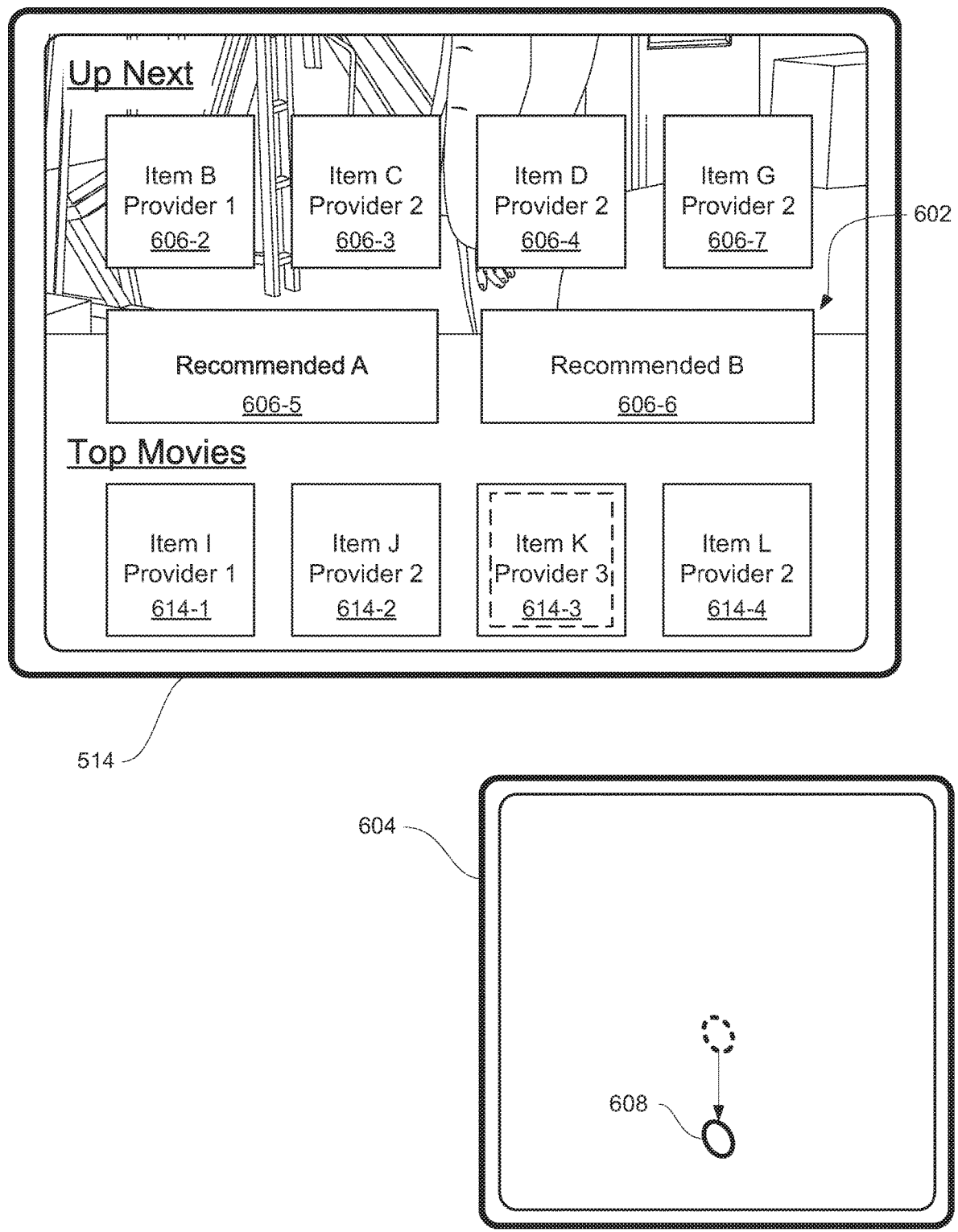

In FIG. 6I, a further top-to-bottom swipe of contact 608 has been detected on touch-sensitive surface 604 such that the current focus is again navigated past the bottom edge of user interface 602. In response, the electronic device scrolls through user interface 602 to fully reveal, in user interface 602, representations 614-1 to 614-4 of trending media items (e.g., top movies, in FIG. 6I). As a result of the top-to-bottom swipe of contact 608 on touch-sensitive surface 604 in FIG. 6I, the electronic device moves the current focus from representation 606-6 to representation 614-3, corresponding to media item K from content provider 3, as shown in FIG. 6H, and additionally further moves the background of the user interface 602 up and out of display. Representations 614 include indications of the titles of the trending media items (e.g., Item I, Item J, etc.) and indications of the media providers from which the trending media items are provided (e.g., Media Provider 1, Media Provider 2, etc.). The trending media items are optionally different than the suggested media items that were originally displayed in user interface 602 before the touch input for scrolling past the edge of user interface 602 was detected (e.g., as described with reference to FIG. 6A), in that the trending media items are media items not selected for inclusion in user interface 602 based on the viewing activity of the user of the electronic device. For example, the trending media items are media items that are popular with other viewers, or media items that are otherwise selected by a third party (e.g., selected by a media provider for inclusion in user interface 602 to promote the media item).

Figure 6J:
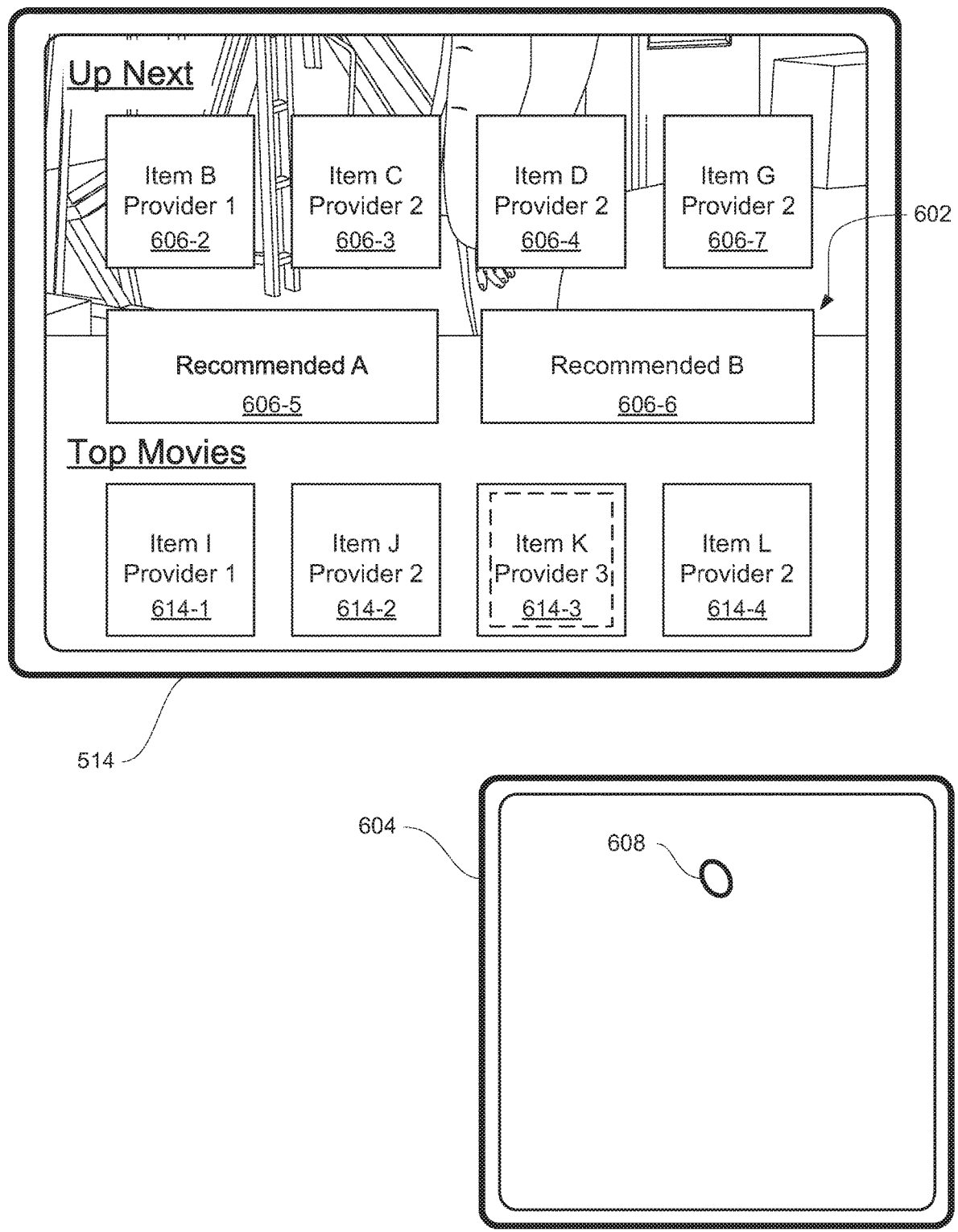
Figure 6K:
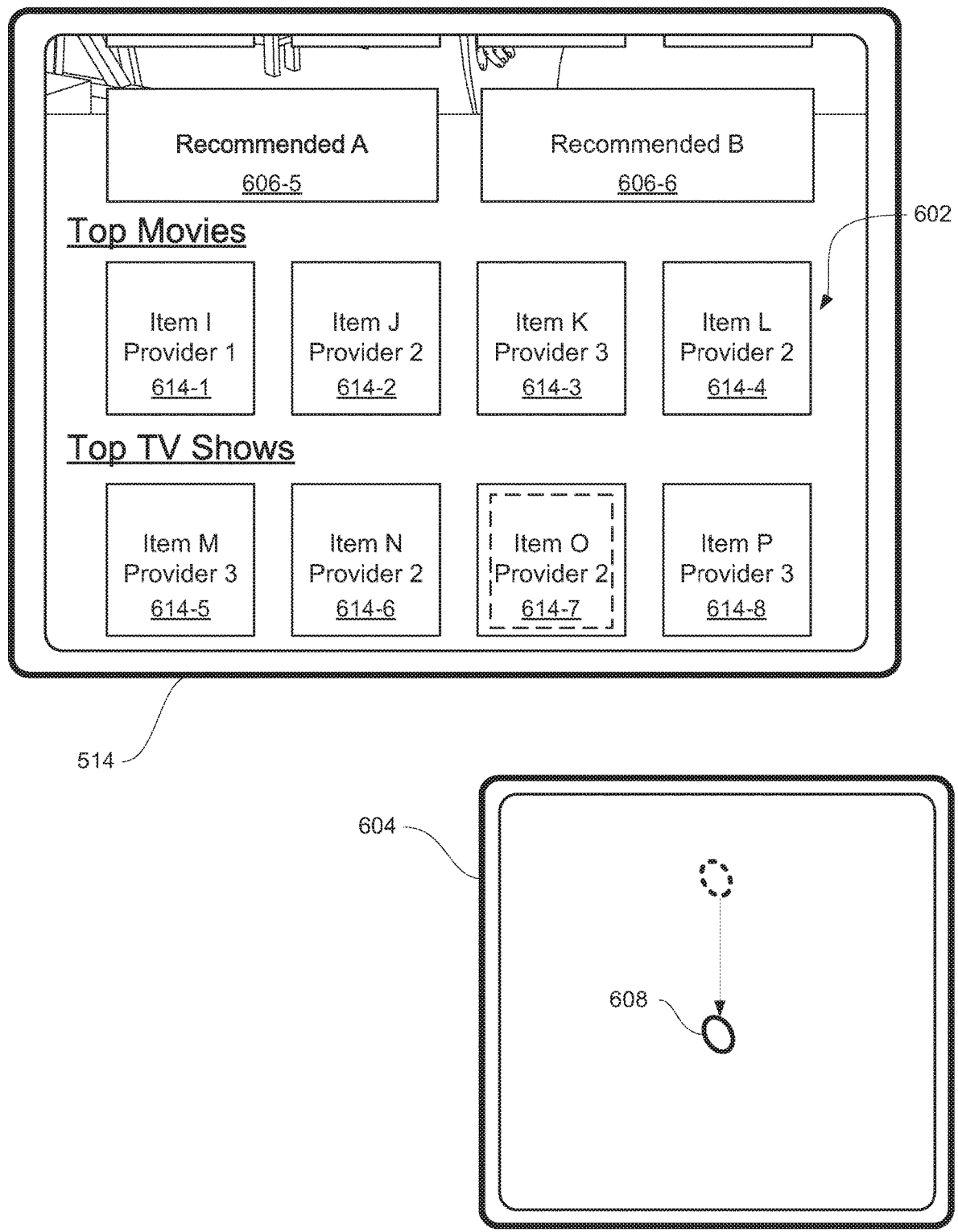

In FIGS. 6J-6K, a further top-to-bottom swipe of contact 608 has been detected on touch-sensitive surface 604 such that the current focus is again navigated past the bottom edge of user interface 602, and the electronic device further scrolls through user interface 602 to reveal, in user interface 602, further representations 614-5 to 614-8 of trending media items in user interface 602 (e.g., top television shows in FIG. 6K). Additionally, the electronic device moves the current focus from representation 614-3 to representation 614-7, which corresponds to media item O from media provider 2, as shown in FIG. 6K. Additional representations of trending media items are optionally revealed in user interface 602 as further input for scrolling past the bottom edge of user interface 602 is detected at touch-sensitive surface 604.

Figure 6L:
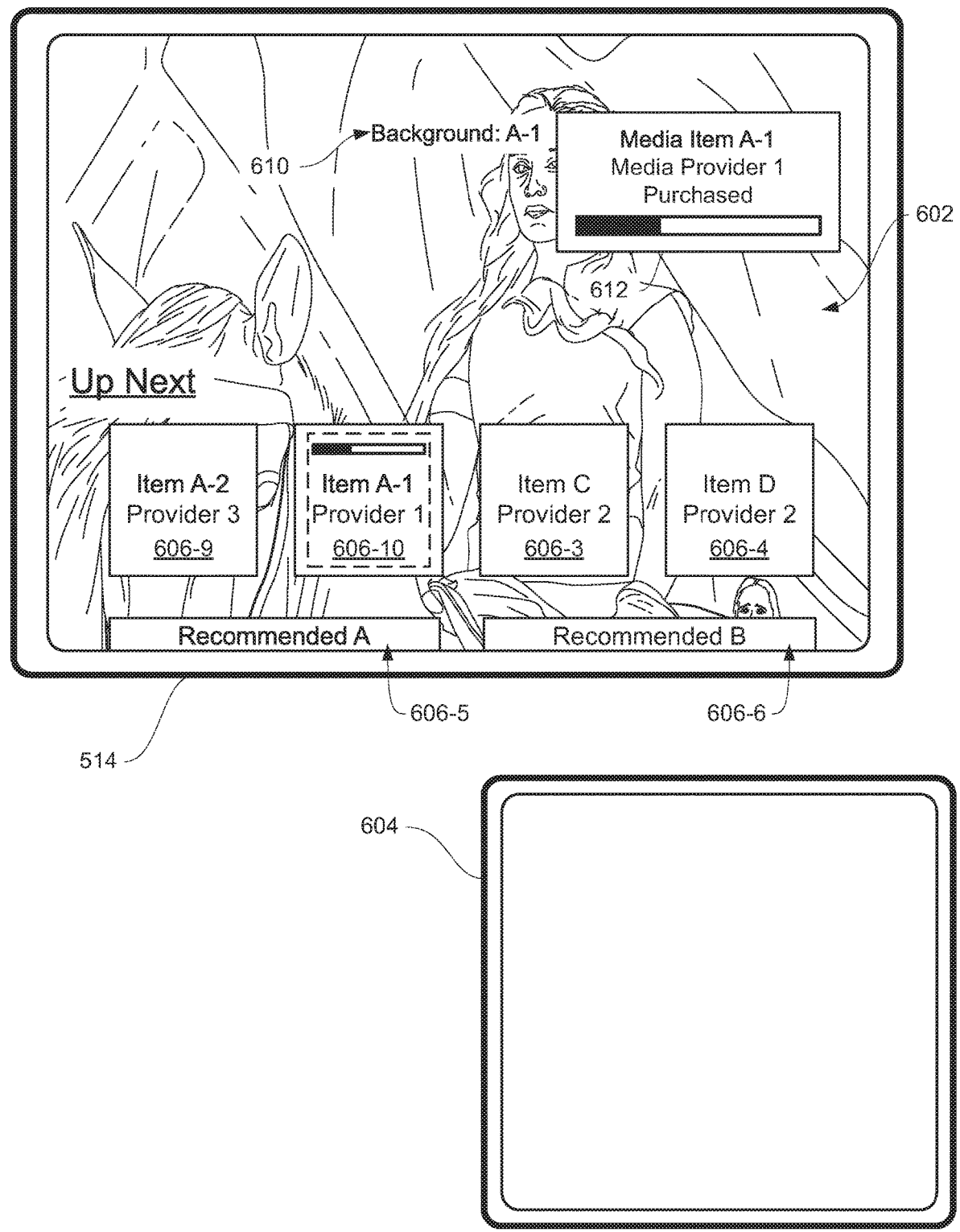
Figure 6M:
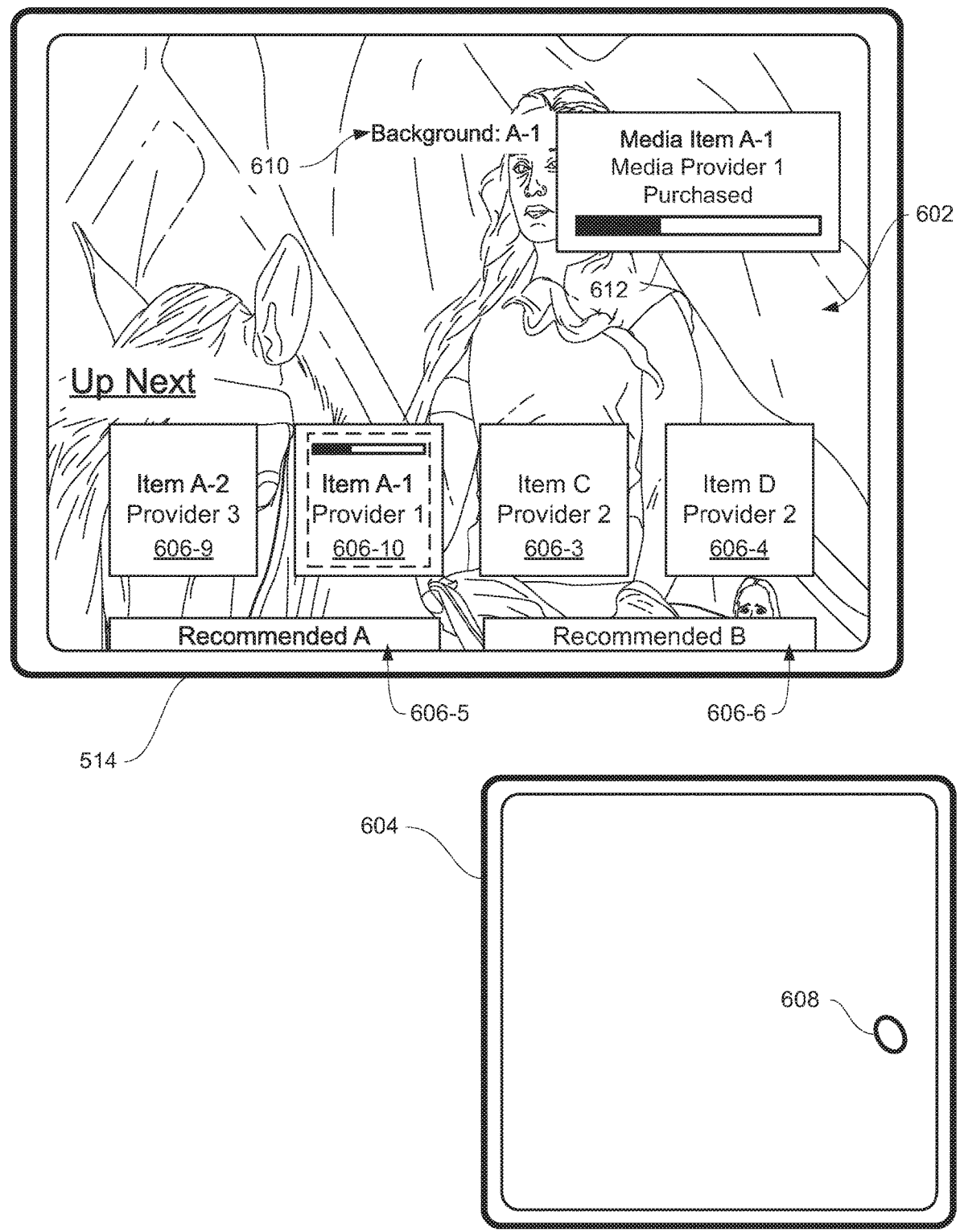
Figure 6N:
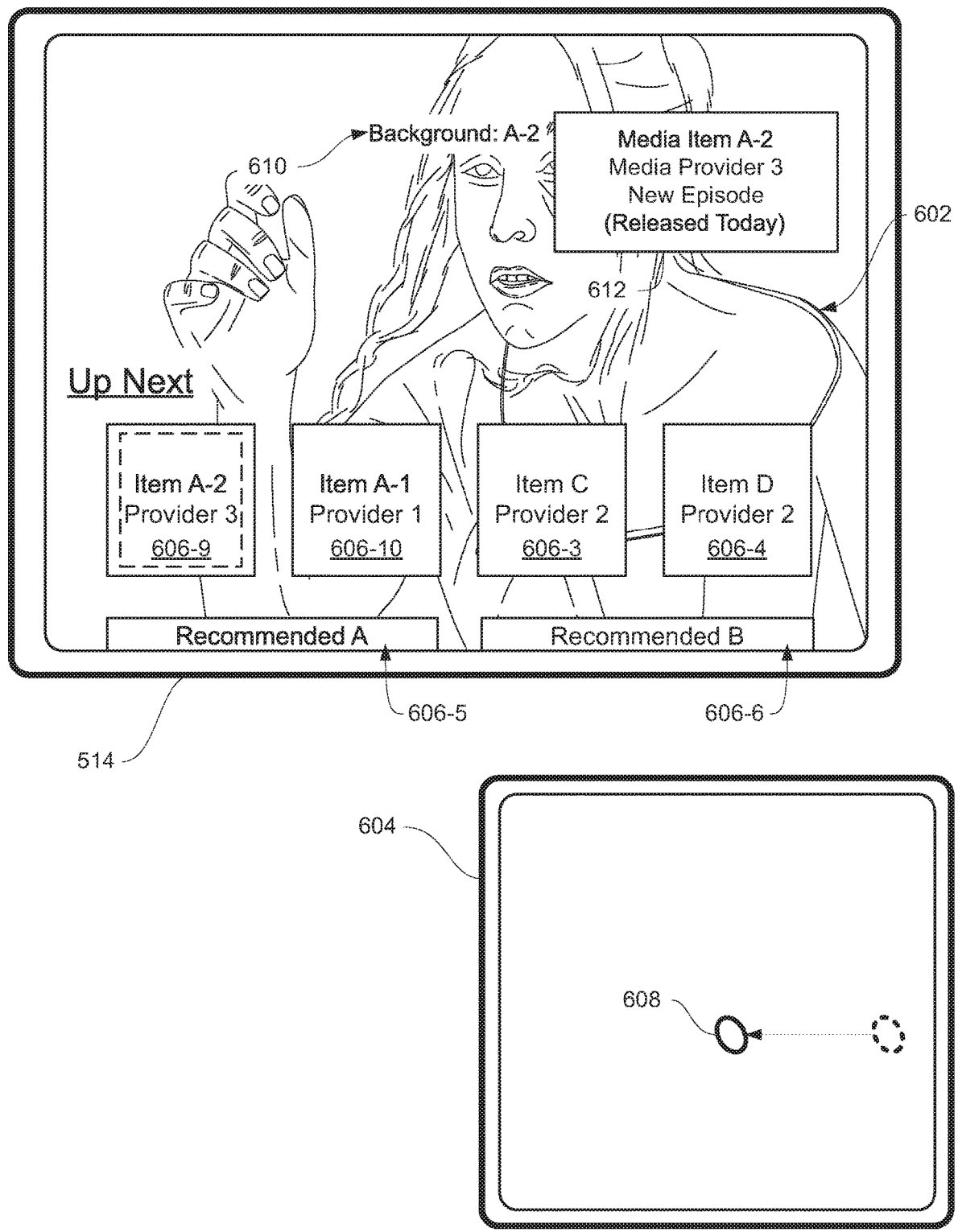

As previously mentioned, media items are optionally presented by the electronic device as suggested media items (e.g., as shown in FIG. 6A) for various reasons (e.g., the user has rented the media items, the user has purchased the media items, the user has partially watched the media items, etc.). In some embodiments, a media item is suggested by the electronic device, because the media item is part of a collection of episodic media (e.g., a television series, a mini-series, or the like) and the user of the electronic device has watched previous media items in the collection of episodic media (e.g., previous episodes in a television series). For example, in FIG. 6L, the electronic device has included, in user interface 602, representation 606-9 of suggested media item A-2, and representation 606-10 of suggested media item A-1. Media item A-1 is optionally a first episode in collection A of episodic media items, and media item A-2 is optionally a second episode in collection A of episodic media items. The user has purchased and partially watched media item A-1, as shown in information 612 in FIG. 6L. As a result of the user having purchased and/or watched (at least partially) media item A-1, the electronic device has suggested media item A-2 to the user, as shown in FIG. 6L. Further, the electronic device has done so, despite that fact that the user watched media item A-1 via media provider 1, and media item A-2 is available via a different media provider 3, not via media provider 1. In FIGS. 6M-6N, a right-to-left swipe of contact 608 has been detected on touch-sensitive surface 604, which has given representation 606-9, corresponding to media item A-2, the current focus.

Figure 6O:
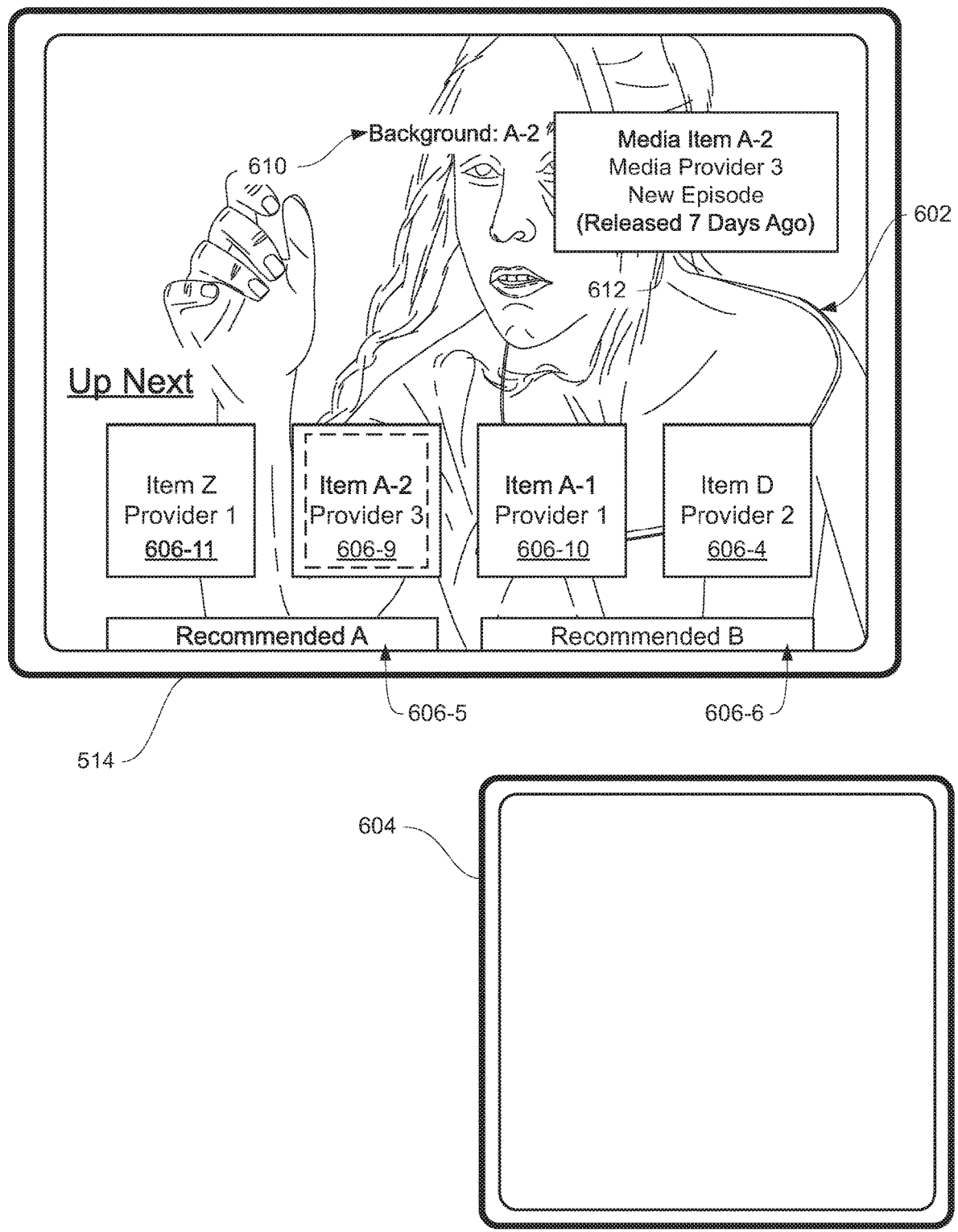

In some embodiments, the electronic device prioritizes the display of suggested media item representations 606 depending on time-related characteristics of those suggested media items. For example, in FIG. 6N, media item A-2 is a new episode of episodic media collection A, the new episode having just been released today (e.g., the user of the electronic device became entitled to view media item A-2 today, because media item A-2 was made available on media provider 3 today). As such, the electronic device has prioritized display of representation 606-9, which corresponds to media item A-2, in representations 606. In particular, the electronic device has placed representation 606-9 at the beginning of the list of suggested media items, as shown in FIG. 6N. As more time passes, the electronic device optionally de-prioritizes display of representation 606-9 in representations 606. For example, in FIG. 6O, seven days have passed since media item A-2 was released or made available to the user of the electronic device. As a result, the electronic device has de-prioritized display of representation 606-9 in representations 606, and has moved representation 606-9 further back in the list of suggested media items. In the meantime, the electronic device has prioritized display of representation 606-11, which corresponds to media item Z, over representation 606-9, because media item Z was optionally more recently added by the electronic device to the listing of suggested media items, for example. It is understood that, for the purposes of this disclosure, a user is entitled to view a media item when the user has a subscription with a media provider that allows the user to view the media item via that media provider or the user has purchased, rented or otherwise has access to a playable copy of the media item (e.g., via personal media server that includes a copy of the media item or a cloud storage account that has a copy of the media item). The user (or electronic device) is additionally or alternatively entitled to view a media item when the electronic device is associated with an account (e.g., logged into the account) that is entitled to play the media item.

Figure 6P:
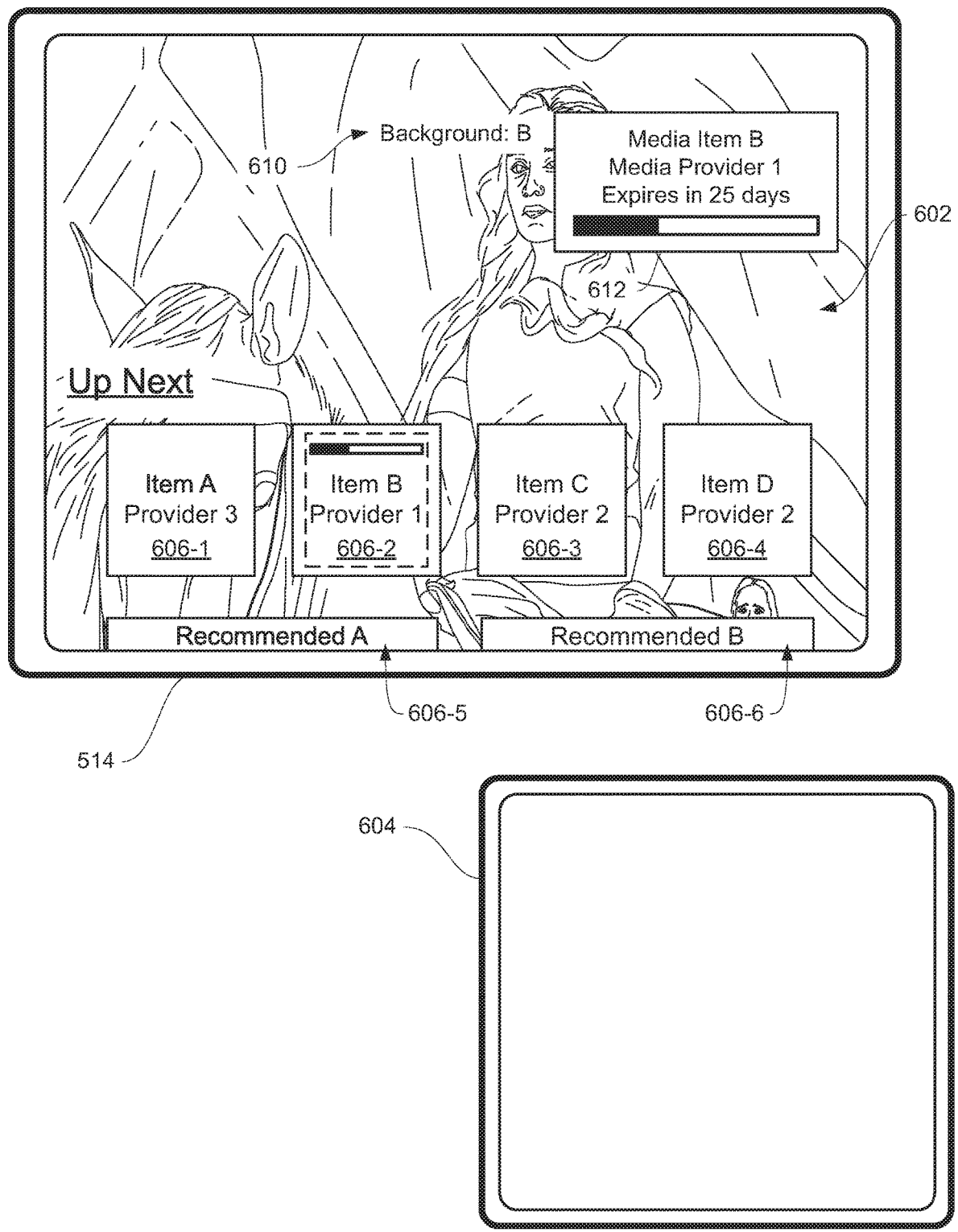
Figure 6Q:
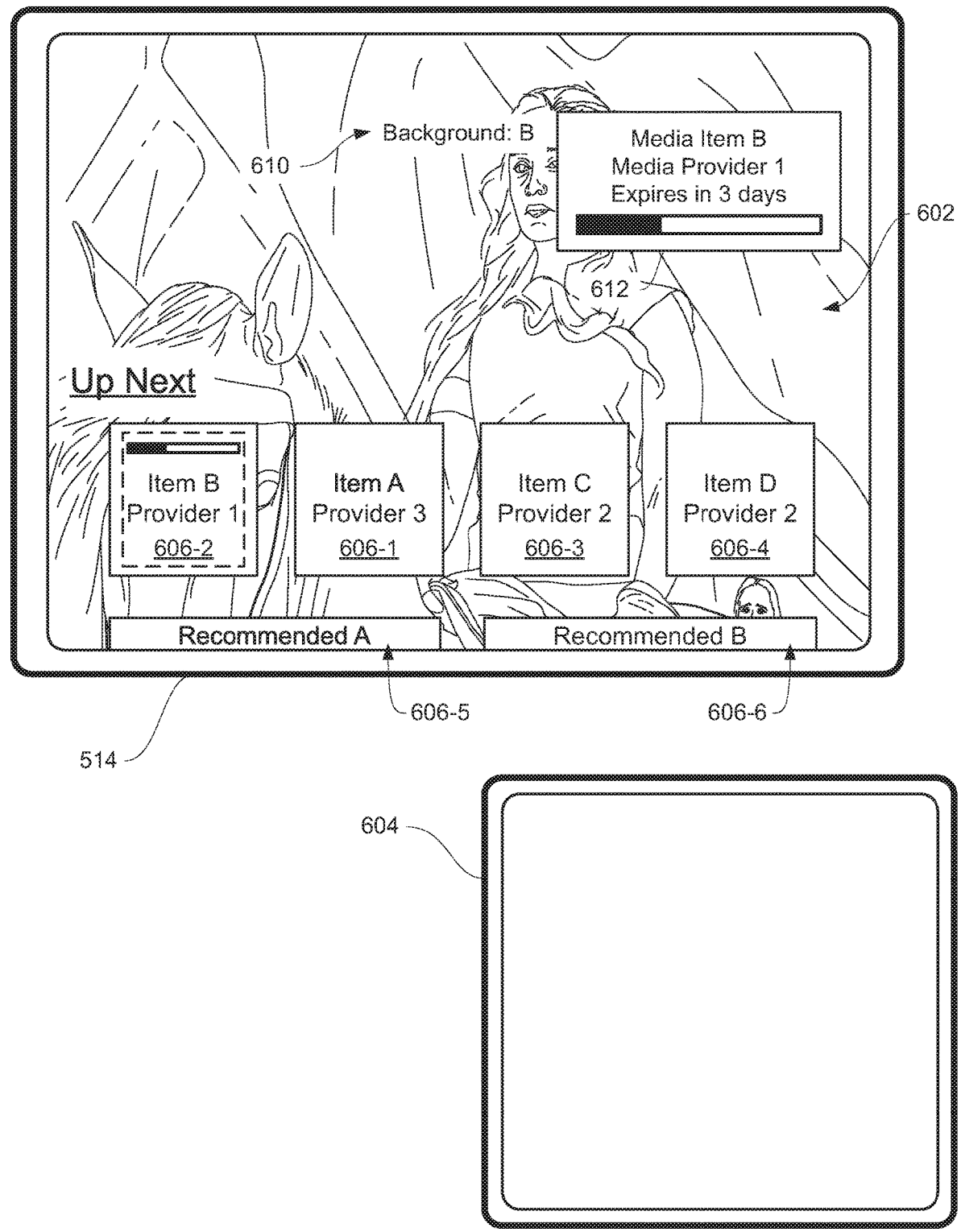

As another example of the electronic device prioritizing the display of suggested media item representations 606 depending on time-related characteristics of those suggested media items, in some embodiments, the electronic device prioritizes display of suggested media items based on how long the user's access to the media items will remain in effect (e.g., because the user has rented the media items with rental expiration dates, because the media providers of the media items will stop providing the media items, etc.). For example, in FIG. 6P, the electronic device has displayed representation 606-2, corresponding to media item B, in the second position in the listing of suggested media items. Additionally, the user's access to media item B expires in 25 days, as shown in information 612. In FIG. 6Q, time has passed, and the user's access to media item B now expires in three days. Because this expiration time is shorter than a time threshold (e.g., five days), the electronic device has prioritized display of representation 606-2 in representations 606, and is displaying representations 606-2 at the front of the listing of suggested media items. As an example scenario, when a user first rents a movie, the movie is prioritized highly within the suggested media representations (e.g., placed at the beginning of the up next queue) and the movie is gradually de-prioritized over time (e.g., moves away from the beginning of the up next queue as other items are added to the up next queue based on user activity with respect to the other items) but when an end of a rental period for the movie is approaching (e.g., the movie rental will expire within 3 days), the prioritization of the movie is increased in the suggested media representations (e.g., the movie is moved to the beginning of the up next queue) to alert the user that the rental period is expiring (e.g., the movie is moved to the beginning of the up next queue without any user activity with respect to the movie). By prioritizing display of representations of certain media items based on time-considerations, the electronic device more effectively conveys media item availability to the user, thus improving the efficiency of conveying such information to the user.

In some embodiments, detection of a selection input (e.g., on touch-sensitive surface 604) while a representation of a suggested media item has focus causes the electronic device to play that suggested media item. For example, in FIG. 6R, a click of touch-sensitive surface 451 of remote 510 (corresponding to touch-sensitive surface 604 in the remaining figures) has been detected while representation 606-2, which corresponds to media item B from media provider 1, has the current focus. In response, the electronic device launches the media application corresponding to media provider 1, and plays media item B in that media application, as shown in FIG. 6S. In some embodiments, when the electronic device switches from the unified media browsing application in FIG. 6R to the media application corresponding to media provider 1 in FIG. 6S, the navigation hierarchy of the media application, not the navigation hierarchy of the unified media browsing application, governs the response of the electronic device to navigation hierarchy-change inputs detected at remote 510. For example, in FIG. 6T, a click of "menu" button 516 of remote 510 has been detected, which corresponds to a backward navigation input within a currently-active navigation hierarchy on the electronic device (e.g., as described with reference to FIG. 5B). In response to the click of "menu" button 516, the electronic device navigates backward within the media application corresponding to media provider 1 (e.g., back to a home menu of the media application), as shown in FIG. 6U, rather than navigating back to the unified media browsing application from which the media application was launched. As such, launching of the media application from the unified media browsing application in the way described is optionally a "deep" link into the media application. In some embodiments, the request to navigate back from the media item playing in the media application produces a different response based on how the user started playing the media item (e.g., if the user started playing the media item by selecting it within the app, then the request to navigate back causes the device to return to a prior screen in the app, but if the user started playing the media item from a content aggregation user interface, then the request to navigate back causes the device to return to the content aggregate user interface).

In contrast to the behavior of the electronic device when a suggested media representation 606 is selected, as described with reference to FIGS. 6R-6S, the electronic device optionally does not immediately start playing a corresponding trending media item when a trending media item representation is similarly selected. For example, in FIG. 6V, representation 614-3, corresponding to trending media item K, has the current focus. In FIG. 6W, a click of touch-sensitive surface 604 is detected while representation 614-3 has the current focus, and in response, rather than starting to play media item K, the electronic device displays a canonical page corresponding to media item K, which includes, for example, information 618 about media item K (e.g., genre, director(s), actor(s), user rating, content rating, length, year of release, description, etc.) and information identifying media provider 3 (via which media item K is available). The canonical page corresponding to media item K also includes button 616, selection of which will cause the electronic device to play media item K in a media application corresponding to media provider 3. The canonical page also includes button 617 to play a trailer/preview of media item K, button 619 to browse and select other media providers via which media item K is available and via which to play media item K, and button 621 to favorite media item K (e.g., thus, causing it be displayed with suggested media item representations 606 in FIG. 6A). Additionally, the canonical page includes selectable representations of media items (e.g., items AA, BB, CC, DD) that are related to media item K (e.g., are of the same genre), and that are selected to navigate to canonical pages of those media items.

In some embodiments, the electronic device displays representations of suggested media items in user interface 602, even though the media applications via which those suggested media items are available are not installed on the electronic device. For example, in FIG. 6Y, the electronic device is displaying, as a suggested media item, representation 606-6, corresponding to media item F. Media item F is available via media provider 3. However, the media application corresponding to media provider 3 is not installed on the electronic device. The electronic device displays representation 606-6 anyway, because displaying this representation allows the user to discover the existence of media item F, and gives the user an opportunity to install the media application to view media item F. In some embodiments, representation 606-6 is included in representations 606 based on prior user action that occurred on a second electronic device, different from the electronic device (e.g., the user partially watched the respective suggested media item on the second electronic device, not on the electronic device). In some embodiments, the user's actions on other devices with respect to media items cause those media items to be displayed in the suggested media items on the current electronic device, because, for example, the suggested media items are associated with a user account of the user that the user is logged into on multiple electronic devices, including the current electronic device and the second electronic device.

Figure 6R:
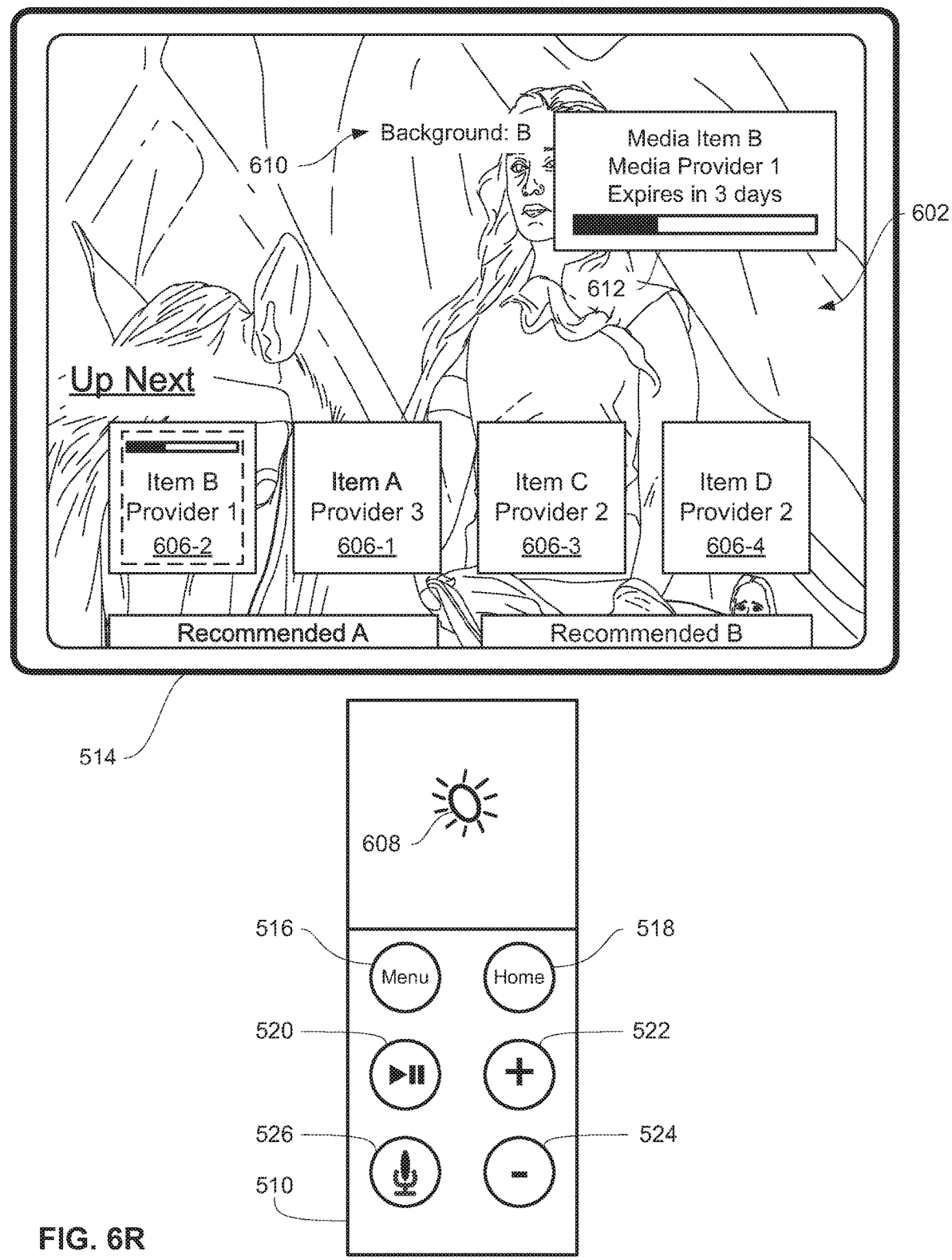
Figure 6S:
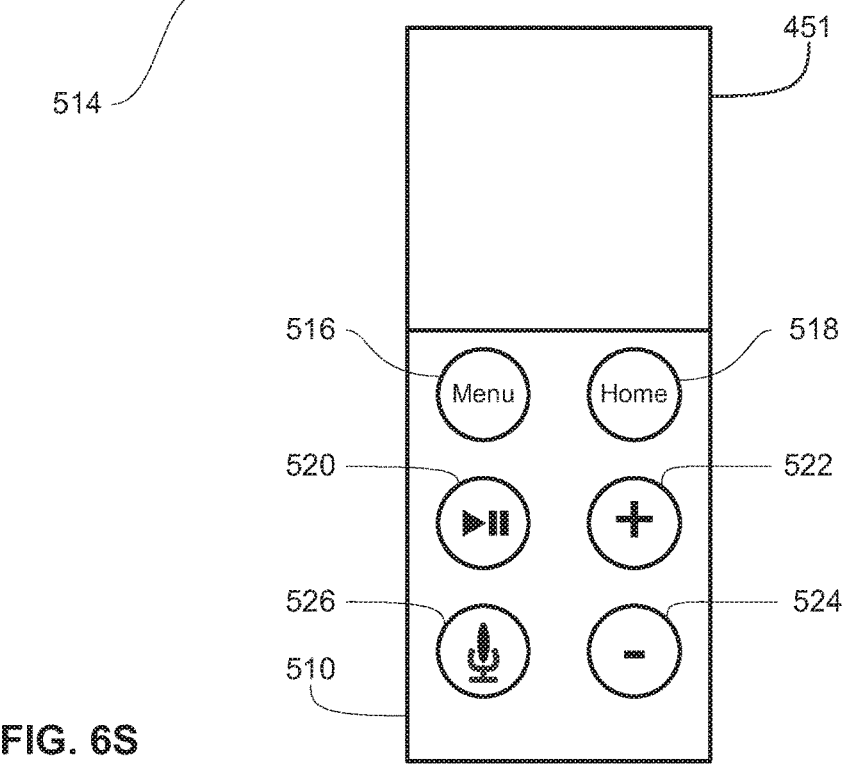
Figure 6T:
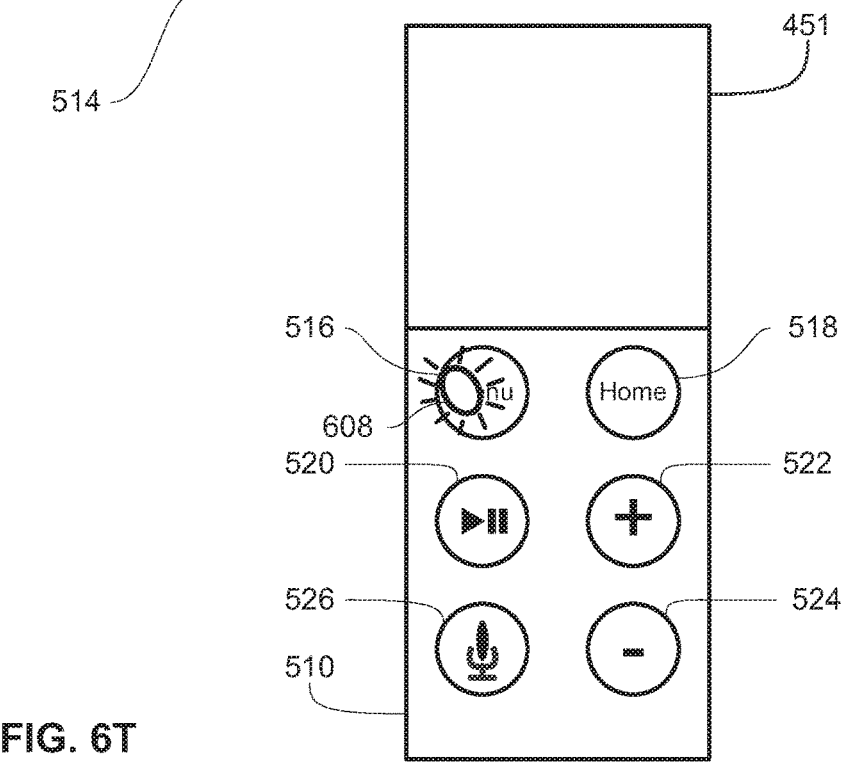
Figure 6U:
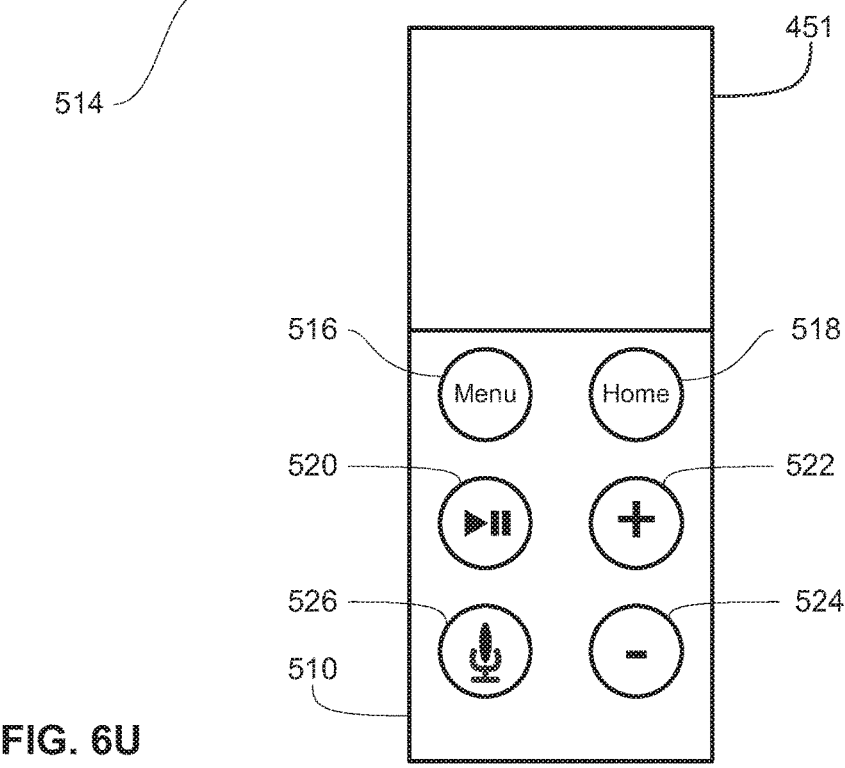
Figure 6V:
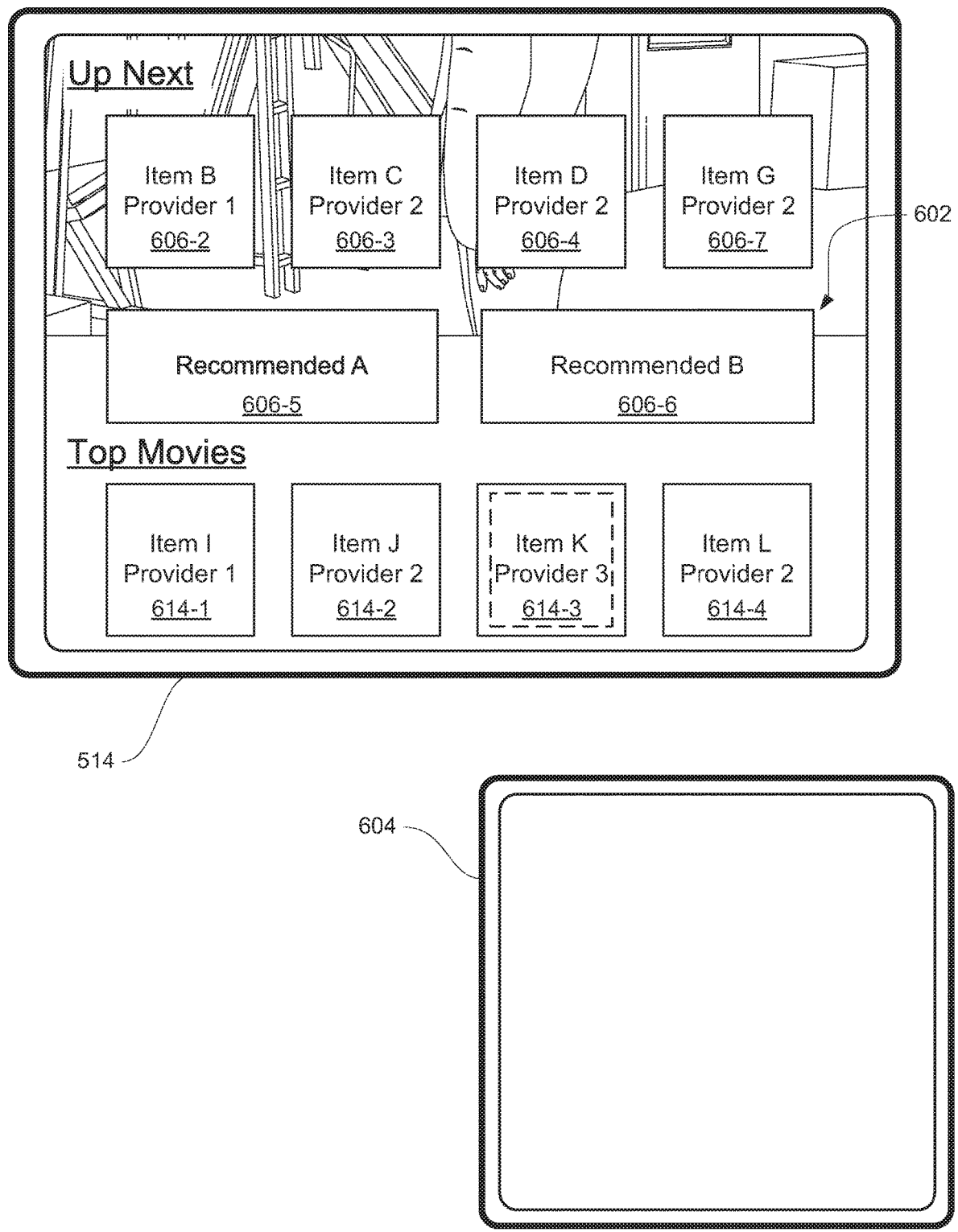
Figure 6W:
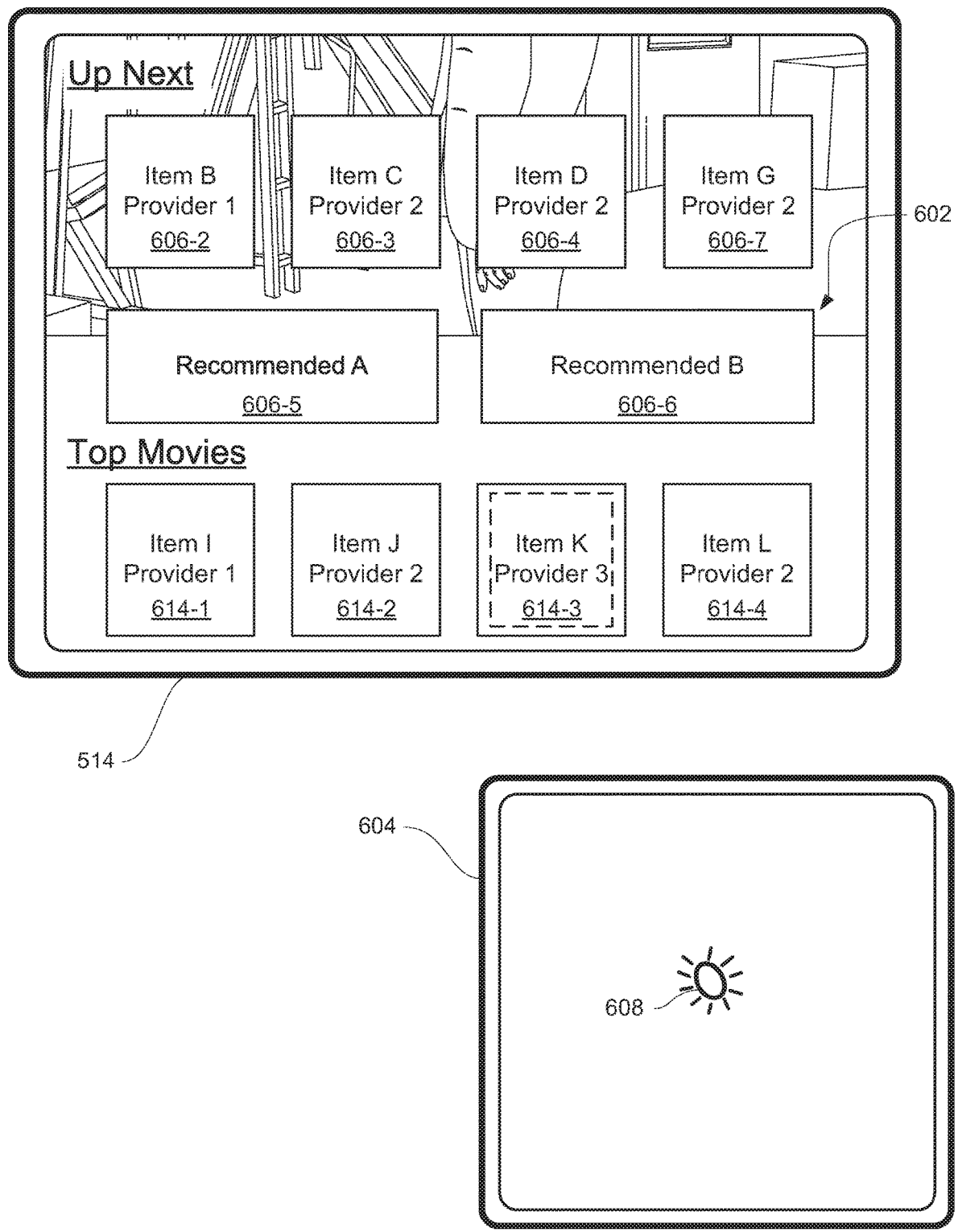
Figure 6X:
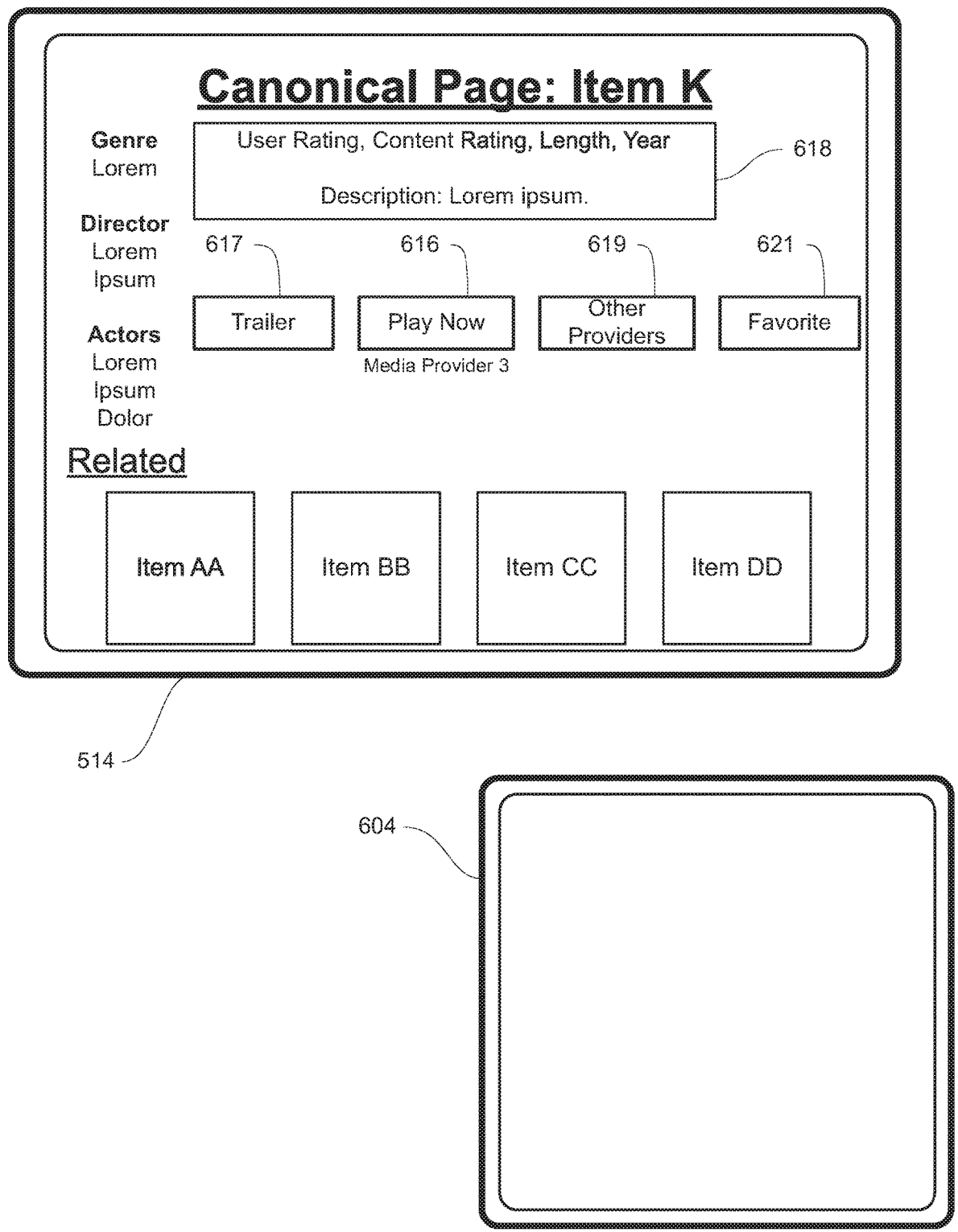
Figure 6Y:
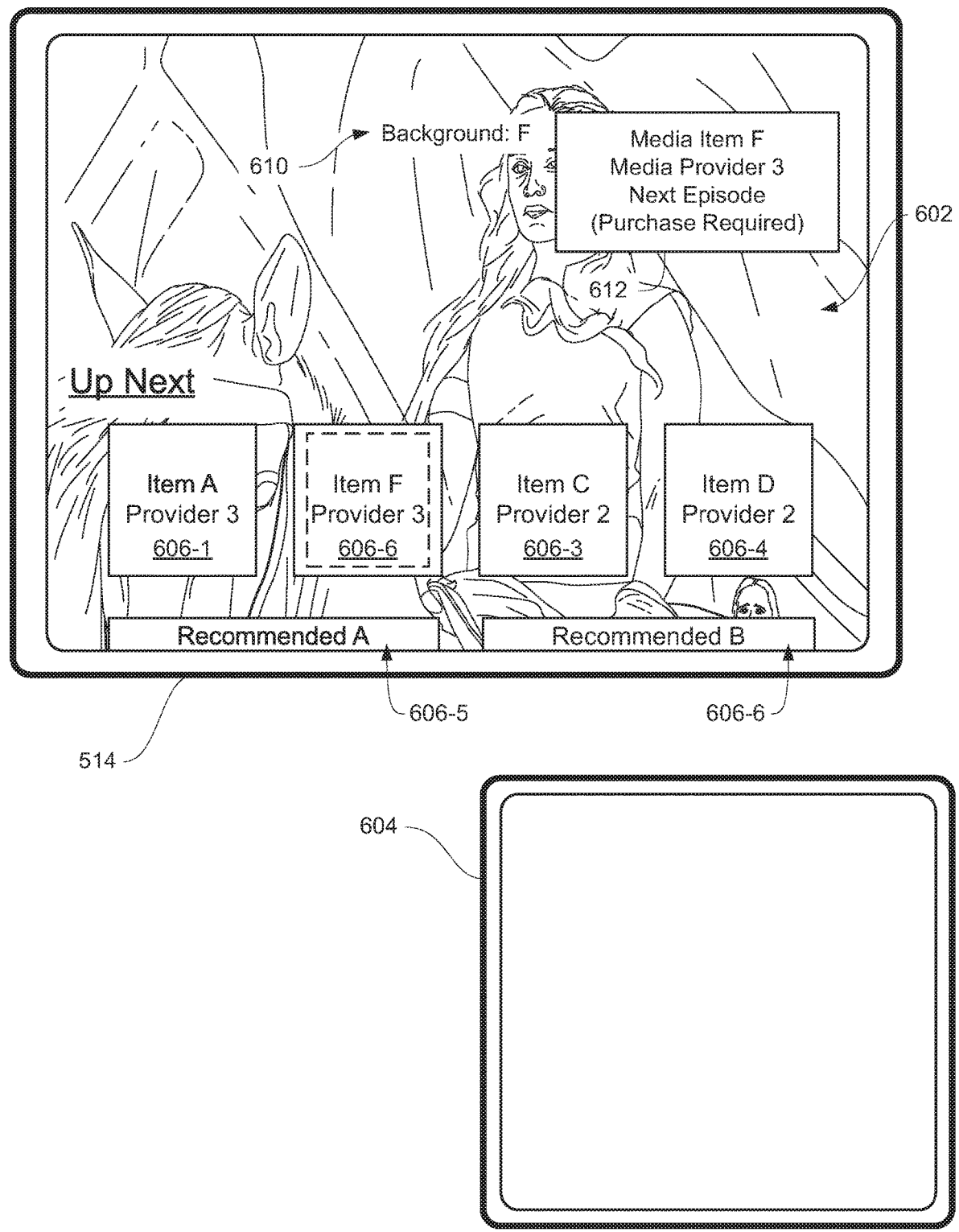
Figure 6Z:
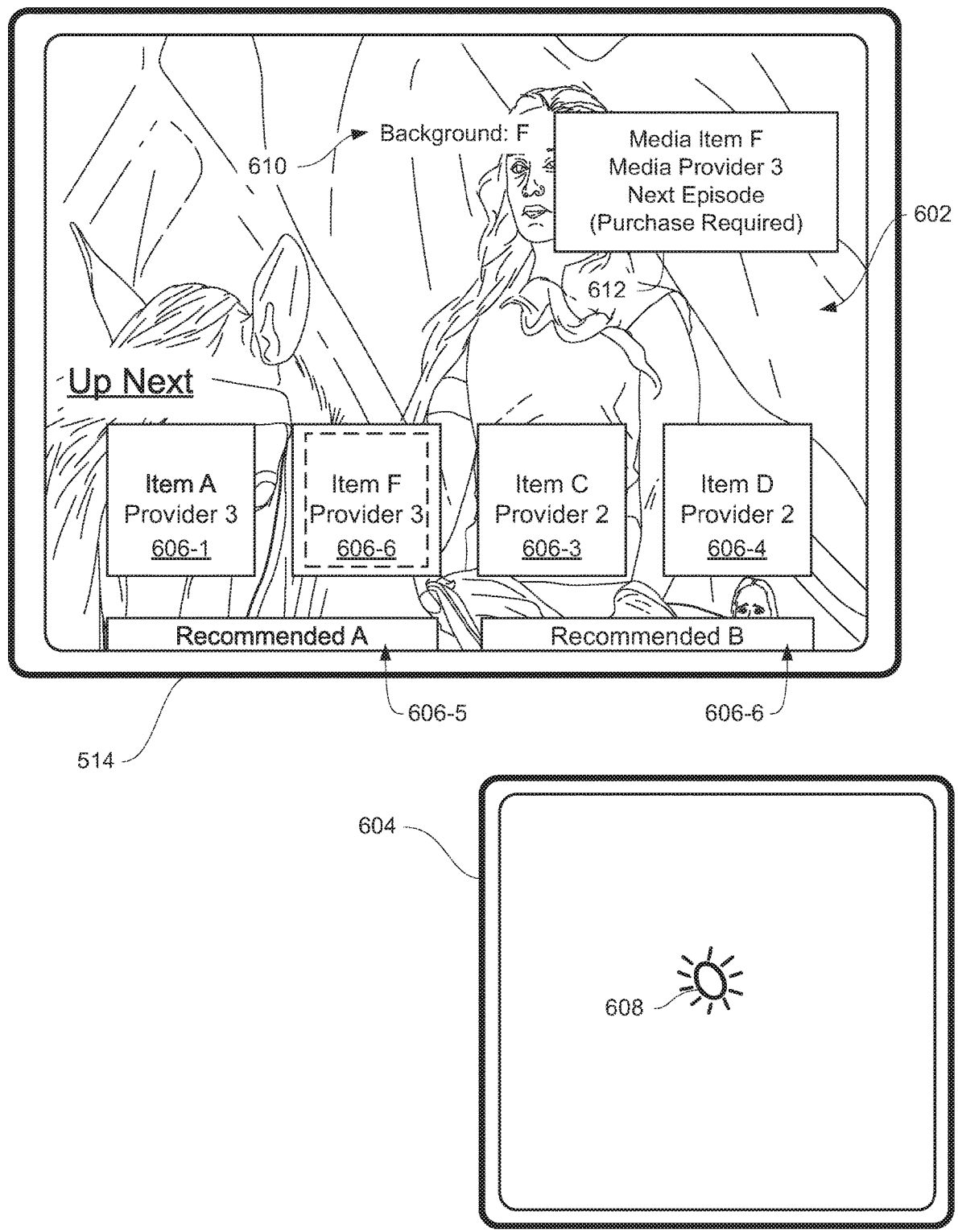
Figure 6A:
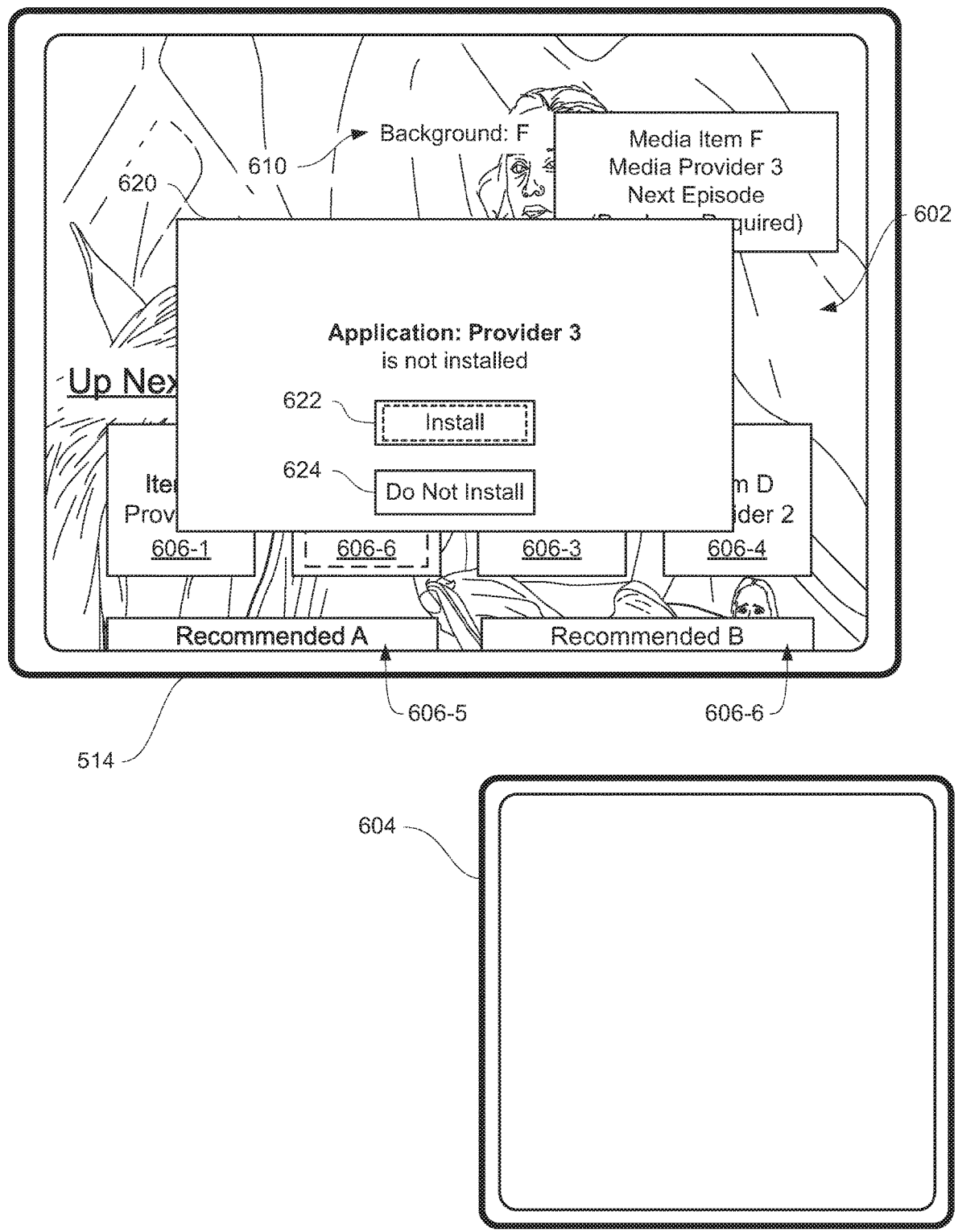
Figure 6B:
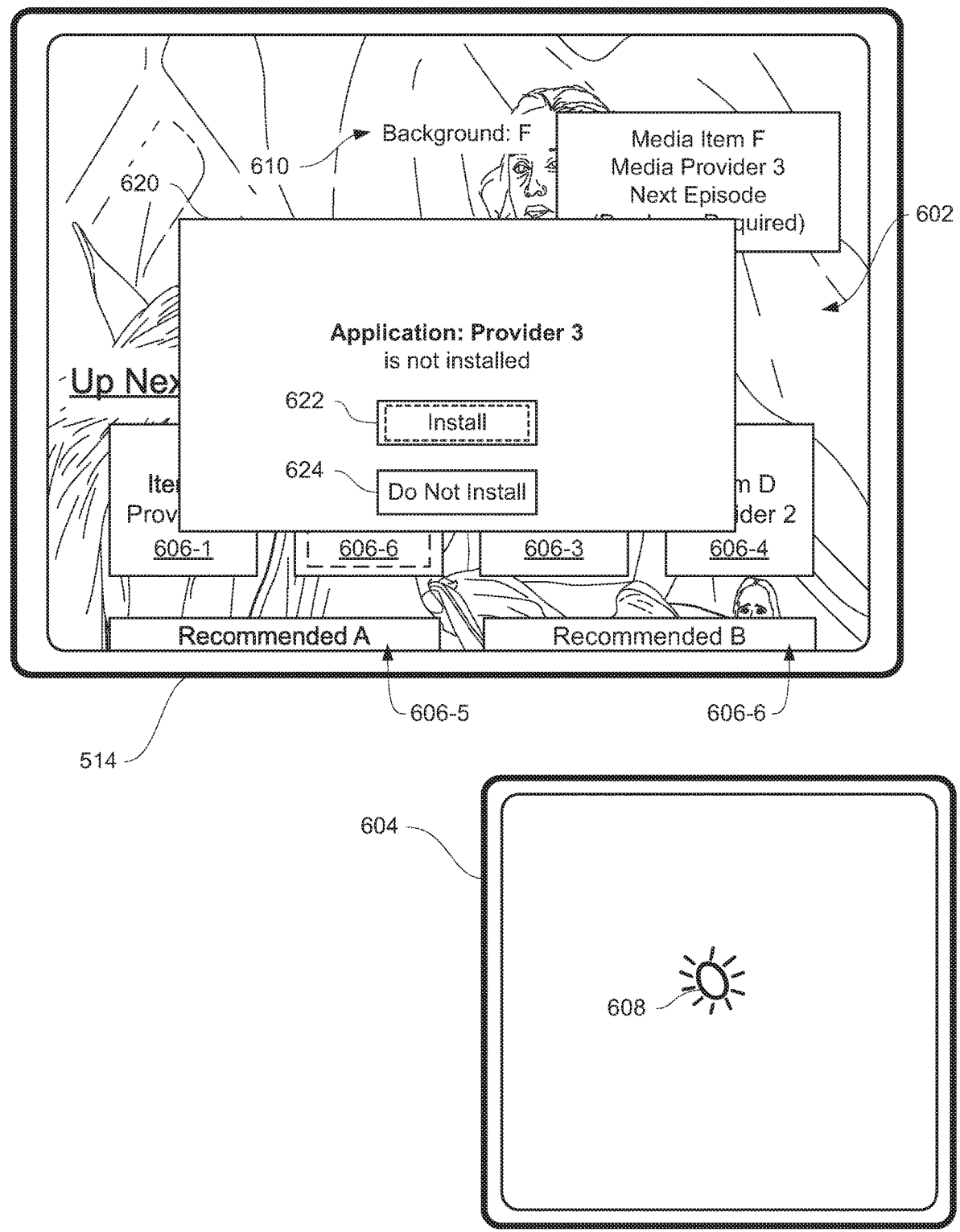
Figure 6C:
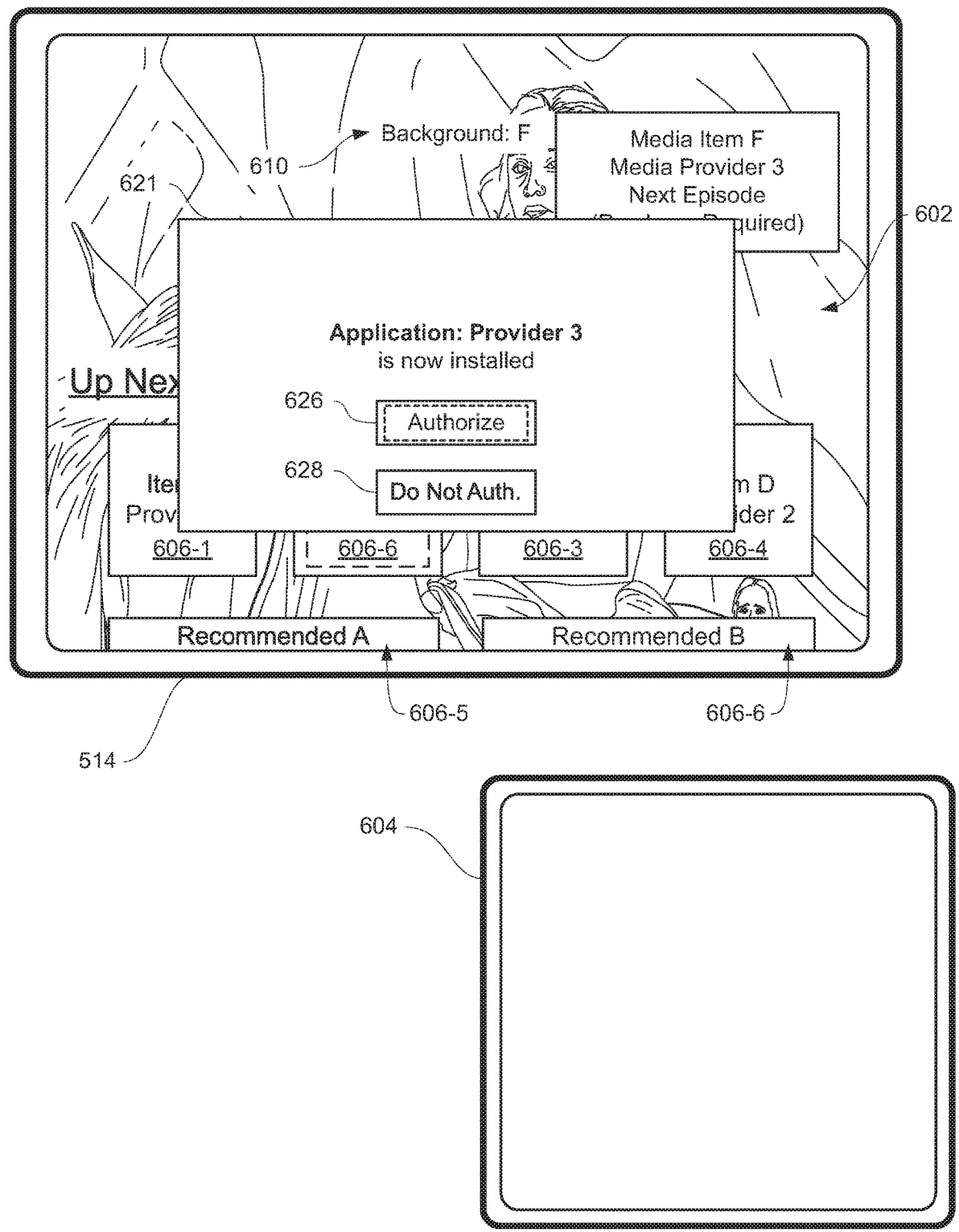
Figure 6D:
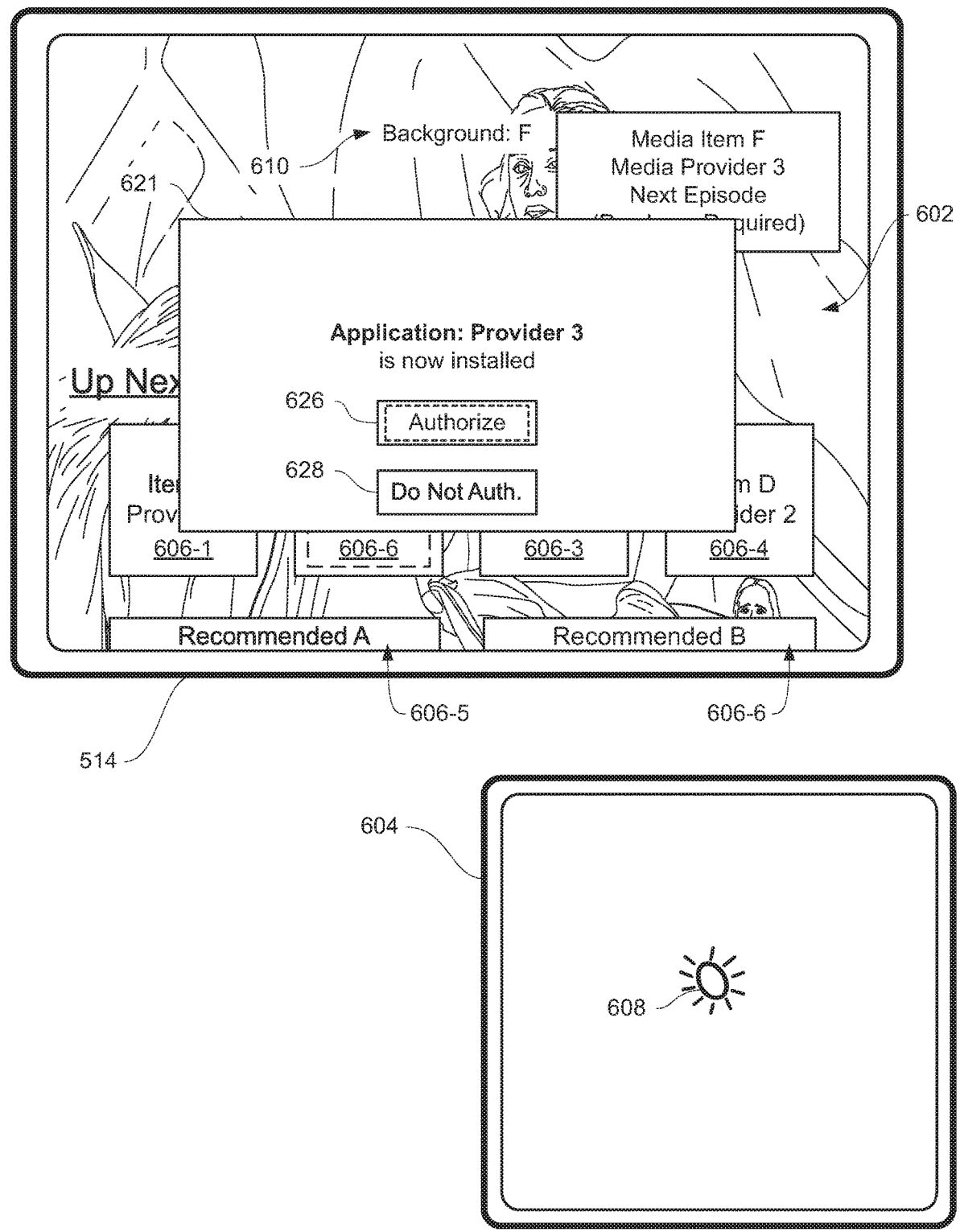
Figure 6F:
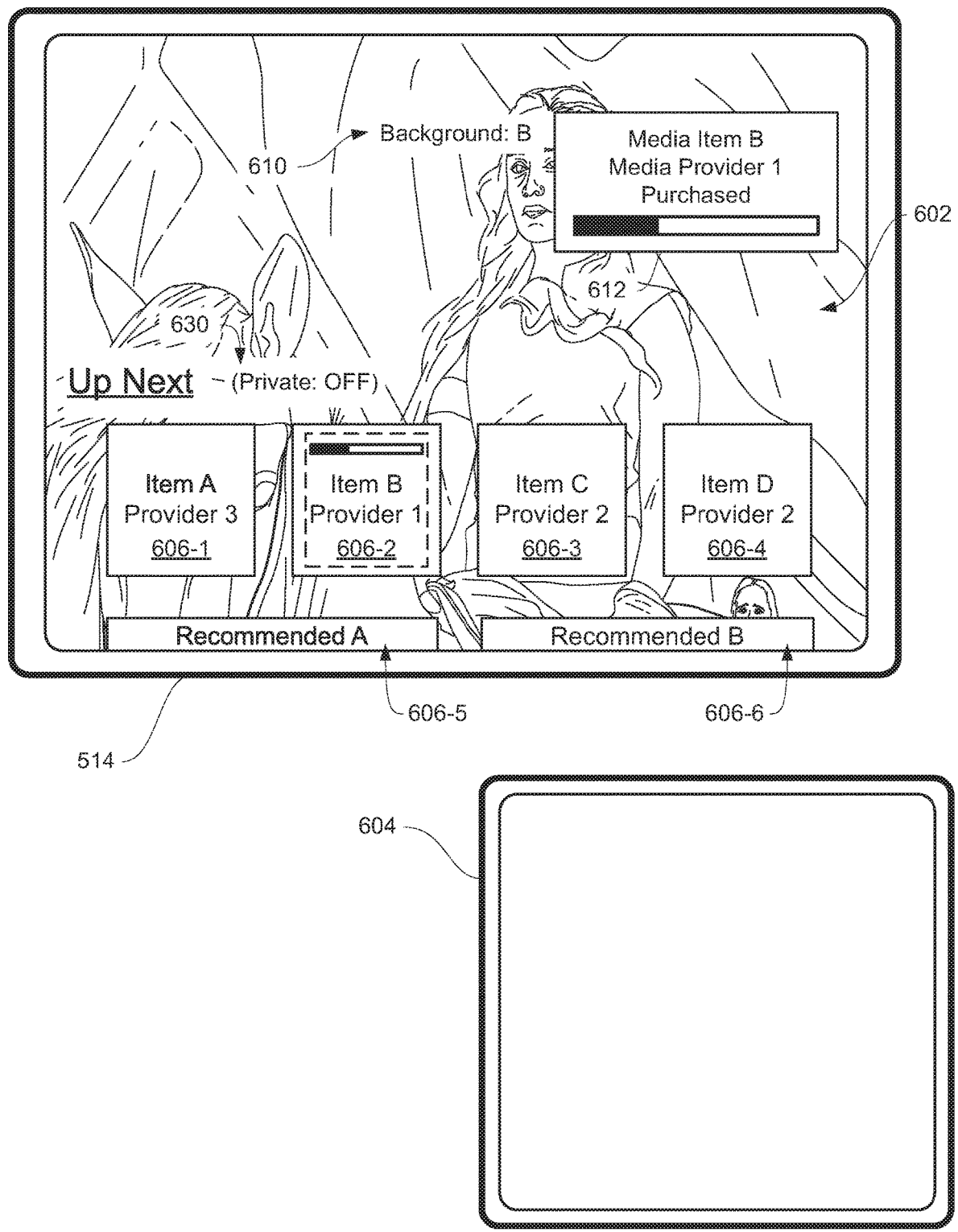
Figure 6G:
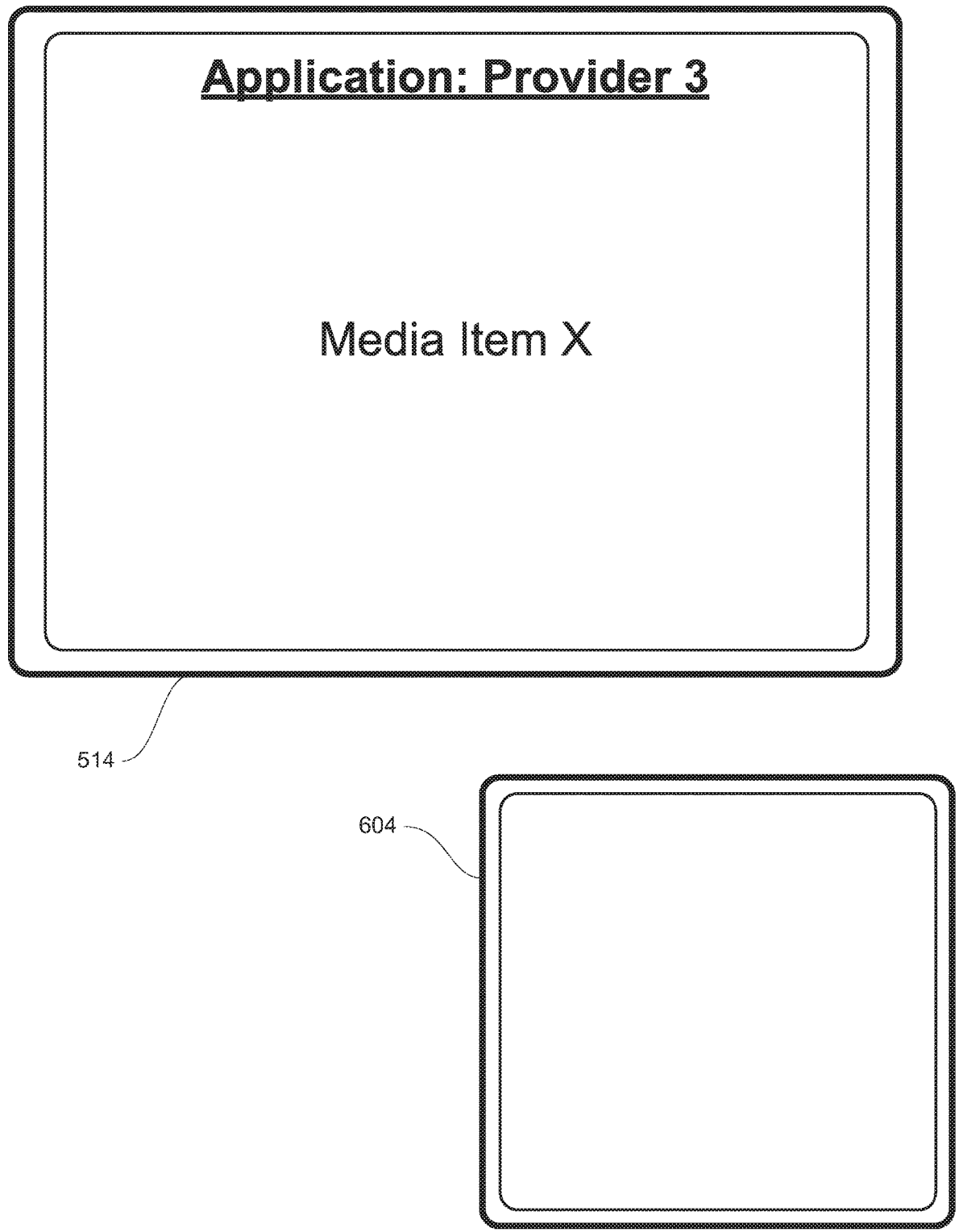
Figure 6H:
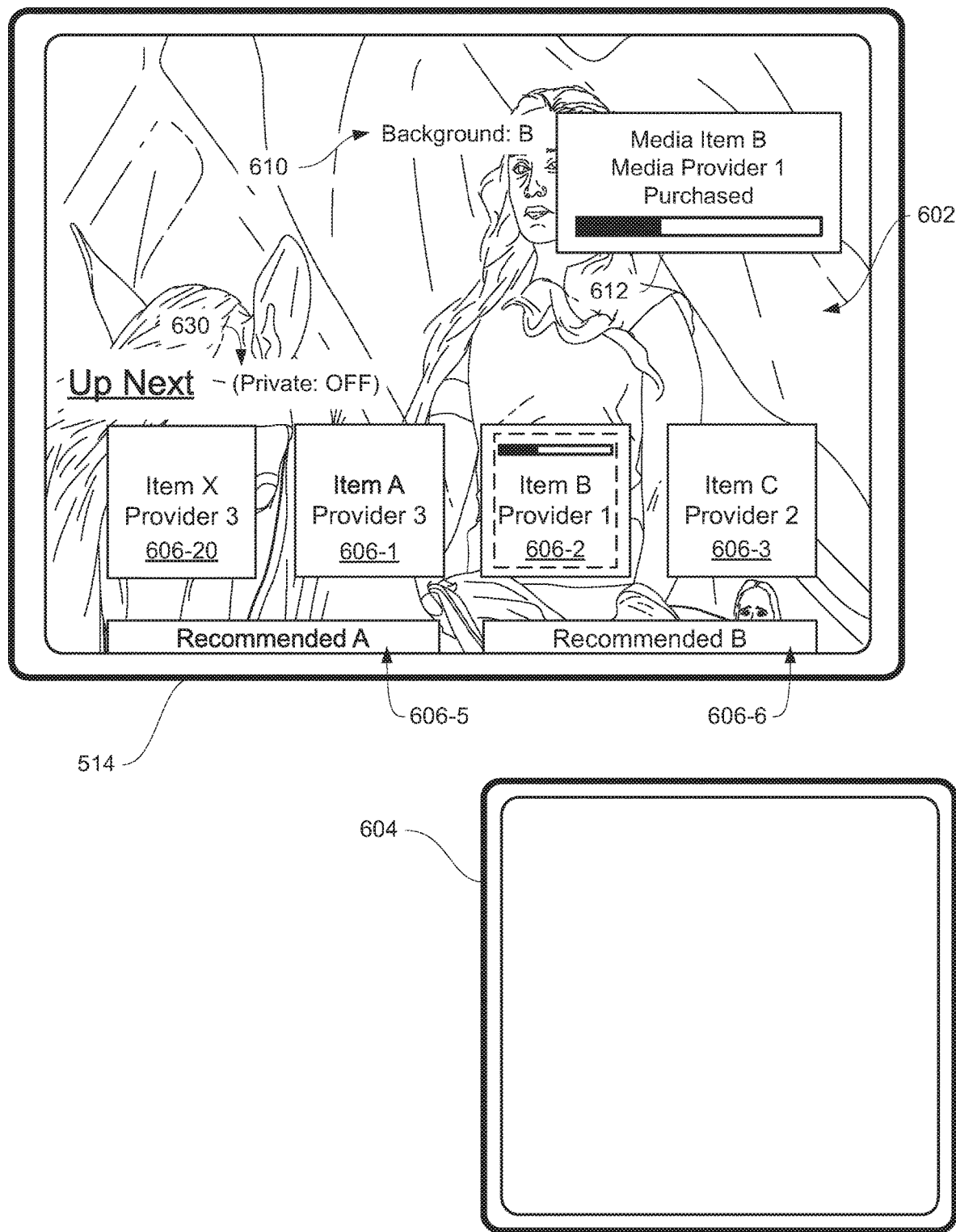
Figure 6I:
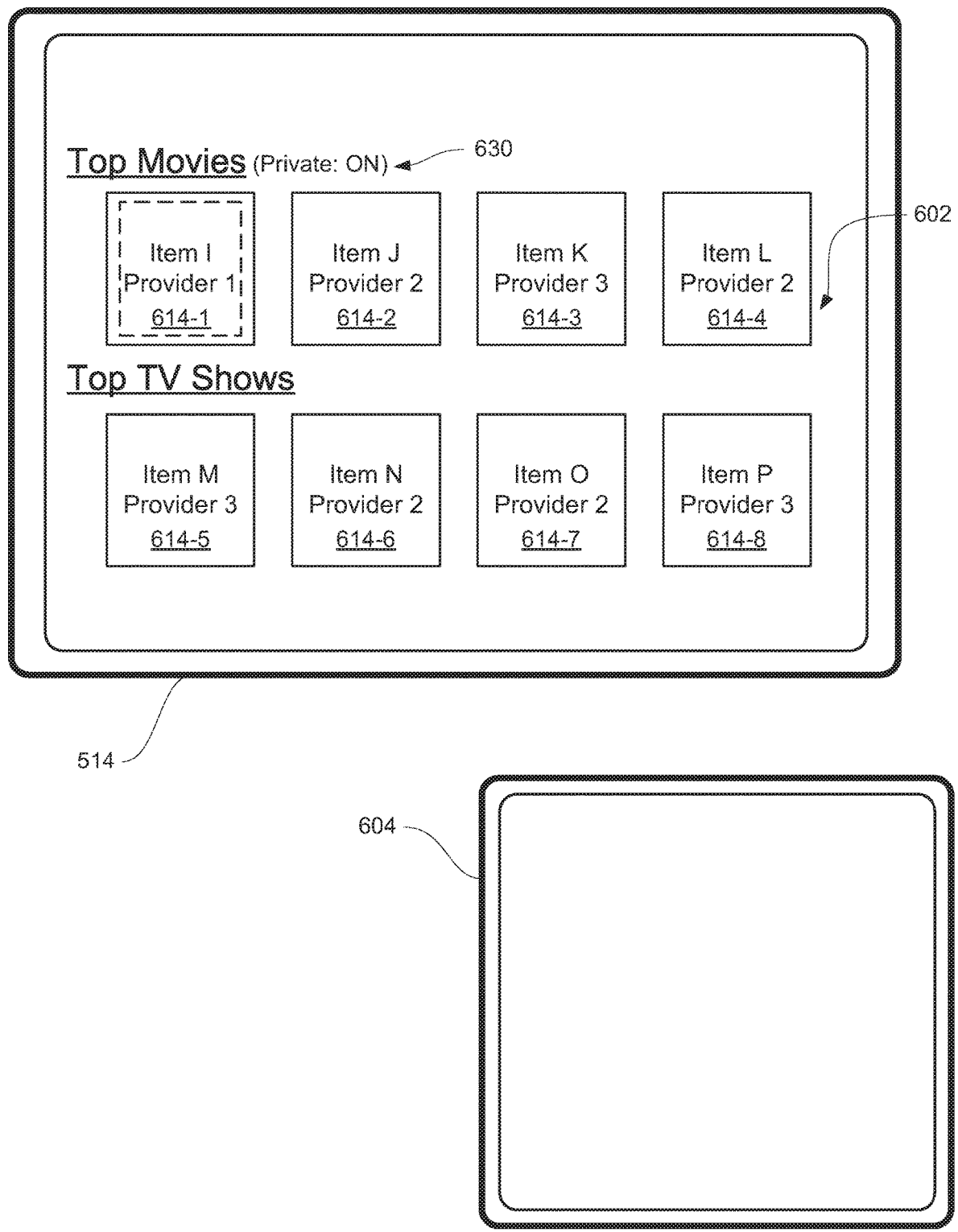
Figure 6J:
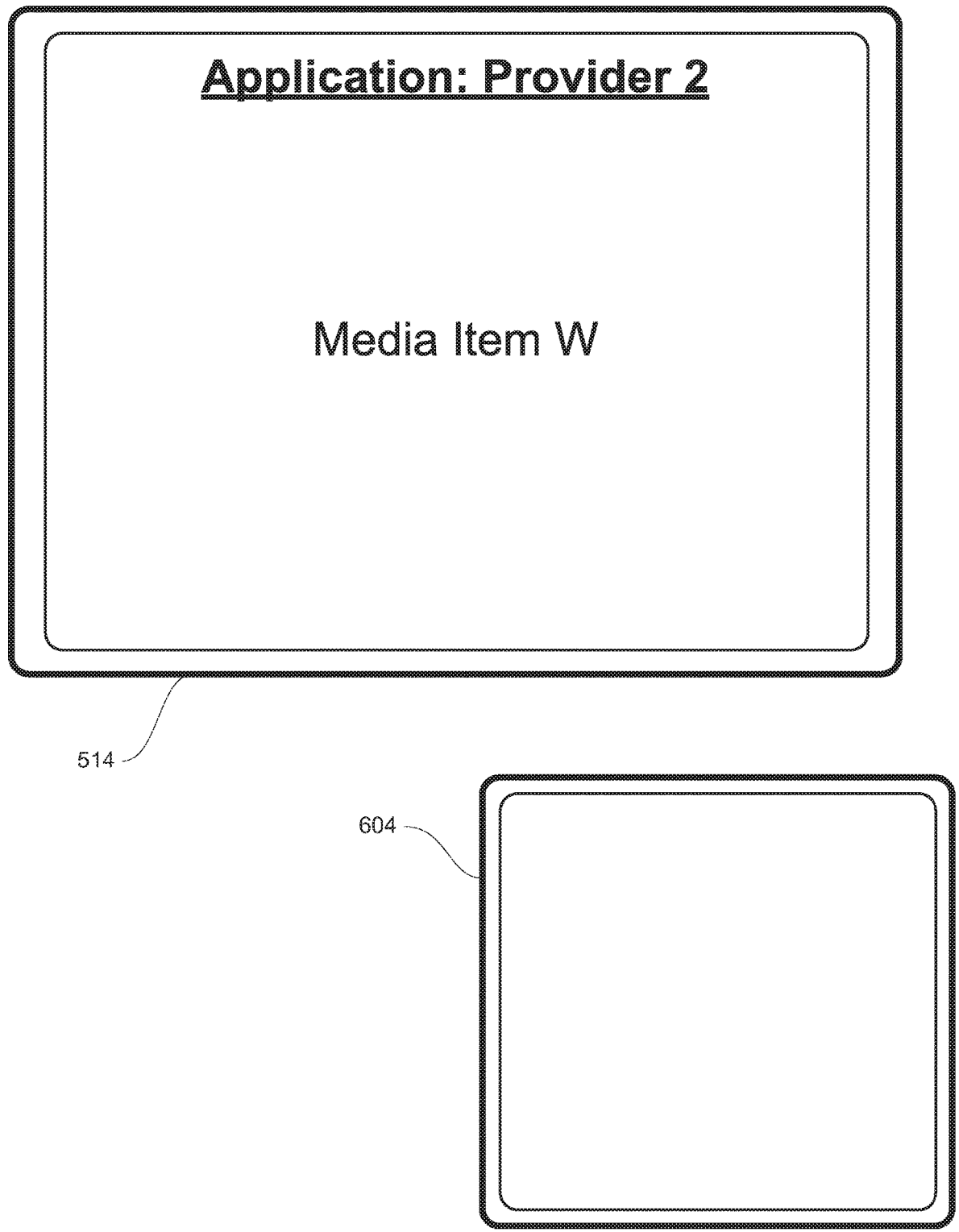
Figure 6K:
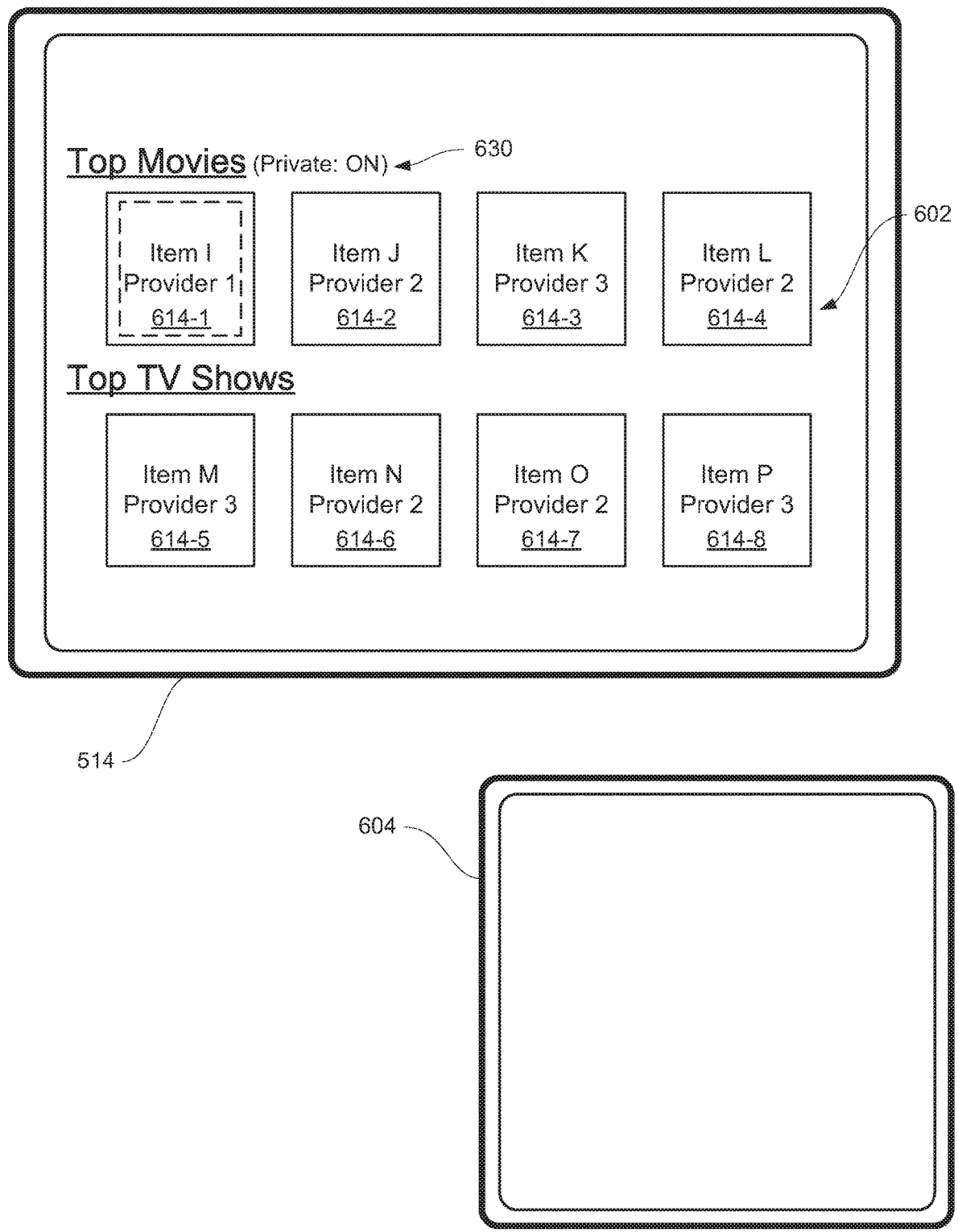
Figure 6L:
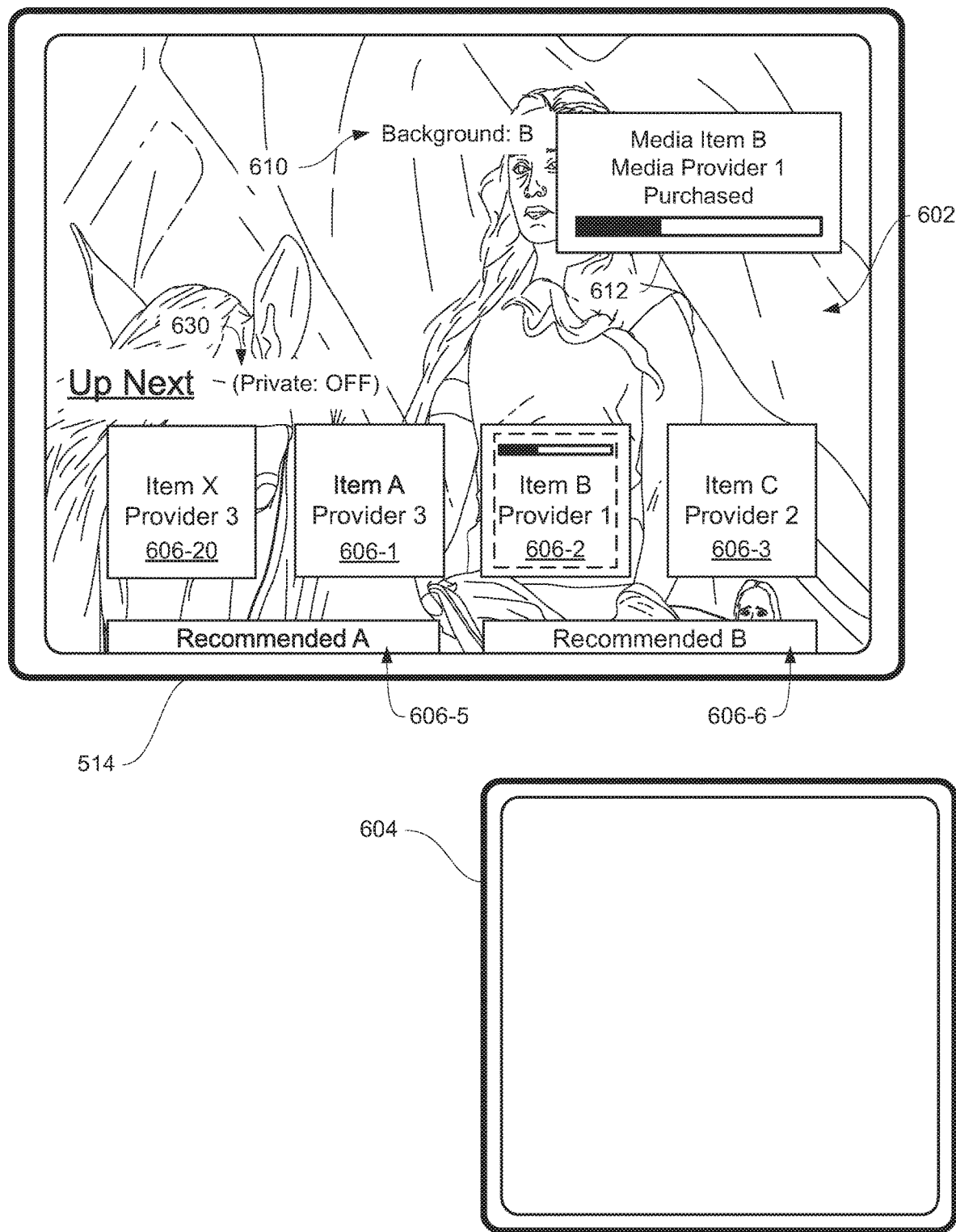
Figure 7A:
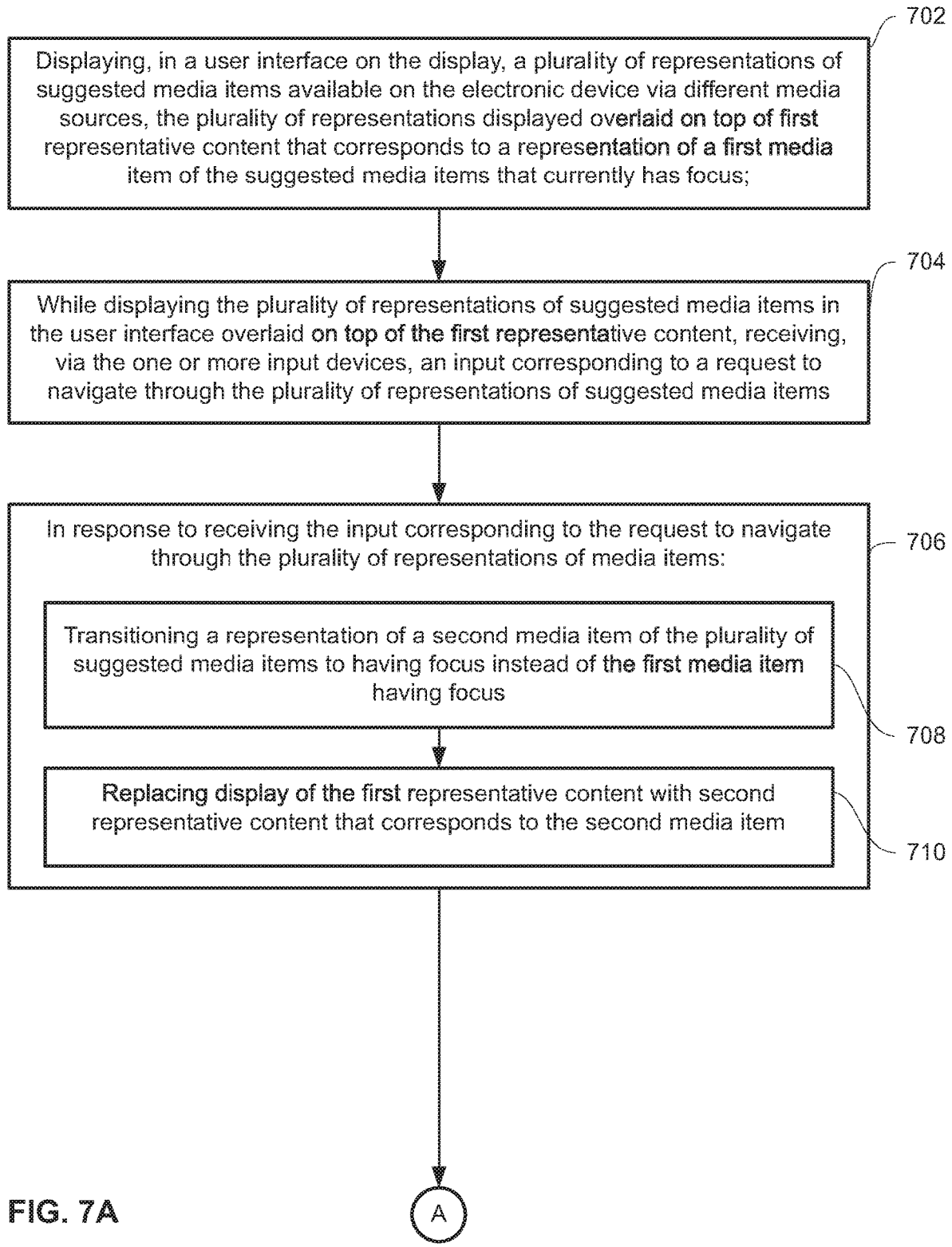
FIGS. 7A-7L are flow diagrams illustrating a method of presenting suggested media items (e.g., movies, television shows, etc.) to a user in a unified media browsing application in accordance with some embodiments of the disclosure.
Figure 7B:
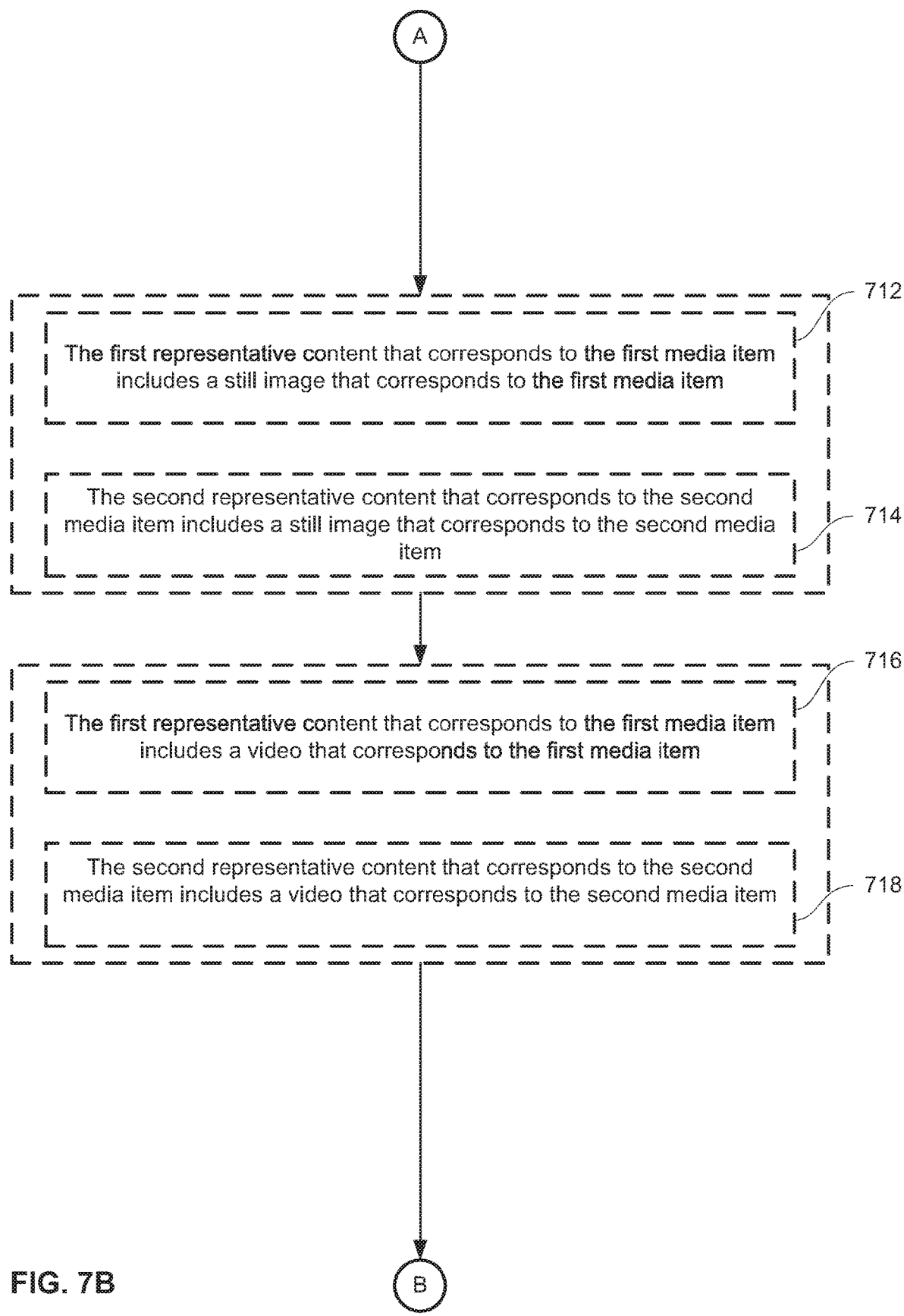
Figure 7C:
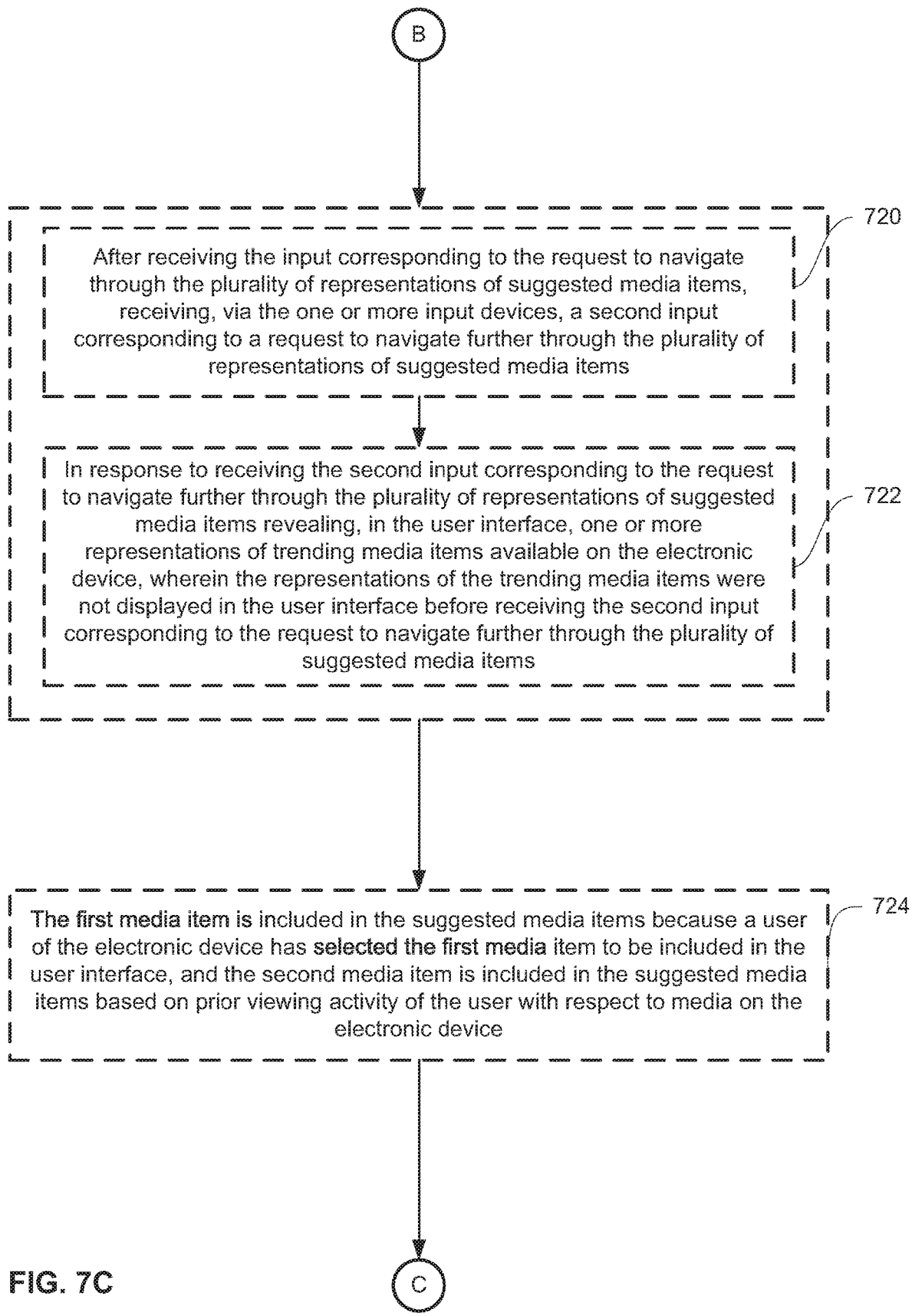
Figure 7D:
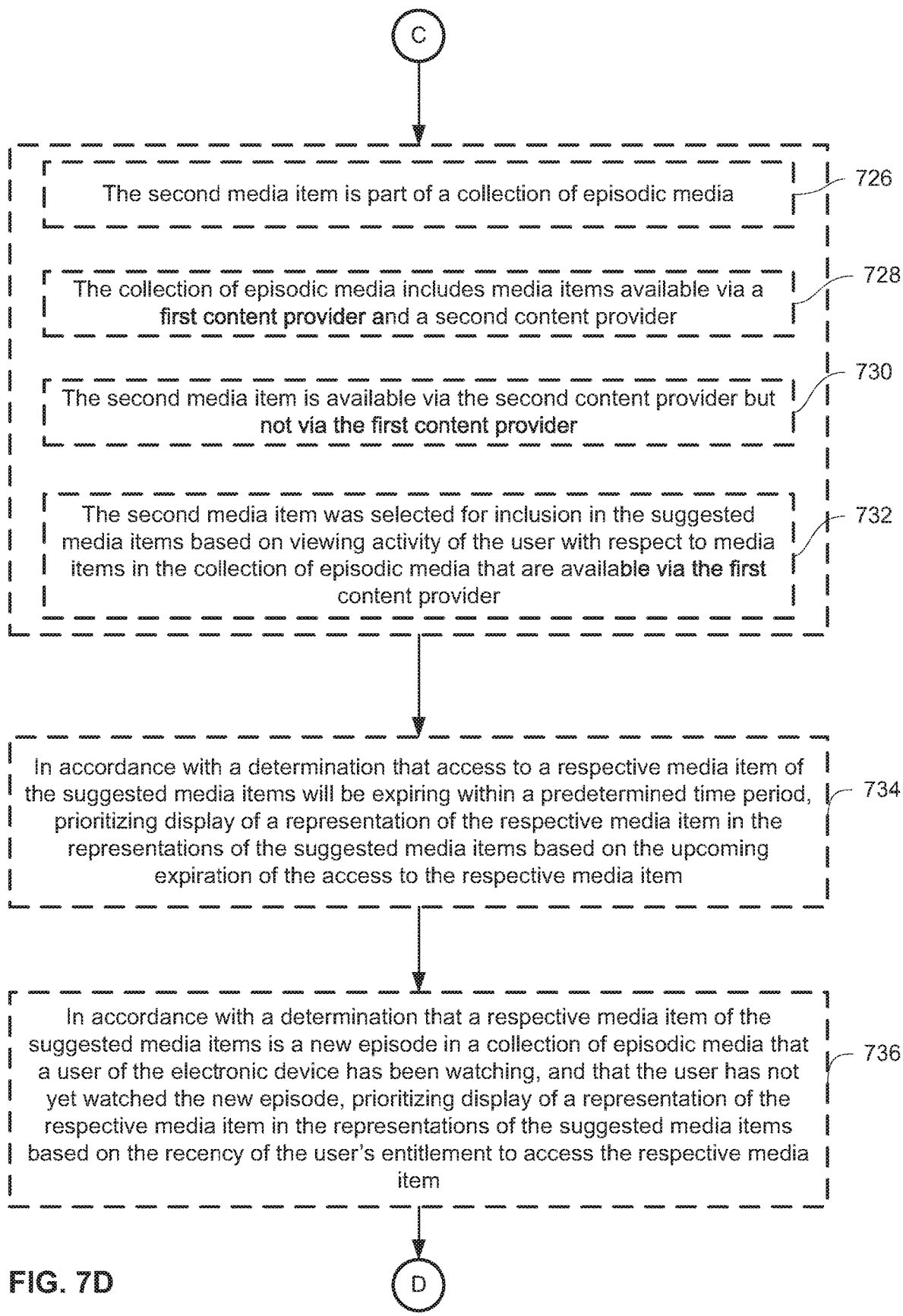
Figure 7E:
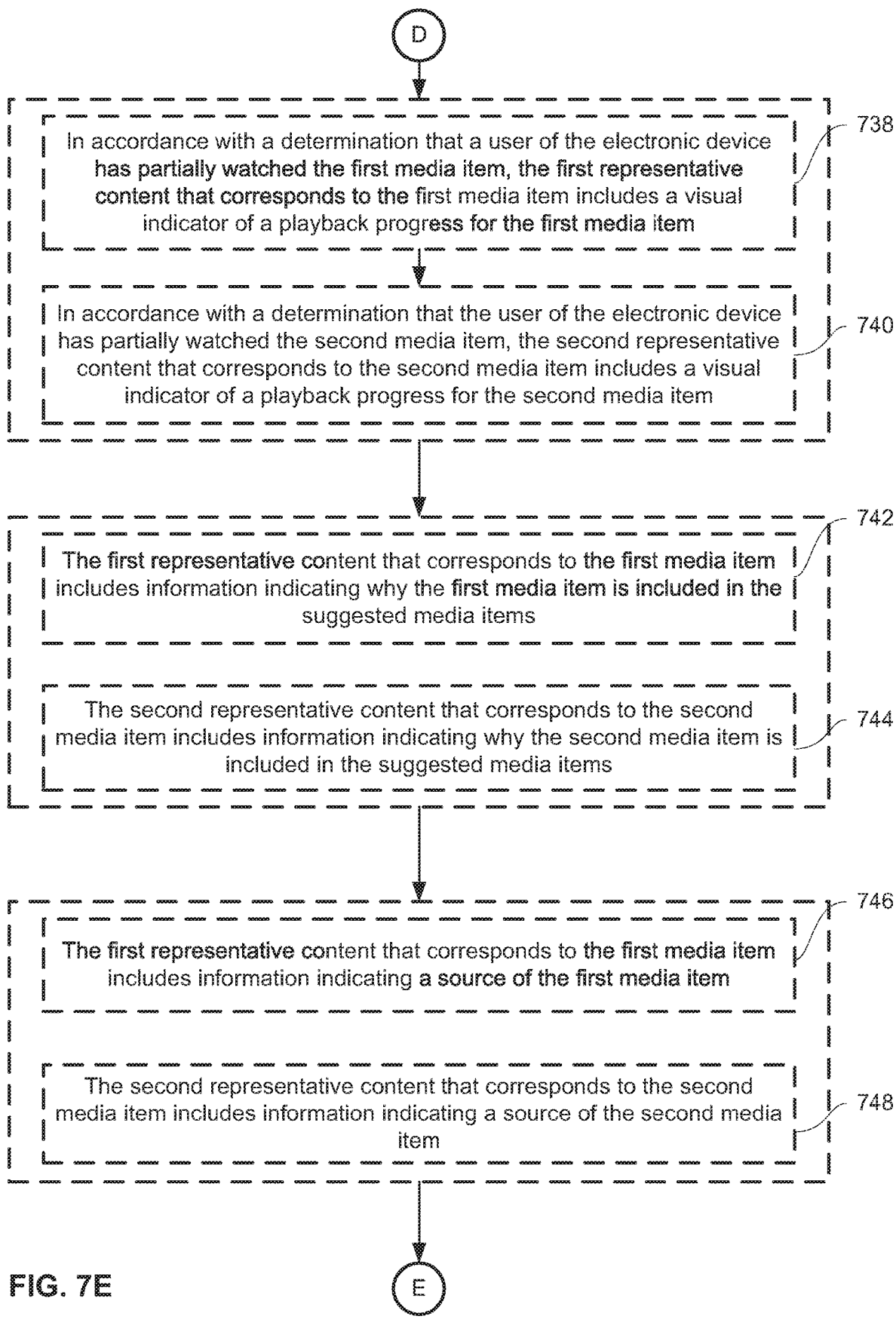
Figure 7F:
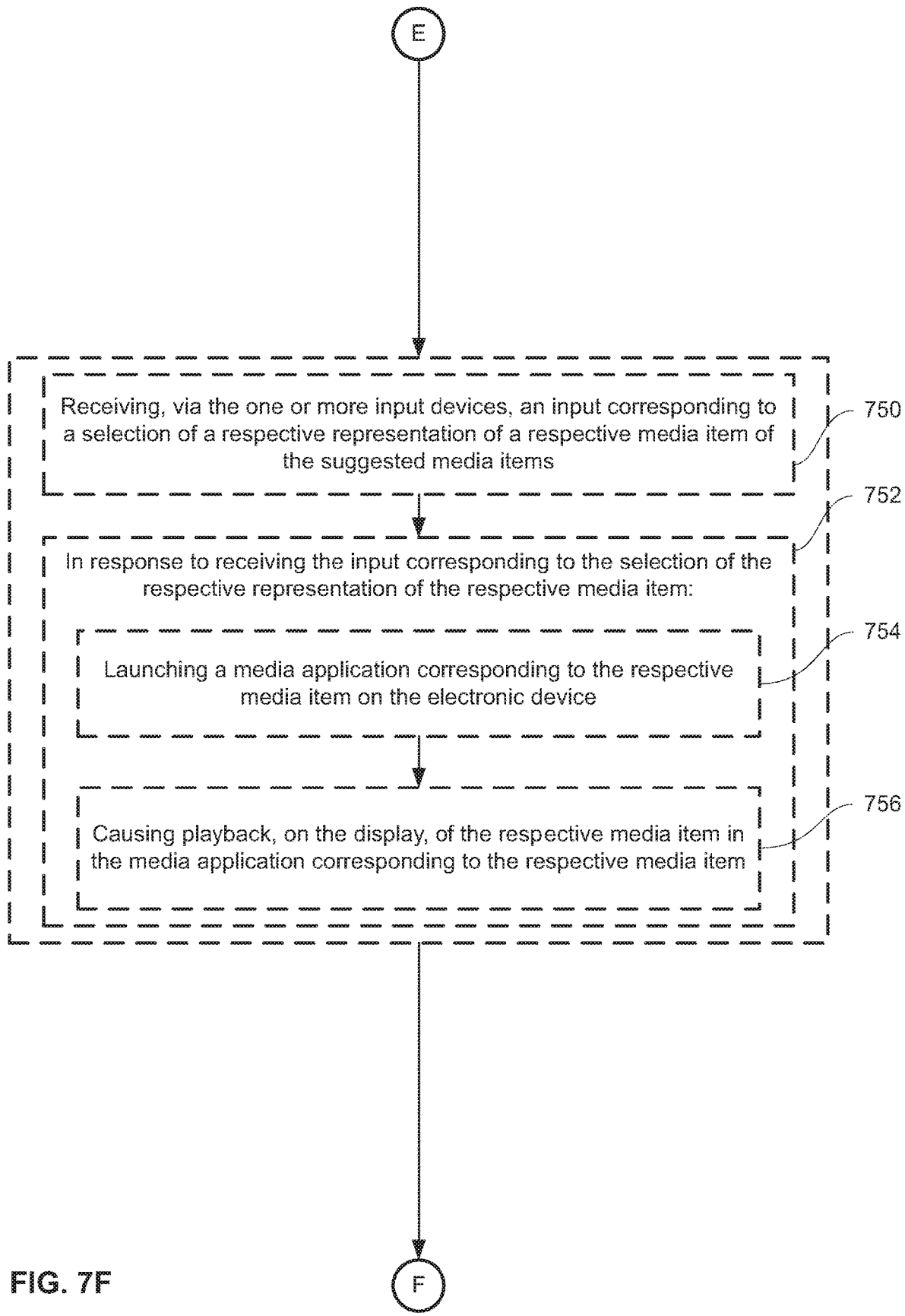
Figure 7G:
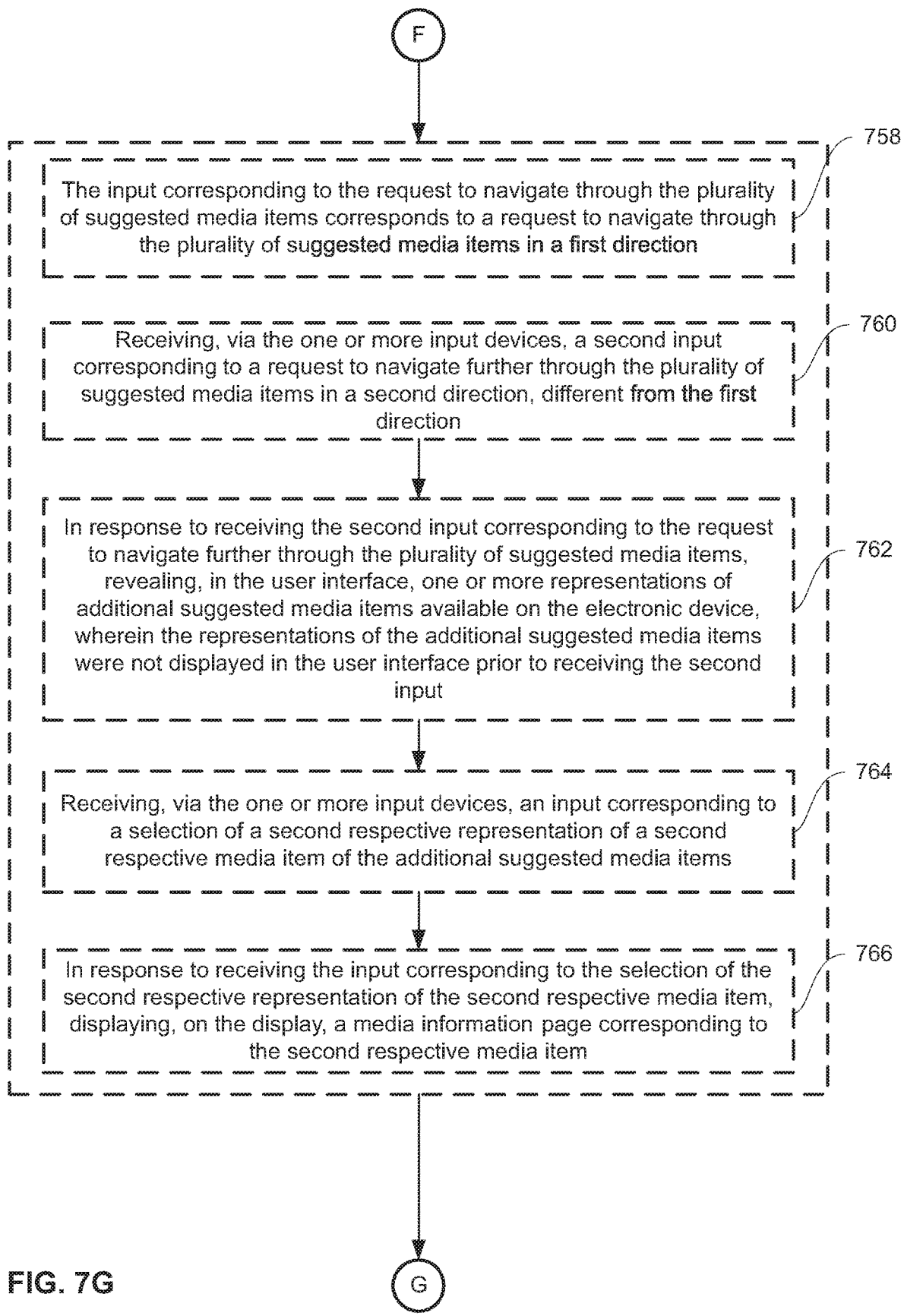
Figure 7H:
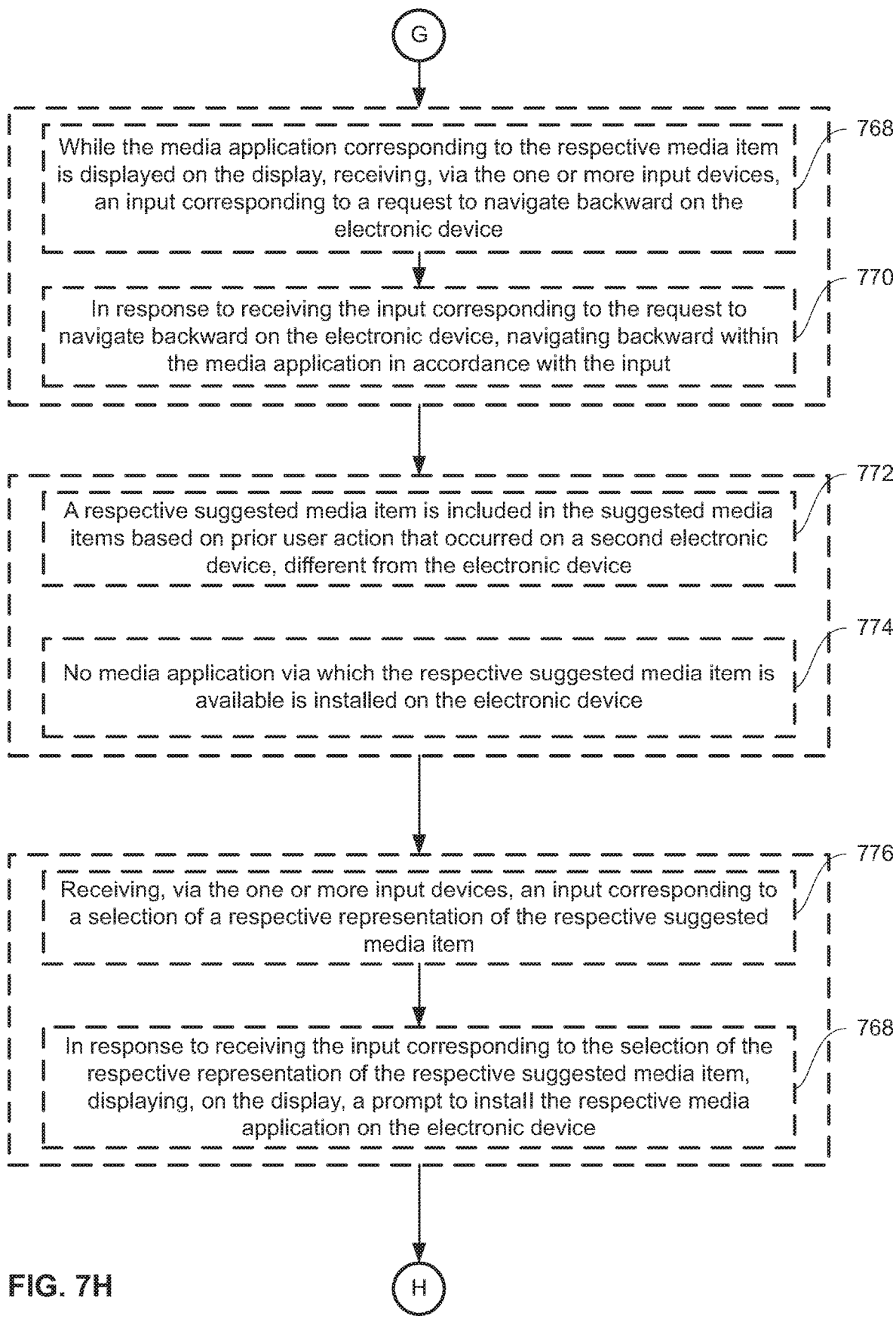
Figure 7I:
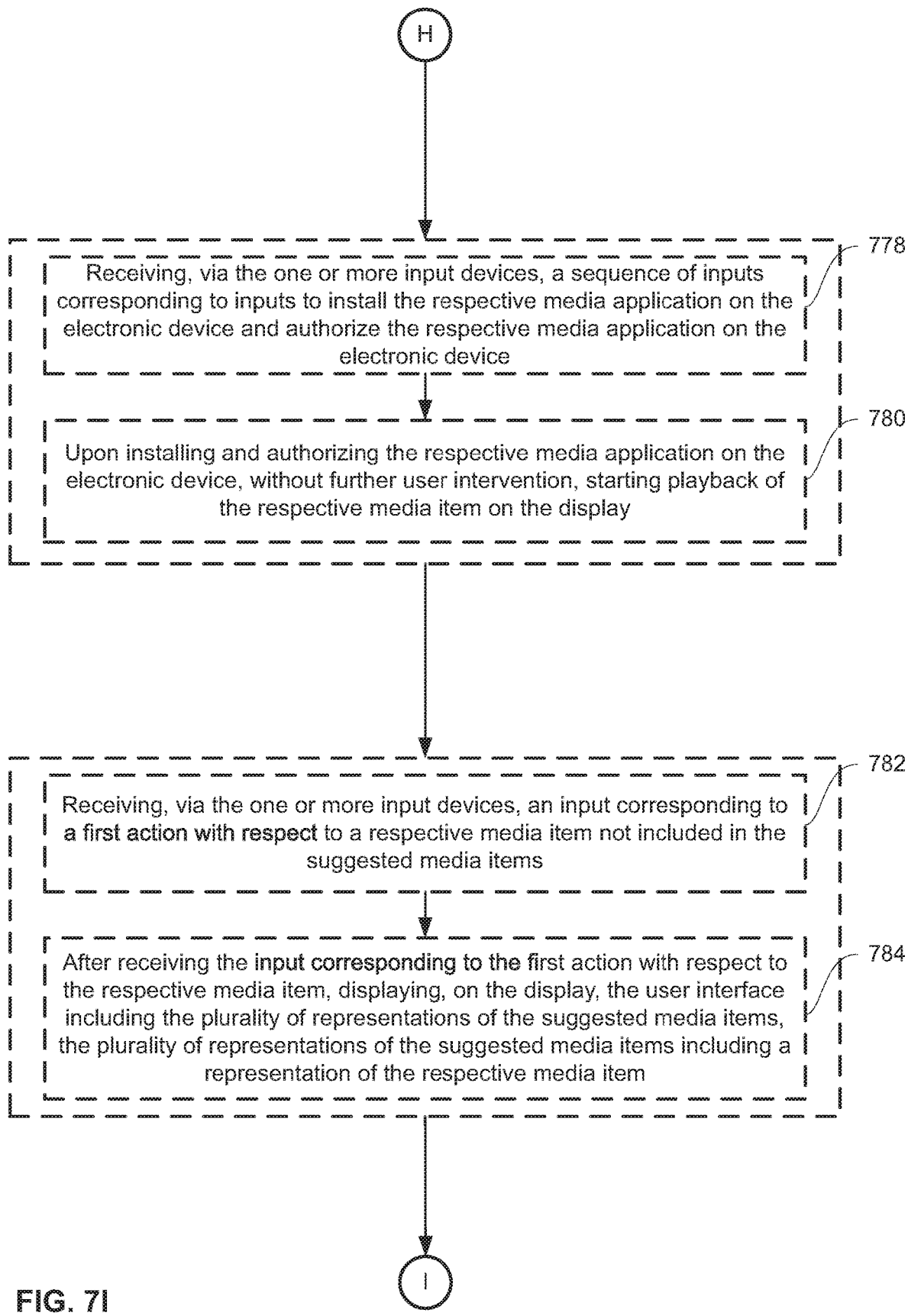
Figure 7J:
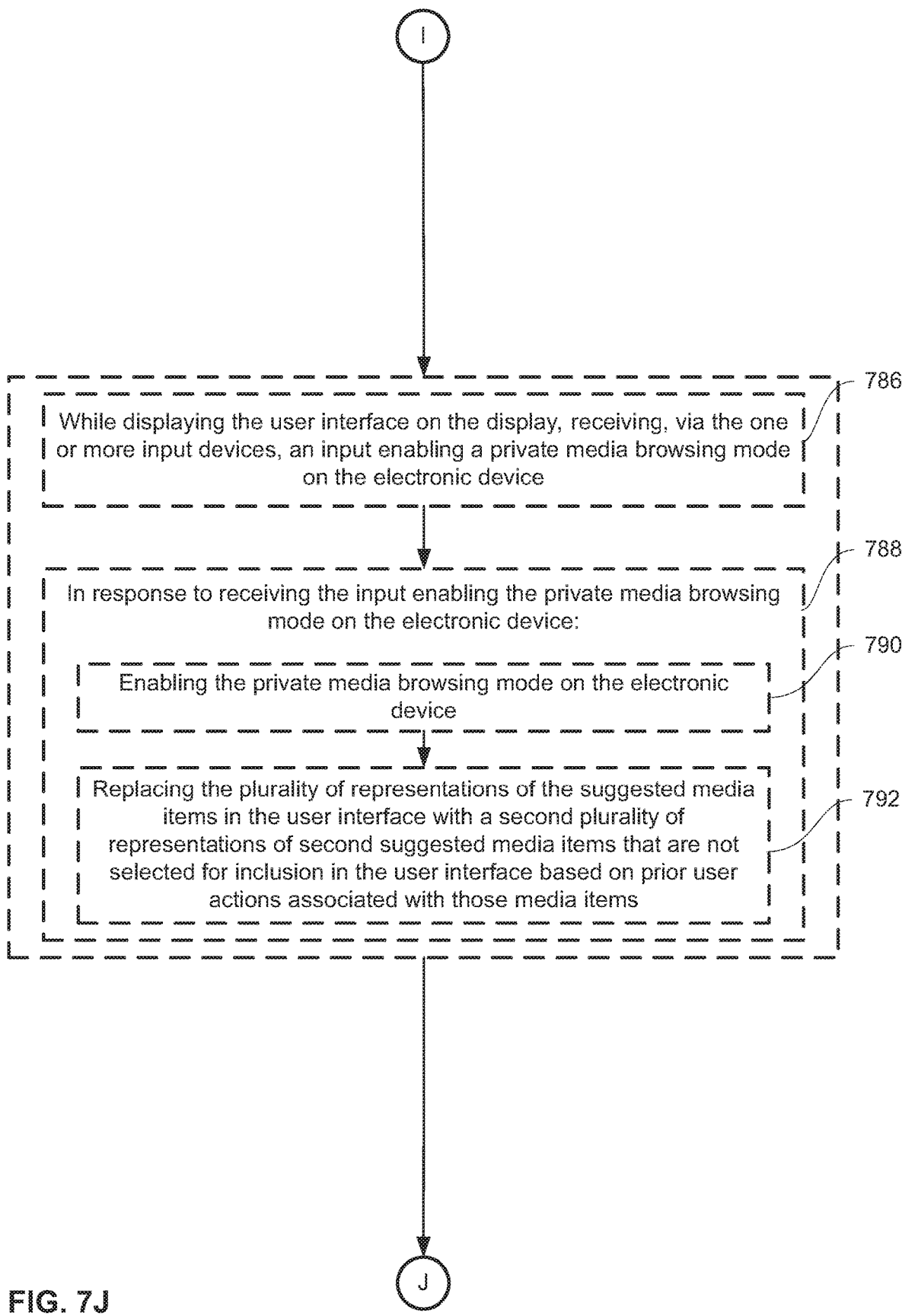
Figure 7K:
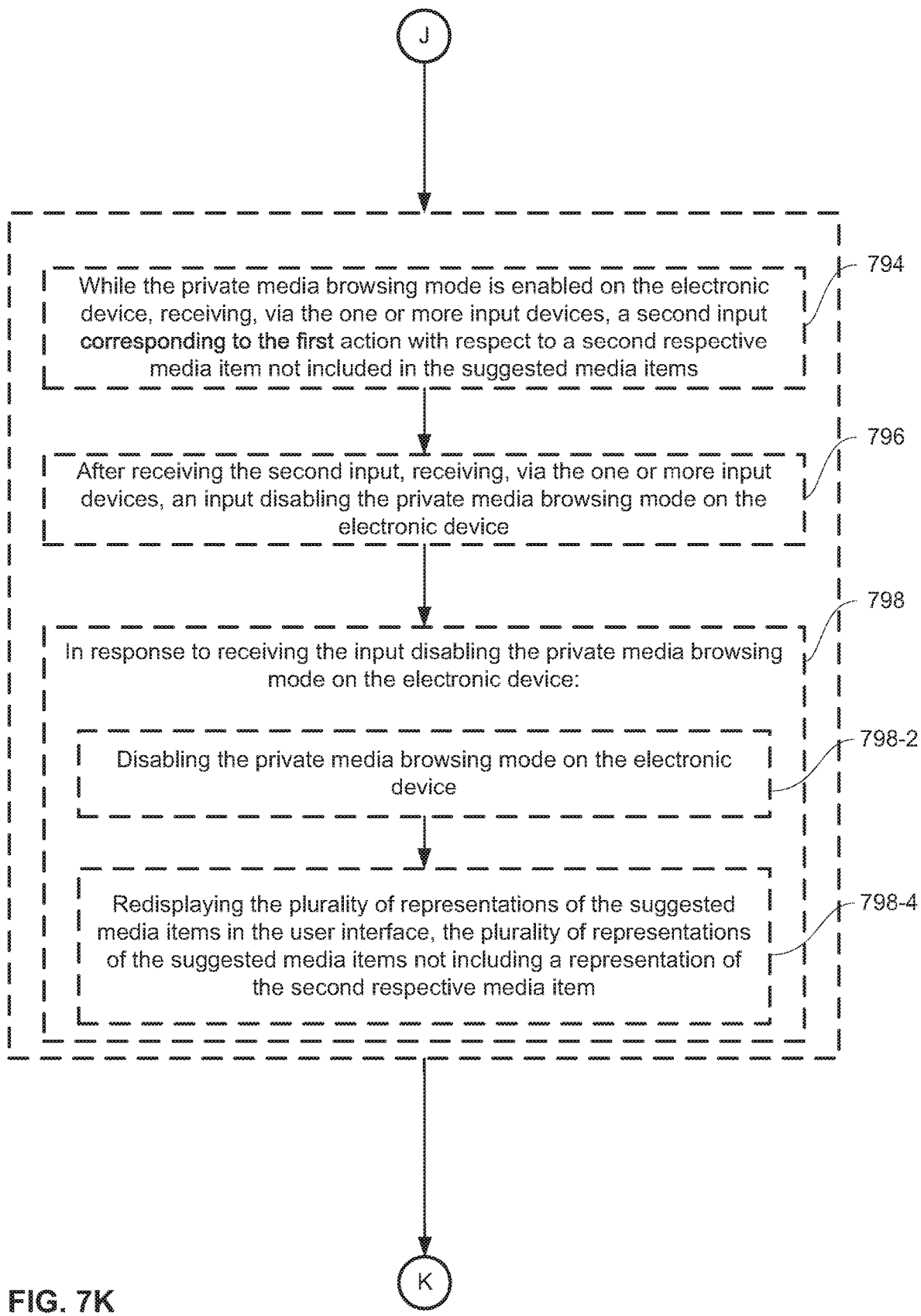
Figure 7L:
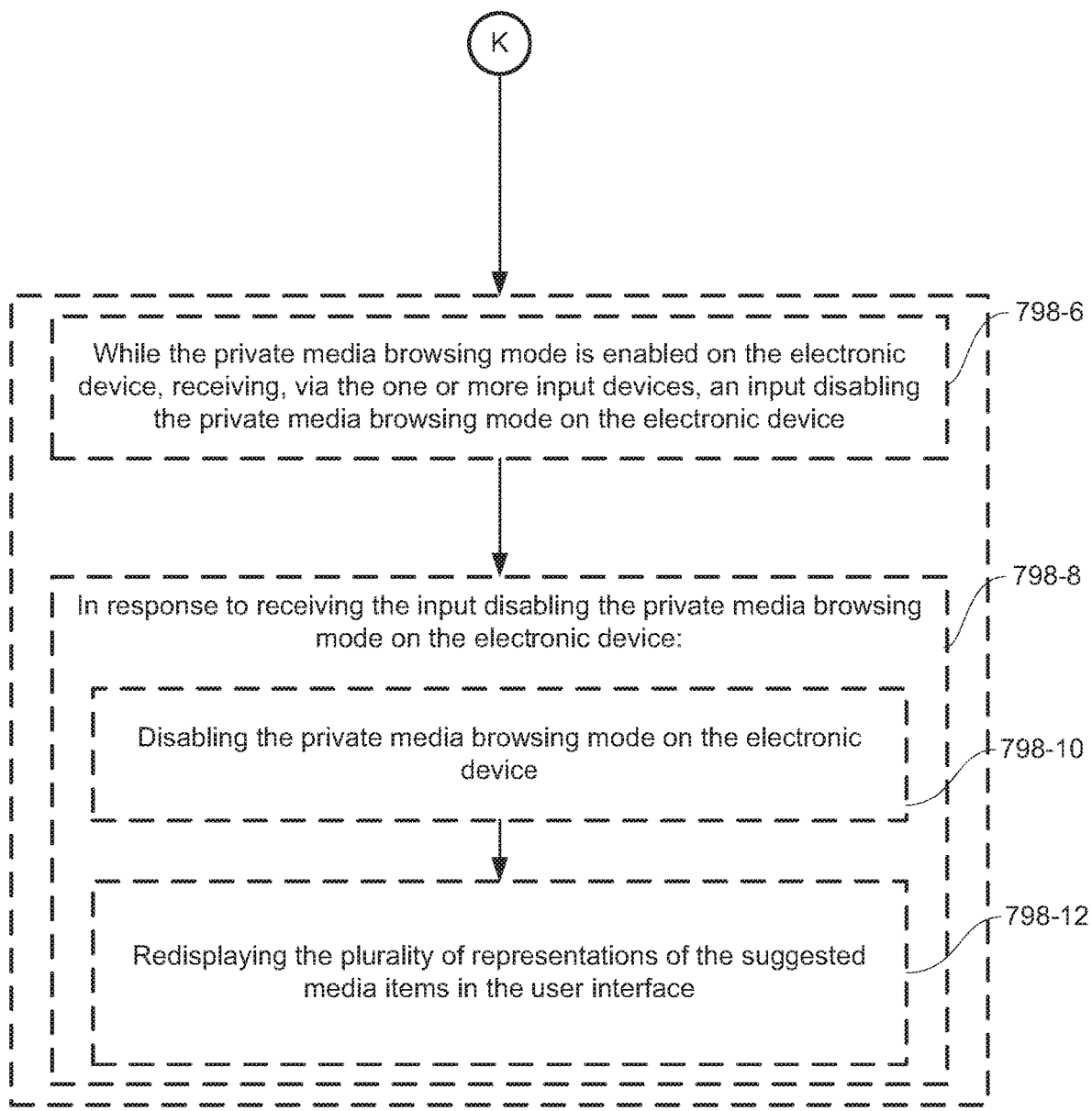

In FIG. 6Z, a click of touch-sensitive surface 604 is detected while representation 606-6 has the current focus. In response, because the media application corresponding to media provider 3 is not installed on the electronic device, the electronic device displays prompt 620, as shown in FIG. 6AA, which indicates that the media application corresponding to media provider 3 is not installed on the electronic device, and provides button 622 to install the media application, and button 624 to forgo installing the media application. In FIG. 6BB, a selection of button 622 has been detected, which installs the media application corresponding to media provider 3 on the electronic device. In FIG. 6CC, after the media application corresponding to media provider 3 has been installed on the electronic device, the electronic device displays prompt 621, which indicates that the media application has been installed, and provides button 626 to authorize the media application to provide access to its corresponding media (e.g., by providing login credentials to the media application that authenticate the user with media provider 3), and button 628 to not authorize the media application to provide access to its corresponding media. In FIG. 6DD, selection of button 626 has been detected, which authorizes the media application corresponding to media provider 3 to provide access to media from media provider 3, and in response to that authorization, without further input from the user, the electronic device begins playing media item F, as shown in FIG. 6EE. Thus, after installation and sign-in or sign-up via the media application, the electronic device immediately begins playback of the media item in the media application, rather than displaying a navigation or initial launch user interface of the media application, such as a home screen of the media application. This result simplifies the user's experience with viewing a media item when installation of a media application is first required. In some embodiments, the user of the electronic device may have previously authorized media provider 3 to share user-specific information with the unified media browsing application (e.g., via a setting in an account of the user that the electronic device is logged into). In such circumstances, in response to detecting selection of representation 606-6 in FIG. 6Z, the electronic device optionally automatically installs and/or authorizes the media application corresponding to media provider 3, without requiring further user input, and begins playing media item F as shown in FIG. 6EE.

Referring back to FIGS. 6Y and 6Z, selection of one of representations 606 optionally causes the electronic device to respond differently depending on whether the electronic device has information about the current play position of the user in the media corresponding to the selected representation 606, and/or whether the user is entitled to access the media corresponding to the selected representation 606. Specifically, in some embodiments, a representation 606 corresponds to a collection of episodic media (e.g., a television series that has multiple episodes and/or seasons), rather than a specific episode in the collection of episodic media. The user of the electronic device may be entitled to view none, some, or all of the episodes in such a collection, and the electronic device may have, or may not have, information about which episodes of the collection the user has watched (e.g., the user's "current play position" in the collection of episodic media corresponds to the next episode in the collection of episodic media that the user has not watched. For example, if the user has watched episodes 1 and 2, episode 3 is optionally the episode at the user's current play position in the collection of episodic media). The different responses of the electronic device in response to selection of such a representation 606 are summarized in the table below.

Figure 12A:
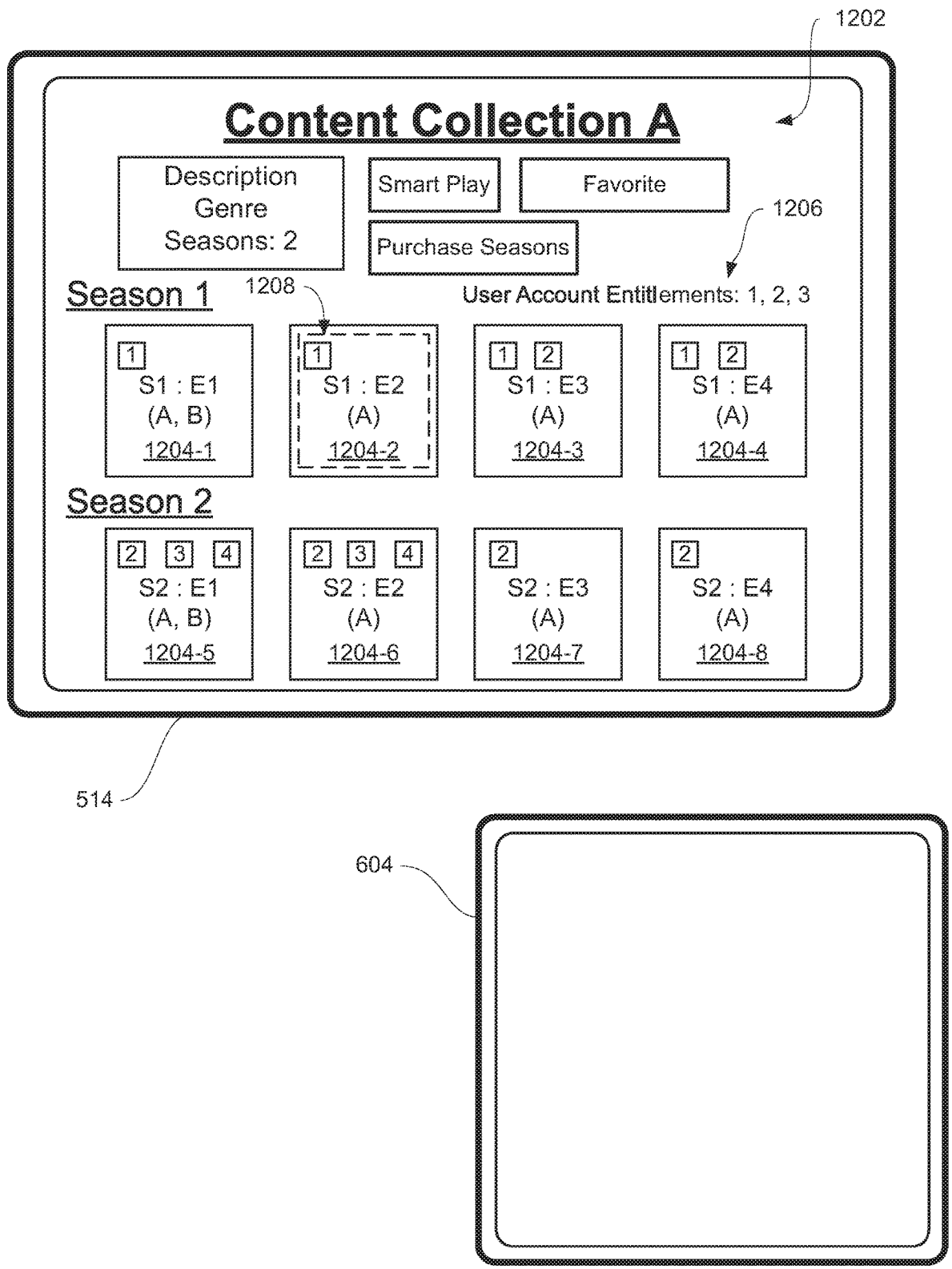
FIGS. 12A-12V illustrate exemplary ways in which an electronic device displays representations of episodes in a collection of episodic content in accordance with some embodiments of the disclosure.

|  | Current play position known | Current play position unknown |
|---|---|---|
| Entitled to view the episode at the user's current play position | Play the episode at the user's current play position in response to selection of the representation of the collection of episodic media | Display one or more of the following selectable options from which the user can choose in response to selection of the representation of the collection of episodic media:<br>1. Watch first episode of the collection of episodic media<br>2. Watch latest (most recent) episode of the collection of episodic media<br>3. Display list of episodes in the collection of episodic media (e.g., display the canonical page for the show from which the user is able to select an episode to watch, such as illustrated in FIGS. 12A-12V) |
| Not entitled to view the episode at the user's current play position | If the user is entitled to a later episode (e.g., later than the episode corresponding to the user's current play position), in response to selection of the representation of the collection of episodic media, display one or more of the following selectable options from which the user can choose:<br>1. Watch next available episode that the user is entitled to view<br>2. Display list of episodes in the collection of episodic media (e.g., display the canonical page for the show from which the user is able to select an episode to purchase and/or watch, such as illustrated in FIGS. 12A-12V)<br>3. Purchase and view the episode at the user's current play position (e.g., selection of this option allows the user to purchase entitlement to the episode, after which playback of the episode begins)<br>If the user is not entitled to a later episode (e.g., later than the episode corresponding to the user's current play position), in response to selection of the representation of the collection of episodic media, display one or more of the following selectable options from which the user | Display the following selectable option that the user can choose in response to selection of the representation of the collection of episodic media:<br>1. Display list of episodes in the collection of episodic media (e.g., display the canonical page for the show from which the user is able to select an episode to purchase and/or watch, such as illustrated in FIGS. 12A-12V) |

| Current play position known | Current play position unknown |
|---|---|
| can choose:<br>1. Display list of episodes in the collection of episodic media (e.g., display the canonical page for the show from which the user is able to select an episode to purchase and/or watch, such as illustrated in FIGS. 12A-12V)<br>2. Purchase and view the episode at the user's current play position (e.g., selection of this option allows the user to purchase entitlement to the episode, after which playback of the episode begins) | |

In some embodiments, the electronic device has a private media browsing mode during which media viewing activity of the user is not tracked and/or media items suggested for the user based on the user's media viewing activity are not displayed by the unified media browsing application in user interface 602. For example, in FIG. 6FF, the electronic device is displaying representations 606 of suggested media items while the private media browsing mode of the electronic device is disabled (indicated by 630 in FIG. 6FF). In FIG. 6GG, while the private media browsing mode of the electronic device is disabled, the electronic device begins playing media item X from media provider 3 on the electronic device (e.g., in response to a sequence of inputs detected on touch-sensitive surface 604 to search for and play media item X on the electronic device). After playing media item X, and while the private media browsing mode of the electronic device is disabled, the electronic device redisplays user interface 602 with representations 606 of suggested media items before playback of media item X has been completed (e.g., in response to a sequence of inputs detected on touch-sensitive surface 604 to open the unified media browsing application on the electronic device). As shown in FIG. 6HH, the electronic device has, because the user partially watched media item X, included representation 606-20 of media item X in the representations 606 of suggested media items. Further, because media item X is the latest media item that the electronic device added to representations 606, representation 606-20 corresponding to media item X is displayed at the front of the list of suggested media items.

In FIG. 6II, the private media browsing mode of the electronic device has been enabled (indicated by 630 in FIG. 6II). In response, because the electronic device is now in a private media browsing mode, the electronic device has stopped displaying representations 606 of suggested media items in user interface 602, and instead is displaying representations 614 of trending media items. While the electronic device is in the private media browsing mode, if the user causes partial playback of a media item on the electronic device (e.g., media item W), as shown in FIG. 6JJ, causes user interface 602 to be redisplayed, as shown in FIG. 6KK, and disables the private media browsing mode, as shown in FIG. 6LL, the electronic device will not include, as a suggested media item in representations 606, media item W, because media item W was played while the electronic device was in the private media browsing mode, and the electronic device optionally does not track media viewing activity of the user while the electronic device is in the private media browsing mode.

FIGS. 7A-7L are flow diagrams illustrating a method 700 of presenting suggested media items (e.g., movies, television shows, etc.) to a user in a unified media browsing application in accordance with some embodiments of the disclosure. The method 700 is optionally performed at an electronic device such as device 100, device 300 or device 500 as described above with reference to FIGS. 1A-1B, 2-3 and 5A-5B. Some operations in method 700 are, optionally, combined and/or the order of some operations is, optionally, changed.

As described below, the method 700 provides ways of presenting suggested media items to a user in a unified media browsing application. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., a set-top box, such as device 100, device 300 or device 500) in communication with a display (e.g., a television, such as display 514) and one or more input devices (e.g., a remote control, such as remote 510, or a smartphone, such as device 511), displays (702), in a user interface on the display (e.g., a media navigation user interface in which a user of the electronic device is able to browse media available on the electronic device), a plurality of representations of suggested media items available on the electronic device via different media sources, such as in FIG. 6A (e.g., different media items available via different media providers and/or different media applications on the electronic device). In some embodiments, the representations of the media items optionally include content (e.g., video(s) and/or image(s)) from the corresponding media items, and/or textual information about the corresponding media items. In some embodiments, the suggested media items only include media items that the user of the electronic device is entitled to access, for example, because the user has purchased the media items or via the user's subscription with a content provider that provides access to the media items. In some embodiments, the plurality of representations are displayed overlaid on top of first representative content (e.g., a hero image or video snippet) that corresponds to a representation of a first media item of the suggested media items that currently has focus, such as in FIG. 6A (e.g., a user of the electronic device optionally causes a media item to have focus via one or more navigational inputs provided to the one or more input devices). The user interface optionally displays, as a background behind the representations of the suggested media, content that is representative of the media item that has the current focus such that as the media item with focus changes, the representative content, as the background, also changes accordingly, such as in FIG. 6A.

In some embodiments, the suggested media items are selected for display in the user interface based on different prior user actions associated with the suggested media items. For example, the user may have partially watched some media items to cause them to be included in the user interface, the user may have favorited some media items to cause them to be included in the user interface, the user may have watched previous episodes in a TV series such that the current/next episode is included in the user interface, etc. In some embodiments, the prior user actions associated with the suggested media items have occurred on the current electronic device, and in some embodiments, the prior user actions associated with the suggested media items have occurred on a different electronic device (e.g., another electronic device associated with the user that the user is logged into). In some embodiments, the electronic device ceases displaying a media item in the suggested media items when it determines that the media item no longer should be suggested for viewing to the user. For example, the user has completely watched the media item, the media item is no longer available (e.g., the rental has expired), etc.

In some embodiments, while displaying the plurality of representations of suggested media items in the user interface overlaid on top of the first representative content, the electronic device receives (704), via the one or more input devices, an input corresponding to a request to navigate through the plurality of representations of suggested media items, such as in FIGS. 6B-6D (e.g., to scroll horizontally or vertically through the representations of the suggested media items such that the media item with focus changes). In some embodiments, in response to receiving the input (706) corresponding to the request to navigate through the plurality of representations of media items: the electronic device transitions (708) a representation of a second media item of the plurality of suggested media items to having focus instead of the first media item having focus (e.g., scrolling through the suggested media items based on the scrolling input to change the media item with focus) and replaces (710) display of the first representative content with second representative content that corresponds to the second media item, such as in FIG. 6D (e.g., as the media item with focus changes, so does the background of the user interface to correspond to the newly-focused media item). By doing so, the electronic device improves the efficiency with which information about which media item has the current focus is conveyed to the user, thus improving user-electronic device interactions.

In some embodiments, the first representative content that corresponds to the first media item includes (712) a still image that corresponds to the first media item and the second representative content that corresponds to the second media item includes (714) a still image that corresponds to the second media item, such as described with reference to FIGS. 6A-6D (e.g., pre-selected cover art corresponding to the first and second media items, still images corresponding to the beginning of the first and second media items, or still images corresponding to current play locations within the partially watched first and second media items). In some embodiments, the first representative content that corresponds to the first media item includes (716) a video that corresponds to the first media item and the second representative content that corresponds to the second media item includes (718) a video that corresponds to the second media item (e.g., video previews (e.g., trailers) of the first and second media items, video loops of current play locations within the partially watched first and second media items, etc.). By including such representative content in the background of the unified media browsing user interface, the electronic device improves the efficiency with which information about the content of the currently-focused media item is conveyed to the user, thus improving user-electronic device interactions.

In some embodiments, after receiving the input corresponding to the request to navigate through the plurality of representations of suggested media items, the electronic device receives (720), via the one or more input devices, a second input corresponding to a request to navigate further through the plurality of representations of suggested media items, such as in FIGS. 6H-6I (e.g., to further scroll horizontally or vertically through the representations of the suggested media items). In some embodiments, in response to receiving the second input corresponding to the request to navigate further through the plurality of representations of suggested media items, the electronic device reveals (722), in the user interface, one or more representations of trending media items available on the electronic device, such as in FIG. 6J (e.g., media items selected for inclusion in the user interface not based on the viewing activity of the user of the electronic device). For example, media that is popular with other viewers, or media that is otherwise selected by a third party, is optionally included in the trending media items. In some embodiments, the electronic device only displays trending media items that the user of the electronic device is entitled to access, for example, because the user has purchased the media item or via the user's subscription with a content provider that provides access to the media item. In some embodiments, the representations of the trending media items were not displayed in the user interface before receiving the second input corresponding to the request to navigate further through the plurality of suggested media items. By allowing the user to scroll through suggested media items to reveal trending media items, the electronic device improves the efficiency with which information about media items that may be of interested to the user is conveyed to the user, thus improving user-electronic device interactions.

In some embodiments, the first media item is included (724) in the suggested media items because a user of the electronic device has selected the first media item to be included in the user interface, such as in FIG. 6D (e.g., an explicit selection by the user of the first media item for inclusion in the user interface). For example, the user has favorited the first media item via a canonical page for the first media item, the user has provided a long press input on the first media item to display a contextual menu from which the user adds the first media item to the user's favorite media items when not on the canonical page for the first media item, or the user has provided a voice command to a virtual assistant on the electronic device to "add this to my favorites" (when on the canonical page for the first media item) or "add [media item name] to my favorites" (when not on the canonical page for the first media item). In some embodiments, the second media item is included (724) in the suggested media items based on prior viewing activity of the user with respect to media on the electronic device, such as in FIG. 6A (e.g., instead of being included based on selection of the second media item for inclusion in the suggested media items). For example, the user of the electronic device has watched previous episodes in a television series and the second media item is the next episode in the television series, such as in FIG. 6L, the user of the electronic device has partially watched the second media item, such as in FIG. 6A, the user of the electronic device has rented/purchased the second media item, such as in FIG. 6G, etc. By displaying these media items in a centralized user interface despite being interacted with in differing ways by the user, the electronic device improves the efficiency with which information about media items that may be of interested to the user is conveyed to the user, thus improving user-electronic device interactions.

In some embodiments, the second media item is part (726) of a collection of episodic media, such as in FIG. 6L (e.g., a television series, a mini-series, or the like). In some embodiments, the collection of episodic media includes (728) media items available via a first content provider and a second content provider. In some embodiments, the second media item is available (730) via the second content provider but not via the first content provider, such as in FIG. 6L. In some embodiments, the second media item was selected (732) for inclusion in the suggested media items based on viewing activity of the user with respect to media items in the collection of episodic media that are available via the first content provider (but not via the second content provider), such as in FIG. 6L. For example, the user of the electronic device viewed a previous media item of the collection of episodic media on the electronic device via a first media provider (e.g., the user watched the prior episode of the television series via a first media application on the electronic device that provides access to media from the first media provider), and the second media item is included in the user interface as being available via a second media provider, because the second media item is not available via the first media provider (e.g., selection of the second media item will provide the second media item for viewing by the user via a second media application on the electronic device, not the first media application on the electronic device). Thus, in some embodiments, the electronic device provides the user with easy access to media despite the media being accessible via different media applications, thus improving user-electronic device interactions.

In some embodiments, in accordance with a determination that access to a respective media item of the suggested media items will be expiring (e.g., rental expiration, expiration of availability via a streaming service, etc.) within a predetermined time period (e.g., twelve hours, one day, three days, etc.), the electronic device prioritizes (734) display of a representation of the respective media item in the representations of the suggested media items based on the upcoming expiration of the access to the respective media item, such as in FIG. 6Q (e.g., at or near the front of the list of suggested media items in the user interface). In some embodiments, if access to the respective media item is not expiring within the predetermined time period, the electronic device does not prioritize the display of the representation of the respective media item; for example, the respective media item is optionally displayed in the list of suggested media items, but outside of the front portion of the list (e.g., the position of the representation of the second media item in the representations of suggested media items is selected based on an upcoming expiration of access to the second media item), such as in FIG. 6P.

In some embodiments, in accordance with a determination that a respective media item of the suggested media items is a new episode in a collection of episodic media (e.g., a newly-released episode in a television series, a mini-series, or the like) that a user of the electronic device has been watching (e.g., the user has watched one or more previous episodes of the collection of episodic media), and that the user has not yet watched the new episode, the electronic device prioritizes (736) display of a representation of the respective media item in the representations of the suggested media items based on the recency of the user's entitlement to access the respective media item, such as in FIG. 6N (e.g., at or near the front of the list of suggested media items in the user interface). If the user has already watched the respective media item, the respective media item is optionally not displayed in the priority region of the user interface; for example, the respective media item is optionally displayed in the list of suggested media items, but outside of the front portion of the list if the user has partially watched the respective media item, or the respective media item is not displayed at all if the user has completely watched the respective media item. For example, the position of the representation of the second media item in the representations of suggested media items is selected based on the recency with which the user became entitled to access the second media item (e.g., because the episode was just released on a content provider with which the user has an active subscription). By prioritizing display of representations of certain media items based on time-considerations, the electronic device more effectively conveys media item availability to the user, thus improving the efficiency of conveying such information to the user.

In some embodiments, in accordance with a determination (738) that a user of the electronic device has partially watched the first media item, the first representative content that corresponds to the first media item includes a visual indicator of a playback progress for the first media item, such as in FIG. 6A. In some embodiments, in accordance with a determination (740) that the user of the electronic device has partially watched the second media item, the second representative content that corresponds to the second media item includes a visual indicator of a playback progress for the second media item (e.g., if the user has partially watched a media item that has the current focus, the background of the user interface includes a progress bar or other indicator that indicates how much of the media the user has watched). If the user has not partially watched the media item that has the current focus, the background optionally does not include such an indicator, such as in FIG. 6D. By including such an indicator in the background of the user interface, the electronic device more effectively conveys media item information to the user, thus improving the efficiency of conveying such information to the user.

In some embodiments, the first representative content that corresponds to the first media item includes (742) information indicating why the first media item is included in the suggested media items, and the second representative content that corresponds to the second media item includes (744) information indicating why the second media item is included in the suggested media items, such as in FIGS. 6A-6G (e.g., the background optionally displays information about why the media item with the current focus was included by the electronic device in the suggested content). For example, the background optionally indicates that the user favorited the media item, the user partially viewed the media item, the user watched other media that is related to the media item, etc. For example, for a media item that was partially viewed, the information includes "continue" and, optionally, playback progress information. For a media item that was favorited, the information includes "favorite" and, optionally, a total play time. For a media item that was purchased, the information includes "purchased" and, optionally, a total play time. For a media item that was rented, the information includes "rented" and, optionally, a total play time, a time to expiration of the rental (e.g., expires in 20 days) and/or playback progress information. For a media item that was purchased, the information includes "purchased" and, optionally, a total play time. For a media item that corresponds to a next episode of a collection of episodic media, the information includes "next episode" and, optionally, an indication of the position of the media item in the collection of episodic media (e.g., season 5, episode 2). For a media item that corresponds to a newly available episode of a collection of episodic media, the information includes "new episode" and, optionally, an indication of the position of the media item in the collection of episodic media (e.g., season 5, episode 2). For a media item that corresponds to media item that will be removed from a subscription service, the information includes "expiring soon" and, optionally, an indication of when the media item will be removed from the subscription service (available until October 30). For a media item that corresponds to a next episode of a collection of episodic media that is not available to the user without a purchase or subscription, the information includes "next episode" and, an indication that the user is not entitled to play the media item (e.g., buy or subscribe). By including such information in the background of the user interface, the electronic device more effectively conveys media item information to the user, thus improving the efficiency of conveying such information to the user.

In some embodiments, the first representative content that corresponds to the first media item includes (746) information indicating a source of the first media item, and the second representative content that corresponds to the second media item includes (748) information indicating a source of the second media item, such as in FIGS. 6A-6G (e.g., the background optionally displays information about the source of the media item with the current focus). For example, the background optionally includes a logo of the television channel from which the media item is available, an icon of a media application on which the media is available, etc. By including such information in the background of the user interface, the electronic device more effectively conveys media item information to the user, thus improving the efficiency of conveying such information to the user.

In some embodiments, the electronic device receives (750), via the one or more input devices, an input corresponding to a selection of a respective representation of a respective media item of the suggested media items, such as in FIG. 6R (e.g., a click of a button on the input devices when the respective representation has the focus). In some embodiments, in response to receiving the input (752) corresponding to the selection of the respective representation of the respective media item, the electronic device launches (754) a media application (e.g., a different application than the application in which the media items are being displayed, or the same application as the application in which the media items are being displayed) corresponding to the respective media item on the electronic device, such as in FIG. 6S. In some embodiments, the electronic device causes playback (756), on the display, of the respective media item in the media application corresponding to the respective media item, such as in FIG. 6S.

In some embodiments, the input corresponding to the request to navigate through the plurality of suggested media items corresponds (758) to a request to navigate through the plurality of suggested media items in a first direction, such as in FIGS. 6B-6D (e.g., the input comprises a horizontal, right/left scrolling input). In some embodiments, the electronic device receives (760), via the one or more input devices, a second input corresponding to a request to navigate further through the plurality of suggested media items in a second direction, different from the first direction, such as in FIGS. 6H-6I (e.g., the second input comprises a vertical, up/down scrolling input). In some embodiments, in response to receiving the second input corresponding to the request to navigate further through the plurality of suggested media items, the electronic device reveals (762), in the user interface, one or more representations of additional suggested media items available on the electronic device, wherein the representations of the additional suggested media items (e.g., items that are not in the "up next" queue) were not displayed in the user interface prior to receiving the second input, such as in FIGS. 6H-6I (e.g., scrolling past the originally suggested media items caused additional suggested media items to be displayed). In some examples, the additional suggested media items are not selected based on prior user actions associated with those media items. In some embodiments, the additional suggested media items comprise trending media items (media items popular with other viewers), media items selected for advertisement by content providers or other third parties, etc. In some embodiments, the electronic device receives (764), via the one or more input devices, an input corresponding to a selection of a second respective representation of a second respective media item of the additional suggested media items, such as in FIG. 6W (e.g., a click of a button on the input devices when the respective representation has the focus). In some embodiments, in response to receiving the input corresponding to the selection of the second respective representation of the second respective media item, the electronic device displays (766), on the display, a media information page corresponding to the second respective media item, such as in FIG. 6X (e.g., a user interface that is optionally a dedicated canonical page for the second respective media item). For example, a canonical page that includes information about the second respective media item and a selectable affordance that, when selected, causes the second respective media item to be played on the electronic device.

In some embodiments, while the media application corresponding to the respective media item is displayed on the display, the electronic device receives (768), via the one or more input devices, an input corresponding to a request to navigate backward on the electronic device, such as in FIG. 6T (e.g., selection of button 516 on remote 510, an input corresponding to an input to move backward in a navigation hierarchy, etc.). In some embodiments, in response to receiving the input corresponding to the request to navigate backward on the electronic device, the electronic device navigates (770) backward within the media application in accordance with the input, such as in FIG. 6U (e.g., the link into the media application is a "deep" link such that when the user has entered the media application to play the respective media item, the navigation hierarchy of the media application governs the response of the electronic device to navigational inputs detected at the input devices). However, in some embodiments, a backward navigation input received here within the media application navigates back to the user interface in which the representations of the suggested media items were displayed, rather than navigating backward within the media application.

In some embodiments, a respective suggested media item is included (772) in the suggested media items based on prior user action that occurred on a second electronic device, different from the electronic device, such as in FIG. 6Y (e.g., the user partially watched the respective suggested media item on the second electronic device, not on the electronic device). In some embodiments, the user's actions, on other devices, with respect to media items cause those media items to be displayed in the suggested media items on the current electronic device, because, for example, the suggested media items are associated with a user account of the user that the user is logged into on multiple electronic devices, including the current electronic device and the second electronic device. In some embodiments, no media application via which the respective suggested media item is available is installed (774) on the electronic device, such as in FIG. 6Y (e.g., the respective suggested media item is displayed as a suggested media item on the electronic device even though no media application for watching the respective suggested media item is installed on the electronic device). In some embodiments, a respective media application via which the respective suggested media item is available is installed on the second electronic device. Displaying the respective suggested media item allows the user to discover the existence of the respective suggested media item, and gives the user an opportunity to install the media application to view the respective suggested media item, thus improving user-electronic device interactions.

In some embodiments, the electronic device receives (776), via the one or more input devices, an input corresponding to a selection of a respective representation of the respective suggested media item, such as in FIG. 6Z (e.g., a click of a button on the input devices when the respective representation has the focus). In some embodiments, in response to receiving the input corresponding to the selection of the respective representation of the respective suggested media item, the electronic device displays, on the display, a prompt to install the respective media application on the electronic device, such as in FIG. 6AA (e.g., because no media application for viewing the respective media item is installed on the electronic device, selection of the respective media item for playback prompts the user to install a media application for viewing the respective media item).

In some embodiments, the electronic device receives (778), via the one or more input devices, a sequence of inputs corresponding to inputs to install the respective media application on the electronic device and authorize the respective media application on the electronic device, such as in FIGS. 6BB-6DD (e.g., the user installs and signs-into the media application or signs-up for the service provided by the media application). In some embodiments, upon installing and authorizing the respective media application on the electronic device, without further user intervention, the electronic device starts playback (780) of the respective media item on the display, such as in FIG. 6EE (e.g., after installation and sign-in or sign-up via the media application, the electronic device immediately begins playback of the media item in the media application, rather than displaying a navigation or initial launch user interface of the media application, such as a home screen of the media application). Thus, no further user action is optionally required after the installation and authorization of the respective media application before the respective media item is played on the electronic device. This result simplifies the user's experience with viewing a media item when installation of a media application is first required, thus improving user-electronic device interactions.

In some embodiments, the electronic device receives (782), via the one or more input devices, an input corresponding to a first action with respect to a respective media item not included in the suggested media items, such as in FIG. 6GG (e.g., the user partially watches the respective media item, the user favorites the respective media item, etc.). In some embodiments, after receiving the input corresponding to the first action with respect to the respective media item, the electronic device displays (784), on the display, the user interface including the plurality of representations of the suggested media items (e.g., after taking the first action with respect to the respective media item, the user re-displays the media navigation user interface of the media browsing application), the plurality of representations of the suggested media items including a representation of the respective media item, such as in FIG. 6HH (e.g., the respective media item becomes a suggested media item due to the user's actions with respect to the respective media item).

In some embodiments, while displaying the user interface on the display, the electronic device receives (786), via the one or more input devices, an input enabling a private media browsing mode on the electronic device, such as in FIG. 6II (e.g., selection of a private browsing mode toggle in the settings for the media browsing application). In some embodiments, in response to receiving the input enabling the private media browsing mode on the electronic device (788), the electronics device enables (790) the private media browsing mode on the electronic device and replaces (792) the plurality of representations of the suggested media items in the user interface with a second plurality of representations of second suggested media items that are not selected for inclusion in the user interface based on prior user actions associated with those media items, such as in FIG. 6II. For example, in the private media browsing mode, the electronic device optionally does not provide suggested media items to the user that are selected based on the user's media viewing activity and/or are specific to the user. Rather, in some embodiments, the electronic device provides suggested media items that are popular with other viewers (e.g., trending media items), or media items that are otherwise selected by a third party, such as in FIG. 6II.

In some embodiments, while the private media browsing mode is enabled on the electronic device, the electronic device receives (794), via the one or more input devices, a second input corresponding to the first action with respect to a second respective media item not included in the suggested media items, such as in FIG. 6JJ (e.g., the user partially watches the second respective media item, the user favorites the second respective media item, etc.). In some embodiments, after receiving the second input, the electronic device receives (796), via the one or more input devices, an input disabling the private media browsing mode on the electronic device, such as in FIG. 6LL. In some embodiments, in response to receiving the input (798) disabling the private media browsing mode on the electronic device, the electronic device disables (798-2) the private media browsing mode on the electronic device and redisplays (798-4) the plurality of representations of the suggested media items in the user interface, the plurality of representations of the suggested media items not including a representation of the second respective media item, such as in FIG. 6LL (e.g., the electronic device optionally does not track media viewing actions of the user when the electronic device is in the private media browsing mode). For example, even though the user has taken an action with respect to the second respective media item that would otherwise cause the second respective media item to be included in the suggested media items in the media browsing application, because the user took that action while the electronic device was in the private media browsing mode, the electronic device does not include the second respective media item in the suggested media items.

In some embodiments, while the private media browsing mode is enabled on the electronic device, the electronic device receives (798-6), via the one or more input devices, an input disabling the private media browsing mode on the electronic device, such as in FIG. 6LL (e.g., deselection of a private browsing mode toggle in the settings for the media browsing application). In some embodiments, in response to receiving the input (798-8) disabling the private media browsing mode on the electronic device, the electronic device disables (798-10) the private media browsing mode on the electronic device and redisplays (798-12) the plurality of representations of the suggested media items in the user interface, such as in FIG. 6LL (e.g., when the private media browsing mode is disabled, the electronic device optionally returns to displaying suggested media items to the user that are selected based on the user's media viewing activity and/or are specific to the user). Such private media browsing capabilities of the electronic device allow the user to browse and view media items on the electronic device without the electronic device tracking such activities when not desired, thus improving user-electronic device interactions.

It should be understood that the particular order in which the operations in FIGS. 7A-7L have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100, 1300 and 1900) are also applicable in an analogous manner to method 700 described above with respect to FIGS. 7A-7L. For example, the unified media browsing application and user interface, suggested media items, trending media items, media applications, representations of suggested and trending media items, and media providers described above with reference to method 700 optionally have one or more of the characteristics of the unified media browsing application and user interface, suggested media items, trending media items, media applications, representations of suggested and trending media items, and media providers described herein with reference to other methods described herein (e.g., methods 900, 1100, 1300 and 1900). For brevity, these details are not repeated here.

The operations in the information processing methods described above are, optionally, implemented by running one or more functional modules in an information processing apparatus such as general purpose processors (e.g., as described with respect to FIGS. 1A, 3, 5A and 14) or application specific chips. Further, the operations described above with reference to FIGS. 7A-7L are, optionally, implemented by components depicted in FIGS. 1A-1B. For example, displaying operation 702, receiving operation 704, transitioning operation 708 and replacing operation 710 are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Category-Based Media Browsing

Users interact with electronic devices in many different manners, including interacting with media (e.g., music, movies, etc.) that may be available (e.g., stored or otherwise accessible) on the electronic devices (e.g. as described with reference to FIGS. 6A-6LL, FIGS. 8A-8GG, FIGS. 10A-10Z, FIGS. 12A-12V and/or FIGS. 18A-18J). For example, a user may browse and play media that is accessible on the electronic device. The user may desire to browse such media by category (e.g., movies, television shoes, etc.). The embodiments described below provide ways in which an electronic device facilitates browsing of media items by category, thereby enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 8A-8GG illustrate exemplary ways in which an electronic device facilitates browsing of media items by category in accordance with some embodiments of the disclosure. The embodiments in these figures are used to illustrate the processes described below, including the processes described with reference to FIGS. 9A-9H.

Figure 8A:
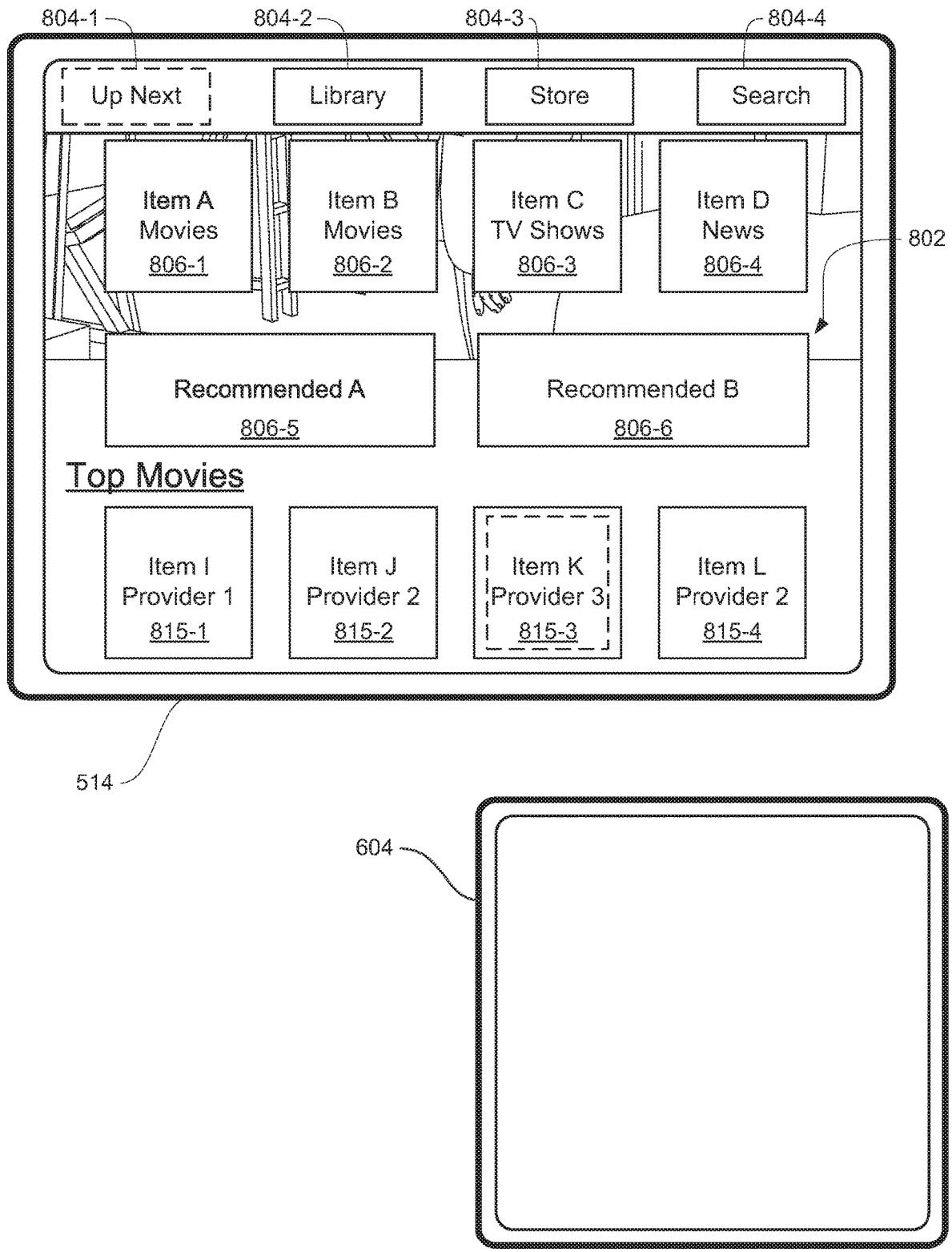
FIGS. 8A-8GG illustrate exemplary ways in which an electronic device facilitates browsing of media items by category in accordance with some embodiments of the disclosure.

FIG. 8A illustrates exemplary display 514. Display 514 optionally displays one or more user interfaces that include various content. In the example illustrated in FIG. 8A, display 514 displays a unified media browsing application running on an electronic device (e.g., electronic device 500 of FIG. 5A) of which display 514 is a part, or to which display 514 is connected (e.g., a unified media browsing application as described with reference to FIGS. 6A-6LL). In FIG. 8A, the unified media browsing application displays unified media browsing user interface 802 for browsing through various media accessible on the electronic device. User interface 802 includes selectable user interface elements 804-1 to 804-4 in a top menu bar to navigate through the unified media browsing application, which will be described in more detail below. Further, as described with reference to FIGS. 6A-6LL, in some embodiments, the electronic device ceases displaying the top menu bar after (e.g., within a predetermined time after) one of user interface elements 804 is selected. In FIG. 8A, user interface element 804-1 corresponding to suggested media items is currently-selected (indicated by the dashed-line border), and the electronic device is displaying representations 806-1 to 806-6 of suggested media items and representations 815-1 to 815-4 of trending media items (e.g., suggested and trending media items as described with reference to FIGS. 6A-6LL), and representation 815-3 corresponding to media item K has the current focus (indicated by the dashed-line box within representation 815-3). In FIG. 8A, representations 806 of suggested media items and representations 815 of trending media items are displayed in rows. In some embodiments, the electronic device only displays representations 806 and 815 of media items that the user of the electronic device is entitled to access (e.g., the user has a subscription with a media provider that provides the electronic device access to the media items, the user has purchased the media items, etc.), and does not display representations of media items that the user of the electronic device is not entitled to access.

In some embodiments, selection of a representation of a trending media item in FIG. 8A causes the electronic device to display a canonical page corresponding to that trending media item. For example, in FIG. 8B, a click of touch-sensitive surface 604 is detected while representation 815-3, corresponding to media item K, has the current focus. In response, the electronic displays a canonical page corresponding to media item K, as shown in FIG. 8C, which includes various information and user interface objects as described with reference to FIG. 6X. The canonical page corresponding to media item K also includes button 808, selection of which will cause the electronic device to play media item K, as shown in FIGS. 8C-8D.

In some embodiments, the user of the electronic device is able to scroll through representations 815 of trending media items to reveal, in user interface 802, user interface elements for browsing media items by category. For example, in FIGS. 8E-8H, top-to-bottom swipes of contact 608 are detected on touch-sensitive surface 604. In response, the electronic device scrolls through representations 815 of trending media items to reveal, in user interface 802, additional trending media items (e.g., top TV shows), and eventually user interface elements 812-1 to 812-4 that correspond to categories of suggested media available on the electronic device. For example, user interface elements 812 include user interface element 812-1 corresponding to movies, user interface element 812-2 corresponding to television shows, user interface element 812-3 corresponding to news shows, and user interface element 812-4 corresponding to sports shows. As shown in FIG. 8H, user interface elements 812 corresponding to media categories are displayed in a row, similar to how representations 806 of suggested media items are displayed.

Selection of one of user interface elements 812 causes the electronic device to display media items, assessable by the electronic device, of the selected category. For example, in FIG. 8I, a click of touch-sensitive surface 604 has been detected while user interface element 812-1, corresponding to movies, has the current focus. In response, the electronic device replaces display of representations 815 of trending media items and user interface elements 812 of media categories with representations 814-1 to 814-12 of media items in the movies category, as shown in FIG. 8J. In some embodiments, representations 814 of media items in the movies category are displayed with the same spatial arrangement as representations 815 of trending media items and/or user interface elements 812 of media categories (e.g., in rows). Additionally, the media items for which representations 814 are displayed in FIG. 8J are optionally different than the media items for which representations 806 and/or 815 are displayed in FIGS. 8E-8G, such that the same media item is not displayed multiple times as the user browses through media in the unified media browsing application. As shown in FIG. 8J, in some embodiments, the movie media items 814 are displayed in groups based on one or more shared characteristics (e.g., award-winning, popular, highly-rated, etc.).

Similar to as described with reference to FIGS. 8E-8H, the user is able to scroll through representations 814 of media items in the selected category to reveal, in user interface 802, user interface elements for browsing media items by sub-categories of the selected category. For example, in FIGS. 8K-8L, top-to-bottom swipes of contact 608 are detected on touch-sensitive surface 604. In response, the electronic device scrolls through representations 814 of media items in the movies category to reveal, in user interface 802, user interface elements 816-1 to 816-4 that correspond to sub-categories of movies media available on the electronic device. For example, user interface elements 816 include user interface element 816-1 corresponding to dramas, user interface element 816-2 corresponding to comedies, user interface element 816-3 corresponding to suspense movies, and user interface element 816-4 corresponding to action movies. As shown in FIG. 8L, user interface elements 816 corresponding to media sub-categories are displayed in a row, similar to how representations 806 of suggested media items, representations 815 of trending media items, and representations 814 of movie media items are displayed. Additionally, similar to above, selection of one of user interface elements 816 causes the electronic device to display media items, assessable by the electronic device, of the selected sub-category (e.g., similar to as described with reference to FIGS. 8I-8J).

In some embodiments, the user is able to scroll past the representations 806 of suggested media items, representations 815 of trending media items and the user interface elements 812 for browsing media items by category, to reveal, in user interface 802, additional representations of suggested media items that are grouped together by category (e.g., different categories than the categories represented by user interface elements 812). For example, in FIGS. 8M-8P, top-to-bottom swipes of contact 608 are detected on touch-sensitive surface 604. In response, the electronic device scrolls through representations 806 of media items, representations 815 of trending media items and user interface elements 812 to reveal, in user interface 802, representations 818-1 to 818-4 of music video trending media items that are suggested for the user. As shown in FIG. 8P, representations 818 corresponding to music video media items are displayed in a row, similar to how representations 806 of suggested media items, representations 815 of trending media items and user interface elements 812 corresponding to media categories are displayed. Additionally, similar to above, selection of one of representations 818 causes the electronic device to display a canonical page corresponding to the media item of the selected representation (e.g., similar to as described with reference to FIGS. 8B-8C). In FIG. 8Q, an additional top-to-bottom swipe of contact 608 is detected on touch-sensitive surface 604 to reveal additional trending media items, which are in the documentaries category of media items, similar to as described above. Additional trending media items are optionally accessible in response to further scrolling through user interface 802.

As described above, in some circumstances, the electronic device displays a media-category user interface element 812 for a given media category via which media items in that media category may be browsed (e.g., user interface element 812-1 for browsing movies), and in other circumstances, does not display a media-category user interface element 812 for the given media category (e.g., rather, the electronic device displays representations of media items in a given media category as a row in user interface 802, without first requiring selection of a media-category user interface element 812 for browsing media items in that category (e.g., representations 818 of music video and documentary media items in FIGS. 8P-8Q)). In some embodiments, the electronic device displays a media-category user interface element 812 for a given media category if sufficient (e.g., more than three, five, ten) suggested media items are in that media category; otherwise, the electronic device directly displays representations of those media items in user interface 802 without grouping those suggested media items behind a corresponding user interface element 812. For example, in FIG. 8R, three suggested media items are included in the Sports media category. Because three media items is below the threshold number of media items for creating a user interface element 812 for the Sports category (e.g., four media items), the electronic device does not display a Sports user interface element 812, but rather displays representations 818-9 to 818-11 of the sports media items in a row in user interface 802, as shown in FIG. 8R. If, however, the Sports category included four suggested media items, as shown in FIG. 8S, the electronic device displays user interface element 812-4 corresponding to the Sports category, and does not display representations of the sports media items in a row in user interface 802, as shown in FIG. 8T.

In some embodiments, the electronic device has the ability to enforce media restrictions (e.g., set by the user) to restrict access to media having certain content ratings (e.g., R rating, PG-13 rating, etc.). When such media restrictions are in effect, the electronic device optionally omits media items from its suggested and/or trending media items that are restricted by the media restrictions. For example, in FIG. 8U, no media restrictions are in effect (indicated by 820), and the electronic device is displaying representations 815 of trending media items in user interface 802. In FIG. 8V, media restrictions have been put in place that limit user access to media that is rated PG-13 or below (indicated by 820). As a result, the electronic device no longer displays representations 815-2 and 815-5 of suggested media items, which correspond to media items having R-ratings, in user interface 802.

Figure 8B:
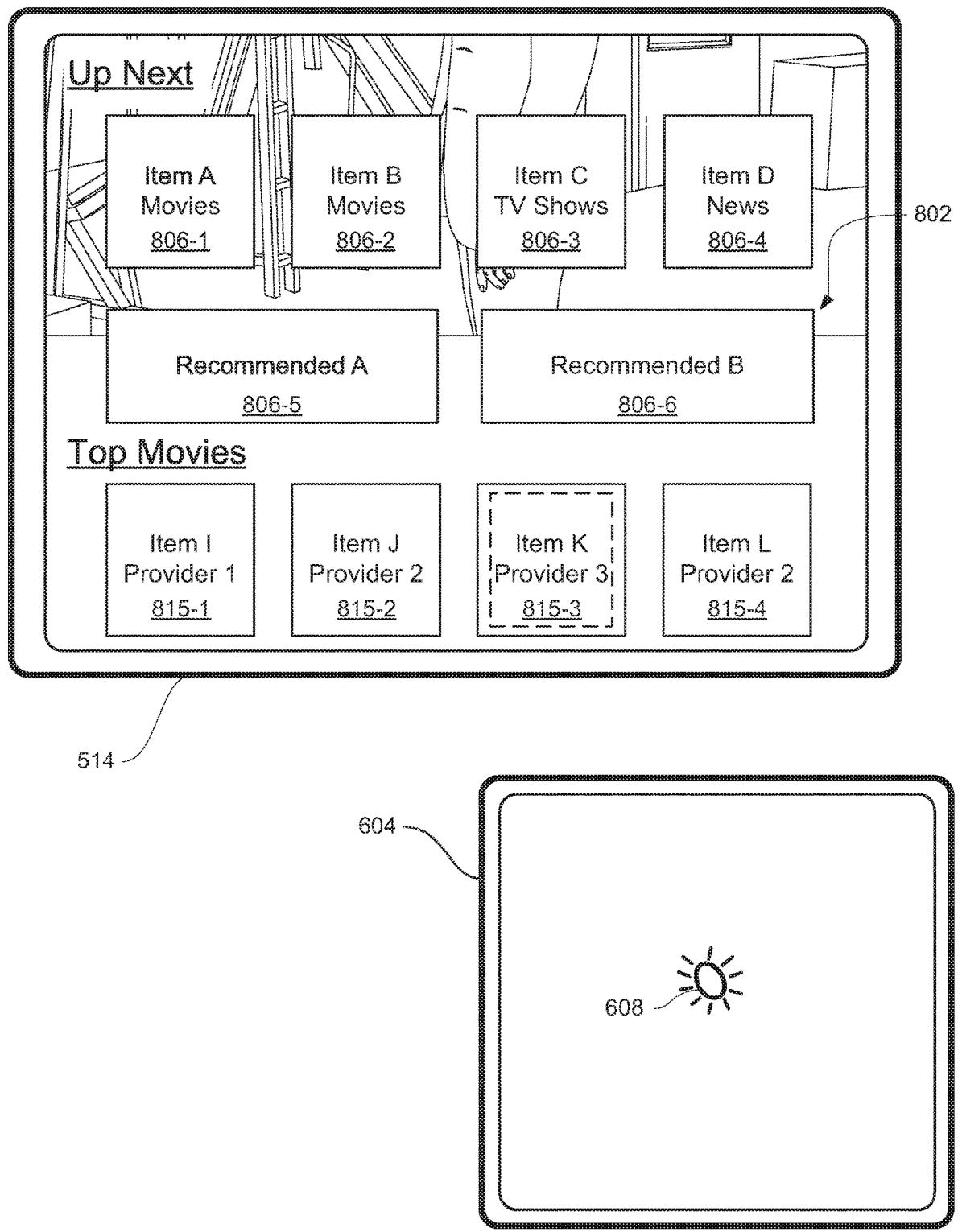
Figure 8C:
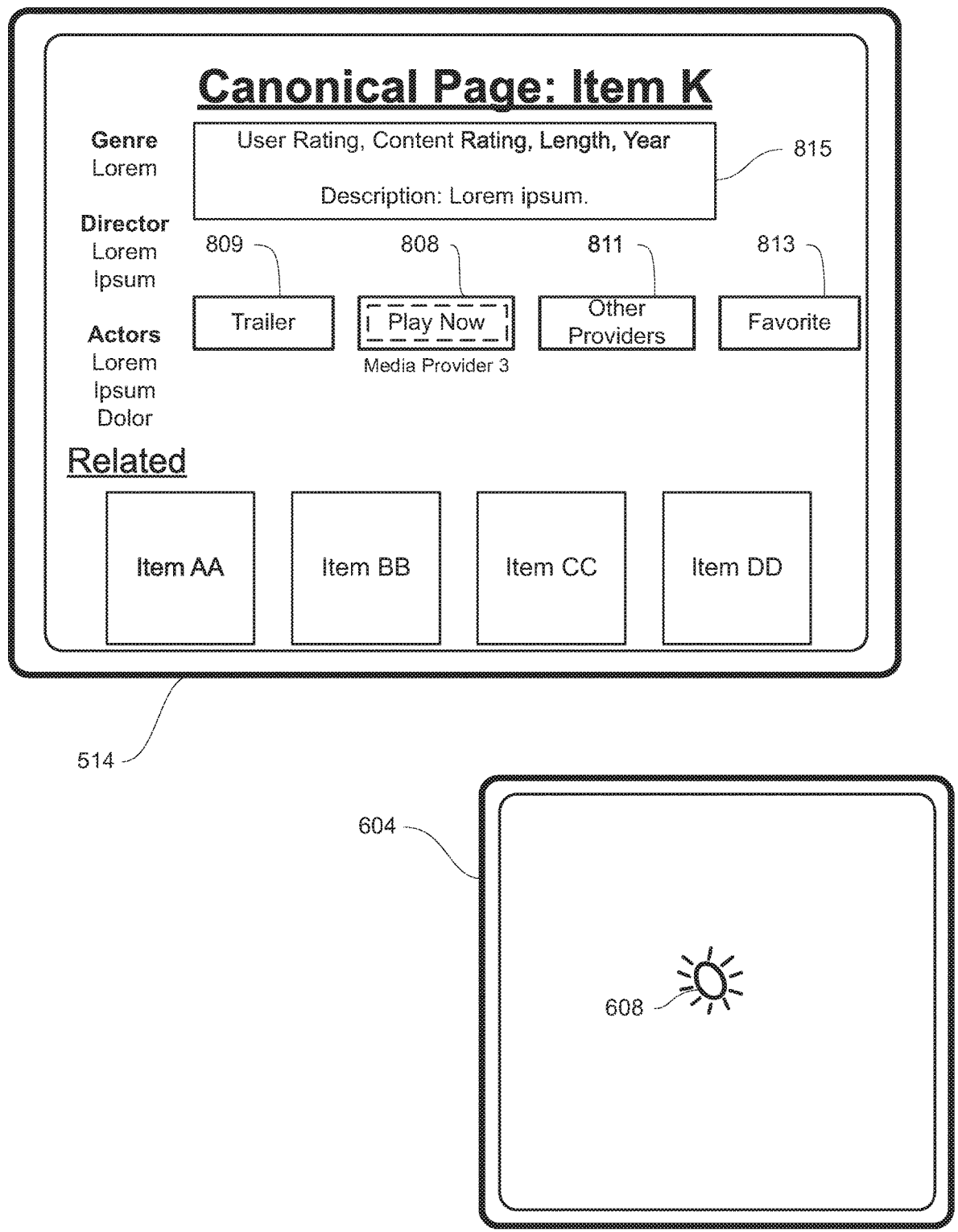
Figure 8D:
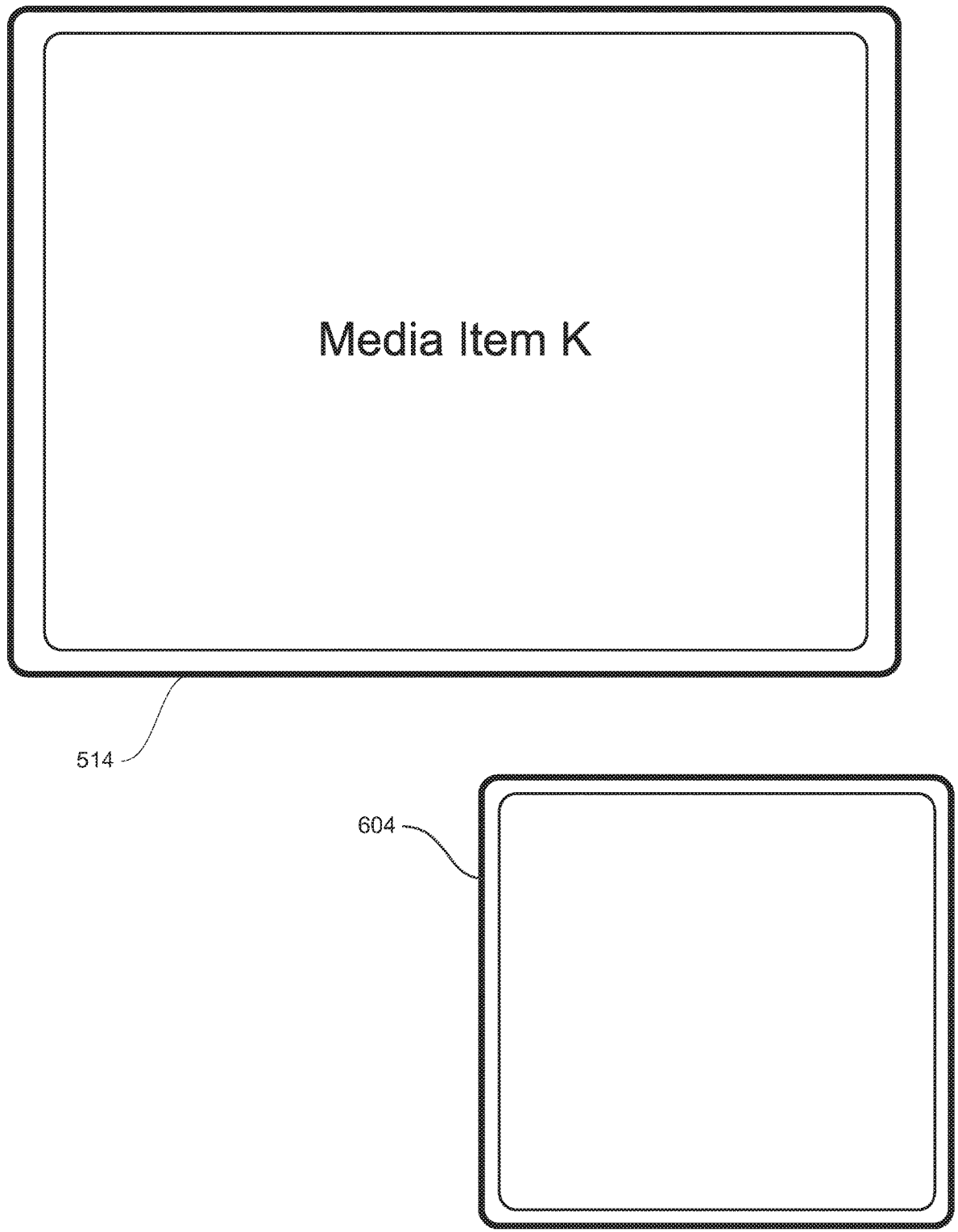
Figure 8E:
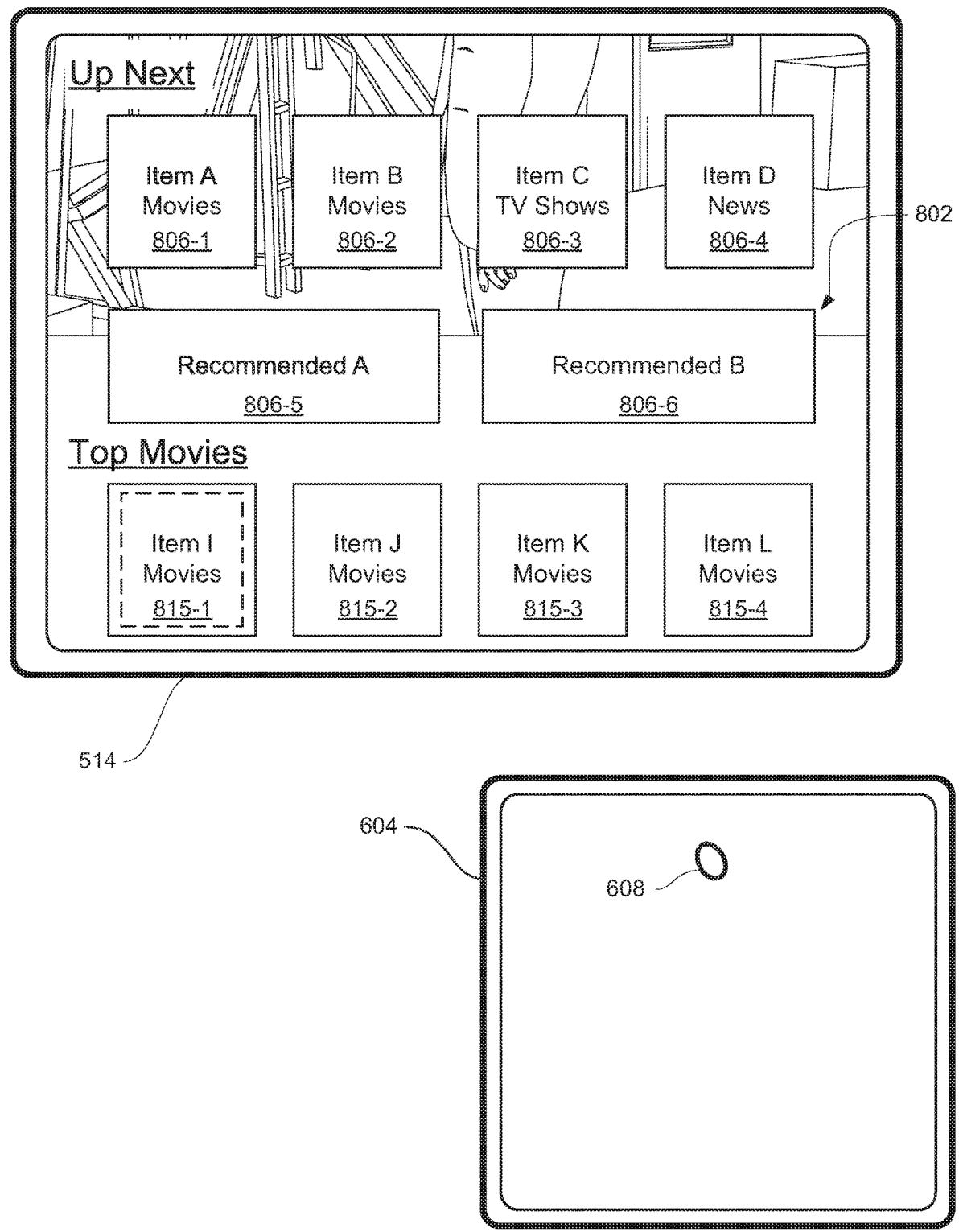
Figure 8F:
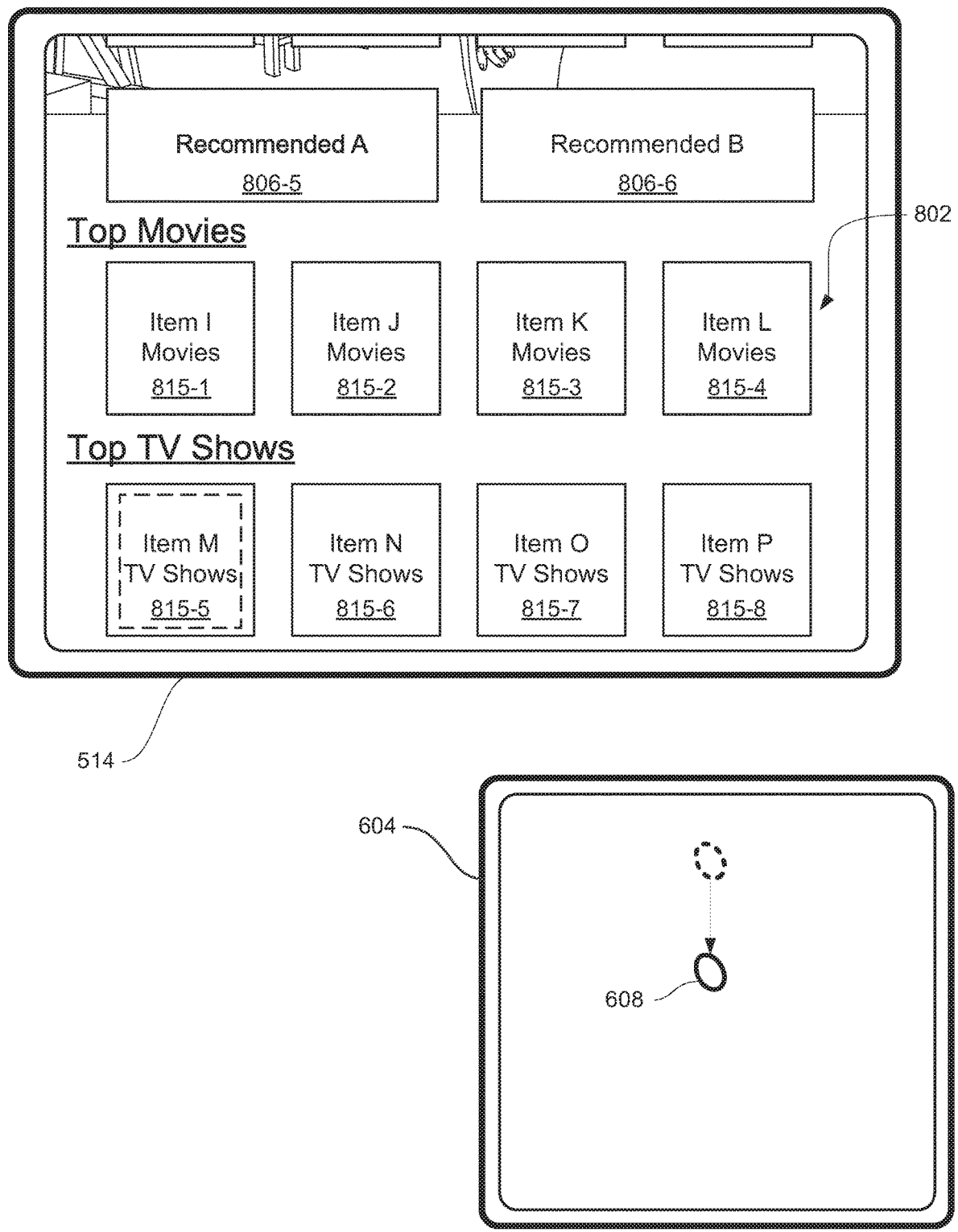
Figure 8G:
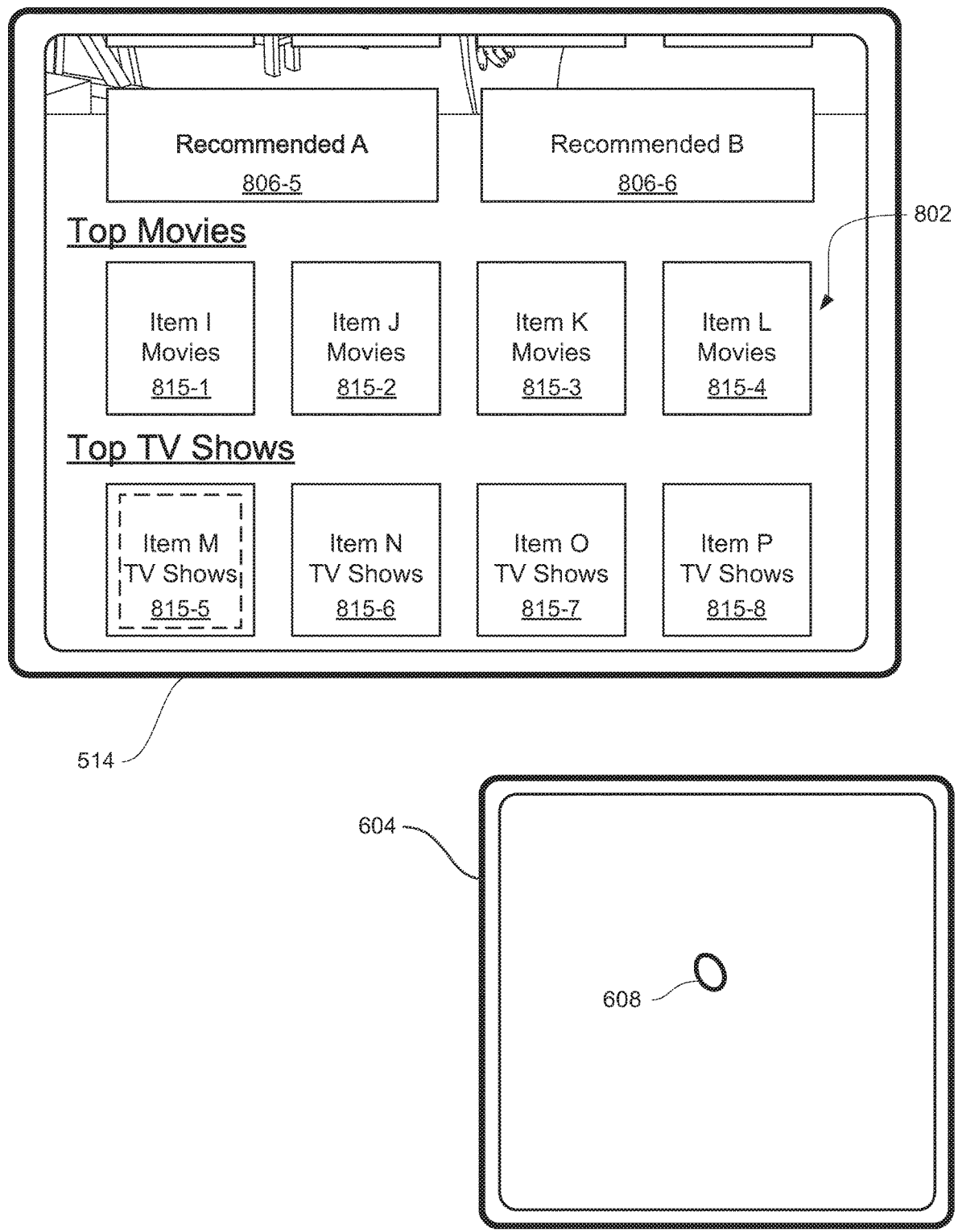
Figure 8H:
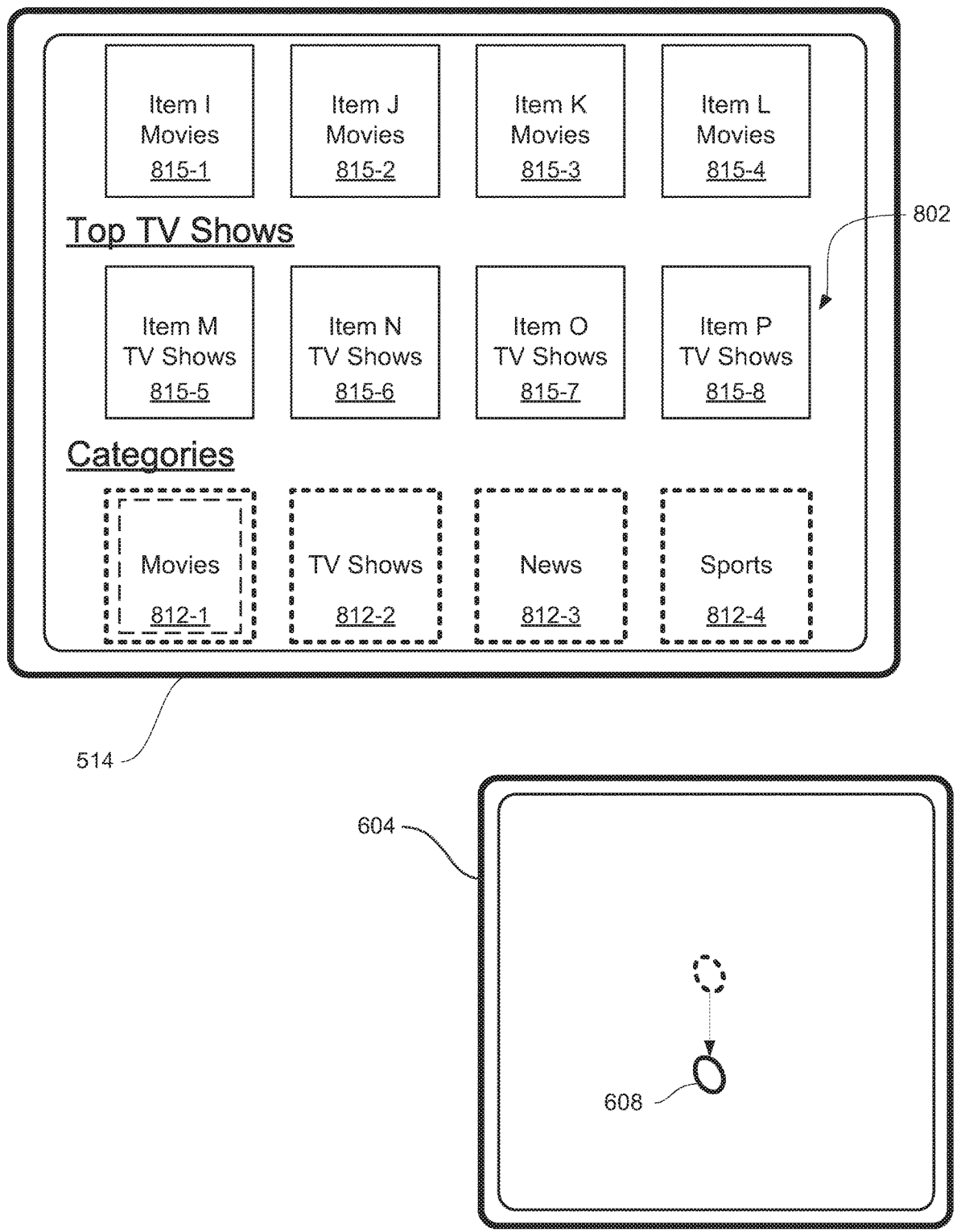
Figure 8I:
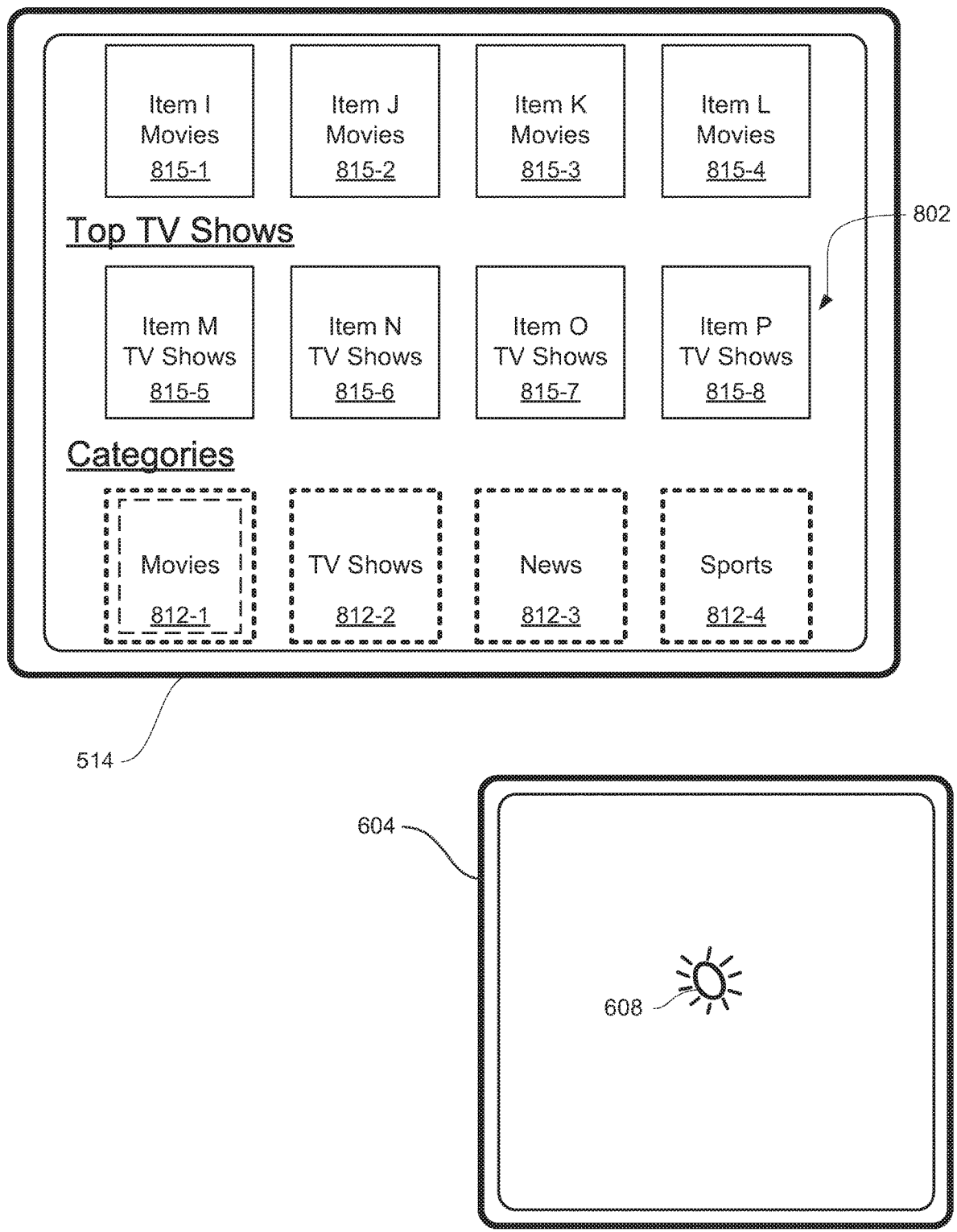
Figure 8J:
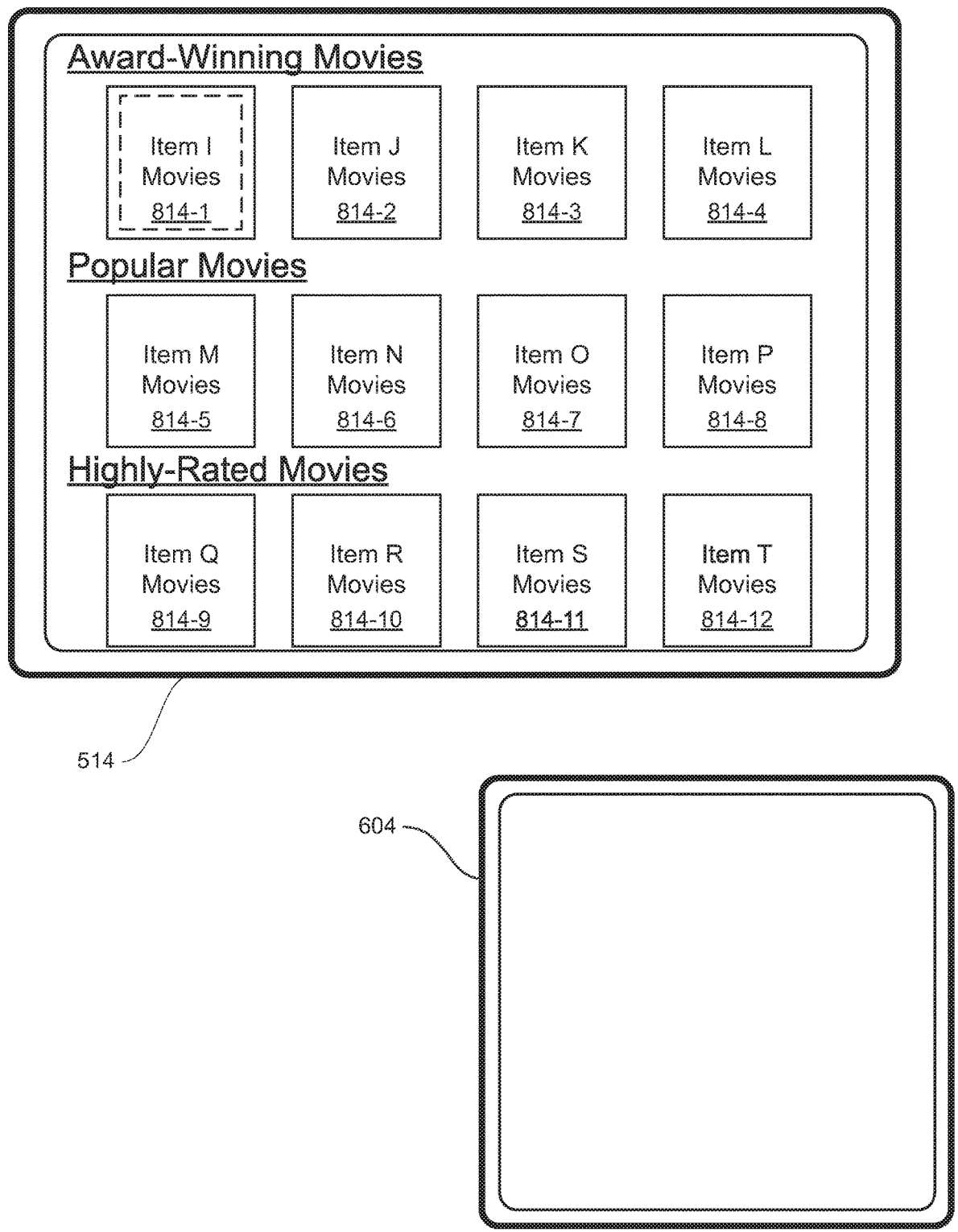
Figure 8K:
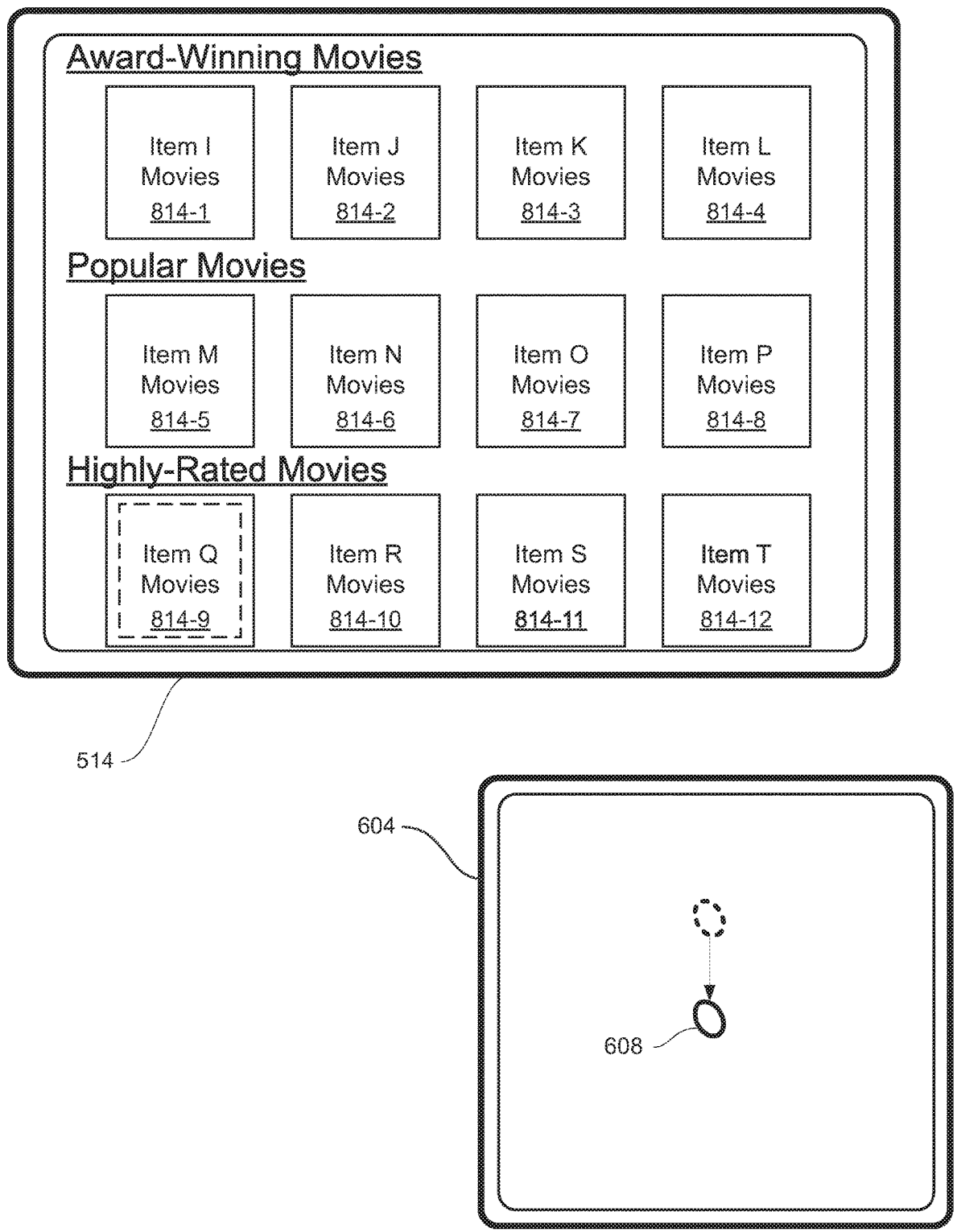
Figure 8L:
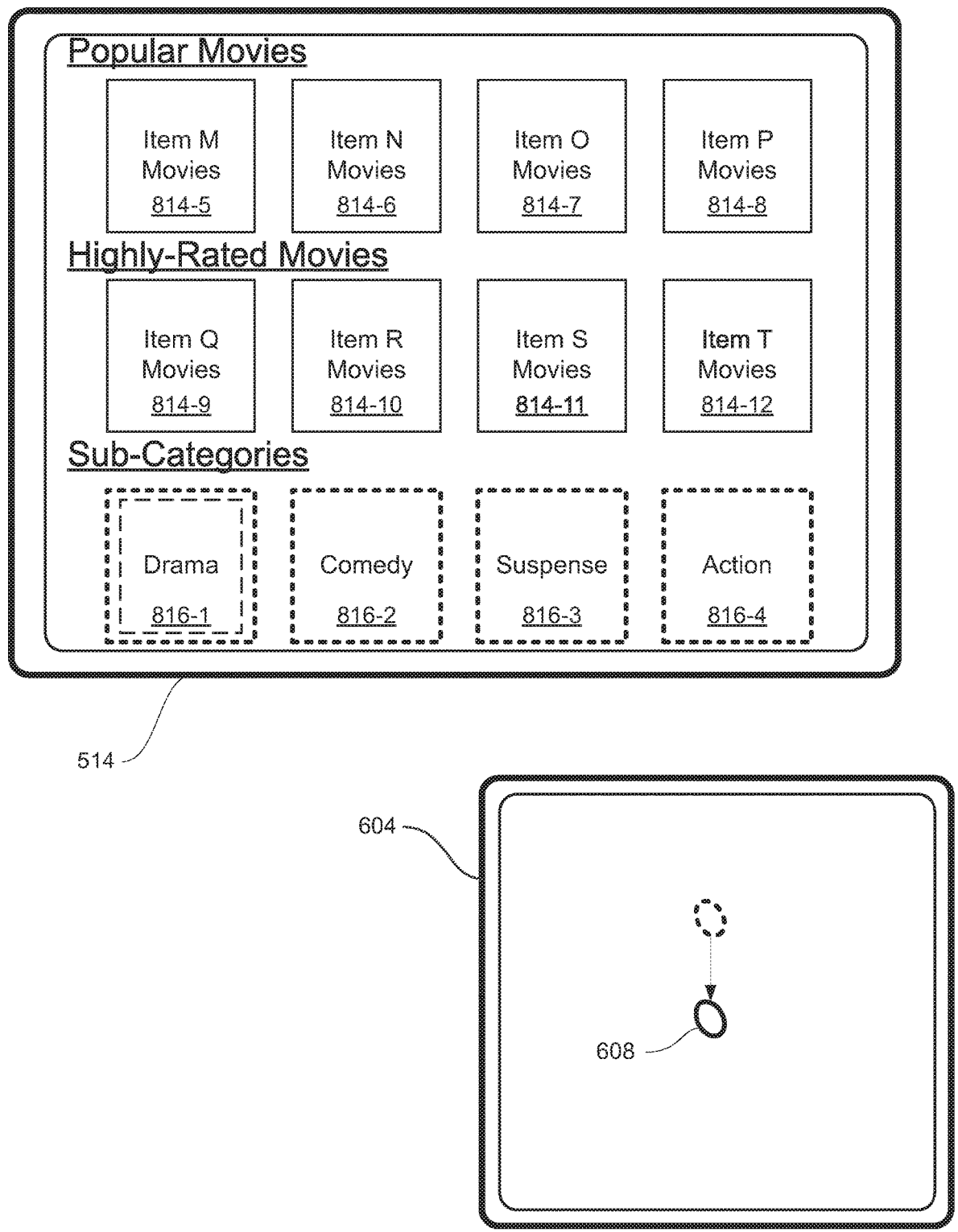
Figure 8M:
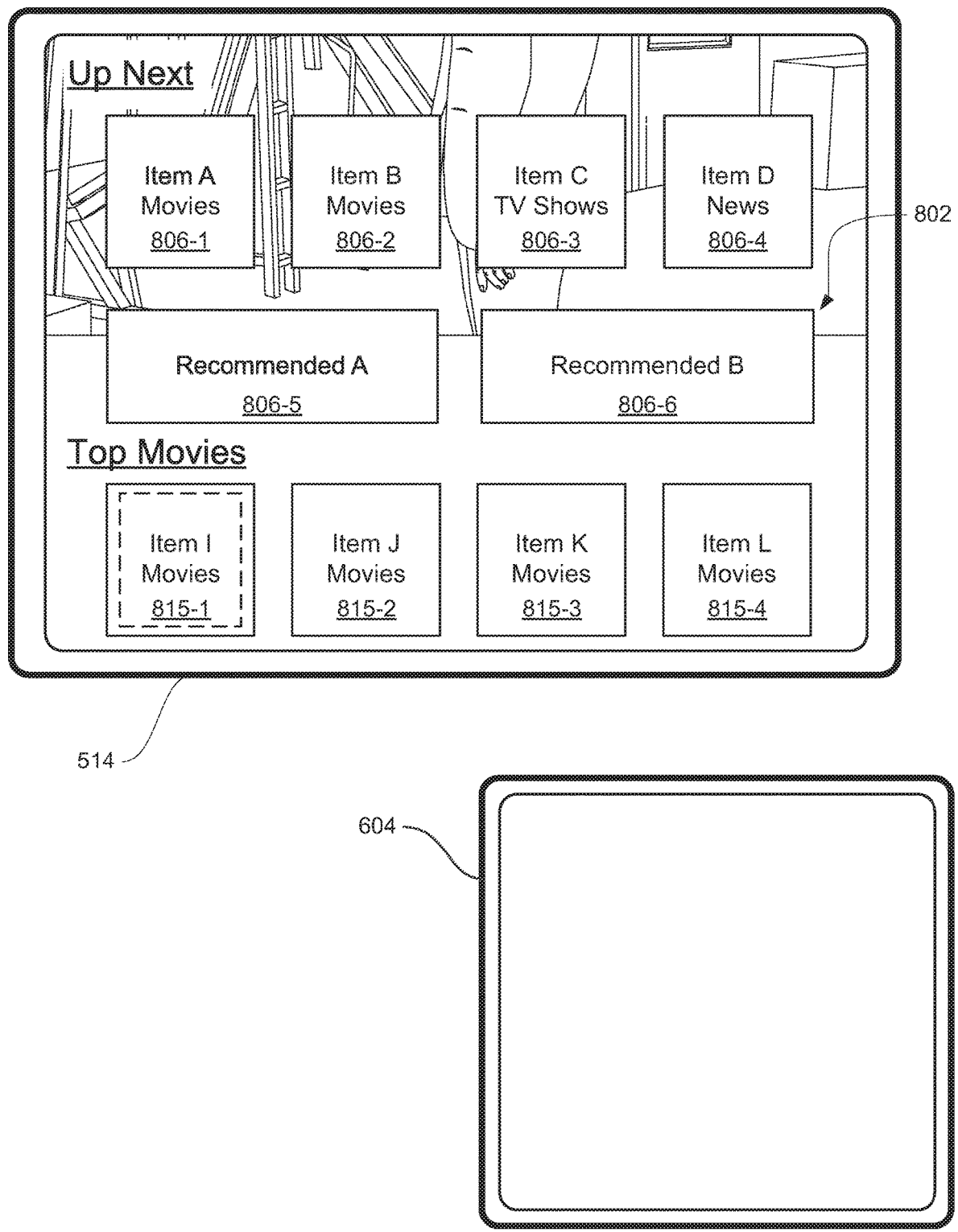
Figure 8N:
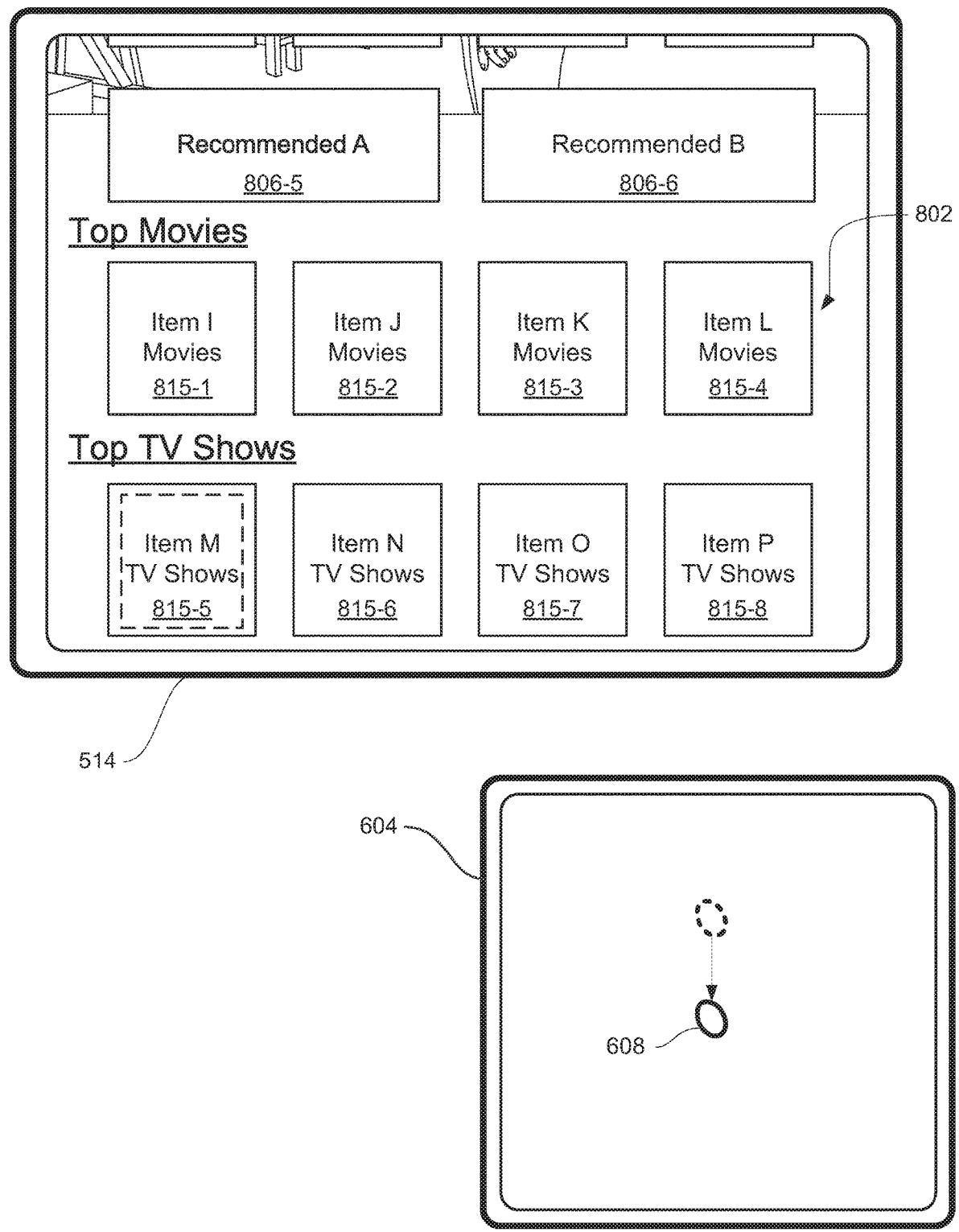
Figure 8O:
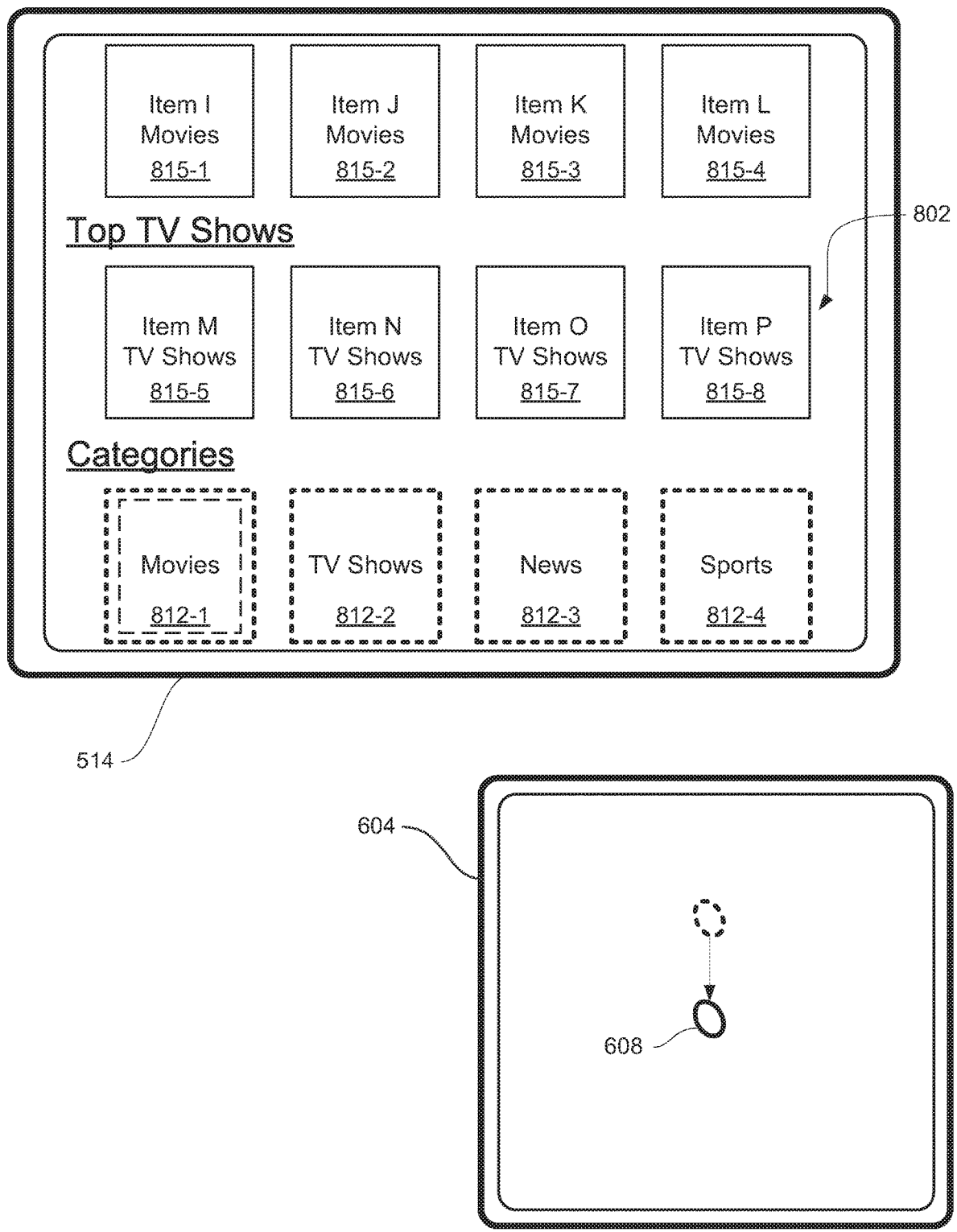
Figure 8P:
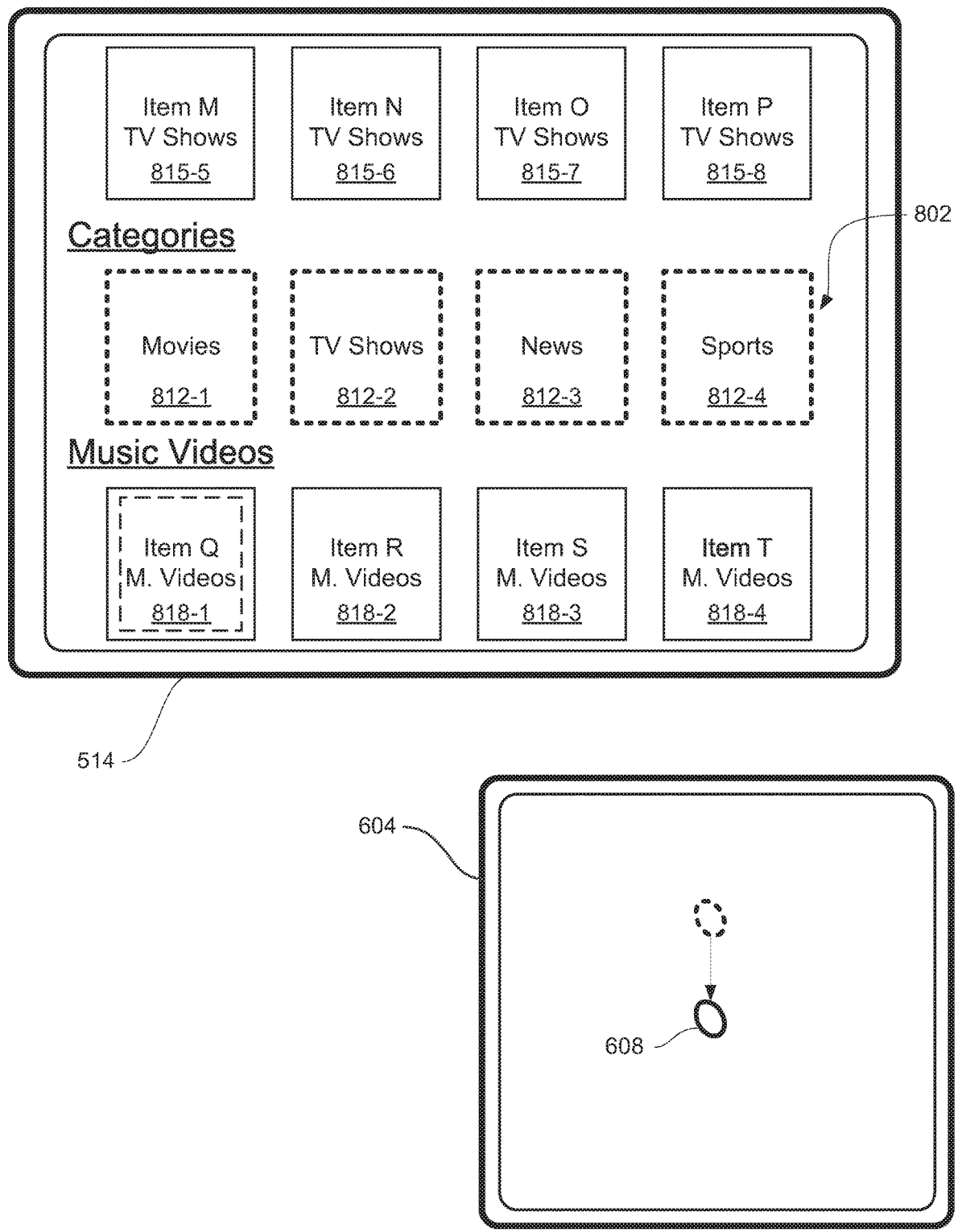
Figure 8Q:
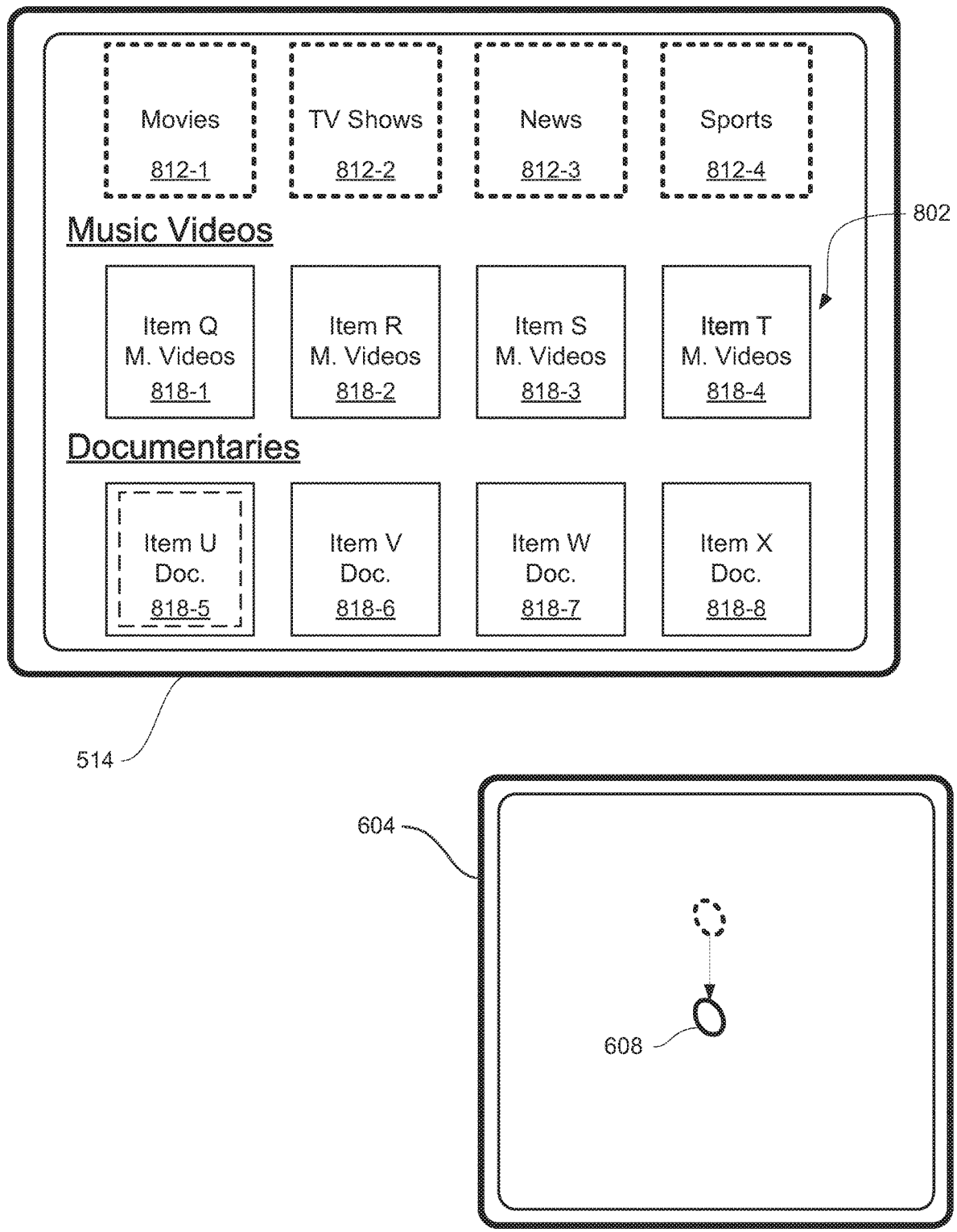
Figure 8R:
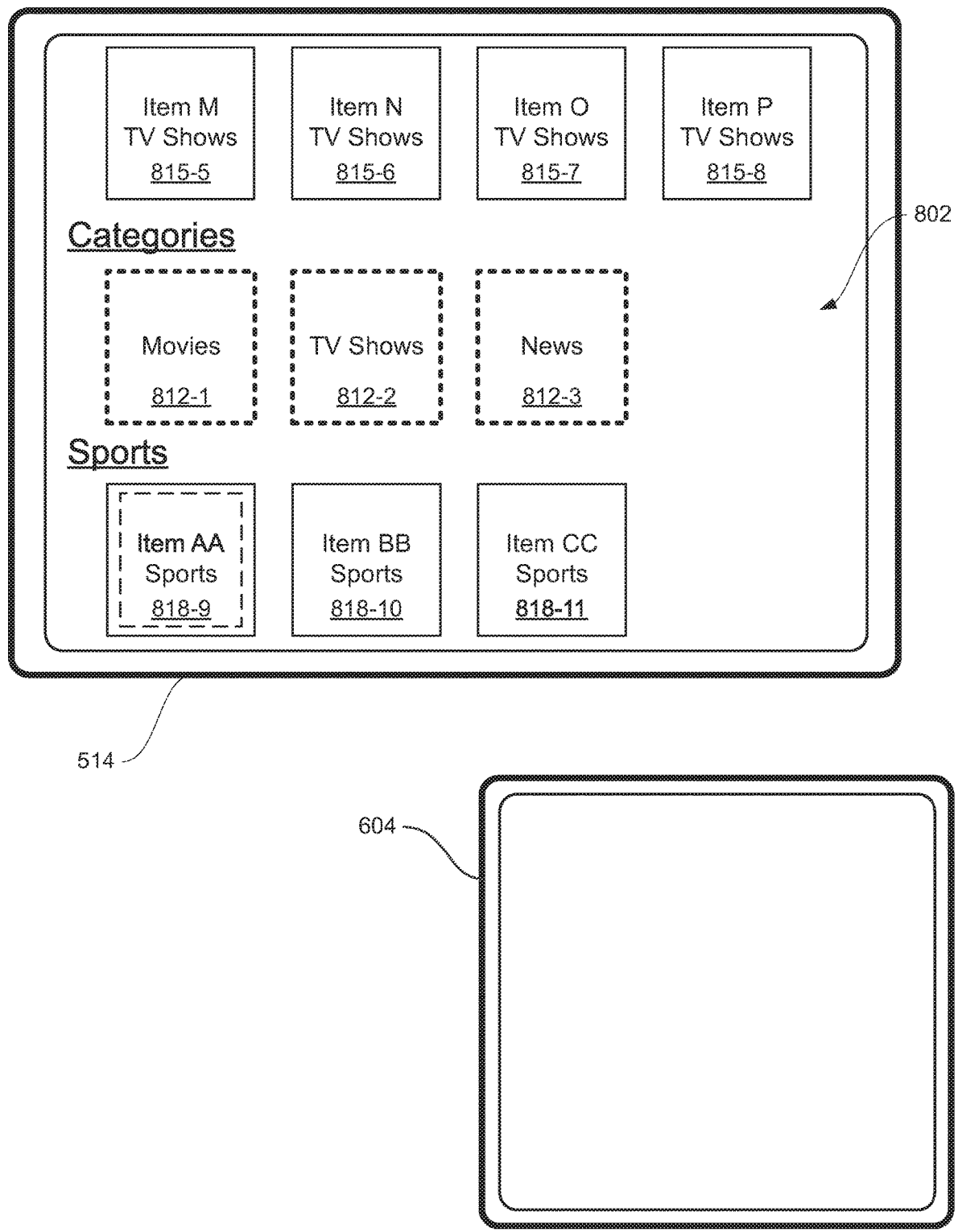
Figure 8S:
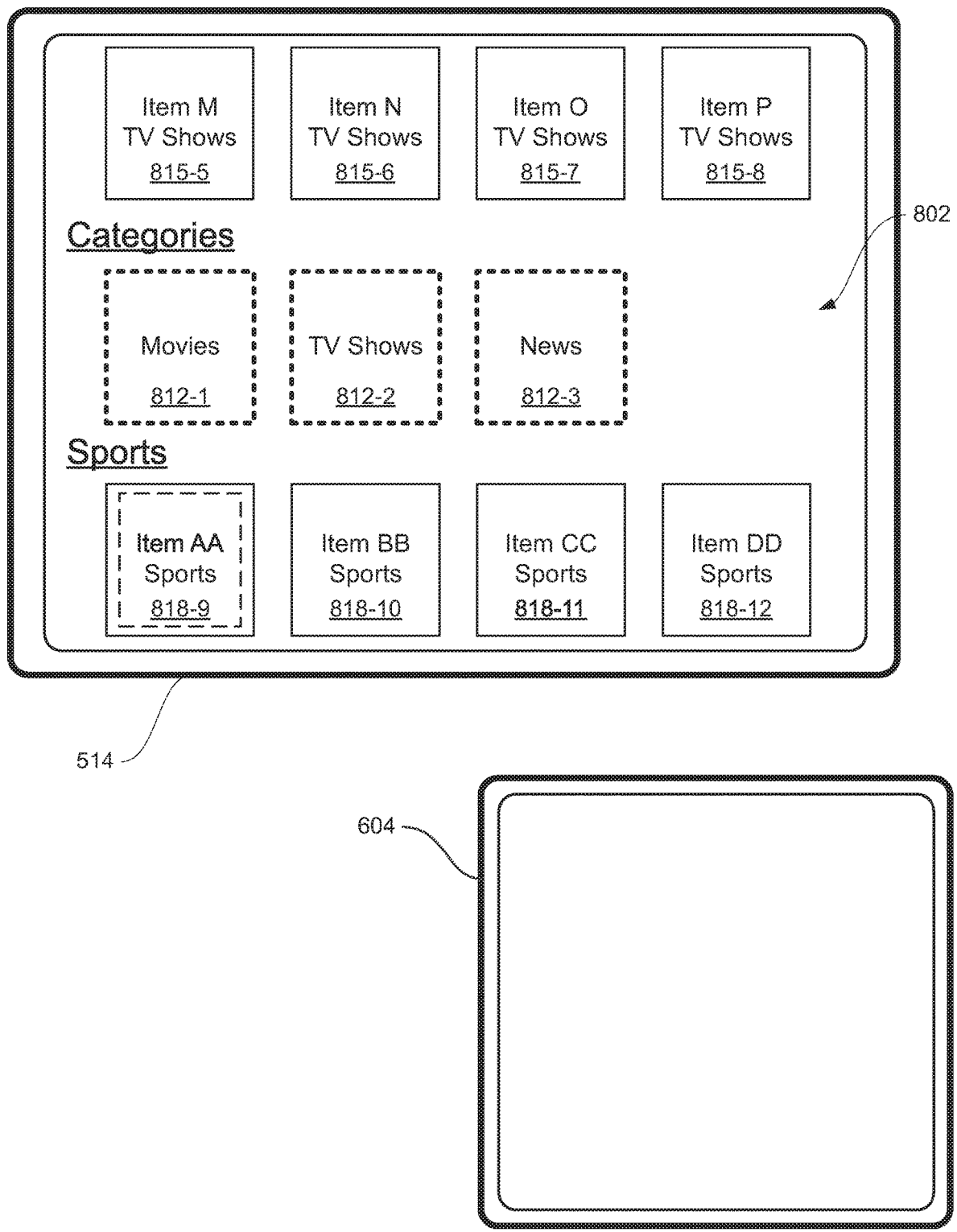
Figure 8T:
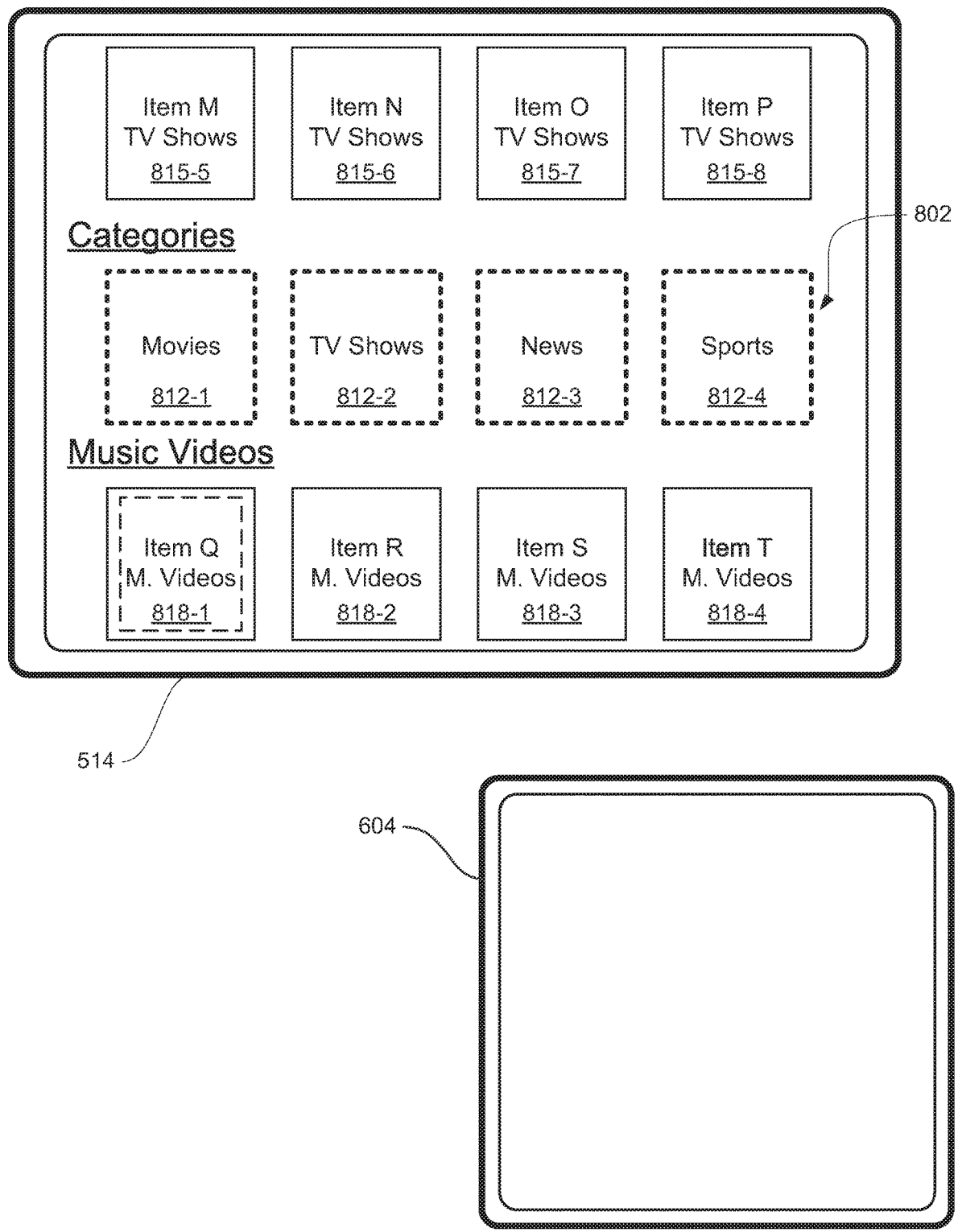
Figure 8U:
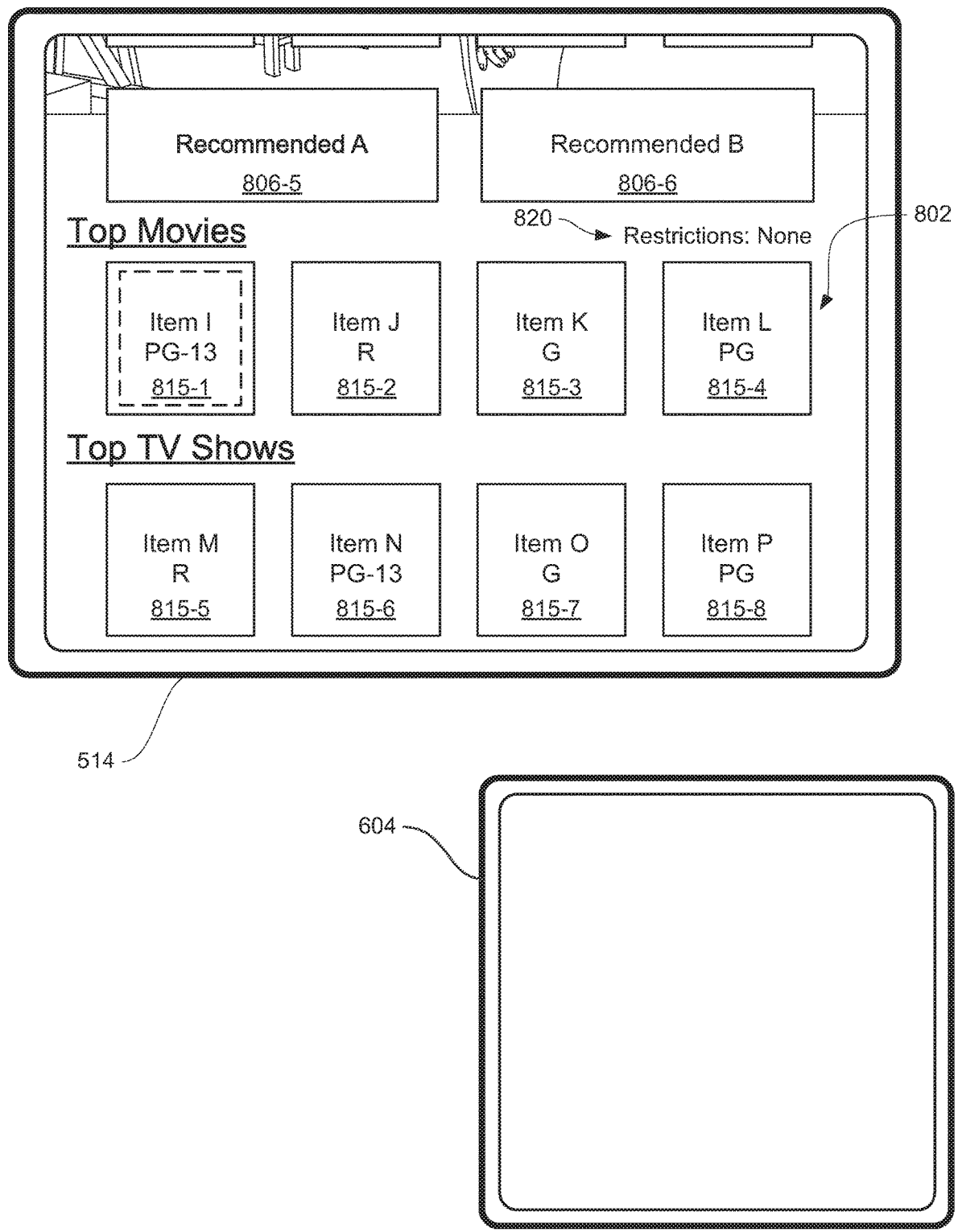
Figure 8V:
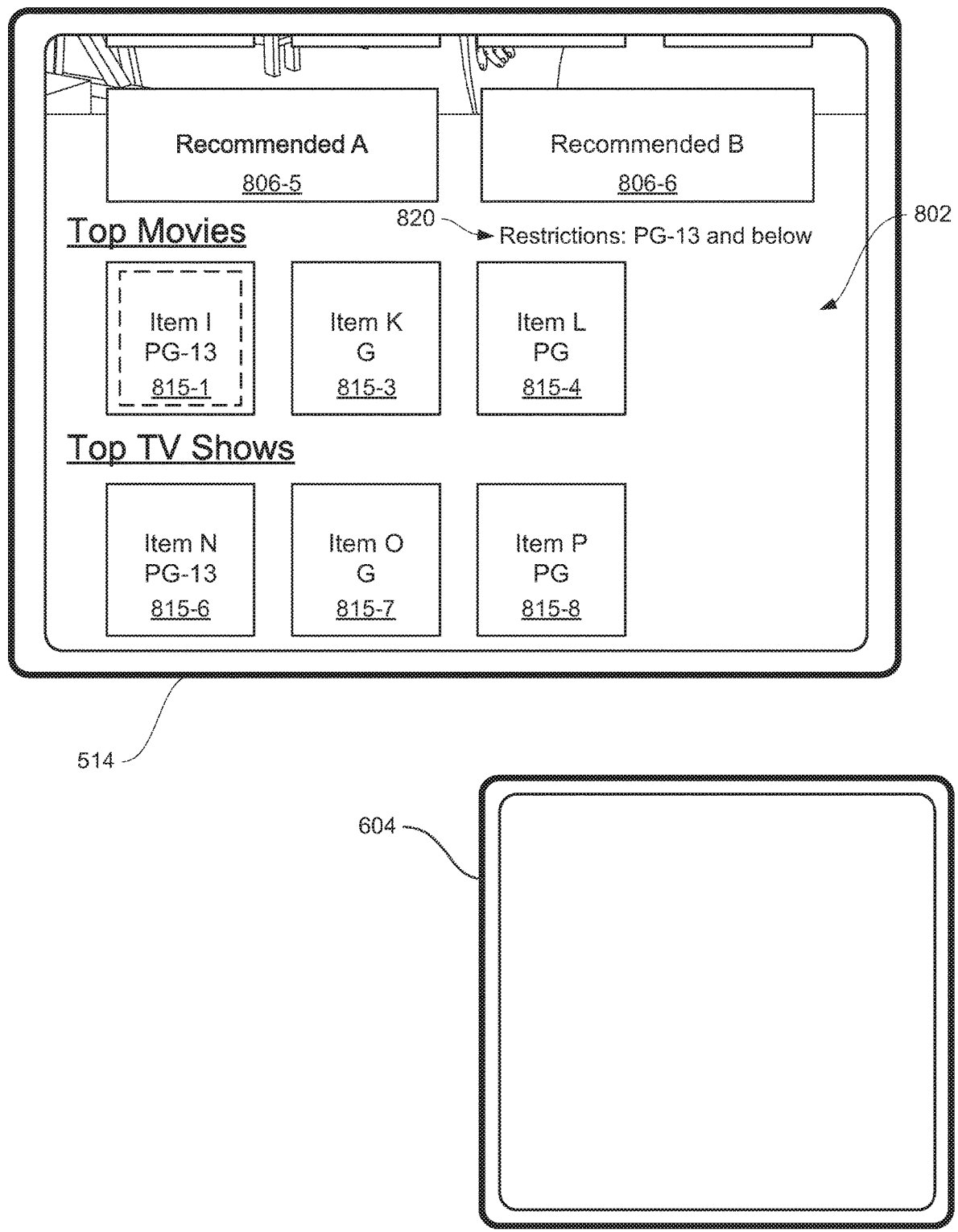
Figure 8W:
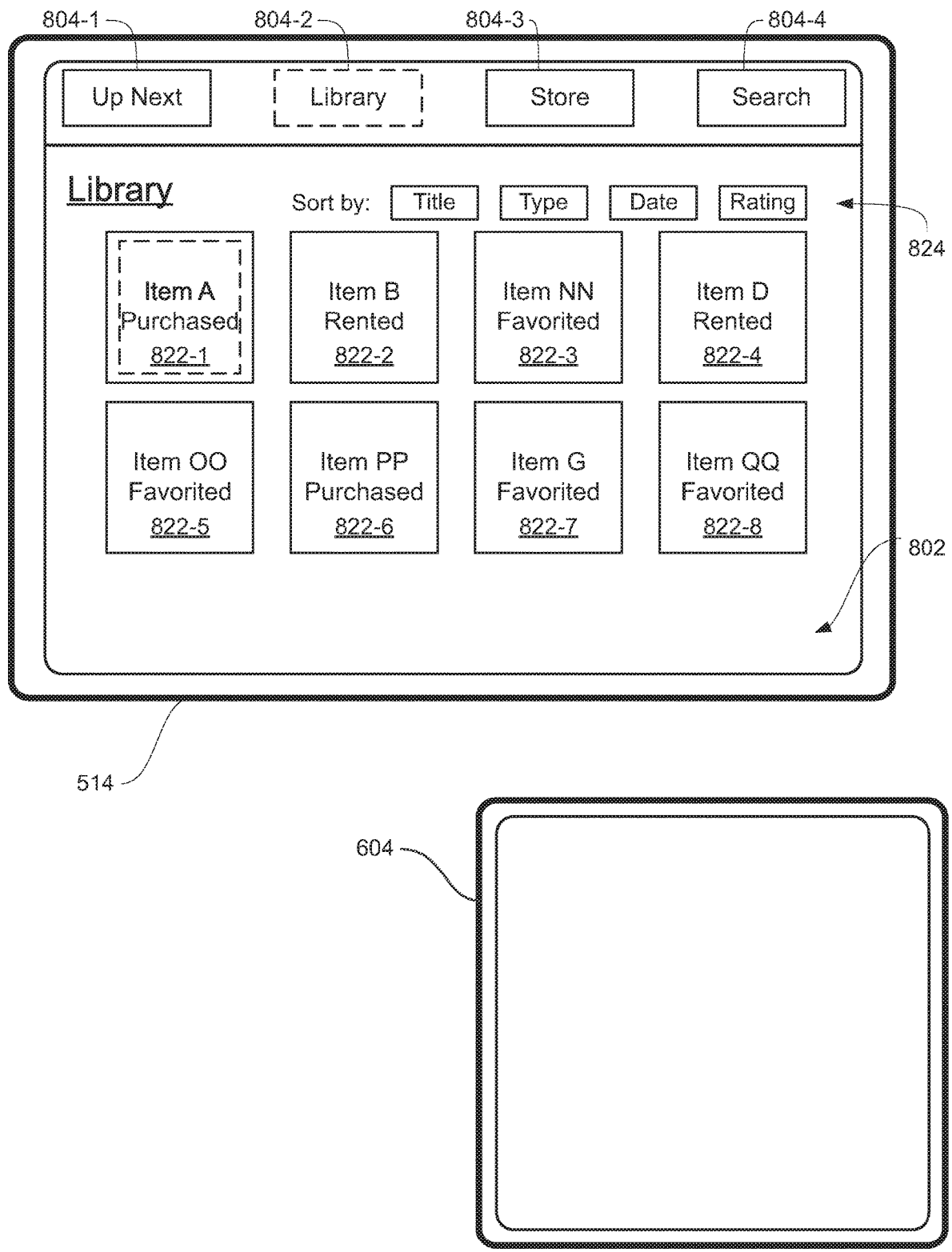

In FIG. 8W, an input selecting user interface element 804-2, which corresponds to a media library, has been detected. As a result, the electronic device displays representations 822-1 to 822-8 of media items that are in the media library in user interface 802. The media library optionally includes media items that the user of the electronic device has selected for inclusion in the media library, for example, by purchasing the media item, by renting the media item, or by favoriting the media item, as shown in FIG. 8W. The media library is optionally a different collection of media items than the suggested media items in FIG. 8A, because the media items included in the media library are optionally included there because of explicit user action with respect to those media items, whereas the suggested media items may or may not be included in the suggested media items because of explicit user action with respect to those media items, as previously described. User interface 802, when the media library user interface element 804-2 has been selected, also includes selectable affordances 824 for sorting through the media items in the media library based on various characteristics, such as title, date the items were added to the media library, the type of media item (e.g., movie, television show, etc.), and content rating.

Figure 8X:
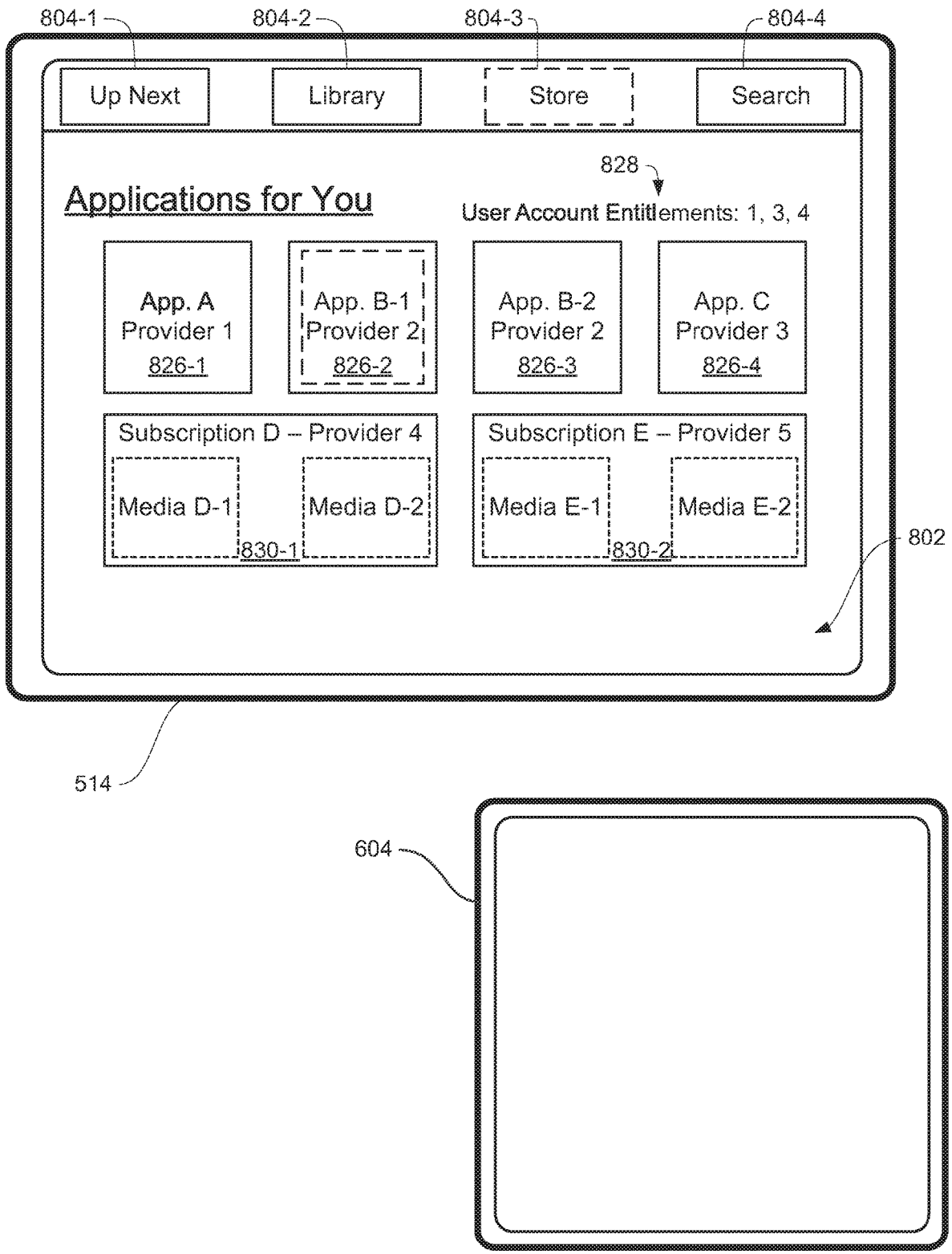

In FIG. 8X, an input selecting user interface element 804-3, which corresponds to media applications that are not installed on the electronic device and that provide access to media on the electronic device, has been detected. As a result, the electronic device displays representations 826-1 to 826-4 of media applications that are not installed on the electronic device. For example, media application A that provides access to media from media provider 1 is not installed on the electronic device; therefore, the electronic device displays representation 826-1 corresponding to media application A that provides access to media from media provider 1 in user interface 802 when the store user interface element 804-3 has been selected. The electronic device similarly displays representations 826-2 to 826-4 of media applications not installed on the electronic device. As indicated by 828, the user of the electronic device is entitled to access media via media providers 1, 3 and 4. As such, some representations 826 correspond to media applications via which the user is entitled to access media (e.g., media applications A and C), and some representations 826 correspond to media applications via which the user is not entitled to access media (e.g., media applications B-1 and B-2).

The electronic device also displays representations 830-1 and 830-2 that correspond to media subscriptions available to the user of the electronic device. For example, representation 830-1 corresponds to a media subscription to media provider 4, and representation 830-2 corresponds to a media subscription to media provider 5. Each representation 830 includes visual indications (e.g., images, videos) of media that the corresponding subscription makes available to the user of the electronic device (e.g., visual indications D-1 and D-2 in representation 830-1, and visual indications E-1 and E-2 in representation 830-2). These visual indications are optionally pre-selected cover art or images for media in those subscriptions and/or video previews for media in those subscriptions. As such, the electronic device provides information that is easily seen by the user about media to which the user is able to obtain access. Representations 826 are selectable to install the corresponding media applications on the electronic device, and representations 830 are selectable to subscribe to the corresponding media subscriptions on the electronic device.

In some embodiments, the electronic device will not display representations of applications via which the user of the electronic device is already entitled to access media (e.g., because of subscriptions with the media providers corresponding to those applications), even if those media applications are not installed on the electronic device. For example, in FIG. 8Y, the user is entitled to access media via media providers 1, 3 and 4. As a result, the electronic device does not display representations 826-1 and 826-4, which correspond to applications of media providers that the user is already entitled to access, and does not display representation 830-1, which corresponds to a media subscription to media provider 4, which the user already has.

In some embodiments, the media from a given media provider may be accessible via multiple media applications. For example, in FIG. 8Y, media applications B-1 and B-2 may both provide access to the media of media provider 2. For example, media provider 2 may have a first application that provides access to its media based on the user's subscription with a cable company (e.g., an indirect subscription to media provider 2 via the user's subscription with the cable company or other similar entity that has an arrangement to provide its customers media from media provider 2), and a second application that provides access to its media based on the user's subscription directly with media provider 2. In such circumstances, once the user installs one of media applications B-1 and B-2, the electronic device optionally ceases displaying a representation of the other of the media applications in user interface 802. For example, in FIG. 8Z, a click of touch-sensitive surface 604 has been detected while representation 826-2, corresponding to media application B-1, has the current focus. In response, the electronic device downloads and/or installs media application B-1, and ceases display of representation 826-2 as well as display of representation 826-3, which corresponds to media application B-2, as shown in FIG. 8AA.

In FIG. 8BB, an input selecting user interface element 804-4 for searching media accessible by the electronic device has been detected. As a result, the electronic device displays a search interface on display 514. The search interface includes a search field 836 for providing search criteria, and displays representations 834-1 to 834-4 of media items that result from the search. As indicated by 828, the user is entitled to access media from media providers 1, 3 and 4. Further, the search interface includes a user-configurable option to search for all media that is accessible by the electronic device, or only media accessible by the electronic device that the user of the electronic device is entitled to access. In FIG. 8BB, searching is not limited to media that the user of the electronic device is entitled to access (indicated by 832). As a result, in response to the "comedy" search criteria inputted to search field 836, the electronic device displays search result representations of media items that are accessible via media providers 1, 2 and 3, even though the user is not entitled to access media via media provider 2.

However, in some embodiments, the electronic device searches media items that the user is entitled to access, without searching media items that that user is not entitled to access. For example, in FIG. 8CC, searching is limited to media that the user of the electronic device is entitled to access (indicated by 832). As a result, in response to the "comedy" search criteria inputted to search field 836, the electronic device only displays representations 834-1 and 834-3 corresponding to media items from media providers 1 and 3, but does not display representations 834-2 and 834-4 corresponding to media items from media provider 2.

In some embodiments, media restrictions that restrict playback of media based on content ratings may be in effect when the electronic device is performing searching of media items. For example, in FIG. 8DD, media restrictions are in effect that restrict playback of media to media that has ratings of PG-13 or below (indicated by 820). However, in some embodiments, the electronic device performs searching and displays representations 834 resulting from the searching irrespective of the media restrictions that are in effect. For example, in FIG. 8DD, the electronic device displays representations 834-1 and 834-4 resulting from its searching, even though those representations correspond to media items with R-ratings. However, selection of those representations will not cause playback of those media items, whereas selection of search result representations that correspond to media items permitted by the media restrictions would cause playback of those media items. For example, in FIG. 8EE, a click of touch-sensitive surface 604 has been detected while representation 834-1, corresponding to media item A, which is R-rated, has the current focus. In response, rather than play media item A, the electronic device displays a visual indication that media item A is restricted by the media restrictions, as shown in FIG. 8FF. In some embodiments, if searching is limited to entitled media (indicated by 832 in FIG. 8GG), the electronic device will not display search result representations of media that the user of the electronic device is not entitled to view, as shown in FIG. 8GG.

FIGS. 9A-9I are flow diagrams illustrating a method 900 of facilitating browsing of media items by category in accordance with some embodiments of the disclosure. The method 900 is optionally performed at an electronic device such as device 100, device 300, or device 500 as described above with reference to FIGS. 1A-1B, 2-3 and 5A-5B. Some operations in method 900 are, optionally, combined and/or the order of some operations is, optionally, changed.

As described below, the method 900 provides ways to facilitate browsing of media items by category. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., a set-top box, such as device 100, device 300 or device 500) in communication with a display (e.g., a television, such as display 514) and one or more input devices (e.g., a remote control, such as remote 510, or a smartphone, such as device 511), receives (902), via the one or more input devices, a request to display, on the display, suggested media items for a user of the electronic device, such as in FIG. 8A (e.g., a request to launch and display a unified media browsing application on the electronic device that displays media available on the electronic device from different media providers and/or different media applications, such as described in method 700). In some embodiments, the media displayed by the electronic device is media that the electronic device determines would be of interest to the user based on prior media viewing actions of the user. In some embodiments, in response to receiving the request to display the suggested media items, the electronic device displays (904), in a media navigation user interface on the display (e.g., within a media browsing application running on the electronic device, different from applications on the electronic device that correspond to media providers and provide media from those content providers), a first plurality of representations of suggested media items, such as in FIG. 8A (e.g., representations of each media item of the suggested media). In some embodiments, the representations include image(s) and/or video(s) from the suggested media, and/or textual information about the suggested media. In some embodiments, the representations are displayed in rows in the media navigation user interface. In some embodiments, the representations are selectable to play the corresponding media item and/or display additional information about the corresponding media item, such as in FIGS. 8B-8D.

In some embodiments, while displaying the first plurality of representations of suggested media items, the electronic device receives (906), via the one or more input devices, a navigation input corresponding to a request to scroll through the first plurality of representations of suggested media items, such as in FIGS. 8E-8H (e.g., a swipe input detected on a touch-sensitive surface of the one or more input devices for causing a current focus to move from one of the representations to another of the representations in accordance with the magnitude and/or direction of the swipe input). In some embodiments, in response to receiving the navigation input, the electronic device scrolls (908) through the first plurality of representations of suggested media items to reveal, in the media navigation user interface, a plurality of media-category user interface elements corresponding to categories of media of suggested media, wherein, prior to receiving the navigation input, the plurality of representations of media items were displayed without displaying the media-category user interface elements, such as in FIGS. 8E-8H (e.g., a user interface element corresponding to TV shows, a user interface element corresponding to movies, a user interface element corresponding to kids content, a user interface element corresponding to editorial collections of content, etc.). In some embodiments, the user interface elements corresponding to the categories of media are displayed with the same spatial layout in the media navigation user interface as the representations corresponding to the suggested media (e.g., as visual blocks in rows of visual blocks).

In some embodiments, while displaying the media-category user interface elements, the electronic device receives (910), via the one or more input devices, an input selecting a respective media-category user interface element of the plurality of media-category user interface elements, such as in FIG. 8I (e.g., a click or tap detected on a touch-sensitive surface of the one or more input devices while the respective user interface element is currently-selected), the respective media-category user interface element corresponding to a respective category of media of the categories of media. In some embodiments, in response to receiving the input selecting the respective user interface element, the electronic device replaces (912), in the media navigation user interface, the first plurality of representations of suggested media items and the media-category user interface elements with a second plurality of representations of suggested media items corresponding to suggested media items in the respective category of media, such as in FIGS. 8I-8J (e.g., when the user selects a particular category of media, the media navigation user interface is updated to display representations of media corresponding to the selected category of media). In some embodiment, the representations of media items corresponding to the selected category of media are displayed with the same spatial layout in the media navigation user interface as the representations corresponding to the suggested media and/or the categories of media (e.g., as visual blocks in rows of visual blocks). In some embodiments, the respective media category is a media filter and suggested media items that are eligible for display in the second plurality of suggested media items is a subset of the suggested media items that are eligible for display in the first plurality of suggested media items. In this way, the electronic device facilitates the ability of the user to easily browse and discover media by category, thus improving the efficiency of user-electronic device interactions. In some embodiments, the suggested media items in the respective category of media are not included in the suggested media items (918) (e.g., the media items displayed when a category of content is selected are optionally not displayed in the original media navigation user interface before the category of content is selected). Thus, a user of the electronic device optionally does not see a given media item twice when browsing media in the media navigation user interface, improving the efficiency of user-electronic device interactions.

While displaying the media-category user interface elements, the electronic device optionally receives (914), via the one or more input devices, a second navigation input corresponding to a request to scroll past the media-category user interface elements, such as in FIGS. 8O-8Q (e.g., a swipe input detected on a touch-sensitive surface of the one or more input devices). In response to receiving the second navigation input, the electronic device optionally scrolls (916) past the media-category user interface elements to reveal, in the media navigation user interface, a third plurality of representations of suggested media items, different from the first and second pluralities of suggested media items, such as in FIGS. 8O-8Q (e.g., additional suggested media items are optionally displayed in the media navigation user interface below the media-category user interface elements, and/or to the left or right side of the media-category user interface elements). In this way, the electronic device facilitates the ability of the user to easily browse and discover additional media by category, thus improving the efficiency of user-electronic device interactions.

In some embodiments, in accordance with a determination that a given category of media of the suggested media includes greater than a threshold number of media items (e.g., five, ten or fifteen), a media-category user interface element corresponding to the given category of media is included in the plurality of media-category user interface elements, and representations of the media items included in the given category of media of the suggested media are not displayed in the media navigation user interface (920), such as in FIGS. 8S-8T (e.g., if a category has enough media items associated with it, it is shown as a category user interface element, and media items in that category are optionally displayed only after the user selected that category user interface element). In some embodiments, in accordance with a determination that the given category of media of the suggested media includes fewer than the threshold number of media items (e.g., five, ten or fifteen), the media-category user interface element corresponding to the given category of media is not included in the plurality of media-category user interface elements, and the representations of the media items included in the given category of media of the suggested media are displayed in the media navigation user interface (922), such as in FIG. 8R (e.g., if a category does not have enough media items associated with it, it is not shown as a category user interface element, and media items in that category are optionally displayed in the media navigation user interface so that the user can browse those media items). In this way, the electronic device intelligently presents media items to the user in manners that make those media items easier to browse, thus improving the efficiency of user-electronic device interactions.

In some embodiments, the suggested media items include media items that the user of the electronic device is entitled to access on the electronic device (e.g., the user has subscription(s) with media provider(s) that provide the user access to the media items, the user has purchased the media items, etc.), and excludes (e.g., does not include) media items that the user of the electronic device is not entitled to access on the electronic device (924) (e.g., the electronic device only suggests media to the user that the user is entitled to access).

The electronic device optionally receives (926), via the one or more input devices, an input selecting a respective representation of a respective media item of the first or second pluralities of representations of suggested media items, such as in FIG. 8B (e.g., a click of a button on the input devices when the respective representation has the focus). In response to receiving the input selecting the respective representation of the respective media item, the electronic device optionally displays (928), on the display, a page corresponding to the respective media item that includes information about the respective media item and a selectable affordance that, when selected, plays the respective media item on the electronic device, such as in FIG. 8C (e.g., a user interface that is optionally a dedicated canonical page for the respective media item). In some embodiments, the electronic device receives (930), via the one or more input devices, a selection of the selectable affordance, such as in FIG. 8C (e.g., a click of a button on the input devices when the selectable affordance has the focus). In response to receiving the selection of the selectable affordance, the electronic device optionally plays (932), on the display, the respective media item on the electronic device, such as in FIG. 8D. In this way, the electronic device facilitates learning about and playing media items on the electronic device, thus improving the efficiency of user-electronic device interactions.

In some embodiments, the first plurality of representations of suggested media items includes representations of suggested media items that are displayed in respective regions (e.g., in rows) of the media navigation user interface that correspond to respective media categories of suggested media (934), such as in FIGS. 8P-8Q (e.g., the representations of suggested media are displayed in rows that correspond to categories of suggested media, such as top movies, top TV shows, genre (sports, news, etc.), application-specific content (new on Media Provider 1, new on Media Provider 2, etc.), golf, etc.). In this way, the electronic device facilitates the ability of the user to easily browse and discover media by category, thus improving the efficiency of user-electronic device interactions.

While displaying, in the media navigation user interface, the second plurality of representations of suggested media items corresponding to the suggested media items in the respective category of media (e.g., the media items displayed after the user has selected a media category), the electronic device optionally receives (936), via the one or more input devices, a second navigation input corresponding to a request to scroll through the second plurality of representations of suggested media items, such as in FIGS. 8J-8L (e.g., a swipe input detected on a touch-sensitive surface of the one or more input devices for causing a current focus to move from one of the representations to another of the representations in accordance with the magnitude and/or direction of the swipe input). In response to receiving the second navigation input, the electronic device optionally scrolls (938) through the second plurality of representations of suggested media items to reveal, in the media navigation user interface, a second plurality of media-category user interface elements corresponding to sub-categories of media of the respective category of media (e.g., media-category user interface elements corresponding to further categories of media within the selected category of media), wherein, prior to receiving the second navigation input, the second plurality of representations of suggested media items were displayed without displaying the second plurality of media-category user interface elements, such as in FIGS. 8J-8L (e.g., if movies is the selected category, further filter is by genre; if TV shows is the selected category, further filter is by genre; if kids is the selected category, further filter is by age range, etc.). In this way, the electronic device facilitates the ability of the user to easily browse and discover media by category, thus improving the efficiency of user-electronic device interactions. Additionally, displaying suggested content before displaying category filter options provides the user with a content-first experience that increases the amount of playable media items that are displayed on the display and reduces the number of inputs from the user before the user selects a playable media item for playback, thereby increasing the efficiency of use of the device.

In some embodiments, in accordance with a determination that media restrictions are in effect on the electronic device (e.g., parental restrictions or otherwise that prevent viewing of media having certain content ratings, such as movies rated R or higher), the suggested media items corresponding to the first and second pluralities of representations of suggested media items exclude (e.g., do not include) media items that are restricted by the media restrictions (940), such as in FIG. 8V (e.g., if media restrictions are in place, the media displayed in the media navigation user interface is limited to the media allowed by the media restrictions.) Thus, in some embodiments, the user may only browse for media that is allowed by the media restrictions. In this way, the electronic device facilitates the ability of the user to easily browse and discover media that is not restricted, thus improving the efficiency of user-electronic device interactions.

While the media restrictions are in effect on the electronic device, the electronic device optionally receives (942), via the one or more input devices, input corresponding to a request to perform a search across media items accessible by the electronic device, such as in FIG. 8DD (e.g., an input to search for a specific media item, an input to search for media items having a certain characteristic, such as comedy movies, etc.). In response to receiving the input corresponding to the request to search across the media items accessible by the electronic device, the electronic device optionally searches (944) the media items accessible by the electronic device, including the media items that are restricted by the media restrictions, such as in FIG. 8DD (e.g., a search performed on the electronic device, even when media restrictions are in effect, will search all media accessible by the electronic device regardless of the media restrictions). In some embodiments, searching the media items accessible by the electronic device comprises searching media items that the user of the electronic device is entitled to access on the electronic device without searching media items that the user of the electronic device is not entitled to access on the electronic device (946), such as in FIG. 8CC (e.g., searching for media is performed across media regardless of media restrictions, but only media that the user is entitled to view is searched). As such, the electronic device allows the user to discover media that is restricted by the media restrictions and/or entitled, thus facilitating the ability of the user to discover entitled media on the electronic device, and improving the efficiency of user-electronic device interactions.

While the media restrictions are in effect on the electronic device, the electronic device optionally receives (948), via the one or more input devices, an input corresponding to a request to play a search-result media item resulting from the searching of the media items (e.g., selection of the search-result media item after the electronic device displays the search-result media item in response to a media search performed by the user), wherein the search-result media item is restricted by the media restrictions on the electronic device, such as in FIG. 8EE (e.g., the search-result media item is not allowed by the media restrictions, because its content rating falls outside of permitted content ratings). In response to receiving the request to play the search-result media item, the electronic device optionally displays (950), on the display, a visual indication that the search-result media item is restricted by the media restrictions on the electronic device without playing the search-result media item on the electronic device, such as in FIG. 8FF (e.g., if the user selects a restricted media item in search results to play, the electronic device displays a warning that the media item is restricted, and does not play it). As such, the electronic device facilitates the ability of the user to determine that media is restricted and/or media restrictions are in place, thus improving the efficiency of user-electronic device interactions.

In some embodiments, the media navigation user interface further includes a library user interface element that corresponds to a media library (e.g., a collection of media items), the media library including media items that the user of the electronic device has selected for inclusion in the media library (952), such as in FIG. 8W (e.g., media items that the user has favorited (or otherwise designated for inclusion in the media library), purchased, rented, etc.). The media library is optionally a different collection of media items than the suggested media items, because the media items included in the media library are optionally included there because of explicit user action with respect to those media items, whereas the suggested media items may or may not be included in the suggested media items because of explicit user action with respect to those media items. In some embodiments, the electronic device receives (954), via the one or more input devices, an input selecting the library user interface element (e.g., a click of a button on the input devices when the library user interface element has the focus). In response to receiving the input selecting the library user interface element, the electronic device optionally replaces (956), in the media navigation user interface, the representations of the suggested media items with a plurality of representations of the media items that the user of the electronic device has selected for inclusion in the media library, such as in FIG. 8W. In some embodiments, the media library includes one or more selectable affordances for sorting the media library by title, date, etc. Thus, the electronic device provides an interface that allows the user to easily browse the media designated to be included in the media library, improving the efficiency of user-electronic device interactions.

In some embodiments, the media navigation user interface further includes a store user interface element that corresponds to media applications that provide media that the user of the electronic device is not entitled to view (958), such as in FIG. 8X (e.g., applications the user has not purchased or downloaded, does not have a subscription to access, etc.). In some embodiments, the electronic device receives (960), via the one or more input devices, an input selecting the store user interface element (e.g., a click of a button on the input devices when the store user interface element has the focus). In response to receiving the input selecting the store user interface element, the electronic device optionally replaces (962), in the media navigation user interface, the representations of the suggested media items with a plurality of representations of the media applications that provide the media that the user of the electronic device is not entitled to view, such as in FIG. 8X. In some embodiments, the plurality of representations of the media applications are displayed without displaying representations of media applications through which the user of the electronic device is entitled to access media (964), such as in FIG. 8Y (e.g., only representations of applications through which the user is not entitled to access content are displayed). In this way, the electronic device provides quick access, to the user, to media applications that are not installed on the electronic device and/or via which the user is not entitled to access media, thus improving the efficiency of user-electronic device interactions.

In some embodiments, the representations of the media applications include one or more representations corresponding to media subscriptions (e.g., subscriptions to applications on which media is available, such as Media Provider 1, Media Provider 2) available to the user of the electronic device, wherein respective representations corresponding to respective media subscriptions available to the user include respective visual indications of media that would become accessible to the user via the corresponding media subscription (966), such as in FIG. 8X (e.g., the representations of the media subscriptions include indications of media that would become accessible to the user if the user subscribes to the media subscription). For example, a representation of Media Provider 1 optionally includes graphic(s) of shows available from Media Provider 1, a representation of Media Item 2 optionally includes graphic(s) shows available from Media Provider 2, etc. In this way, the electronic device provides easily accessible information about media that the user could gain access to via a subscription to a given media provider, thus improving the efficiency of user-electronic device interactions.

Figure 8Y:
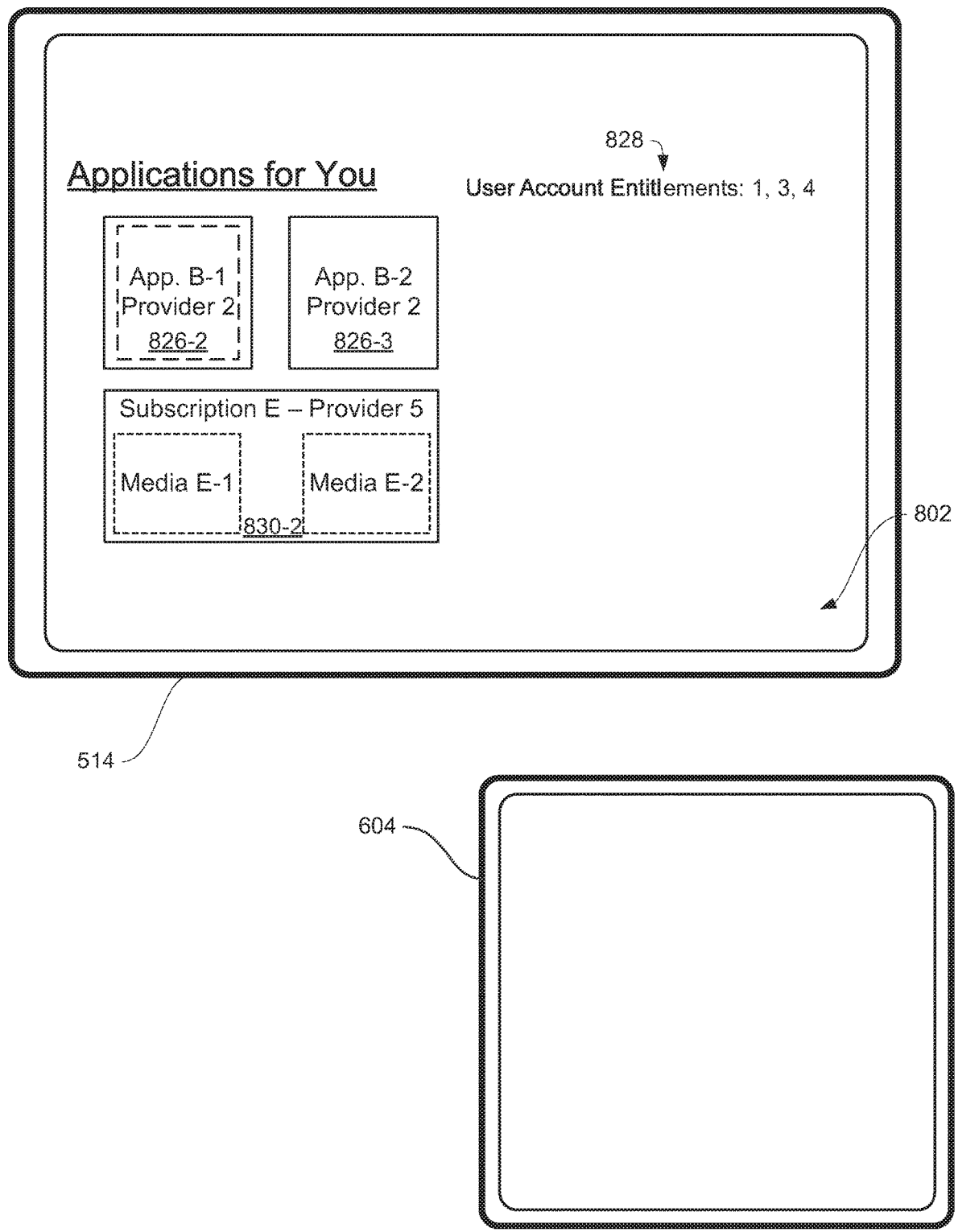

In some embodiments, the user of the electronic device has a subscription with a media provider that gives the user access to media via a plurality of media applications including a first set of media applications that are not installed on the electronic device (968), such as in FIG. 8Y (e.g., the user is a customer of a cable company, and the user's account with the cable company allows the user to view media from multiple media applications, such as an application for a first media provider, an application for a second media provider, etc.). In some embodiments, the plurality of representations of the media applications are displayed without displaying representations of media applications in the first set of media applications (970), such as in FIG. 8Y (e.g., even though the first set of media applications are not installed on the electronic device, they are optionally not displayed in the store user interface, because the user is already entitled to access content via those applications due to the user's account with the cable company). In this way, the electronic device does not display information that may not be of interest to the user of the electronic device (e.g., representations of media applications via which the user is already entitled to access media), thus improving the efficiency of user-electronic device interactions.

Figure 8Z:
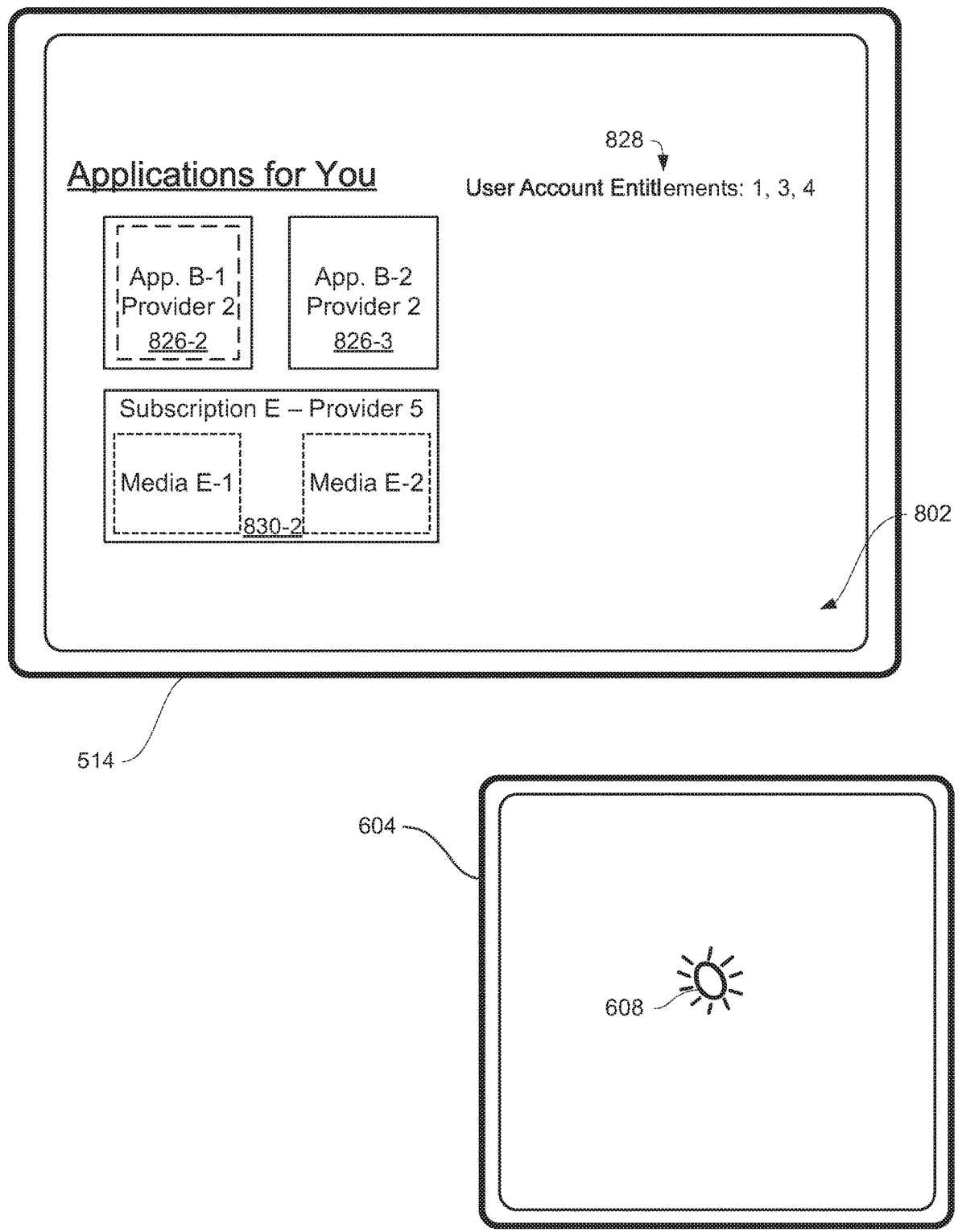
Figure 8A:
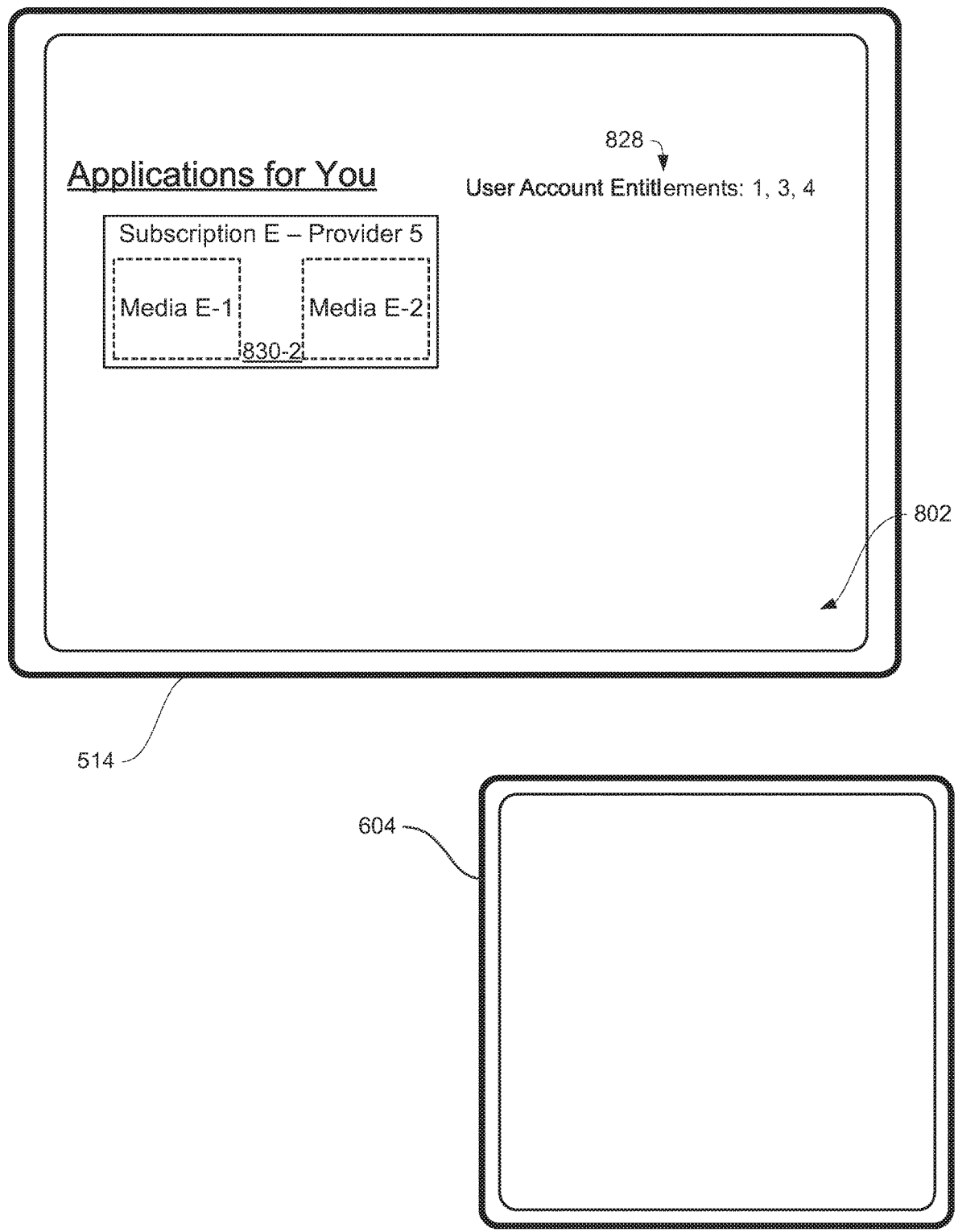
Figure 8B:
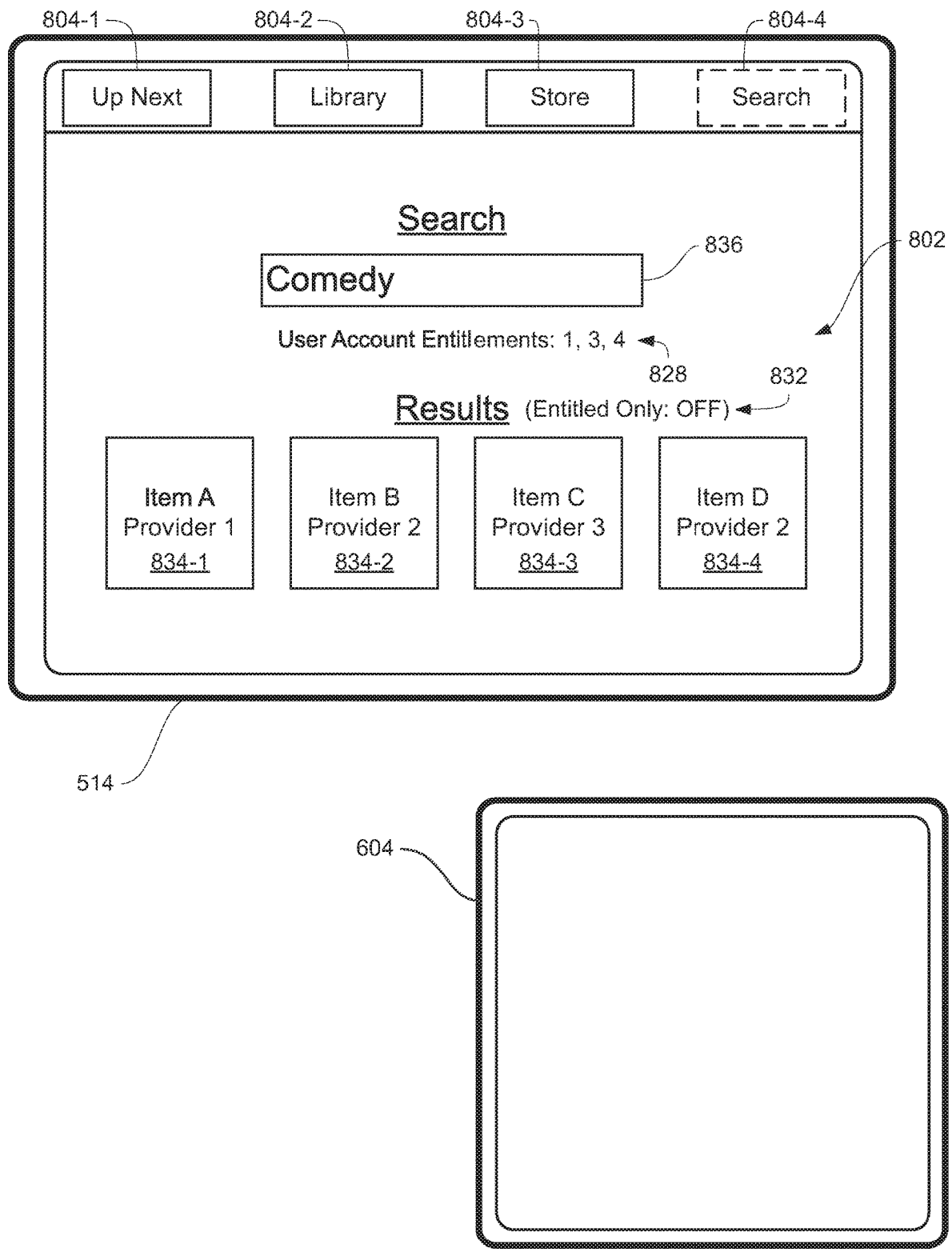
Figure 8C:
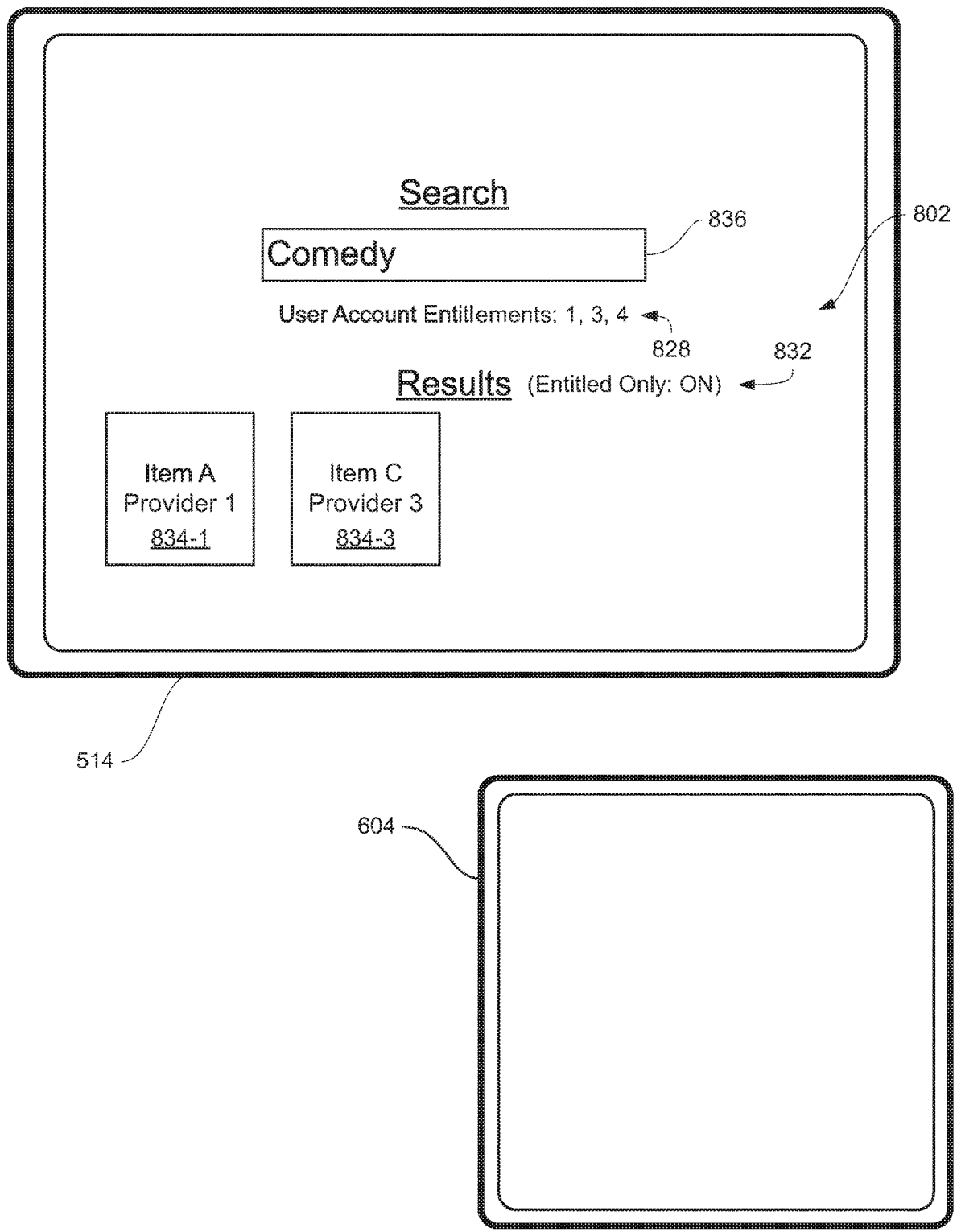
Figure 8D:
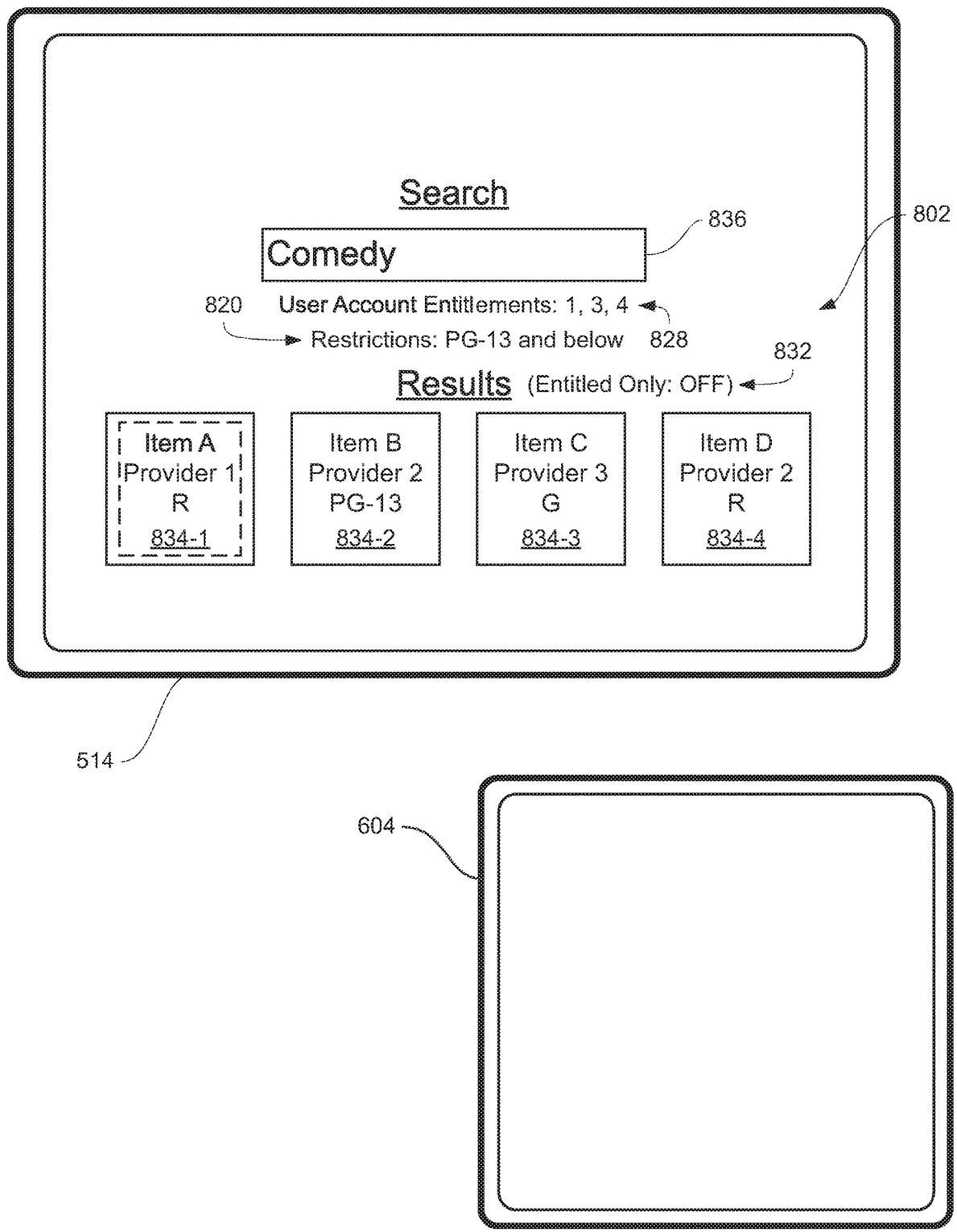
Figure 8E:
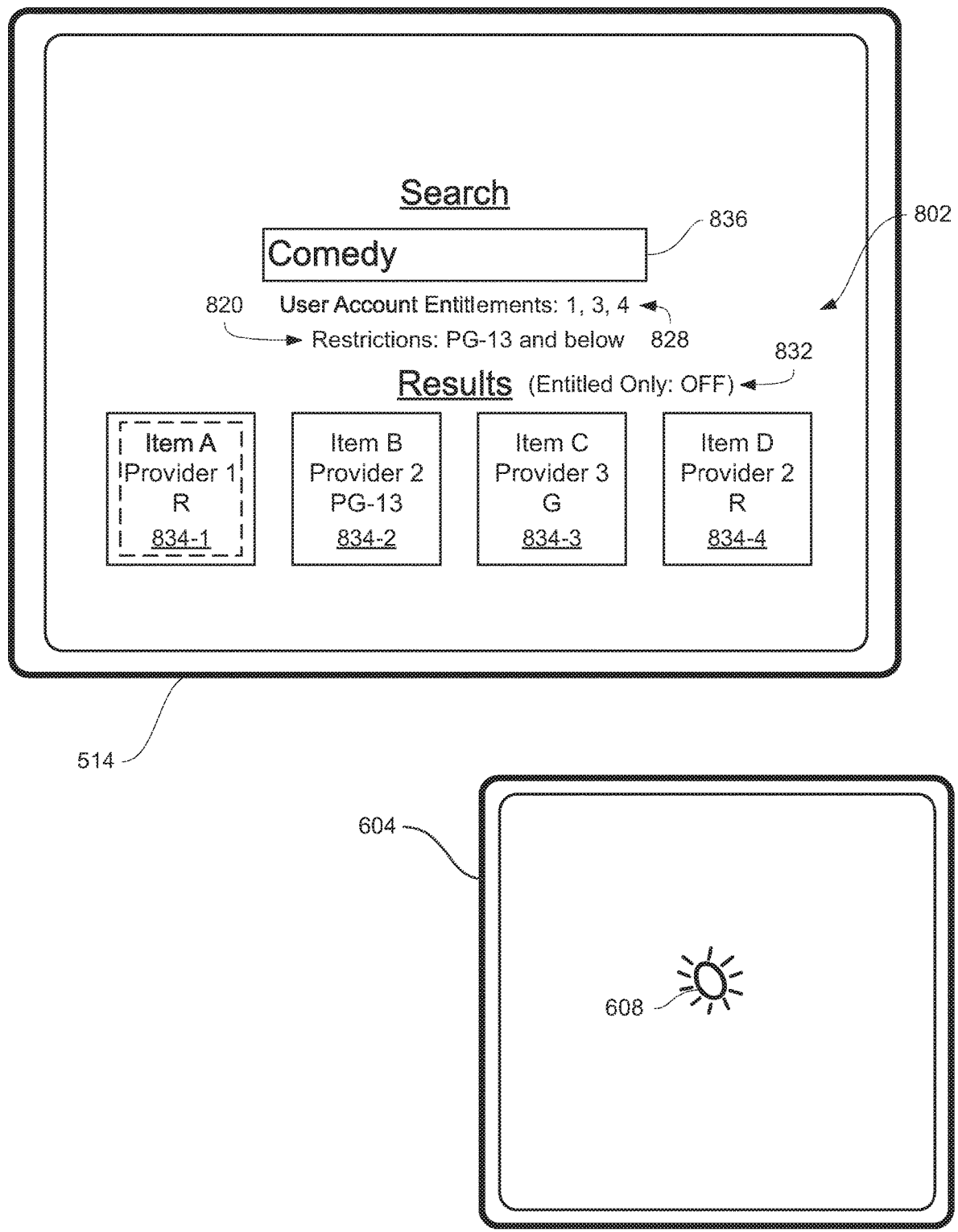
Figure 8F:
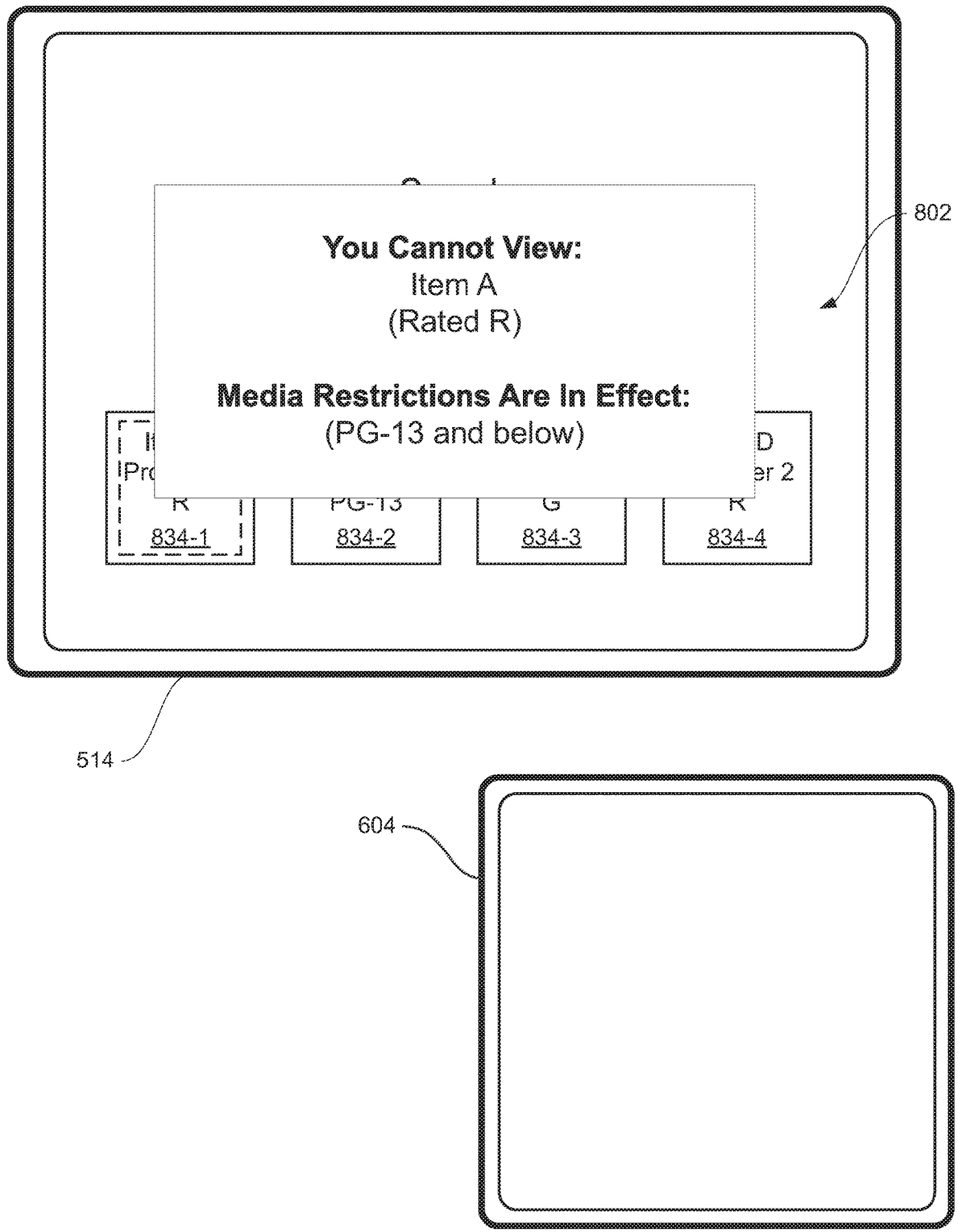
Figure 8G:
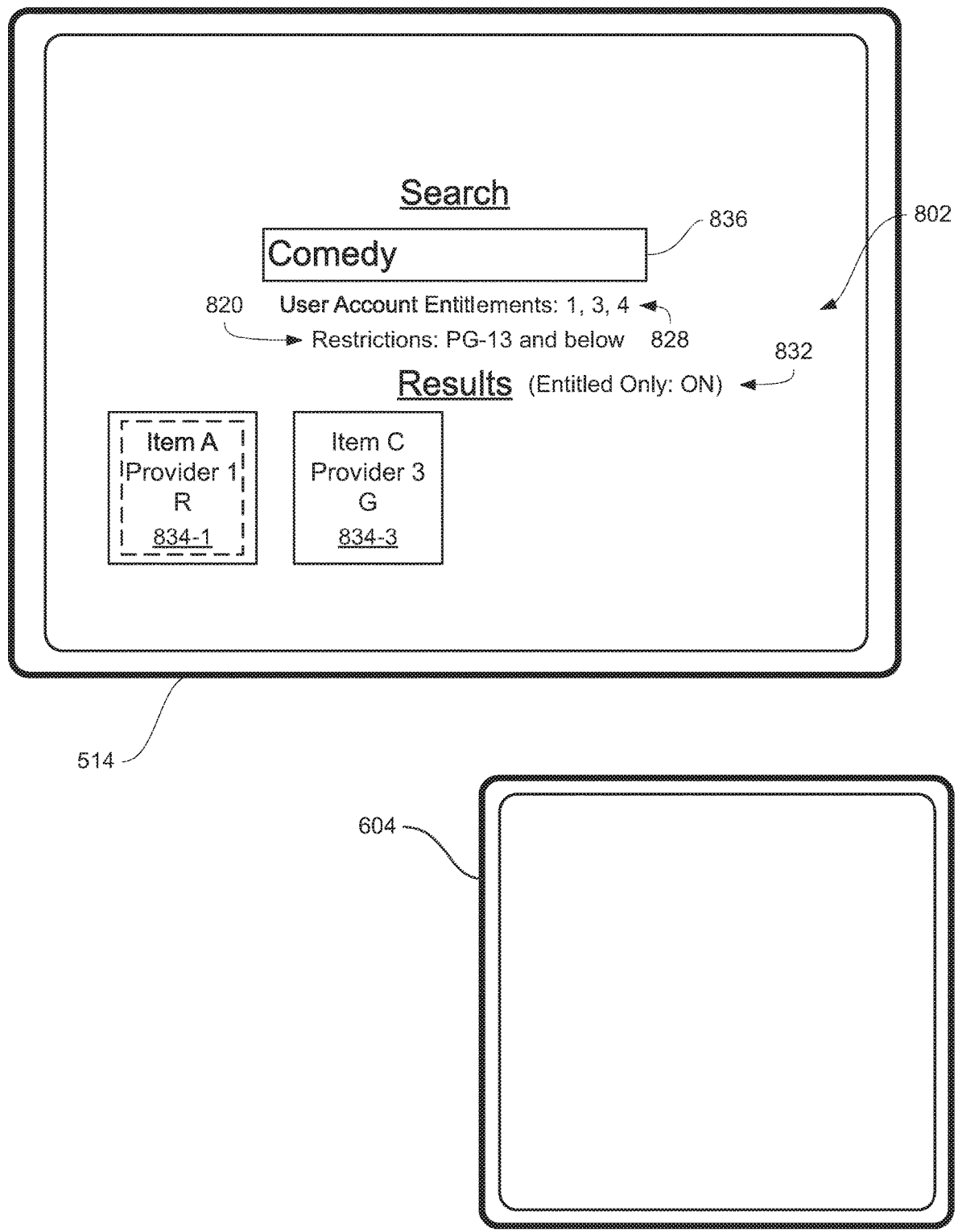
Figure 9A:
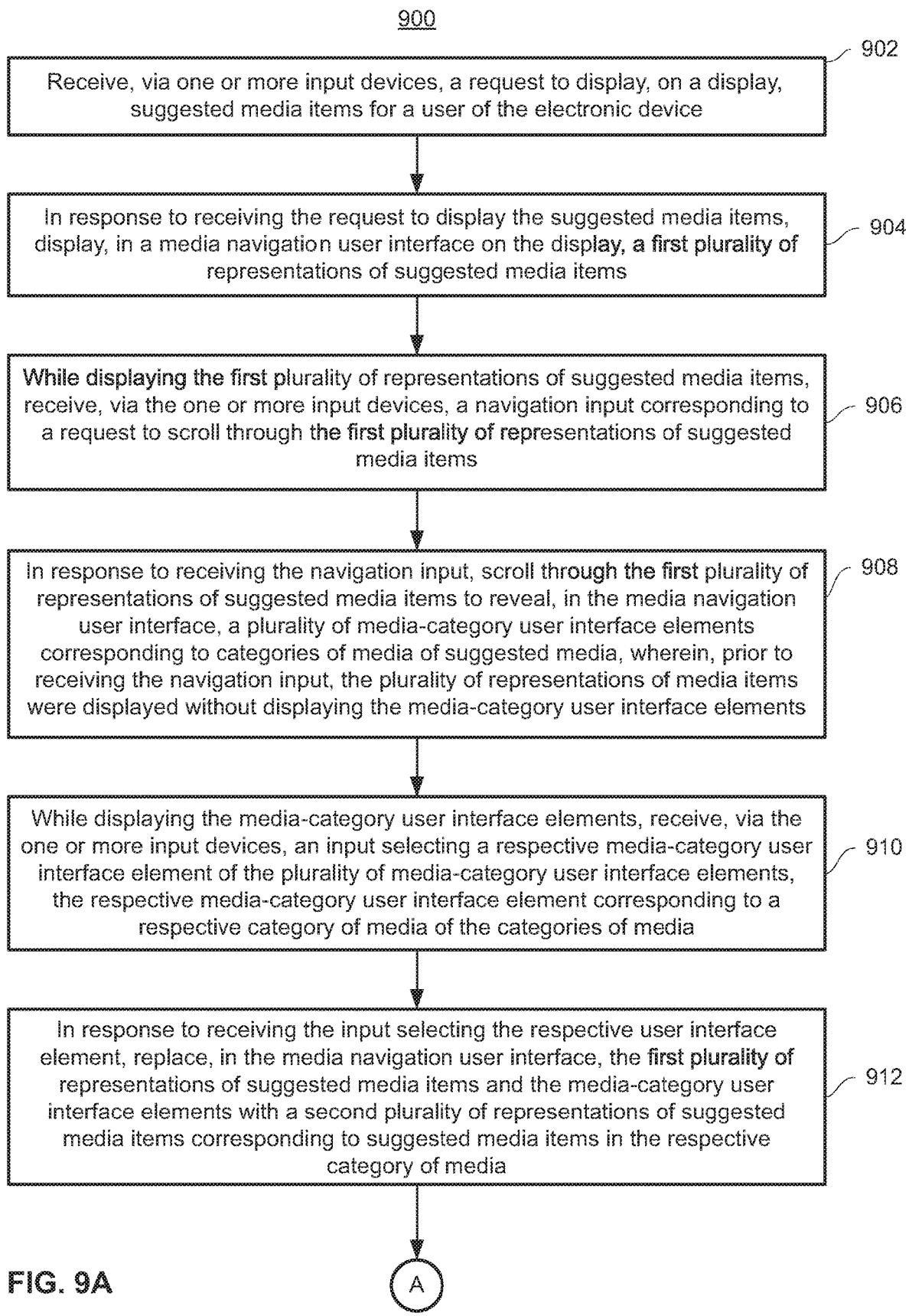
FIGS. 9A-9I are flow diagrams illustrating a method of facilitating browsing of media items by category in accordance with some embodiments of the disclosure.
Figure 9B:
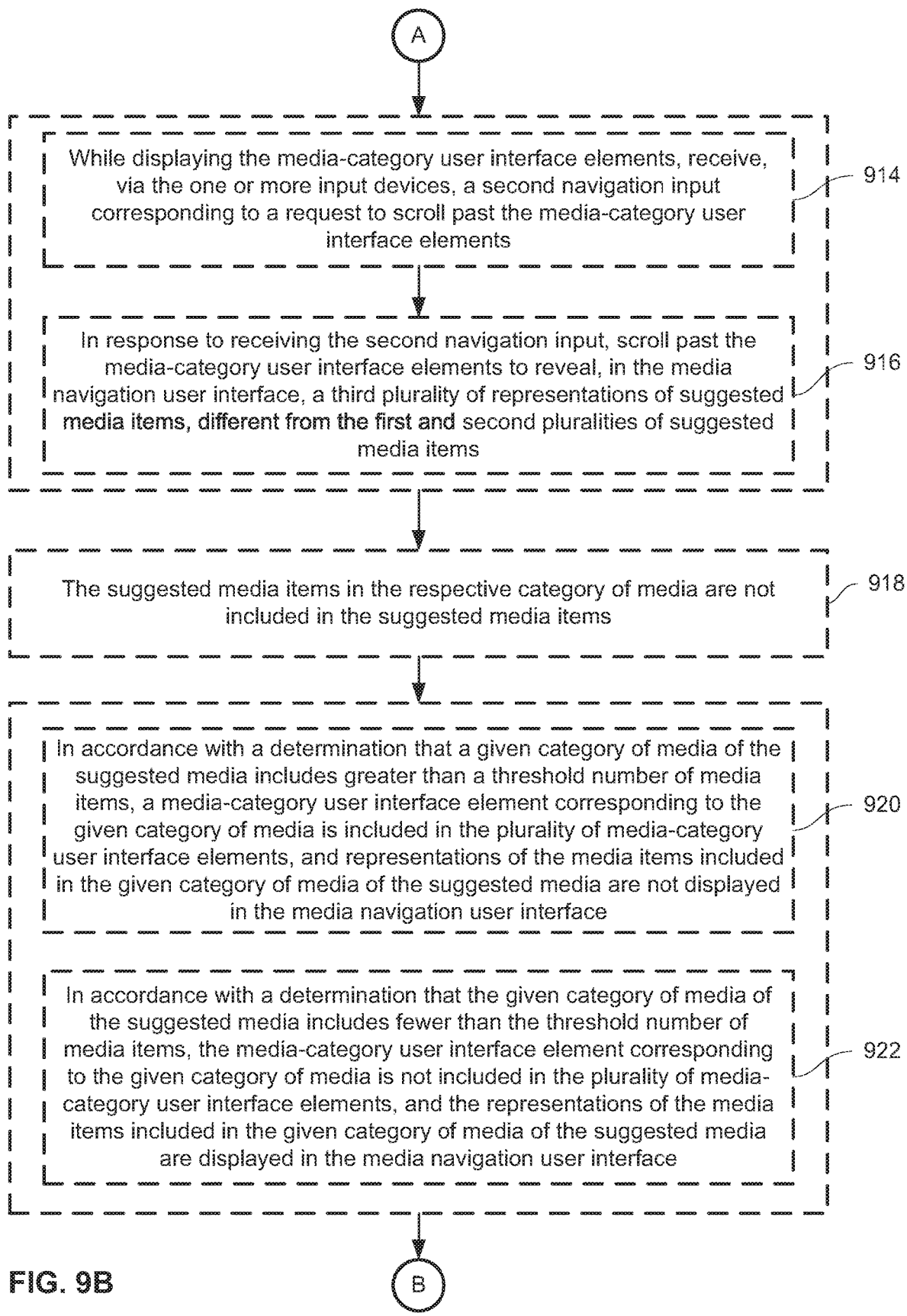
Figure 9C:
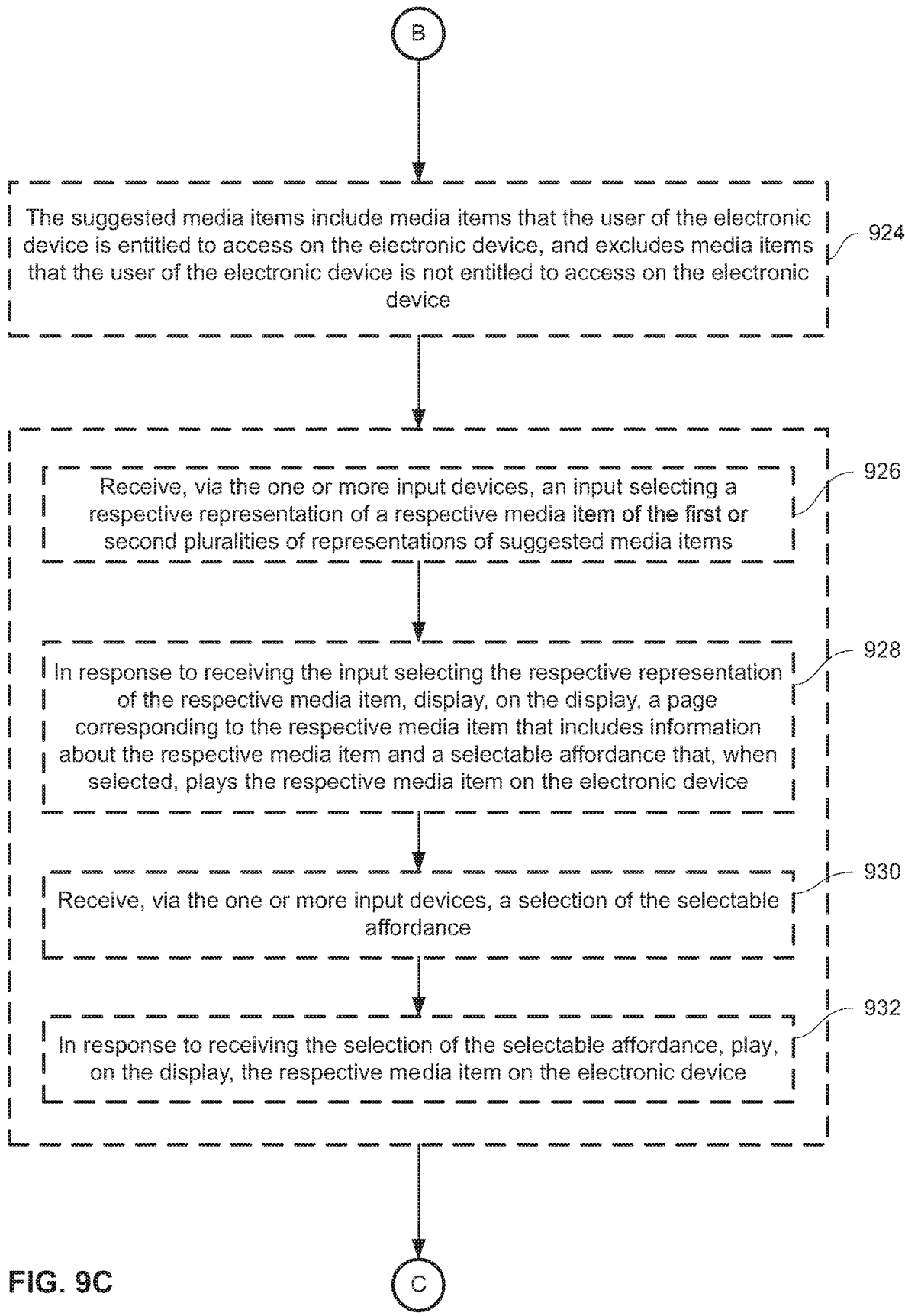
Figure 9D:
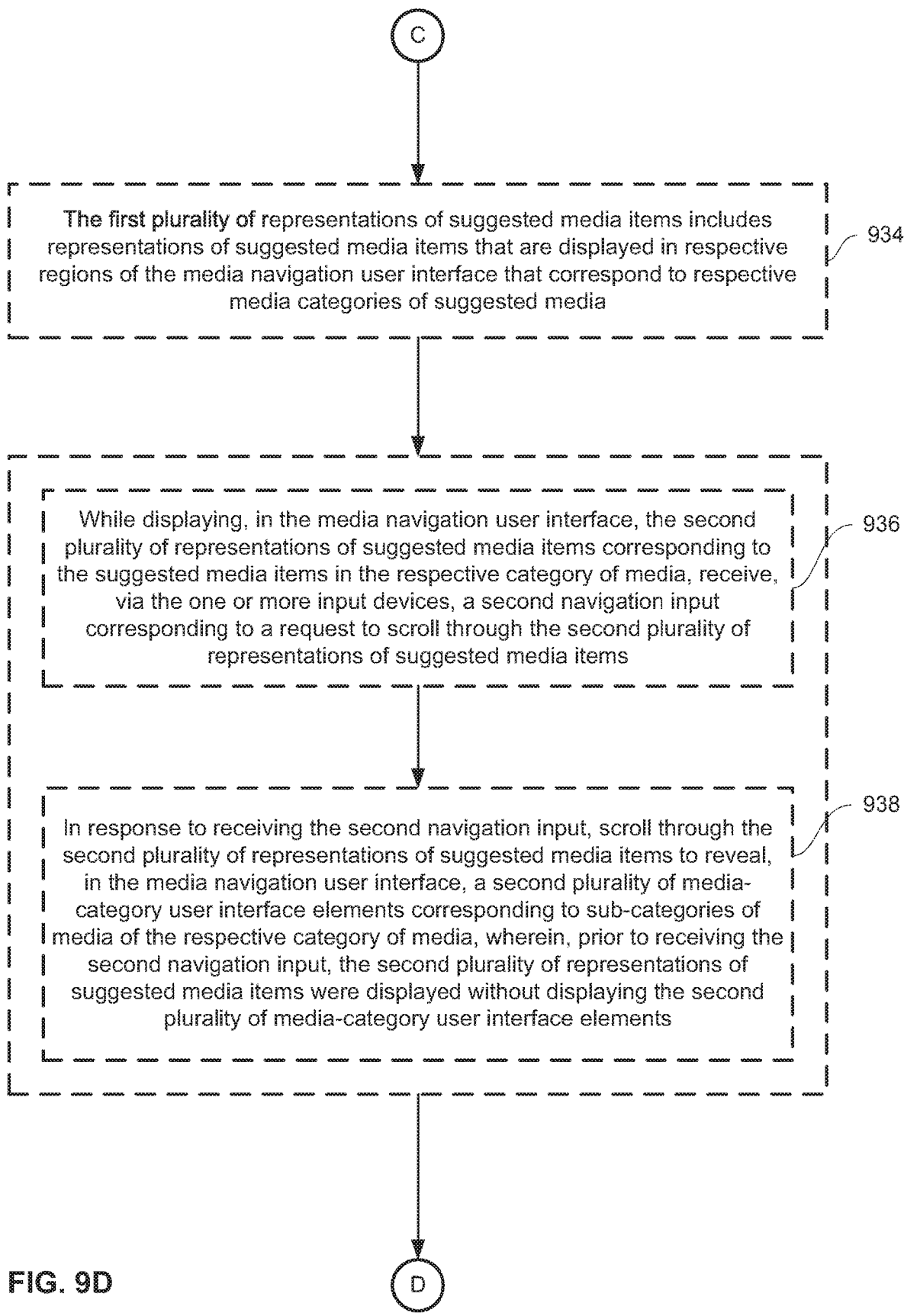
Figure 9E:
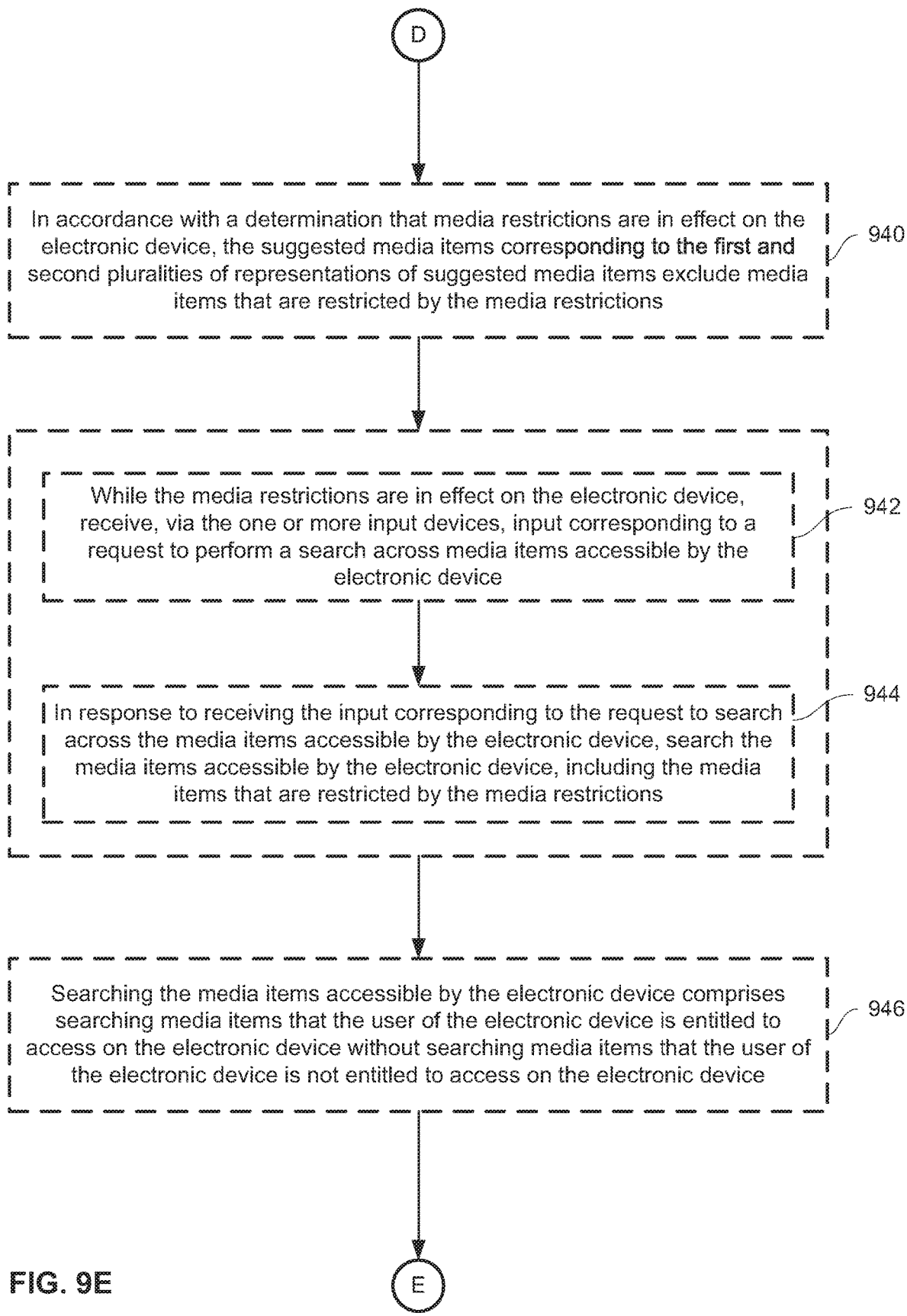
Figure 9F:
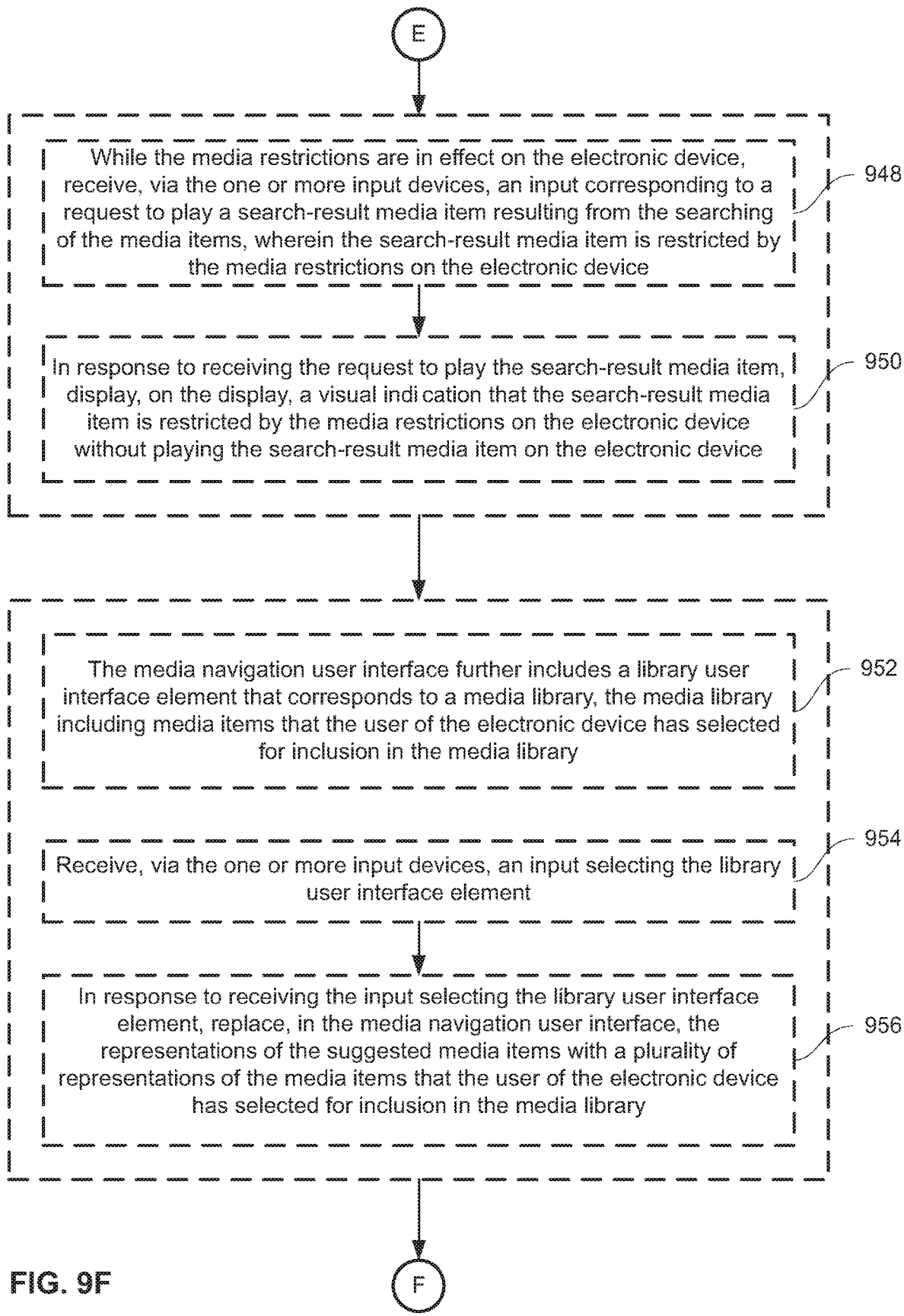
Figure 9G:
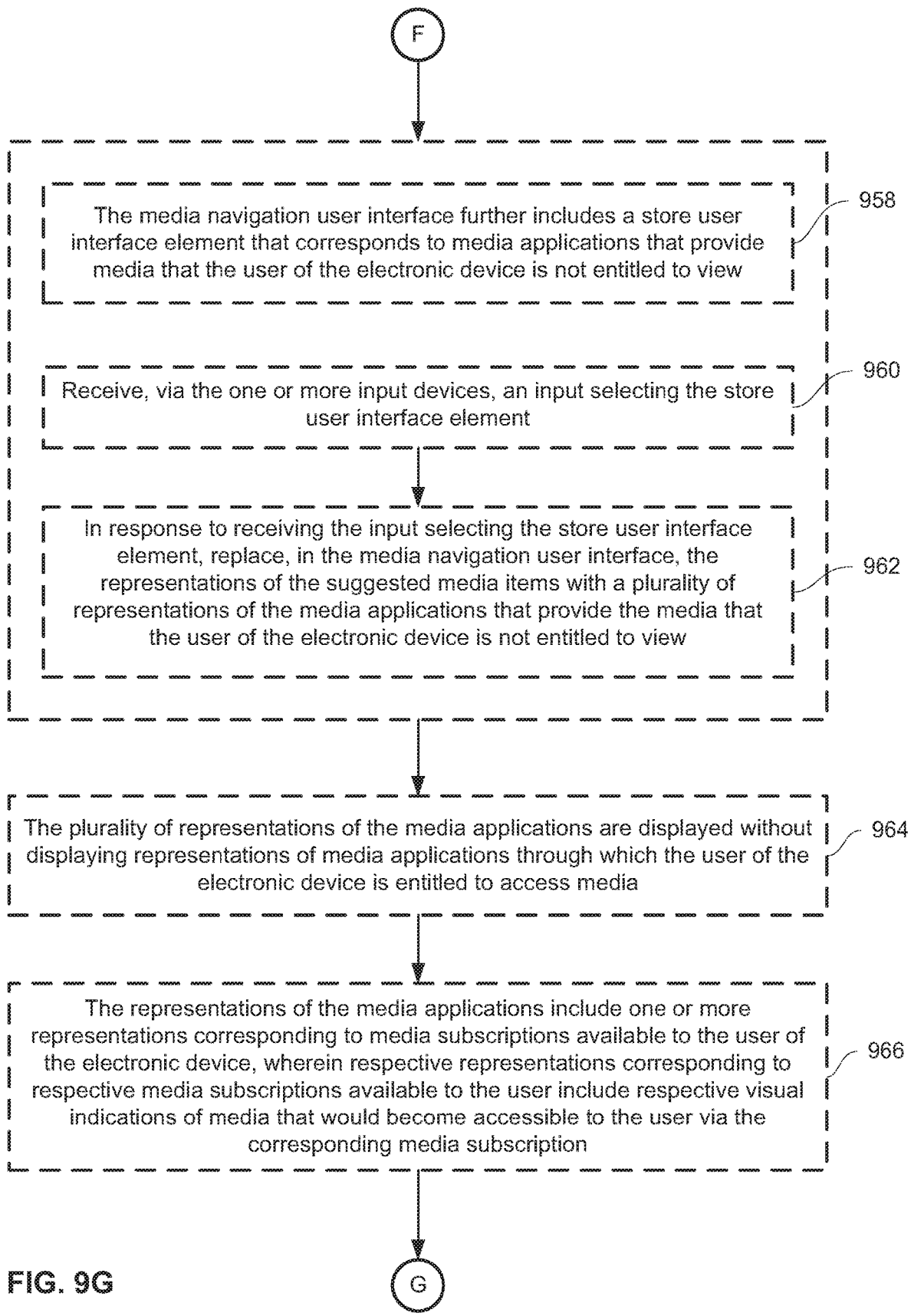
Figure 9H:
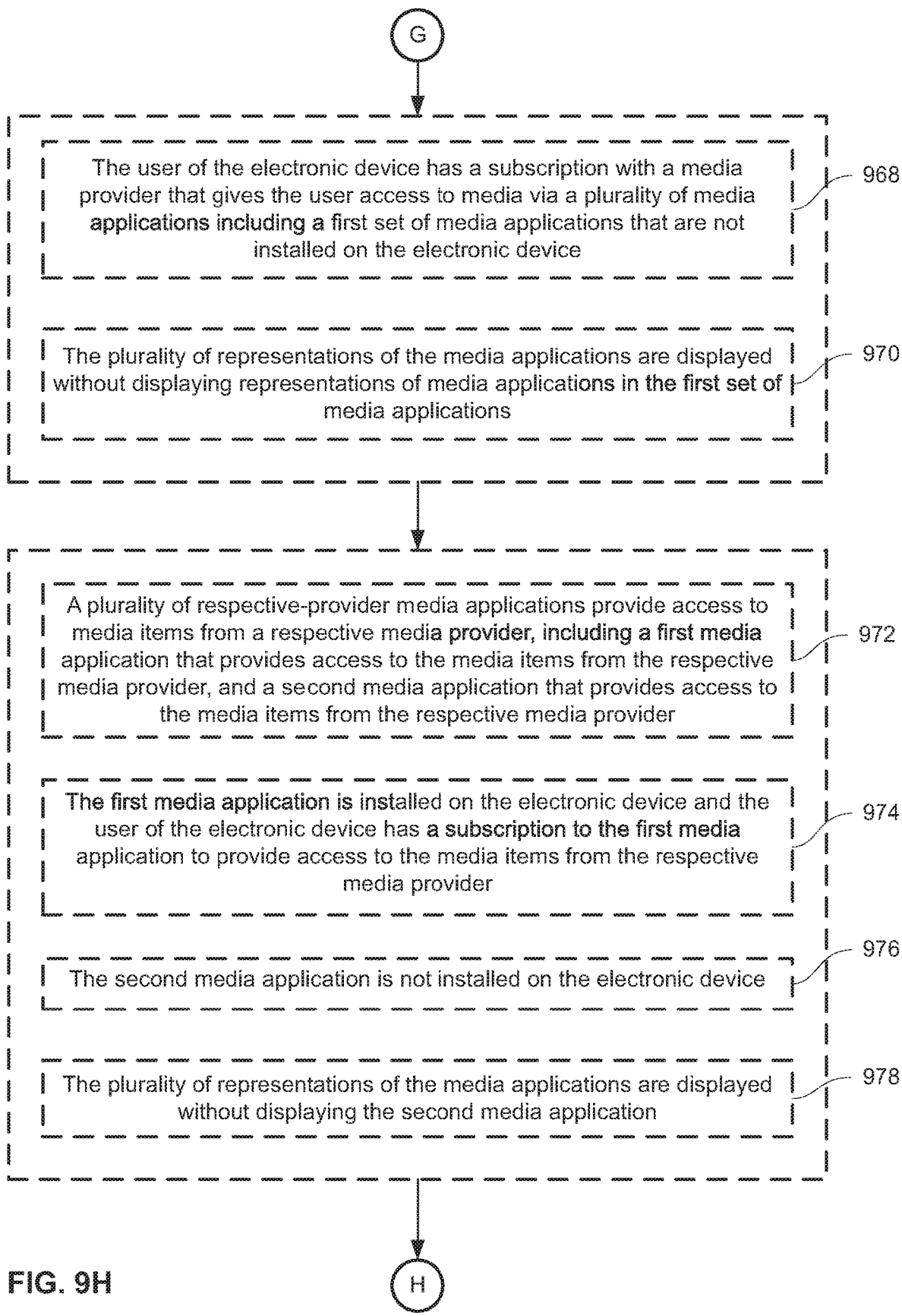
Figure 9I:
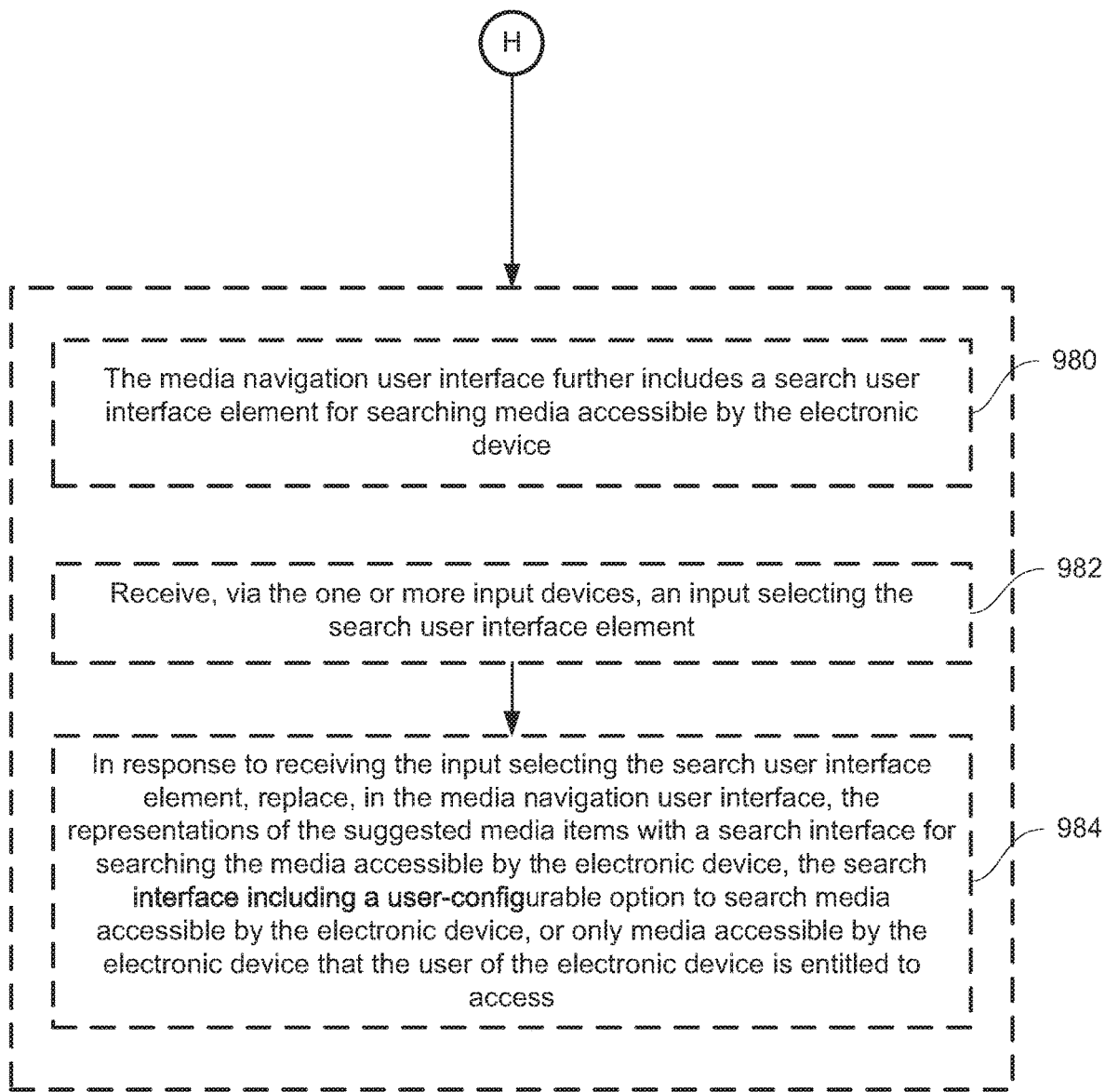

In some embodiments, a plurality of respective-provider media applications provide access to media items from a respective media provider, including a first media application that provides access to the media items from the respective media provider, and a second media application that provides access to the media items from the respective media provider (972), such as in FIGS. 8X-8Z (e.g., a given media provider has multiple media applications that are able to provide access to the media on the media provider). For example, the media provider may have a first application that provides access to the media based on a user's subscription with a cable company (e.g., an indirect subscription to the media provider via the user's subscription with the cable company), and a second application that provides access to the media based on a user's subscription directly with the media provider. In some embodiments, the first media application is installed on the electronic device and the user of the electronic device has a subscription to the first media application to provide access to the media items from the respective media provider (974), such as in FIGS. 8Y-8Z (e.g., the user has already downloaded and authenticated one of the media applications via which media from the media provider is accessible). In some embodiments, the second media application is not installed on the electronic device (976), such as in FIGS. 8Y-8Z (e.g., others of the media applications for accessing the media from the media provider are not downloaded, installed and/or authenticated on the electronic device). In some embodiments, the plurality of representations of the media applications are displayed without displaying the second media application (978), such as in FIG. 8Z (e.g., even though some media applications for accessing media from the given media provider are not installed on the electronic device, they are optionally not displayed in the store user interface, because the user has already installed and authenticated a different media application for accessing media from the given media provider). In some embodiments, the plurality of representations of the media applications are displayed without displaying any representations of the plurality of respective-provider media applications. In this way, the electronic device does not display information that may not be of interest to the user of the electronic device (e.g., representations of duplicative media applications), thus improving the efficiency of user-electronic device interactions.

In some embodiments, the media navigation user interface further includes a search user interface element for searching media accessible by the electronic device (980), such as in FIG. 8BB. In some embodiments, the electronic device receives (982), via the one or more input devices, an input selecting the search user interface element (e.g., a click of a button on the input devices when the search user interface element has the focus). In response to receiving the input selecting the search user interface element, the electronic device optionally replaces (984), in the media navigation user interface, the representations of the suggested media items with a search interface for searching the media accessible by the electronic device, the search interface including a user-configurable option to search media accessible by the electronic device, or only media accessible by the electronic device that the user of the electronic device is entitled to access, such as in FIG. 8BB (e.g., the user has the option to search all media accessible by the electronic device, or only media that the user is entitled to view). In some embodiments, searching from the search interface is performed while media restrictions are in effect on the electronic device, as previously described (e.g., as in step 942). In such embodiments, such searching optionally searches all media accessible by the electronic device regardless of the media restrictions, such as in FIG. 8DD and step 942. In some embodiments, if the user tries to play a media item that is found by the searching, but that is restricted by the media restrictions (e.g., as in step 948), the electronic device displays a warning that the media item is restricted, and does not play it, as previously described, such as in FIG. 8FF and step 950.

It should be understood that the particular order in which the operations in FIGS. 9A-9I have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1100, 1300 and 1900) are also applicable in an analogous manner to method 900 described above with respect to FIGS. 9A-9I. For example, the unified media browsing application and user interface, suggested media items, trending media items, media applications, representations of suggested and trending media items, and media providers described above with reference to method 900 optionally have one or more of the characteristics of the unified media browsing application and user interface, suggested media items, trending media items, media applications, representations of suggested and trending media items, and media providers described herein with reference to other methods described herein (e.g., methods 700, 1100, 1300 and 1900). For brevity, these details are not repeated here.

The operations in the information processing methods described above are, optionally, implemented by running one or more functional modules in an information processing apparatus such as general purpose processors (e.g., as described with respect to FIGS. 1A, 3, 5A and 15) or application specific chips. Further, the operations described above with reference to FIGS. 9A-9I are, optionally, implemented by components depicted in FIGS. 1A-1B. For example, receiving operations 902, 906 and 910, displaying operation 904, scrolling operation 908 and replacing operation 912 are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Unified Media Browsing Application Setup

Users interact with electronic devices in many different manners, including interacting with media (e.g., music, movies, etc.) that may be available (e.g., stored or otherwise accessible) on the electronic devices. For example, a user may browse and play media that is accessible on an electronic device in a unified media browsing application (e.g. as described with reference to FIGS. 6A-6LL, FIGS. 8A-8GG, FIGS. 10A-10Z, FIGS. 12A-12V and/or FIGS. 18A-18J). However, in some circumstances, in order for the media from different media applications to be browsable in the unified media browsing application, authorization from the user may be required to allow the corresponding media providers to share user-specific information with the unified media browsing application (e.g., information pertaining to the user's actions with respect to media on those media providers). The embodiments described below provide ways in which an electronic device facilitates the setup of a unified media browsing application, thereby enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 10A:
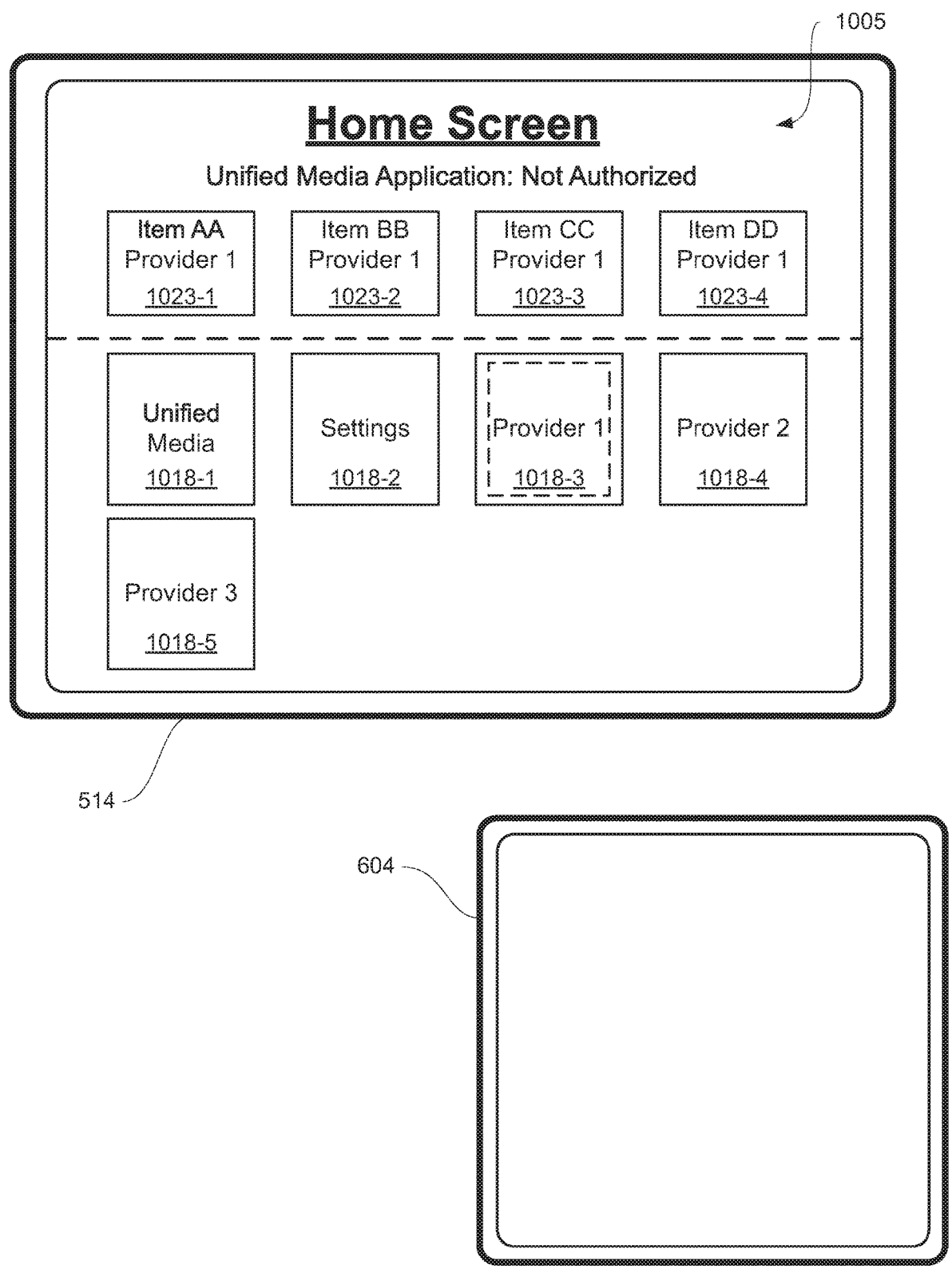
FIGS. 10A-10Z illustrate exemplary ways in which an electronic device facilitates the setup of a unified media browsing application in accordance with some embodiments of the disclosure.
Figure 10B:
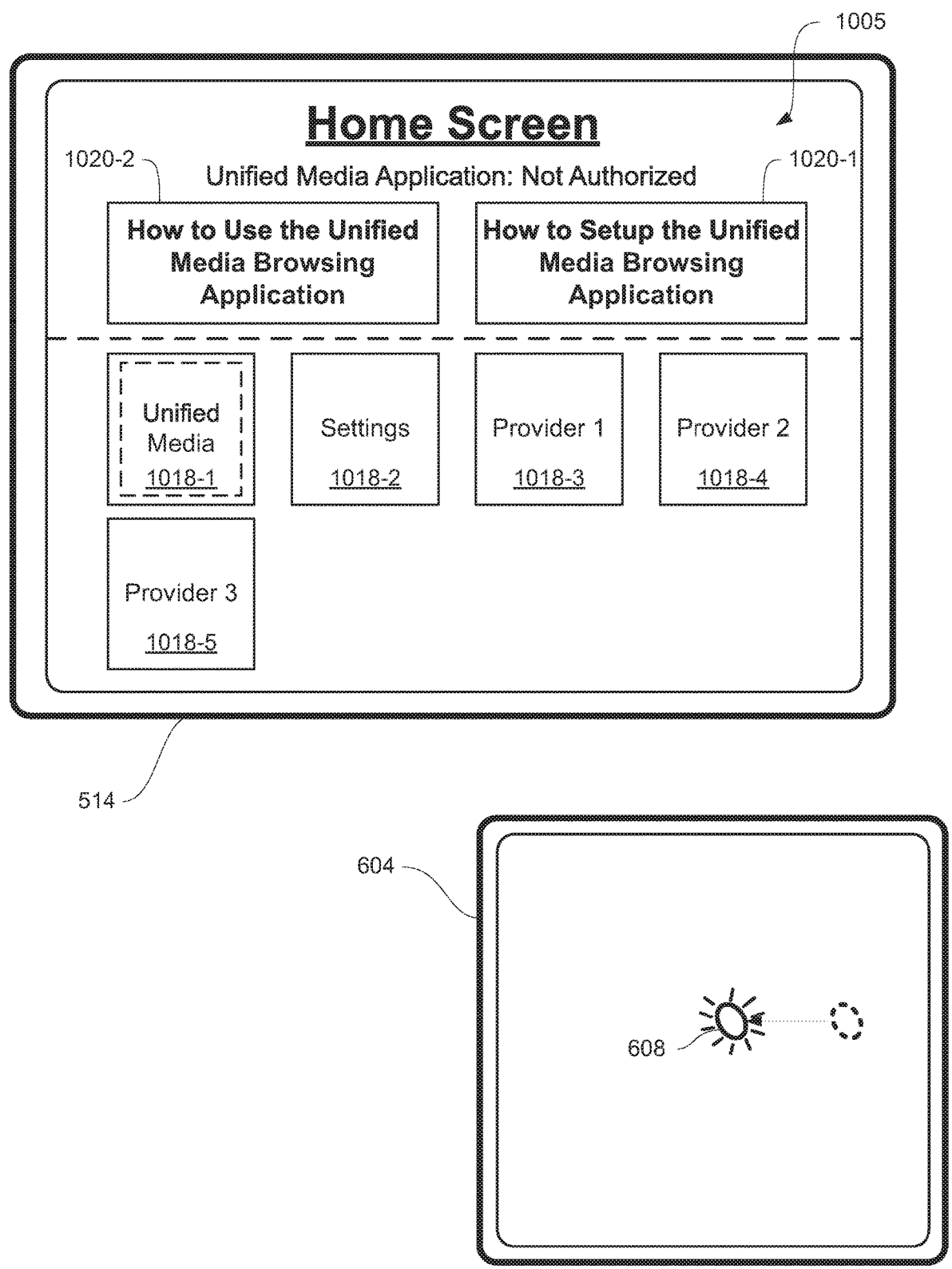
Figure 10C:
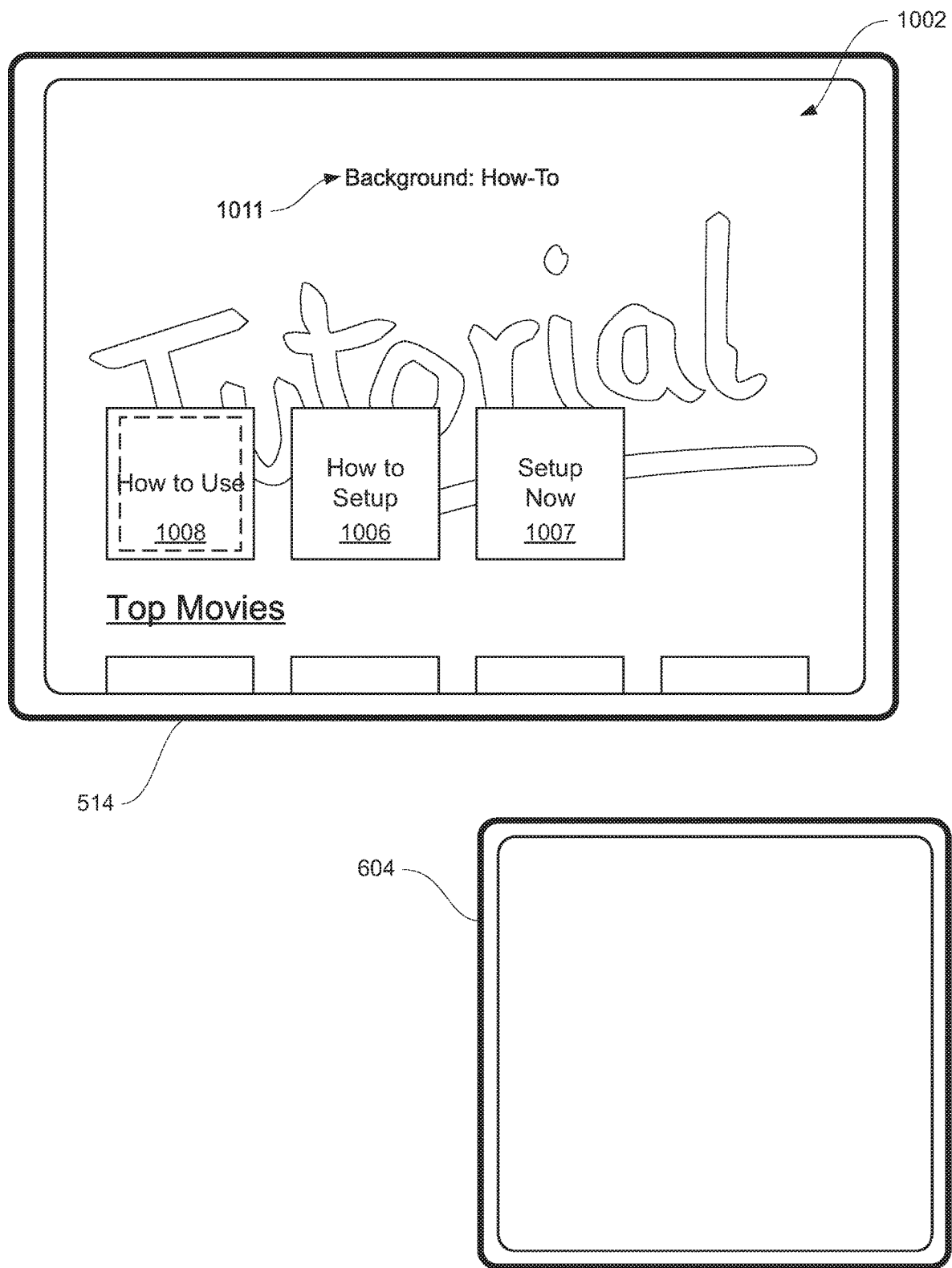
Figure 10D:
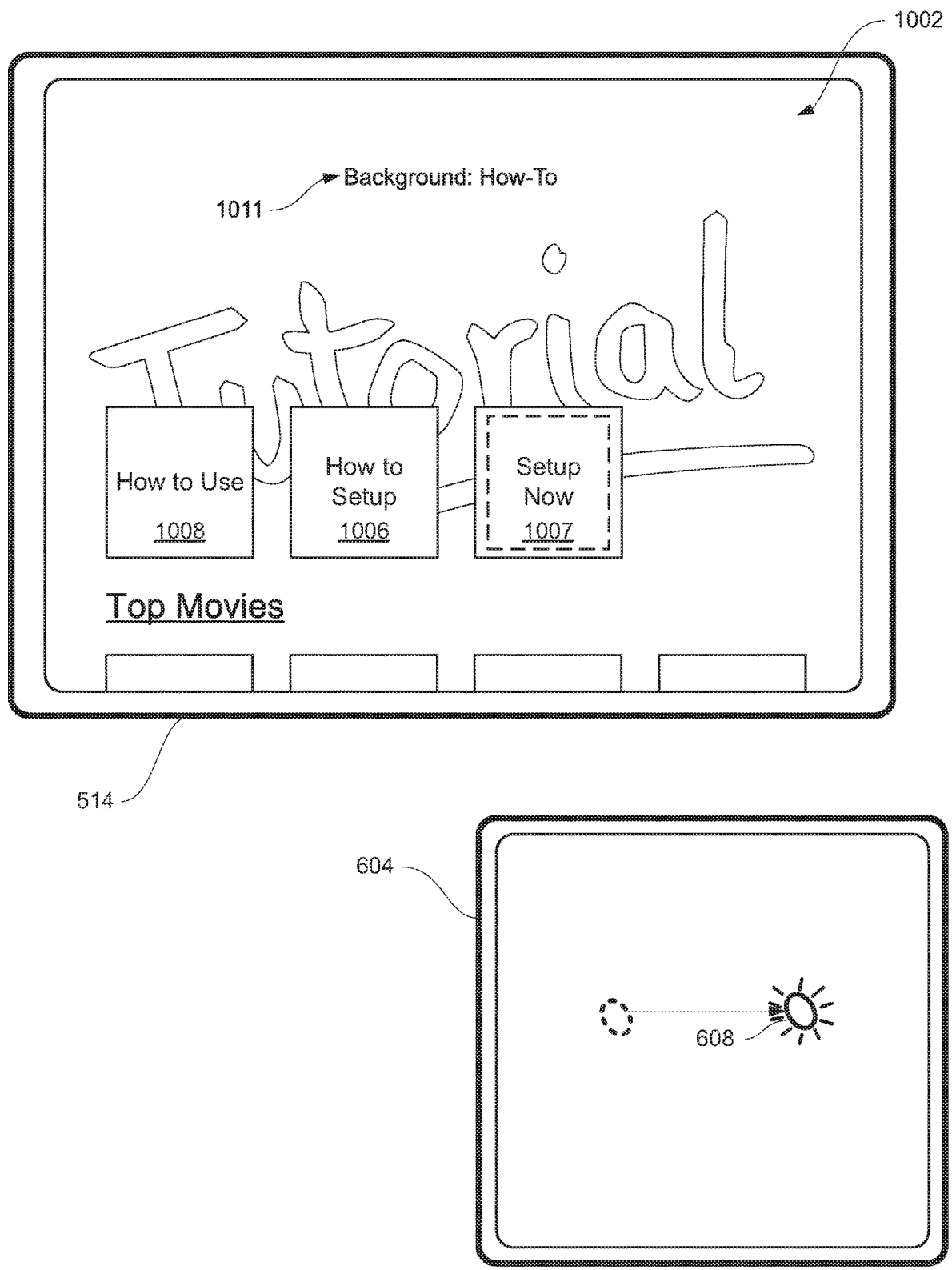
Figure 10E:
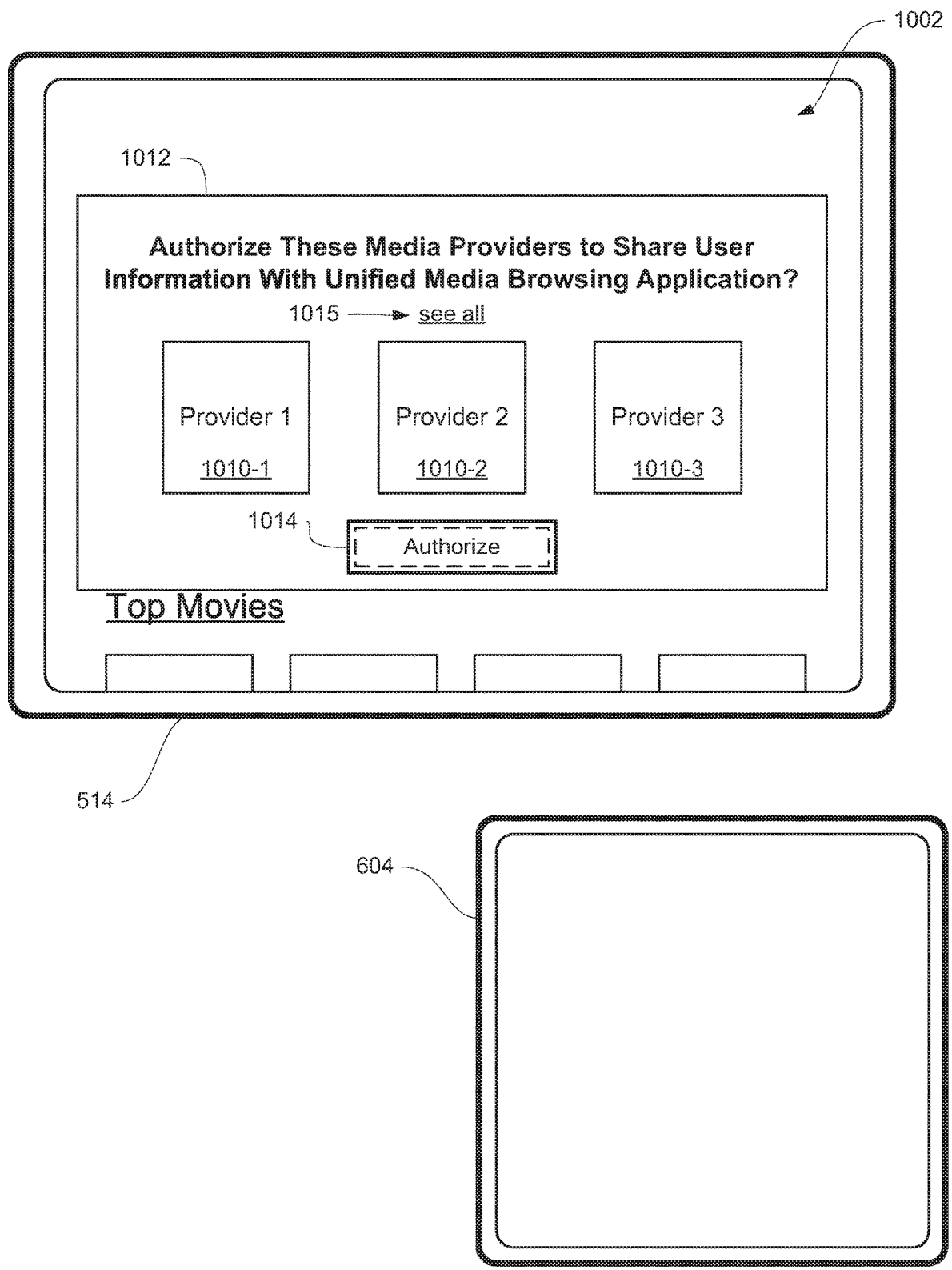
Figure 10F:
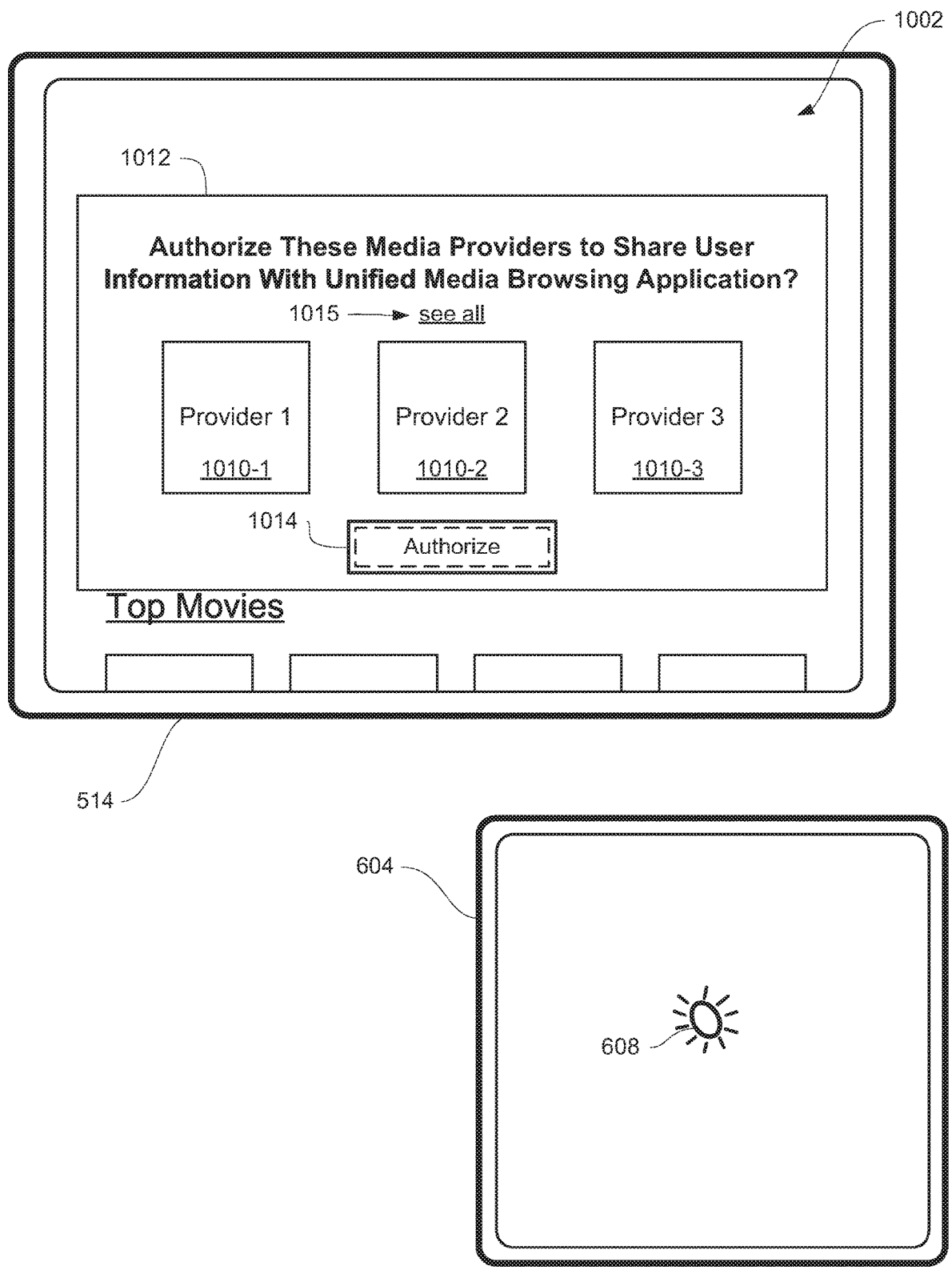
Figure 10G:
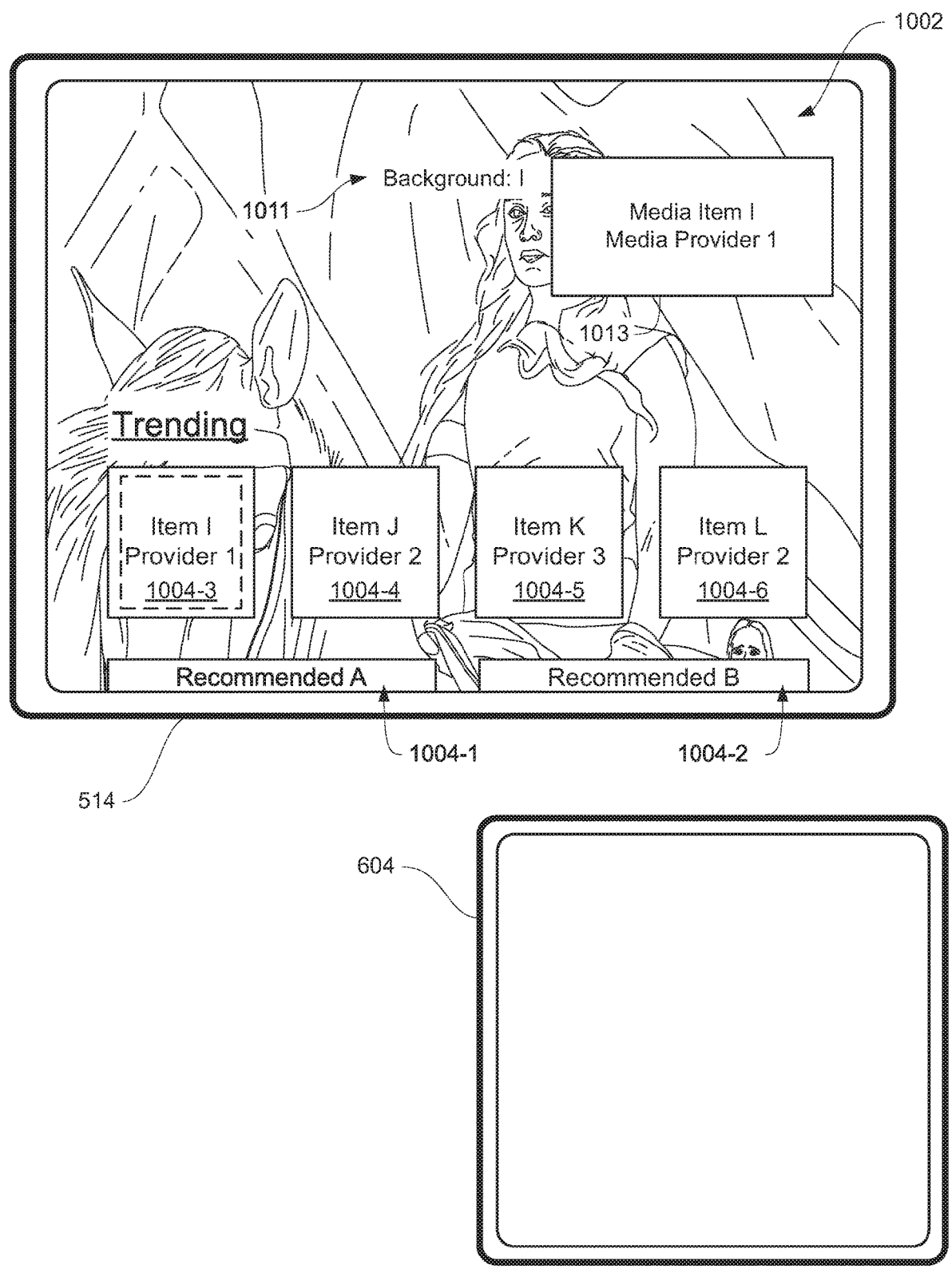
Figure 10H:
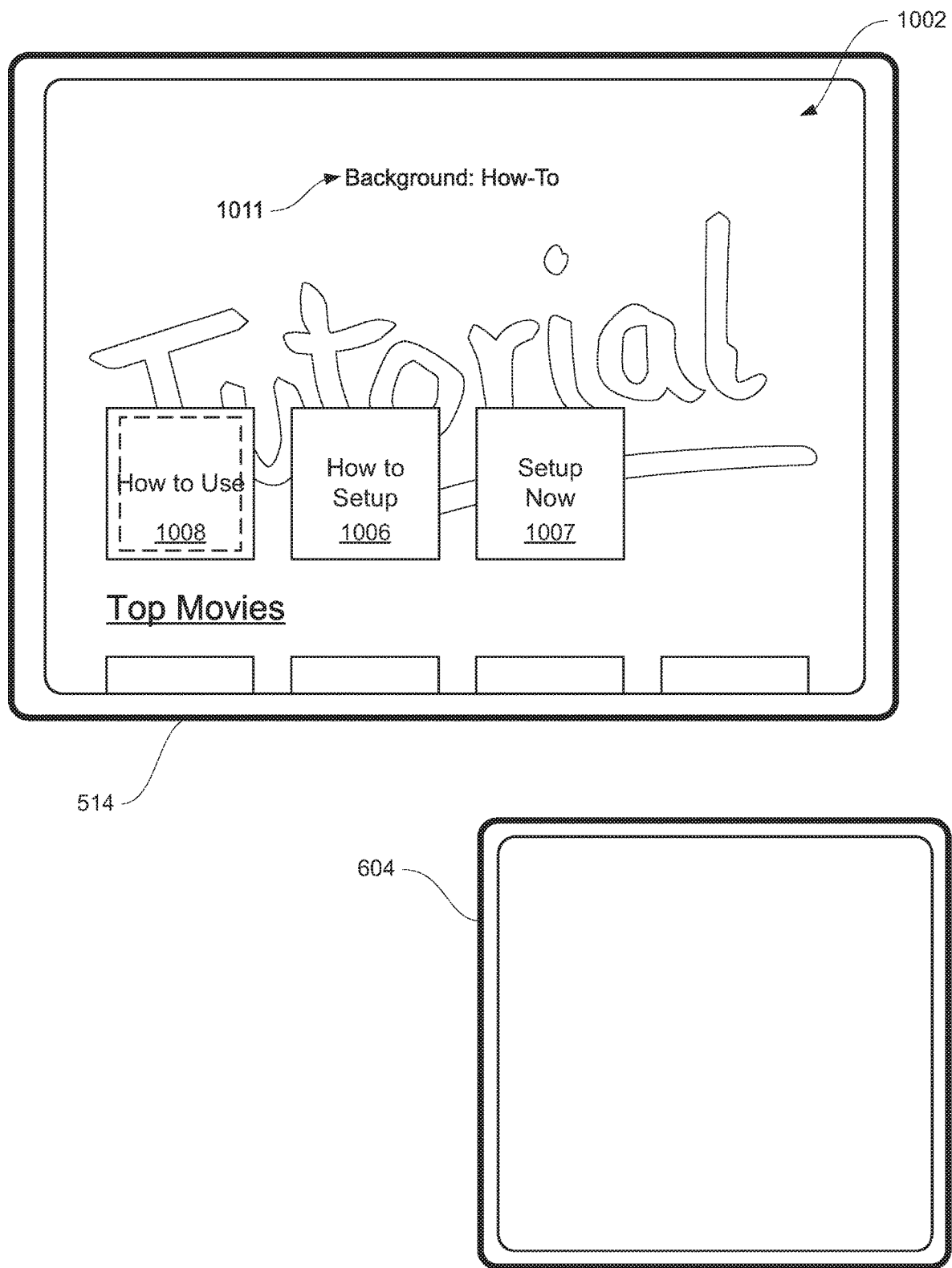
Figure 10I:
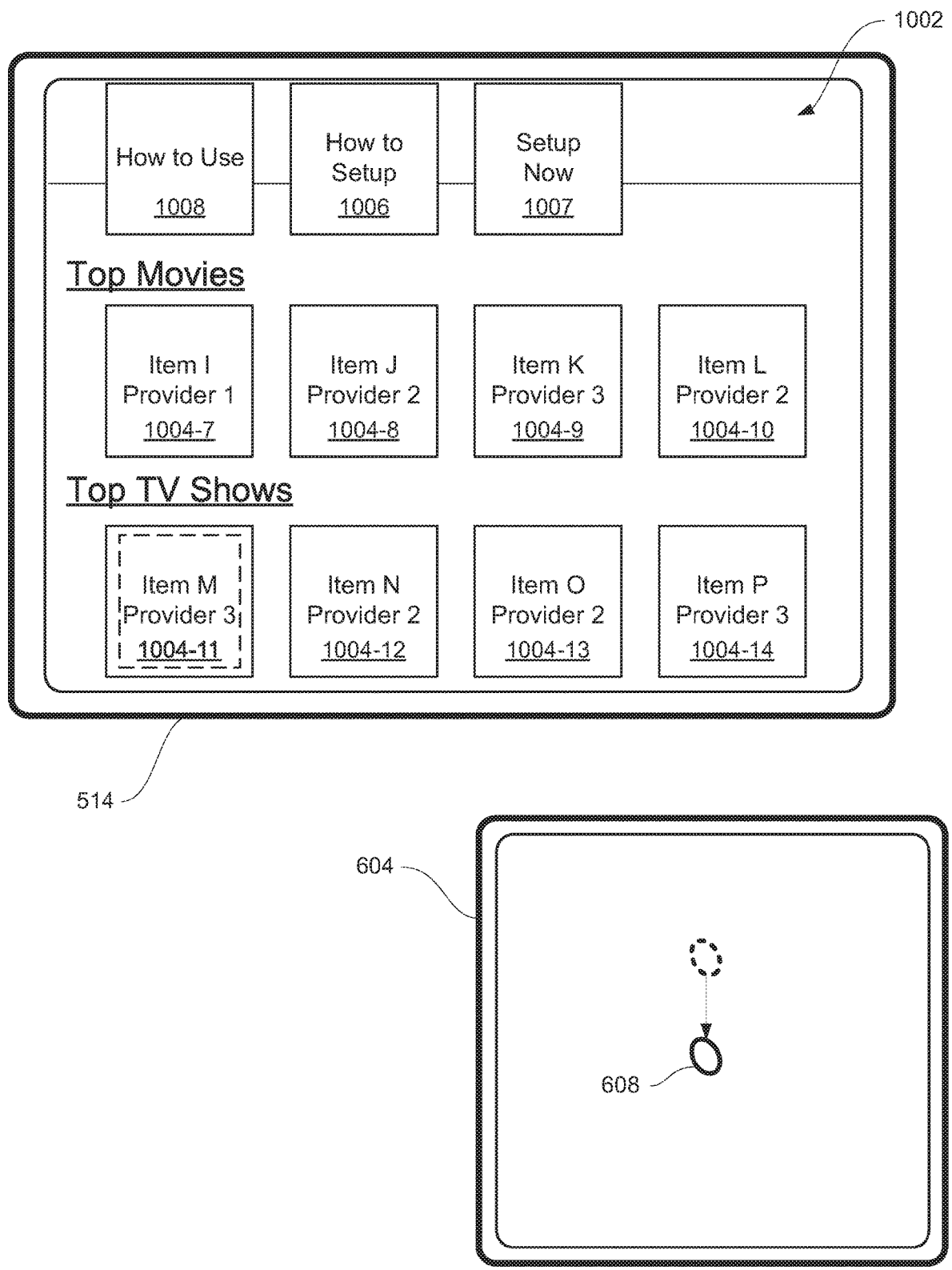
Figure 10J:
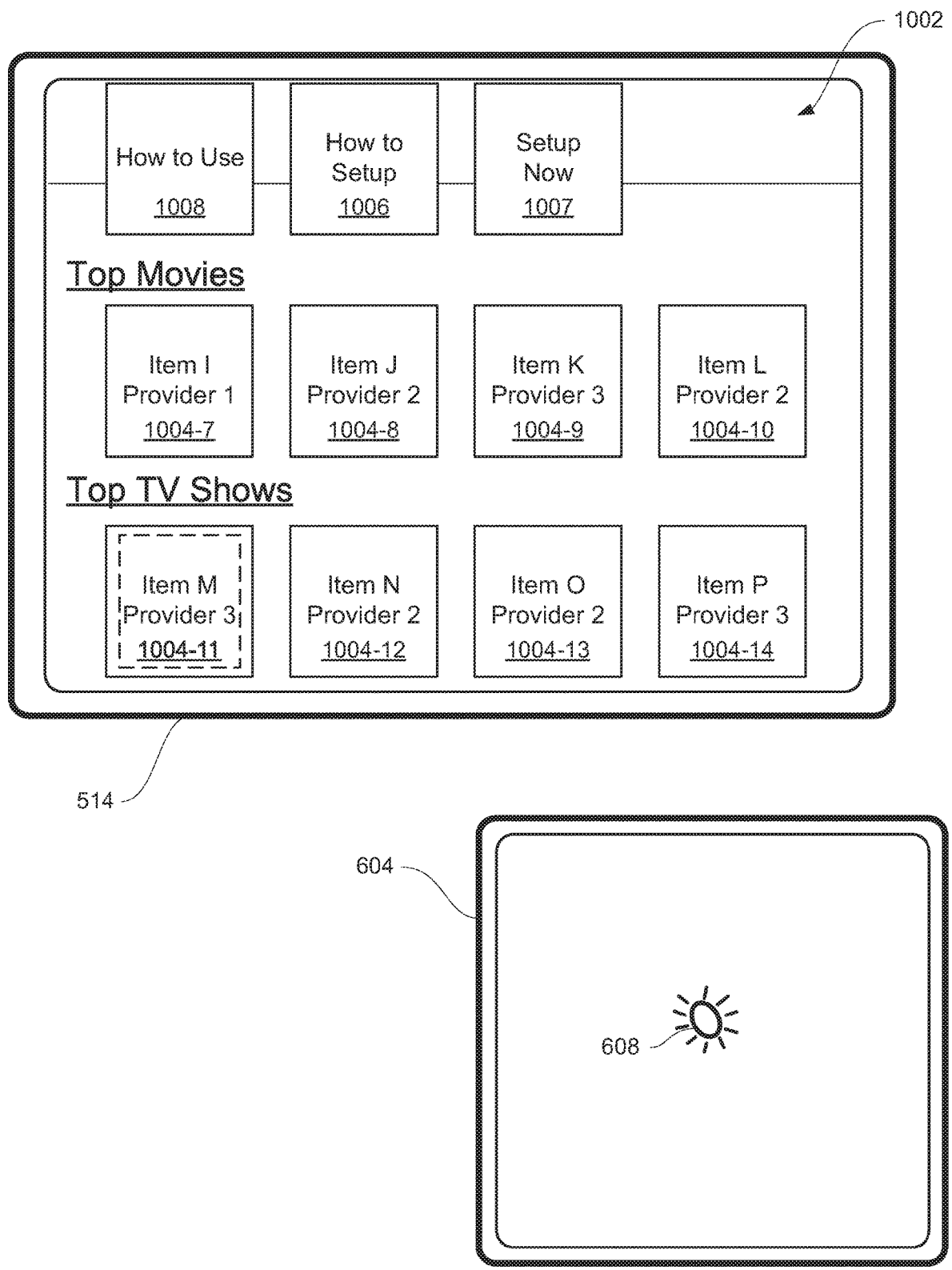
Figure 10K:
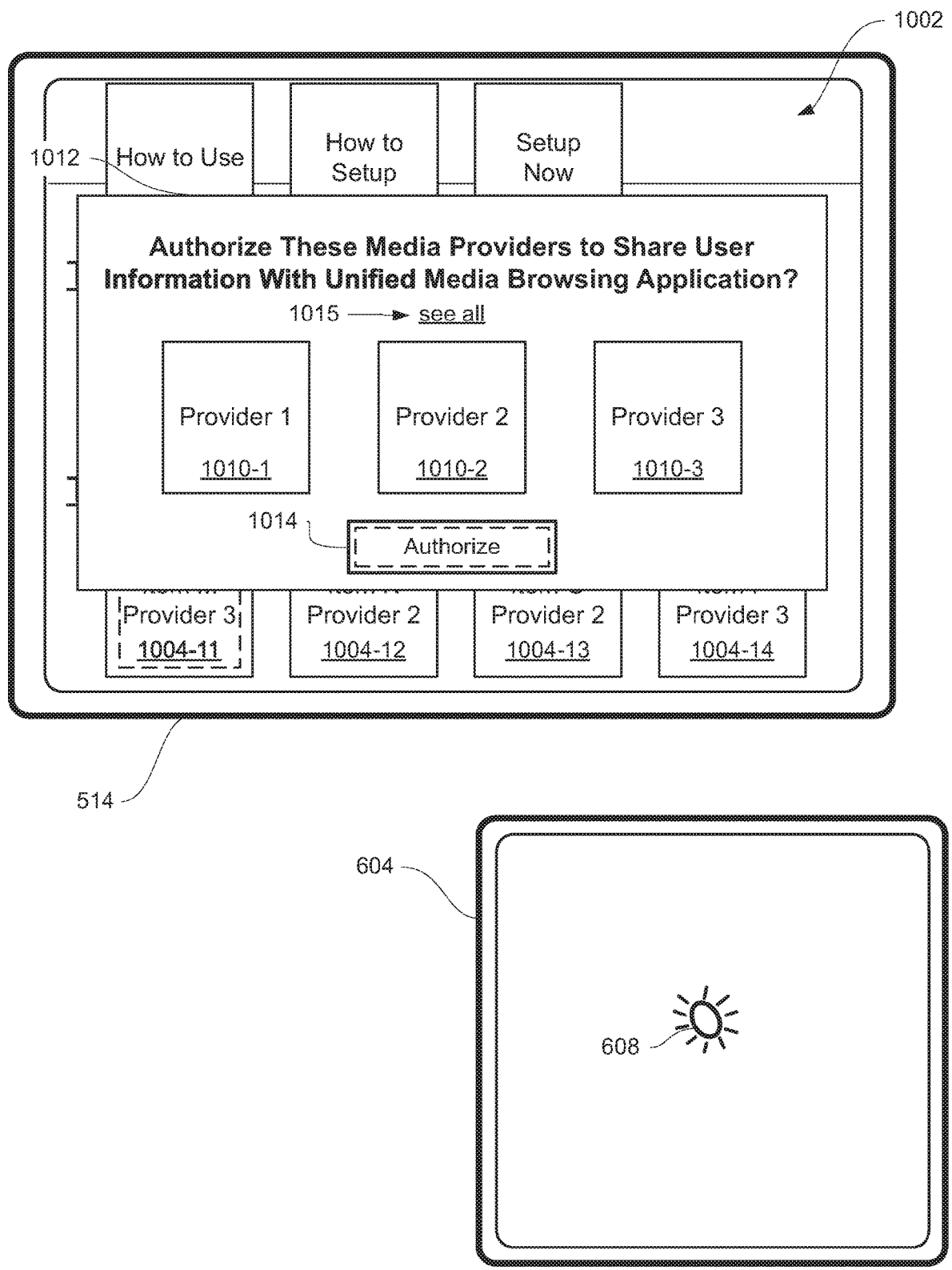
Figure 10L:
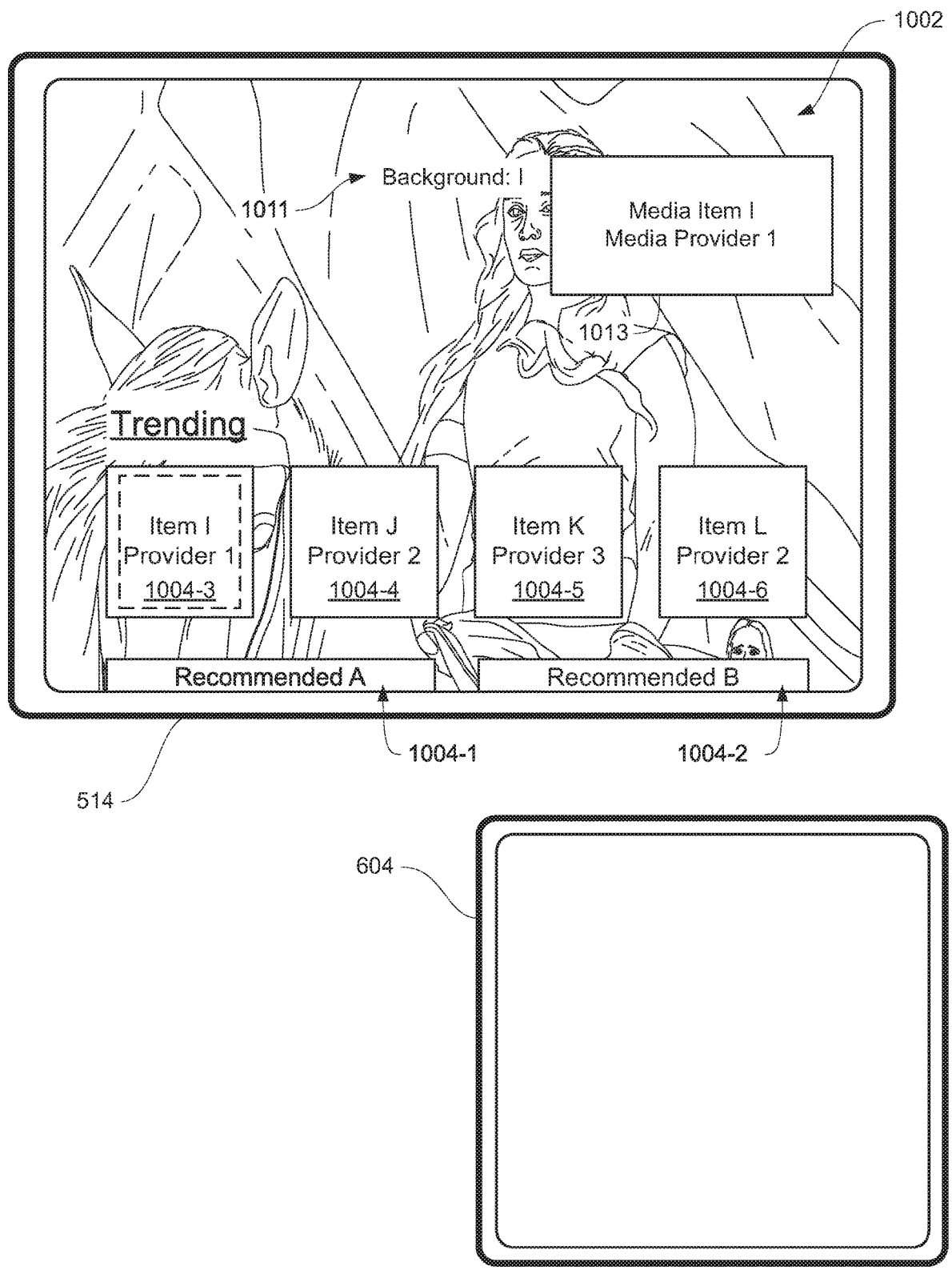
Figure 10M:
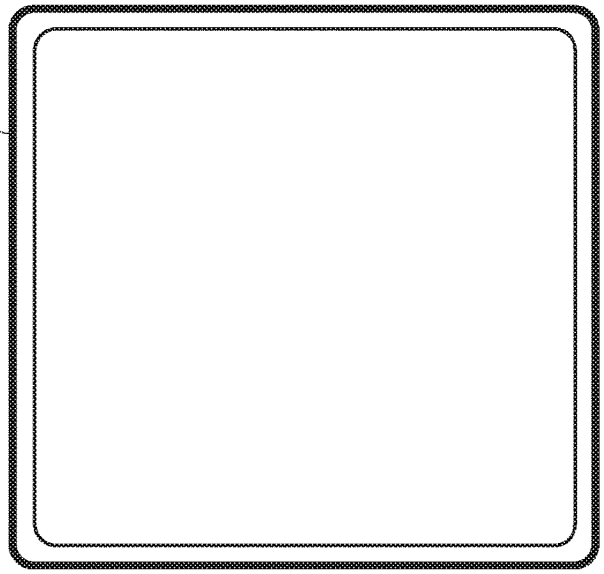
Figure 10N:
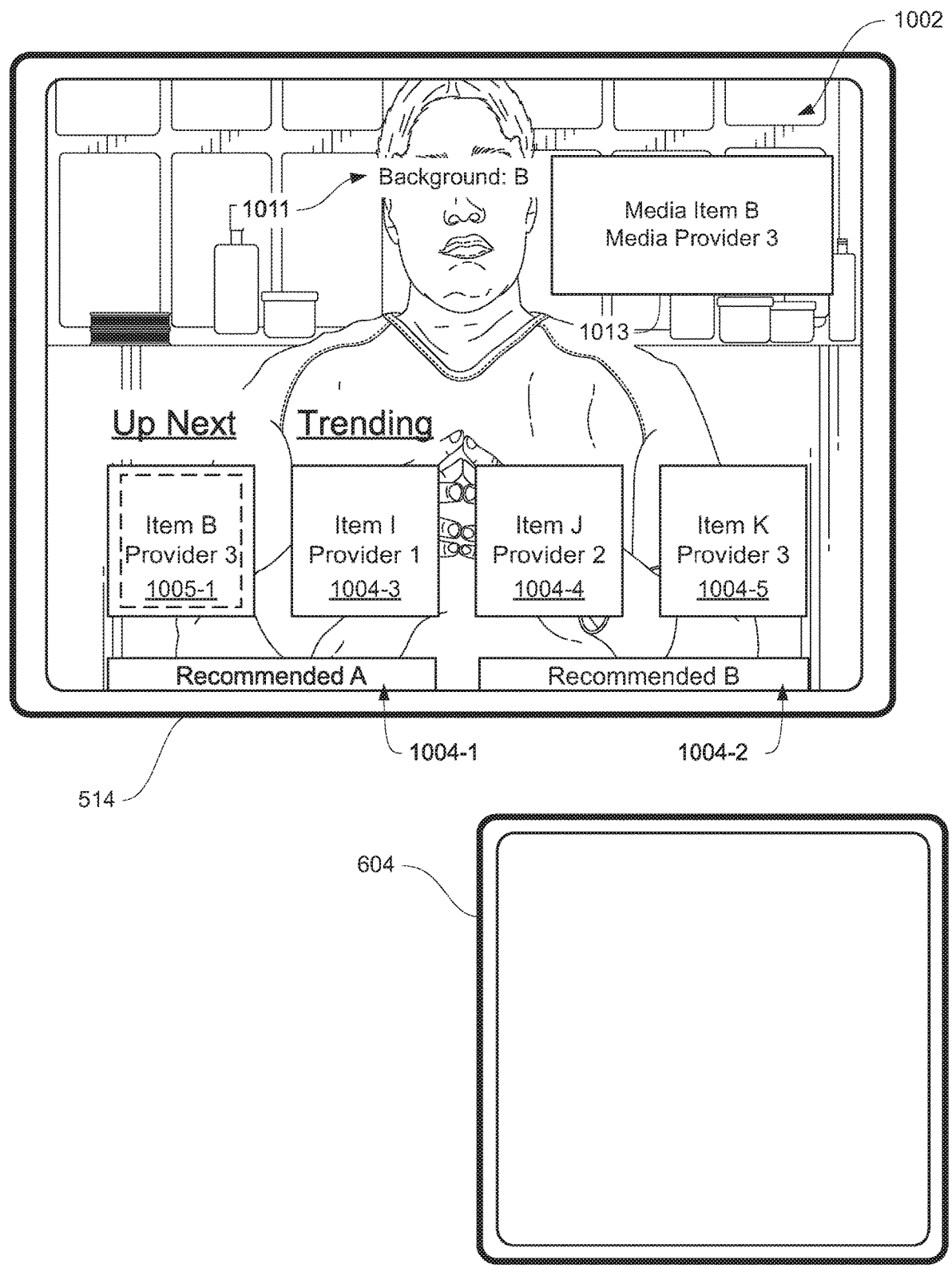
Figure 10O:
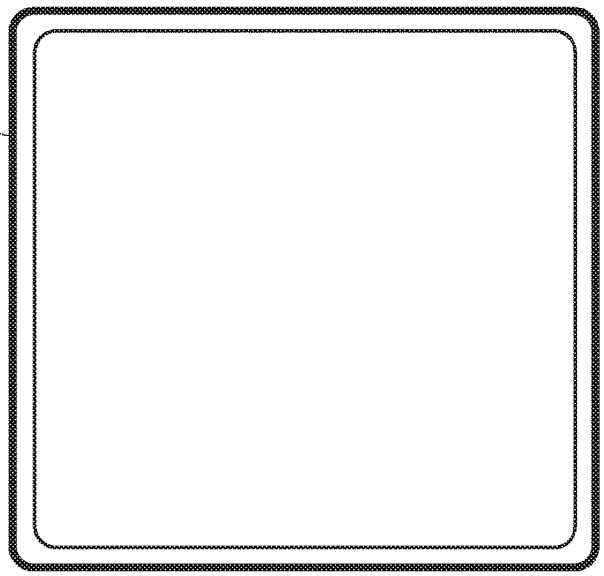
Figure 10P:
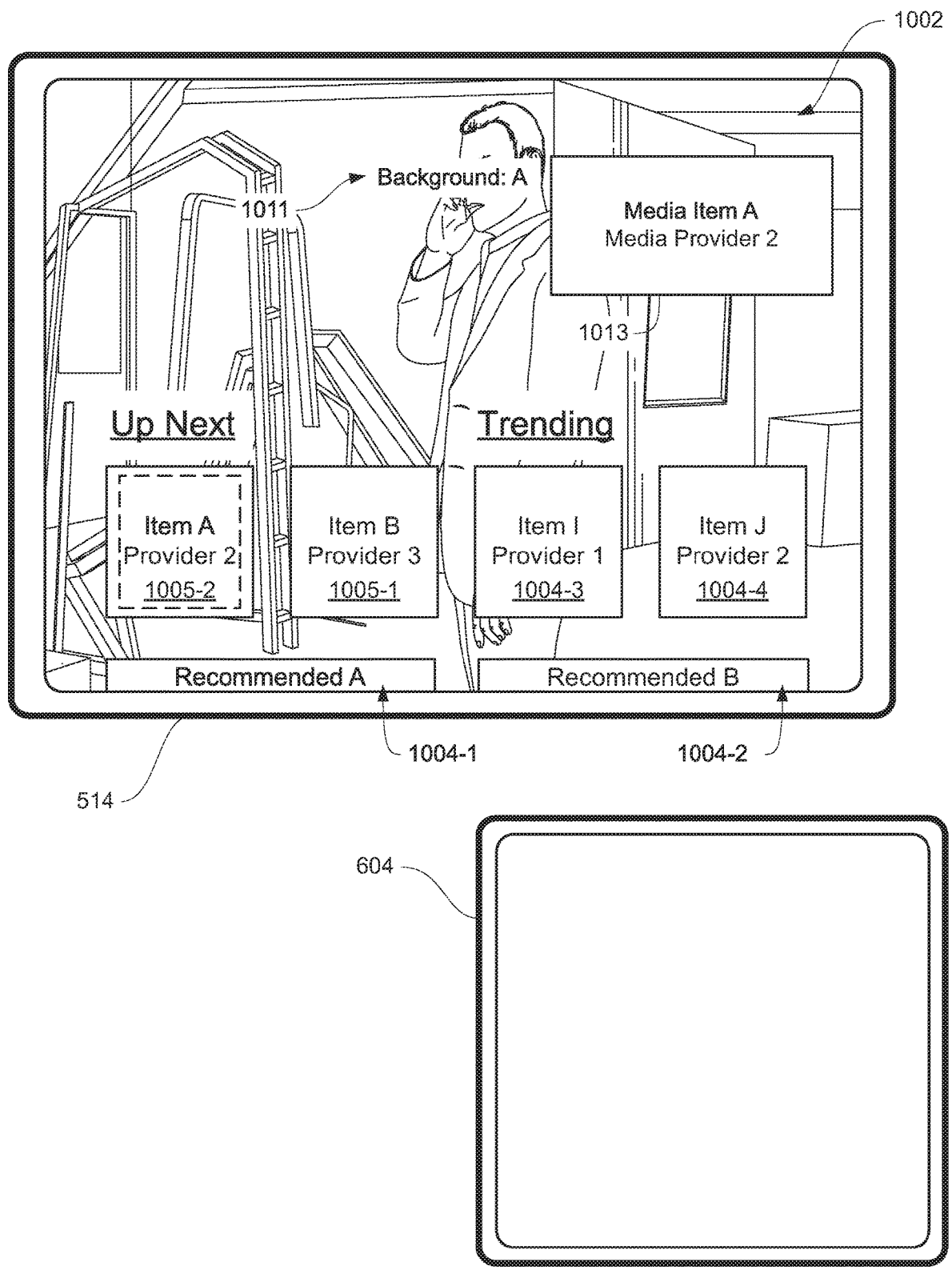
Figure 10Q:
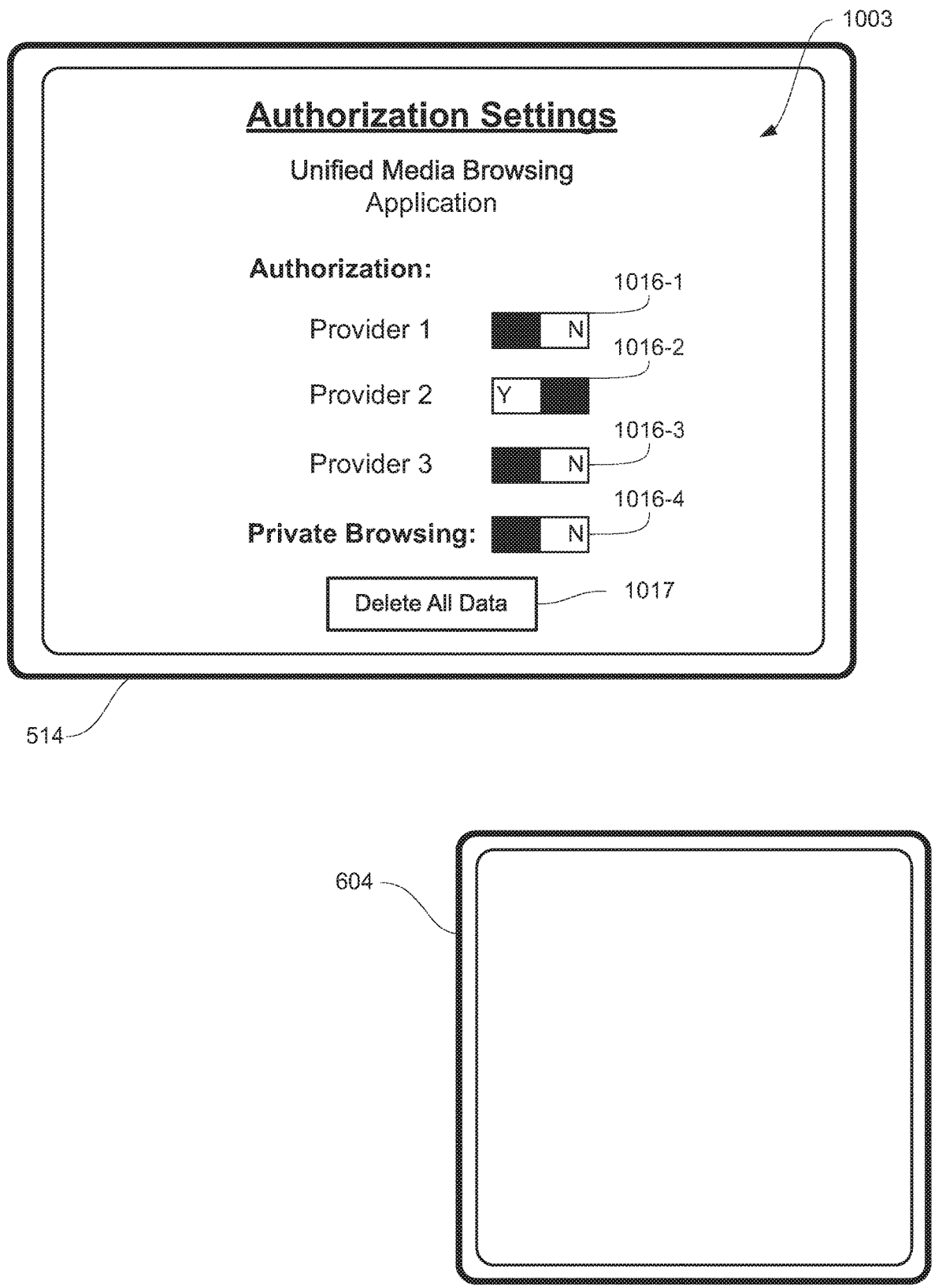
Figure 10R:
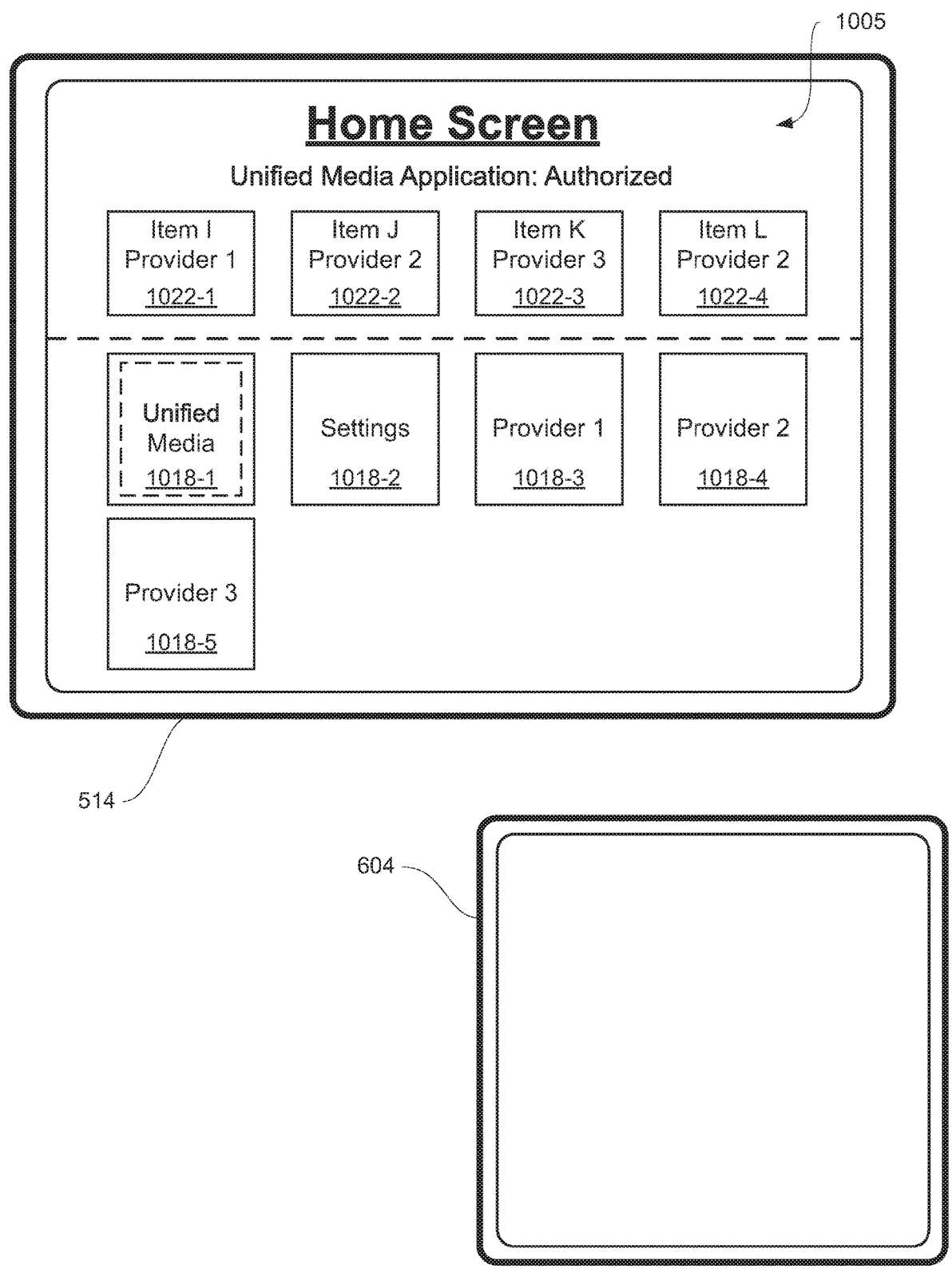
Figure 10S:
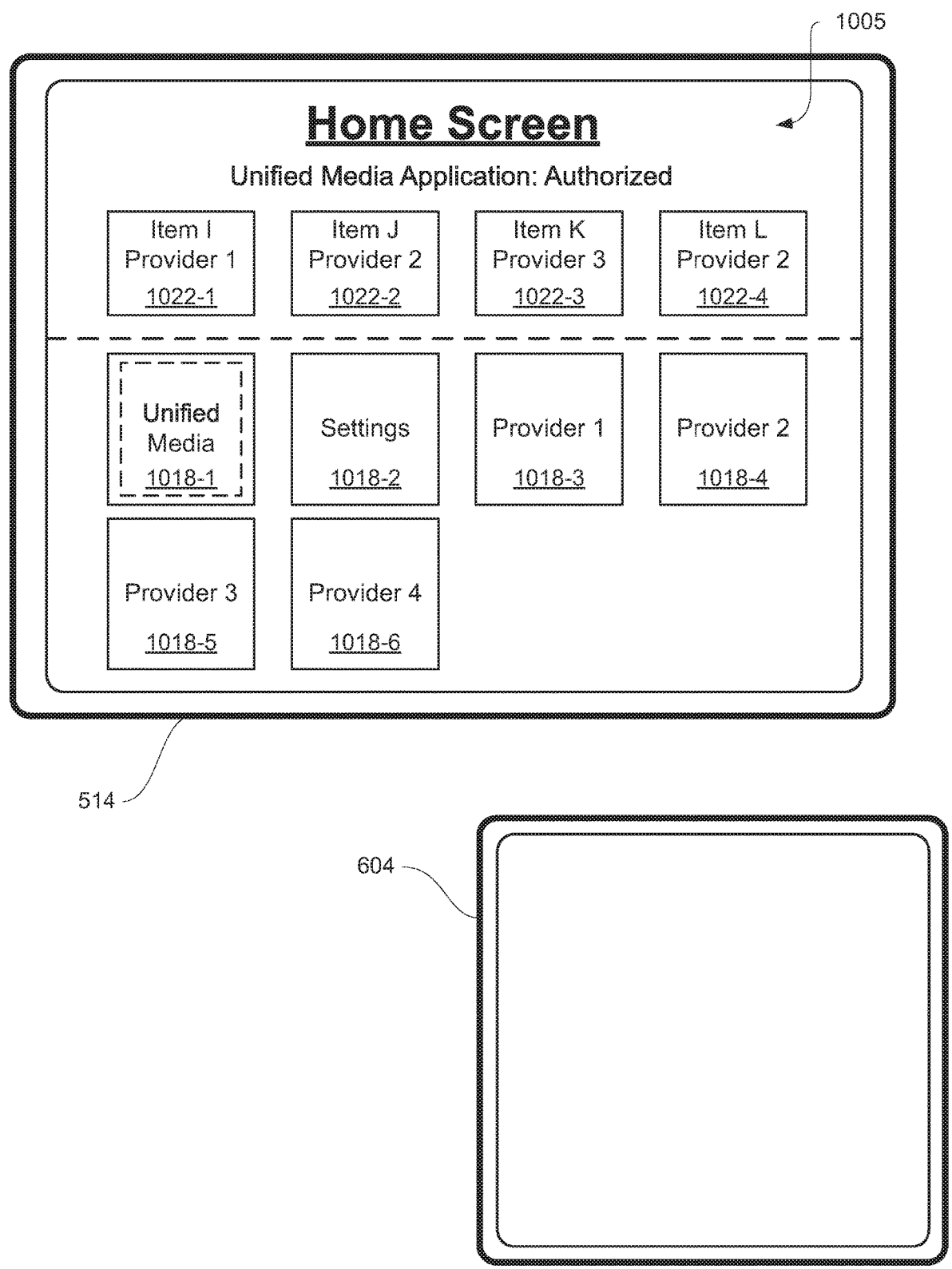
Figure 10T:
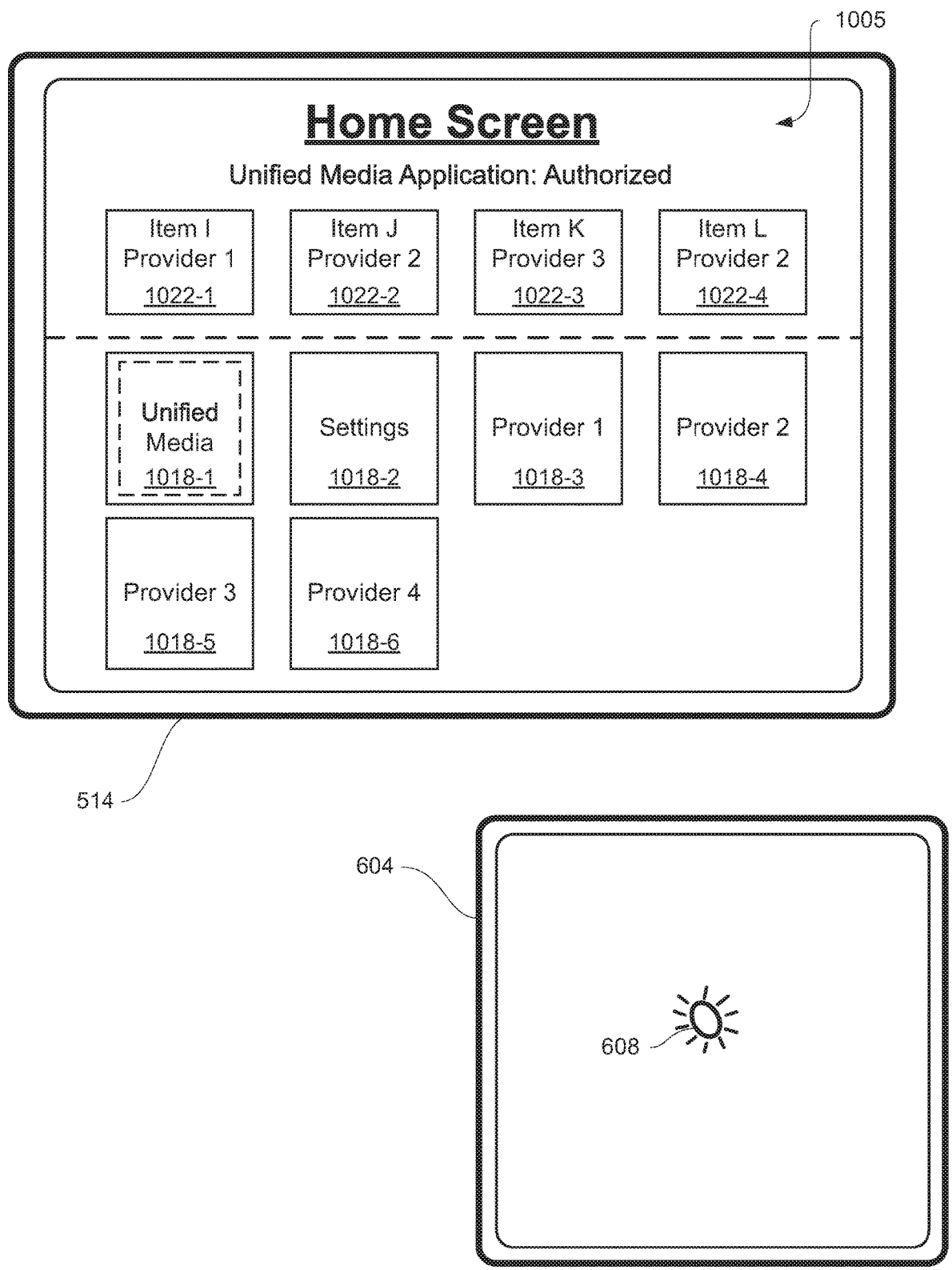
Figure 10U:
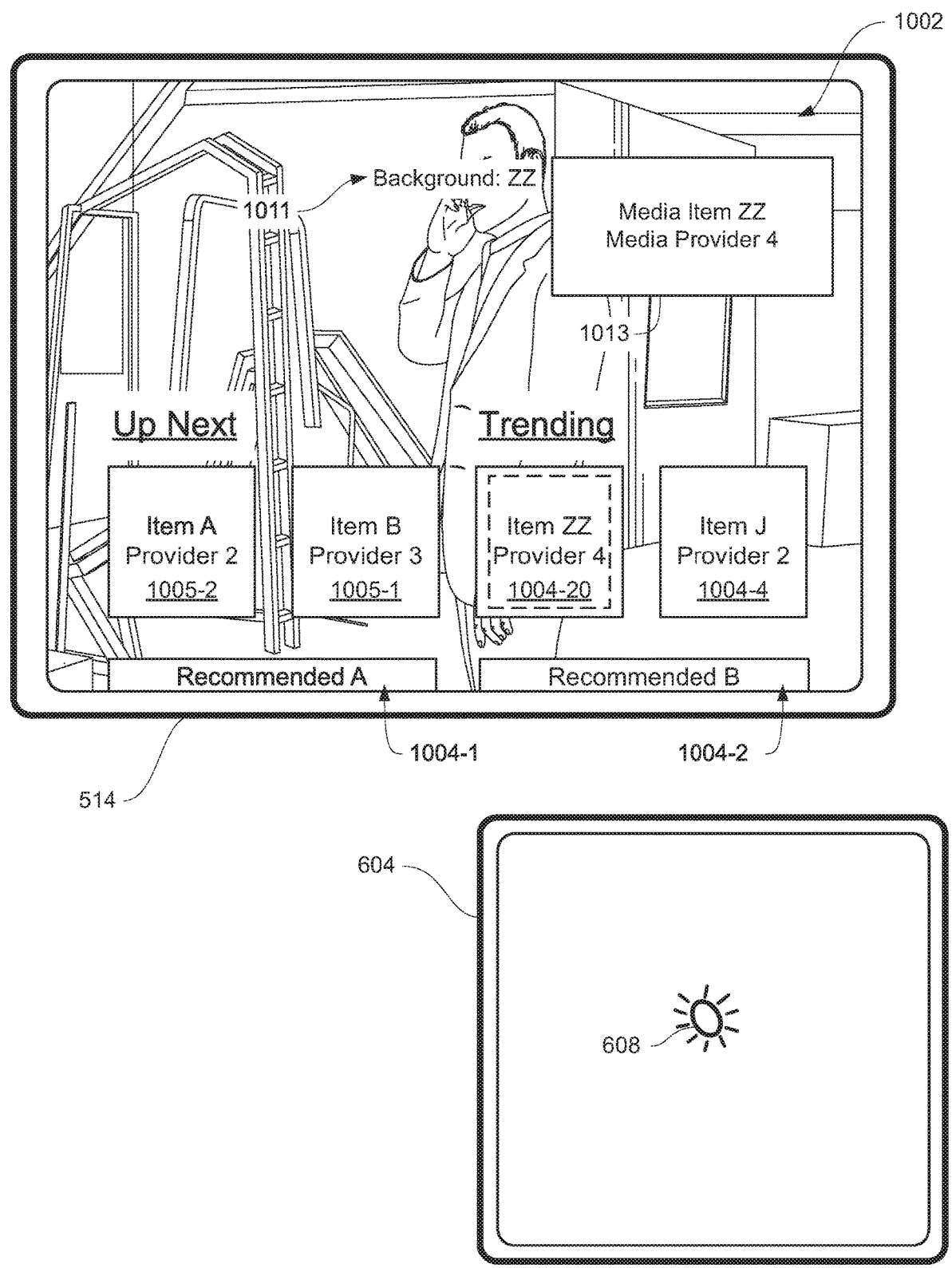
Figure 10V:
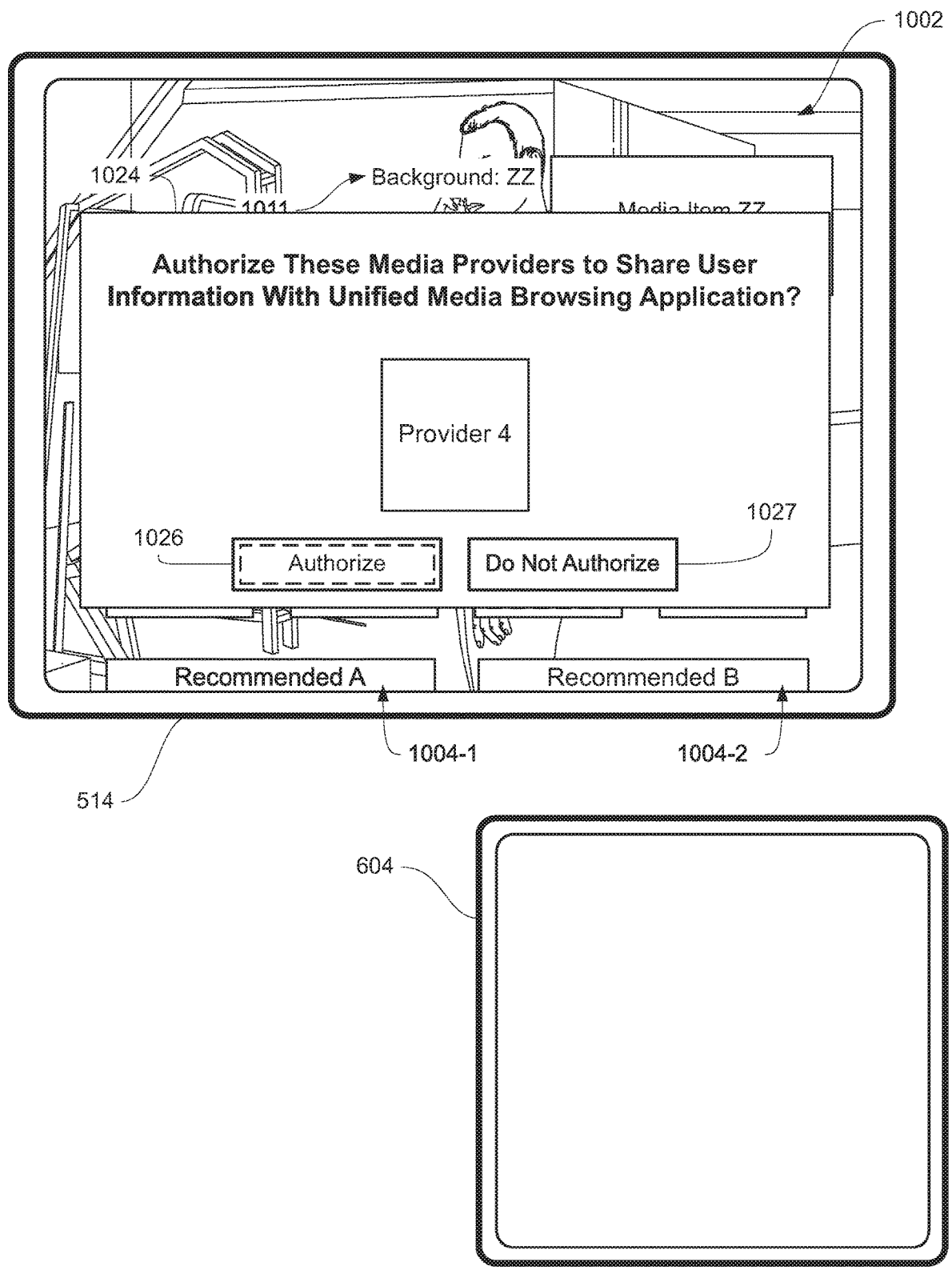
Figure 10W:
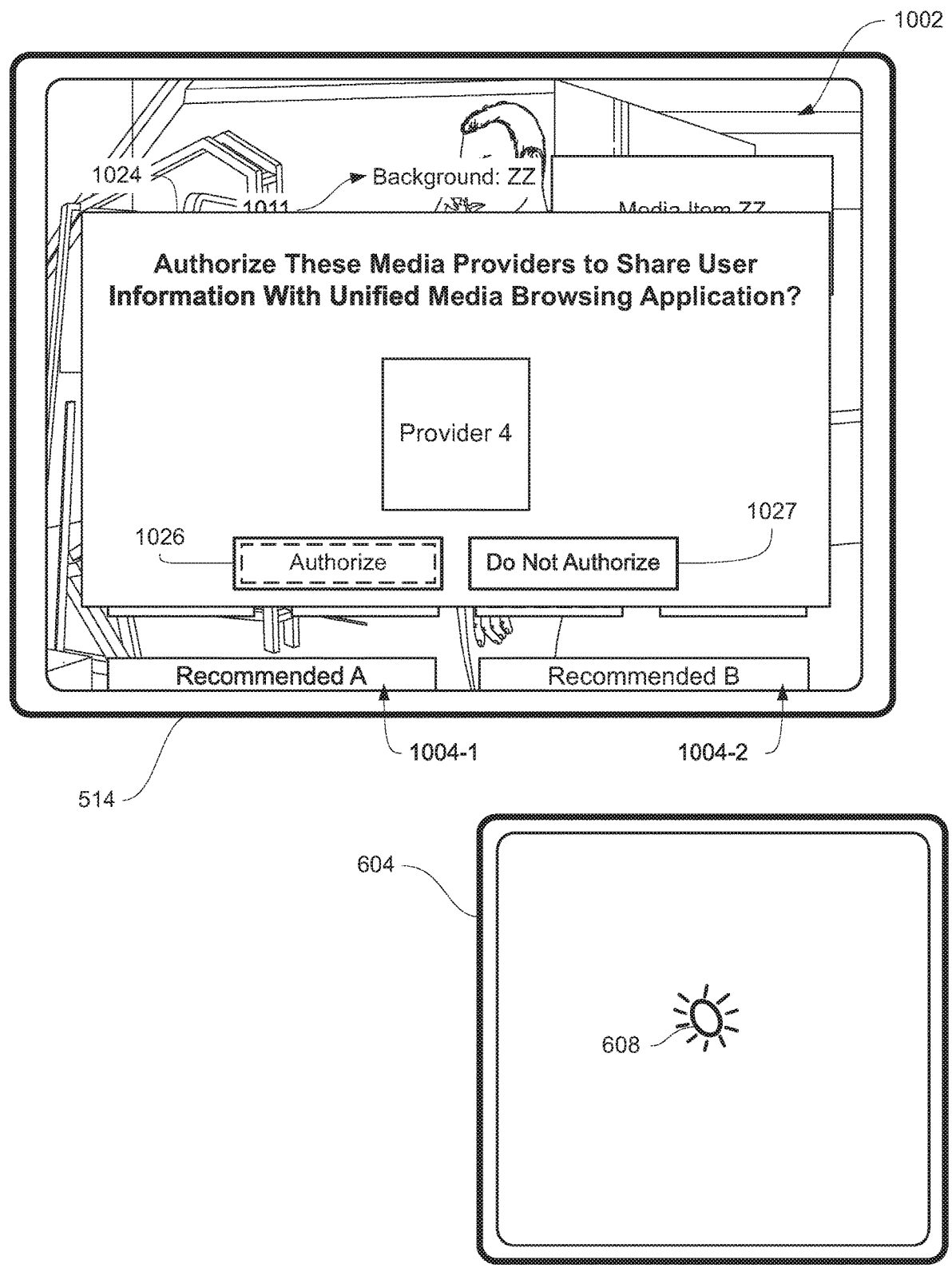
Figure 10X:
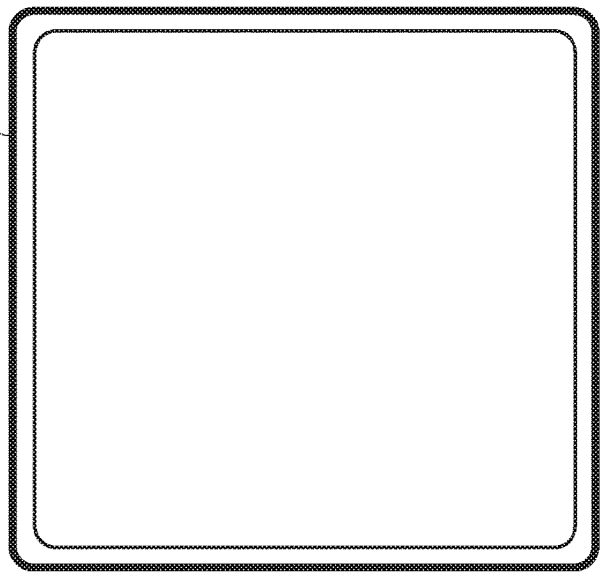
Figure 10Y:
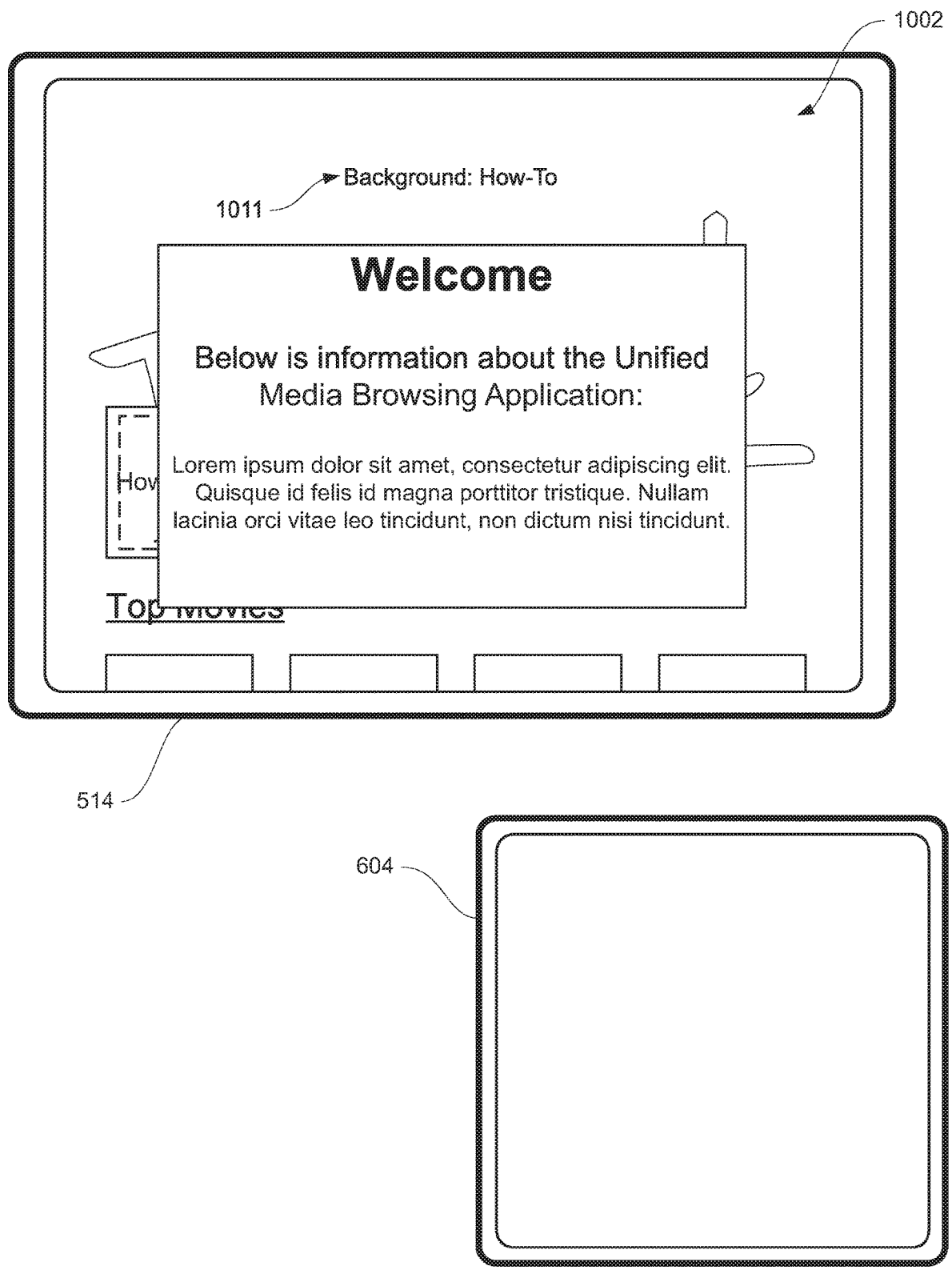
Figure 10Z:
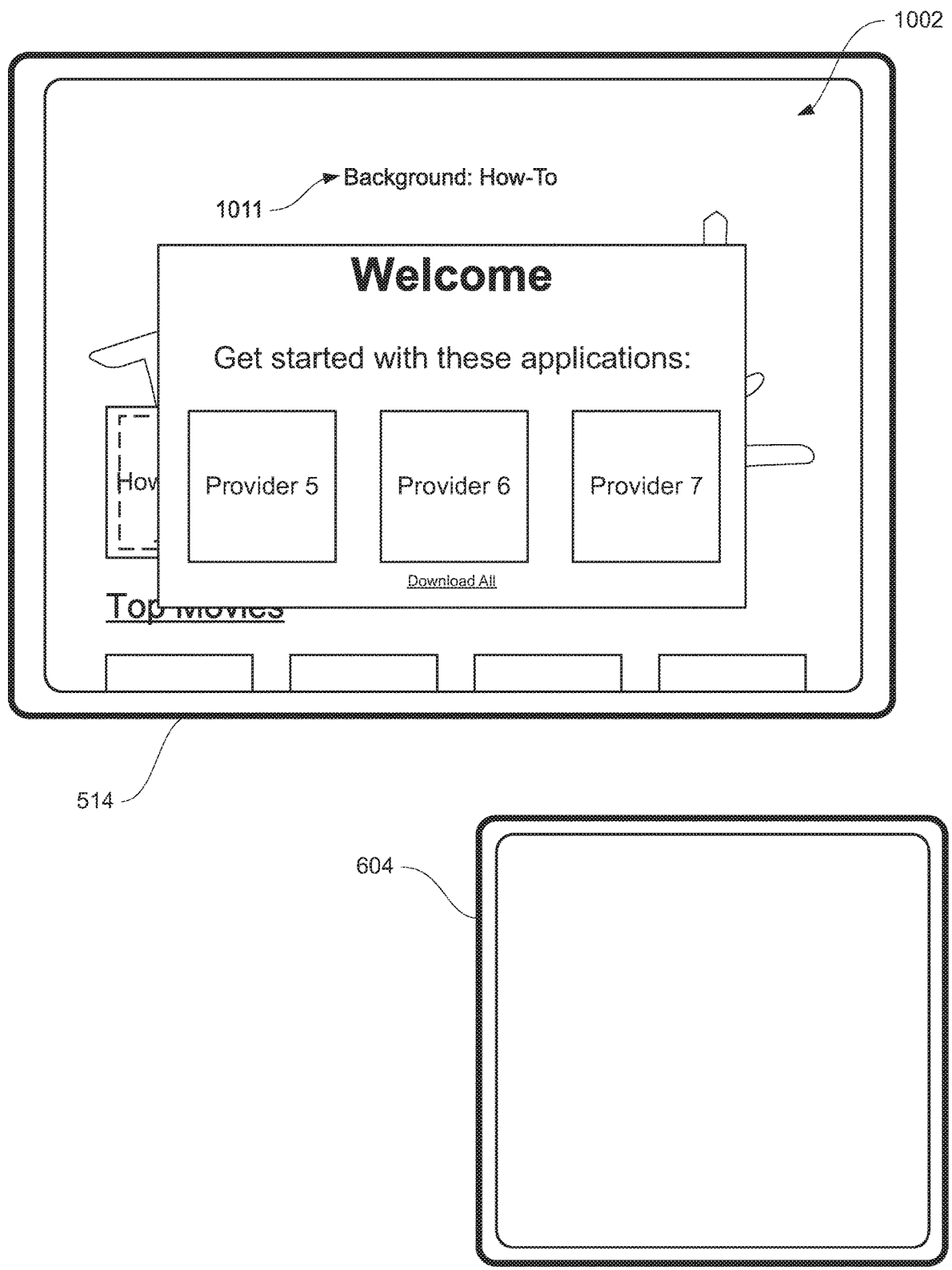
Figure 11A:
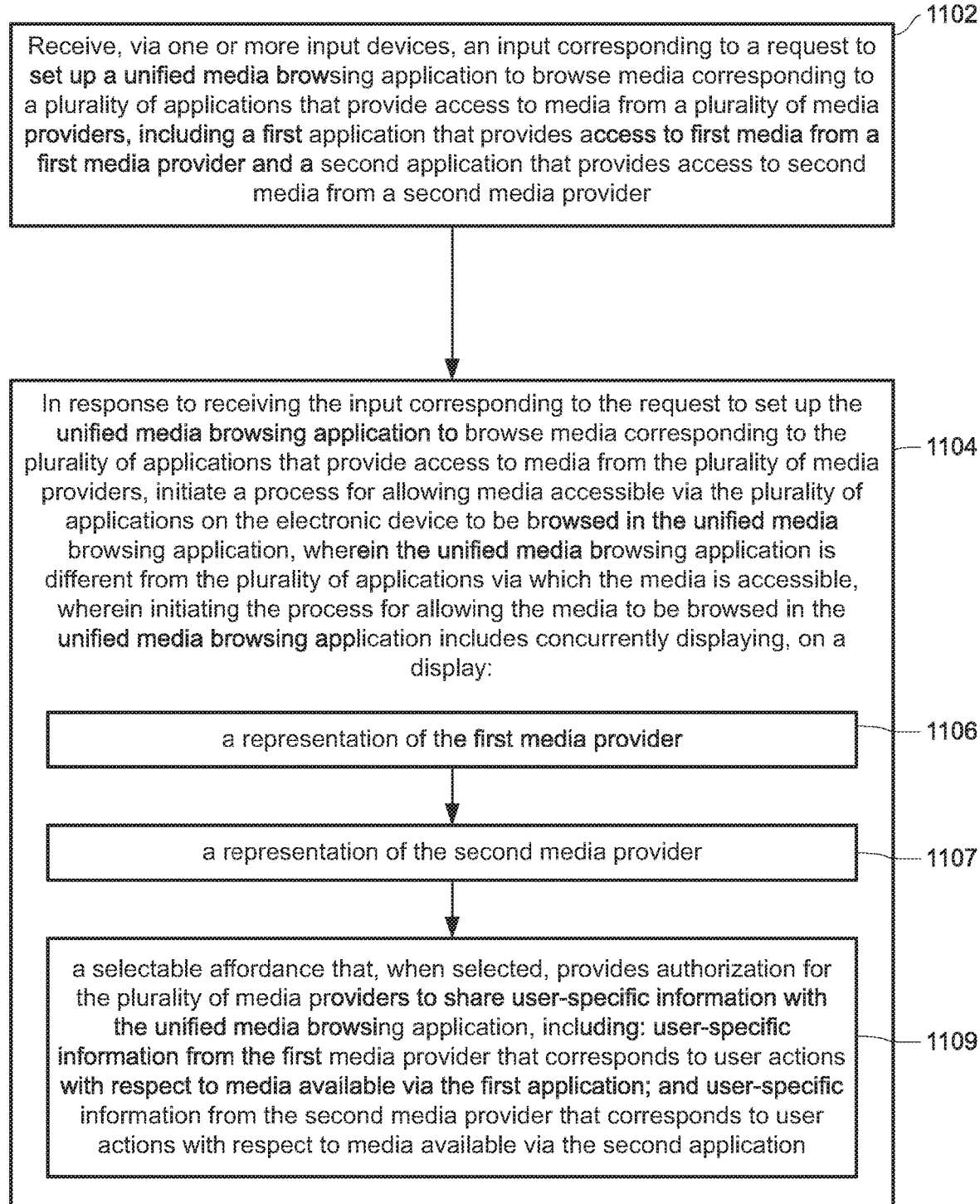
FIGS. 11A-11F are flow diagrams illustrating a method of facilitating the setup of a unified media browsing application in accordance with some embodiments of the disclosure.
Figure 11B:
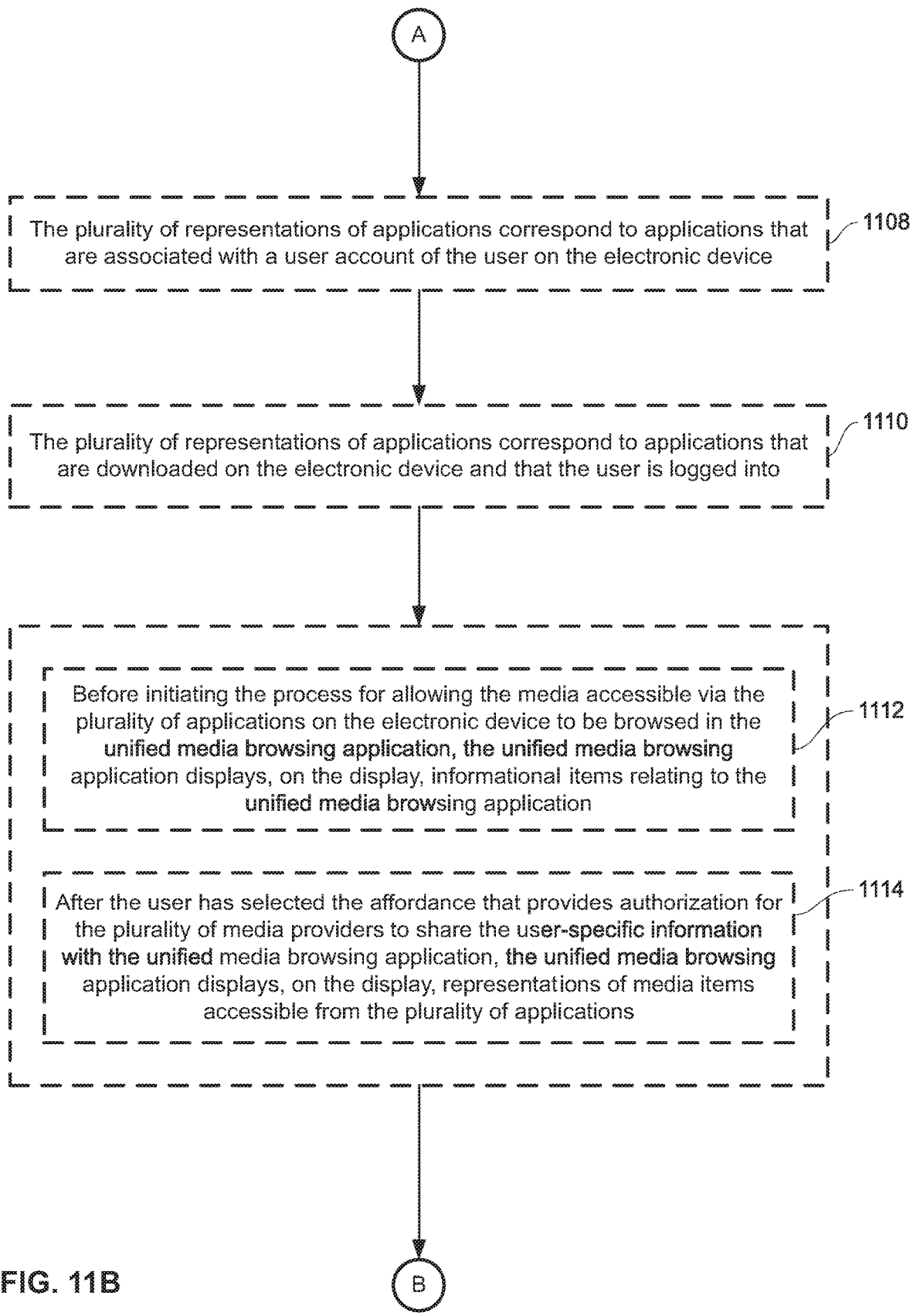
Figure 11C:
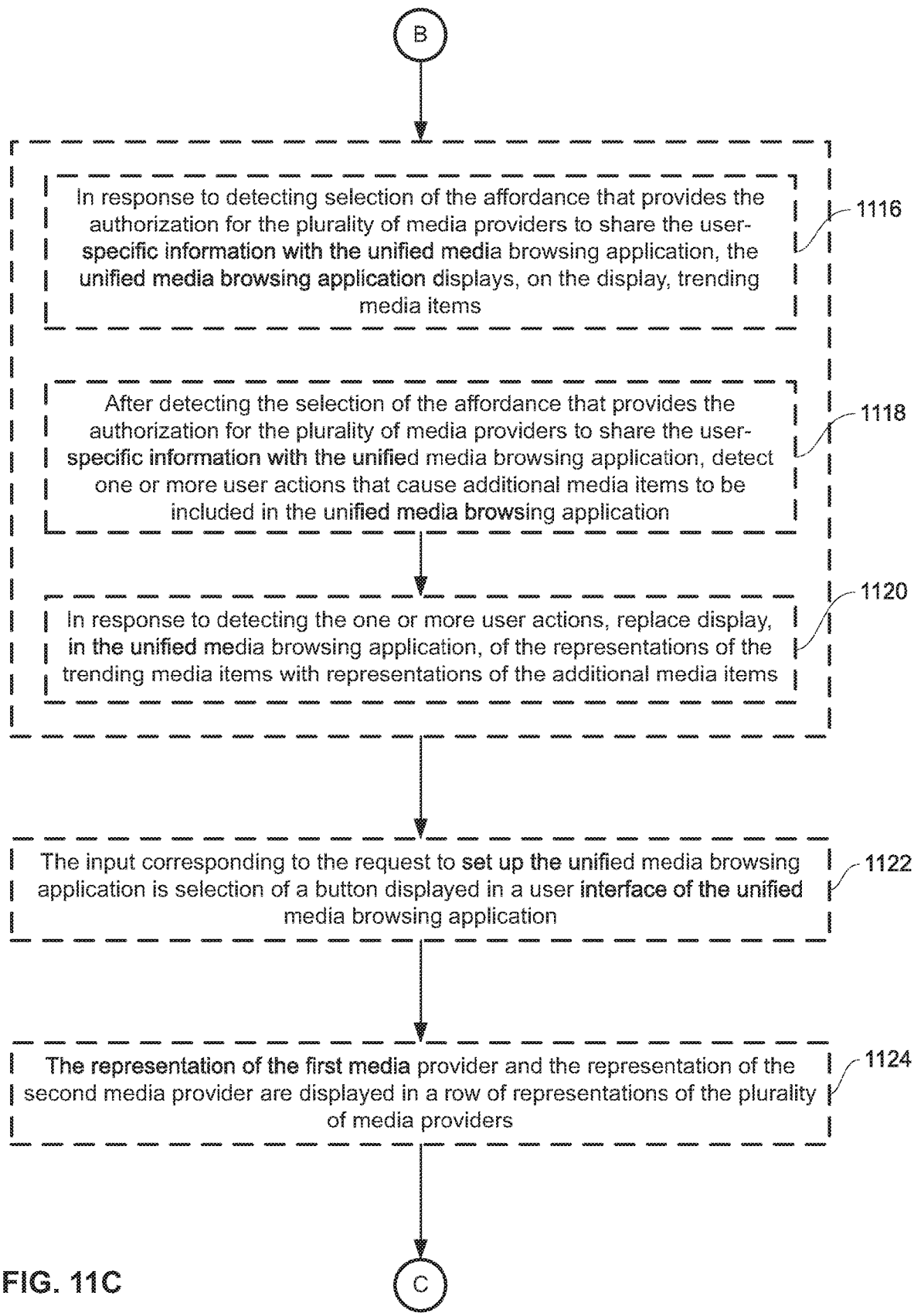
Figure 11D:
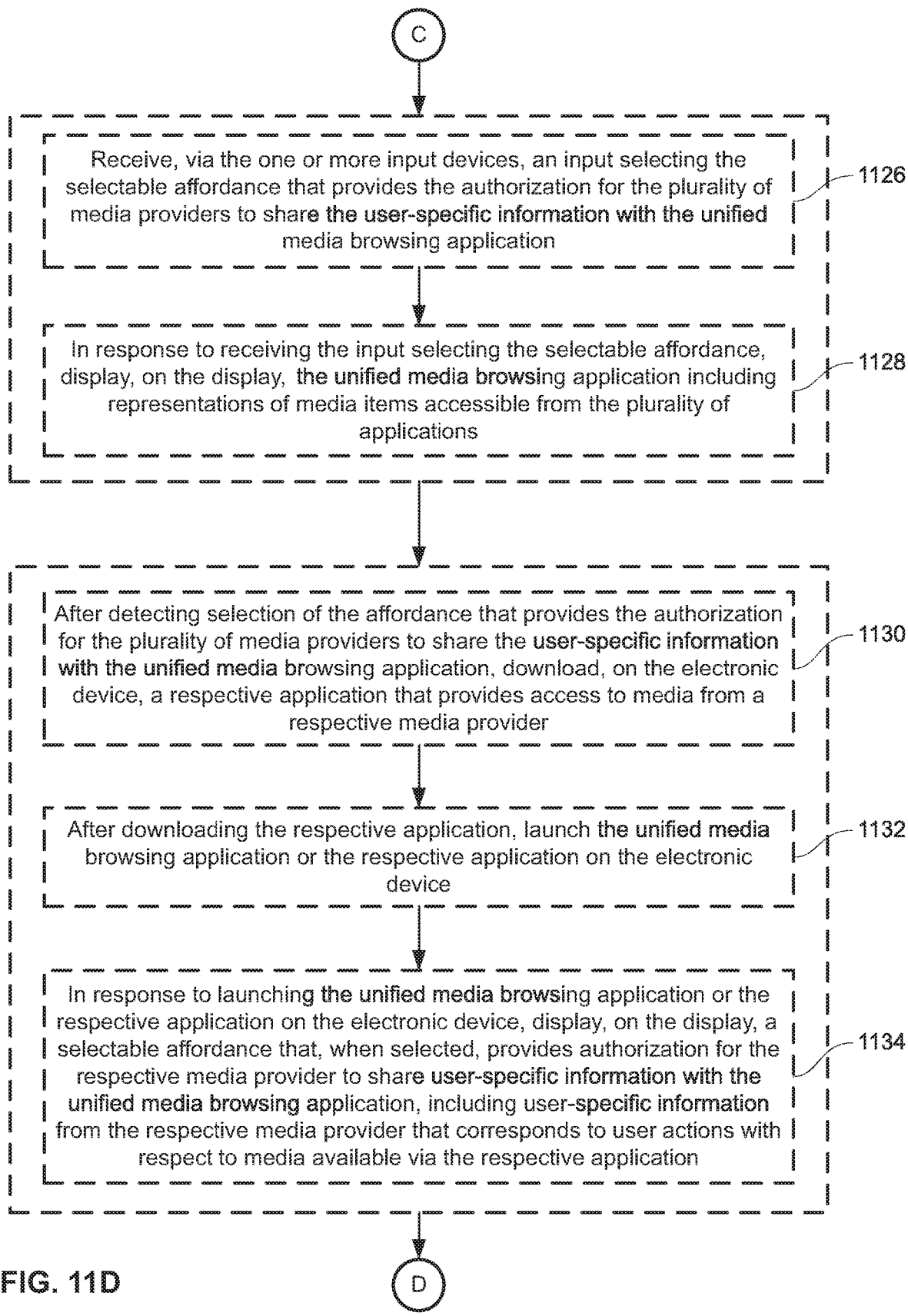
Figure 11E:
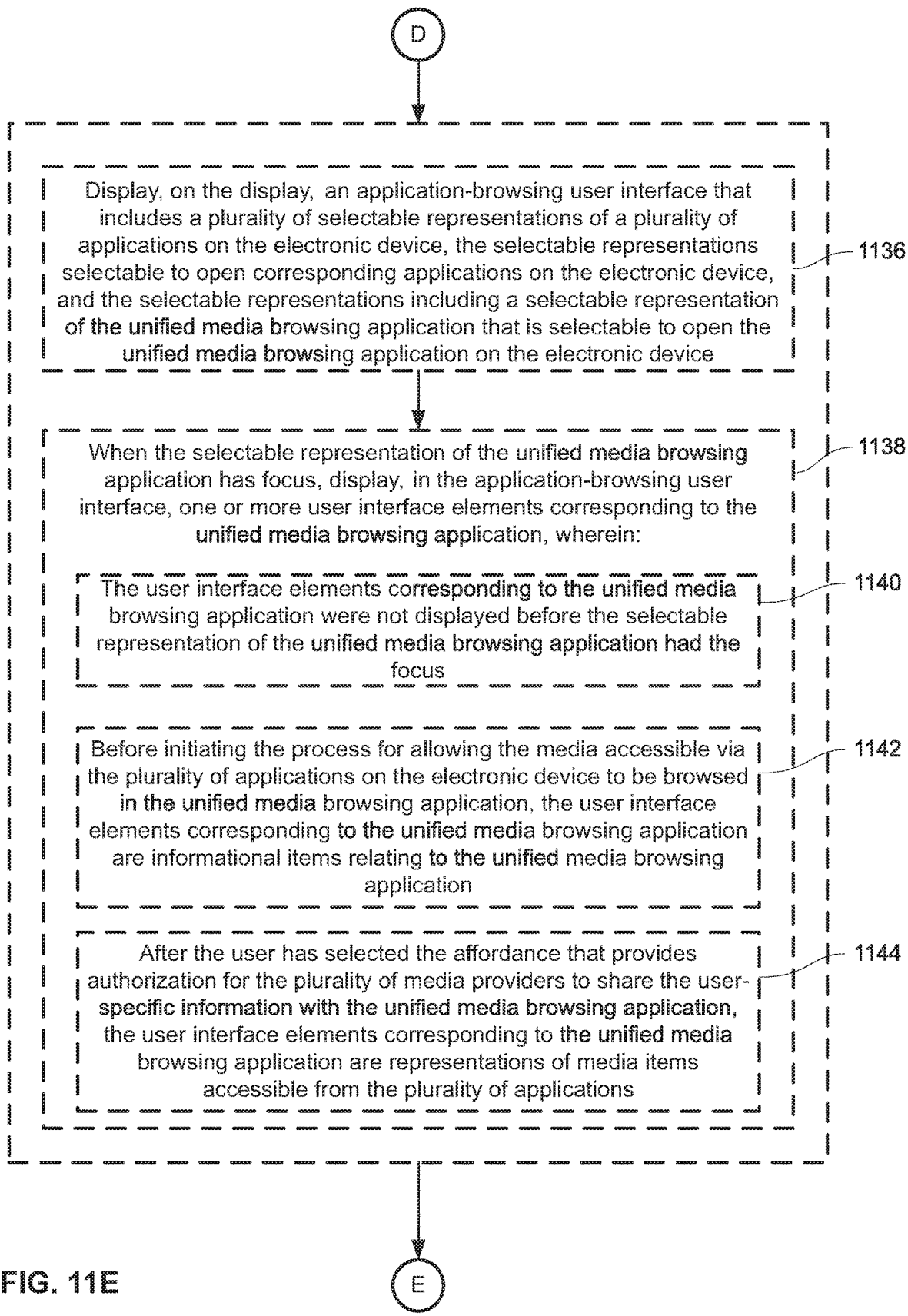
Figure 11F:
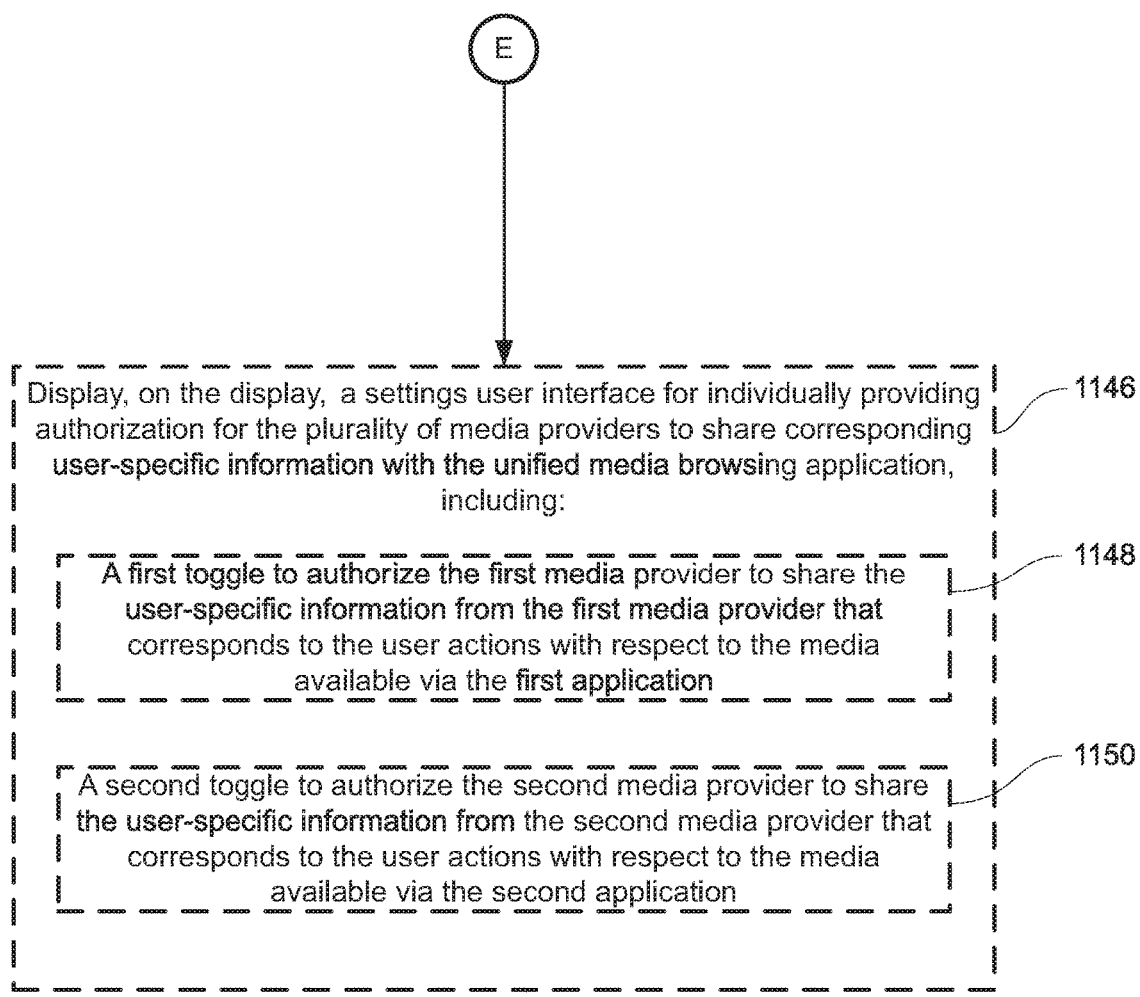

FIGS. 10A-10Z illustrate exemplary ways in which an electronic device facilitates the setup of a unified media browsing application in accordance with some embodiments of the disclosure. The embodiments in these figures are used to illustrate the processes described below, including the processes described with reference to FIGS. 11A-11F.

FIG. 10A illustrates exemplary display 514. Display 514 optionally displays one or more user interfaces that include various content. In the example illustrated in FIG. 8A, display 514 displays a home screen user interface 1005n of an electronic device (e.g., electronic device 500 of FIG. 5A) of which display 514 is a part, or to which display 514 is connected. User interface 1005 is optionally an application-browsing user interface of the operating system of the electronic device that includes icons for different applications installed on the electronic device, the icons selectable to launch their corresponding applications on the electronic device. For example, user interface 1005 includes icons 1018-1 to 1018-5 that are selectable to launch different applications on the electronic device. Icon 1018-1 is selectable to launch a unified media browsing application (e.g., a unified media browsing application as described with reference to FIGS. 6A-6LL), icon 1018-2 is selectable to launch a settings application (e.g., from which settings user interface 1003 in FIG. 10Q is optionally accessible), icon 1018-3 is selectable to launch a media application corresponding to media provider 1, icon 1018-4 is selectable to launch a media application corresponding to media provider 2, and icon 1018-5 is selectable to launch a media application corresponding to media provider 3. In FIG. 10K, icon 1018-3 has the current focus, as indicated by the dashed-line box within icon 1018-3.

User interface 1005 also includes a region above icons 1018 (e.g., a "top shelf" region) that optionally displays one or more user interface elements corresponding to the application whose icon 1018 has the current focus. For example, in FIG. 10A, icon 1018-3 corresponding to media provider 1 has the current focus. As a result, the electronic device displays representations 1023-1 to 1023-4 of media items accessible from media provider 1 in the "top shelf" region of user interface 1005. Representations 1023 optionally include information identifying each media item (e.g., textual information) and/or information about the content of each media item (e.g., video previews of the media items, still images of the media items, etc.). The "top shelf" region is, in some embodiments, a scrollable region that includes representations of suggested media items for the currently highlighted application in the home screen, and an upward swipe causes the current focus to move to a representation of one of the suggested media items that, upon selection (e.g., with a tap or click input on a remote control), will cause the device to start playing a media item that corresponds to the representation of a suggested media item that has current focus.

In FIG. 10B, a right-to-left swipe of contact 608 is detected on touch-sensitive surface 604, which causes icon 1018-1, corresponding to the unified media browsing application, to have the current focus. As a result, the electronic device displays user interface elements 1020-1 and 1020-2 corresponding to the unified media browsing application in the "top shelf" region of user interface 1005. In FIG. 10L, the unified media browsing application has not yet been authorized to act as a centralized media navigation application that displays representations of media items available from various media applications installed on the electronic device (e.g., as will be described later). Therefore, user interface elements 1020 are informational items relating to the unified media browsing application, and are not representations of media items that would be browsable in the unified media browsing application, once authorized. Specifically, user interface element 1020-1 is a video (or a link to a video) describing how to setup the unified media browsing application, and user interface element 1020-2 is a video (or a link to a video) describing how to use the unified media browsing application, for example. While the unified media browsing application has current focus, an upward swipe causes the current focus to move to a representation of one of the information items relating to the unified media browsing application that, upon selection (e.g., with a tap or click input on a remote control), will cause the device to start playing a media item that corresponds to the information item relating to the unified media browsing application that has current focus (e.g., a demo video).

In FIG. 10B, after the right-to-left swipe of contact 608 is detected on touch-sensitive surface 604, a click is detected on touch-sensitive surface 604, thus selecting representation 1018-1. As a result, the electronic device launches and displays the unified media browsing application, as shown in FIG. 10C. In FIG. 10C, the unified media browsing application has not yet been authorized to act as a centralized media navigation application that displays representations of media items available from various media applications installed on the electronic device to facilitate easy browsing and viewing of those media items by the user of the electronic device. Therefore, user interface 1002, which is displayed by the unified media browsing application, includes button 1007 for setting up and/or authorizing the unified media browsing application to operate as such. Additionally, user interface 1002 includes informational items 1006 and 1008 relating to the unified media browsing application. Specifically, user interface 1002 includes item 1006, which is a video (or a link to a video) describing how to setup the unified media browsing application, and item 1008, which is a video (or a link to a video) describing how to use the unified media browsing application. Item 1008 has the current focus in FIG. 10C, and, button 1007 and items 1006 and 1008 are overlaid over a background image/video corresponding to the "how to use" video that corresponds to item 1008, as indicated by 1011 in FIG. 10C. Before the unified browsing media application has been setup/authorized, in some embodiments, user interface 1002 does not include representations of media available from various media applications installed on the electronic device. However, in some embodiments, user interface 1002 does include partial representations of trending media items (e.g., top movies), as shown in FIG. 10C.

In FIG. 10D, a left-to-right swipe of contact 608 on touch-sensitive surface 604 is detected to move the current focus to button 1007, and a click of touch-sensitive surface 604 is detected while button 1007 has the current focus. In response, the electronic device initiates a process for allowing the media available from various media applications installed on the electronic device to be browsed in the unified media browsing application. For example, as shown in FIG. 10E, in response to the selection of button 1007 in FIG. 10D, the electronic device displays dialog box 1012, which includes a row of representations 1010-1 to 1010-3 of media providers 1, 2 and 3. Representations 1010 correspond to media providers from which media will be browsable in the unified media browsing application upon setup/ authorization of the unified media browsing application. Representations 1010 are optionally textual and/or graphical representations of the media providers (e.g., logos of the media providers, icons of the media applications corresponding to the media providers, etc.). If the list of media providers is long (e.g., longer than a threshold, such as five, ten or fifteen), the row of representations 1010 is animated to scroll horizontally to automatically display all of the representations 1010 over time. Additionally or alternatively, dialog box 1012 includes "see all" button 1015, which is selectable to expand dialog box 1012 to display all of the media providers to be added to the unified media browsing application in a grid of representations 1010. In some embodiments, the plurality of representations 1010 of applications correspond to applications that are associated with a user account of the user on the electronic device, such as applications that are downloaded on the electronic device that is logged into the user account, or applications that are downloaded on other electronic devices that are also associated with the user account (e.g., logged into the user account)). In some embodiments, the plurality of representations 1010 of applications correspond to applications that are downloaded on the electronic device and that the user is logged into (e.g., the user has provided access credentials to the applications such that the applications provides access to their corresponding media). Dialog box 1012 also includes button 1014, which is selectable to authorize the media providers corresponding to representations 1010 to share user-specific information with the unified media browsing application (e.g., information pertaining to the user's actions with respect to media on those media providers, such as media purchasing activity, media renting activity, media favoriting/bookmarking activity, media watching activity, etc.).

In FIG. 10F, a click of touch-sensitive surface 604 has been detected while button 1014 has the current focus. As described above, selection of button 1014 provides authorization for media providers 1, 2 and 3 (corresponding to representations 1010) to share user-specific information with the unified media browsing application. After receiving the above authorization, the unified media browsing application ceases displaying button 1007 and informational items 1006 and 1008 shown in FIGS. 10C-10D, and begins displaying representations of media items accessible from media providers 1, 2 and 3. For example, as shown in FIG. 10G, user interface 1002 now includes representations 1004-1 to 1004-6 of various media items accessible from media providers 1, 2 and 3. Initially, after the unified media browsing application has been authorized as described above, representations 1004 optionally correspond to trending media items (e.g., media items not selected for inclusion in user interface 1002 based on the viewing activity of the user of the electronic device, such as top television shows). For example, the trending media items are optionally media items that are popular with other viewers, or media items that are otherwise selected by a third party (e.g., selected by a media provider for inclusion in user interface 1002 to promote the media item). As the user of the electronic device takes actions with respect to media items accessible on the electronic device (e.g., watches media items, rents media items, purchases media items, etc.), the trending media items in user interface 1002 will be replaced by media items selected for inclusion in user interface 1002 based on the viewing activity of the user, as will be described in more detail below.

Alternatively to selection of button 1007 to setup and authorize the unified media browsing application, selection of a representation of a media item in the unified media browsing application optionally also triggers setup/authorization of the unified media browsing application. For example, in FIGS. 10H-10I, a downward swipe of contact 608 is detected on touch-sensitive surface 604, and as a result, the electronic device scrolls through user interface 1002 and causes representation 1004-11, corresponding to a top television show, to have the current focus. In FIG. 10J, selection of representation 1004-11 is detected. In response, the electronic device displays dialog box 1012, as shown in FIG. 10K, and after authorization, displays the unified media browsing application, as shown in FIG. 10L. As mentioned above, the trending media items in user interface 1002 in FIG. 10L, will be replaced by media items selected for inclusion in user interface 1002 based on the viewing activity of the user, as will now be described.

For example, in FIG. 10M, the electronic device is playing media item B via media provider 3 in a media application corresponding to media provider 3 (e.g., in response to user input for viewing media item B). After media item B has been partially viewed on the electronic device, representation 1005-1 corresponding to media item B from media provider 3 is included in user interface 1002, as shown in FIG. 10N. In particular, representation 1004-6 of trending media item L (in FIG. 10L) has been removed from user interface 1002 (e.g., pushed off the edge of user interface 1002), and representation 1005-1 of media item B that the user partially watched has been added to user interface 1002. As the viewing activity of the user causes additional representations of media items to be added to user interface 1002, additional representations of trending media items will similarly be replaced in user interface 1002. For example, in FIG. 10O, the electronic device is playing media item A via media provider 2 in a media application corresponding to media provider 2 (e.g., in response to user input for viewing media item A). After media item A has been partially viewed on the electronic device, representation 1005-2 corresponding to media item A from media provider 2 is included in user interface 1002, as shown in FIG. 10P, replacing another representation of a trending media item in user interface 1002 (e.g., representation 1004-5 of trending media item K). In some embodiments, even after the trending content has been pushed off screen by "up next" content that was selected based on user activity with respect to the content, the user can scroll through the up next content (e.g., with swipes to the right on the touch-sensitive surface) to redisplay the trending content on the display and scroll the "up next" content off of the display. In some embodiments, the trending content changes based on aggregate activity of multiple users (e.g., the trending content indicates content that has been watch by large number of users in a predetermined period of time such as the last hour, day, week or month).

In some embodiments, the electronic device provides a settings user interface for individually managing each media provider's authorization to share user-specific information with the unified media browsing application. For example, in FIG. 10Q, user interface 1003 is such a settings user interface. User interface 1003 is optionally a user interface of the unified media browsing application itself, or is a user interface of the operating system of the electronic device, outside of the unified media browsing application. User interface 1003 gives the user the ability to individually authorize or deauthorize the sharing of user-specific information with the unified media browsing application by media providers 1, 2 and 3. For example, in FIG. 10Q, user interface 1003 includes toggle 1016-1 to authorize or deauthorize the sharing of user-specific information by media provider 1 with the unified media browsing application (not authorized in FIG. 10Q), toggle 1016-2 to authorize or deauthorize the sharing of user-specific information by media provider 2 with the unified media browsing application (authorized in FIG. 10Q), and toggle 1016-3 to authorize or deauthorize the sharing of user-specific information by media provider 3 with the unified media browsing application (not authorized in FIG. 10Q). User interface 1003 also optionally includes a toggle 1016-4 for enabling or disabling a private media browsing mode on the electronic device (disabled in FIG. 10Q), such as described with reference to FIGS. 6FF-6LL, and a button 1017, selection of which optionally deletes all user data relating to media viewing activity on the electronic device.

FIG. 10R illustrates the home screen user interface 1005 of the electronic device. The home screen user interface 1005 is optionally reached from the unified media browsing application in response to an input detected on a remote control corresponding to a request to navigate back to the home screen user interface 1005 (e.g., selection of "home" button 518 or "menu button" 516 on remote 510, as described with reference to FIG. 5B, when in the unified media browsing application). In FIG. 10R, the unified media browsing application has been authorized to act as a centralized media navigation application that displays representations of media items available from various media applications installed on the electronic device (e.g., as described with reference to FIGS. 10C-10L), and icon 1018-1, corresponding to the unified media browsing application, continues to have the current focus. Because the unified media browsing application has now become authorized, the electronic device replaces display of user interface elements 1020 (described in FIG. 10B) with display of representations 1022-1 to 1022-4 of media items accessible, from within the unified media browsing application, from media providers 1, 2 and 3 in the "top shelf" region of user interface 1005.

In FIG. 10S, a media application corresponding to media provider 4 has been installed on the electronic device after the unified media browsing application became authorized to act as a centralized media navigation application, as indicated by the addition of icon 1018-6 in user interface 1005. As such, media provider 4 has not yet been authorized to share user-specific information with the unified media browsing application. The electronic device optionally requests such authorization the next time the unified media browsing application, or the media application corresponding to media provider 4, are launched. In some embodiments, the electronic device requests such authorization when a media item provided by media provider 4 is selected for playback in the unified media browsing application. For example, in FIG. 10O, a click of touch-sensitive surface 604 is detected while icon 1018-1, corresponding to the unified media browsing application, has the current focus. In response, the electronic device launches the unified media browsing application, as shown in FIG. 10U. In FIG. 10U, a click of touch-sensitive surface 604 is detected while representation 1004-20, corresponding to media item ZZ from media provider 4, has the current focus. In response, the electronic device prompts the user to authorize the sharing of user-specific information by media provider 4 with the unified media browsing application, as shown in FIG. 10V. Specifically, the electronic device displays prompt 1024, which includes a representation of media provider 4, button 1026 to authorize media provider 4 to share user-specific information with the unified media browsing application, and button 1027 to prevent media provider 4 from sharing user-specific information with the unified media browsing application. In FIG. 10W, a click of touch-sensitive surface 604 is detected while button 1026 has the current focus, and as a result, media provider 4 becomes authorized to share user-specific information with the unified media browsing application. In response to the selection of button 1026 in FIG. 10W, and without further user input, the electronic device begins playing media item ZZ from media provider 4, as shown in FIG. 10X.

In some embodiments, the electronic device responds differently to the launching of the unified media browsing application (e.g., such as described with reference to FIGS. 10A-10C), in circumstances in which the unified media browsing application has not yet been authorized to act as a centralized media navigation application as previously described, depending on whether media applications are currently installed on the electronic device when the unified media browsing application is launched and/or the number of times the unified media browsing application has been launched. For example, the first time the unified media browsing application is launched when there are no media applications installed on the electronic device, the unified media browsing application optionally displays a dialog box that includes information about the unified media browsing application, such as shown in FIG. 10Y, without displaying any particular media applications that the user may install on the electronic device.

However, the second (and, optionally, subsequent) time the unified media browsing application is launched when there are no media applications installed on the electronic device, the unified media browsing application optionally displays a dialog box that includes representations of particular media applications (e.g., featured media applications, or media applications that are part of a specific media application bundle or pack, such as a sports pack or a movie pack) that the user may install on the electronic device to get started with using the unified media browsing application with those applications, such as shown in FIG. 10Z (e.g., representations of media applications corresponding to media provider 5, media provider 6 and media provider 7). The user is optionally able to individually install the media applications (e.g., by individually selecting the representations of the media applications) to initiate authorization of the unified media browsing application with the selected media application/provider (e.g., similar to as described with reference to FIGS. 10E-10G), or install all of the media applications presented in the dialog box (e.g., by selecting the "download all" link in the dialog box) to initiate authorization of the unified media browsing application with all of the displayed media applications/providers (e.g., similar to as described with reference to FIGS. 10E-10G). In this way, the electronic device only prompts the user to download/install media applications after the user has already launched the unified media browsing application at least once before, thus avoiding unnecessarily inconveniencing the user with presentation of such information.

It should be noted that in some embodiments, when there are no media applications installed on the electronic device, the electronic device displays the dialog box of FIG. 10Z when the unified media browsing application is launched for the first time, rather than waiting until the unified media browsing application is launched for a second time (e.g., the electronic device does not display the dialog box of FIG. 10Y).

In some embodiments, when the unified media browsing application is launched for the first time in circumstances in which the unified media browsing application has not yet been authorized to act as a centralized media navigation application as previously described, but one or more media applications are installed on the electronic device, the electronic device optionally displays the user interface of FIG. 10C, and the user is able to initiate authorization of the unified media browsing application as described with reference to FIGS. 10D-10G (e.g., authorization of the unified media browsing application with one or more media applications already installed on the electronic device). Subsequently, the user is able to browse various media items in the unified media browsing application, such as described with reference to FIGS. 10A-10X. In response to subsequent launches of the unified media browsing application when media applications are installed on the electronic device, the electronic device optionally displays the dialog box of 10Z to promote or offer additional media applications that the user may download to the electronic device and authorize with the unified media browsing application (e.g., media applications that are not already installed on the electronic device).

FIGS. 11A-11F are flow diagrams illustrating a method 1100 of facilitating the setup of a unified media browsing application in accordance with some embodiments of the disclosure. The method 1100 is optionally performed at an electronic device such as device 100, device 300, or device 500 as described above with reference to FIGS. 1A-1B, 2-3 and 5A-5B. Some operations in method 1100 are, optionally, combined and/or the order of some operations is, optionally, changed.

As described below, the method 1100 provides ways of facilitating the setup of a unified media browsing application. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., a set-top box, such as device 100, device 300 or device 500) in communication with a display (e.g., a television, such as display 514) and one or more input devices (e.g., a remote control, such as remote 510, or a smartphone, such as device 511), receives (1102), via the one or more input devices, an input corresponding to a request to set up a unified media browsing application to browse media corresponding to (e.g., selection of a button displayed in a user interface on the display that includes a plurality of representations of) a plurality of applications that provide access to media from a plurality of media providers, such as in FIG. 10D (e.g., an onboarding or initialization button is displayed in a unified media browsing application running on the electronic device and is selected by the user to setup the unified media browsing application). In some embodiments, the plurality of applications includes a first application that provides access to first media from a first media provider and a second application that provides access to second media from a second media provider, such as in FIG. 10E. The unified media browsing application optionally acts as a centralized application from which media available via a plurality of different applications is browsed, such as described in methods 700 and 900. The unified media browsing application optionally displays the button before the unified media browsing application has been authorized, by the user, to display the media available via the plurality of different applications, such as in FIG. 10C. After the unified media browsing application has been authorized to display the media available via the plurality of different applications, the unified media browsing application optionally ceases display of the button, such as in FIG. 10G.

In response to receiving the input corresponding to the request to set up the unified media browsing application to browse media corresponding to the plurality of applications that provide access to media from the plurality of media providers, the electronic device initiates (1104) a process for allowing media accessible via the plurality of applications on the electronic device to be browsed in the unified media browsing application, such as in FIGS. 10E-10F (e.g., initiating a process during which a user of the electronic device authorizes the unified media browsing application to display the media available via the plurality of different applications). In some embodiments, the unified media browsing application is different from the plurality of applications via which the media is accessible. In some embodiments, initiating the process for allowing the media to be browsed in the unified media browsing application includes the electronic device concurrently displaying, on the display, a representation of the first media provider (1106), a representation of the second media provider (1107) (e.g., a listing of the different applications on the electronic device via which media is accessible, and from which the unified media browsing application will display media that will be browsable by the user in the unified media browsing application), and a selectable affordance (1109), such as in FIG. 10E. In some embodiments, the listing of the different applications includes images corresponding to those applications (e.g., application icons for those applications) and/or text corresponding to those applications (e.g., the names of those applications). In some embodiments, the selectable affordance, when selected, provides authorization for the plurality of media providers to share user-specific information with the unified media browsing application, such as in FIG. 10F, including user-specific information from the first media provider that corresponds to user actions (e.g., purchasing, renting, favoriting/bookmarking, watching, etc.) with respect to media available via the first application, and user-specific information from the second media provider that corresponds to user actions (e.g., purchasing, renting, favoriting/bookmarking, watching, etc.) with respect to media available via the second application. In this way, the electronic device provides a simple process for authorizing the unified media browsing application, and provides information about the media providers that are part of the authorization in an easily-accessible manner, thus improving the efficiency of user-electronic device interactions.

In some embodiments, the plurality of representations of applications correspond to applications that are associated with a user account of the user on the electronic device, such as applications that are downloaded on the electronic device that is logged into the user account, or applications that are downloaded on other electronic devices that are also associated with the user account (1108) (e.g., logged into the user account)). In some embodiments, the plurality of representations of applications correspond to applications that are downloaded on the electronic device and that the user is logged into (1110) (e.g., the user has provided access credentials to the applications such that the applications provides access to their corresponding media).

Before initiating the process for allowing the media accessible via the plurality of applications on the electronic device to be browsed in the unified media browsing application, the unified media browsing application optionally displays (1112), on the display, informational items relating to the unified media browsing application, such as in FIG. 10C (e.g., a demo video of how the unified media browsing application operations, a how-to video describing how to setup the unified media browsing application, etc.). In some embodiments, before the process for allowing the unified media browsing application to provide browsable media is initiated, the unified media browsing application does not display the media accessible via the plurality of applications, such as in FIG. 10C. After the user has selected the affordance that provides authorization for the plurality of media providers to share the user-specific information with the unified media browsing application, the unified media browsing application optionally displays (1114), on the display, representations of media items accessible from the plurality of applications, such as in FIG. 10G (e.g., after the unified media browsing application has been authorized to display browsable media, the informational items relating to the unified media browsing application are optionally replaced with the browsable media from the plurality of applications).

In response to detecting selection of the affordance that provides the authorization for the plurality of media providers to share the user-specific information with the unified media browsing application, the unified media browsing application optionally displays (1116), on the display, trending media items, such as in FIG. 10G (e.g., media items selected for inclusion in the unified media browsing application, not based on the viewing activity of the user of the electronic device). For example, media that is popular with other viewers, or media that is otherwise selected by a third party, is optionally included in the trending media items. After detecting the selection of the affordance that provides the authorization for the plurality of media providers to share the user-specific information with the unified media browsing application, the electronic device optionally detects (1118) one or more user actions that cause additional media items to be included in the unified media browsing application, such as in FIG. 10M (e.g., favoriting, watching, renting, purchasing, etc., of the additional media items). In response to detecting the one or more user actions, the electronic device optionally replaces (1120) display, in the unified media browsing application, of the representations of the trending media items with representations of the additional media items, such as in FIG. 10N. For example, as the user's actions cause more media items to be added to the unified media browsing application, the trending media items are replaced with the user's media items (e.g., the trending media items get pushed off the edge of the screen as they get replaced with the user's media items). In this way, the electronic device transitions to displaying media items that are likely of particular interest to the user (e.g., because they are selected based on user actions), giving the user easy access to such media items, and thus improving the efficiency of user-electronic device interactions.

In some embodiments, the input corresponding to the request to set up the unified media browsing application is selection of a button displayed in a user interface of the unified media browsing application (1122), such as in FIG. 10D (e.g., the button is optionally displayed in the user interface where the representations of the media accessible via the plurality of the applications will be displayed once allowed by the user). In some embodiments, the representation of the first media provider and the representation of the second media provider are displayed in a row of representations of the plurality of media providers (1124), such as in FIG. 10E. If there are greater than a threshold number (e.g., 5, 8 or 10) of media providers to be added to the unified media browsing application, in some embodiments, the row of representations of media providers is animated to scroll through the representations of media providers.

In some embodiments, the electronic device receives (1126), via the one or more input devices, an input selecting the selectable affordance that provides the authorization for the plurality of media providers to share the user-specific information with the unified media browsing application, such as in FIG. 10F (e.g., a click of a button on the input devices when the selectable affordance has the focus). In response to receiving the input selecting the selectable affordance, the electronic device optionally displays (1128), on the display, the unified media browsing application including representations of media items accessible from the plurality of applications, such as in FIG. 10G (e.g., after the user has authorized the media providers to share the user-specific information with the unified media browsing application, the unified media browsing application displays representations of the media from those applications). The unified media browsing application, and the user interface it displays including the representations of the media items, are optionally the unified media browsing applications and corresponding user interfaces described in methods 700 and 900. The electronic device, thus, provides a simple process for allowing the unified media browsing application to display representations of media items from multiple media providers, therefore improving the efficiency of user-electronic device interactions.

After detecting selection of the affordance that provides the authorization for the plurality of media providers to share the user-specific information with the unified media browsing application, the electronic device optionally downloads (1130), on the electronic device, a respective application that provides access to media from a respective media provider, such as in FIG. 10S (e.g., the user downloads a media application to the electronic device after authorizing the media providers to share the user-specific information with the unified media browsing application). In some embodiments, after downloading the respective application, the electronic device launches (1132) the unified media browsing application or the respective application on the electronic device, such as in FIG. 10U (e.g., the user launches either the unified media browsing application or the respective application). In response to launching the unified media browsing application or the respective application on the electronic device (or, in response to detecting an input requesting playback of a media item using the respective application from within the unified media browsing application), the electronic device optionally displays (1134), on the display, a selectable affordance, such as in FIG. 10V. When selected, the selectable affordance optionally provides authorization for the respective media provider to share user-specific information with the unified media browsing application, including user-specific information from the respective media provider that corresponds to user actions (e.g., purchasing, renting, favoriting/bookmarking, watching, etc.) with respect to media available via the respective application, such as in FIG. 10V. In some embodiments, because the respective application was downloaded after the user provided the initial authorization to share the user-specific information with the unified media browsing application, additional authorization, as described above, is optionally required for the respective application. As such, the electronic device provides a simple process for authorizing media providers corresponding to newly-downloaded applications to share user-specific information with the unified media browsing application, thus improving the efficiency of user-electronic device interactions.

In some embodiments, the electronic device displays (1136), on the display, an application-browsing user interface that includes a plurality of selectable representations of a plurality of applications on the electronic device (e.g., a home screen of the electronic device that includes icons for different applications installed on the electronic device, the icons selectable to launch their corresponding applications on the electronic device), the selectable representations selectable to open corresponding applications on the electronic device, and the selectable representations including a selectable representation of the unified media browsing application that is selectable to open the unified media browsing application on the electronic device, such as in FIG. 10A. When the selectable representation of the unified media browsing application has focus, the electronic device optionally displays (1138), in the application-browsing user interface, one or more user interface elements corresponding to the unified media browsing application, such as in FIGS. 10B and 10R (e.g., displayed in a specified region of the application-browsing user interface that is separate from a region of the application-browsing user interface where the selectable representations are displayed, such as a top region of the application-browsing user interface). In some embodiments, when the selectable representation of the unified media browsing application loses the focus (e.g., the user has moved a focus cursor away from the selectable representation of the unified media browsing application), the electronic device ceases displaying the user interface elements corresponding to the unified media browsing application. In some embodiments, the user interface elements corresponding to the unified media browsing application were not displayed before the selectable representation of the unified media browsing application had the focus (1140), such as in FIG. 10A.

In some embodiments, before initiating the process for allowing the media accessible via the plurality of applications on the electronic device to be browsed in the unified media browsing application, the user interface elements corresponding to the unified media browsing application are informational items relating to the unified media browsing application (1142), such as in FIG. 10B (e.g., a demo video of how the unified media browsing application operates, a how-to video describing how to setup the unified media browsing application, etc.). In some embodiments, before the process for allowing the unified media browsing application to provide browsable media is initiated, the application-browsing user interface does not display representations of the media accessible via the plurality of applications, such as in FIG. 10B. In some embodiments, after the user has selected the affordance that provides authorization for the plurality of media providers to share the user-specific information with the unified media browsing application, the user interface elements corresponding to the unified media browsing application are representations of media items accessible from the plurality of applications (1144), such as in FIG. 10R (e.g., after the unified media browsing application has been authorized to display browsable media, the informational items relating to the unified media browsing application are optionally replaced with representations of the browsable media from the plurality of applications). As such, from the application-browsing user interface of the electronic device, the electronic device provides the user with easily accessible indications of whether or not the unified media browsing application has been authorized, informational items relating to the unified media browsing application and/or media items accessible from the unified media browsing application, thus improving the efficiency of user-electronic device interactions.

In some embodiments, the electronic device displays (1146), on the display, a settings user interface (e.g., a settings user interface that is a user interface of the operating system of the electronic device, not a user interface of the unified media browsing application) for individually providing authorization for the plurality of media providers to share corresponding user-specific information with the unified media browsing application, such as in FIG. 10Q. In some embodiments, the settings user interface is a user interface of the unified media browsing application, though in some embodiments, the settings user interface is a user interface of the operating system of the electronic device, and not a user interface of the unified media browsing application. In some embodiments, the settings user interface includes a first toggle to authorize the first media provider to share the user-specific information from the first media provider that corresponds to the user actions with respect to the media available via the first application (1148), such as in FIG. 10Q (e.g., the user is able to individually allow or disallow the first media provider to share the user-specific information with the unified media browsing application, such that media from the first application will or will not, respectively, be included in the unified media browsing application). In some embodiments, the settings user interface includes a second toggle to authorize the second media provider to share the user-specific information from the second media provider that corresponds to the user actions with respect to the media available via the second application (1150), such as in FIG. 10Q (e.g., the user is able to individually allow or disallow the second media provider to share the user-specific information with the unified media browsing application, such that media from the second application will or will not, respectively, be included in the unified media browsing application). In this way, the electronic device provides a centralized location where authorizations for sharing user-specific information are able to be managed, thus improving the efficiency of user-electronic device interactions.

It should be understood that the particular order in which the operations in FIGS. 11A-11F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1300 and 1900) are also applicable in an analogous manner to method 1100 described above with respect to FIGS. 11A-11F. For example, the unified media browsing application and user interface, suggested media items, trending media items, media applications, representations of suggested and trending media items, and media providers described above with reference to method 1100 optionally have one or more of the characteristics of the unified media browsing application and user interface, suggested media items, trending media items, media applications, representations of suggested and trending media items, and media providers described herein with reference to other methods described herein (e.g., methods 700, 900, 1300 and 1900). For brevity, these details are not repeated here.

The operations in the information processing methods described above are, optionally, implemented by running one or more functional modules in an information processing apparatus such as general purpose processors (e.g., as described with respect to FIGS. 1A, 3, 5A and 16) or application specific chips. Further, the operations described above with reference to FIGS. 11A-11F are, optionally, implemented by components depicted in FIGS. 1A-1B. For example, receiving operation 1102 and initiating operation 1104 are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

User Interface for Episodic Content

Users interact with electronic devices in many different manners, including interacting with content or media (e.g., music, movies, etc.) that may be available (e.g., stored or otherwise accessible) on the electronic devices, such as via different content providers and corresponding content applications (e.g. as described with reference to FIGS. 6A-6LL, FIGS. 8A-8GG, FIGS. 10A-10Z, FIGS. 12A-12V and/or FIGS. 18A-18J). For example, a user may browse and play content that is accessible on an electronic device. However, a user may desire to view information about a collection of episodic content (e.g., a television series, a mini-series, or the like) from a user interface dedicated to that collection of episodic content. The embodiments described below provide ways in which an electronic device displays representations of episodes in a collection of episodic content, thereby enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 12A-12V illustrate exemplary ways in which an electronic device displays representations of episodes in a collection of episodic content in accordance with some embodiments of the disclosure. The embodiments in these figures are used to illustrate the processes described below, including the processes described with reference to FIGS. 13A-13E.

FIG. 12A illustrates exemplary display 514. Display 514 optionally displays one or more user interfaces that include various content. In the example illustrated in FIG. 12A, display 514 displays a user interface 1202 for a given collection of episodic content (e.g., a television show, mini-series, or the like). User interface 1202 is optionally a dedicated canonical page for the collection of episodic content. User interface 1202 is optionally displayed in response to selection of a representation of the collection of episodic content displayed in a unified media browsing application on the electronic device (e.g., a unified media browsing application as described with reference to FIGS. 6A-6LL, FIGS. 8A-8GG and/or FIGS. 10A-10Z). User interface 1202 is optionally a canonical page that includes information about a television show, for example, including information about season(s) and/or episode(s) of the television show. In FIG. 12A, user interface 1202 includes the title of the collection of episodic content (Content Collection A), a description and genre of the collection of episodic content, and information about the number of seasons in the collection of episodic content. User interface 1202 also includes a "smart play" button, selection of which causes the electronic device to play the next episode in the collection of episodic content (e.g., the episode following the last episode watched by the user), a "favorite" button, selection of which causes the electronic device to favorite the collection of episodic content (e.g., such that it is displayed as suggested content in the unified media browsing application), and a "purchase seasons" button, selection of which allows the user to purchase access to one or more seasons of the collection of episodic content (if the user is not already entitled to access those seasons).

User interface 1202 also includes representations 1204-1 to 1204-4 of episodes from the first season of content collection A, and representations 1204-5 to 1204-8 of episodes from the second season of content collection A. Representations 1204 also include visual indications 1208 of the content provider(s) via which the corresponding episodes are available, though it is understood that representations 1204 need not include visual indications 1208 (e.g., display of visual indications 1208 is optional). For example, representation 1204-2, corresponding to season 1, episode 2, includes indication 1208, which indicates that season 1, episode 2 is available via content provider 1. Some episodes are available via multiple content providers. For example, representation 1204-3, corresponding to season 1, episode 3, includes indications that season 1, episode 3 is available via content providers 1 and 2. In some embodiments, indications 1208 are textual indications and/or graphical indications (e.g., logos of the corresponding content providers). Additionally, some episodes have multiple versions available for viewing on the electronic device (e.g., extended cut, standard cut, director's cut, etc.), while other episodes have a single version available for viewing. For example, season 1, episode 1 and season 2, episode 1 each have two versions available for viewing (e.g., versions A and B), while the remaining episodes have one version available for viewing (e.g., version A).

In FIG. 12A, the user of the electronic device is entitled to view content from content providers 1, 2 and 3 (e.g., the user has content subscriptions with content providers 1, 2 and 3), as indicated by 1206. It is understood that in some embodiments, "a user being entitled to view a content/media item" refers to the electronic device being associated with an account (e.g., logged into the account) that is entitled to play the content/media item. Each of the episodes of content collection A is available to the user via at least one of content providers 1, 2 and 3. Therefore, the user has access to all of the episodes of content collection A, and the electronic device displays representations 1204 with the same visual characteristic (e.g., all of the representations are displayed in color (as opposed to grayscale for episodes the user is not entitled to view), or without a badge or other indication that payment or subscription is required to view the episodes).

Figure 12B:
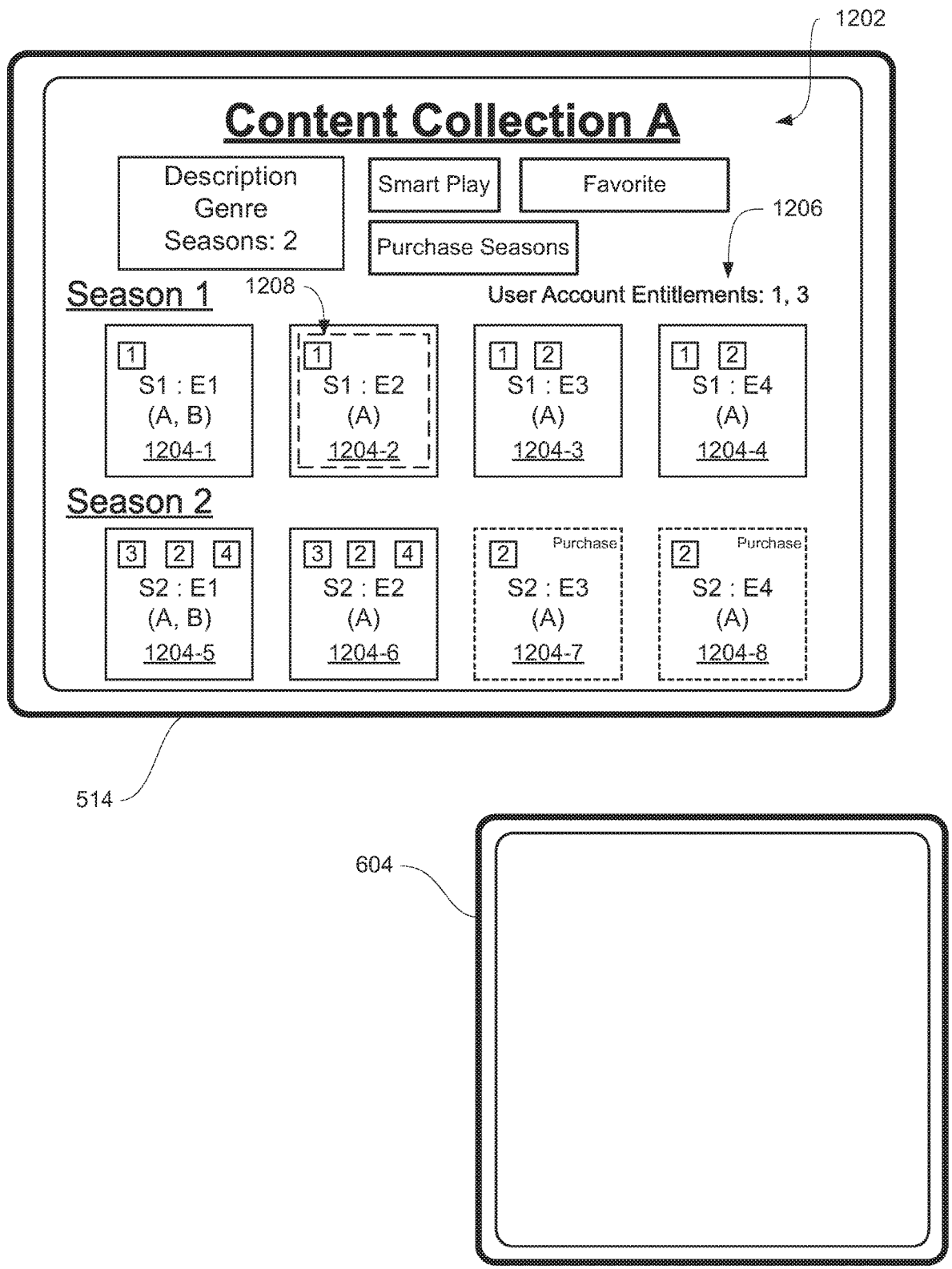

In FIG. 12B, the user is only entitled to view content from content providers 1 and 3, as indicated by 1206. As such, the user is no longer entitled to view season 2, episode 3 and season 2, episode 4. As a result, the electronic device displays representations 1204-7 and 1204-8, corresponding to season 2, episode 3 and season 2, episode 4, respectively, with a different visual characteristic than representations 1204-1 to 1204-6, which correspond to episodes that the user is entitled to view. For example, the electronic device displays a "purchase" badge in representations 1204-7 and 1204-8 to indicate, to the user, that the user is not entitled to view season 2, episode 3 and season 2, episode 4, and must purchase access to those episodes (or otherwise subscribe to a content provider).

Further, in some embodiments, the ordering of indications 1208 in representations 1204 is based on the entitlement of the user to view the corresponding episodes on the various content providers. For example, the visual indication(s) for the content provider(s) on which the user is entitled to view the episode are displayed first, followed by visual indication(s) of preferred content provider(s), if any, that require the user to purchase or otherwise pay for accessing the episode (e.g., content provider(s) that a third party has designated as preferred), followed by visual indication(s) for content provider(s) on which the user is not entitled to view the episode. As an example, in FIG. 12B, indications 1208 in representation 1204-5 include an indication for content provider 3 displayed first, an indication for content provider 2 displayed second, and an indication for content provider 4 listed third, because the user is entitled to access content via content provider 3, and is not entitled to access content via content providers 2 or 4. Content provider 2 is optionally a preferred content provider, and content provider 4 is optionally not a preferred content provider; thus, content provider 2 is optionally displayed ahead of content provider 4.

Figure 12C:
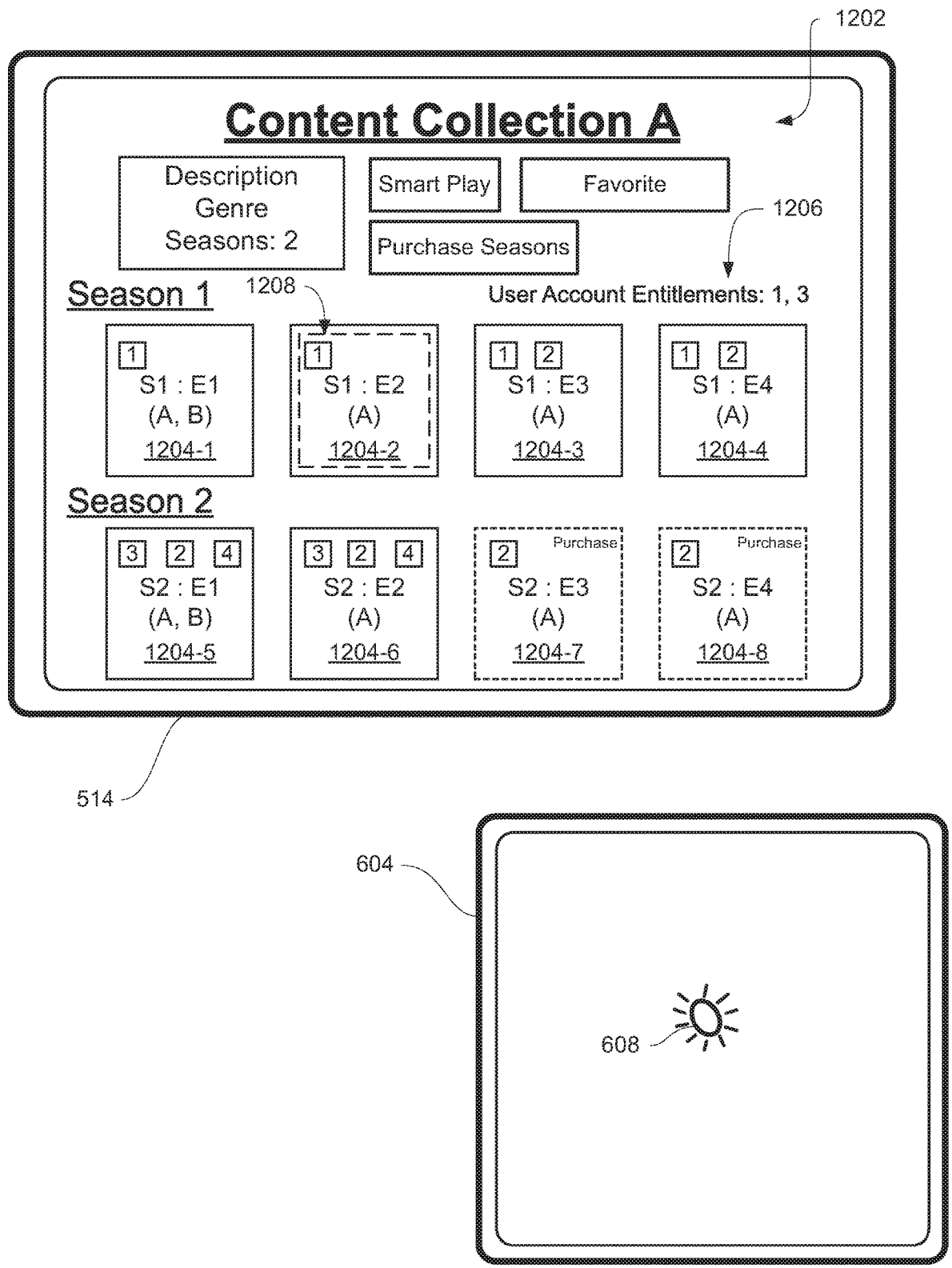
Figure 12D:
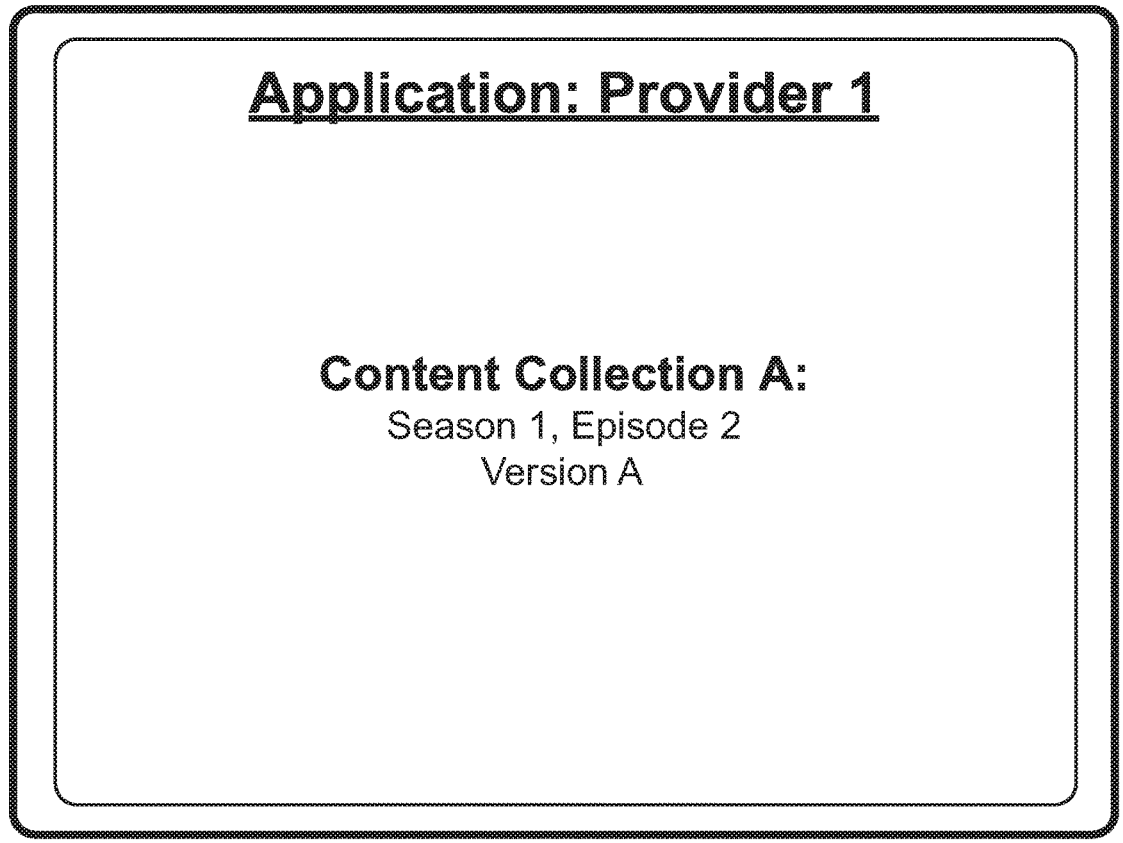
Figure 12D:
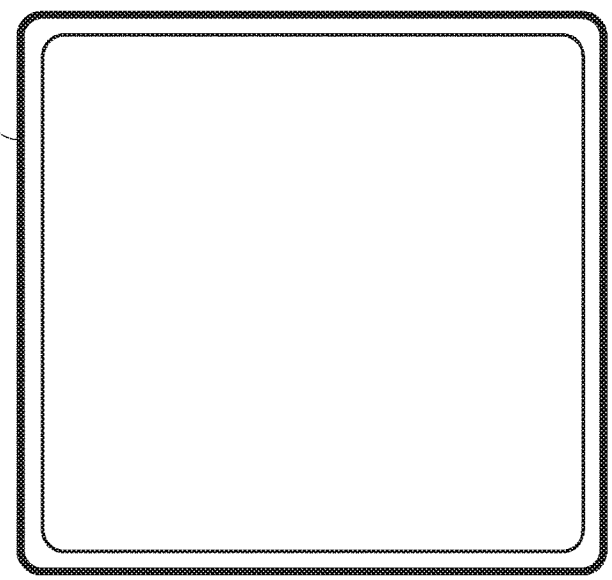

In some embodiments, representations 1204 are selectable to play their corresponding episodes on the electronic device. For example, in FIG. 12C, a click of touch-sensitive surface 604 is detected while representation 1204-2, corresponding to season 1, episode 2, has the current focus. Because season 1, episode 2 is only available via content provider 1, and only has a single version available (version A), in response to the selection of representation 1204-2, the electronic device plays version A of season 1, episode 2 in a media application corresponding to content provider 1, as shown in FIG. 12D.

Figure 12E:
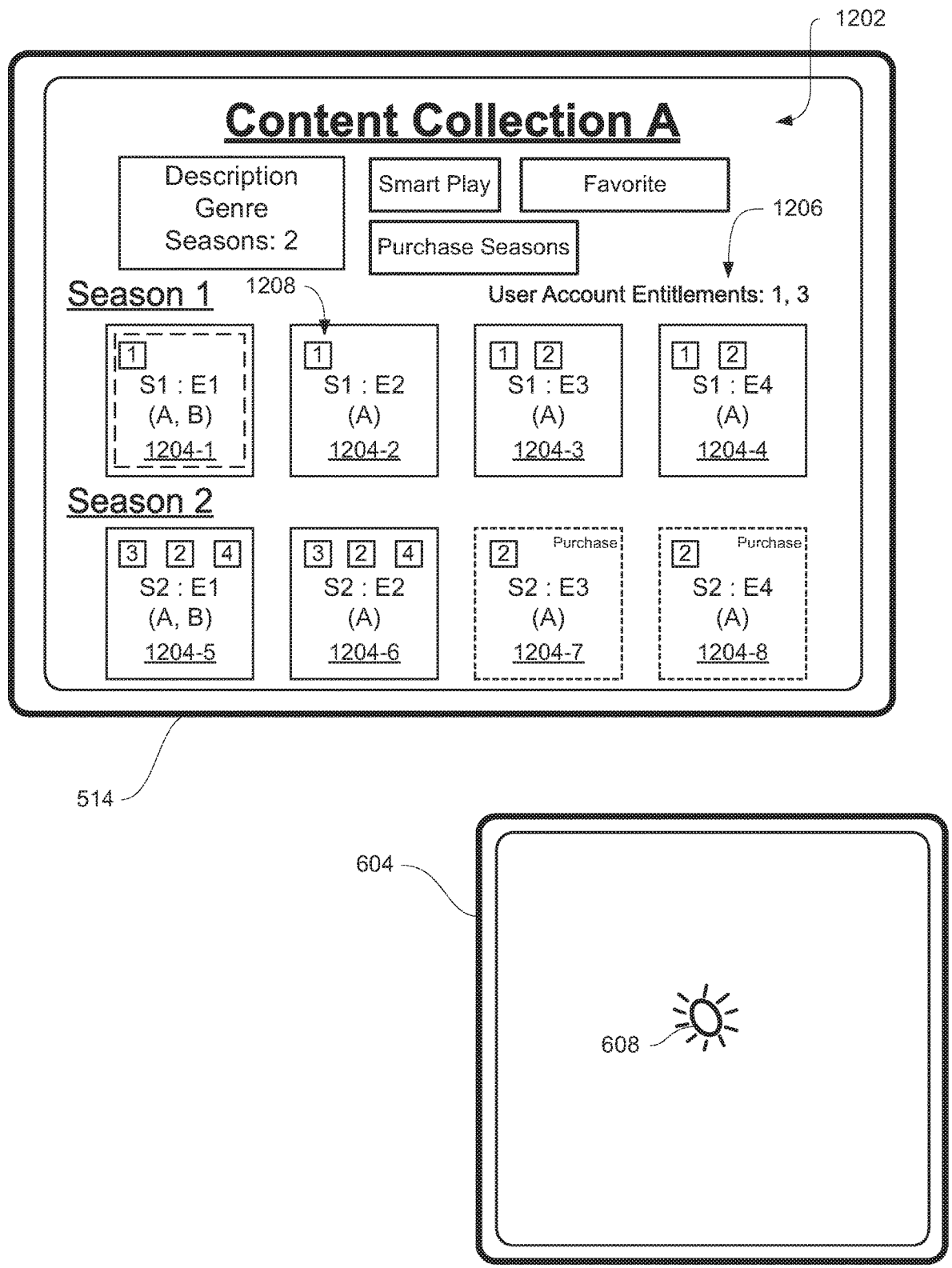
Figure 12F:
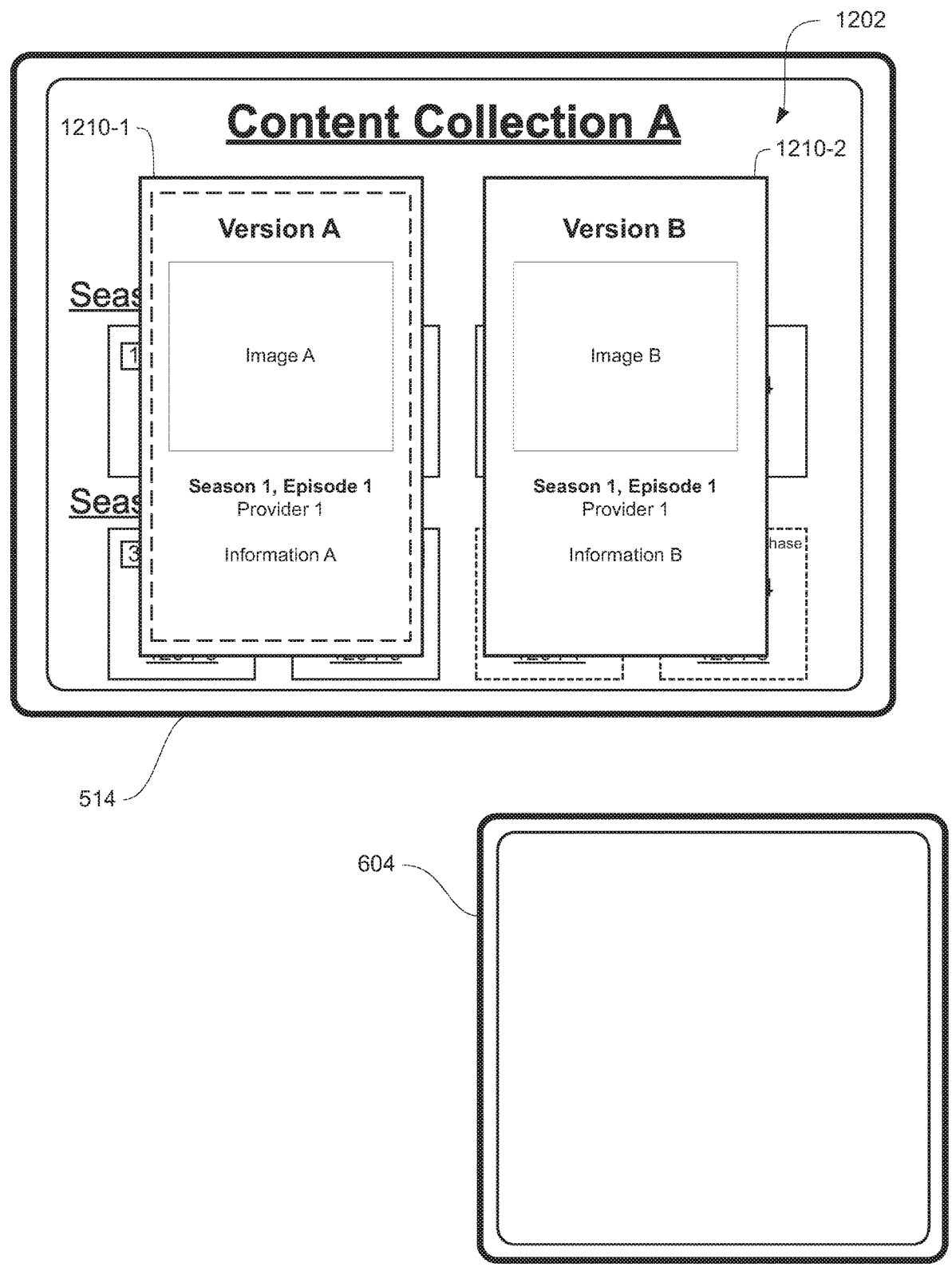

In FIG. 12E, a click of touch-sensitive surface 604 is detected while representation 1204-1, corresponding to season 1, episode 1, has the current focus. However, in contrast to season 1, episode 2, two versions of season 1, episode 1 are available for viewing (both via content provider 1). Because multiple versions of season 1, episode 1 are available for viewing, in response to the selection of representation 1204-1, in response to the selection of representation 1204-1, the electronic device displays representation 1210-1 of version A of season 1, episode 1, and representation 1210-2 of version B of seasons 1, episode 1, as shown in FIG. 12F. Representations 1210-1 and 1210-2 are each selectable to play their respective versions of season 1, episode 1 on the electronic device. Further, representations 1210-1 and 1210-2 include various information about their versions of season 1, episode 1, including version information (e.g., extended cut, director's cut, etc.), images corresponding to the different versions, and information about the content provider via which each version is available. In FIG. 12F, representation 1210-1, corresponding to version A of season 1, episode 1, has the current focus.

Figure 12G:
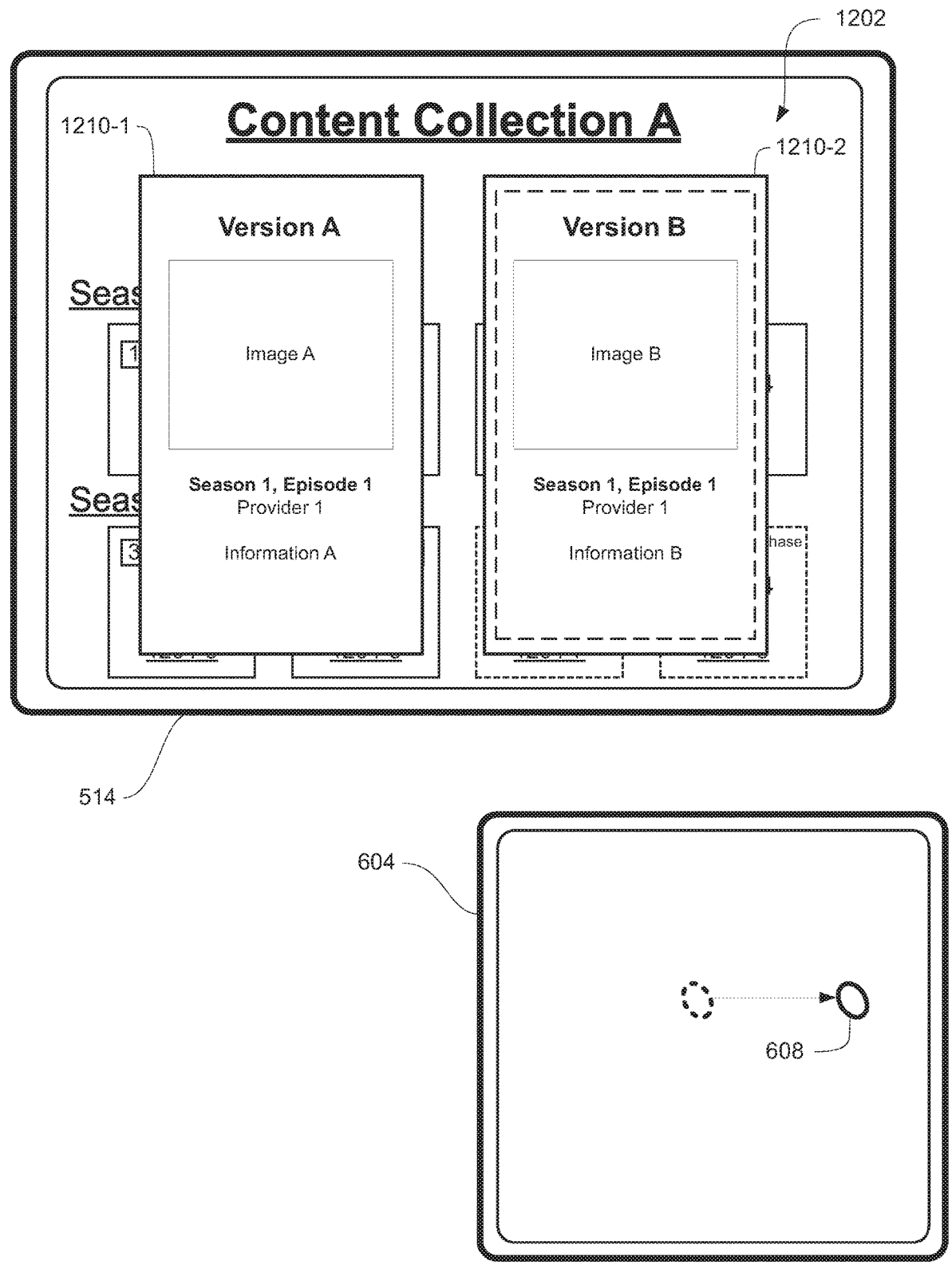
Figure 12H:
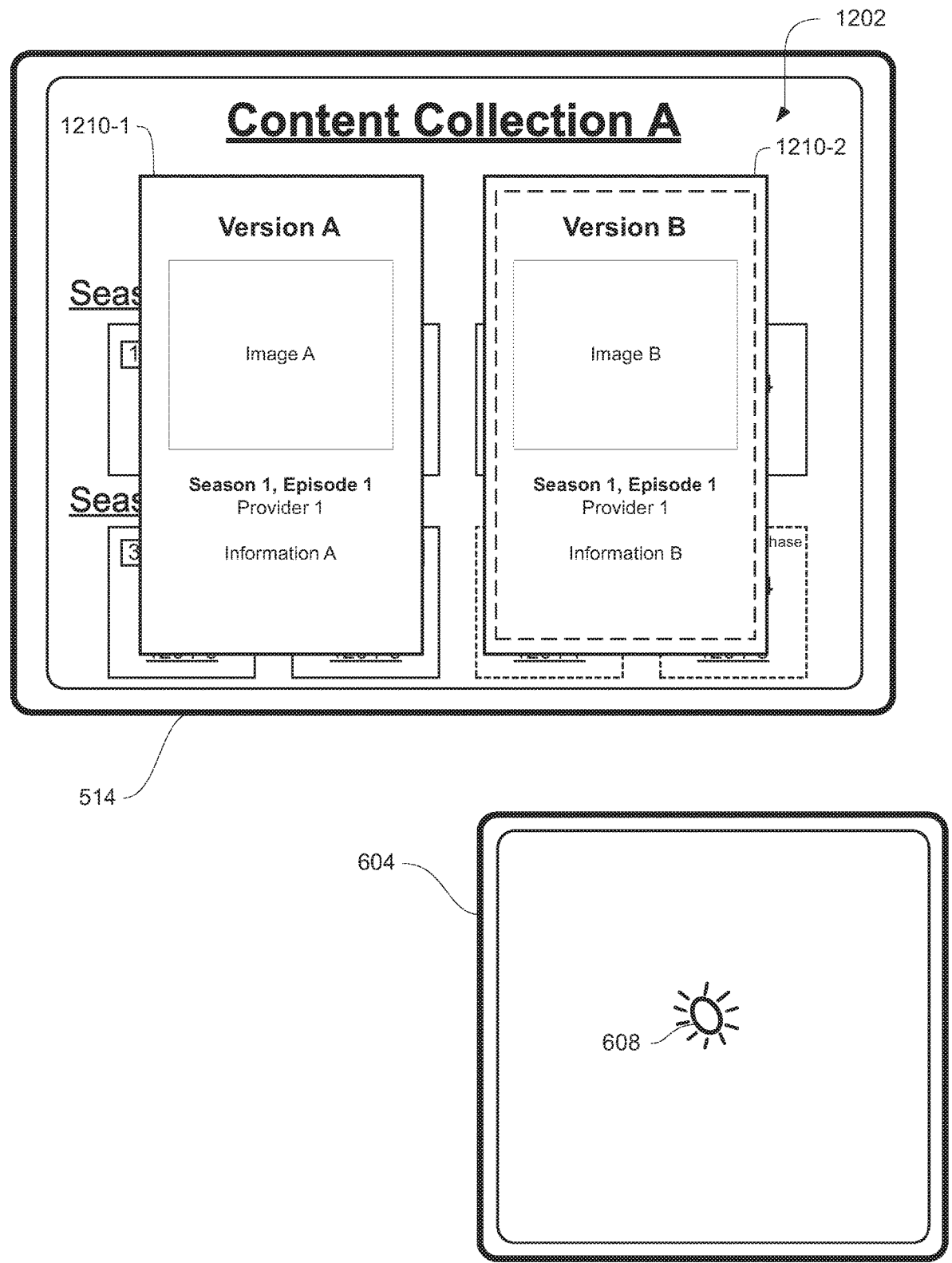
Figure 12I:
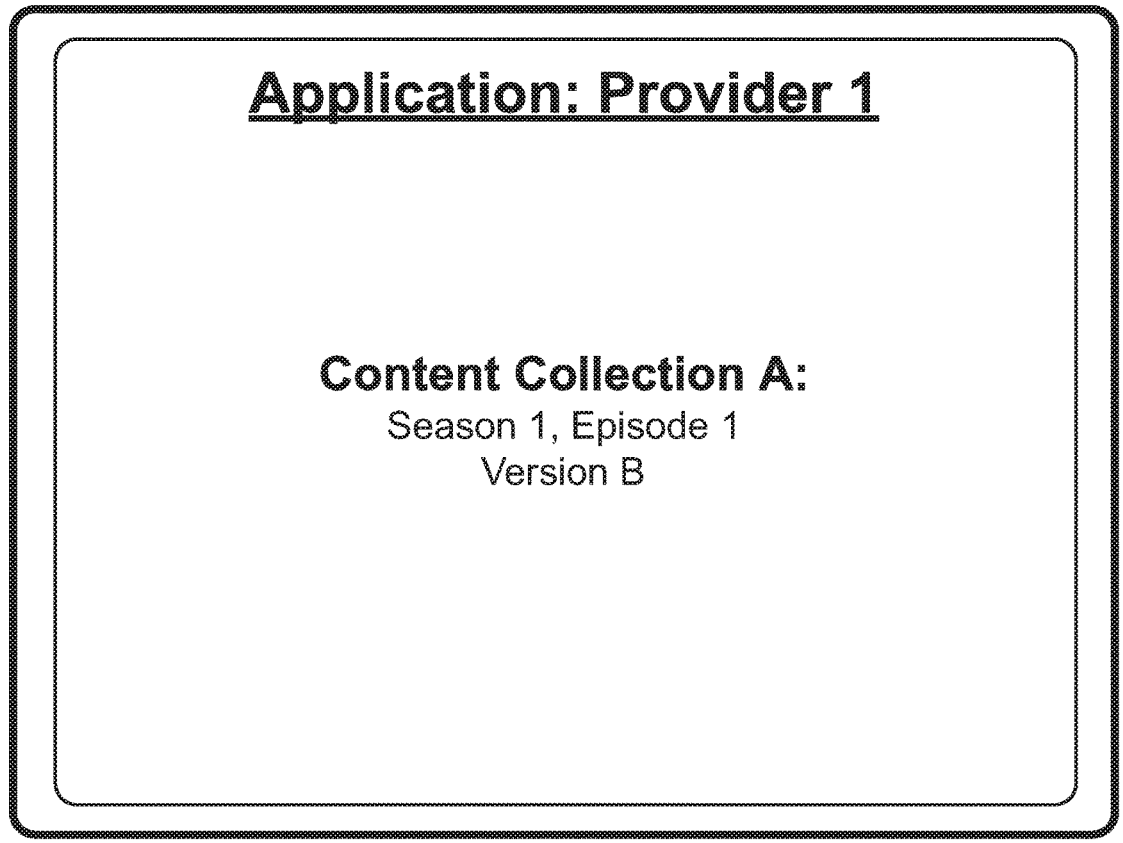
Figure 12I:
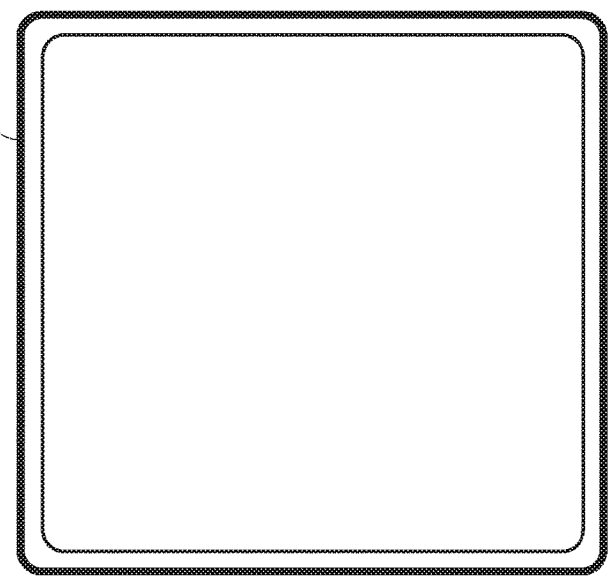

In FIG. 12G, a left-to-right swipe of contact 608 on touch-sensitive surface 604 is detected, which causes representation 1210-2, corresponding to version B of season 1, episode 1, to have the current focus. In FIG. 12H, a click of touch-sensitive surface 604 is detected while representation 1210-2 has the current focus. In response, the electronic device plays version B of season 1, episode 1 in a media application corresponding to content provider 1, as shown in FIG. 12I.

Figure 12J:
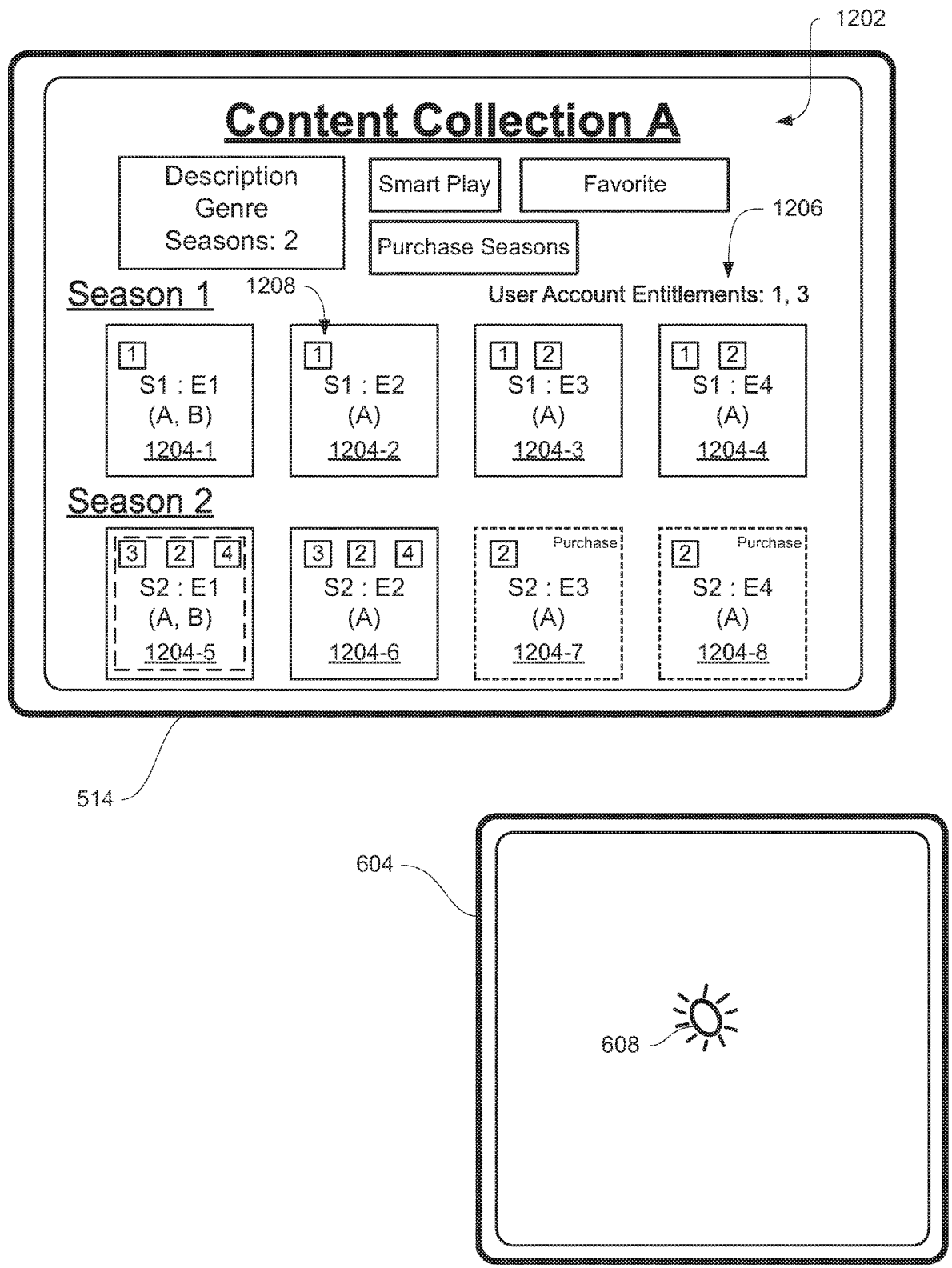
Figure 12K:
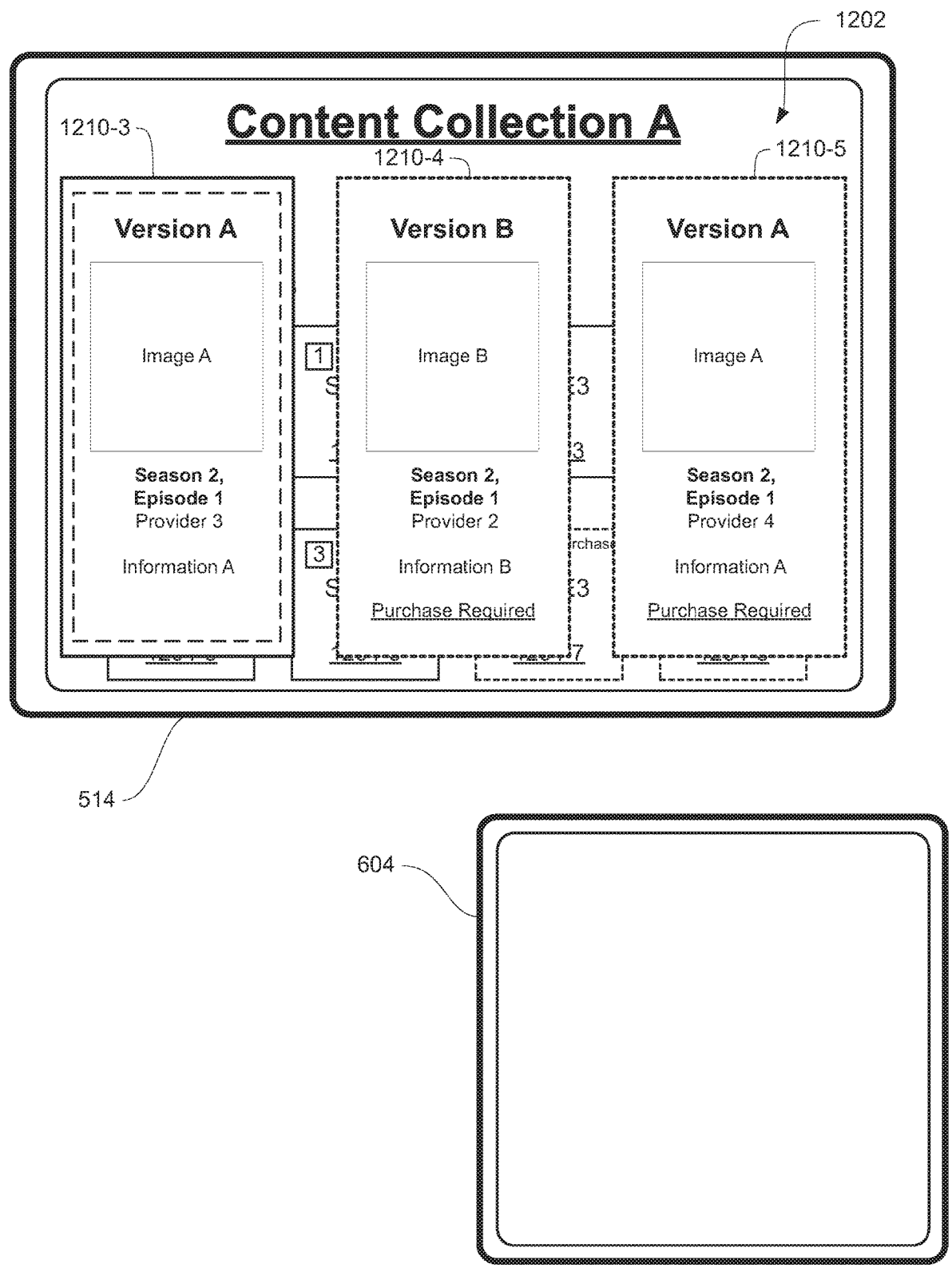

In some embodiments, if a representation of an episode that has multiple versions available and/or is available via multiple content providers is selected, the electronic device displays selectable representations of each version and/or corresponding to each content provider, even if the user of the electronic device is not entitled to view a version and/or access content on a content provider. For example, in FIG. 12J, a click of touch-sensitive surface 604 is detected while representation 1204-5, corresponding to season 2, episode 1, has the current focus. As shown in FIG. 12J, season 2, episode 1 has two versions available for viewing (e.g., versions A and B), and is available via multiple content providers (e.g., content providers 2, 3 and 4).

In response to the selection of representation 1204-5, the electronic device displays representations 1210-3 to 1210-5 corresponding to the different content providers/versions associated with season 2, episode 1. Specifically, the electronic device displays representation 1210-3 that corresponds to version A of season 2, episode 1, which is available via content provider 3 (via which the user of the electronic device is entitled to access content). The electronic device also displays representation 1210-4 that corresponds to version B of season 2, episode 1, which is available via content provider 2 (via which the user of the electronic device is not entitled to access content). Finally, the electronic device additionally displays representation 1210-5 that corresponds to version A of season 2, episode 1, which is available via content provider 4 (via which the user of the electronic device is also not entitled to access content). As such, the electronic device displays representations 1210-4 and 1210-5 even though the user of the electronic device is not entitled to access their corresponding episodes. However, to indicate that the user is entitled to access some versions/content providers, but not others, the electronic device displays representation 1210-3 (corresponding to entitled content) with a different visual characteristic than representations 1210-4 and 1210-5 (not corresponding to entitled content) (e.g., color vs. grayscale, without a "purchase required" badge vs. with a "purchase required" badge, etc.). Representation 1210-3 is selectable to play version A of season 2, episode 1 via content provider 3 (e.g., as described with reference to FIGS. 12H-12I). Representations 1210-4 and 1210-5 are optionally selectable to purchase then view their corresponding episodes, respectively, and/or subscribe to content providers 2 and 4, respectively, then view their corresponding episodes.

Figure 12L:
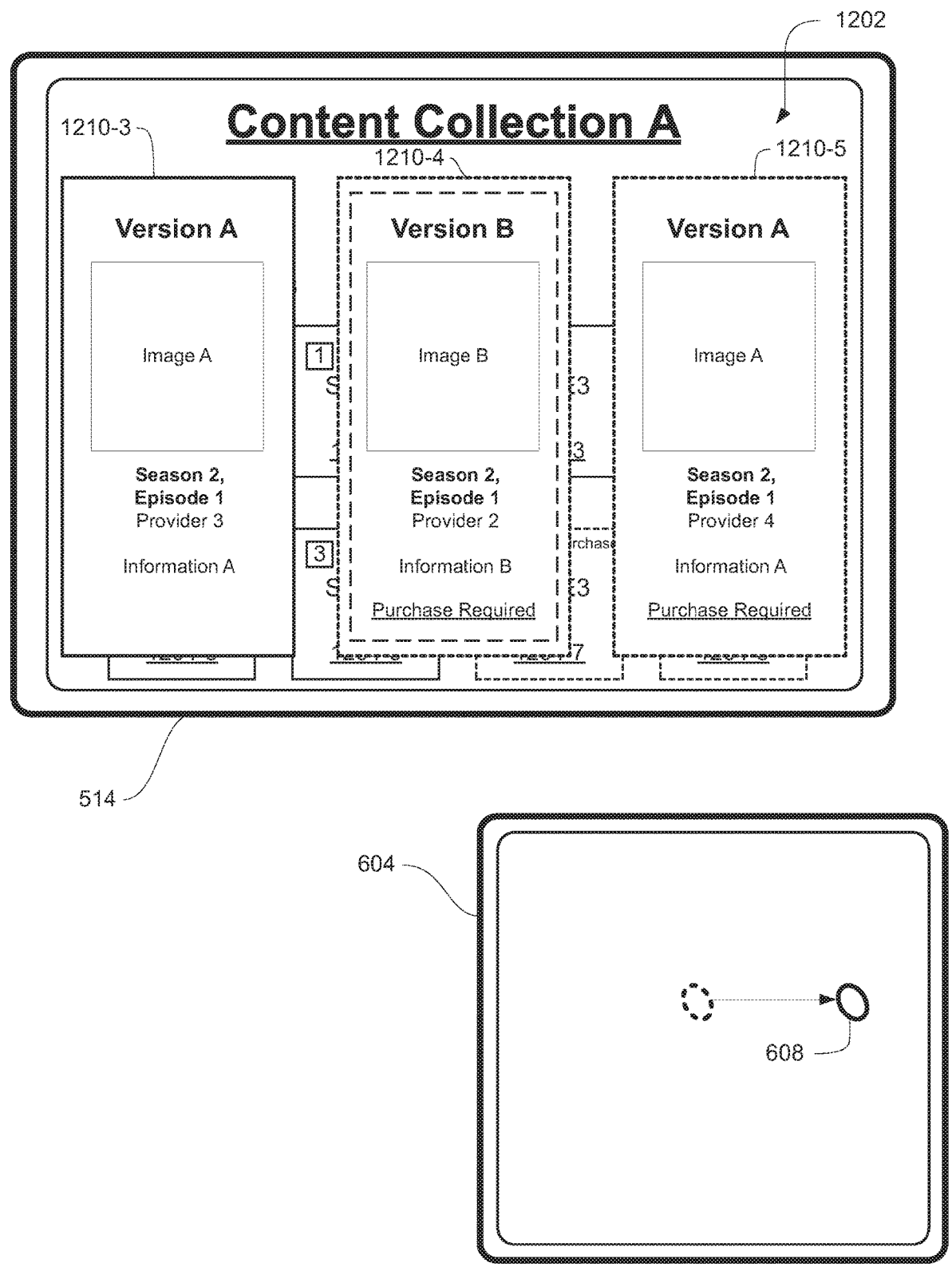
Figure 12M:
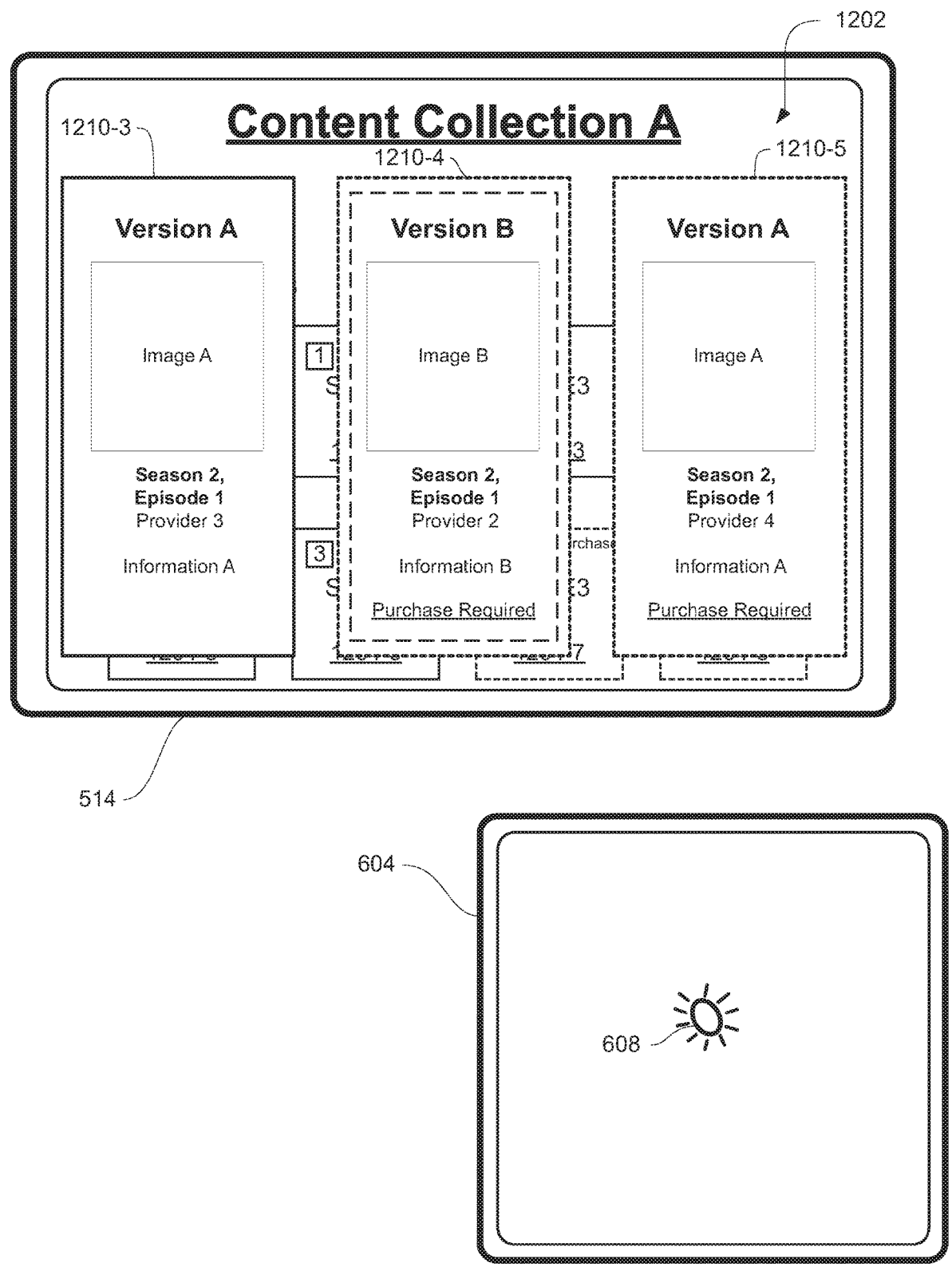

For example, in FIG. 12L, a left-to-right swipe of contact 608 is detected on touch-sensitive surface 604, and in response, representation 1210-4, corresponding to version B of season 2, episode 1 from content provider 2, gains the current focus. In FIG. 12M, a click of touch-sensitive surface 604 is detected while representation 1210-4 has the current focus. In response, in FIG. 12N, the electronic device displays a page via which the user is able to purchase version B of season 2, episode 1 (e.g., by selecting button 1250) to watch the episode, subscribe to content provider 2 to watch the episode (e.g., by selecting button 1252), or cancel the request to watch the episode (e.g., by selecting button 1254, which optionally causes the electronic device to return to the display of FIG. 12L).

Figure 12N:
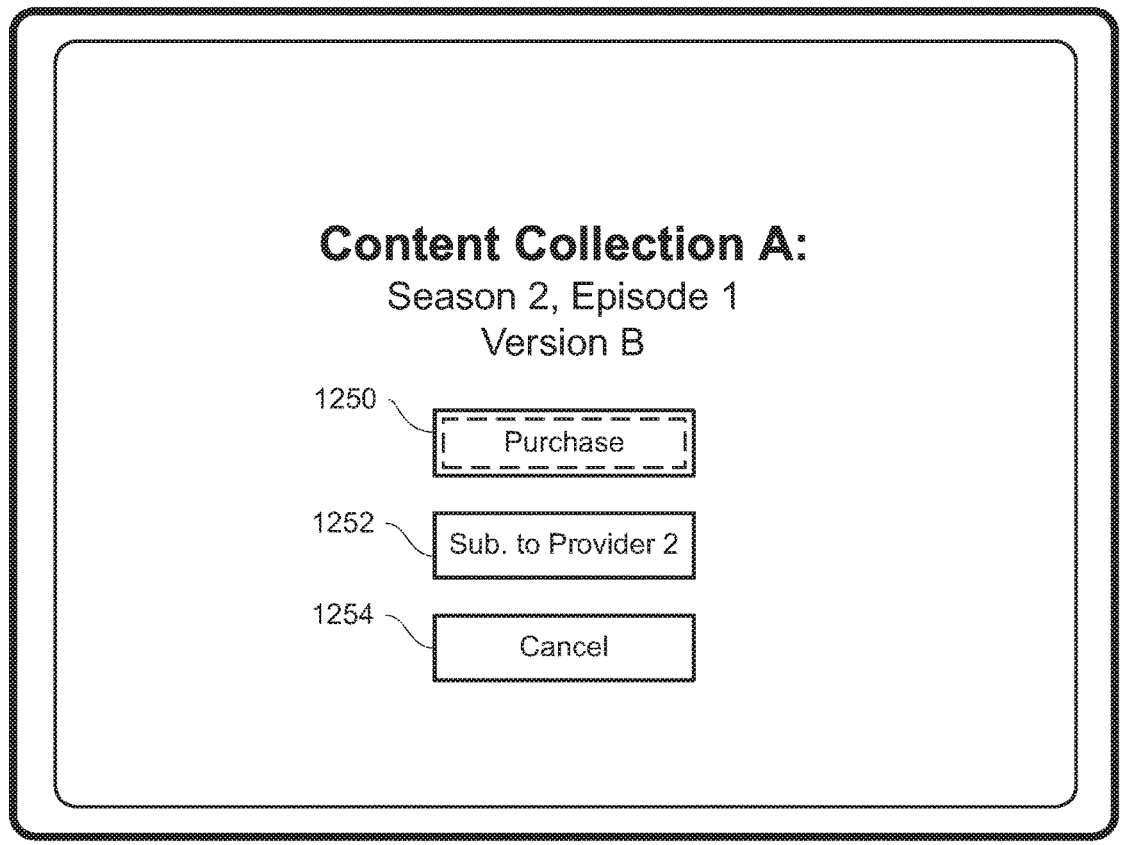
Figure 12N:
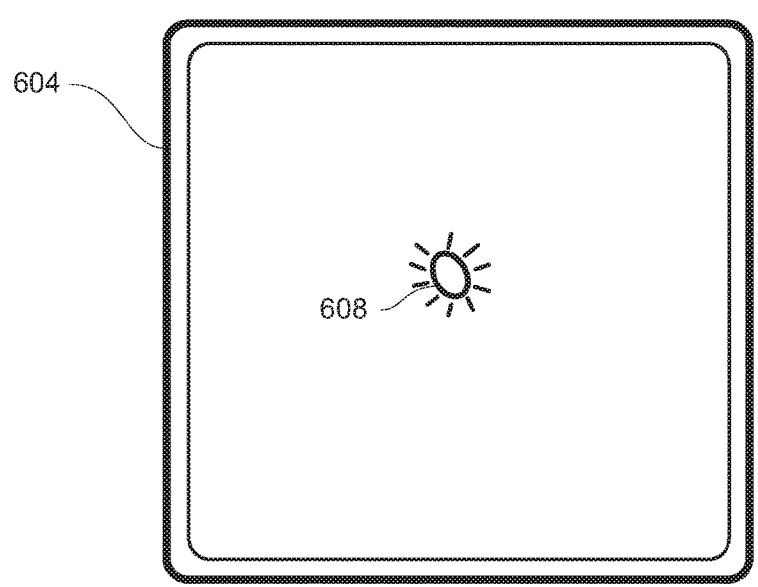
Figure 12O:
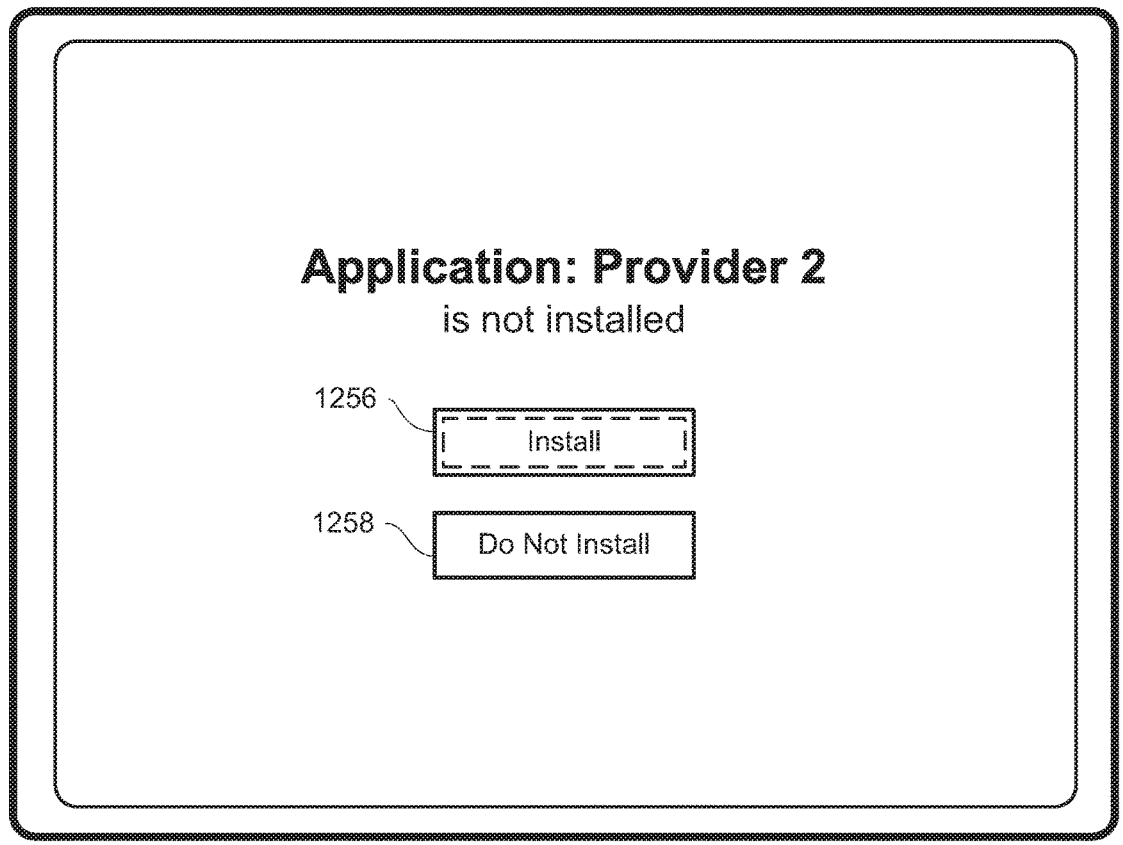
Figure 12O:
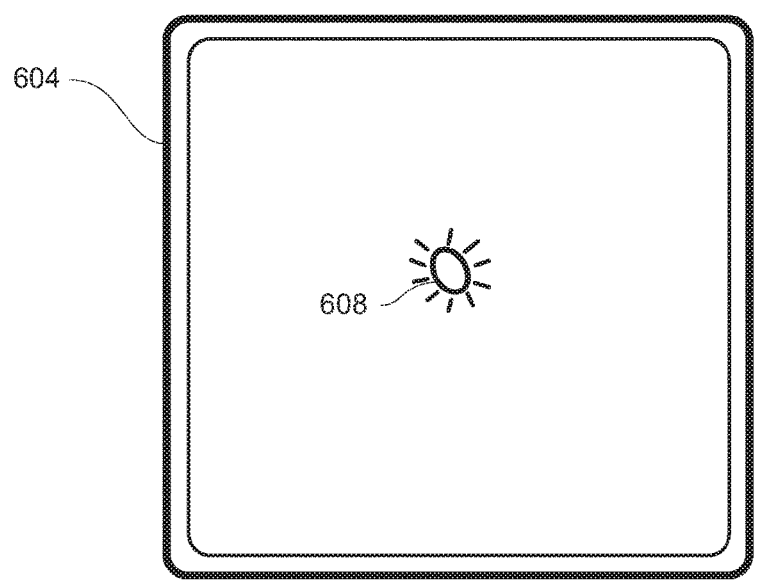
Figure 12P:
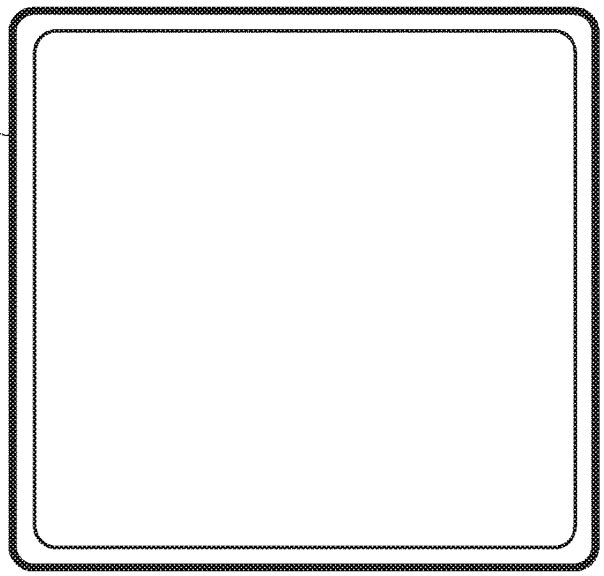

In FIG. 12N, a click of touch-sensitive surface 604 has been detected while button 1250 has the current focus. In response, the user has now purchased access to version B of season 2, episode 1 from content provider 2. In some embodiments, if the content application for viewing version B of season 2, episode 1 via content provider 2 is not installed on the electronic device, in response to the selection of button 1250 in FIG. 12N, the electronic device displays, in FIG. 12O, a page via which the user is able to install the content application (e.g., by selecting button 1256) or not install the application (e.g., by selecting button 1258, which optionally causes the electronic device to return to the display of FIG. 12L). In FIG. 12O, a click of touch-sensitive surface 604 has been detected while button 1256 has the current focus. In response, the electronic device, without further user input, downloads and/or installs the content application for content provider 2, and begins playing version B of season 2, episode 1 in the content application, as shown in FIG. 12P. In some embodiments, if the content application for content provider 2 is already installed on the electronic device, selection of button 1250 in FIG. 12N causes the electronic device to immediately (e.g., without further user input) play version B of season 2, episode 1 in the content application as in FIG. 12P, without displaying the page of FIG. 12O.

Figure 12Q:
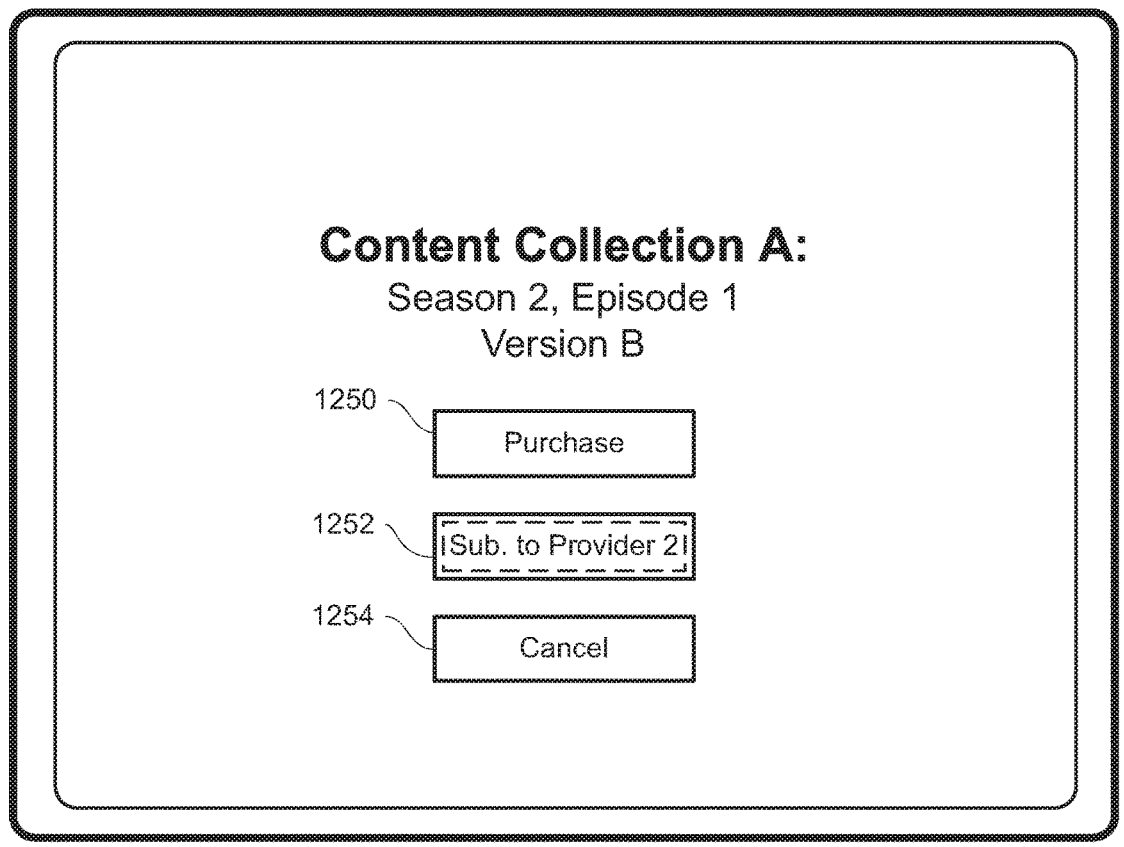
Figure 12Q:
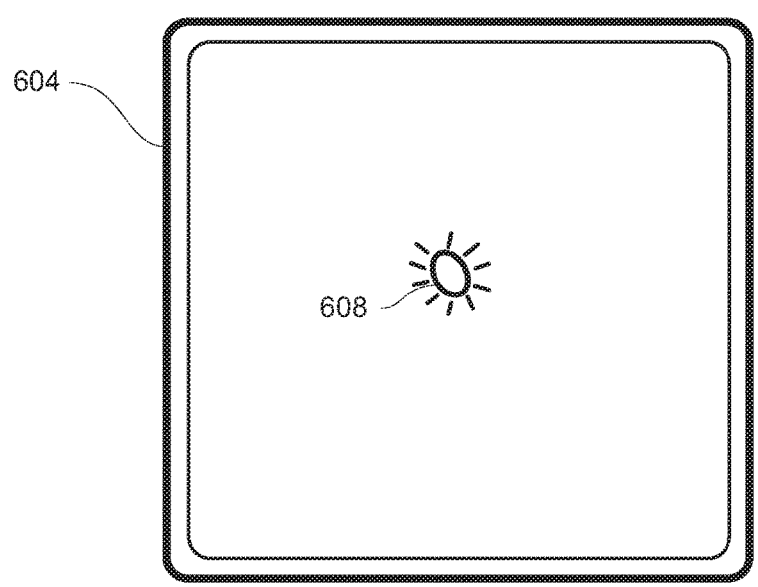
Figure 12R:
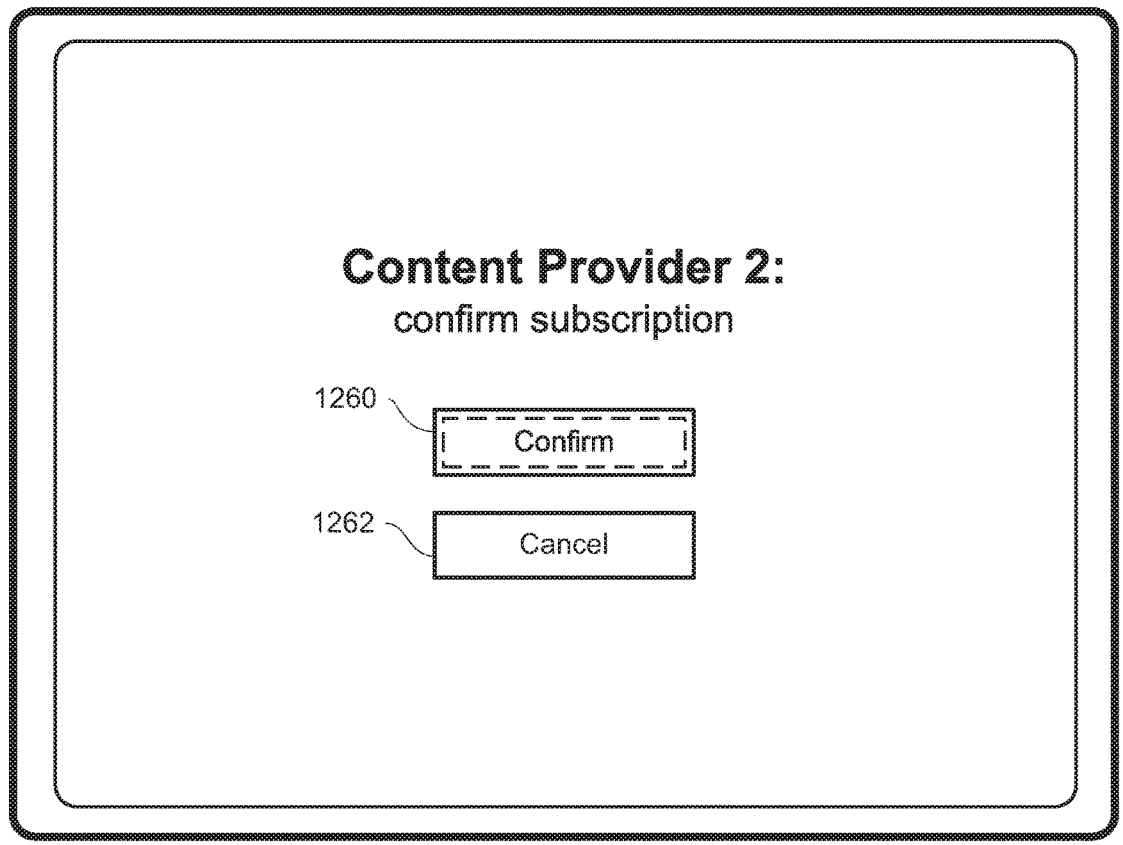
Figure 12R:
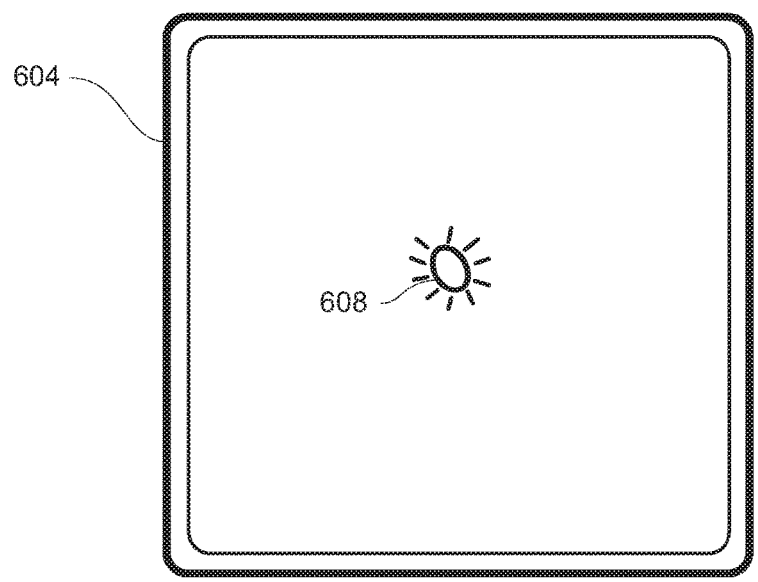
Figure 12S:
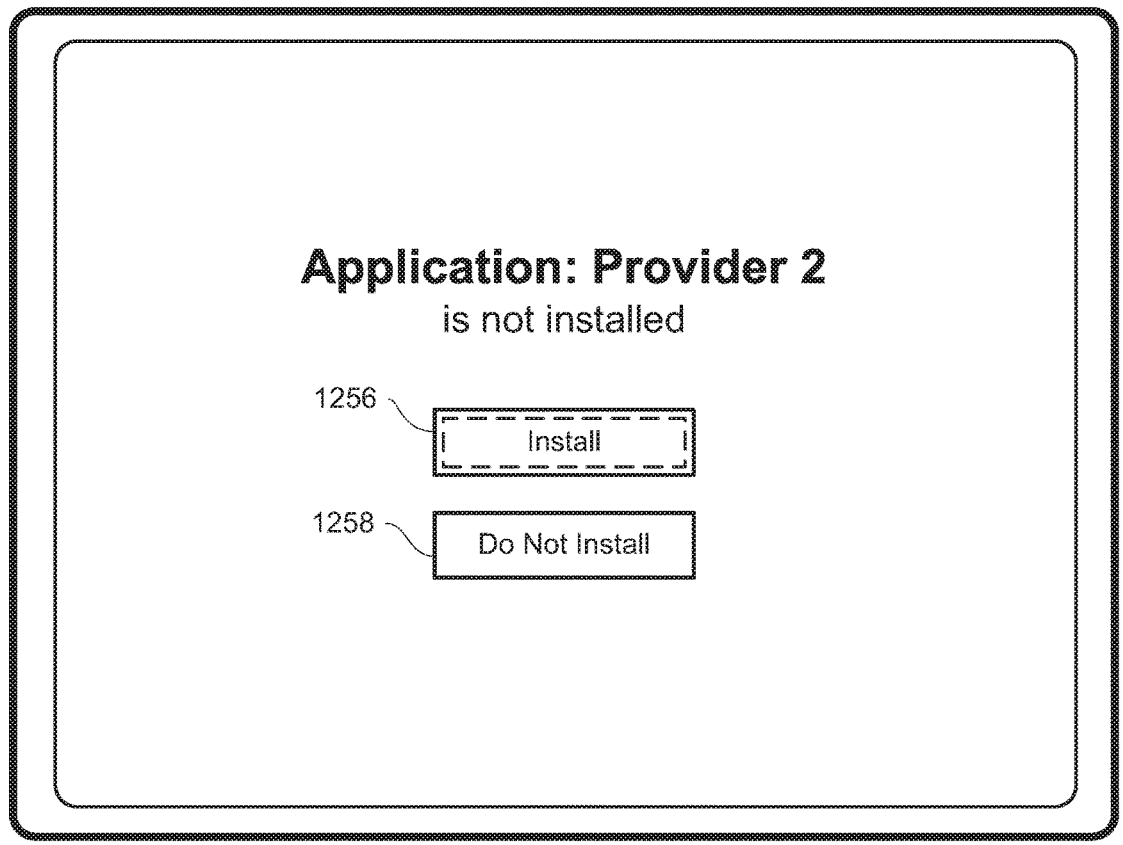
Figure 12S:
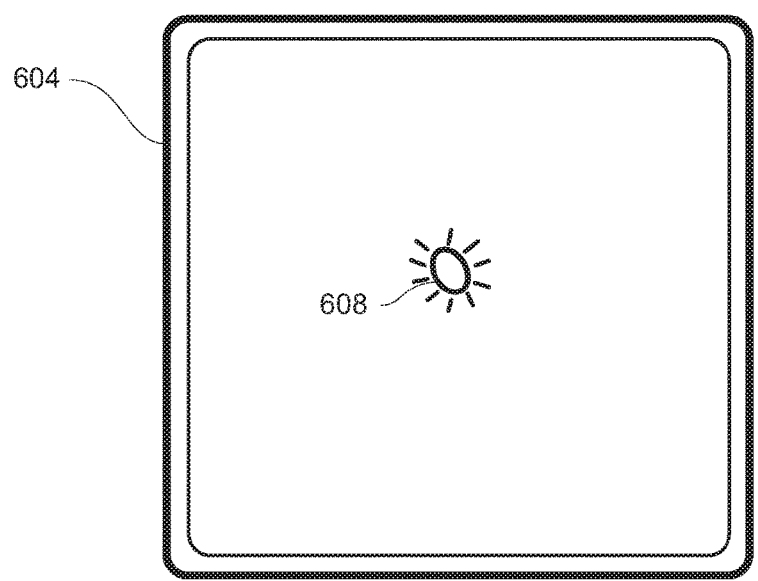
Figure 12T:
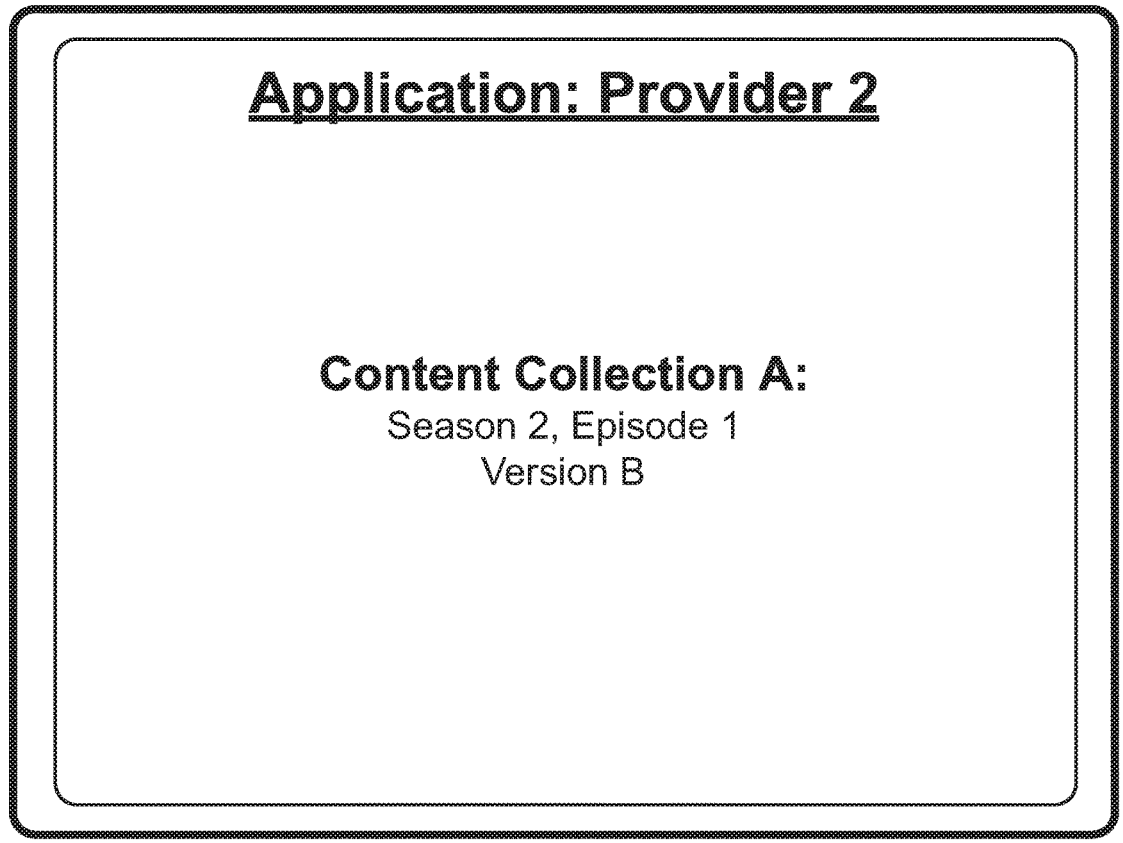
Figure 12T:
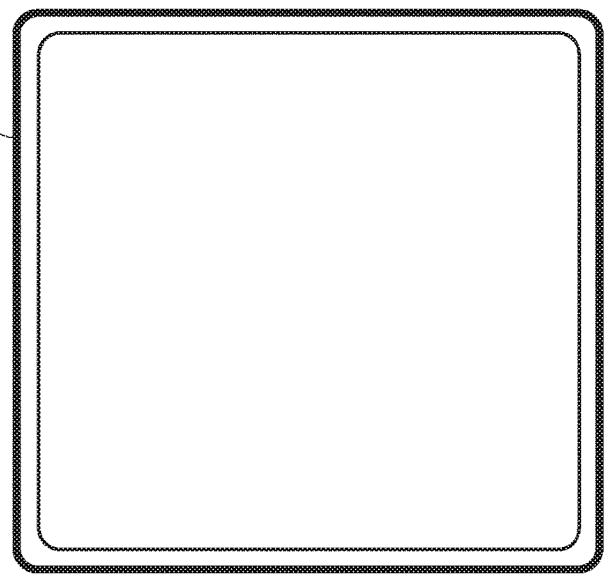

In some circumstances, the user may subscribe to content provider 2 to view version B of season 2, episode 1. For example, in FIG. 12Q, a click of touch-sensitive surface 604 has been detected while button 1252, for subscribing to content provider 2, has the current focus. In response, the electronic device displays, in FIG. 12R, a page via which the user is able to confirm the subscription request to content provider 2 (e.g., by selecting button 1260), or cancel the subscription request (e.g., by selecting button 1262, which optionally causes the electronic device to return to the display of FIG. 12Q). In FIG. 12R, a click of touch-sensitive surface 604 has been detected while button 1260, for confirming the subscription to content provider 2, has the current focus. In some embodiments, if the content application for viewing version B of season 2, episode 1 via content provider 2 is not installed on the electronic device, in response to the selection of button 1260 in FIG. 12R, the electronic device subscribes the user to content provider 2 and displays, in FIG. 12S, a page via which the user is able to install the content application (e.g., by selecting button 1256) or not install the application (e.g., by selecting button 1258, which optionally causes the electronic device to return to the display of FIG. 12Q). In FIG. 12S, a click of touch-sensitive surface 604 has been detected while button 1256 has the current focus. In response, the electronic device downloads and/or installs the content application for content provider 2, and without further user input, begins playing version B of season 2, episode 1 in the content application, as shown in FIG. 12T. In some embodiments, if the content application for content provider 2 is already installed on the electronic device, selection of button 1260 in FIG. 12R causes the electronic device to subscribe the user to content provider 2 and immediately (e.g., without further user input) play version B of season 2, episode 1 in the content application as in FIG. 12T, without displaying the page of FIG. 12S.

Figure 12U:
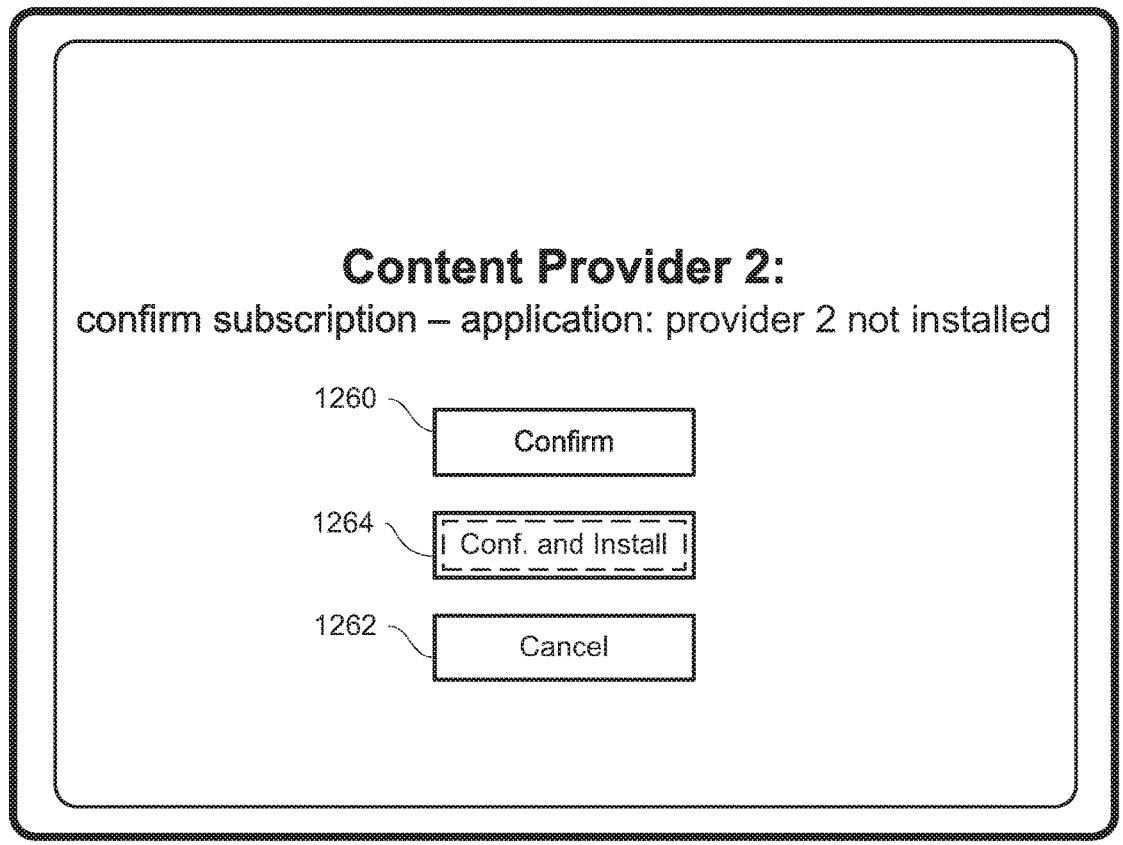
Figure 12U:
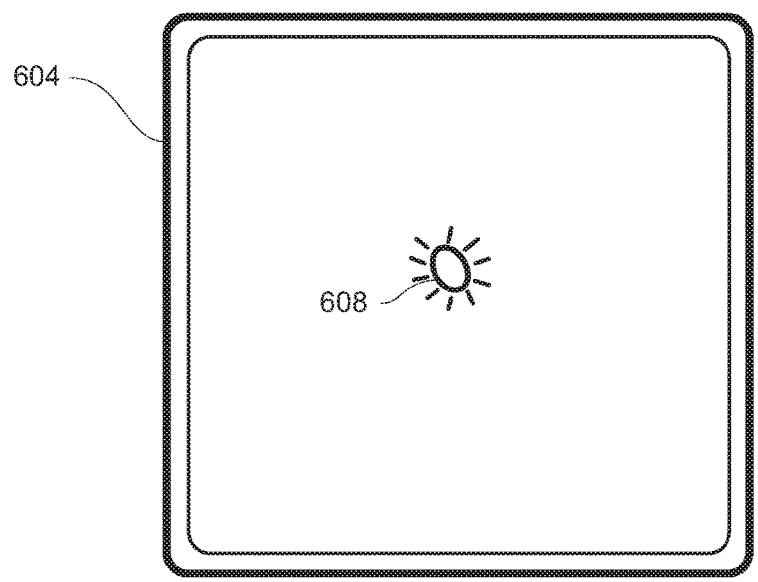
Figure 12V:
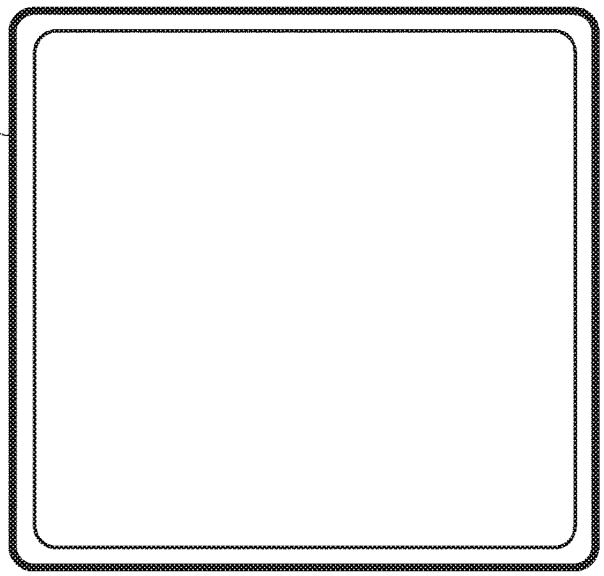
Figure 13A:
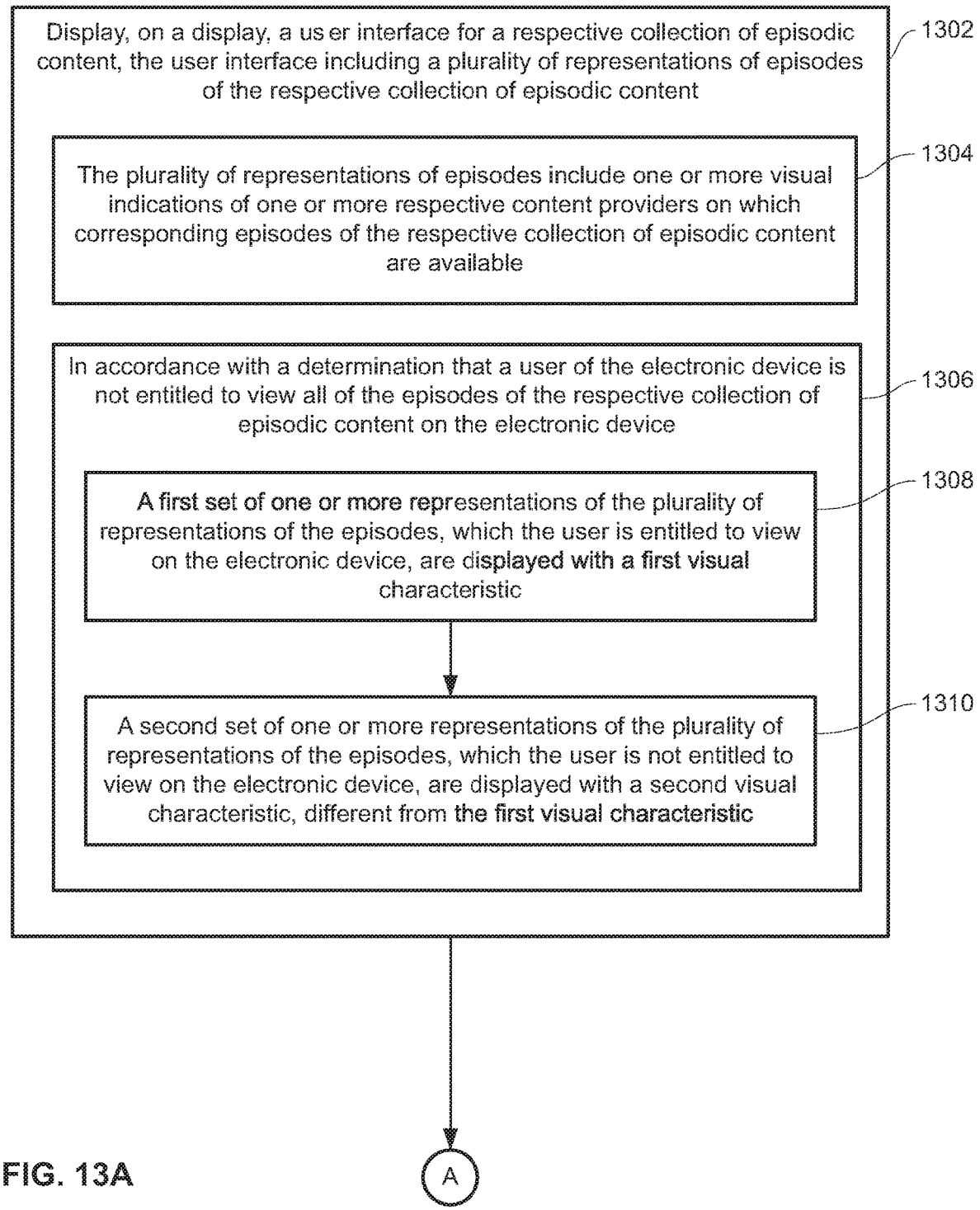
FIGS. 13A-13E are flow diagrams illustrating a method of displaying representations of episodes in a collection of episodic content in accordance with some embodiments of the disclosure.
Figure 13B:
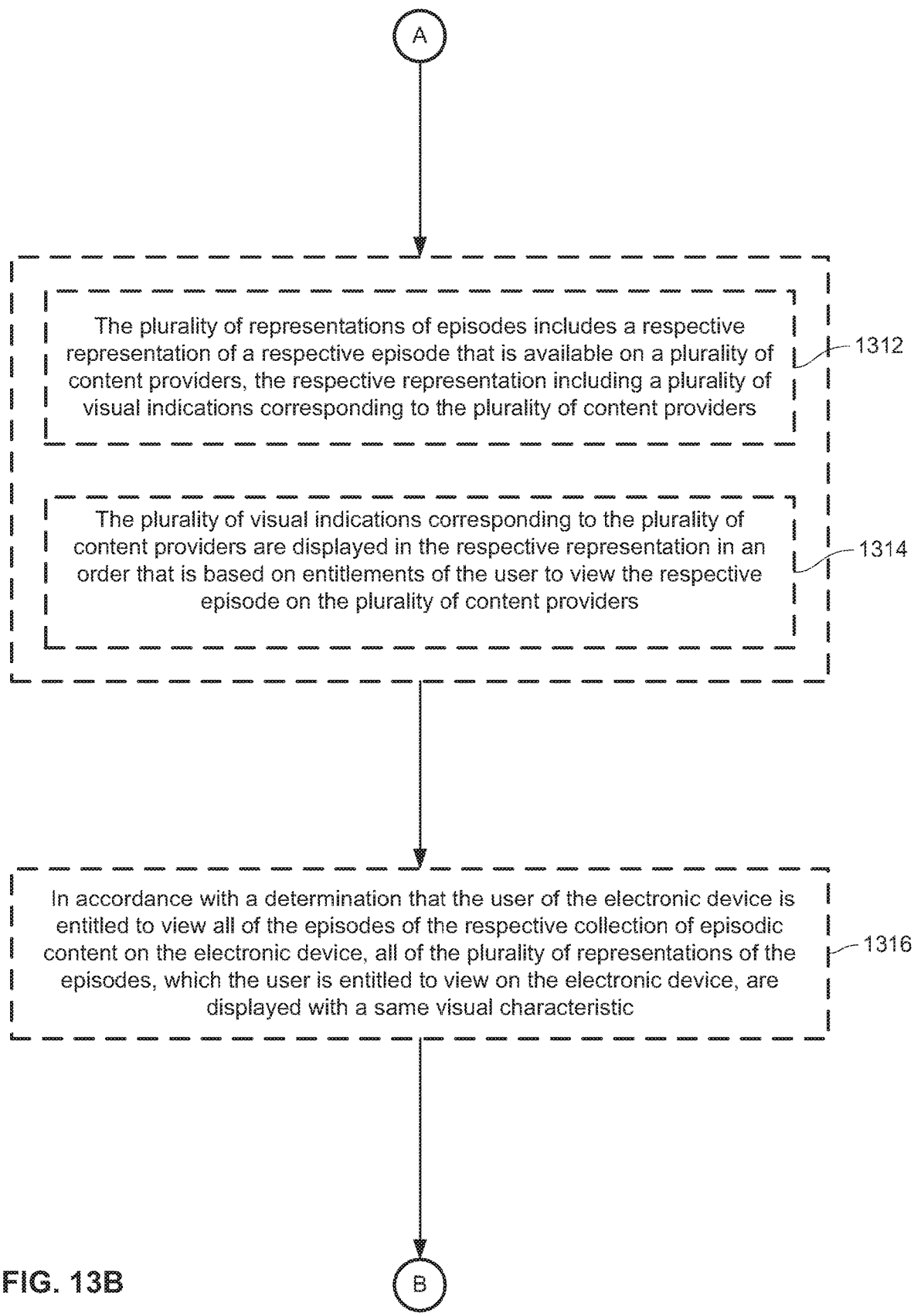
Figure 13C:
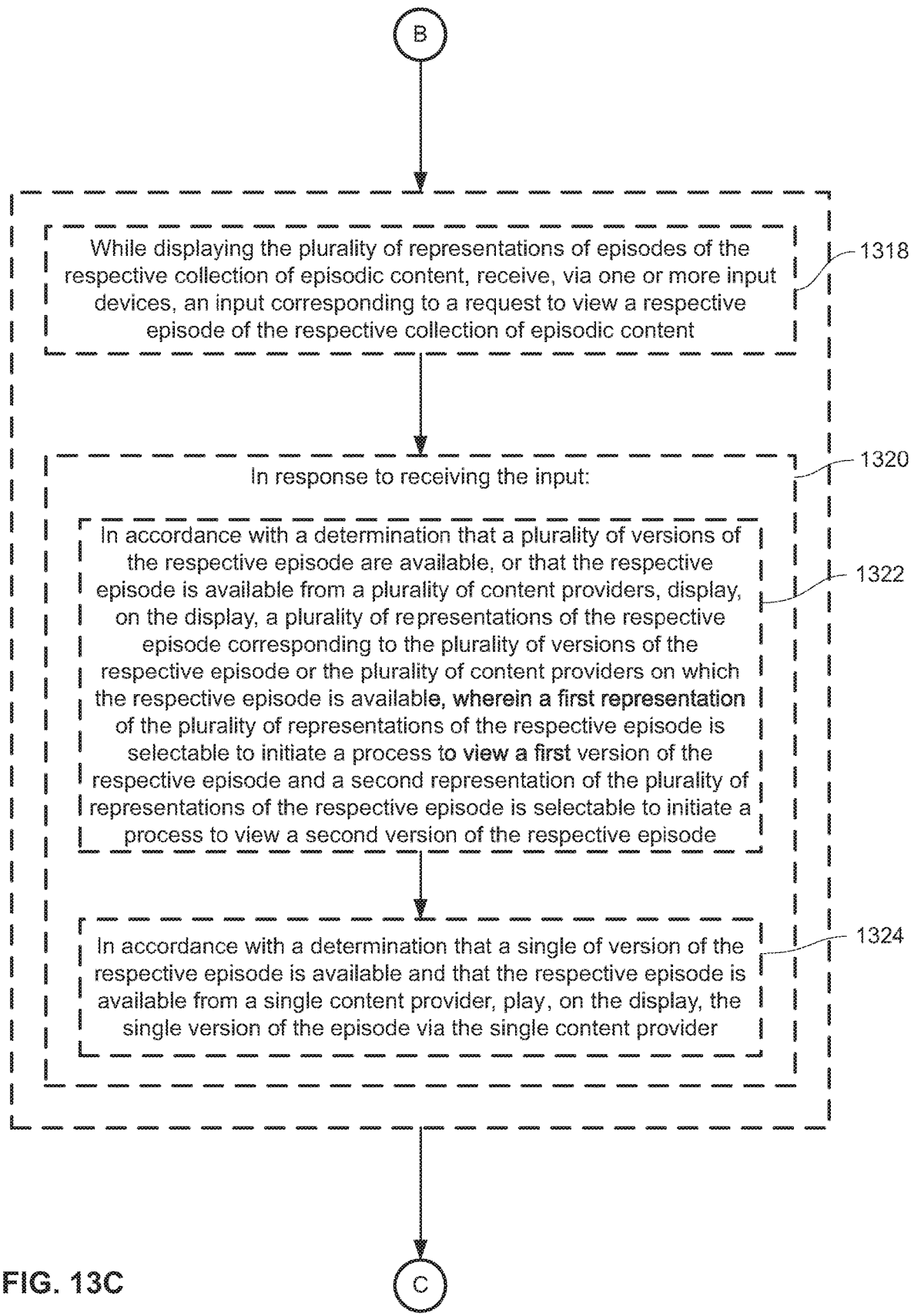
Figure 13D:
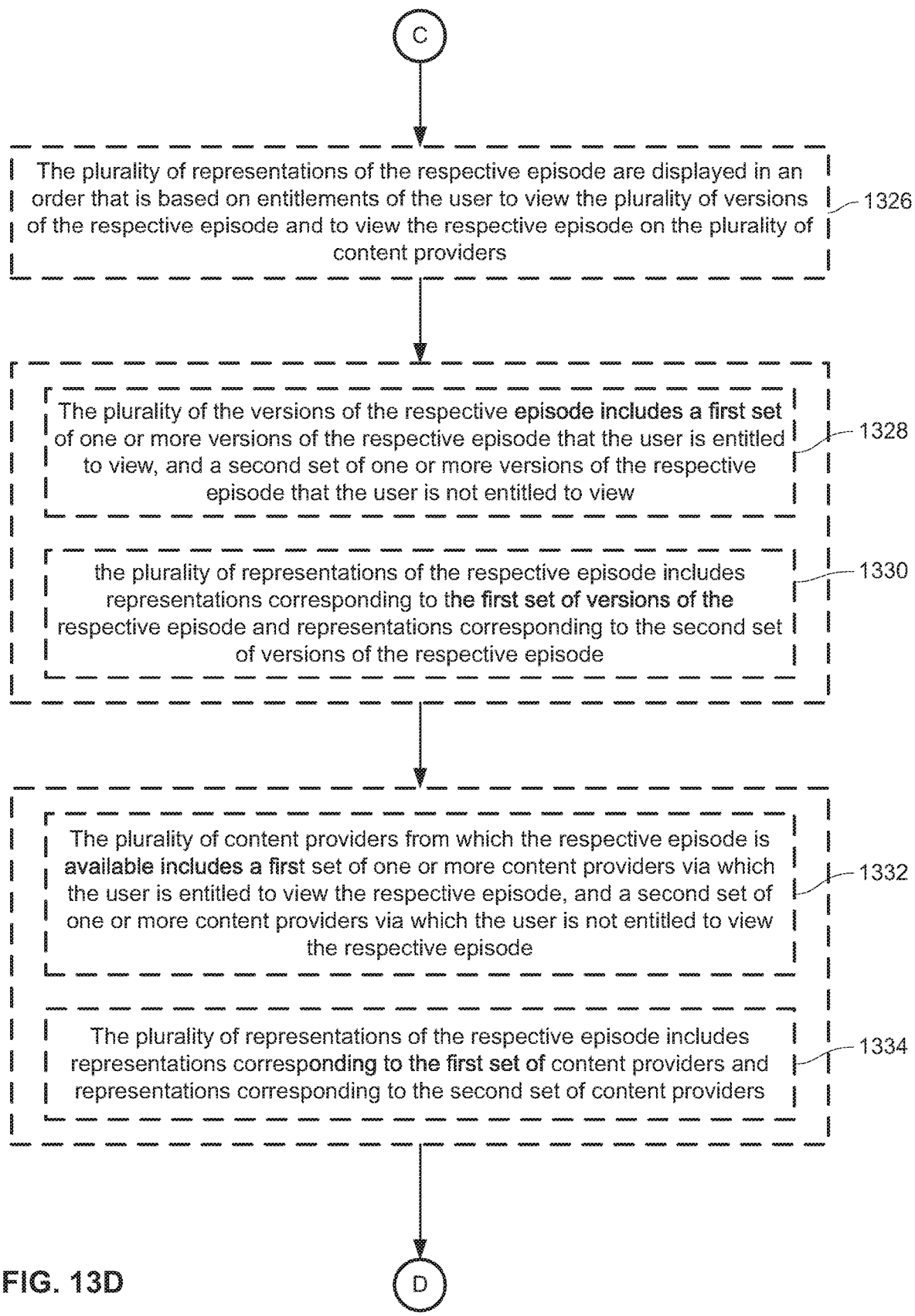
Figure 13E:
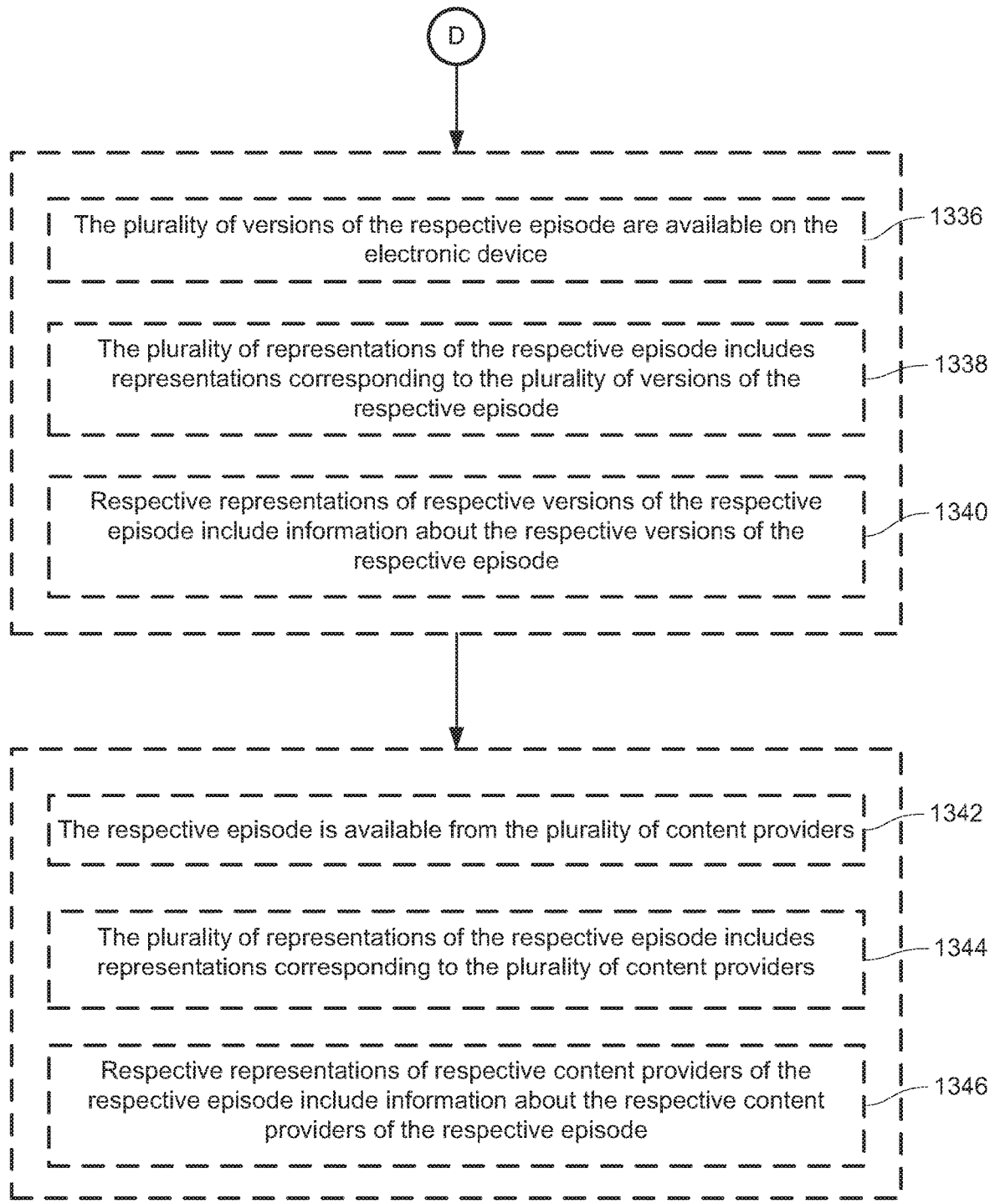

In some embodiments, when the content application for content provider 2 is not installed on the electronic device, subscription to content provider 2 and installation of the corresponding content application is streamlined into a response to a single input. For example, if the content application for content provider 2 is not installed on the electronic device, selection of button 1252 in FIG. 12Q (e.g., for subscribing to content provider 2) causes the electronic device to display, in FIG. 12U, a page via which the user is able to confirm the subscription request to content provider 2 (e.g., by selecting button 1260, as described with reference to FIG. 12R), confirm the subscription request to content provider 2 and also install the content application for content provider 2 (e.g., by selecting button 1264), or cancel the subscription request (e.g., by selecting button 1262, which optionally causes the electronic device to return to the display of FIG. 12Q). In FIG. 12U, a click of touch-sensitive surface 604 has been detected while button 1264 has the current focus. In response, and without further user input, the electronic device subscribes the user to content provider 2, downloads and/or installs the content application for content provider 2, and begins playing version B of season 2, episode 1 in the content application, as shown in FIG. 12V.

FIGS. 13A-13E are flow diagrams illustrating a method of displaying representations of episodes in a collection of episodic content in accordance with some embodiments of the disclosure. The method 1300 is optionally performed at an electronic device such as device 100, device 300, or device 500 as described above with reference to FIGS. 1A-1B, 2-3 and 5A-5B. Some operations in method 1300 are, optionally, combined and/or the order of some operations is, optionally, changed.

As described below, the method 1300 provides ways of displaying representations of episodes in a collection of episodic content. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., a set-top box, such as device 100, device 300 or device 500) in communication with a display (e.g., a television, such as display 514) and one or more input devices (e.g., a remote control, such as remote 510, or a smartphone, such as device 511), displays (1302), on the display, a user interface for a respective collection of episodic content, such as in FIG. 12A (e.g., a television show, mini-series, or the like). The user interface is optionally a dedicated canonical page for the collection of episodic content. For example, a canonical page that includes information about a television show, including information about season(s) and/or episode(s) of the television show. In some embodiments, the user interface includes a plurality of representations of episodes of the respective collection of episodic content, such as in FIG. 12A (e.g., the user interface includes a block or other representation for each of a plurality of episodes of the episodic content). Each representation optionally includes image(s) and/or video(s) from the corresponding episode, and/or textual information about the corresponding episode. The representations are optionally selectable to view or purchase the episodes of the collection of episodic content.

In some embodiments, the plurality of representations of episodes include one or more visual indications of one or more respective content providers on which corresponding episodes of the respective collection of episodic content are available (1304), such as in FIG. 12A. In some embodiments, different episodes of a television show are available via different content providers. For example, some episodes may be available via a first content provider, while other episodes may be available via a second content provider, and some episodes may be available via both. The representations of the episodes optionally include visual indications of the content provider(s) on which the episodes are available. For example, a first representation may include an icon/graphic/text indicating the first content provider, and a second representation may include an icon/graphic/text indicating the second content provider.

In accordance with a determination that a user of the electronic device is not entitled to view all of the episodes of the respective collection of episodic content on the electronic device (1306) (e.g., a user of the electronic device may have subscriptions to some content providers and not others), a first set of one or more representations of the plurality of representations of the episodes, which the user is entitled to view on the electronic device, are optionally displayed (1308), by the electronic device, with a first visual characteristic, such as in FIG. 12B. If a user does not have a subscription to any content provider via which an episode of the television series is available, the user is optionally not entitled to view that episode on the electronic device. In accordance with a determination that a user of the electronic device is not entitled to view all of the episodes of the respective collection of episodic content on the electronic device (1306), a second set of one or more representations of the plurality of representations of the episodes, which the user is not entitled to view on the electronic device, are optionally displayed (1310), by the electronic device, with a second visual characteristic, different from the first visual characteristic, such as in FIG. 12B (e.g., a badge overlay is optionally displayed on the representation of an episode that the user is not entitled to view on the electronic device). The badge overlay optionally indicates that the user can buy the episode or subscribe to a service to gain access to the episode. In some embodiments, additional or alternative visual characteristic differences are utilized to display entitled episodes differently than non-entitled episodes. Thus, in some embodiments, the user interface displays all episodes of the collection of episodic content that can be accessed from the electronic device, regardless of user entitlement to view those episodes. It is understood that in some embodiments, "a user being entitled to view a media item" refers to the electronic device being associated with an account (e.g., logged into the account) that is entitled to play the content. In this way, the electronic device displays information about the collection of episodic content that allows the user to easily determine which episodes the user is entitled to view, thus improving the efficiency of user-electronic device interactions.

In some embodiments, the plurality of representations of episodes includes a respective representation of a respective episode that is available on a plurality of content providers (e.g., the episode is available on a first content provider and a second content provider, etc.), the respective representation including a plurality of visual indications corresponding to the plurality of content providers (1312), such as in FIG. 12B (e.g., the representation includes a logo of the first content provider and the second content provider). In some embodiments, the plurality of visual indications corresponding to the plurality of content providers are displayed in the respective representation in an order that is based on entitlements of the user to view the respective episode on the plurality of content providers (1314), such as in FIG. 12B (e.g., the visual indication(s) for the content provider(s) on which the user is entitled to view the respective episode are displayed first, followed by one or more visual indications of preferred content providers that require the user to purchase or otherwise pay for accessing the episode, followed by visual indication(s) for content provider(s) on which the user is not entitled to view the episode). In this way, the electronic device displays information about the episodes of the collection of episodic content that allows the user to easily determine which content provider will provide a given episode, thus improving the efficiency of user-electronic device interactions.

In accordance with a determination that the user of the electronic device is entitled to view all of the episodes of the respective collection of episodic content on the electronic device, all of the plurality of representations of the episodes, which the user is entitled to view on the electronic device, are optionally displayed (1316), by the electronic device, with a same visual characteristic, such as in FIG. 12A (e.g., all of the representations are displayed in color (as opposed to grayscale for episodes the user is not entitled to view), or without a badge or other indication that payment or subscription is required to view the episodes). In this way, the electronic device displays information about the episodes of the collection of episodic content that allows the user to easily determine which episodes the user is entitled to view, thus improving the efficiency of user-electronic device interactions.

While displaying the plurality of representations of episodes of the respective collection of episodic content, the electronic device optionally receives (1318), via the one or more input devices, an input corresponding to a request to view a respective episode of the respective collection of episodic content, such as in FIGS. 12E and 12J (e.g., a click of a button on the input devices when a representation corresponding to the respective episode has the focus). In response to receiving the input (1320), in accordance with a determination that a plurality of versions of the respective episode are available (e.g., extended cut, standard cut, etc.), or that the respective episode is available from a plurality of content providers (e.g., available from HBO, Netflix, Showtime, etc.), the electronic device optionally displays (1322), on the display, a plurality of representations of the respective episode corresponding to the plurality of versions of the respective episode or the plurality of content providers on which the respective episode is available, such as in FIGS. 12F and 12K. In some embodiments, a first representation of the plurality of representations of the respective episode is selectable to initiate a process to view a first version of the respective episode and a second representation of the plurality of representations of the respective episode is selectable to initiate a process to view a second version of the respective episode, such as in FIGS. 12F and 12K (e.g., if the episode has multiple versions or is accessible from multiple providers, a collection of representations corresponding to the different versions/providers are displayed that are each selectable to initiate a process for viewing the episode (a specific version of the episode and/or the episode from a specific content provider)). In response to receiving the input (1320), in accordance with a determination that a single of version of the respective episode is available and that the respective episode is available from a single content provider, the electronic device optionally plays (1324), on the display, the single version of the episode via the single content provider, such as in FIG. 12D (e.g., if the episode does not have multiple versions and is not accessible from multiple providers, clicking on the representation of the episodes causes the electronic device to play the episode). In this way, the electronic device displays information about the episodes of the collection of episodic content that allows the user to easily determine which episodes the user is entitled to view, thus improving the efficiency of user-electronic device interactions.

In some embodiments, the plurality of representations of the respective episodes are displayed in an order that is based on entitlements of the user to view the plurality of versions of the respective episode and to view the respective episode on the plurality of content providers (1326), such as in FIG. 12K (e.g., the representation(s) for the content provider(s) on which the user is entitled to view the respective episode are displayed first, followed by one or more representations of preferred content providers that require the user to purchase or otherwise pay for accessing the episode, following by representation(s) for content provider(s) on which the user is not entitled to view the episode). In some embodiments, the first representation corresponds to the recommended provider for the episode. In some embodiments, the ordering of the representations corresponding to different content providers here matches the ordering of the visual indications corresponding to the different content providers that are displayed in the representations of the respective episode, described above, such as in FIGS. 12J-12K. In this way, the electronic device displays information about the content providers and/or version of the episode that allows the user to easily determine which content providers/episodes the user is entitled to access/view, thus improving the efficiency of user-electronic device interactions.

In some embodiments, the plurality of the versions of the respective episode includes a first set of one or more versions of the respective episode that the user is entitled to view, and a second set of one or more versions of the respective episode that the user is not entitled to view (1328), such as in FIG. 12K (e.g., the user does not have entitlement to view all available versions of the episode). In some embodiments, the plurality of representations of the respective episode includes representations corresponding to the first set of versions of the respective episode and representations corresponding to the second set of versions of the respective episode (1330), such as in FIG. 12K (e.g., the electronic device displays representations of all versions of the episode that are accessible from the electronic device, regardless of user entitlement to view those versions).

In some embodiments, the plurality of content providers from which the respective episode is available includes a first set of one or more content providers via which the user is entitled to view the respective episode, and a second set of one or more content providers via which the user is not entitled to view the respective episode (1332), such as in FIG. 12K (e.g., the user does not have entitlement to view the episode on all of the content providers via which the episode is available). In some embodiments, the plurality of representations of the respective episode includes representations corresponding to the first set of content providers and representations corresponding to the second set of content providers (1334), such as in FIG. 12K (e.g., the electronic device displays representations corresponding to all providers of the episode, regardless of user entitlement to view the episode via those providers).

In some embodiments, the plurality of versions of the respective episode are available on the electronic device (1336), such as in FIG. 12E. In some embodiments, the plurality of representations of the respective episode includes representations corresponding to the plurality of versions of the respective episode (1338), such as in FIG. 12F. In some embodiments, respective representations of respective versions of the respective episode include information about the respective versions of the respective episode (1340), such as in FIG. 12F (e.g., the episode has multiple versions available, and the electronic device displays a representation for each available version, each representation of a given version including information about that given version).

In some embodiments, the respective episode is available from the plurality of content providers (1342), such as in FIG. 12J. In some embodiments, the plurality of representations of the respective episode includes representations corresponding to the plurality of content providers (1344), such as in FIG. 12K. In some embodiments, respective representations of respective content providers of the respective episode include information about the respective content providers of the respective episode (1346), such as in FIG. 12K (e.g., there are multiple content providers available for the episode, and the electronic device displays a representation for each content provider, each representation of a given content provider including information about that given content provider).

It should be understood that the particular order in which the operations in FIGS. 13A-13E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100 and 1900) are also applicable in an analogous manner to method 1300 described above with respect to FIGS. 13A-13E. For example, the content items, content providers and content applications described above with reference to method 1300 optionally have one or more of the characteristics of the media items, media providers and media applications described herein with reference to other methods described herein (e.g., methods 700, 900, 1100 and 1900). For brevity, these details are not repeated here.

The operations in the information processing methods described above are, optionally, implemented by running one or more functional modules in an information processing apparatus such as general purpose processors (e.g., as described with respect to FIGS. 1A, 3, 5A and 17) or application specific chips. Further, the operations described above with reference to FIGS. 13A-13E are, optionally, implemented by components depicted in FIGS. 1A-1B. For example, displaying operation 1302 and receiving operation 1318 are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface 604 corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 14:
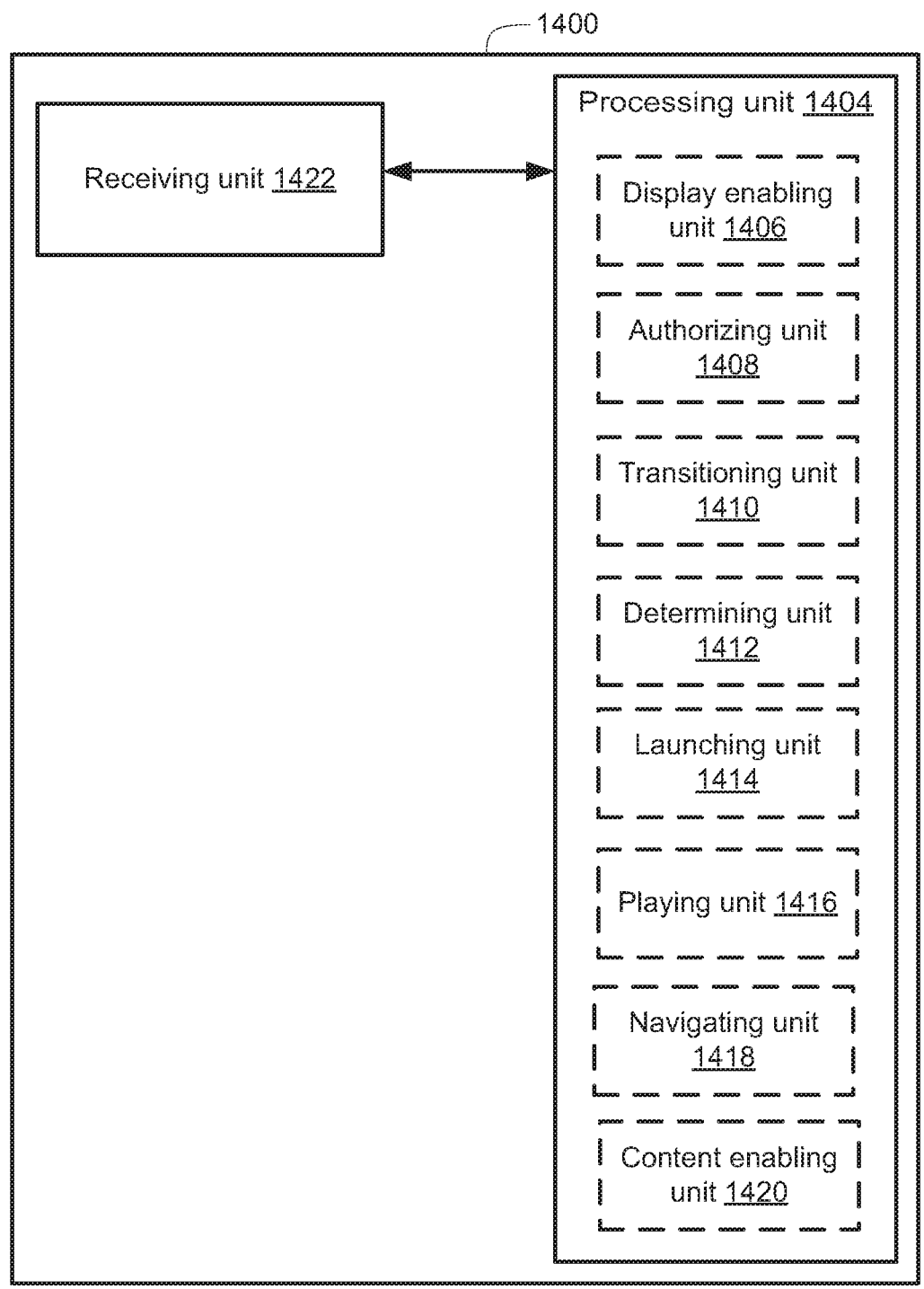
FIGS. 14-17 are functional block diagrams of electronic devices in accordance with some embodiments of the disclosure.

In accordance with some embodiments, FIG. 14 shows a functional block diagram of an electronic device 1400 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 14 are, optionally, combined or separated into sub-blocks to implement the principles of the various described embodiments. Therefore, the description herein optionally supports any possible combination or separation or further definition of the functional blocks described herein.

As shown in FIG. 14, an electronic device 1400 optionally includes a receiving unit 1422 configured to receive inputs, and a processing unit 1404 coupled to the receiving unit 1422. In some embodiments, the processing unit 1404 includes a display enabling unit 1406, an authorizing unit 1408, a transitioning unit 1410, a determining unit 1412, a launching unit 1414, a playing unit 1416, navigating unit 1418 and a content enabling unit 1420.

In some embodiments, the processing unit 1404 is configured to display (e.g., with the display enabling unit 1406), in a user interface on a display, a plurality of representations of suggested media items available on the electronic device via different media sources, the plurality of representations displayed overlaid on top of first representative content that corresponds to a representation of a first media item of the suggested media items that currently has focus. In some embodiments, the receiving unit 1422 is configured to, while displaying (e.g., with the display enabling unit 1406) the plurality of representations of suggested media items in the user interface overlaid on top of the first representative content, receive an input corresponding to a request to navigate through the plurality of representations of suggested media items. In some embodiments, the processing unit 1404 is further configured to, in response to receiving the input (e.g., with the receiving unit 1402) corresponding to the request to navigate through the plurality of representations of media items, transition (e.g., with the transitioning unit 1410) a representation of a second media item of the plurality of suggested media items to having focus instead of the first media item having focus and replace display (e.g., with the display enabling unit 1406) of the first representative content with second representative content that corresponds to the second media item.

In some embodiments, the first representative content that corresponds to the first media item includes a still image that corresponds to the first media item, and the second representative content that corresponds to the second media item includes a still image that corresponds to the second media item. In some embodiments, the first representative content that corresponds to the first media item includes a video that corresponds to the first media item and the second representative content that corresponds to the second media item includes a video that corresponds to the second media item.

In some embodiments, the receiving unit 1422 is further configured to, after receiving the input corresponding to the request to navigate through the plurality of representations of suggested media items, receive a second input corresponding to a request to navigate further through the plurality of representations of suggested media items. In some embodiments, the processing unit 1404 is further configured to, in response to receiving the second input corresponding to the request to navigate further through the plurality of representations of suggested media items, reveal (e.g., with the revealing unit 1410), in the user interface, one or more representations of trending media items available on the electronic device, wherein the representations of the trending media items were not displayed in the user interface before receiving the second input corresponding to the request to navigate further through the plurality of suggested media items.

In some embodiments, the first media item is included in the suggested media items because a user of the electronic device has selected the first media item to be included in the user interface, and the second media item is included in the suggested media items based on prior viewing activity of the user with respect to media on the electronic device. In some embodiments, the second media item is part of a collection of episodic media, the collection of episodic media includes media items available via a first content provider and a second content provider, the second media item is available via the second content provider but not via the first content provider, and the second media item was selected for inclusion in the suggested media items based on viewing activity of the user with respect to media items in the collection of episodic media that are available via the first content provider.

In some embodiments, the processing unit 1404 is further configured to, in accordance with a determination (e.g., with the determining unit 1412) that access to a respective media item of the suggested media items will be expiring within a predetermined time period, prioritize display of a representation of the respective media item in the representations of the suggested media items based on the upcoming expiration of the access to the respective media item.

In some embodiments, the processing unit 1404 is further configured to, in accordance with a determination (e.g., with the determining unit 1412) that a respective media item of the suggested media items is a new episode in a collection of episodic media that a user of the electronic device has been watching, and that the user has not yet watched the new episode, prioritize display (e.g., with the display enabling unit 1406) of a representation of the respective media item in the representations of the suggested media items based on the recency of the user's entitlement to access the respective media item.

In some embodiments, in accordance with a determination (e.g., with the determining unit 1412) that a user of the electronic device has partially watched the first media item, the first representative content that corresponds to the first media item includes a visual indicator of a playback progress for the first media item, and in accordance with a determination (e.g., with the determining unit 1412) that the user of the electronic device has partially watched the second media item, the second representative content that corresponds to the second media item includes a visual indicator of a playback progress for the second media item.

In some embodiments, the first representative content that corresponds to the first media item includes information indicating why the first media item is included in the suggested media items, and the second representative content that corresponds to the second media item includes information indicating why the second media item is included in the suggested media items. In some embodiments, the first representative content that corresponds to the first media item includes information indicating a source of the first media item, and the second representative content that corresponds to the second media item includes information indicating a source of the second media item.

In some embodiments, the receiving unit 1422 is further configured to receive an input corresponding to a selection of a respective representation of a respective media item of the suggested media items. In some embodiments, the processing unit 1404 is further configured to, in response receiving the input corresponding to the selection of the respective representation of the respective media item, launch (e.g., with the launching unit 1414) a media application corresponding to the respective media item on the electronic device, and cause playback (e.g., with the playing unit 1416), on the display, of the respective media item in the media application corresponding to the respective media item.

In some embodiments, the input corresponding to the request to navigate through the plurality of suggested media items corresponds to a request to navigate through the plurality of suggested media items in a first direction. In some embodiments, the receiving unit 1422 is further configured to receive a second input corresponding to a request to navigate further through the plurality of suggested media items in a second direction, different from the first direction, the processing unit 1404 is further configured to, in response to receiving the second input corresponding to the request to navigate further through the plurality of suggested media items, reveal (e.g., with the display enabling unit 1406), in the user interface, one or more representations of additional suggested media items available on the electronic device, wherein the representations of the additional suggested media items were not displayed in the user interface prior to receiving the second input. In some embodiments, the receiving unit 1422 is further configured to receive an input corresponding to a selection of a second respective representation of a second respective media item of the additional suggested media items, and the processing unit (1404) is further configured to, in response receiving the input corresponding to the selection of the second respective representation of the second respective media item, display (e.g., with the display enabling unit 1406), on the display, a media information page corresponding to the second respective media item.

In some embodiments, the receiving unit 1422 is further configured to, while the media application corresponding to the respective media item is displayed on the display, receive, via the one or more input devices, an input corresponding to a request to navigate backward on the electronic device and the processing unit 1404 is further configured to, in response to receiving the input corresponding to the request to navigate backward on the electronic device, navigate (e.g., with the navigating unit 1418) backward within the media application in accordance with the input.

In some embodiments, a respective suggested media item is included in the suggested media items based on prior user action that occurred on a second electronic device, different from the electronic device, and no media application via which the respective suggested media item is available is installed on the electronic device.

In some embodiments, the receiving unit 1422 is further configured to receive an input corresponding to a selection of a respective representation of the respective suggested media item, and the processing unit 1404 is further configured to, in response to receiving the input corresponding to the selection of the respective representation of the respective suggested media item, display (e.g., with the display enabling unit 1406), on the display, a prompt to install the respective media application on the electronic device. In some embodiments, the receiving unit 1422 is further configured to receive a sequence of inputs corresponding to inputs to install the respective media application on the electronic device and authorize the respective media application on the electronic device, and the processing unit 1404 is further configured to, upon installing and authorizing (e.g., with the authorizing unit 1408) the respective media application on the electronic device, without further user intervention, start playback (e.g., with the playing unit 1416) of the respective media item on the display.

In some embodiments, the receiving unit 1422 is further configured to receive an input corresponding to a first action with respect to a respective media item not included in the suggested media items, and the processing unit 1404 is further configured to, after receiving the input corresponding to the first action with respect to the respective media item, display (e.g., with the display enabling unit 1406), on the display, the user interface including the plurality of representations of the suggested media items, the plurality of representations of the suggested media items including a representation of the respective media item.

In some embodiments, the receiving unit is further configured to, while displaying (e.g., with the display enabling unit 1406) the user interface on the display, receive an input enabling a private media browsing mode on the electronic device. In some embodiments, the processing unit 1404 is further configured to, in response to receiving the input enabling the private media browsing mode on the electronic device, enable (e.g., with the content enabling unit 1420) the private media browsing mode on the electronic device, and replace the plurality of representations (e.g., with the display enabling unit 1406) of the suggested media items in the user interface with a second plurality of representations of second suggested media items that are not selected for inclusion in the user interface based on prior user actions associated with those media items.

In some embodiments, the receiving unit 1422 is further configured to, while the private media browsing mode is enabled on the electronic device, receive a second input corresponding to the first action with respect to a second respective media item not included in the suggested media items, and after receiving the second input, receiving, via the one or more input devices, an input disabling the private media browsing mode on the electronic device. In some embodiments, the processing unit 1404 is further configured to, in response to receiving the input disabling the private media browsing mode on the electronic device, disable (e.g., with the content enabling unit 1420) the private media browsing mode on the electronic device, and redisplay (e.g., with the display enabling unit 1406) the plurality of representations of the suggested media items in the user interface, the plurality of representations of the suggested media items not including a representation of the second respective media item.

In some embodiments, the receiving unit 1422 is further configured to, while the private media browsing mode is enabled on the electronic device, receive an input disabling the private media browsing mode on the electronic device. In some embodiments, the processing unit 1404 is further configured to: in response to receiving the input disabling the private media browsing mode on the electronic device, disable (e.g., with the content enabling unit 1420) the private media browsing mode on the electronic device, and redisplay (e.g., with the display enabling unit 1406) the plurality of representations of the suggested media items in the user interface.

Figure 15:
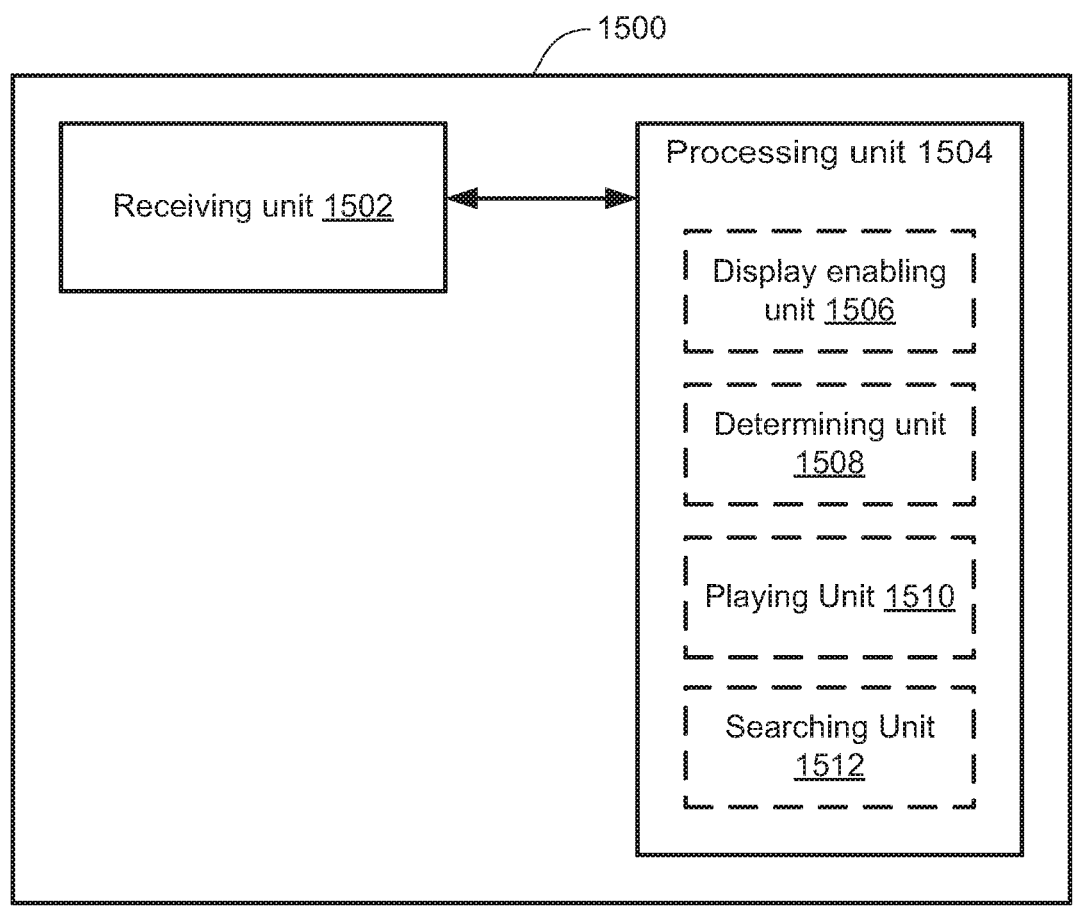

In accordance with some embodiments, FIG. 15 shows a functional block diagram of an electronic device 1500 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 15 are, optionally, combined or separated into sub-blocks to implement the principles of the various described embodiments. Therefore, the description herein optionally supports any possible combination or separation or further definition of the functional blocks described herein.

As shown in FIG. 15, an electronic device 1500 optionally includes a receiving unit 1502 configured to receive inputs and a processing unit 1504 coupled to the receiving unit 1502. In some embodiments, the processing unit 1504 includes a display enabling unit 1506, a determining unit 1508, a playing unit 1510, and a searching unit 1512.

In some embodiments, the receiving unit 1502 is configured to receive a request to display, on a display, suggested media items for a user of the electronic device 1500. In some embodiments, the processing unit 1504 is configured to, in response to receiving the request to display the suggested media items (e.g., with the receiving unit 1502), display (e.g., with the display enabling unit 1506), in a media navigation user interface on the display, a first plurality of representations of suggested media items. In some embodiments, the receiving unit 1502 is further configured to, while displaying the first plurality of representations of suggested media items, receive a navigation input corresponding to a request to scroll through the first plurality of representations of suggested media items. In some embodiments, the processing unit 1504 is further configured to, in response to receiving the navigation input (e.g., with the receiving unit 1502), scroll (e.g., with the display enabling unit 1506) through the first plurality of representations of suggested media items to reveal, in the media navigation user interface, a plurality of media-category user interface elements corresponding to categories of media of suggested media. In some embodiments, prior to receiving the navigation input (e.g., with the receiving unit 1502), the plurality of representations of media items were displayed (e.g., with the display enabling unit 1506) without displaying the media-category user interface elements. In some embodiments, the receiving unit 1502 is further configured to, while displaying the media-category user interface elements, receive an input selecting a respective media-category user interface element of the plurality of media-category user interface elements. In some embodiments, the respective media-category user interface element corresponds to a respective category of media of the categories of media. In some embodiments, the processing unit 1504 is further configured to, in response to receiving the input selecting the respective user interface element (e.g., with the receiving unit 1502), replace (e.g., with the display enabling unit 1506), in the media navigation user interface, the first plurality of representations of suggested media items. In some embodiments, the media-category user interface elements with a second plurality of representations of suggested media items corresponds to suggested media items in the respective category of media.

In some embodiments, the suggested media items in the respective category of media are not included in the suggested media items. In some embodiments, the suggested media items include media items that the user of the electronic device 1500 is entitled to access on the electronic device, and excludes media items that the user of the electronic device is not entitled to access on the electronic device.

In some embodiments, the receiving unit 1502 is further configured to, while displaying the media-category user interface elements, receive a second navigation input corresponding to a request to scroll past the media-category user interface elements. In some embodiments, the processing unit 1504 is further configured to, in response to receiving the second navigation input (e.g., with the receiving unit 1502), scroll past the media-category user interface elements (e.g., with the display enabling unit 1506) to reveal, in the media navigation user interface, a third plurality of representations of suggested media items, different from the first and second pluralities of suggested media items.

In some embodiments, in accordance with a determination (e.g., with the determining unit 1508) that a given category of media of the suggested media includes greater than a threshold number of media items, a media-category user interface element corresponding to the given category of media is included in the plurality of media-category user interface elements, and representations of the media items included in the given category of media of the suggested media are not displayed (e.g., with the display enabling unit 1506) in the media navigation user interface. In some embodiments, in accordance with a determination (e.g., with the determining unit 1508) that the given category of media of the suggested media includes fewer than the threshold number of media items, the media-category user interface element corresponding to the given category of media is not included in the plurality of media-category user interface elements, and the representations of the media items included in the given category of media of the suggested media are displayed (e.g., with the display enabling unit 1506) in the media navigation user interface.

In some embodiments, the receiving unit 1502 is further configured to receive an input selecting a respective representation of a respective media item of the first or second pluralities of representations of suggested media items. In some embodiments, the processing unit 1504 is further configured to, in response to receiving the input selecting the respective representation of the respective media item (e.g., with the receiving unit 1502), display (e.g., with the display enabling unit 1506), on the display, a page corresponding to the respective media item that includes information about the respective media item and a selectable affordance that, when selected, plays the respective media item on the electronic device 1500. In some embodiments, the receiving unit 1502 is further configured to receive a selection of the selectable affordance. In some embodiments, the processing unit 1504 is further configured to, in response to receiving the selection of the selectable affordance (e.g., with the receiving unit 1502), play (e.g., with the playing unit 1510), on the display, the respective media item on the electronic device 1500.

In some embodiments, the first plurality of representations of suggested media items includes representations of suggested media items that are displayed (e.g., with the display enabling unit 1506) in respective regions of the media navigation user interface that correspond to respective media categories of suggested media.

In some embodiments, the receiving unit 1502 is further configured to, while displaying, in the media navigation user interface, the second plurality of representations of suggested media items corresponding to the suggested media items in the respective category of media, receive a second navigation input corresponding to a request to scroll through the second plurality of representations of suggested media items. In some embodiments, the processing 1504 unit is further configured to, in response to receiving the second navigation input (e.g., with the receiving unit 1502), scroll through the second plurality of representations of suggested media items (e.g., with the display enabling unit 1506) to reveal, in the media navigation user interface, a second plurality of media-category user interface elements corresponding to sub-categories of media of the respective category of media. In some embodiments, prior to receiving the second navigation input (e.g., with the receiving unit 1502), the second plurality of representations of suggested media items were displayed (e.g., with the display enabling unit 1506) without displaying the second plurality of media-category user interface elements.

In some embodiments, in accordance with a determination (e.g., with the determining unit 1508) that media restrictions are in effect on the electronic device 1500, the suggested media items corresponding to the first and second pluralities of representations of suggested media items exclude media items that are restricted by the media restrictions. In some embodiments, the receiving unit 1502 is further configured to, while the media restrictions are in effect on the electronic device, receive input corresponding to a request to perform a search across media items accessible by the electronic device 1500. In some embodiments, the processing unit 1504 is further configured to, in response to receiving the input corresponding to the request to search across the media items accessible by the electronic device (e.g., with the receiving unit 1502), search (e.g., with the searching unit 1512) the media items accessible by the electronic device 1500, including the media items that are restricted by the media restrictions. In some embodiments, searching the media items accessible by the electronic device 1500 comprises searching (e.g., with the searching unit 1512) media items that the user of the electronic device is entitled to access on the electronic device without searching media items that the user of the electronic device is not entitled to access on the electronic device.

In some embodiments, the receiving unit 1502 is further configured to, while the media restrictions are in effect on the electronic device 1500, receive an input corresponding to a request to play a search-result media item resulting from the searching of the media items. In some embodiments, the search-result media item is restricted by the media restrictions on the electronic device 1500. In some embodiments, the processing unit 1504 is further configured to, in response to receiving the request to play the search-result media item (e.g., with the receiving unit 1502), display (e.g., with the display enabling unit 1506), on the display, a visual indication that the search-result media item is restricted by the media restrictions on the electronic device 1500 without playing the search-result media item on the electronic device.

In some embodiments, the media navigation user interface further includes a library user interface element that corresponds to a media library. In some embodiments, the media library includes media items that the user of the electronic device 1500 has selected for inclusion in the media library. In some embodiments, the receiving unit 1502 is further configured to receive an input selecting the library user interface element. In some embodiments, the processing unit 1504 is further configured to, in response to receiving the input selecting the library user interface element (e.g., with the receiving unit 1502), replace (e.g., with the display enabling unit 1506), in the media navigation user interface, the representations of the suggested media items with a plurality of representations of the media items that the user of the electronic device 1500 has selected for inclusion in the media library.

In some embodiments, the media navigation user interface further includes a store user interface element that corresponds to media applications that provide media that the user of the electronic device 1500 is not entitled to view. In some embodiments, the receiving unit 1502 is further configured to receive an input selecting the store user interface element. In some embodiments, the processing unit 1504 is further configured to, in response to receiving the input selecting the store user interface element (e.g., with the receiving unit 1502), replace (e.g., with the display enabling unit 1506), in the media navigation user interface, the representations of the suggested media items with a plurality of representations of the media applications that provide the media that the user of the electronic device 1500 is not entitled to view. In some embodiments, the plurality of representations of the media applications are displayed (e.g., with the display enabling unit 1506) without displaying representations of media applications through which the user of the electronic device 1500 is entitled to access media. In some embodiments, the representations of the media applications include one or more representations corresponding to media subscriptions available to the user of the electronic device 1500. In some embodiments, respective representations corresponding to respective media subscriptions available to the user include respective visual indications of media that would become accessible to the user via the corresponding media subscription.

In some embodiments, the user of the electronic device 1500 has a subscription with a media provider that gives the user access to media via a plurality of media applications including a first set of media applications that are not installed on the electronic device. In some embodiments, the plurality of representations of the media applications are displayed (e.g., with the display enabling unit 1506) without displaying representations of media applications in the first set of media applications. In some embodiments, a plurality of respective-provider media applications that provide access to media items from a respective media provider, including a first media application that provides access to the media items from the respective media provider, and a second media application that provides access to the media items from the respective media provider. In some embodiments, the first media application is installed on the electronic device 1500 and the user of the electronic device has a subscription to the first media application to provide access to the media items from the respective media provider. In some embodiments, the second media application is not installed on the electronic device 1500. In some embodiments, the plurality of representations of the media applications are displayed (e.g., with the display enabling unit 1506) without displaying the second media application.

In some embodiments, the media navigation user interface further includes a search user interface element for searching media accessible by the electronic device 1500. In some embodiments, the receiving unit 1502 is further configured to receive an input selecting the search user interface element. In some embodiments, the processing unit 1504 is further configured to, in response to receiving the input selecting the search user interface element (e.g., with the receiving unit 1502), replace (e.g., with the display enabling unit 1506), in the media navigation user interface, the representations of the suggested media items with a search interface for searching the media accessible by the electronic device 1500, the search interface including a user-configurable option to search media accessible by the electronic device, or only media accessible by the electronic device that the user of the electronic device is entitled to access.

Figure 16:
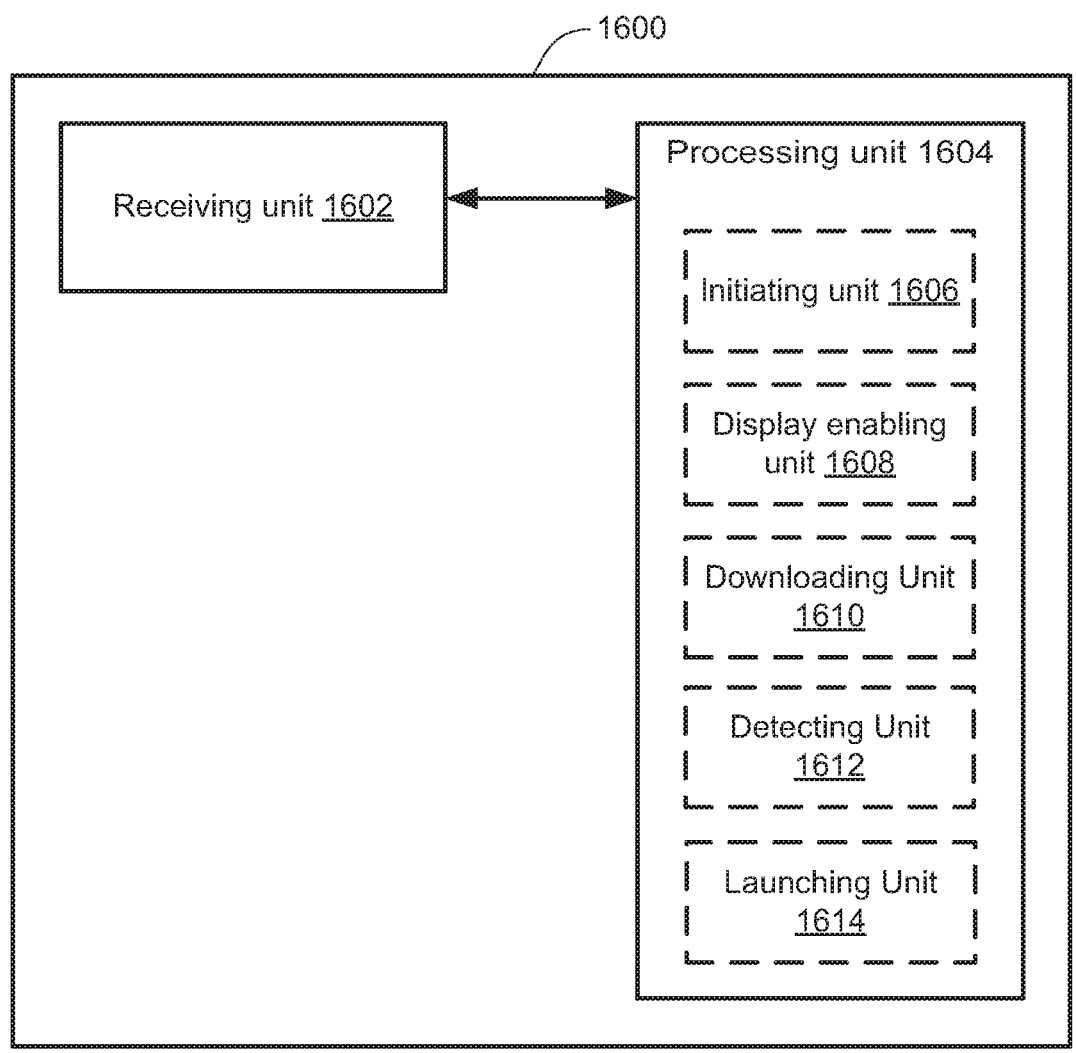

In accordance with some embodiments, FIG. 16 shows a functional block diagram of an electronic device 1600 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 16 are, optionally, combined or separated into sub-blocks to implement the principles of the various described embodiments. Therefore, the description herein optionally supports any possible combination or separation or further definition of the functional blocks described herein.

As shown in FIG. 16, an electronic device 1600 optionally includes a receiving unit 1602 configured to receive inputs and a processing unit 1604 coupled to the receiving unit 1602. In some embodiments, the processing unit 1604 includes a initiating unit 1606, a display enabling unit 1608, a downloading unit 1610, a detecting unit 1612 and a launching unit 1614.

In some embodiments, the receiving unit 1602 is configured to receive an input corresponding to a request to set up a unified media browsing application to browse media corresponding to a plurality of applications that provide access to media from a plurality of media providers, including a first application that provides access to first media from a first media provider and a second application that provides access to second media from a second media provider. In some embodiments, the processing unit 1604 is configured to, in response to receiving (e.g., with the receiving unit 1602) the input corresponding to the request to set up the unified media browsing application to browse media corresponding to the plurality of applications that provide access to media from the plurality of media providers, initiate (e.g., with the initiating unit 1606) a process for allowing media accessible via the plurality of applications on the electronic device 1600 to be browsed in the unified media browsing application. In some embodiments, the unified media browsing application is different from the plurality of applications via which the media is accessible. In some embodiments, initiating (e.g., with the initiating unit 1606) the process for allowing the media to be browsed in the unified media browsing application includes concurrently displaying (e.g., with the display enabling unit 1608), on a display: a representation of the first media provider, a representation of the second media provider, and a selectable affordance. In some embodiments, the selectable affordance, when selected, provides authorization (e.g., with the initiating unit 1606) for the plurality of media providers to share user-specific information with the unified media browsing application, including: user-specific information from the first media provider that corresponds to user actions with respect to media available via the first application and user-specific information from the second media provider that corresponds to user actions with respect to media available via the second application. In some embodiments, the plurality of representations of applications correspond to applications that are associated with a user account of the user on the electronic device 1600. In some embodiments, the plurality of representations of applications correspond to applications that are downloaded (e.g., with the downloading unit 1610) on the electronic device 1600 and that the user is logged into.

In some embodiments, before initiating (e.g., with the initiating unit 1606) the process for allowing the media accessible via the plurality of applications on the electronic device 1600 to be browsed in the unified media browsing application, the unified media browsing application displays (e.g., with the display enabling unit 1608), on the display, informational items relating to the unified media browsing application. In some embodiments, after the user has selected the affordance that provides authorization for the plurality of media providers to share the user-specific information with the unified media browsing application, the unified media browsing application displays (e.g., with the display enabling unit 1608), on the display, representations of media items accessible from the plurality of applications.

In some embodiments, in response to detecting selection of the affordance that provides the authorization (e.g., with the initiating unit 1606) for the plurality of media providers to share the user-specific information with the unified media browsing application, the unified media browsing application displays (e.g., with the display enabling unit 1608), on the display, trending media items. In some embodiments, the processing unit 1604 is further configured to: after detecting the selection of the affordance that provides the authorization (e.g., with the initiating unit 1606) for the plurality of media providers to share the user-specific information with the unified media browsing application, detect (e.g., with the detecting unit 1612) one or more user actions that cause additional media items to be included in the unified media browsing application. In some embodiments, in response to detecting the one or more user actions (e.g., with the detecting unit 1612), the processing unit 1604 replaces display (e.g., with the display enabling unit 1608), in the unified media browsing application, of the representations of the trending media items with representations of the additional media items.

In some embodiments, the input corresponding to the request to set up the unified media browsing application is selection of a button displayed in a user interface of the unified media browsing application. In some embodiments, the representation of the first media provider and the representation of the second media provider are displayed (e.g., with the display enabling unit 1608) in a row of representations of the plurality of media providers.

In some embodiments, the receiving unit 1602 is further configured to receive an input selecting the selectable affordance that provides the authorization for the plurality of media providers to share the user-specific information with the unified media browsing application. In some embodiments, the processing unit 1604 is further configured to, in response to receiving the input selecting the selectable affordance (e.g., with the receiving unit 1602), display (e.g., with the display enabling unit 1608), on the display, the unified media browsing application including representations of media items accessible from the plurality of applications.

In some embodiments, the processing unit 1604 is further configured to: after detecting selection of the affordance that provides the authorization (e.g., with the initiating unit 1606) for the plurality of media providers to share the user-specific information with the unified media browsing application, download (e.g., with the downloading unit 1610), on the electronic device 1600, a respective application that provides access to media from a respective media provider. In some embodiments, after downloading (e.g., with the downloading unit 1610) the respective application, the processing unit 1604 is configured to launch (e.g., with the launching unit 1614) the unified media browsing application or the respective application on the electronic device. In some embodiments, in response to launching (e.g., with the launching unit 1614) the unified media browsing application or the respective application on the electronic device 1600, the processing unit 1604 is configured to display (e.g., with the display enabling unit 1608), on the display, a selectable affordance. In some embodiments, the selectable affordance, when selected, provides authorization (e.g., with the initiating unit 1606) for the respective media provider to share user-specific information with the unified media browsing application, including user-specific information from the respective media provider that corresponds to user actions with respect to media available via the respective application.

In some embodiments, the processing unit 1604 is further configured to: display (e.g., with the display enabling unit 1608), on the display, an application-browsing user interface that includes a plurality of selectable representations of a plurality of applications on the electronic device 1600. In some embodiments, the selectable representations are selectable to open corresponding applications on the electronic device 1600. In some embodiments, the selectable representations include a selectable representation of the unified media browsing application that is selectable to open the unified media browsing application on the electronic device 1600. In some embodiments, when the selectable representation of the unified media browsing application has focus, the processing unit is configured to display (e.g., with the display enabling unit 1608), in the application-browsing user interface, one or more user interface elements corresponding to the unified media browsing application. In some embodiments, the user interface elements corresponding to the unified media browsing application were not displayed (e.g., with the display enabling unit 1608) before the selectable representation of the unified media browsing application had the focus. In some embodiments, before initiating (e.g., with the initiating unit 1606) the process for allowing the media accessible via the plurality of applications on the electronic device 1600 to be browsed in the unified media browsing application, the user interface elements corresponding to the unified media browsing application are informational items relating to the unified media browsing application. In some embodiments, after the user has selected the affordance that provides authorization (e.g., with the initiating unit 1606) for the plurality of media providers to share the user-specific information with the unified media browsing application, the user interface elements corresponding to the unified media browsing application are representations of media items accessible from the plurality of applications.

In some embodiments, the processing unit is configured to display (e.g., with the display enabling unit 1608), on the display, a settings user interface for individually providing authorization for the plurality of media providers to share corresponding user-specific information with the unified media browsing application. In some examples, the settings user interface includes a first toggle to authorize the first media provider to share the user-specific information from the first media provider that corresponds to the user actions with respect to the media available via the first application. In some embodiments, the settings user interface includes a second toggle to authorize the second media provider to share the user-specific information from the second media provider that corresponds to the user actions with respect to the media available via the second application.

Figure 17:
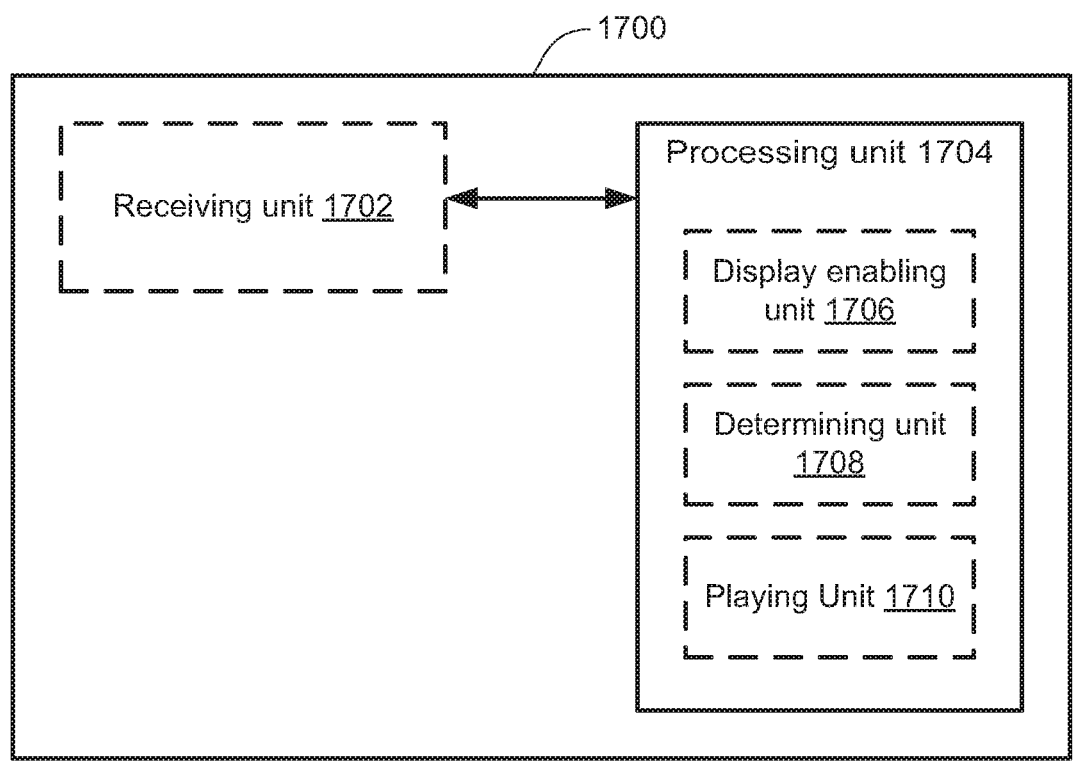

In accordance with some embodiments, FIG. 17 shows a functional block diagram of an electronic device 1700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 17 are, optionally, combined or separated into sub-blocks to implement the principles of the various described embodiments. Therefore, the description herein optionally supports any possible combination or separation or further definition of the functional blocks described herein.

As shown in FIG. 17, an electronic device 1700 optionally includes a receiving unit 1702 configured to receive inputs and a processing unit 1704 coupled to the receiving unit 1702. In some embodiments, the processing unit 1704 includes a display enabling unit 1706, a determining unit 1708 and a playing unit 1710.

In some embodiments, the processing unit 1704 is configured to display (e.g., with the display enabling unit 1706), on a display, a user interface for a respective collection of episodic content, the user interface including a plurality of representations of episodes of the respective collection of episodic content. In some embodiments, the plurality of representations of episodes include one or more visual indications of one or more respective content providers on which corresponding episodes of the respective collection of episodic content are available, and in accordance with a determination (e.g., with the determining unit 1708) that a user of the electronic device is not entitled to view all of the episodes of the respective collection of episodic content on the electronic device: a first set of one or more representations of the plurality of representations of the episodes, which the user is entitled to view on the electronic device, are displayed with a first visual characteristic, and a second set of one or more representations of the plurality of representations of the episodes, which the user is not entitled to view on the electronic device, are displayed with a second visual characteristic, different from the first visual characteristic.

In some embodiments, the plurality of representations of episodes includes a respective representation of a respective episode that is available on a plurality of content providers, the respective representation including a plurality of visual indications corresponding to the plurality of content providers, and the plurality of visual indications corresponding to the plurality of content providers are displayed in the respective representation in an order that is based on entitlements of the user to view the respective episode on the plurality of content providers. In some embodiments, wherein in accordance with a determination (e.g., with the determining unit 1706) that the user of the electronic device is entitled to view all of the episodes of the respective collection of episodic content on the electronic device, all of the plurality of representations of the episodes, which the user is entitled to view on the electronic device, are displayed with a same visual characteristic.

In some embodiments, the receiving unit 1702 is coupled to the processing unit 1704 and is configured to, while displaying (e.g., with the display enabling unit 1706) the plurality of representations of episodes of the respective collection of episodic content, receive (e.g., with the receiving unit 1702) an input corresponding to a request to view a respective episode of the respective collection of episodic content. In some embodiments, the processing unit 1704 is further configured to, in response to receiving the input: in accordance with a determination (e.g., with the determining unit 1708) that a plurality of versions of the respective episode are available, or that the respective episode is available from a plurality of content providers, display (e.g., with the display enabling unit 1706), on the display, a plurality of representations of the respective episode corresponding to the plurality of versions of the respective episode or the plurality of content providers on which the respective episode is available, wherein a first representation of the plurality of representations of the respective episode is selectable to initiate a process to view a first version of the respective episode and a second representation of the plurality of representations of the respective episode is selectable to initiate a process to view a second version of the respective episode. In some embodiments, in accordance with a determination (e.g., with the determining unit 1708) that a single of version of the respective episode is available and that the respective episode is available from a single content provider, play (e.g., with the playing unit 1710), on the display, the single version of the episode via the single content provider.

In some embodiments, the plurality of representations of the respective episode are displayed (e.g., with the display enabling unit 1706) in an order that is based on entitlements of the user to view the plurality of versions of the respective episode and to view the respective episode on the plurality of content providers. In some embodiments, the plurality of the versions of the respective episode includes a first set of one or more versions of the respective episode that the user is entitled to view, and a second set of one or more versions of the respective episode that the user is not entitled to view, and the plurality of representations of the respective episode includes representations corresponding to the first set of versions of the respective episode and representations corresponding to the second set of versions of the respective episode. In some embodiments, the plurality of content providers from which the respective episode is available includes a first set of one or more content providers via which the user is entitled to view the respective episode, and a second set of one or more content providers via which the user is not entitled to view the respective episode, and the plurality of representations of the respective episode includes representations corresponding to the first set of content providers and representations corresponding to the second set of content providers. In some embodiments, the plurality of versions of the respective episode are available on the electronic device, the plurality of representations of the respective episode includes representations corresponding to the plurality of versions of the respective episode, and respective representations of respective versions of the respective episode include information about the respective versions of the respective episode. In some embodiments, the respective episode is available from the plurality of content providers, the plurality of representations of the respective episode includes representations corresponding to the plurality of content providers, and respective representations of respective content providers of the respective episode include information about the respective content providers of the respective episode.

User Interfaces for Live-Event Media

Users interact with electronic devices in many different manners, including interacting with content or media (e.g., music, movies, etc.) that may be available (e.g., stored or otherwise accessible) on the electronic devices, such as via different content providers and corresponding content applications (e.g. as described with reference to FIGS. 6A-6LL, FIGS. 8A-8GG, FIGS. 10A-10Z, FIGS. 12A-12V and/or FIGS. 18A-18J). For example, a user may browse and play media that is accessible on an electronic device. In some circumstances, the media accessible on the electronic device includes live-event media (e.g., a broadcast of a live event such as a news report, a sport event, or a live dramatic performance). The embodiments described below provide ways in which an electronic device displays representations of, and provides access to, live-event media items accessible on the electronic device, thereby enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 18A-18J illustrate exemplary ways in which an electronic device displays representations of, and provides access to, live-event media items accessible on the electronic device in accordance with some embodiments of the disclosure. The embodiments in these figures are used to illustrate the processes described below, including the processes described with reference to FIGS. 19A-19K.

Figure 18A:
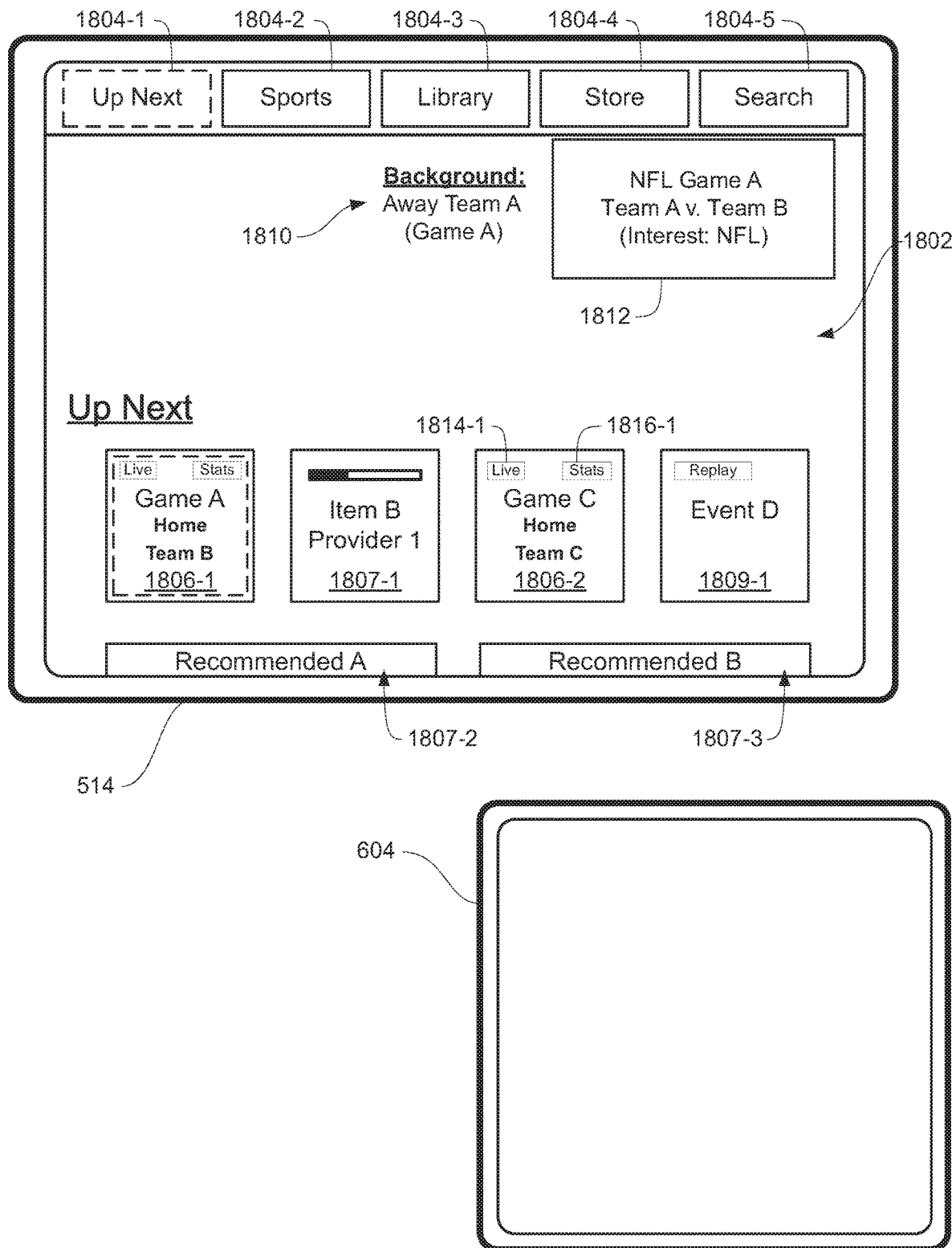
FIGS. 18A-18J illustrate exemplary ways in which an electronic device displays representations of, and provides access to, live-event media items accessible on the electronic device in accordance with some embodiments of the disclosure.

FIG. 18A illustrates exemplary display 514. Display 514 optionally displays one or more user interfaces that include various content. In the example illustrated in FIG. 18A, display 514 displays a unified media browsing application running on an electronic device (e.g., electronic device 500 of FIG. 5A) of which display 514 is a part, or to which display 514 is connected (e.g., a unified media browsing application as described with reference to FIGS. 6A-6LL, FIGS. 8A-8GG, FIGS. 10A-10Z and/or FIGS. 12A-12V). Various features of the unified media browsing application are optionally as described with reference to FIGS. 6A-6LL, FIGS. 8A-8GG, FIGS. 10A-10Z and/or FIGS. 12A-12V, except as otherwise indicated in FIGS. 18A-18J and FIGS. 19A-19K. For example, selection of a representation of a live-event media item that is available for viewing via the electronic device (e.g., the user is entitled to view the live-event media item, the live-event media item is currently available for viewing via the electronic device, etc.) optionally results in the electronic device displaying, on display 514, the live-event media item corresponding to the selected representation. In some embodiments, displaying the selected live-event media item includes opening (e.g., displaying) an application, other than the unified media browsing application, for viewing the live-event media item, and then displaying the live-event media item in that application. In some embodiments, displaying the selected live-event media item includes displaying the live-event media item from within the unified media browsing application that displays the unified media browsing user interface without opening (e.g., displaying) another application.

In FIG. 18A, the unified media browsing application displays unified media browsing user interface 1802 for browsing through various media accessible on the electronic device. User interface 1802 includes selectable user interface elements 1804-1 to 1804-5 in a top menu bar to navigate through the unified media browsing application, including user interface elements 1804-1, 1804-3, 1804-4 and 1804-5 corresponding to the Up Next, Library, Store and Search user interface elements described with reference to FIGS. 6A-6LL, FIGS. 8A-8GG, FIGS. 10A-10Z and/or FIGS. 12A-12V. The top menu bar also includes user interface element 1804-2 corresponding to a Sports or live-event media user interface, which will be described in more detail below. Further, as described with reference to FIGS. 6A-6LL, in some embodiments, the electronic device ceases displaying the top menu bar after (e.g., within a predetermined time after) one of user interface elements 1804 is selected. In FIG. 18A, user interface element 1804-1 corresponding to suggested media items is currently-selected (indicated by the dashed-line border), and the electronic device is displaying representations 1806-1 to 1806-2, 1807-1 to 1807-3 and 1809-1 of suggested media items (e.g., suggested media items as described with reference to FIGS. 6A-6LL, FIGS. 8A-8GG, FIGS. 10A-10Z and/or FIGS. 12A-12V), and representation 1806-1 corresponding to media item Game A has the current focus (indicated by the dashed-line box within representation 1806-1). In some embodiments, the electronic device only displays representations 1806, 1807 and 1809 of suggested media items that the user of the electronic device is entitled to access (e.g., the user has a subscription with a media provider that provides the electronic device access to the media items, the user has purchased the media items, etc.), and does not display representations of media items that the user of the electronic device is not entitled to access.

In FIG. 18A, the electronic device is concurrently displaying representations of live-event suggested media, on-demand suggested media, and a replay of (or a previously-recorded version of) live-event suggested media. Live-event media includes media such as a broadcast of a live event, such as a news report, a sport event, or a live dramatic performance. In some embodiments, broadcasting of a live event entails some delays with respect to the live event due to various factors or processes in the broadcast chain; however, such potentially delayed broadcasts of media items are still considered to be live-event media items, as the broadcasts are of a live event, as opposed to being broadcasts of previously-recorded events (e.g., events that are not currently happening) or content, such as movies, television shows, etc. (e.g., referred to as "on-demand" media).

In some embodiments, when a live-event media item that the electronic device determines would likely be of interest to the user becomes available for viewing via the electronic device, the electronic device displays a representation of that live-event media item in user interface 1802. In particular, in FIG. 18A, the electronic device has identified Game A (corresponding to representation 1806-1) and Game C (corresponding to representation 1806-2) to be live-events that are of interest to the user, and is displaying representations 1806-1 and 1806-2 in user interface 1802. The electronic device has also identified Event D (corresponding to representation 1809-1), which is a replay of a live-event, to be of interest to the user, and Item B (corresponding to representation 1807-1), which is an on-demand media item, to be of interest to the user, and is displaying representations 1807-1 and 1809-1 in user interface 1802. In some embodiments, when a live-event suggested media item first becomes available, it is inserted into the row of suggested media items in the left-most position, and from that point forward moves within the row of suggested media items in the manners previously described with reference to FIGS. 6A-6LL, FIGS. 8A-8GG, FIGS. 10A-10Z and/or FIGS. 12A-12V.

The electronic device optionally uses various criteria to determine whether a particular media item is likely to be of interest to the user, and thus to determine whether to include that media item in user interface 1802, including those described for on-demand media items (e.g., representation 1807-1) with reference to FIGS. 6A-6LL, FIGS. 8A-8GG, FIGS. 10A-10Z and/or FIGS. 12A-12V. Additionally, the electronic device optionally determines to include a live-event media item in user interface 1802 (e.g., representations 1806-1 and 1806-2) if the user has expressed interest in a news topic, a sports team, a sport player, etc. that is related to the live-event media item, the user watched the live-event media item for more than a predetermined amount of time such as 30 seconds, 1 minute, 5 minutes, and which is still ongoing, and/or etc.; this criteria optionally differs from criteria for including on-demand media in user interface 1802, which in some embodiments occurs as a result of the user watching, favoriting, bookmarking, adding to a watch-list or otherwise interacting with the particular on-demand media that is included in user interface 1802. Further, the electronic device optionally determines to include a replay of (or a previously-recorded version of) a live-event in user interface 1802 (e.g., representation 1809-1) in circumstances in which the live-event is one for which a recording recently became available, the live-event is one that the user started watching but stopped watching before the live-event ended, the live-event is one that the user explicitly indicated interest in by favoriting, bookmarking or otherwise marking for later viewing, and/or etc.

The representations of the suggested media items displayed in user interface 1802 include representative content from their respective media items, similar to as described with reference to FIGS. 6A-6LL, FIGS. 8A-8GG, FIGS. 10A-10Z and/or FIGS. 12A-12V. For example, representations 1806-1 and 1806-2 include images of the home teams in the games corresponding to those representations, representation 1807-1 includes an image from media item B, and representation 1809-1 includes an image from event D. The representations of the suggested media items displayed in user interface 1802 optionally differ based on whether the media item is a live-event media item, an on-demand media item or a replay of a live-event. For example, as shown in FIG. 18A, live-event media items 1806-1 and 1806-2 include "Live" badges (e.g., badge 1814-1 in representation 1806-2) that indicate the media items to which they correspond are currently-live live-event media items. The live-event media items also include "Stats" indicators (e.g., indicator 1816-1 in representation 1806-2) that optionally display one or more statistics (e.g., sport scores, votes, poll results) associated with the live-event media items and/or a time period associated with an event that is a subject of the live-event media items (e.g., a period/quarter/inning of a game and/or an amount of time since the period/quarter/inning started, or an amount of time until the period/quarter/inning ends). The "Live" badges and "Stats" indicators are optionally overlaid over the representative images of content included in representations 1806-1 and 1806-2.

On-demand media item B 1807-1 does not include a "Live" badge or a "Stats" indicator, because it is not a live-event media item. Rather, representation 1807-1 has features as described with reference to FIGS. 6A-6LL. Finally, replay media item D 1809-1 also does not include a "Live" badge or a "Stats" indicator, but does include a "Replay" indicator in place of the "Live" badge, which is overlaid over the representative image of content included in representation 1809-1, and indicates that media item D is a replay of (or a previously-recorded version of) a live-event media item.

As described with reference to FIGS. 6A-6LL, the background 1810 of user interface 1802 changes depending on which representation 1806, 1807 and 1809 has the current focus. In FIG. 18A, representation 1806-1 has the current focus. As a result, background 1810 includes representative content from game A (corresponding to representation 1806-1). In the example of FIG. 18A, game A is an NFL game between Team A (the away team) and Team B (the home team). As such, representation 1806-1 includes an image of the home team, Team B (e.g., the logo of Team B, an image of a player from Team B, etc.), and background 1810 is an image of the away team, Team A (e.g., the logo of Team A, an image of a player from Team A, etc.). User interface 1802 also includes indication 1812, which optionally provides information about the media item that has the current focus in user interface 1802, including information about why the media item is included as a suggested media item in user interface 1802, as described with reference to FIGS. 6A-6LL. In the example of FIG. 18A, indication 1812 indicates that Game A is an NFL game between Team A and Team B, and that Game A is included as a suggested media item, because the user has previously expressed an interest in the NFL.

Figure 18B:
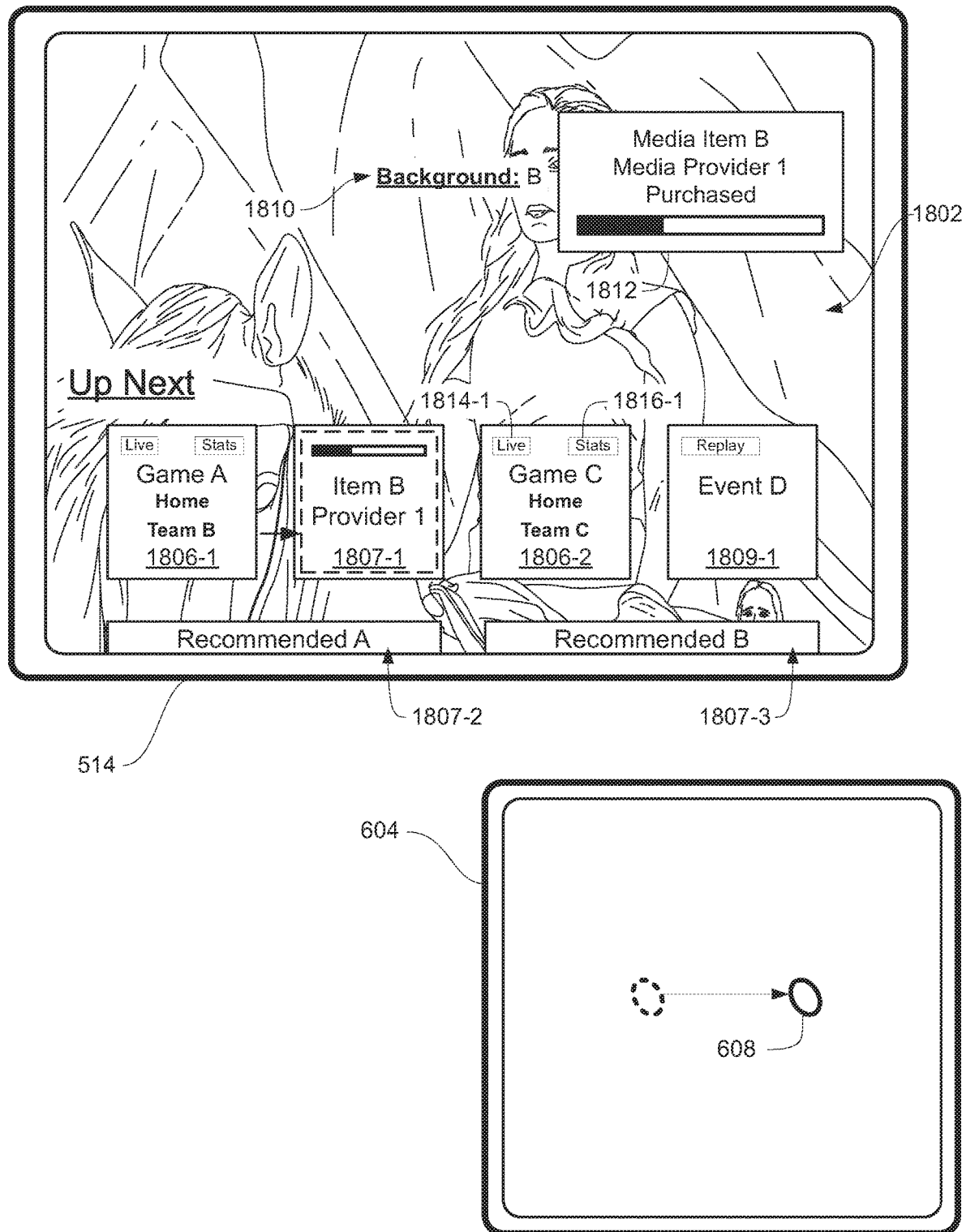
Figure 18C:
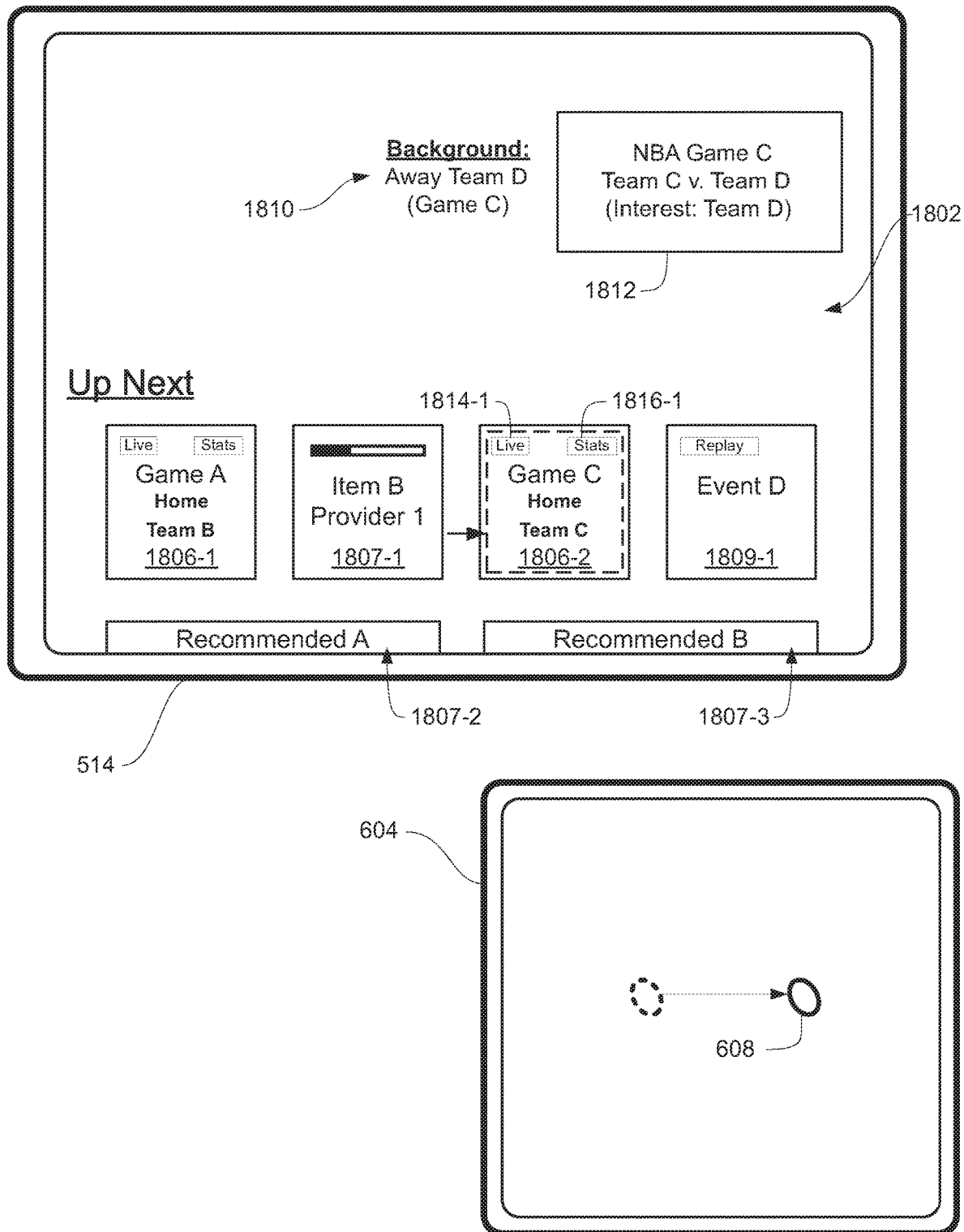

Background 1810 and indication 1812 change when the media item with current focus changes. In FIG. 18B, a left-to-right swipe of contact 608 on touch-sensitive surface 604 is detected. In response, the electronic device changes the current focus from representation 1806-1 to representation 1807-1, and background 1810 and indication 1812 change to correspond to media item B, the details of which are described with reference to FIGS. 6A-6LL. In FIG. 18C, another left-to-right swipe of contact 608 on touch-sensitive surface 604 is detected, and in response, the electronic device changes the current focus from representation 1807-1 to representation 1806-2, and background 1810 and indication 1812 again change, this time to correspond to Game C. In the example of FIG. 18C, game C is an NBA game between Team C (the home team) and Team D (the away team). As such, representation 1806-2 includes an image of the home team, Team C (e.g., the logo of Team C, an image of a player from Team C, etc.), and background 1810 is an image of the away team, Team D (e.g., the logo of Team D, an image of a player from Team D, etc.). Further, indication 1812 indicates that Game C is an NBA game between Team C and Team D, and that Game C is included as a suggested media item, because the user has previously expressed an interest in Team D.

Figure 18D:
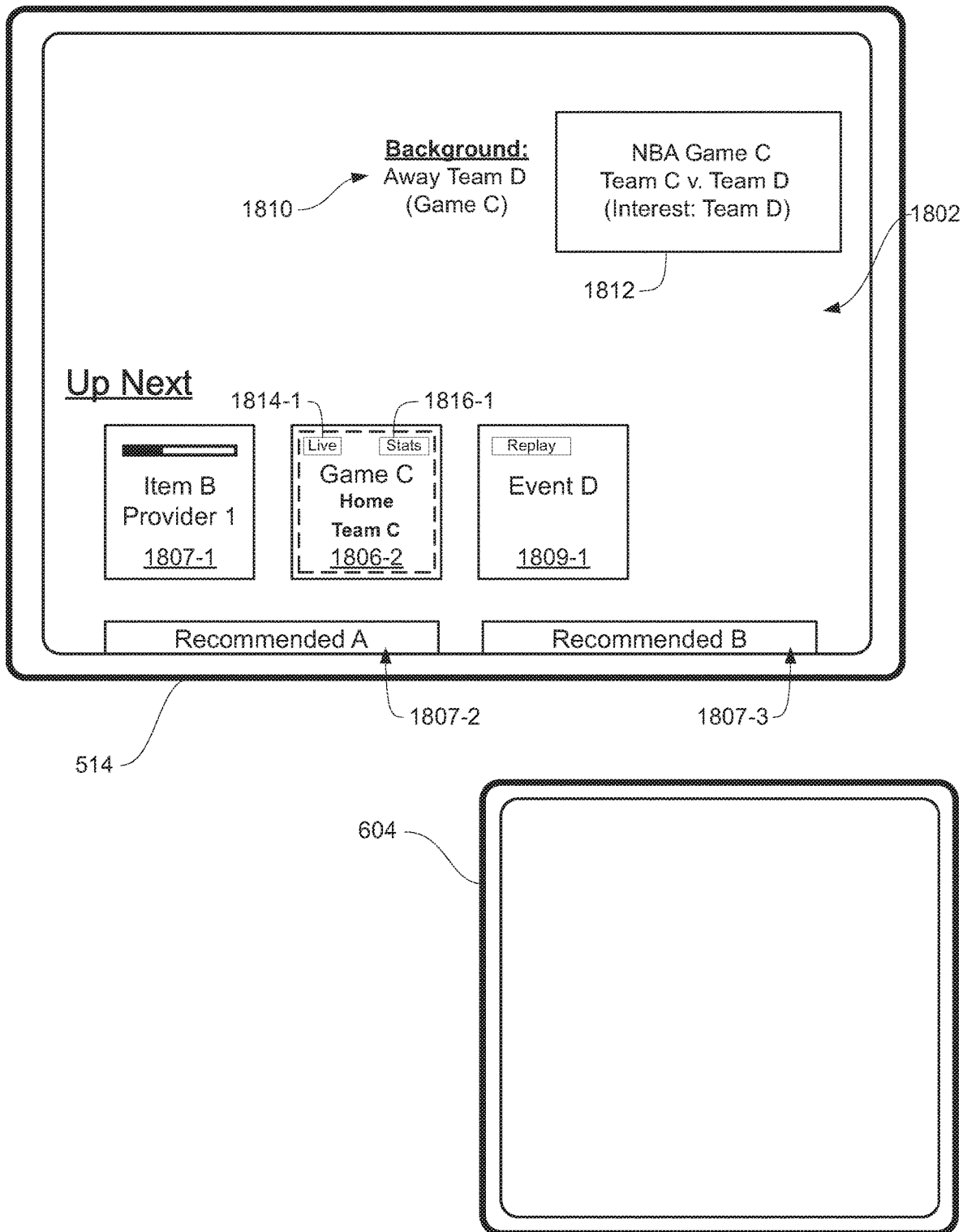

As previously mentioned, in some embodiments, when a live-event media item ends, rather than remaining as a suggested media item in user interface 1802, the electronic device removes that media item from user interface 1802. In FIG. 18D, Game A has ended. As a result, the electronic device has removed representation 1806-1 (corresponding to Game A) from user interface 1802, as shown. In FIG. 18D, Game C is still ongoing, and as such representation 1806-2 remains in user interface 1802.

Figure 18E:
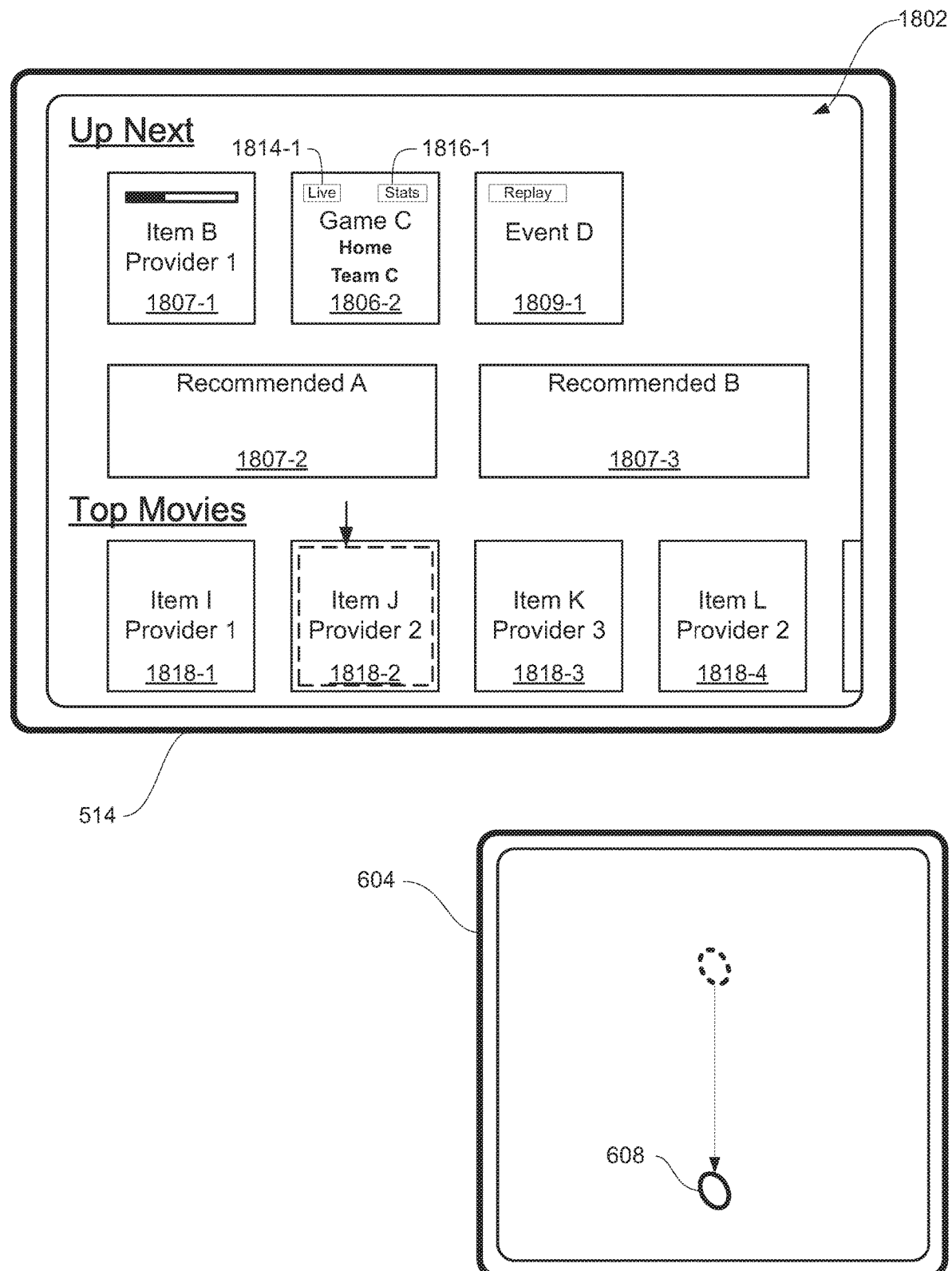
Figure 18F:
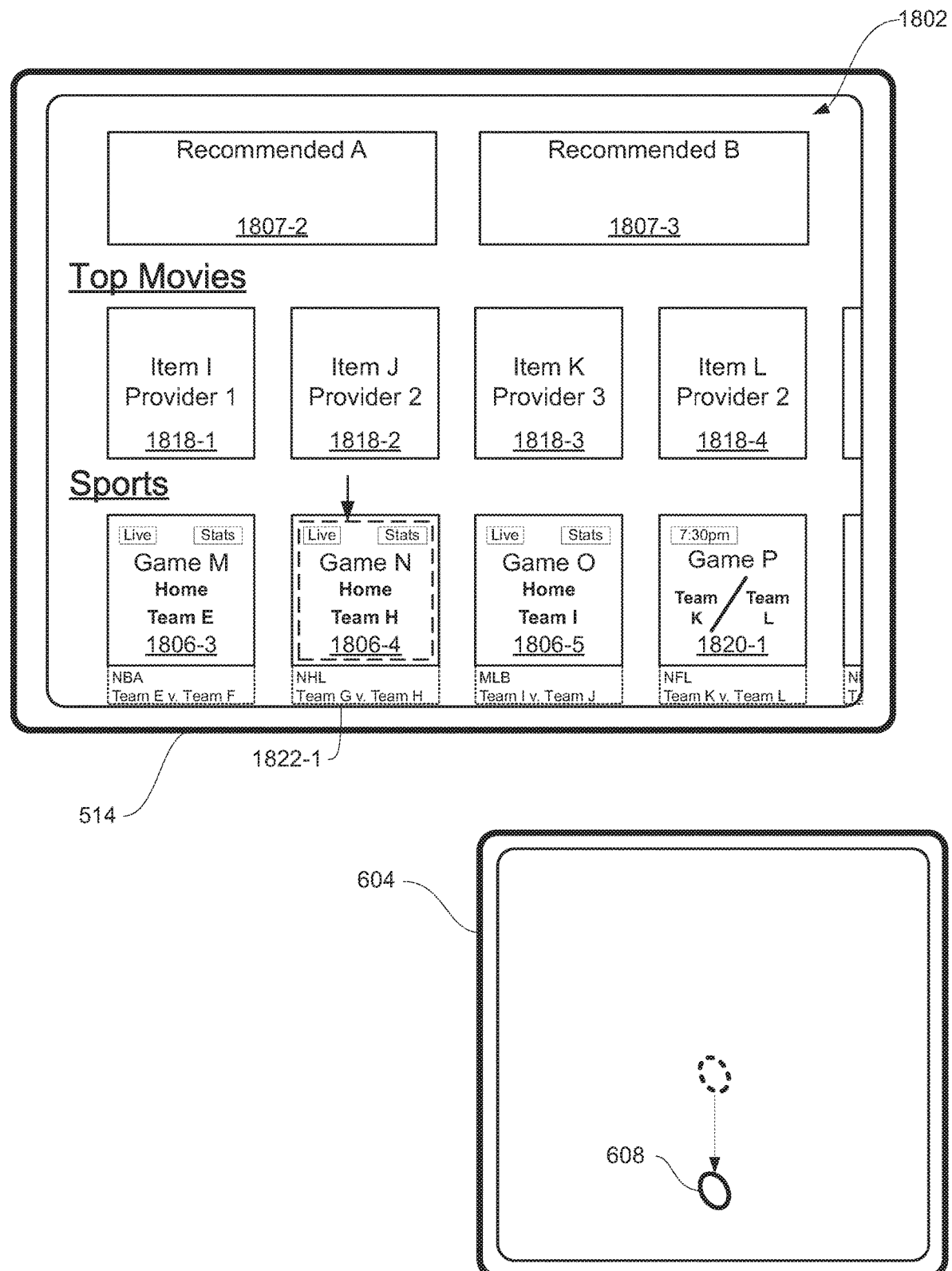

In FIG. 18E, a top-to-bottom swipe of contact 608 is detected on touch-sensitive surface 604. In response, the electronic device scrolls through user interface 1802 to reveal trending media items 1818-1 to 1818-4 (e.g., Top Movies) in user interface 1802, as described with reference to FIGS. 6H-6I. Trending media items are described in more detail with reference to FIGS. 6A-6LL. In FIG. 18F, a further top-to-bottom swipe of contact 608 is detected on touch-sensitive surface 604, and in response the electronic device scrolls further through user interface 1802 to display a row of live-event media items (in the example of FIG. 18F, sports events) corresponding to representations 1806-3 to 1806-5 and 1820-1.

The row of sports media items in FIG. 18F includes both live-events that are currently live (e.g., representations 1806-3 to 1806-5) and live-events that are upcoming (e.g., representation 1820-1, corresponding to a live-event that has not yet started). Representations 1806-3 to 1806-5 and 1820-1 for sports games in the row of sports media items include indicators adjacent to and below them (e.g., indicator 1822-1 below representation 1806-4) that include information about what kind of game the sports games are (e.g., NBA, NHL, MLB, NFL) and the teams involved in the sports games (e.g., Team E v. Team F for representation 1806-3, Team G v. Team H for representation 1806-4, etc.). The remaining features of representations 1806-3 to 1806-5 for live-events that are currently live are as described with reference to FIGS. 18A-18C. The remaining features of representation 1820-1 for a live-event that is upcoming differ from those of representations 1806-3 to 1806-5. Specifically, representation 1820-1 does not include a "Live" or "Stats" badge. Further, in place of the "Live" badge, representation 1820-1 includes a badge indicating the time at which Game P will begin (e.g., will become available for viewing) that is overlaid over the image(s) included in representation 1820-1. Additionally, instead of including an image of only the home team in Game P, representation 1820-1 includes images of both teams involved in Game P (e.g., logos of Teams K and L). When Game P begins (e.g., becomes available for viewing), its features will optionally change to be those of representations 1806-3 to 1806-5.

The unified media browsing application that displays user interface 1802 also includes a dedicated user interface for browsing live-event media items. For example, in FIG. 18G, a click of touch-sensitive surface 604 is detected while the "Sports" element 1804-2 in the top menu bar has the current focus. In response, the electronic device displays user interface 1803, as shown in FIG. 18H, which is a dedicated user interface for browsing live-event media items (in this case, live-event sports media items). In some embodiments, the live-event media items displayed in user interface 1803 include media items that the user is entitled to view, and one or more live-event media items that the user is not entitled to view (e.g., pay per view content or content that requires a subscription to watch that the user does not have), in contrast to those media items displayed in user interface 1802 in FIGS. 18A-18G.

User interface 1803 includes groups of sports events that are grouped according to one or more shared characteristics. For example, user interface 1803 includes NCAA basketball games displayed in a single row of media items. The row of NCAA basketball games includes both currently-live live-events (representations 1806-6 and 1806-7) and upcoming live-events (representations 1820-2 and 1820-3), the features of which are as described with reference to FIGS. 18A-18G. User interface 1803 also includes a mixed row of sports events that includes sports games of various types (e.g., representation 1806-8 for an NBA game, representation 1806-9 for an NHL game, etc.).

A user is also able to browse sports by category in user interface 1803. Specifically, in FIG. 18I, a top-to-bottom swipe of contact 608 is detected on touch-sensitive surface 604, and in response the electronic device displays categories 1824 of sports content available for browsing (e.g., Football, Basketball, Hockey, Tennis), similar to as described with reference to FIGS. 8G-8L. Selection of one of categories 1824 optionally results in the electronic device displaying sports events of the selected category in user interface 1803 (e.g., similar to as described with reference to FIGS. 8I-8J).

Figure 18G:
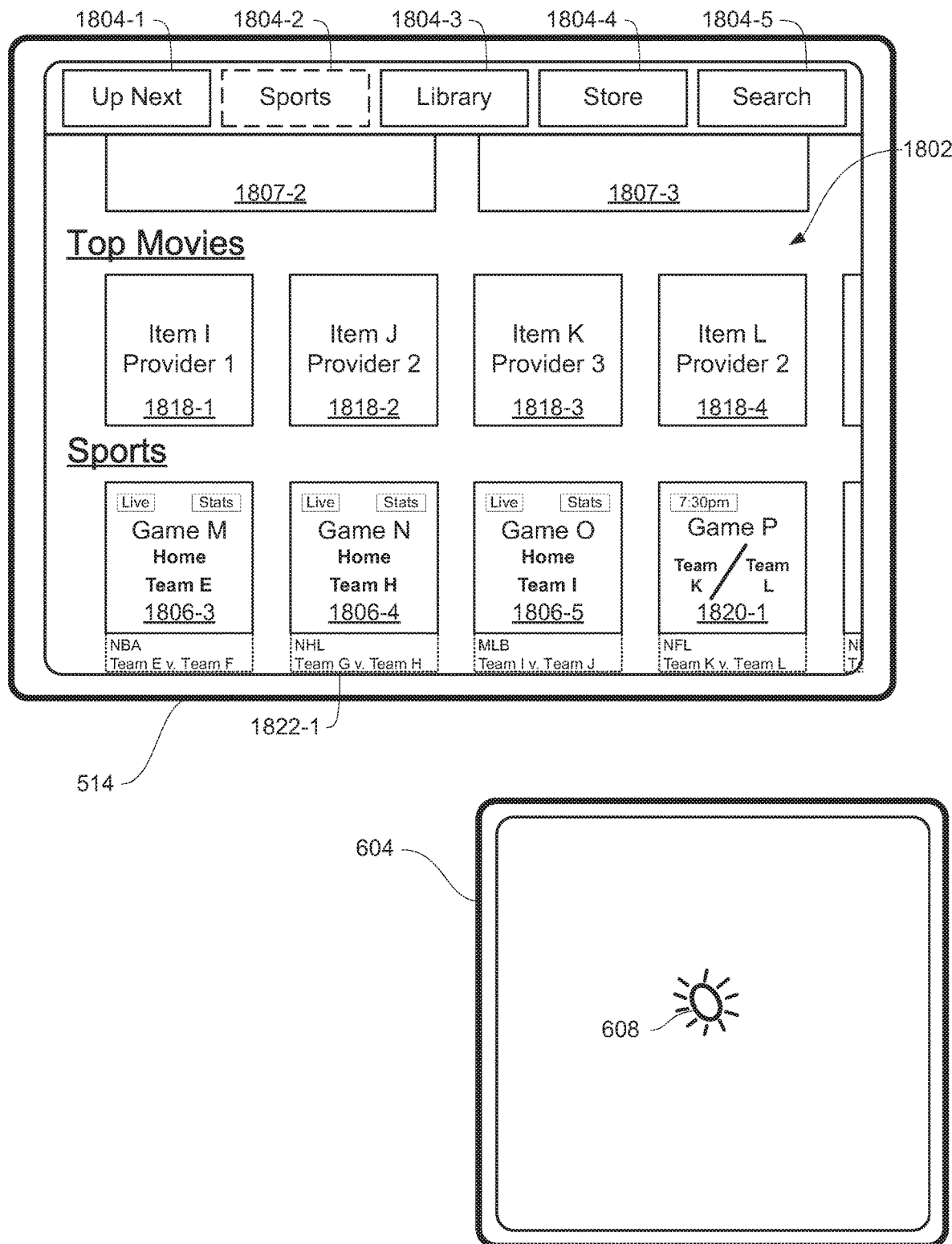
Figure 18H:
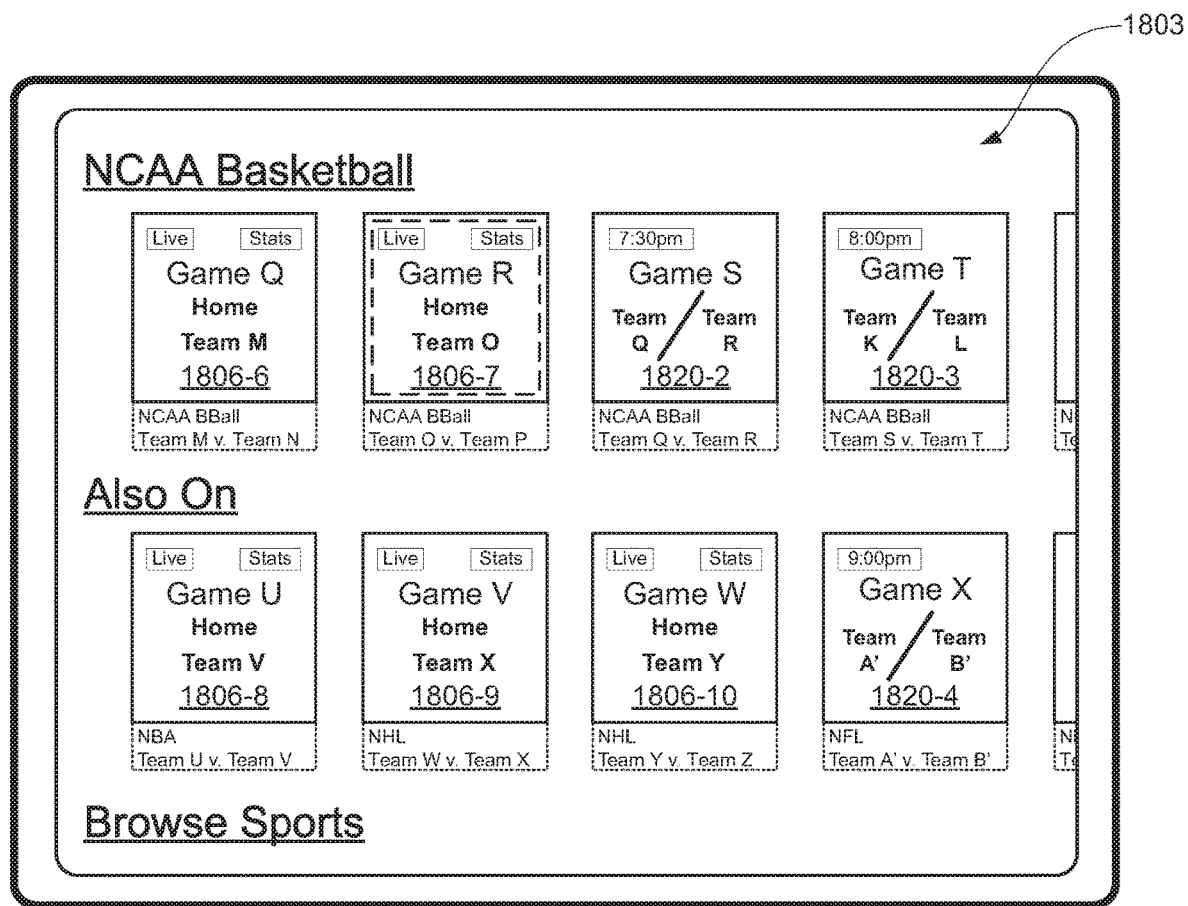
Figure 18I:
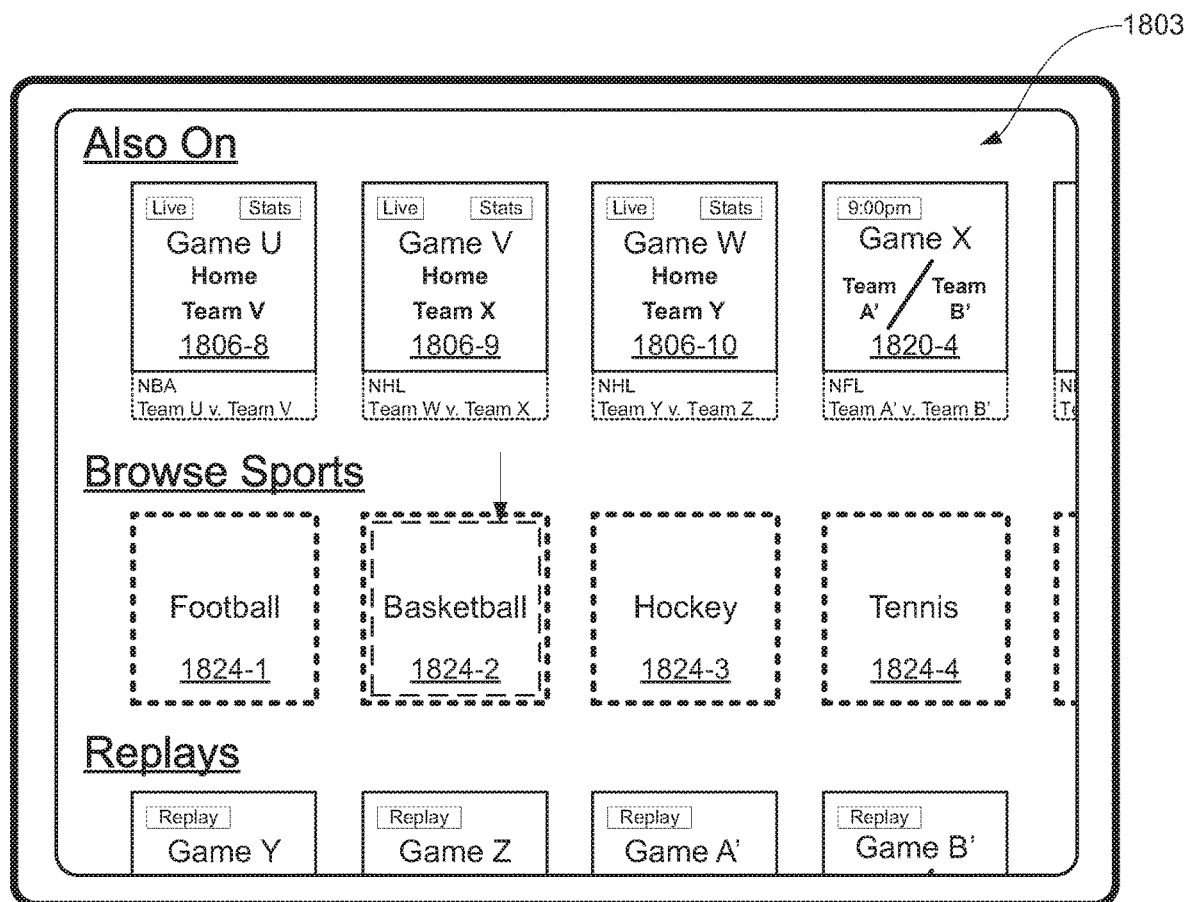
Figure 18I:
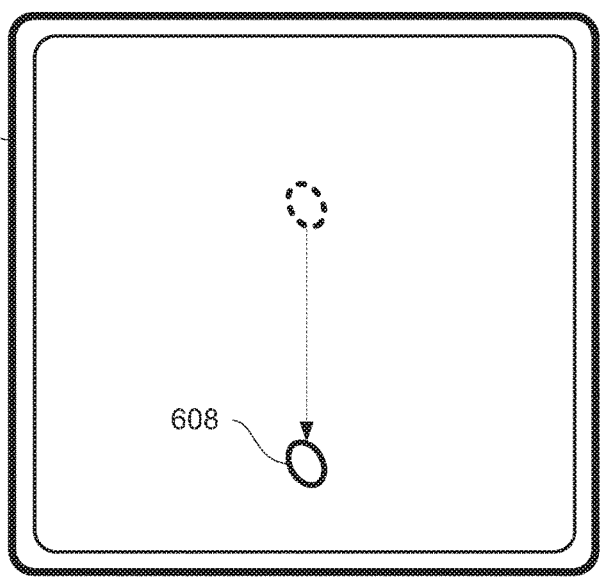
Figure 18J:
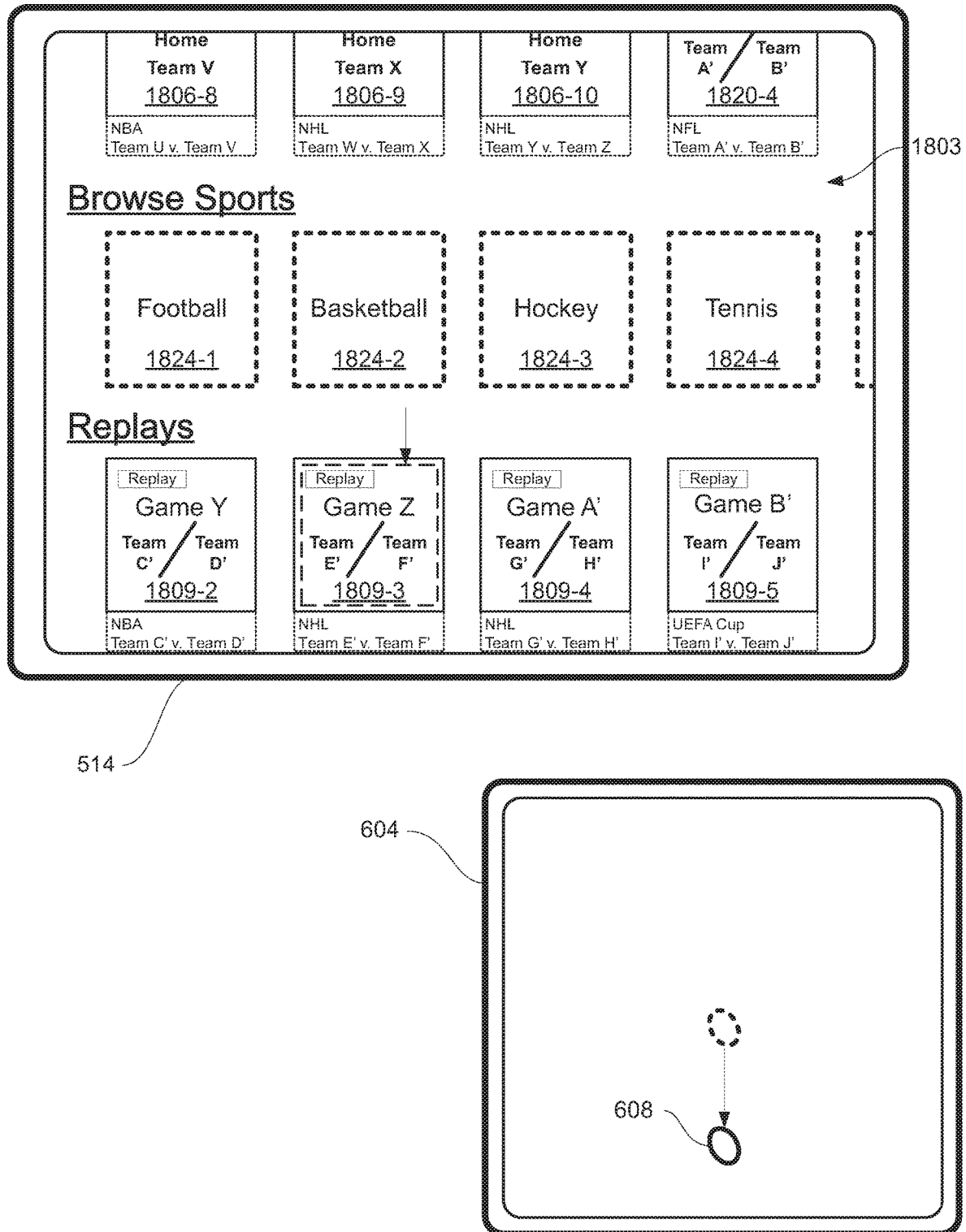
Figure 19A:
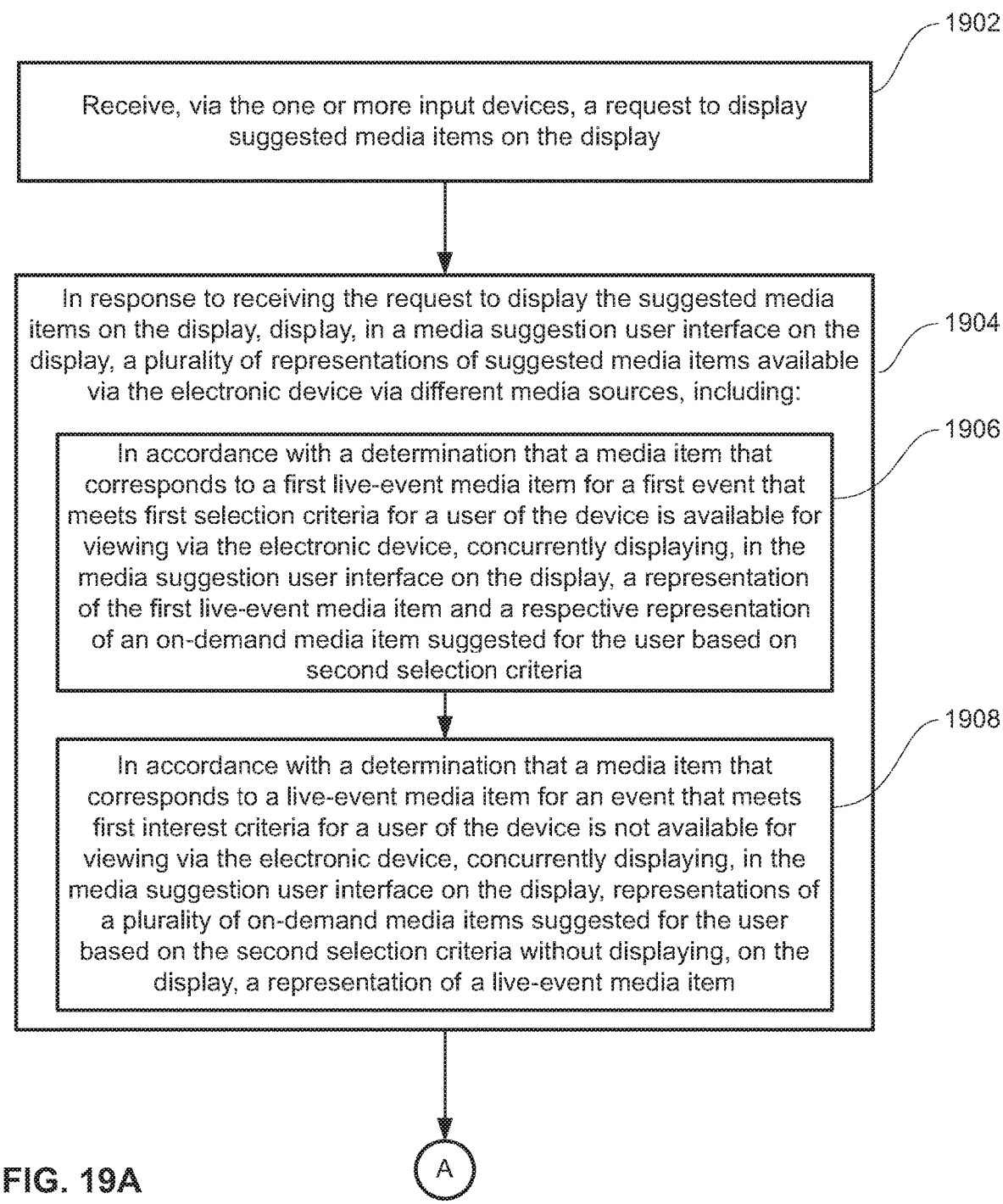
FIGS. 19A-19K are flow diagrams illustrating a method of displaying representations of, and providing access to, live-event media items accessible on an electronic device in accordance with some embodiments of the disclosure.
Figure 19B:
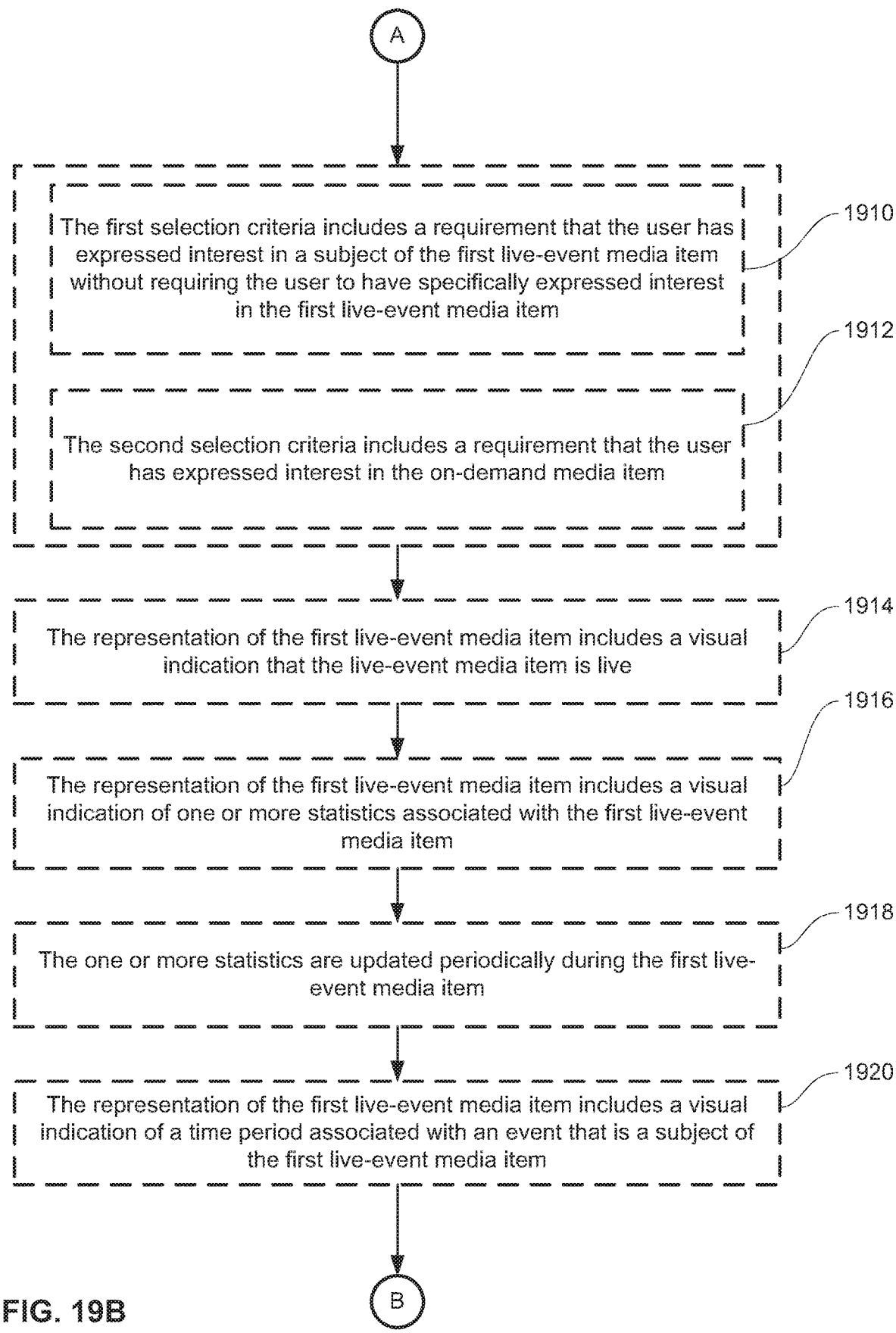
Figure 19C:
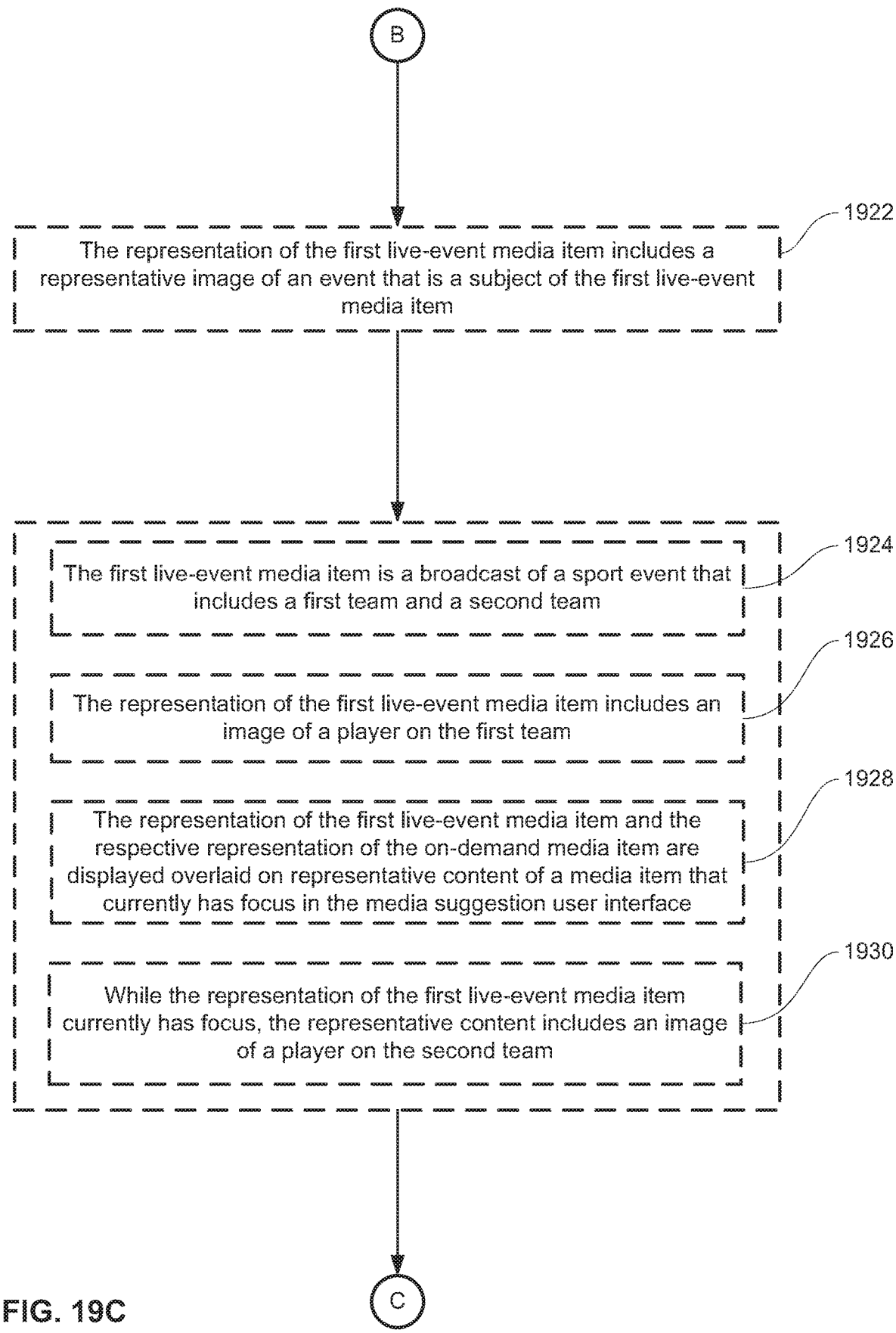
Figure 19D:
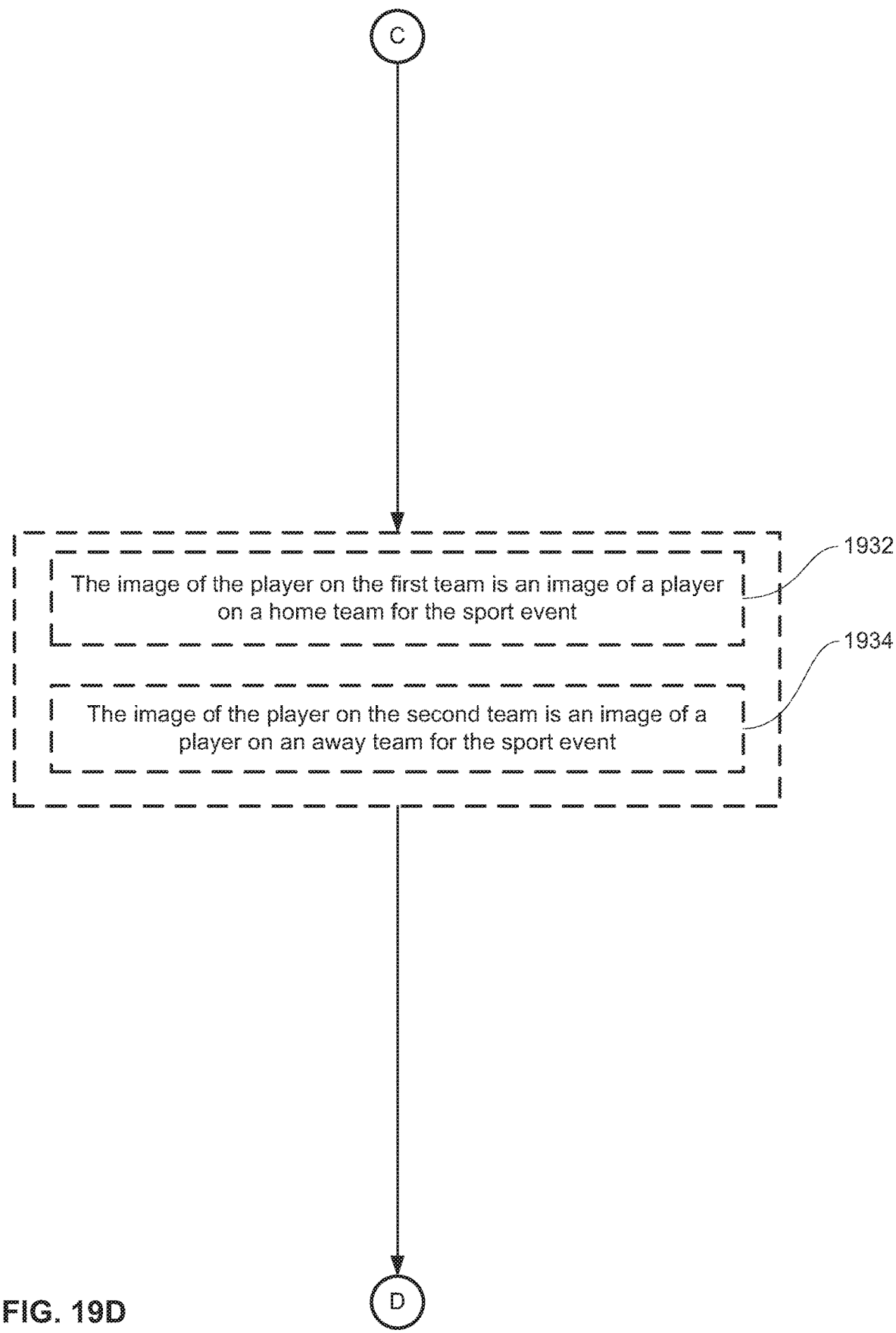
Figure 19E:
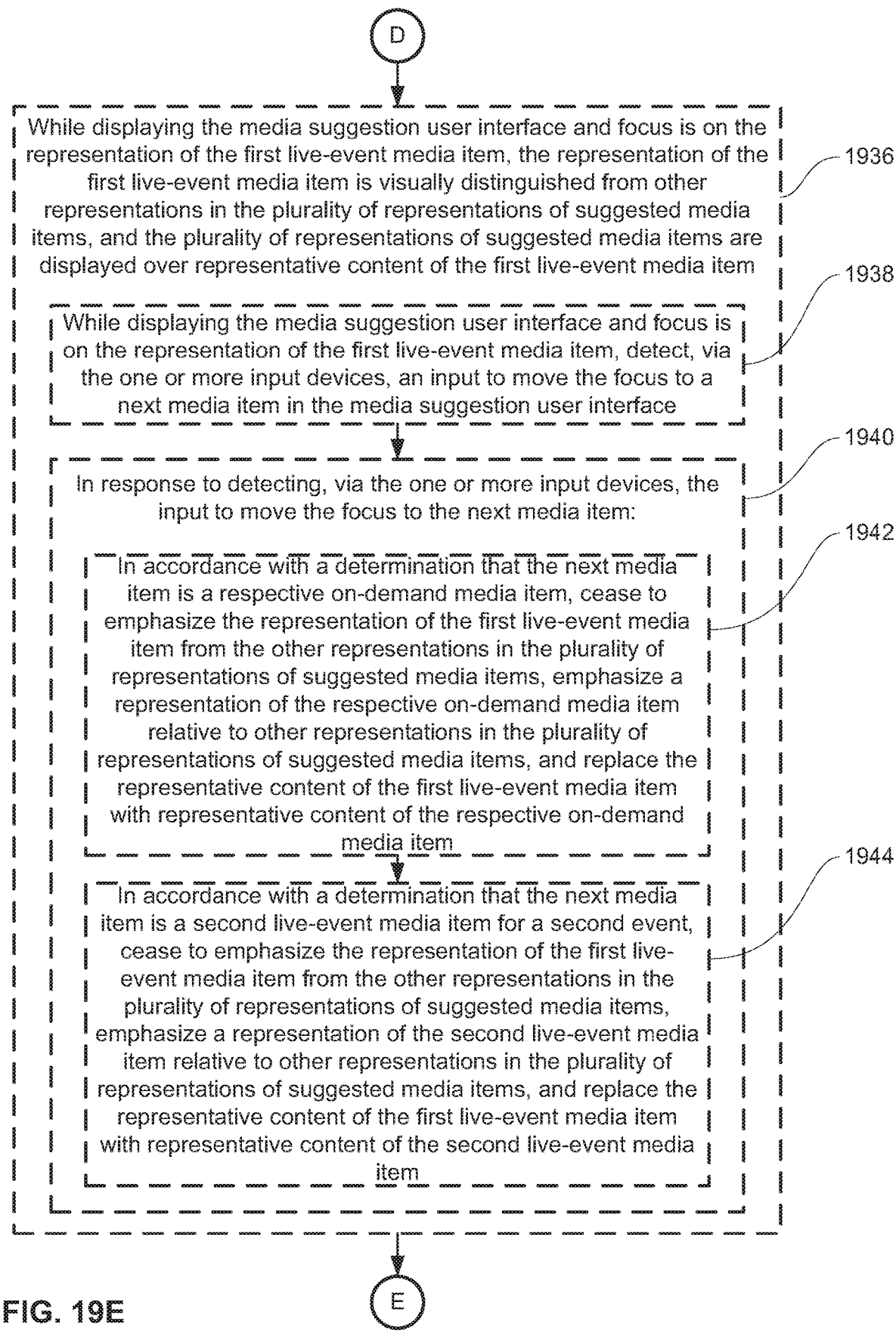
Figure 19F:
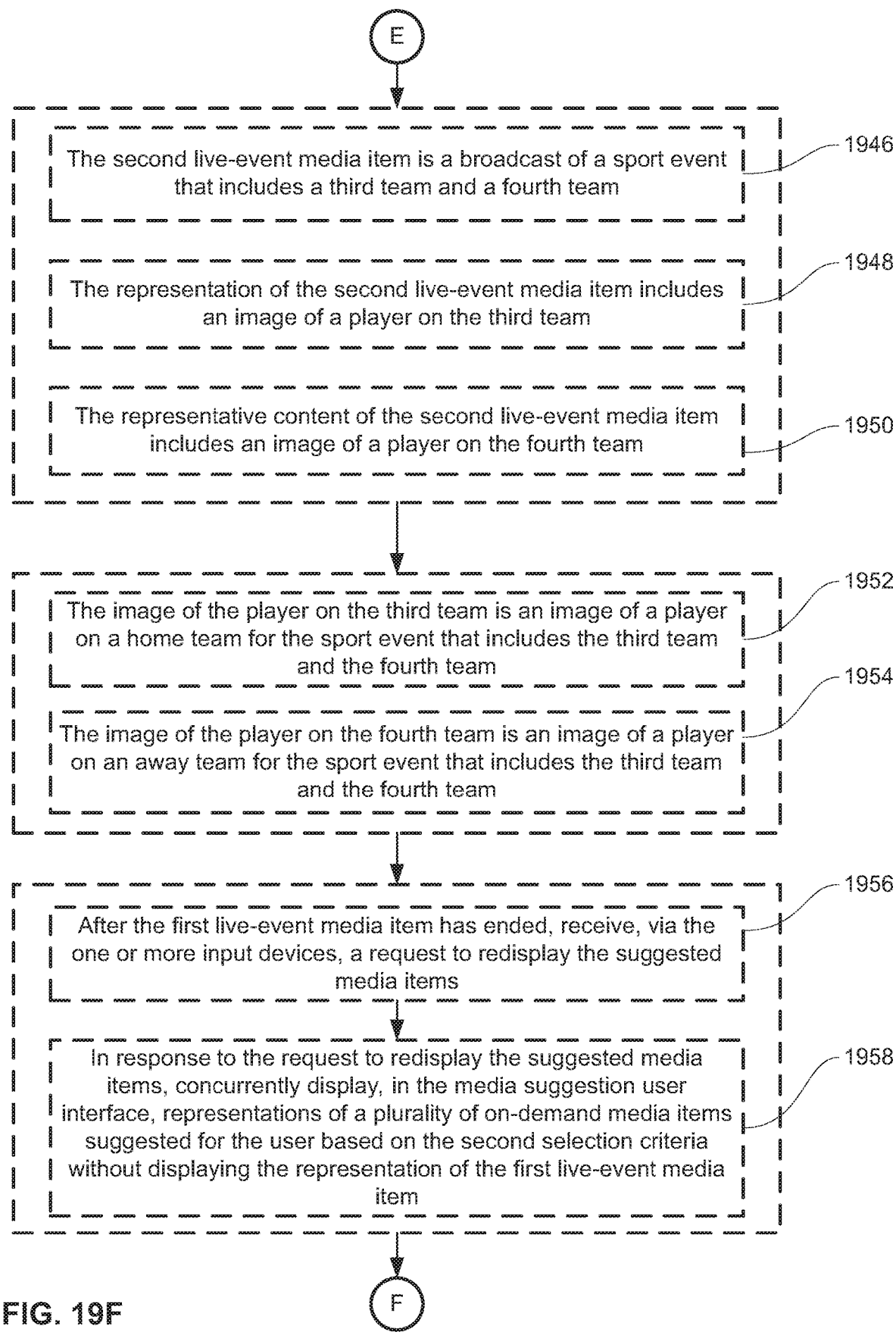
Figure 19G:
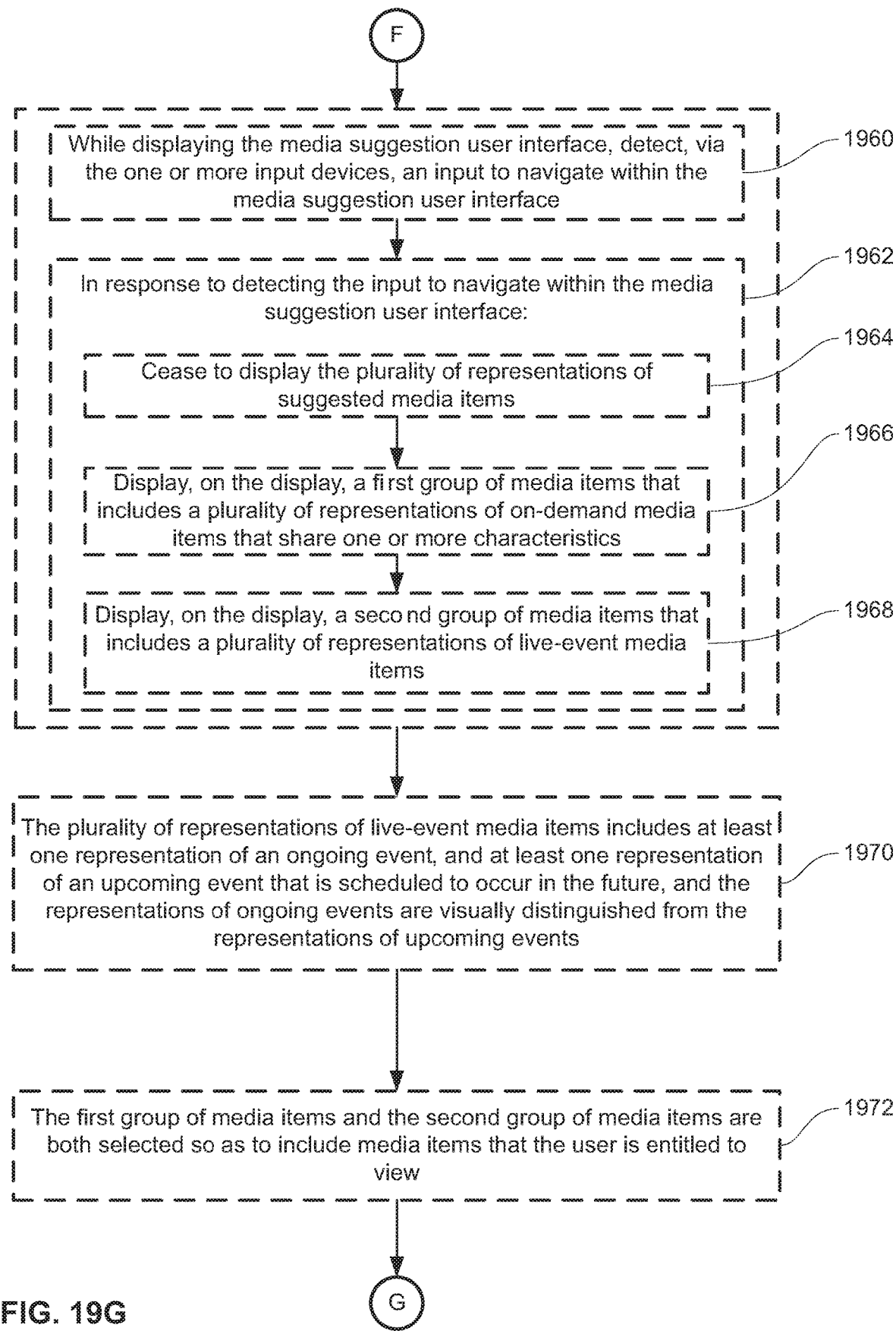
Figure 19H:
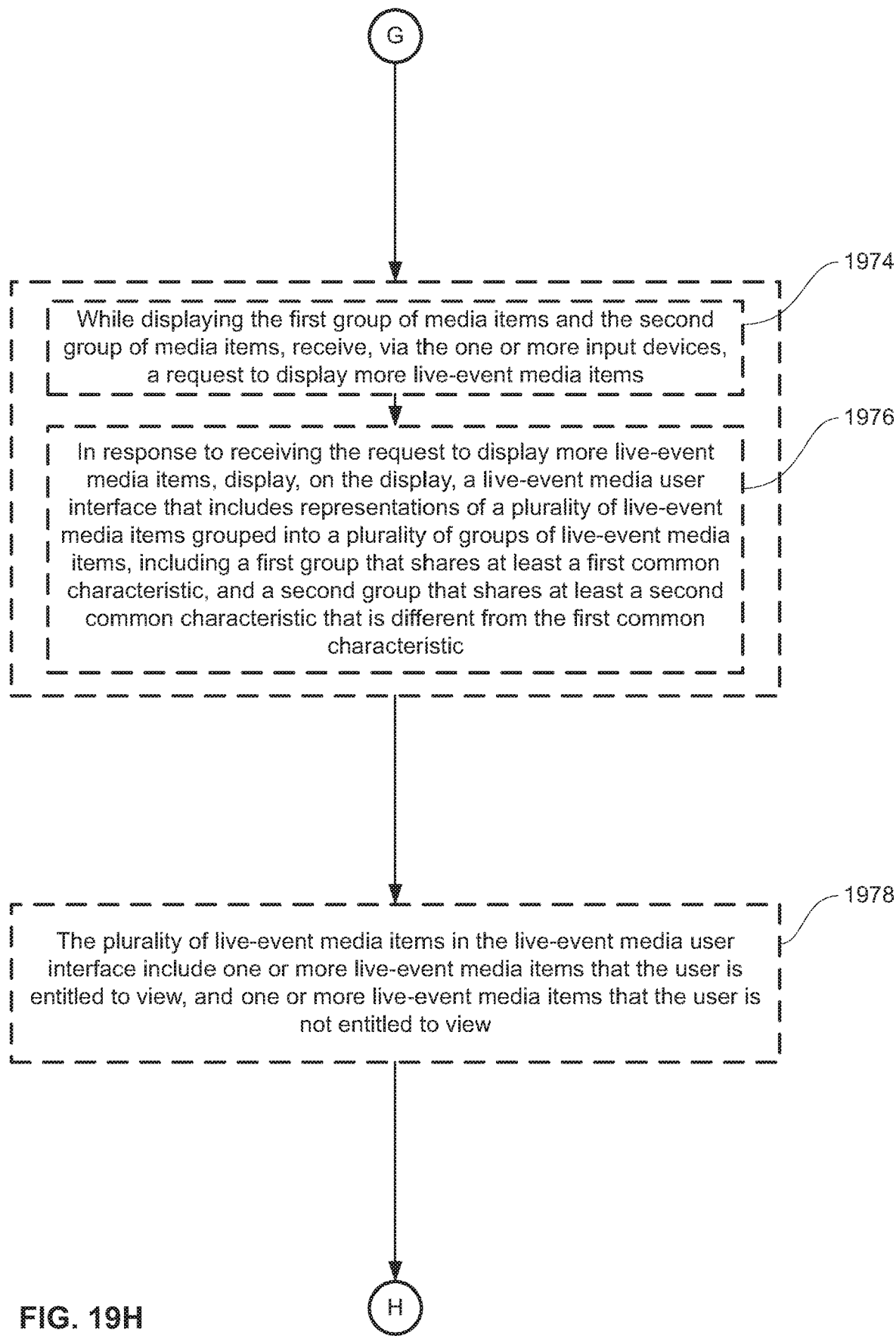
Figure 19I:
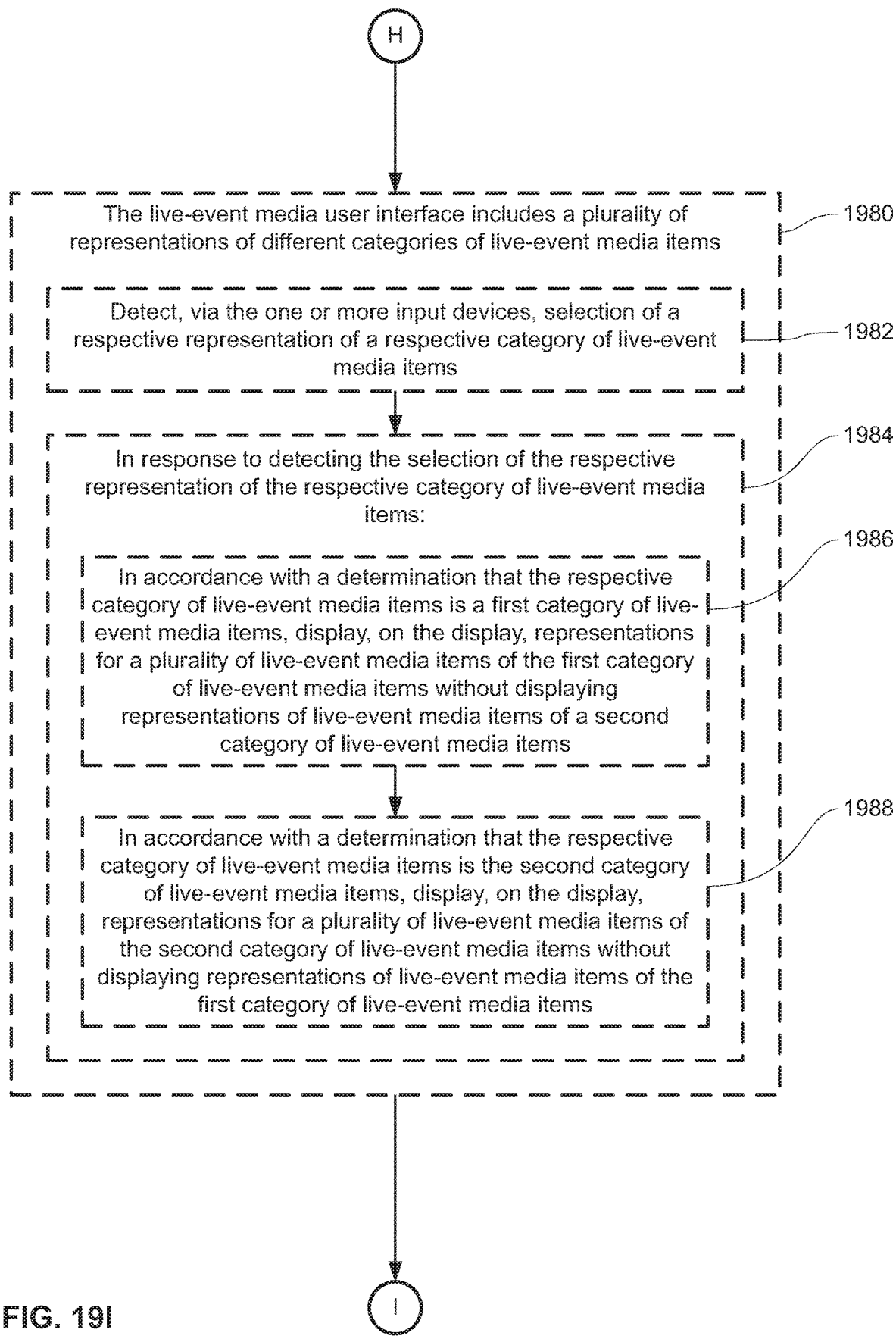
Figure 19J:
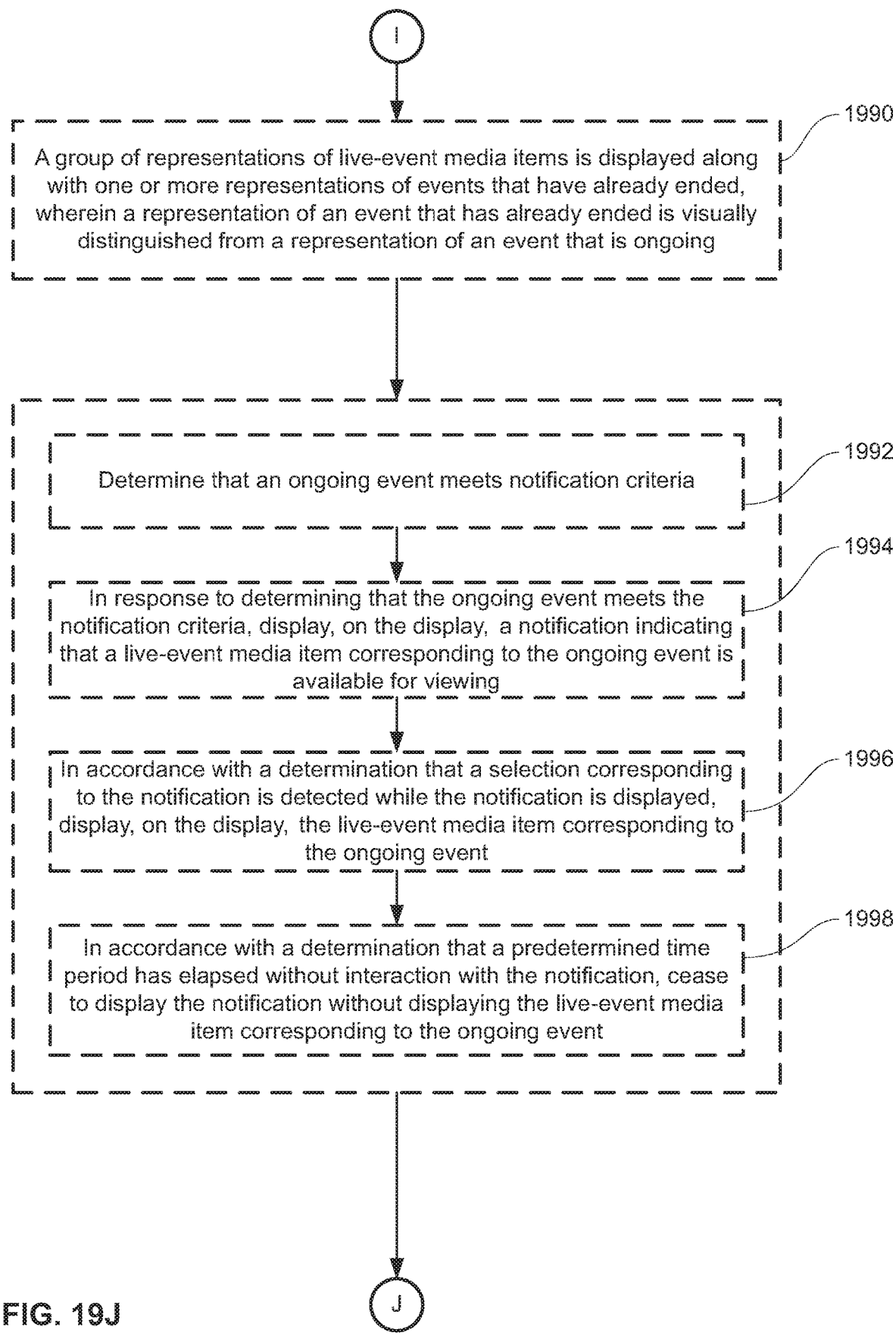
Figure 19K:
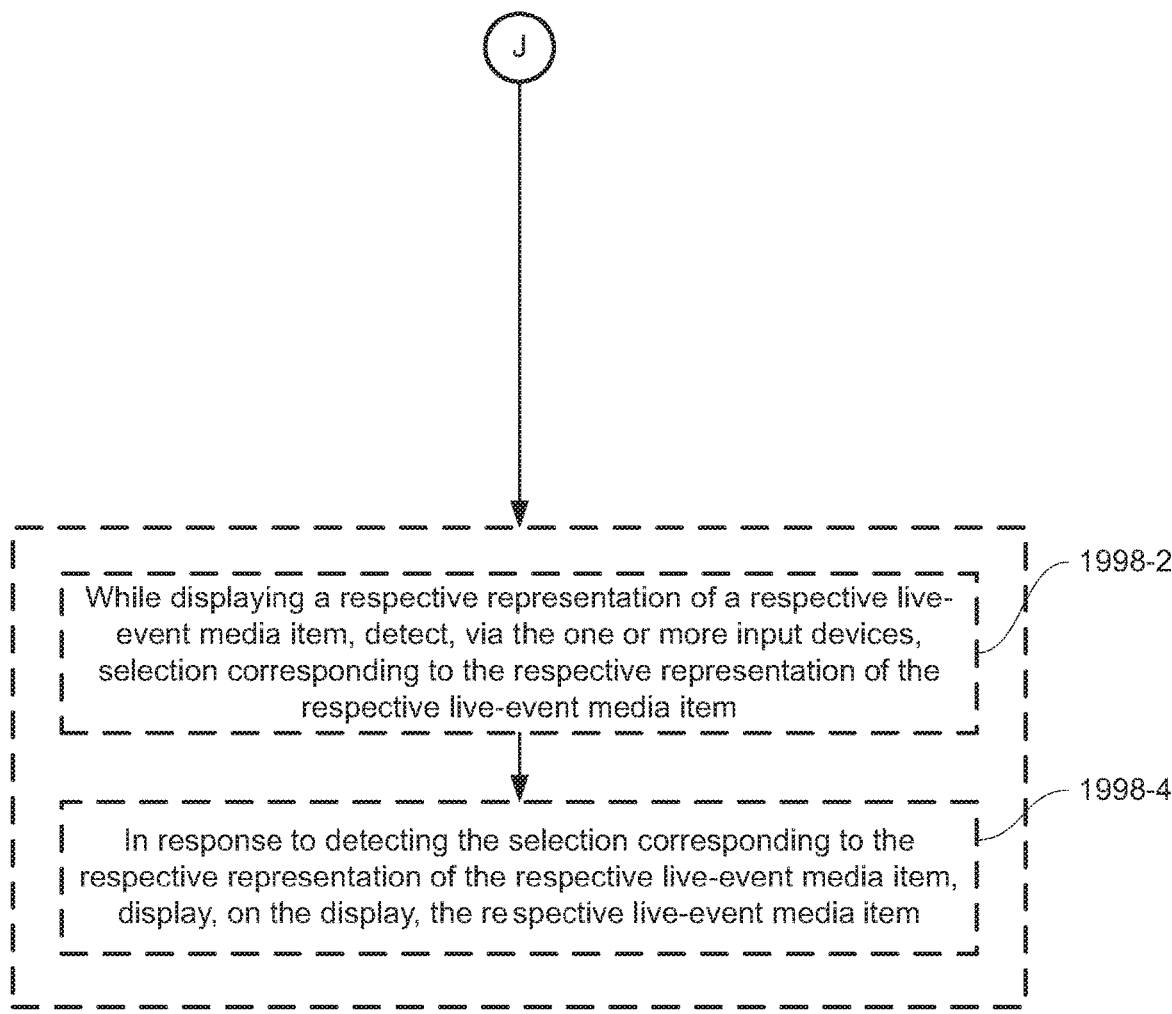

In addition to including currently-live and upcoming live-event media items, user interface 1803 includes replays of (or previously-recorded versions of) live-events, as shown in FIGS. 18I-18J. In particular, in FIG. 18J, a further top-to-bottom swipe of contact 608 is detected on touch-sensitive surface 604, and in response, the electronic device fully reveals a row of replays of sports games (representations 1809-2 to 1809-5) that is displayed below the categories 1824 of sports in user interface 1803. The features of representations 1809-2 to 1809-5 are optionally the same as the features of representations 1820 of upcoming sports games as previously described, except that instead of a badge indicating the start times of the sports games that are displayed in representations 1820 of upcoming sports games, representations 1809-2 to 1809-5 of replays of sports games include a "Replay" badge overlaid over the images included in those representations that indicates that the representations correspond to replays of live-events.

FIGS. 19A-19K are flow diagrams illustrating a method of displaying representations of, and providing access to, live-event media items accessible on an electronic device in accordance with some embodiments of the disclosure. The method 1900 is optionally performed at an electronic device such as device 100, device 300, or device 500 as described above with reference to FIGS. 1A-1B, 2-3 and 5A-5B. Some operations in method 1900 are, optionally, combined and/or the order of some operations is, optionally, changed.

As described below, the method 1900 provides ways of displaying representations of, and providing access to, live-event media items accessible on an electronic device. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., a set-top box, such as device 100, device 300 or device 500) in communication with a display (e.g., a television, such as display 514) and one or more input devices (e.g., a remote control, such as remote 510, or a smartphone, such as device 511), receives (1902), via the one or more input devices, a request to display suggested media items on the display (e.g., launching a media item suggestion application that, for example, displays a media navigation user interface as described with reference to methods 700, 900 and 1100, a verbal request to "show me something to watch", scrolling in the media item suggestion application to a media item suggestion region). In some embodiments, in response to receiving the request to display the suggested media items on the display, the electronic device displays (1904), in a media suggestion user interface (e.g., the media navigation user interface) on the display, a plurality of representations of suggested media items available via the electronic device via different media sources, such as in FIG. 18A.

In accordance with a determination that a media item that corresponds to a first live-event media item for a first event (e.g., a broadcast of a live event such as a news report, a sport event, or a live dramatic performance) that meets first selection criteria (e.g., live-media item interest criteria) for a user of the device (e.g., a user account associated with the device or a user account currently logged into the device) is available for viewing via the electronic device, the electronic device optionally concurrently displays (1906), in the media suggestion user interface on the display, a representation of the first live-event media item and a respective representation of an on-demand media item (e.g., a media item that does not correspond to a currently-live event) suggested for the user based on second selection criteria (e.g., on-demand interest criteria), such as in FIG. 18A. In accordance with a determination that a media item that corresponds to a live-event media item for an event (e.g., news, sports, live TV, election results) that meets first interest criteria (e.g., live-media item interest criteria) for a user of the device (e.g., a user account associated with the device or a user account currently logged into the device) is not available for viewing via the electronic device, the electronic device optionally concurrently displays (1908), in the media suggestion user interface on the display, representations of a plurality of on-demand media items (e.g., a media items that do not correspond to currently-live events) suggested for the user based on the second selection criteria (e.g., on-demand interest criteria) without displaying, on the display, a representation of a live-event media item (e.g., without displaying, on the display, the representation of the first live media item or any other live media item), such as in FIG. 6A. The above- and below-described manners of displaying and providing access to live-event media items in conjunction with displaying and providing access to on-demand media items allows the electronic device to provide all relevant media items to a user in a focused manner, independent of the kind of media that they are, which simplifies interactions between the user and the device and enhances the operability of the device and makes the user-device interface more efficient (e.g., by allowing a viewer to access different kinds of media with fewer inputs), which, additionally, reduces power usage and improves battery life of the device by enabling the user to use the device more quickly and efficiently.

In some embodiments, broadcasting of a live event entails some delays with respect to the live event due to various factors or processes in the broadcast chain; however, such potentially delayed broadcasts of media items are still considered to be live-event media items, as the broadcasts are of a live event, as opposed to being broadcasts of previously-recorded events (e.g., events that are not currently happening) or content, such as movies, television shows, etc.). In some embodiments, when a live-event media item becomes available, it is displayed at or near the front of the list of suggested media items in the user interface, such as in FIG. 18A, and when the live-event media item ends or concludes, it is removed from the list of suggested media items in the user interface, such as in FIG. 18D, in contrast to the behavior of non-live-event media items as described with reference to methods 700, 900 and 1100. In some embodiments, the plurality of representations of suggested media items available via the electronic device include a predetermined number of on-demand recordings of live events (e.g., a single on-demand recording of a live event) selected based on predetermined criteria, such as in FIG. 18A (e.g., a live event for which a recording recently became available, a live event that the user started watching but stopped watching before the live event ended, a live event that the user explicitly indicated interest in by favoriting, bookmarking or otherwise marking for later viewing). In some embodiments, when a new on-demand recording of a live event that meets the predetermined criteria is available, a prior on-demand recording of the live event is removed from the plurality of representations of suggested media items (e.g., an oldest or lowest rated prior on-demand recording of the live event) so as to maintain the predetermined number of on-demand recordings of live events in the plurality of representations of suggested media items. In some embodiments, a representation of a suggested media item available via the electronic device is removed when it is determined to have been "watched," wherein an on-demand recording of a live event is determined to have been watched when a user has played at least a predetermined portion of the live event (e.g., an end of a sport game in the live event).

In some embodiments, the first selection criteria includes a requirement that the user has expressed interest in a subject of the first live-event media item without requiring the user to have specifically expressed interest in the first live-event media item (1910), such as in FIG. 18A (e.g., the user has expressed interest in a news topic, a sports team, a sport player, etc. that is related to the first event, a sport event that the user watched for more than a predetermined amount of time such as 30 seconds, 1 minute, 5 minutes, and which is still ongoing). In some embodiments, the second selection criteria includes a requirement that the user has expressed interest in the on-demand media item (1912), such as in FIGS. 6A-6LL (e.g., by watching, favoriting, bookmarking, purchasing, adding to a watchlist or otherwise interacting with the particular on-demand media item that is included in the media suggestion user interface).

In some embodiments, the representation of the first live-event media item includes a visual indication that the live-event media item is live (1914), such as in FIG. 18A. In some embodiments, the representation of the first live-event media item includes a visual indication of one or more statistics (e.g., sport scores, votes, poll results) associated with the first live-event media item (1916), such as in FIG. 18A. In some embodiments, the visual indication of the one or more statistics are displayed overlaid on top of a representative image of the first live media item, such as in FIG. 18A. In some embodiments, the one or more statistics are updated periodically during the first live-event media item (1918) (e.g., every 30 seconds, 1 minute, 5 minutes, 10 minutes or when the media suggestion user interface is refreshed, the statistics are updated). In some embodiments, the representation of the first live-event media item includes a visual indication of a time period associated with an event that is a subject of the first live-event media item (1920) (e.g., a period/quarter/inning of a game and/or an amount of time since the period/quarter/inning started, or an amount of time until the period/quarter/inning ends). In some embodiments, the representation of the first live-event media item includes a representative image of an event that is a subject of the first live-event media item (1922), such as in FIG. 18A (e.g., the representative image includes one or more of: a performer in the first event, a player in the first event, an image of a location of the first event, an image captured during the first event such as a frame from the first live-event media item, a video captured during the first event). In some embodiments, all of the representations of live-event media items displayed in the media suggestion user interface include video (e.g., video from the first event). In some embodiments, only the representation of a live-event media item that currently has the focus in the media suggestion user interface includes video (e.g., video from the first event), while the other representations of live-event media items do not (e.g., include still images).

In some embodiments, the first live-event media item is a broadcast of a sport event that includes a first team and a second team (1924), such as in FIG. 18A, the representation of the first live-event media item includes an image of a player on the first team (1926), such as in FIG. 18A (e.g., the representation is a still image, the representation is a sequence of images such as a video or slideshow or animated image), the representation of the first live-event media item and the respective representation of the on-demand media item are displayed overlaid on representative content of a media item that currently has focus in the media suggestion user interface (1928), such as in FIG. 18A (e.g., is currently selected and/or highlighted in the media suggestion user interface), and while the representation of the first live-event media item currently has focus, the representative content includes an image of a player on the second team (1930), such as in FIG. 18A. In some embodiments, the representative content is a still image, and in some embodiments, the representation is a sequence of images such as a video or slideshow or animated image.

In some embodiments, the image of the player on the first team is an image of a player on a home team for the sport event (1932), such as in FIG. 18A (e.g., the representation of the first live-event media item is selected to include a player from the team that is associated with the sport event venue at which the sport event is taking place), and the image of the player on the second team is an image of a player on an away team for the sport event (1934), such as in FIG. 18A (e.g., the representative content is selected to include a player from the team that is not associated with the sport event venue at which the sport event is taking place).

In some embodiments, while displaying the media suggestion user interface and focus is on the representation of the first live-event media item, the representation of the first live-event media item is visually distinguished from other representations in the plurality of representations of suggested media items, such as in FIG. 18A (e.g., by being shown at a different size or z-height, or by being otherwise visually distinguished from the other representations of media items), and the plurality of representations of suggested media items are displayed over representative content of the first live-event media item (1936), such as in FIG. 18A. While displaying the media suggestion user interface and focus is on the representation of the first live-event media item, the electronic device optionally detects (1938), via the one or more input devices, an input to move the focus to a next media item in the media suggestion user interface, such as in FIG. 18B (e.g., a left/right swipe on a touch-sensitive surface or a left/right selection input such as a tap on a left or right side of a touch sensitive surface or a press of a left or right navigation button). In some embodiments, in response to detecting, via the one or more input devices, the input to move the focus to the next media item, in accordance with a determination that the next media item is a respective on-demand media item, the electronic device ceases to emphasize (1942) the representation of the first live-event media item from the other representations in the plurality of representations of suggested media items, emphasizes a representation of the respective on-demand media item relative to other representations in the plurality of representations of suggested media items, and replaces the representative content of the first live-event media item with representative content of the respective on-demand media item, such as in FIG. 18B. In some embodiments, in accordance with a determination that the next media item is a second live-event media item for a second event (e.g., a second live media item that meets the first selection criteria), the electronic device ceases to emphasize (1944) the representation of the first live-event media item from the other representations in the plurality of representations of suggested media items, emphasizes a representation of the second live-event media item relative to other representations in the plurality of representations of suggested media items, and replaces the representative content of the first live-event media item with representative content of the second live-event media item, such as in FIG. 18C.

In some embodiments, the second live-event media item is a broadcast of a sport event that includes a third team and a fourth team (1946), the representation of the second live-event media item includes an image of a player on the third team (1948) (e.g., the representation is a still image, the representation is a sequence of images such as a video or slideshow or animated image), and the representative content of the second live-event media item includes an image of a player on the fourth team (1950), such as in FIG. 18C. In some embodiments, the representative content is a still image, and in some embodiments, the representation is a sequence of images such as a video or slideshow or animated image. In some embodiments, the image of the player on the third team is an image of a player on a home team for the sport event that includes the third team and the fourth team (1952), such as in FIG. 18C (e.g., the representation of the second live-event media item is selected to include a player from the team that is associated with the sport event venue at which the sport event is taking place), and the image of the player on the fourth team is an image of a player on an away team for the sport event that includes the third team and the fourth team (1954), such as in FIG. 18C (e.g., the representative content is selected to include a player from the team that is not associated with the sport event venue at which the sport event is taking place).

In some embodiments, after the first live-event media item has ended, the electronic device receives (1956), via the one or more input devices, a request to redisplay the suggested media items (e.g., launching a media item suggestion application, such as a media navigation user interface as described with reference to methods 700, 900 and 1100, a verbal request to "show me something to watch", scrolling in the media item suggestion application to a media item suggestion region). In response to the request to redisplay the suggested media items, the electronic device optionally concurrently displays (1958), in the media suggestion user interface, representations of a plurality of on-demand media items suggested for the user based on the second selection criteria (e.g., on-demand interest criteria) without displaying the representation of the first live-event media item, such as in FIG. 18D (e.g., once a live-event media item ends, it is no longer displayed as a suggested media item, which optionally differs from non-live-event media items, which optionally remain displayed as a suggested media item until a user take certain action with respect to those items such as watching those items, removing those items, etc.).

In some embodiments, while displaying the media suggestion user interface, the electronic device optionally detects (1960), via the one or more input devices, an input to navigate within the media suggestion user interface, such as in FIGS. 18E-18F (e.g., an up/down swipe on a touch-sensitive surface or a up/down selection input such as a tap on a top or bottom side of a touch sensitive surface or a press of a top or bottom navigation button). In response to detecting the input to navigate within the media suggestion user interface (1962), the electronic device optionally ceases to display (1964) the plurality of representations of suggested media items, displays (1966), on the display, a first group of media items that includes a plurality of representations of on-demand media items that share one or more characteristics (e.g., popular movies, westerns, tv shows, etc.), and displays (1968), on the display, a second group of media items that includes a plurality of representations of live-event media items, such as in FIGS. 18E-18F (e.g., live broadcasts of sports events, news programs, etc.). In some embodiments, the second group of media items is sorted in accordance with one or more criteria including: sorting live events before upcoming events; sorting live events that are of higher interest to the user before live events that are of lower interest to the user based on user preference information such as favorite teams, historical viewing habits, preferred sports, etc.; and/or sorting upcoming events that are starting sooner before upcoming events that are starting later. In some embodiments, if there is no live-event media that the user is entitled to watch and/or there are not live event-media that meets user preference criteria, then the row of live-event media items is not displayed.

In some embodiments, the plurality of representations of live-event media items includes at least one representation of an ongoing event, and at least one representation of an upcoming event that is scheduled to occur in the future, and the representations of ongoing events are visually distinguished from the representations of upcoming events (1970), such as in FIG. 18F. In some embodiments, representations of ongoing events include a consistent graphical element that indicates that the event is live (e.g., currently ongoing), such as in FIG. 18F. In some embodiments, representations of upcoming events include a representation of the start time of the event in place of the consistent graphical element that indicates that the event is live, such as in FIG. 18F. In some embodiments, the ongoing events include metadata about the current state of the event (e.g., a score and/or timing information such as a current segment of the game and an amount of time left in that segment of the game), such as in FIG. 18F. In some embodiments, the representations of ongoing events include images corresponding to the event (e.g., an image of one or more participants in the event, an image from the live event itself) while upcoming events are represented by graphics representing the teams that will be participating in the event (e.g., team logos for the two teams that are participating in the event), such as in FIG. 18F. In some embodiments, the first group of media items and the second group of media items are both selected so as to include media items that the user is entitled to view (1972) (e.g., without additional payments or subscription fees, the user has subscription(s) with media provider(s) that provide the user access to the media items, the user has purchased the media items, etc.).

In some embodiments, while displaying the first group of media items and the second group of media items, the electronic device receives (1974), via the one or more input devices, a request to display more live-event media items (e.g., selection of a "sports" section from a menu of media item sections), such as in FIG. 18G. In response to receiving the request to display more live-event media items, the electronic device optionally displays (1976), on the display, a live-event media user interface that includes representations of a plurality of live-event media items grouped into a plurality of groups of live-event media items, including a first group that shares at least a first common characteristic, and a second group that shares at least a second common characteristic that is different from the first common characteristic, such as in FIG. 18H. For example, the common characteristic is the same sport (e.g., baseball, basketball, football, soccer), the same sports organization (e.g., NHL, NBA, NCAA, FIFA), or the same sport event (e.g., March Madness, World Series, Winter Olympics). In some embodiments, the live-event media user interface includes an affordance, that, when selected, causes the electronic device to display, on the display, a user interface for selecting preferences for live-event content (e.g., specifying favorite news topics, favorite sports, favorite players, favorite games, etc.). In some embodiments, the plurality of live-event media items in the live-event media user interface include one or more live-event media items that the user is entitled to view, and one or more live-event media items that the user is not entitled to view (1978) (e.g., pay per view content or content that requires a subscription to watch that the user does not have).

In some embodiments, the live-event media user interface includes a plurality of representations of different categories of live-event media items (1980) (e.g., categories for different sports, such as soccer, baseball, football, golf, tennis), such as in FIG. 18I. In some embodiments, the electronic device detects (1982), via the one or more input devices, selection of a respective representation of a respective category of live-event media items, similar to as described with reference to FIG. 8I. In response to detecting the selection of the respective representation of the respective category of live-event media items, in accordance with a determination that the respective category of live-event media items is a first category of live-event media items, the electronic device optionally displays (1986), on the display, representations for a plurality of live-event media items of the first category of live-event media items without displaying representations of live-event media items of a second category of live-event media items, similar to as described with reference to FIG. 8J. In some embodiments, in accordance with a determination that the respective category of live-event media items is the second category of live-event media items, the electronic device displays (1988), on the display, representations for a plurality of live-event media items of the second category of live-event media items without displaying representations of live-event media items of the first category of live-event media items, similar to as described with reference to FIG. 8J (e.g., selection of a particular category of live-event media items optionally causes display of live-event media items of that category only, without displaying live-event media items of another category).

In some embodiments, a group of representations of live-event media items is displayed along with one or more representations of events that have already ended (e.g., a sport event that has ended), wherein a representation of an event that has already ended is visually distinguished from a representation of an event that is ongoing. (1990), such as in FIG. 18J (e.g., the group of representations of live-event media items that is displayed includes both representations of one or more ongoing events and representations of one or more events that have already concluded). In some embodiments, the representation of the event that has already concluded includes a visual indicator such as a "replay" badge at a location that is occupied by a "live" indicator for an event that is ongoing, such as in FIG. 18J. In some embodiments, the representation of the event that is ongoing includes metadata for the event (e.g., a score and/or current time period associated with the event) that is not included in the representation of the event that has already concluded, such as in FIGS. 18I-18J (e.g., for games that have ended, scores and time periods are not displayed on the representation of the event).

In some embodiments, the electronic device determines that an ongoing event meets notification criteria (1992) (e.g., criteria that is met if the user has instructed the electronic device to follow a team and that team starts playing a game, if there is an iconic rivalry between two teams and those two teams are playing a game, if there is a major sports event like the super bowl, if there is an exciting game where the lead has changed a certain number of times in a certain time period), and in response to determining that the ongoing event meets the notification criteria, the electronic device displays (1994), on the display, a notification indicating that a live-event media item corresponding to the ongoing event is available for viewing. In accordance with a determination that a selection corresponding to the notification is detected while the notification is displayed (e.g., the user selects the notification), the electronic device optionally displays, on the display, the live-event media item corresponding to the ongoing event. In accordance with a determination that a predetermined time period has elapsed without interaction with the notification, the electronic device optionally ceases to display (1998) the notification without displaying the live-event media item corresponding to the ongoing event. In some embodiments, the notification is displayed over a browsing user interface of the device such as the media suggestion user interface. In some embodiments, the notification is displayed over a playing media item (e.g., on-demand media such as a movie or TV show or live-event media such as a sport event).

In some embodiments, while displaying a respective representation of a respective live-event media item, the electronic device detects (1998-2), via the one or more input devices, selection corresponding to the respective representation of the respective live-event media item, similar to as described with reference to FIG. 6R (e.g., the user selects the representation of the live-event media item). In response to detecting the selection corresponding to the respective representation of the respective live-event media item, the electronic device optionally displays (1998-4), on the display, the respective live-event media item (1998-4), similar to as described with reference to FIG. 6S. In some embodiments, displaying the respective live-event media item includes opening (e.g., displaying) an application for viewing the live-event media item, and then displaying the live-event media item in that application, similar to as described with reference to FIG. 6S. In some embodiments, displaying the respective live-event media item includes displaying the live-event media item from within the media item suggestion application that displays the media suggestion user interface without opening (e.g., displaying) another application.

It should be understood that the particular order in which the operations in FIGS. 19A-19K have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100 and 1300) are also applicable in an analogous manner to method 1900 described above with respect to FIGS. 19A-19K. For example, the suggested media items, media suggestion user interface, and unified media browsing application described above with reference to method 1900 optionally have one or more of the characteristics of the suggested media items, media suggestion user interface, and unified media browsing application described herein with reference to other methods described herein (e.g., methods 700, 900, 1100 and 1300). For brevity, these details are not repeated here.

The operations in the information processing methods described above are, optionally, implemented by running one or more functional modules in an information processing apparatus such as general purpose processors (e.g., as described with respect to FIGS. 1A, 3 and 5A) or application specific chips. Further, the operations described above with reference to FIGS. 19A-19K are, optionally, implemented by components depicted in FIGS. 1A-1B. For example, receiving operation 1902 and displaying operations 1904, 1906 and 1908 are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface 604 corresponds to a pre-defined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The operations described above with reference to FIGS. 7A-7L, 9A-9H, 11A-11F, 13A-13E and 19A-19K are, optionally, implemented by components depicted in FIGS. 1A-1B or FIGS. 14-17. For example, displaying operations 702, 904, 1302, 1904, 1906 and 1908, receiving operations 704, 902, 906, 910, 1102, 1318 and 1902, transitioning operation 708, replacing operations 710 and 912, scrolling operation 908 and initiating operation 1104 are, optionally implemented by event sorter 170, event recognizer 180, and event handler 190. Event monitor 171 in event sorter 170 detects a contact on a touch-sensitive surface, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B or FIGS. 14-17.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at an electronic device in communication with a display and one or more input devices:
  receiving, via the one or more input devices, a user input corresponding to a request to display a media browsing user interface;
  in response to receiving the user input corresponding to the request to display the media browsing user interface, displaying, on the display, the media browsing user interface, wherein the media browsing user interface concurrently includes:
    a plurality of representations of suggested media items available on the electronic device via different media sources, wherein the plurality of representations is displayed overlaid on top of first representative content that corresponds to a representation of a first media item of the suggested media items that currently has focus, and wherein a respective suggested media item is included in the suggested media items based on prior user action that occurred on a second electronic device, different from the electronic device, and no respective media application via which the respective suggested media item is available is installed on the electronic device; and
    information indicating a source of the first media item that currently has focus;
  while displaying the plurality of representations of suggested media items in the media browsing user interface overlaid on top of the first representative content, receiving, via the one or more input devices, an input corresponding to a request to navigate through the plurality of representations of suggested media items; and
  in response to receiving the input corresponding to the request to navigate through the plurality of representations of media items:
    transitioning a representation of a second media item of the suggested media items to having focus instead of the first media item having focus; and
    without causing playback, on the display, of the second media item:
      replacing display of the first representative content with second representative content that corresponds to the second media item; and
      replacing display of the information indicating the source of the first media item with information indicating a source of the second media item.

2. The method of claim 1, wherein:
the first representative content that corresponds to the first media item includes a still image that corresponds to the first media item; and
the second representative content that corresponds to the second media item includes a still image that corresponds to the second media item.

3. The method of claim 1, wherein:
the first representative content that corresponds to the first media item includes a video that corresponds to the first media item; and
the second representative content that corresponds to the second media item includes a video that corresponds to the second media item.

4. The method of claim 1, further comprising:
after receiving the input corresponding to the request to navigate through the plurality of representations of suggested media items, receiving, via the one or more input devices, a second input corresponding to a request to navigate further through the plurality of representations of suggested media items; and in response to receiving the second input corresponding to the request to navigate further through the plurality of representations of suggested media items, revealing, in the media browsing user interface, one or more representations of trending media items available on the electronic device, wherein the representations of the trending media items were not displayed in the media browsing user interface before receiving the second input corresponding to the request to navigate further through the plurality of representations of suggested media items.

5. The method of claim 1, wherein the first media item is included in the suggested media items because a user of the electronic device has selected the first media item to be included in the media browsing user interface, and the second media item is included in the suggested media items based on prior viewing activity of the user with respect to media on the electronic device.

6. The method of claim 5, wherein:
the second media item is part of a collection of episodic media;
the collection of episodic media includes media items available via a first content provider and a second content provider;
the second media item is available via the second content provider but not via the first content provider; and
the second media item was selected for inclusion in the suggested media items based on viewing activity of the user with respect to media items in the collection of episodic media that are available via the first content provider.

7. The method of claim 1, further comprising:
in accordance with a determination that a respective media item of the suggested media items is a new episode in a collection of episodic media that a user of the electronic device has been watching, and that the user has not yet watched the new episode, prioritizing display of a representation of the respective media item in the representations of the suggested media items based on a recency of the user's entitlement to access the respective media item.

8. The method of claim 1, wherein:
in accordance with a determination that a user of the electronic device has partially watched the first media item, the first representative content that corresponds to the first media item includes a visual indicator of a playback progress for the first media item; and
in accordance with a determination that the user of the electronic device has partially watched the second media item, the second representative content that corresponds to the second media item includes a visual indicator of a playback progress for the second media item.

9. The method of claim 1, wherein:
the first representative content that corresponds to the first media item includes information indicating why the first media item is included in the suggested media items, and
the second representative content that corresponds to the second media item includes information indicating why the second media item is included in the suggested media items.

10. The method of claim 1, wherein:
the first representative content that corresponds to the first media item includes the information indicating the source of the first media item, and
the second representative content that corresponds to the second media item includes the information indicating the source of the second media item.

11. The method of claim 1, further comprising:
receiving, via the one or more input devices, an input corresponding to a selection of a respective representation of a respective media item of the suggested media items; and
in response to receiving the input corresponding to the selection of the respective representation of the respective media item:
launching a media application corresponding to the respective media item on the electronic device; and
causing playback, on the display, of the respective media item in the media application corresponding to the respective media item.

12. The method of claim 11, wherein the input corresponding to the request to navigate through the plurality of representations of suggested media items corresponds to a request to navigate through the plurality of representations of suggested media items in a first direction, and the method further comprises:
receiving, via the one or more input devices, a second input corresponding to a request to navigate further through the plurality of representations of suggested media items in a second direction, different from the first direction;
in response to receiving the second input corresponding to the request to navigate further through the plurality of representations of suggested media items, revealing, in the media browsing user interface, one or more representations of additional suggested media items available on the electronic device, wherein the representations of the additional suggested media items were not displayed in the media browsing user interface prior to receiving the second input;
receiving, via the one or more input devices, an input corresponding to a selection of a second respective representation of a second respective media item of the additional suggested media items; and
in response receiving the input corresponding to the selection of the second respective representation of the second respective media item, displaying, on the display, a media information page corresponding to the second respective media item.

13. The method of claim 11, further comprising:
while the media application corresponding to the respective media item is displayed on the display, receiving, via the one or more input devices, an input corresponding to a request to navigate backward on the electronic device; and
in response to receiving the input corresponding to the request to navigate backward on the electronic device, navigating backward within the media application in accordance with the input.

14. The method of claim 1, further comprising:
receiving, via the one or more input devices, an input corresponding to a selection of a respective representation of the respective suggested media item; and
in response to receiving the input corresponding to the selection of the respective representation of the respective suggested media item, displaying, on the display, a prompt to install the respective media application on the electronic device.

15. The method of claim 14, further comprising:
receiving, via the one or more input devices, a sequence of inputs corresponding to inputs to install the respective media application on the electronic device and authorize the respective media application on the electronic device; and
upon installing and authorizing the respective media application on the electronic device, without further user intervention, starting playback of the respective suggested media item on the display.

16. The method of claim 1, further comprising:
receiving, via the one or more input devices, an input corresponding to a first action with respect to a respective media item not included in the suggested media items; and
after receiving the input corresponding to the first action with respect to the respective media item, displaying, on the display, the media browsing user interface including the plurality of representations of the suggested media items, the plurality of representations of the suggested media items including a representation of the respective media item.

17. The method of claim 16, further comprising:
while displaying the media browsing user interface on the display, receiving, via the one or more input devices, an input enabling a private media browsing mode on the electronic device; and
in response to receiving the input enabling the private media browsing mode on the electronic device:
enabling the private media browsing mode on the electronic device; and
replacing the plurality of representations of the suggested media items in the media browsing user interface with a second plurality of representations of second suggested media items that are not selected for inclusion in the media browsing user interface based on prior user actions associated with those media items.

18. The method of claim 17, further comprising:
while the private media browsing mode is enabled on the electronic device, receiving, via the one or more input devices, a second input corresponding to the first action with respect to a second respective media item not included in the suggested media items;
after receiving the second input, receiving, via the one or more input devices, an input disabling the private media browsing mode on the electronic device; and
in response to receiving the input disabling the private media browsing mode on the electronic device:
disabling the private media browsing mode on the electronic device; and
redisplaying the plurality of representations of the suggested media items in the media browsing user interface, the plurality of representations of the suggested media items not including a representation of the second respective media item.

19. The method of claim 17, further comprising:
while the private media browsing mode is enabled on the electronic device, receiving, via the one or more input devices, an input disabling the private media browsing mode on the electronic device; and in response to receiving the input disabling the private media browsing mode on the electronic device:
disabling the private media browsing mode on the electronic device; and
redisplaying the plurality of representations of the suggested media items in the media browsing user interface.

20. The method of claim 1, further comprising:
while the representation of the first media item of the suggested media items has focus:
in accordance with a determination that the user of the electronic device has partially watched the first media item, the representation of the first media item includes a visual indicator of a playback progress for the first media item; and
in response to receiving the input corresponding to the request to navigate through the plurality of representations of media items:
updating the representation of the first media item to not include the visual indicator of the playback progress for the first media item; and
in accordance with a determination that the user of the electronic device has partially watched the second media item, updating the representation of the second media item to include a visual indicator of a playback progress for the second media item.

21. The method of claim 1, wherein in accordance with a determination that access to a respective media item of the suggested media items will be expiring within a predetermined time period, a representation of the respective media item is displayed at a prioritized position in the plurality of representations of suggested media items based on an upcoming expiration of the access to the respective media item.

22. The method of claim 21, wherein:
in accordance with a determination that access to the respective media item of the suggested media items will not be expiring within the predetermined time period, the representation of the respective media item is not displayed at the prioritized position in the plurality of representations of suggested media items based on an upcoming expiration of the access to the respective media item.

23. The method of claim 22, wherein:
the plurality of representations of suggested media items concurrently includes the representation of the respective media item and a representation of a second respective media item, wherein:
access to the respective media item will be expiring within a first time period;
access to the second respective media item will be expiring within a second time period, longer than the first time period; and
the representation of the respective media item is displayed at a prioritized position relative to the representation of the second respective media item.

24. An electronic device, comprising:
one or more processors;
memory; and
one or more programs, wherein the one or more programs are stored in the memory and configured to be executed by the one or more processors, the one or more programs including instructions for:
receiving, via one or more input devices, a user input corresponding to a request to display a media browsing user interface;

in response to receiving the user input corresponding to the request to display the media browsing user interface, displaying, on a display, the media browsing user interface, wherein the media browsing user interface concurrently includes:
  a plurality of representations of suggested media items available on the electronic device via different media sources, wherein the plurality of representations is displayed overlaid on top of first representative content that corresponds to a representation of a first media item of the suggested media items that currently has focus, and wherein a respective suggested media item is included in the suggested media items based on prior user action that occurred on a second electronic device, different from the electronic device, and no respective media application via which the respective suggested media item is available is installed on the electronic device; and
  information indicating a source of the first media item that currently has focus;
while displaying the plurality of representations of suggested media items in the media browsing user interface overlaid on top of the first representative content, receiving, via one or more input devices, an input corresponding to a request to navigate through the plurality of representations of suggested media items; and
in response to receiving the input corresponding to the request to navigate through the plurality of representations of media items:
  transitioning a representation of a second media item of the suggested media items to having focus instead of the first media item having focus; and
  without causing playback, on the display, of the second media item:
    replacing display of the first representative content with second representative content that corresponds to the second media item; and
    replacing display of the information indicating the source of the first media item with information indicating a source of the second media item.

25. The electronic device of claim 24, wherein:
the first representative content that corresponds to the first media item includes a still image that corresponds to the first media item; and
the second representative content that corresponds to the second media item includes a still image that corresponds to the second media item.

26. The electronic device of claim 24, wherein:
the first representative content that corresponds to the first media item includes a video that corresponds to the first media item; and
the second representative content that corresponds to the second media item includes a video that corresponds to the second media item.

27. The electronic device of claim 24, wherein the one or more programs further include instructions for:
after receiving the input corresponding to the request to navigate through the plurality of representations of suggested media items, receiving, via the one or more input devices, a second input corresponding to a request to navigate further through the plurality of representations of suggested media items; and
in response to receiving the second input corresponding to the request to navigate further through the plurality of representations of suggested media items, revealing, in the media browsing user interface, one or more representations of trending media items available on the electronic device, wherein the representations of the trending media items were not displayed in the media browsing user interface before receiving the second input corresponding to the request to navigate further through the plurality of representations of suggested media items.

28. The electronic device of claim 24, wherein the first media item is included in the suggested media items because a user of the electronic device has selected the first media item to be included in the media browsing user interface, and the second media item is included in the suggested media items based on prior viewing activity of the user with respect to media on the electronic device.

29. The electronic device of claim 28, wherein:
the second media item is part of a collection of episodic media;
the collection of episodic media includes media items available via a first content provider and a second content provider;
the second media item is available via the second content provider but not via the first content provider; and
the second media item was selected for inclusion in the suggested media items based on viewing activity of the user with respect to media items in the collection of episodic media that are available via the first content provider.

30. The electronic device of claim 24, wherein the one or more programs further include instructions for:
in accordance with a determination that a respective media item of the suggested media items is a new episode in a collection of episodic media that a user of the electronic device has been watching, and that the user has not yet watched the new episode, prioritizing display of a representation of the respective media item in the representations of the suggested media items based on a recency of the user's entitlement to access the respective media item.

31. The electronic device of claim 24, wherein:
in accordance with a determination that a user of the electronic device has partially watched the first media item, the first representative content that corresponds to the first media item includes a visual indicator of a playback progress for the first media item; and
in accordance with a determination that the user of the electronic device has partially watched the second media item, the second representative content that corresponds to the second media item includes a visual indicator of a playback progress for the second media item.

32. The electronic device of claim 24, wherein:
the first representative content that corresponds to the first media item includes information indicating why the first media item is included in the suggested media items, and
the second representative content that corresponds to the second media item includes information indicating why the second media item is included in the suggested media items.

33. The electronic device of claim 24, wherein:
the first representative content that corresponds to the first media item includes the information indicating the source of the first media item, and
the second representative content that corresponds to the second media item includes the information indicating the source of the second media item.

34. The electronic device of claim 24, wherein the one or more programs further include instructions for:
    receiving, via the one or more input devices, an input corresponding to a selection of a respective representation of a respective media item of the suggested media items; and
    in response to receiving the input corresponding to the selection of the respective representation of the respective media item:
        launching a media application corresponding to the respective media item on the electronic device; and
        causing playback, on the display, of the respective media item in the media application corresponding to the respective media item.

35. The electronic device of claim 34, wherein the input corresponding to the request to navigate through the plurality of representations of suggested media items corresponds to a request to navigate through the plurality of representations of suggested media items in a first direction, and the one or more programs further include instructions for:
    receiving, via the one or more input devices, a second input corresponding to a request to navigate further through the plurality of representations of suggested media items in a second direction, different from the first direction;
    in response to receiving the second input corresponding to the request to navigate further through the plurality of representations of suggested media items, revealing, in the media browsing user interface, one or more representations of additional suggested media items available on the electronic device, wherein the representations of the additional suggested media items were not displayed in the media browsing user interface prior to receiving the second input;
    receiving, via the one or more input devices, an input corresponding to a selection of a second respective representation of a second respective media item of the additional suggested media items; and
    in response receiving the input corresponding to the selection of the second respective representation of the second respective media item, displaying, on the display, a media information page corresponding to the second respective media item.

36. The electronic device of claim 34, wherein the one or more programs further include instructions for:
    while the media application corresponding to the respective media item is displayed on the display, receiving, via the one or more input devices, an input corresponding to a request to navigate backward on the electronic device; and
    in response to receiving the input corresponding to the request to navigate backward on the electronic device, navigating backward within the media application in accordance with the input.

37. The electronic device of claim 24, wherein the one or more programs further include instructions for:
    receiving, via the one or more input devices, an input corresponding to a first action with respect to a respective media item not included in the suggested media items; and
    after receiving the input corresponding to the first action with respect to the respective media item, displaying, on the display, the media browsing user interface including the plurality of representations of the suggested media items, the plurality of representations of the suggested media items including a representation of the respective media item.

38. The electronic device of claim 37, wherein the one or more programs further include instructions for:
    receiving, via the one or more input devices, a sequence of inputs corresponding to inputs to install the respective media application on the electronic device and authorize the respective media application on the electronic device; and
    upon installing and authorizing the respective media application on the electronic device, without further user intervention, starting playback of the respective suggested media item on the display.

39. The electronic device of claim 24, wherein the one or more programs further include instructions for:
    receiving, via the one or more input devices, an input corresponding to a first action with respect to a respective media item not included in the suggested media items; and
    after receiving the input corresponding to the first action with respect to the respective media item, displaying, on the display, the media browsing user interface including the plurality of representations of the suggested media items, the plurality of representations of the suggested media items including a representation of the respective media item.

40. The electronic device of claim 37, wherein the one or more programs further include instructions for:
    while displaying the media browsing user interface on the display, receiving, via the one or more input devices, an input enabling a private media browsing mode on the electronic device; and
    in response to receiving the input enabling the private media browsing mode on the electronic device:
        enabling the private media browsing mode on the electronic device; and
        replacing the plurality of representations of the suggested media items in the media browsing user interface with a second plurality of representations of second suggested media items that are not selected for inclusion in the media browsing user interface based on prior user actions associated with those media items.

41. The electronic device of claim 40, wherein the one or more programs further include instructions for:
    while the private media browsing mode is enabled on the electronic device, receiving, via the one or more input devices, a second input corresponding to the first action with respect to a second respective media item not included in the suggested media items;
    after receiving the second input, receiving, via the one or more input devices, an input disabling the private media browsing mode on the electronic device; and
    in response to receiving the input disabling the private media browsing mode on the electronic device:
        disabling the private media browsing mode on the electronic device; and
        redisplaying the plurality of representations of the suggested media items in the media browsing user interface, the plurality of representations of the suggested media items not including a representation of the second respective media item.

42. The electronic device of claim 40, wherein the one or more programs further include instructions for:
    while the private media browsing mode is enabled on the electronic device, receiving, via the one or more input devices, an input disabling the private media browsing mode on the electronic device; and in response to receiving the input disabling the private media browsing mode on the electronic device:
  disabling the private media browsing mode on the electronic device; and
  redisplaying the plurality of representations of the suggested media items in the media browsing user interface.

43. The electronic device of claim 24, wherein the one or more programs further include instructions for:
  while the representation of the first media item of the suggested media items has focus:
    in accordance with a determination that the user of the electronic device has partially watched the first media item, the representation of the first media item includes a visual indicator of a playback progress for the first media item; and
    in response to receiving the input corresponding to the request to navigate through the plurality of representations of media items:
      updating the representation of the first media item to not include the visual indicator of the playback progress for the first media item; and
      in accordance with a determination that the user of the electronic device has partially watched the second media item, updating the representation of the second media item to include a visual indicator of a playback progress for the second media item.

44. The electronic device of claim 24, wherein in accordance with a determination that access to a respective media item of the suggested media items will be expiring within a predetermined time period, a representation of the respective media item is displayed at a prioritized position in the plurality of representations of suggested media items based on an upcoming expiration of the access to the respective media item.

45. The electronic device of claim 44, wherein:
  in accordance with a determination that access to the respective media item of the suggested media items will not be expiring within the predetermined time period, the representation of the respective media item is not displayed at the prioritized position in the plurality of representations of suggested media items based on the upcoming expiration of the access to the respective media item.

46. The electronic device of claim 44, wherein:
  the plurality of representations of suggested media items concurrently includes the representation of the respective media item and a representation of a second respective media item, wherein:
    access to the respective media item will be expiring within a first time period;
    access to the second respective media item will be expiring within a second time period, longer than the first time period; and
    the representation of the respective media item is displayed at a prioritized position relative to the representation of the second respective media item.

47. A non-transitory computer readable storage medium storing one or more programs, the one or more programs comprising instructions, which when executed by one or more processors of an electronic device, cause the electronic device to:
  receive, via the one or more input devices, a user input corresponding to a request to display a media browsing user interface;
  in response to receiving the user input corresponding to the request to display the media browsing user interface, display, on a display, the media browsing user interface, wherein the media browsing user interface concurrently includes:
    a plurality of representations of suggested media items available on the electronic device via different media sources, wherein the plurality of representations is displayed overlaid on top of first representative content that corresponds to a representation of a first media item of the suggested media items that currently has focus, and wherein a respective suggested media item is included in the suggested media items based on prior user action that occurred on a second electronic device, different from the electronic device, and no respective media application via which the respective suggested media item is available is installed on the electronic device; and
    information indicating a source of the first media item that currently has focus;
  while displaying the plurality of representations of suggested media items in the media browsing user interface overlaid on top of the first representative content, receive, via one or more input devices, an input corresponding to a request to navigate through the plurality of representations of suggested media items; and
  in response to receiving the input corresponding to the request to navigate through the plurality of representations of media items:
    transition a representation of a second media item of the suggested media items to having focus instead of the first media item having focus; and
    without causing playback, on the display, of the second media item:
      replace display of the first representative content with second representative content that corresponds to the second media item; and
      replace display of the information indicating the source of the first media item with information indicating a source of the second media item.

48. The non-transitory computer readable storage medium of claim 47, wherein:
  the first representative content that corresponds to the first media item includes a still image that corresponds to the first media item; and
  the second representative content that corresponds to the second media item includes a still image that corresponds to the second media item.

49. The non-transitory computer readable storage medium of claim 47, wherein:
  the first representative content that corresponds to the first media item includes a video that corresponds to the first media item; and
  the second representative content that corresponds to the second media item includes a video that corresponds to the second media item.

50. The non-transitory computer readable storage medium of claim 47, wherein the instructions further cause the electronic device to:
  after receiving the input corresponding to the request to navigate through the plurality of representations of suggested media items, receive, via the one or more input devices, a second input corresponding to a request to navigate further through the plurality of representations of suggested media items; and
  in response to receiving the second input corresponding to the request to navigate further through the plurality of representations of suggested media items, reveal, in the media browsing user interface, one or more representations of trending media items available on the electronic device, wherein the representations of the trending media items were not displayed in the media browsing user interface before receiving the second input corresponding to the request to navigate further through the plurality of representations of suggested media items.

51. The non-transitory computer readable storage medium of claim 47, wherein the first media item is included in the suggested media items because a user of the electronic device has selected the first media item to be included in the media browsing user interface, and the second media item is included in the suggested media items based on prior viewing activity of the user with respect to media on the electronic device.

52. The non-transitory computer readable storage medium of claim 51, wherein:
the second media item is part of a collection of episodic media;
the collection of episodic media includes media items available via a first content provider and a second content provider;
the second media item is available via the second content provider but not via the first content provider; and
the second media item was selected for inclusion in the suggested media items based on viewing activity of the user with respect to media items in the collection of episodic media that are available via the first content provider.

53. The non-transitory computer readable storage medium of claim 47, wherein the instructions further cause the electronic device to:
in accordance with a determination that a respective media item of the suggested media items is a new episode in a collection of episodic media that a user of the electronic device has been watching, and that the user has not yet watched the new episode, prioritize display of a representation of the respective media item in the representations of the suggested media items based on a recency of the user's entitlement to access the respective media item.

54. The non-transitory computer readable storage medium of claim 47, wherein:
in accordance with a determination that a user of the electronic device has partially watched the first media item, the first representative content that corresponds to the first media item includes a visual indicator of a playback progress for the first media item; and
in accordance with a determination that the user of the electronic device has partially watched the second media item, the second representative content that corresponds to the second media item includes a visual indicator of a playback progress for the second media item.

55. The non-transitory computer readable storage medium of claim 47, wherein:
the first representative content that corresponds to the first media item includes information indicating why the first media item is included in the suggested media items, and the second representative content that corresponds to the second media item includes information indicating why the second media item is included in the suggested media items.

56. The non-transitory computer readable storage medium of claim 47, wherein:
the first representative content that corresponds to the first media item includes the information indicating the source of the first media item, and the second representative content that corresponds to the second media item includes the information indicating the source of the second media item.

57. The non-transitory computer readable storage medium of claim 47, wherein the instructions further cause the electronic device to:
receive, via the one or more input devices, an input corresponding to a selection of a respective representation of a respective media item of the suggested media items; and
in response to receiving the input corresponding to the selection of the respective representation of the respective media item:
launch a media application corresponding to the respective media item on the electronic device; and
cause playback, on the display, of the respective media item in the media application corresponding to the respective media item.

58. The non-transitory computer readable storage medium of claim 57, wherein the input corresponding to the request to navigate through the plurality of representations of suggested media items corresponds to a request to navigate through the plurality of representations of suggested media items in a first direction, and the instructions further cause the electronic device to:
receive, via the one or more input devices, a second input corresponding to a request to navigate further through the plurality of representations of suggested media items in a second direction, different from the first direction;
in response to receiving the second input corresponding to the request to navigate further through the plurality of representations of suggested media items, reveal, in the media browsing user interface, one or more representations of additional suggested media items available on the electronic device, wherein the representations of the additional suggested media items were not displayed in the media browsing user interface prior to receiving the second input;
receive, via the one or more input devices, an input corresponding to a selection of a second respective representation of a second respective media item of the additional suggested media items; and
in response receiving the input corresponding to the selection of the second respective representation of the second respective media item, display, on the display, a media information page corresponding to the second respective media item.

59. The non-transitory computer readable storage medium of claim 57, wherein the instructions further cause the electronic device to:
while the media application corresponding to the respective media item is displayed on the display, receive, via the one or more input devices, an input corresponding to a request to navigate backward on the electronic device; and
in response to receiving the input corresponding to the request to navigate backward on the electronic device, navigate backward within the media application in accordance with the input.

60. The non-transitory computer readable storage medium of claim 47, wherein the instructions further cause the electronic device to:
receive, via the one or more input devices, an input corresponding to a selection of a respective representation of the respective suggested media item; and in response to receiving the input corresponding to the selection of the respective representation of the respective suggested media item, display, on the display, a prompt to install the respective media application on the electronic device.

61. The non-transitory computer readable storage medium of claim 60, wherein the instructions further cause the electronic device to:
receive, via the one or more input devices, a sequence of inputs corresponding to inputs to install the respective media application on the electronic device and authorize the respective media application on the electronic device; and
upon installing and authorizing the respective media application on the electronic device, without further user intervention, start playback of the respective suggested media item on the display.

62. The non-transitory computer readable storage medium of claim 47, wherein the instructions further cause the electronic device to:
receive, via the one or more input devices, an input corresponding to a first action with respect to a respective media item not included in the suggested media items; and
after receiving the input corresponding to the first action with respect to the respective media item, display, on the display, the media browsing user interface including the plurality of representations of the suggested media items, the plurality of representations of the suggested media items including a representation of the respective media item.

63. The non-transitory computer readable storage medium of claim 62, wherein the instructions further cause the electronic device to:
while displaying the media browsing user interface on the display, receive, via the one or more input devices, an input enabling a private media browsing mode on the electronic device; and
in response to receiving the input enabling the private media browsing mode on the electronic device:
enable the private media browsing mode on the electronic device; and
replace the plurality of representations of the suggested media items in the media browsing user interface with a second plurality of representations of second suggested media items that are not selected for inclusion in the media browsing user interface based on prior user actions associated with those media items.

64. The non-transitory computer readable storage medium of claim 63, wherein the instructions further cause the electronic device to:
while the private media browsing mode is enabled on the electronic device, receive, via the one or more input devices, a second input corresponding to the first action with respect to a second respective media item not included in the suggested media items;
after receiving the second input, receive, via the one or more input devices, an input disabling the private media browsing mode on the electronic device; and
in response to receiving the input disabling the private media browsing mode on the electronic device:
disable the private media browsing mode on the electronic device; and
redisplay the plurality of representations of the suggested media items in the media browsing user interface, the plurality of representations of the suggested media items not including a representation of the second respective media item.

65. The non-transitory computer readable storage medium of claim 63, wherein the instructions further cause the electronic device to:
while the private media browsing mode is enabled on the electronic device, receive, via the one or more input devices, an input disabling the private media browsing mode on the electronic device; and
in response to receiving the input disabling the private media browsing mode on the electronic device:
disable the private media browsing mode on the electronic device; and
redisplay the plurality of representations of the suggested media items in the media browsing user interface.

66. The non-transitory computer readable storage medium of claim 47, wherein the instructions further cause the electronic device to:
while the representation of the first media item of the suggested media items has focus:
in accordance with a determination that the user of the electronic device has partially watched the first media item, the representation of the first media item includes a visual indicator of a playback progress for the first media item; and
in response to receiving the input corresponding to the request to navigate through the plurality of representations of media items:
update the representation of the first media item to not include the visual indicator of the playback progress for the first media item; and
in accordance with a determination that the user of the electronic device has partially watched the second media item, update the representation of the second media item to include a visual indicator of a playback progress for the second media item.

67. The non-transitory computer readable storage medium of claim 47, wherein in accordance with a determination that access to a respective media item of the suggested media items will be expiring within a predetermined time period, a representation of the respective media item is displayed at a prioritized position in the plurality of representations of suggested media items based on an upcoming expiration of the access to the respective media item.

68. The non-transitory computer readable storage medium of claim 67 wherein:
in accordance with a determination that access to the respective media item of the suggested media items will not be expiring within the predetermined time period, the representation of the respective media item is not displayed at the prioritized position in the plurality of representations of suggested media items based on the upcoming expiration of the access to the respective media item.

69. The non-transitory computer readable storage medium of claim 67, wherein:
the plurality of representations of suggested media items concurrently includes the representation of the respective media item and a representation of a second respective media item, wherein:
access to the respective media item will be expiring within a first time period;
access to the second respective media item will be expiring within a second time period, longer than the first time period; and the representation of the respective media item is displayed at a prioritized position relative to the representation of the second respective media item.

\* \* \* \* \*